United States Patent
Miller et al.

(10) Patent No.: US 12,491,185 B2
(45) Date of Patent: Dec. 9, 2025

(54) INHIBITORS OF mPTP

(71) Applicant: NRG Therapeutics Ltd, Stevenage (GB)

(72) Inventors: Neil Miller, Stevenage (GB); Gilles Ouvry, Stevenage (GB); Richard Rutter, Stevenage (GB); Tammy Ladduwahetty, Cardiff (GB); Christopher Thomson, Cardiff (GB); Jan Kulagowski, London (GB); Michael Rowley, Chelmsford (GB); Andrew Tuffnell, Saffron Walden (GB); Gabriel Negoita-Giras, Saffron Walden (GB); Mark Stewart, Saffron Walden (GB); Rachel Armstrong, Saffron Walden (GB); Susan Boyd, Cambridge (GB)

(73) Assignee: NRG THERAPEUTICS LTD, Stevenage (GB)

( * ) Notice: Subject to any disclaimer, the term of this patent is extended or adjusted under 35 U.S.C. 154(b) by 0 days.

(21) Appl. No.: 19/024,972

(22) Filed: Jan. 16, 2025

(65) Prior Publication Data

US 2025/0177397 A1     Jun. 5, 2025

Related U.S. Application Data

(63) Continuation of application No. PCT/GB2024/050146, filed on Jan. 19, 2024.

(30) Foreign Application Priority Data

Jan. 19, 2023 (GB) .................................. 2300833

(51) Int. Cl.
| | |
|---|---|
| *A61K 31/513* | (2006.01) |
| *A61K 31/4196* | (2006.01) |
| *A61P 7/04* | (2006.01) |
| *C07D 239/22* | (2006.01) |
| *C07D 249/12* | (2006.01) |

(52) U.S. Cl.
CPC ........ *A61K 31/513* (2013.01); *A61K 31/4196* (2013.01); *A61P 7/04* (2018.01); *C07D 239/22* (2013.01); *C07D 249/12* (2013.01)

(58) Field of Classification Search
None
See application file for complete search history.

(56) References Cited

U.S. PATENT DOCUMENTS

| | | | |
|---|---|---|---|
| 4,349,552 A | 9/1982 | Takaya et al. | |
| 5,102,882 A | 4/1992 | Kimura et al. | |
| 5,541,337 A | 7/1996 | Müller et al. | |
| 2023/0159508 A1 | 5/2023 | Lewis et al. | |
| 2023/0312466 A1 | 10/2023 | Miller et al. | |
| 2024/0006714 A1 | 1/2024 | Kim et al. | |

FOREIGN PATENT DOCUMENTS

| | | |
|---|---|---|
| EP | 4 393 469 A1 | 7/2024 |
| WO | WO 03/063797 A2 | 8/2003 |
| WO | WO 2005/105760 A1 | 11/2005 |
| WO | WO 2009/074789 A1 | 6/2009 |
| WO | WO 2011/139107 A2 | 11/2011 |
| WO | WO 2011/151370 A1 | 12/2011 |
| WO | WO 2013/048942 A1 | 4/2013 |
| WO | WO 2013/151923 A1 | 10/2013 |
| WO | WO 2014/115072 A1 | 7/2014 |
| WO | WO 2015/173168 A1 | 11/2015 |
| WO | WO 2016/077375 A1 | 5/2016 |
| WO | WO 2016/198256 A3 | 12/2016 |
| WO | WO 2021/055612 A1 | 3/2021 |
| WO | WO 2022/049376 A1 | 3/2022 |
| WO | WO 2023/008973 A1 | 2/2023 |
| WO | WO 2023/166303 A1 | 9/2023 |
| WO | WO 2024/153945 A1 | 7/2024 |

OTHER PUBLICATIONS

Coomber et al., "Tuning Reactivity in Pd-catalysed C(sp³)-H Arylations via Directing Group Modifications and Solvent Selection", Adv. Synth. Catal., 2020, vol. 362, pp. 5105-5115.

Fancelli et al., "Cinnamic Anilides as New Mitochondrial Permeability Transition Pore Inhibitors Endowed with Ischemia-Reperfusion Injury Protective Effect in Vivo", J. Med. Chem., 2014, vol. 57, pp. 5333-5347.

International Search Report, issued in PCT/GB2024/050146, dated May 21, 2024.

Jung et al., "Facile diverted synthesis of pyrrolidinyl triazoles using organotrifluoroborate: discovery of potential mPTP blockers", Org. Biomol. Chem., 2014, vol. 12, pp. 9674-9682.

Kneller et al., "Structural, Electronic, and Electrostatic Determinants for Inhibitor Binding to Subsites S1 and S2 in SARS-CoV-2 Main Protease", J. Med. Chem., 2021, vol. 64, pp. 17366-17383.

Kokkonen et al., "Virtual screening approach of sirtuin inhibitors results in two new scaffolds", European Journal of Pharmaceutical Sciences, 2015, vol. 76, pp. 27-32.

(Continued)

*Primary Examiner* — Leslie A. Royds Draper

(74) *Attorney, Agent, or Firm* — Birch, Stewart, Kolasch & Birch, LLP

(57) ABSTRACT

The invention relates to compounds of formula (I), and related aspects.

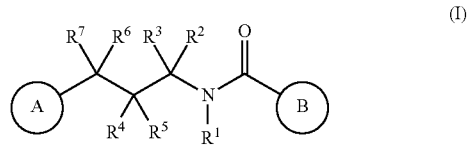

(I)

30 Claims, No Drawings

(56) References Cited

OTHER PUBLICATIONS

Köse et al., "An Agonist Radioligand for the Proinflammatory Lipid-Activated G Protein-Coupled Receptor GPR84 Providing Structural Insights", J. Med. Chem., 2020, vol. 63, pp. 2391-2410.
PubChem CID 119796429. Jun. 15, 2016, pp. 1-5.
PubChem CID 131949973, Dec. 20, 2017, pp. 1-5.
PubChem CID 136306228, Jan. 23, 2019, pp. 1-7.
PubChem CID 138994327, Sep. 13, 2019, pp. 1-5.
PubChem CID 71853659, Nov. 29, 2013, pp. 1-6.
PubChem CID 71853800, Nov. 29, 2013, pp. 1-5.
PubChem CID 71854902, Nov. 29, 2013, pp. 1-5.
PubChem CID 71920696, Nov. 29, 2013, pp. 1-6.
PubChem CID 72842497, Feb. 28, 2014, pp. 1-6.
PubChem CID 86783998, Feb. 7, 2015, pp. 1-5.
PubChem CID 99826377, Dec. 11, 2015, pp. 1-5.
Written Opinion of the International Preliminary Examining Authority, Issued in PCT/GB2024/050146, dated Nov. 22, 2024.
Written Opinion of the International Searching Authority, issued in PCT/GB2024/050146, dated May 21, 2024.
Database registry—Chemical Abstracts Service: XP093139540, Jun. 28, 2020, 1 page, CAS Registry No. 2466788-11-2.

INHIBITORS OF mPTP

CROSS REFERENCE TO RELATED APPLICATIONS

This application is a Continuation of PCT International Application No. PCT/GB2024/050146, filed on Jan. 19, 2024, which claims priority under 35 U.S.C. 119(a) to Patent Application No. 2300833.7, filed in the United Kingdom on Jan. 19, 2023, all of which are hereby expressly incorporated by reference into the present application.

FIELD OF THE INVENTION

The invention relates to novel compounds which are inhibitors of the mitochondrial permeability transition pore (mPTP). The invention also inter alia relates to such compounds for use as medicaments, in particular, for the treatment or prevention of degenerative, neurodegenerative or mitochondrial diseases or other diseases or disorders in which inhibition of mPTP provides a therapeutic or prophylactic effect.

BACKGROUND TO THE INVENTION

The mitochondria permeability transition pore (mPTP) is a high conductance channel residing on the inner mitochondrial membrane that is activated under certain conditions of cellular stress, in particular excessive $Ca^{2+}$ loading and oxidative stress. It is permeable to solutes with molecular mass <1.5 kDa, is voltage and $Ca^{2+}$ dependent and exhibits a characteristic large conductance. Once activated, oxidative phosphorylation is uncoupled resulting in the loss of the mitochondria membrane potential and disrupted mitochondria metabolism. In addition, solutes enter the mitochondrial matrix resulting in swelling, eventual rupture of the outer membrane with consequent release of apoptotic factors as well as sequestered $Ca^{2+}$, leading to eventual cell death via apoptosis or necrosis depending on the type and physiology of the cell. As such it has been implicated as a key pathological event in multiple degenerative and metabolic diseases.

Under normal physiological conditions mitochondria play a key role in regulating cellular $Ca^{2+}$ homeostasis. $Ca^{2+}$ entering the cell via cell surface channels, a common mechanism of cell signalling, is rapidly sequestered by mitochondria, preventing excessive and toxic $Ca^{2+}$ accumulation in the cell cytoplasm. In cell types such as neurons, skeletal muscle myofibers and cardiomyocytes which undergo high levels of $Ca^{2+}$ flux, this $Ca^{2+}$ 'buffering' effect of mitochondria is critical to maintain cell health. However, there is a limit to the capacity of mitochondria to sequester $Ca^{2+}$ and if intramitochondrial $Ca^{2+}$ levels reach a certain threshold the $Ca^{2+}$ sensitive mPTP is activated, resulting in collapse of the mitochondria and initiation of, cell death. Activation of the mPTP in degenerative diseases may occur in a variety of ways depending on the disease, for example: 1) excessive $Ca^{2+}$ entry into cells and overload of the mitochondria with $Ca^{2+}$ 2) dysfunctional mitochondrial $Ca^{2+}$ efflux mechanisms, in particular decreased activity of the $Ca^{2+}$ efflux transporter NCLX resulting in $Ca^{2+}$ overload 3) overactivity or upregulation of the $Ca^{2+}$ uptake mechanisms in mitochondria 4) oxidative stress 5) sensitization of the mPTP due to compromised mitochondrial function i.e. mPTP activation at lower intramitochondrial concentrations of $Ca^{2+}$ 6) excessive transfer of $Ca^{2+}$ from the endoplasmic reticulum into the mitochondria at contact points between the two organelles known as mitochondria-associated-membranes.

While the properties and function of the mPTP can be studied in simple in vitro assays in isolated mitochondria, the molecular identity of the mPTP is not known. Multiple proteins have been proposed to comprise the pore forming complex, including the ATP synthase and the adenine nucleotide transporter (ANT) family of proteins but no single protein is widely accepted as being responsible for formation of the pore. However, the peptidyl prolyl cis-trans isomerase F (Ppif—Uniprot ID P30405 and also known as cyclophilin D), is well accepted to be a key regulator of the pore, though not forming a transmembrane channel in its own right. Genetic or pharmacological inhibition of Ppif significantly decreases the sensitivity of pore opening in response to $Ca^{2+}$ loading and other mPTP activators. Genetic ablation or pharmacological inhibition of Ppif has therefore been utilised to evaluate involvement of the mPTP in pathological pathways in cell and animal disease models. In this way, inhibition of the mPTP has been shown to be protective in numerous models of disease, in particular those where $Ca^{2+}$ dysregulation and oxidative stress are known to contribute to cellular degeneration. Notably, genetic knockout of Ppif was shown to be protective in various preclinical in vivo transgenic models of neurodegenerative disease including Alzheimer's disease, Parkinson's disease and motor neuron disease, also known as Amyotrophic Lateral Sclerosis (ALS), demonstrating the therapeutic potential of mPTP inhibition. In each of these diseases, genetic mutations in particular proteins that cause inherited forms of disease (i.e. amyloid precursor protein, alpha-synuclein and superoxide dismutase 1 respectively), and are expressed in the mouse models, have been shown to cause either $Ca^{2+}$ overload of the mitochondria or sensitization of the mPTP. Recent evidence suggests this may occur through a common mechanism in Alzheimer's, Parkinson's and Friedreich's ataxia. In each case, it has been reported that in cells expressing the mutated disease associated proteins (amyloid precursor protein, PINK1 and frataxin respectively), the activity or expression of the mitochondrial $Ca^{2+}$ efflux transporter, NCLX, is decreased, resulting in $Ca^{2+}$ overload of the mitochondria. In the case of Parkinson's disease, the pathological aggregated form of the protein alpha-synuclein, a common misfolded protein in sporadic and inherited cases of Parkinson's disease, has also been shown to sensitise and activate the mPTP.

Genetic ablation of Ppif has been shown to be beneficial in numerous other preclinical models of degenerative disease, therefore demonstrating the potential of mPTP inhibitors in Duchenne and congenital forms of muscular dystrophy, ischemia-reperfusion injury, bone repair, pancreatitis and inter alia other associated disorders.

In addition to the demonstrated benefit of Ppif inhibition in preclinical models, mPTP function has been shown to be dysregulated in multiple other disease indications. In particular, in a number of diseases the threshold for mPTP activation in response to $Ca^{2+}$ loading appears to be sensitised suggesting that mPTP activation may occur aberrantly under physiological conditions and drive tissue degeneration. For example, in muscle mitochondria from elderly human muscle biopsies, the threshold for mPTP activation is reduced compared to healthy control. In these diseases, this sensitization of mPTP activity underlies additional rationale for the therapeutic potential of mPTP inhibitors.

mPTP inhibitors may also have therapeutic potential in other diseases where mitochondrial dysfunction, oxidative stress, inflammatory stress or $Ca^{2+}$ dysregulation occur during disease pathogenesis.

The discovery and development of inhibitors of the mPTP has largely been focused on identification of Ppif inhibitors. Cyclosporin A (CsA), originally identified as an immunosuppressant by virtue of its inhibitory activity at calcineurin, was also found to inhibit Ppif as well as other members of the peptidyl prolyl cis-trans isomerase (Ppi) enzyme family. Several cyclosporin A derivatives e.g. Debio-25, NIM811 were subsequently developed that retained broad activity against the Ppi enzyme family without inhibiting calcineurin, however none of these progressed to market. To date, no potent brain penetrant selective Ppif inhibitors have been reported. Other more recent approaches to discover mPTP inhibitors, have utilised phenotypic screens in isolated mitochondria. These have successfully identified potent small molecule mPTP inhibitors with a Ppif-independent mode of action.

Yu et al., (2020, Cell, 183, 1-14) relates to the link between mPTP activation and the mechanism of TDP-43 proteinopathy such as TAR DNA-binding protein 43 (TDP-43) associated neurodegeneration. Accumulation in neuronal cytoplasm of the normally nuclear protein TDP-43 is a disease hallmark for almost all cases of ALS and 40-50% of Frontotemporal Lobar Degeneration (FTLD), with some familial cases caused by mutant forms of the protein. Both diseases are associated with a neuroinflammatory cytokine profile related to upregulation of NF-κB and type I IFN pathways, directly suggesting a role for TDP-43 in neuroinflammation. Mutant or overexpressed WT TDP-43 in neurons mis-localises to the mitochondria and induces the release of mitochondrial DNA (mtDNA) into the cytoplasm. This mtDNA then activates the immune sensor cGAS-STING triggering the induction of innate immune genes such as IL-6, TNFα, and interferonβ. Inhibition of the mPTP with cyclosporin A or via Ppif knockout, prevents the TDP-43 induced release of mtDNA and subsequent induction of innate immune response genes. Furthermore, inhibition of cGAS-STING extends the survival of mutant mice expressing a mutant TDP-43. The data implicates mPTP activation in mediating the toxic effects of TDP-43 in ALS and other disease where either mutations in the TDP-43 gene causes disease or where TDP-43 proteinopathy is observed.

Jang et al., (2021 American Journal of Physiology: Renal physiology, 2021 321:4, F431-F442) highlighted the potential therapeutic benefit of mPTP inhibition (via Ppif knockout) in a mouse model of kidney fibrosis. Unilateral ureteral obstruction was used to induce kidney fibrosis in WT and Ppif KO mice. Inflammation, proximal tubule atrophy and markers of fibrosis were reduced in the Ppif KO mice versus WT. Measures of fibrosis included collagen deposition, α-SMA and TGFβ expression, and interstitial cell proliferation. This highlights the potential role of the mPTP in cell injury/death-mediated tissue remodelling and fibrogenesis. mPTP inhibitors may therefore be beneficial in diseases where fibrosis is a key pathological mechanism, e.g, chronic kidney disease, idiopathic pulmonary fibrosis, non-alcoholic steatohepatitis, primary biliary cholangitis and systemic sclerosis.

WO2010/049768 relates to acrylamido derivatives and their use as therapeutic agents, particularly for the prevention and/or treatment of diseases associated with the activity of the mPTP (see also Plyte et al. J. Med Chem. 2014, 57, 5333-47). Chen et al. (Assay and Drug Development Technologies, 2018, 16, 445-455) relates to phenotypic screening for mPTP modulators using platelets, and discloses further acrylamido derivatives. CA2884607A1 relates to acrylamido and maleimide compounds which are said to be useful in the treatment of mitochondrial diseases. WO2022/049376, WO2022/049377 and WO2023/166303 disclose cinamide compounds which are inhibitors of the mPTP.

There remains a need to find further compounds which are inhibitors of the mPTP.

SUMMARY OF THE INVENTION

In a first aspect, the invention provides a compound according to formula (I):

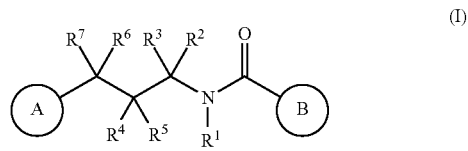

wherein:
R¹ is H or $C_{1-4}$alkyl;
R² is H, halo, $C_{1-4}$alkyl, $C_{1-4}$haloalkyl, $C_{1-4}$alkoxy, $C_{1-4}$haloalkoxy or $C_{0-4}$alkylene(OH);
R³ is H, halo or $C_{1-4}$alkyl;
R⁴ is H, halo or $C_{1-4}$alkyl;
R⁵ is halo, $C_{1-6}$alkyl, $C_{1-6}$haloalkyl, $C_{1-6}$alkoxy, $C_{1-6}$haloalkoxy, $C_{2-6}$alkenyl, $C_{2-6}$haloalkenyl, $C_{0-6}$alkylene($C_{3-6}$cycloalkyl), $C_{0-6}$alkylene(OH); or R⁴ and R⁵ together with the carbon atom to which they are attached form a $C_{5-11}$spirocarbocyclyl, 4 to 7 membered heterocycle or $C_{3-6}$cycloalkyl wherein said spirocarbocyclyl, heterocycle or cycloalkyl may be optionally substituted by one or more groups selected from $C_{1-3}$alkyl, $C_{1-3}$haloalkyl and halo;
R⁶ is H or $C_{1-4}$alkyl;
R⁷ is H, halo, $C_{1-4}$alkyl, $C_{1-4}$haloalkyl, $C_{1-4}$alkoxy or $C_{1-4}$haloalkoxy;
A is a monocyclic or bicyclic aryl or a monocyclic or bicyclic heteroaryl, wherein said aryl or heteroaryl may be optionally substituted by one or more A¹;
A¹ is independently selected from the group consisting of: $C_{1-3}$alkylthio, halo, $C_{1-6}$ alkyl, $C_{1-6}$haloalkyl, $C_{1-6}$alkoxy, $C_{1-6}$haloalkoxy, $C_{3-6}$cycloalkyl, CN, OH, $NR^gR^h$, or $NHSO_2R^j$;
$R^g$ is H or $C_{1-4}$alkyl;
$R^h$ is H or $C_{1-6}$alkyl;
$R^j$ is $C_{1-4}$alkyl;
or when A represents phenyl substituted by one or more A¹, R⁵ together with a substituent A¹ in the ortho position are joined and together represent $(CH_2)_v$ wherein v represents 1, 2 or 3 and wherein one of the said $CH_2$ groups may optionally be replaced by O;
B is a monocyclic or bicyclic heterocycle or a monocyclic or bicyclic heteroaryl, wherein said heterocycle or heteroaryl may be optionally substituted by one or more B¹; B¹ is halo, $C_{1-6}$alkyl, $C_{1-6}$haloalkyl, $C_{1-6}$alkoxy, $C_{1-6}$haloalkoxy, oxo (=O), thiooxo (=S) or $C_{0-6}$alkylene(OH);

or a salt and/or solvate thereof,
and provided that formula (I) is not N-((1-benzylcyclobutyl)methyl)-6-hydroxypyrazine-2-carboxamide:

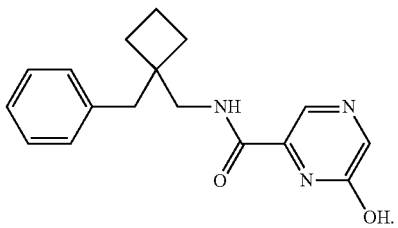 [SMILES: O=C(NCC1(Cc2ccccc2)CCC1)c1cncc(O)n1]

In one embodiment, a compound of formula (I) is provided in the form of a salt. In one embodiment, a compound of formula (I) is provided in the form of a pharmaceutically acceptable salt. In one embodiment, a compound of formula (I) is provided in the form of a solvate. In one embodiment, a compound of formula (I) is provided in the form of a pharmaceutically acceptable solvate. In one embodiment, a compound of formula (I) is provided in the form of a pharmaceutically acceptable salt and solvate (i.e. a pharmaceutically acceptable salt of a pharmaceutically acceptable solvate). In one embodiment, a compound of formula (I) is provided.

The invention further provides pharmaceutical compositions comprising a compound of formula (I), or a pharmaceutically acceptable salt and/or solvate thereof, and a pharmaceutically acceptable carrier or excipient, wherein the proviso of formula (I) does not apply.

The invention also provides the use of a compound of formula (I), or pharmaceutically acceptable salt and/or solvate thereof, in the manufacture of a medicament for the treatment or prophylaxis of a disease or disorder in which inhibition of mPTP provides a therapeutic or prophylactic effect, wherein the proviso of formula (I) does not apply.

The invention also provides the use of a compound of formula (I), or a pharmaceutically acceptable salt and/or solvate thereof, the manufacture of a medicament for the treatment or prophylaxis of a disease or disorder in which inhibition of mPTP provides a therapeutic or prophylactic effect, wherein the proviso of formula (I) does not apply.

The invention also provides a method of preventing or treating a disorder in which inhibition of mPTP provides a therapeutic or prophylactic effect in a subject, which comprises administering to a subject in need thereof an effective amount of a compound of formula (I), or a pharmaceutically acceptable salt and/or solvate thereof, wherein the proviso of formula (I) does not apply.

Suitably the disease or disorder is selected from degenerative or neurodegenerative diseases, disorders of the central nervous system, ischemia and re-perfusion injury, metabolic diseases, inflammatory or autoimmune diseases, diseases of aging and renal diseases.

The invention also provides a compound of formula (I), or a pharmaceutically acceptable salt and/or solvate thereof, for use in the treatment or prophylaxis of a mitochondrial disease, wherein the proviso of formula (I) does not apply.

The invention also provides the use of a compound of formula (I), or a pharmaceutically acceptable salt and/or solvate thereof, in the manufacture of a medicament for the treatment or prophylaxis of a mitochondrial disease, wherein the proviso of formula (I) does not apply.

The invention also provides a method of preventing or treating a mitochondrial disease in a subject, which comprises administering to a subject in need thereof an effective amount of a compound of formula (I), or a pharmaceutically acceptable salt and/or solvate thereof, wherein the proviso of formula (I) does not apply.

The invention also provides a compound of formula (I), or a pharmaceutically acceptable salt and/or solvate thereof, for use in the treatment or prophylaxis of a disease or disorder associated with TDP-43 proteinopathy such as TDP-43 associated neurodegeneration, wherein the proviso of formula (I) does not apply.

The invention also provides the use of a compound of formula (I), or a pharmaceutically acceptable salt and/or solvate thereof, in the manufacture of a medicament for the treatment or prophylaxis of a disease or disorder associated with TDP-43 proteinopathy such as TDP-43 associated neurodegeneration, wherein the proviso of formula (I) does not apply.

The invention also provides a method of treating or preventing a disease or disorder associated with TDP-43 proteinopathy such as TDP-43 associated neurodegeneration, which comprises administering to a subject in need thereof an effective amount of a compound of formula (I), or a pharmaceutically acceptable salt and/or solvate thereof, wherein the proviso of formula (I) does not apply.

The invention also provides a compound of formula (I), or a pharmaceutically acceptable salt and/or solvate thereof, for use in the treatment or prophylaxis of a disease or disorder associated with fibrosis, wherein the proviso of formula (I) does not apply.

The invention also provides the use of a compound of formula (I), or a pharmaceutically acceptable salt and/or solvate thereof, in the manufacture of a medicament for the treatment or prophylaxis of a disease or disorder associated with fibrosis, wherein the proviso of formula (I) does not apply.

The invention also provides a method of treating or preventing a disease or disorder associated with fibrosis, which comprises administering to a subject in need thereof an effective amount of a compound of formula (I), or a pharmaceutically acceptable salt and/or solvate thereof, wherein the proviso of formula (I) does not apply.

DETAILED DESCRIPTION OF THE INVENTION

The term "alkyl" as used herein, such as in $C_{1-4}$alkyl, whether alone or forming part of a larger group, is a straight or branched fully saturated hydrocarbon chain containing the specified number of carbon atoms. Examples of $C_{1-4}$alkyl groups include methyl, ethyl, n-propyl, iso-propyl, n-butyl, iso-butyl, tert-butyl and sec-butyl. Reference to "propyl" includes n-propyl and iso-propyl. Reference to "butyl" includes n-butyl, iso-butyl, tert-butyl and sec-butyl.

The term "alkylthio" as used herein, such as "$C_{1-3}$alkylthio" refers to an alkyl group (e.g. a $C_{1-3}$alkyl group) as defined above singularly bonded to a sulphur atom e.g. —S—$C_{1-3}$alkyl. Examples of $C_{1-3}$alkylthio include methylthio, ethylthio and propylthio.

The term "alkylene" as used herein, such as $C_{1-4}$alkylene or $C_{1-6}$alkylene, whether alone or forming part of a larger group e.g. $C_{1-4}$alkylene(OH), $C_{1-6}$alkylene(OH) or $C_{1-6}$alkylene($C_{3-6}$cycloalkyl), is a bifunctional straight or branched fully saturated hydrocarbon group containing the specified number of carbon atoms. Examples of $C_{1-6}$alkylene groups include methylene (i.e. —$CH_2$—), ethylene (i.e. —$CH_2CH_2$—) n-propylene (i.e. —($CH_2)_3$—), n-butylene (i.e. —($CH_2)_4$—), n-pentylene (i.e. —($CH_2)_5$—) and n-hexylene (i.e. (—CH$_2$)$_6$—). A branched example of a C$_{1-6}$alkylene group is i-propylene (i.e. —CH(Me)CH$_2$—). References to C$_0$alkylene will be understood to mean that the alkylene chain is absent e.g. C$_0$alkylene(OH) represents OH.

The term C$_{1-4}$alkylene(OH) as used herein e.g. C$_{1-4}$alkylene means a C$_{1-4}$alkyl group substituted by OH, such as CH$_2$OH. References to C$_0$alkylene will be understood to mean that the alkylene chain is absent e.g. C$_0$alkylene(OH) represents OH.

The term "alkoxy" as used herein, such as in C$_{1-4}$alkoxy or C$_{1-6}$alkoxy, refers to an alkyl group (e.g. a C$_{1-4}$alkyl group) as defined above, singularly bonded to an oxygen atom. Examples of C$_{1-6}$alkoxy groups include methoxy, ethoxy, 1-propoxy, 2-propoxy, 1-butoxy, 2-butoxy and 3-butoxy, especially methoxy.

The term 'halo' or 'halogen' as used herein, refers to fluorine, chlorine, bromine or iodine. Particular examples of halo are bromine, fluorine and chlorine, especially fluorine.

The term "haloalkyl" as used herein, such as in C$_{1-4}$haloalkyl or C$_{1-6}$haloalkyl, is a straight or branched alkyl group containing the specified number of carbon atoms, substituted by one or more halo atoms, for example fluoromethyl (CH$_2$F), di-fluoromethyl (CHF$_2$), tri-fluoromethyl (CF$_3$), 1-fluoroethyl (CHFCH$_3$) and 2-fluoroethyl (CH$_2$CH$_2$F).

The term "haloalkoxy" as used herein, such as in C$_{1-4}$haloalkoxy, refers to an haloalkyl group (e.g. a C$_{1-4}$haloalkyl group) as defined above, singularly bonded to an oxygen atom, for example, trifluoromethoxy.

The term "cycloalkyl" as used herein, such as in C$_{3-6}$cycloalkyl, whether alone or forming part of a larger group such as C$_{0-6}$alkylene(C$_{3-6}$cycloalkyl) is a fully saturated hydrocarbon ring containing the specified number of carbon atoms. Examples of C$_{3-6}$cycloalkyl groups include cyclopropyl, cyclobutyl, cyclopentyl and cyclohexyl, in particular cyclopropyl. Optionally, the cycloalkyl may be substituted as defined herein.

The term 'alkenyl' as used herein, such as in C$_{2-6}$alkenyl, refers to a straight or branched hydrocarbon group containing the specified number of carbon atoms and at least one carbon-carbon double bond, such as one or two double bonds. The term encompasses, CH═CH$_2$, CH$_2$CH═CH$_2$, CH═CHCH$_3$, CH$_2$CH$_2$CH═CH$_2$, CH═CHCH$_2$CH$_3$, CH$_2$CH═CHCH$_3$, CH$_2$CH$_2$CH$_2$CH═CH$_2$, CH═CHCH$_2$CH$_2$CH$_3$, CH$_2$CH═CHCH$_2$CH$_3$, CH$_2$CH$_2$CH═CHCH$_3$, CH═CHCH═CHCH$_3$ and CH$_2$CH═CHCH═CH$_2$. Branched variants such as CH(CH$_3$)CH═CH$_2$ and CH═C(CH$_3$)$_2$ are also included.

The term 'haloalkenyl' as used herein, such as in C$_{2-6}$haloalkenyl is a straight or a branched alkenyl chain containing the specified number of carbon atoms and at least one halogen atom, such as fluoro or chloro, for example fluoro.

The term 'aryl' as used herein refers to a mono (i.e. phenyl) or polycyclic ring system (e.g. comprising one or two, such as one additional ring) containing at least one phenyl ring, suitably an aryl group contains 6-10 ring members. Additional rings in a polycylic ring system may be saturated (e.g forming indane or tetralin) or partially unsaturated (e.g. forming indene) or fully unsaturated (e.g. forming naphthalene) hydrocarbon rings, or additional rings may be saturated or partially unsaturated heterocycles (e.g. forming chromane). Suitably aryl refers to a mono (i.e. phenyl) or a bicyclic ring system containing at least one phenyl ring (and no heteroaryl rings).

The term 'heteroaryl' as used herein refers to mono or polycyclic ring system (e.g bicyclic) with at least one ring having aromatic character and containing at least one heteroatom selected from N, O and S, for example N. Suitably a heteroaryl group contains 5-10 ring members. Where a heteroaryl group contains more than one ring, not all rings must contain a heteroatom, and not all rings must be aromatic in character. In some examples heteroaryl is monocyclic, such as a 5- or 6-membered heteroaryl ring (e.g. containing one or two heteroatom selected from N, S and O). In other examples heteroaryl is bicyclic, such as a 5,5-, 5,6- or 6,6-bicyclic system (e.g. containing one, two or three heteroatoms selected from N, S and O). A heteroaryl may contain one heteroatom selected from N, S and O, for example N and O, especially N. In other examples a heteroaryl may contain two heteroatoms selected from N, S and O. In further examples a heteroaryl may contain three heteroatoms selected from N, S and O, for example N and O. Examples of 6-membered heteroaryls include one nitrogen atom (pyridinyl), two nitrogen atoms (pyridazinyl, pyrimidinyl or pyrazinyl) and three nitrogen atoms (triazinyl). Further examples of heteroaryl include triazolyl, indolyl, indazolyl, benzofuranyl, benzimidazolyl, benzoxazolinyl, quinolinyl, isoquinolinyl and quinazolinyl.

As used herein, the term heterocycle means a non-aromatic cyclic group of carbon atoms wherein from one to four of the carbon atoms is/are replaced by one or more heteroatoms independently selected from nitrogen (N), oxygen (O) or sulfur (S). Suitably a heterocycle group contains 5-10 ring members. A heterocycle group may, for example, be monocyclic or bicyclic. In a bicyclic heterocycle group there may be one or more heteroatoms in each ring, or only in one of the rings. Where a heterocycle group contains more than one ring, not all rings must contain a heteroatom. A heteroatom may be S, O or N, and is suitably O or N. A heterocycle may contain one heteroatom selected from N, S and O, for example N and O, especially N. In other examples a heterocycle may contain two heteroatoms selected from N, S and O. In further examples a heterocycle may contain three heteroatoms selected from N, S and O, for example N and O. In some examples heterocycle is monocyclic, such as a 5- or 6-membered heterocycle ring. Examples of heterocycles include morpholinyl, tetrahydrofuran, and tetrahydropyran.

As used herein, the term C$_{5-11}$spirocarbocyclyl means a cyclic ring system containing 5 to 11 carbon atoms, wherein R$^4$ and R$^5$ are part of the sprirocarbocyclyl with the carbon that they are attached to.

Examples include:

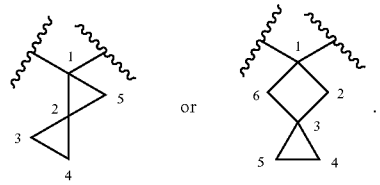

Another example of a C$_{5-11}$spirocarbocyclyl is spiropentane.

Where substituents are indicated as being optionally substituted in formula (I) in the embodiments and preferences set out below, the optional substituent may be attached to an available carbon atom, which means a carbon atom which is attached to a hydrogen atom i.e. a C—H group or the optional substituent may be attached to an available nitrogen atom, which means a nitrogen atom which is attached to a hydrogen atom i.e. a N—H group. The optional substituent replaces the hydrogen atom attached to the carbon atom or the hydrogen atom attached to the nitrogen atom.

The invention provides a compound according to formula (I):

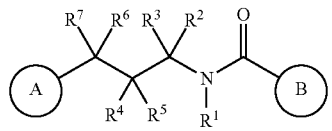

(I)

wherein:
- $R^1$ is H or $C_{1-4}$alkyl;
- $R^2$ is H, halo, $C_{1-4}$alkyl, $C_{1-4}$haloalkyl; $C_{1-4}$alkoxy, $C_{1-4}$haloalkoxy or $C_{0-4}$alkylene(OH);
- $R^3$ is H, halo or $C_{1-4}$alkyl;
- $R^4$ is H, halo or $C_{1-4}$alkyl;
- $R^5$ is halo, $C_{1-6}$alkyl, $C_{1-6}$haloalkyl, $C_{1-6}$alkoxy, $C_{1-6}$haloalkoxy, $C_{2-6}$alkenyl, $C_{2-6}$haloalkenyl, $C_{0-6}$alkylene($C_{3-6}$cycloalkyl), $C_{0-6}$alkylene(OH); or $R^4$ and $R^5$ together with the carbon atom to which they are attached form a $C_{5-11}$spirocarbocyclyl, 4 to 7 membered heterocycle or $C_{3-6}$cycloalkyl wherein said spiro carbocyclyl, heterocycle or cycloalkyl may be optionally substituted by one or more groups selected from $C_{1-3}$alkyl, $C_{1-3}$haloalkyl and halo;
- $R^6$ is H or $C_{1-4}$alkyl;
- $R^7$ is H, halo, $C_{1-4}$alkyl, $C_{1-4}$haloalkyl, $C_{1-4}$alkoxy or $C_{1-4}$haloalkoxy;
- A is a monocyclic or bicyclic aryl or a monocyclic or bicyclic heteroaryl, wherein said aryl or heteroaryl may be optionally substituted by one or more $A^1$;
  - $A^1$ is independently selected from the group consisting of: $C_{1-3}$alkylthio, halo, $C_{1-6}$alkyl, $C_{1-6}$haloalkyl, $C_{1-6}$alkoxy, $C_{1-6}$haloalkoxy, $C_{3-6}$cycloalkyl, CN, OH, $NR^gR^h$, or $NHSO_2R^j$;
  - $R^g$ is H or $C_{1-4}$alkyl;
  - $R^h$ is H or $C_{1-4}$alkyl;
  - $R^j$ is $C_{1-4}$alkyl;
- or when A represents phenyl substituted by one or more $A^1$, $R^5$ together with a substituent $A^1$ in the ortho position are joined and together represent $(CH_2)_v$, wherein v represents 1, 2 or 3 and wherein one of the said $CH_2$ groups may optionally be replaced by O;
- B is a monocyclic or bicyclic heterocycle or a monocyclic or bicyclic heteroaryl, wherein said heterocycle or heteroaryl may be optionally substituted by one or more $B^1$; $B^1$ is halo, $C_{1-6}$alkyl, $C_{1-6}$haloalkyl, $C_{1-6}$alkoxy, $C_{1-6}$haloalkoxy, oxo (=O), thiooxo (=S), or $C_{0-6}$alkylene(OH);
- or a salt and/or solvate thereof,
- and provided that formula (I) is not N-((1-benzylcyclobutyl)methyl)-6-hydroxypyrazine-2-carboxamide:

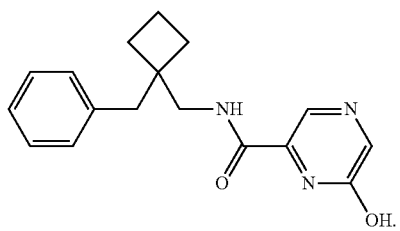 [SMILES: O=C(NCC1(Cc2ccccc2)CCC1)c1cncc(O)n1]

In a second embodiment, the invention provides a compound according to formula (IA):

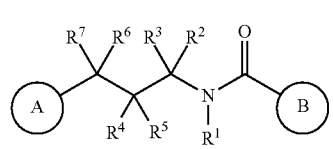

(IA)

wherein:
- $R^1$ is H or $C_{1-4}$alkyl;
- $R^2$ is H, halo, $C_{1-4}$alkyl, $C_{1-4}$haloalkyl; $C_{1-4}$alkoxy, $C_{1-4}$haloalkoxy or $C_{0-4}$alkylene(OH);
- $R^3$ is H, halo or $C_{1-4}$alkyl;
- $R^4$ is H or $C_{1-4}$alkyl;
- $R^5$ is H, halo, $C_{1-6}$alkyl, $C_{1-6}$haloalkyl, $C_{1-6}$alkoxy, $C_{1-6}$haloalkoxy, $C_{2-6}$alkenyl, $C_{2-6}$haloalkenyl, $C_{0-6}$alkylene($C_{3-6}$cycloalkyl), $C_{0-6}$alkylene(OH); or $R^4$ and $R^5$ together with the atom to which they are attached form a $C_{3-6}$cycloalkyl wherein said cycloalkyl may be optionally substituted by one or more groups selected from $C_{1-3}$alkyl, $C_{1-3}$haloalkyl and halo;
- $R^6$ is H or $C_{1-4}$alkyl;
- $R^7$ is H, halo, $C_{1-4}$alkyl, $C_{1-4}$haloalkyl, $C_{1-4}$alkoxy or $C_{1-4}$haloalkoxy;
- A is a monocyclic or bicyclic aryl or a monocyclic or bicyclic heteroaryl optionally substituted by one or more $A^1$;
  - $A^1$ is halo, $C_{1-6}$alkyl, $C_{1-6}$haloalkyl, $C_{1-6}$alkoxy, $C_{1-6}$haloalkoxy, $C_{3-6}$cycloalkyl, CN, OH, $NR^gR^h$, or $NHSO_2R^j$;
  - $R^g$ is H or $C_{1-4}$alkyl;
  - $R^h$ is H or $C_{1-4}$alkyl;
  - $R^j$ is $C_{1-4}$alkyl;
- or when A represents phenyl substituted by one or more $A^1$, $R^5$ together with a substituent $A^1$ in the ortho position are joined and together represent $(CH_2)_v$ wherein v represents 1, 2 or 3 and wherein one of the said $CH_2$ groups may optionally be replaced by O;
- B is a monocyclic or bicyclic heterocycle or a monocyclic or bicyclic heteroaryl which may be optionally substituted by one or more $B^1$;
- $B^1$ is halo, $C_{1-6}$alkyl, $C_{1-6}$haloalkyl, $C_{1-6}$alkoxy, $C_{1-6}$haloalkoxy or $C_{0-6}$alkylene(OH);
- or a salt and/or solvate thereof,
- and provided that formula (IA) is not N-((1-benzylcyclobutyl)methyl)-6-hydroxypyrazine-2-carboxamide:

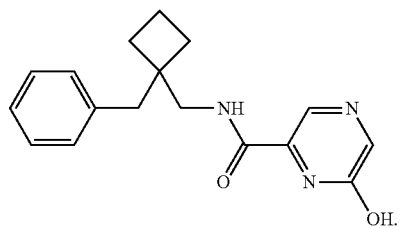 [SMILES: O=C(NCC1(Cc2ccccc2)CCC1)c1cncc(O)n1]

The compounds according to formula (IA) or a salt and/or solvate thereof are a sub-genus of compounds of formula (I) or a salt and/or solvate thereof. Compounds according to formula (IA') or a salt and/or solvate thereof are a sub-genus of compounds of formula (IA) or a salt and/or solvate thereof. Compounds according to formula (IA") or a salt and/or solvate thereof are a sub-genus of compounds of formula (IA) or a salt and/or solvate thereof. Compounds according to formula (IA''') or a salt and/or solvate thereof are a sub-genus of compounds of formula (IA) or a salt and/or solvate thereof. The embodiments that follow apply equally to the compounds of formula (I), (IA), (IA'), (IA'') and/or (IA''') or a salt and/or solvate thereof.

In one embodiment, $R^1$ is H. In a second embodiment, $R^1$ is $C_{1-4}$alkyl, such as methyl.

In one embodiment, $R^2$ is H. In a second embodiment, $R^2$ is halo. In a third embodiment, $R^2$ is fluoro. In a fourth embodiment, $R^2$ is $C_{1-4}$alkyl, such as methyl or ethyl. In a fifth embodiment, $R^2$ is $C_{1-4}$haloalkyl. In a sixth embodiment, $R^2$ is $C_{1-4}$alkoxy. In a seventh embodiment, $R^2$ is $C_{1-4}$haloalkoxy. In a eighth embodiment, $R^2$ is $C_{0-4}$alkylene(OH), such as $CH_2CH_2OH$. In a ninth embodiment, $R^2$ is $C_{1-4}$alkylene(OH), such as $CH_2CH_2OH$.

In one embodiment, $R^3$ is H. In a second embodiment, $R^3$ is halo. In a third embodiment, $R^3$ is fluoro. In a fourth embodiment, $R^3$ is $C_{1-4}$alkyl. In a fifth embodiment, $R^3$ is methyl.

In one embodiment, $R^2$ and $R^3$ are each H. In a second embodiment, $R^2$ is H and $R^3$ is methyl. In a third embodiment, $R^2$ is H and $R^3$ is ethyl.

In one embodiment, $R^4$ is H. In a second embodiment, $R^4$ is $C_{1-4}$alkyl, such as methyl. In a third embodiment, $R^4$ is halo, such as fluoro.

In one embodiment, $R^5$ is H. In a second embodiment, $R^5$ is halo. In a third embodiment, $R^5$ is $C_{1-6}$alkyl, such as methyl, ethyl, n-propyl or iso-propyl, especially ethyl. In a fourth embodiment, $R^5$ is $C_{1-6}$haloalkyl. In a fifth embodiment, $R^5$ is $C_{1-6}$alkoxy, such as OMe. In a sixth embodiment, $R^5$ is $C_{1-6}$haloalkoxy. In a seventh embodiment, $R^5$ is $C_{2-6}$alkenyl. In an eighth embodiment, $R^5$ is $C_{2-6}$haloalkenyl. In a ninth embodiment, $R^5$ is $C_{0-6}$alkylene($C_{3-6}$cycloalkyl), such as $C_{3-6}$cycloalkyl, in particular cyclopropyl or cyclobutyl, especially cyclopropyl. In a tenth embodiment, $R^5$ is $C_{0-6}$alkylene(OH), such as $CH_2OH$ or $CH(Me)(OH)$. In an eleventh embodiment, $R^5$ is fluoro.

In a twelfth embodiment, $R^5$ is

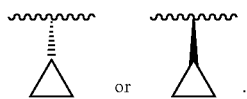

In one embodiment, $R^4$ and $R^5$ are each methyl. In a second embodiment, $R^4$ is H and $R^5$ is ethyl. In a third embodiment, $R^4$ is H and $R^5$ is iso-propyl. In one embodiment, $R^4$ is H and $R^5$ is cyclopropyl.

In a one embodiment, $R^4$ is H and $R^5$ is $C_{0-6}$alkylene($C_{3-6}$cycloalkyl), such as $C_{3-6}$cycloalkyl.

In one embodiment, $R^4$ and $R^5$ together with the carbon atom to which they are attached form a $C_{3-6}$cycloalkyl. Within such embodiments, the $C_{3-6}$cycloalkyl may be substituted by one or more (such as one, two or three, e.g. one or two) groups selected from the group consisting of $C_{1-3}$alkyl, $C_{1-3}$haloalkyl and halo. Suitably, the $C_{3-6}$cycloalkyl is not substituted. Suitably, $R^4$ and $R^5$ with the carbon atom to which they are attached form a cyclopropyl, cyclobutyl, cyclopentyl or cyclohexyl ring, such as a cyclopropyl, cyclobutyl, cyclopentyl ring, especially a cyclobutyl ring. In one embodiment, $R^4$ and $R^5$ together with the carbon atom to which they are attached form a $C_{3-6}$cycloalkyl. Within such embodiments, the $C_{3-6}$-cycloalkyl may be substituted by one or more (such as one, two or three, e.g. one or two) groups selected from the group consisting of methyl, $OCF_3$ and fluoro.

In another embodiment, $R^4$ and $R^5$ together with the carbon atom to which they are attached form a 4 to 7 membered heterocycle. Within such embodiments, the 4 to 7 membered heterocycle may be substituted by one or more (such as one, two or three, e.g. one or two, preferably one) groups selected from the group consisting of $C_{1-3}$alkyl, such as methyl, $C_{1-3}$ haloalkyl, such as $OCF_3$ and halo, such as fluoro. In another embodiment, the 4 to 7 membered heterocycle is unsubstituted. In another embodiment, $R^4$ and $R^5$ together with the carbon atom to which they are attached form a tetrahydrofuran or tetrahydropyran ring.

In another embodiment, $R^4$ and $R^5$ together with the carbon atom to which they are attached form a $C_{5-11}$spirocarbocyclyl. Within such embodiments, the $C_{5-11}$spirocarbocyclyl may be substituted by one or more (such as one, two or three, e.g. one or two, preferably one) groups selected from the group consisting of $C_{1-3}$alkyl, such as methyl, $C_{1-3}$haloalkyl, such as $OCF_3$ and halo, such as fluoro. In another embodiment, the $C_{5-11}$spirocarbocyclyl is unsubstituted. In another embodiment, $R^4$ and $R^5$ together with the carbon atom to which they are attached form a spiropentane ring.

In another embodiment, $R^4$ and $R^5$ together with the carbon atom to which they are attached form a $C_{5-11}$ spirocarbocyclyl, 4 to 7 membered heterocycle or $C_{3-6}$cycloalkyl wherein said spirocarbocyclyl, heterocycle or cycloalkyl.

In another embodiment, $R^4$ and $R^5$ together with the carbon atom to which they are attached form an unsubstituted $C_{5-11}$ spirocarbocyclyl, 4 to 7 membered heterocycle or $C_{3-6}$cycloalkyl.

In another embodiment, $R^4$ and $R^5$ together with the carbon atom to which they are attached form a cyclobutyl, cyclopentyl, spiropentane ring or a tetrahydrofuran or tetrahydropyran group.

In one embodiment, $R^6$ is H. In a second embodiment, $R^6$ is $C_{1-4}$alkyl, such as methyl.

In one embodiment, $R^7$ is H. In a second embodiment, $R^7$ is halo. In a third embodiment, $R^7$ is halo, such as fluoro. In a fourth embodiment, $R^7$ is $C_{1-4}$haloalkyl. In a fifth embodiment, $R^7$ is $C_{1-4}$alkoxy, such as OMe. In a sixth embodiment, $R^7$ is $C_{1-4}$haloalkoxy.

In one embodiment, $R^6$ is H and $R^7$ is H. In a second embodiment, $R^6$ is H and $R^7$ is methyl.

In one embodiment, at least one of $R^2$, $R^3$, $R^4$, $R^5$, $R^6$ or $R^7$ is not H. Suitably, one of $R^4$ and $R^5$ are not H.

In one embodiment, $R^2$, $R^3$, $R^6$ and $R^7$ are all H.

$R^4$ and $R^5$ may preferably have the following stereochemistry:

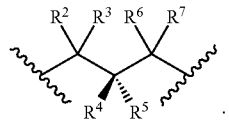

$R^4$ and $R^5$ may also have the following stereochemistry:

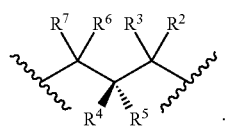

Alternatively, when $R^4$ is H, $R^4$ and $R^5$ may have the following stereochemistry:

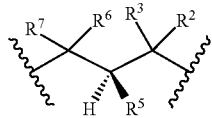

In one embodiment, A is a monocyclic aryl, such as phenyl. In a second embodiment, A is a bicyclic aryl. In a third embodiment, A is a monocyclic heteroaryl. In a fourth embodiment, A is a bicyclic heteroaryl. A is optionally substituted i.e. is substituted or is not substituted.

In one embodiment, A is substituted by substituted by one or more (such as one, two or three, for example one or two, particularly one) $A^1$.

In one embodiment, A is substituted by two $A^1$.

In one embodiment, at least one $A^1$ is halo, such as F, Br or Cl, especially F. In a second embodiment, at least one $A^1$ is $C_{1-6}$alkyl, such as methyl. In a third embodiment, at least one $A^1$ is $C_{1-6}$haloalkyl. In a fourth embodiment, at least one $A^1$ is $C_{1-6}$alkoxy, such as OMe. In a fifth embodiment, at least one $A^1$ is $C_{1-6}$haloalkoxy. In a sixth embodiment, at least one $A^1$ is $C_{3-6}$cycloalkyl. In a seventh embodiment, at least one $A^1$ is CN. In an eighth embodiment, at least one $A^1$ is OH. In a ninth embodiment, at least one $A^1$ is $NR^gR^h$. Suitably, $R^g$ is H. Suitably, $R^g$ is $C_{1-4}$alkyl. Suitably, $R^h$ is H. Suitably, $R^h$ is $C_{1-4}$alkyl. In a tenth embodiment, at least one $A^1$ is $NHSO_2R^j$. In an eleventh embodiment, at least one $A^1$ is $C_{1-3}$alkylthio. In a twelfth embodiment, at least one $A^1$ is SMe.

In one embodiment, A is not substituted.

In one embodiment, A is phenyl substituted by one or two $A^1$ groups independently selected from halo or $C_{1-6}$alkyl.

In one embodiment, A is phenyl substituted by one or two $A^1$ groups independently selected from F or $C_{1-3}$alkyl.

In one embodiment, A is selected from the group consisting of:

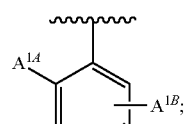

(A1)

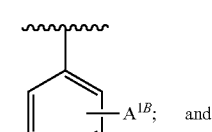

(A2)

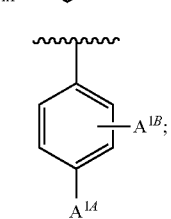

(A3)

wherein:
$A^{1A}$ is halo, such as F, Br or Cl; $C_{1-6}$alkyl, such as methyl; or $C_{1-6}$alkoxy, such as OMe; and $A^{1B}$ is H or halo, such as F, Br or Cl, especially F.

In one embodiment, A is

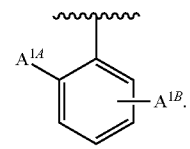

(A1)

In a second embodiment, A is

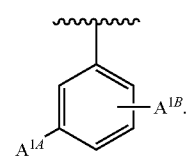

(A2)

In a third embodiment, A is

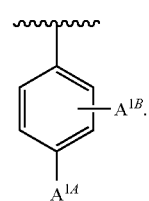

(A3)

In one embodiment, A is selected from the group consisting of:

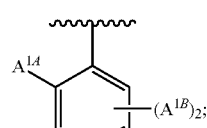

(A4)

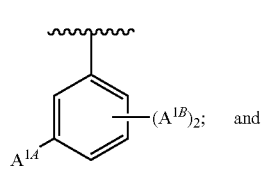

(A5) and

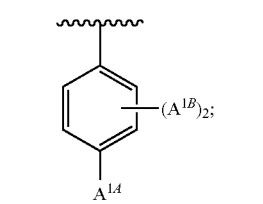

(A6)

wherein:
$A^{1A}$ is halo, such as F, Br or Cl; $C_{1-6}$alkyl, such as methyl; or $C_{1-6}$alkoxy, such as OMe; and $A^{1B}$ is H or halo, such as F, Br or Cl, especially F.

In one embodiment, A is selected from the group consisting of:

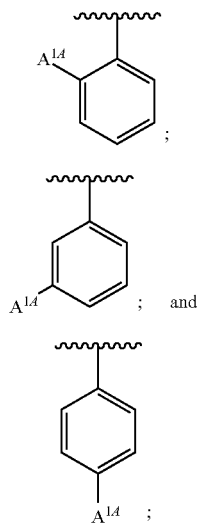

(A7); (A8); and (A9)

wherein:
A$^{1A}$ is halo, such as F, Br or Cl; C$_{1-6}$alkyl, such as methyl; or C$_{1-6}$alkoxy, such as OMe.

In one embodiment, A is

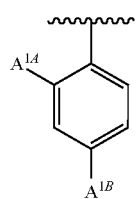

(A10)

wherein A$^{1A}$ is halo, such as F and A$^{1B}$ is halo, such as F.

In one embodiment, A$^{1A}$ is halo, such as F, Br or Cl. In a second embodiment, A$^{1A}$ is C$_{1-6}$alkyl, such as methyl. In a third embodiment, A$^{1A}$ is C$_{1-6}$alkoxy, such as OMe. In a fourth embodiment, A$^{1A}$ is F.

In one embodiment, A$^{1B}$ is H. In a second embodiment, A$^{1B}$ is halo, such as F, Br or Cl, especially F.

In one embodiment, when A represents phenyl substituted by one or more A$^1$, R$^5$ together with a substituent A$^1$ in the ortho position are joined and together represent (CH$_2$)$_v$, wherein v represents 1, 2 or 3 and wherein one of the said CH$_2$ groups may optionally be replaced by O. Suitably, when A represents phenyl substituted by one or more A$^1$, R$^5$ together with a substituent A$^1$ in the ortho position are joined and together represent (CH$_2$)$_v$, wherein v represents 1, 2 or 3.

Suitably, when A represents phenyl substituted by one or more A$^1$ (such as one, two or three, e.g. one or two, R$^5$ together with a substituent A$^1$ in the ortho position are joined and together represent (CH$_2$)$_v$, wherein v represents 1, 2 or 3.

In one embodiment, v is 1. In one embodiment, v is 2. In one embodiment, v is 3.

In one embodiment, B is a monocyclic heterocycle. Suitably, B is a 5 or 6-membered monocyclic heterocycle. Suitably, B is a 6-membered monocyclic heterocycle. Suitably, B is a 5-membered monocyclic heterocycle. In a second embodiment, B is a bicyclic heterocycle. In a third embodiment, B is a monocyclic heteroaryl. Suitably, B is a 5 or 6-membered monocyclic heteroaryl. In a fourth embodiment, B is a bicyclic heteroaryl. Suitably, B is benzoxazolinone.

In one embodiment, B is substituted by one or more (such as one or two, especially one) B$^1$. In one embodiment, B is substituted by one or more (such as one, two or three, for example one or two, especially one) B$^1$.

In one embodiment, at least one B$^1$ is halo. In a second embodiment, at least one B$^1$ is halo, such as fluoro. In a third embodiment, at least one B$^1$ is C$_{1-6}$alkyl, such as methyl. In a fourth embodiment, at least one B$^1$ is C$_{1-6}$haloalkyl. In a fifth embodiment, at least one B$^1$ is C$_{1-6}$ alkoxy. In a sixth embodiment, at least one B$^1$ is C$_{1-6}$haloalkoxy. In a seventh embodiment, at least one B$^1$ is C$_{0-6}$alkylene(OH), such as OH. In a eighth embodiment, at least one B$^1$ is oxo (=O). In a ninth embodiment, at least one B$^1$ is thiooxo (=S). In a tenth embodiment, at least one B$^1$ is C$_{1-3}$alkyl, such as methyl.

In one embodiment, B is not substituted.

In one embodiment, B is selected from the group consisting of

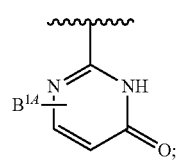

(B1)

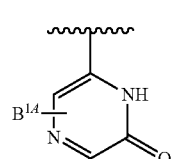

(B2)

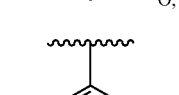

(B3)

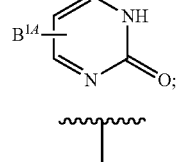

(B4)

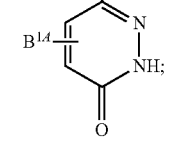

(B5)

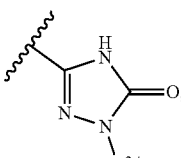

(B6)

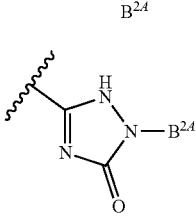

-continued
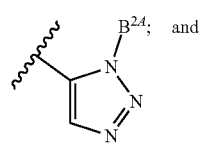 (B7)
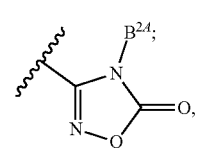 (B8)
such as 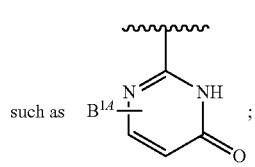 (B1)
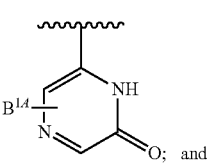 (B2)
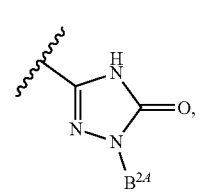 (B5)
wherein:
$B^{1A}$ is H or $C_{1-6}$alkyl, such as methyl; and
$B^{2A}$ is H or $C_{1-6}$alkyl, such as methyl.
In another embodiment, B is selected from the group consisting of
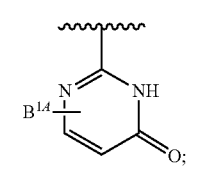 (B1)
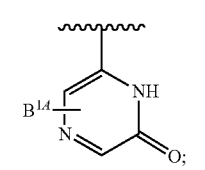 (B2)
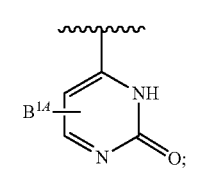 (B3)
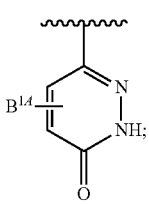 (B4)
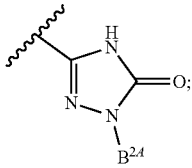 (B5)
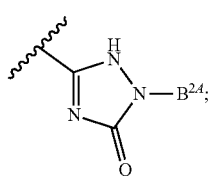 (B6)
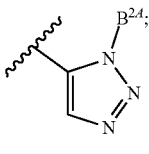 (B7)
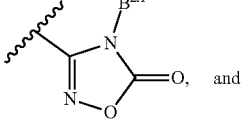 (B8)
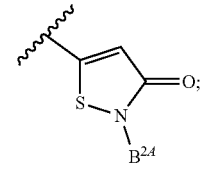 (B9)
such as 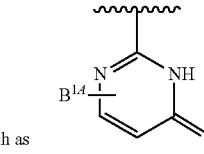 (B1)
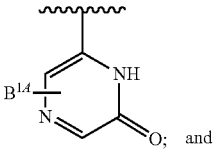 (B2); and
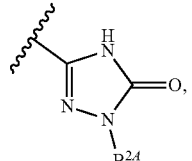 (B5)
wherein:
$B^{1A}$ is H, halo, such as F, Br or Cl, especially F, or $C_{1-6}$alkyl, such as methyl; and $B^{2A}$ is H, halo, such as F, Br or Cl, especially F, or $C_{1-6}$alkyl, such as methyl.

In one embodiment, B is

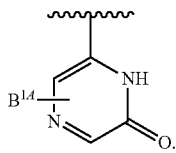
(B2)

In a second embodiment, B is

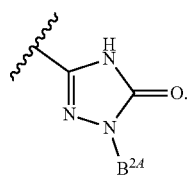
(B5)

In one embodiment, $B^{1A}$ is H. In a second embodiment, $B^{1A}$ is $C_{1-6}$alkyl, such as methyl.

In one embodiment, $B^{2A}$ is H. In a second embodiment, $B^{2A}$ is $C_{1-6}$alkyl, such as methyl.

In one embodiment, B is selected from the group consisting of:

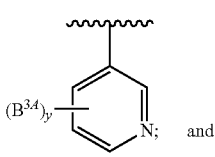
(B9)

and

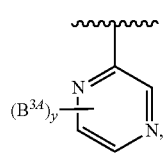
(B10)

wherein
each $B^{3A}$ is independently selected from $C_{1-6}$alkyl, such as methyl; and $C_{0-6}$alkylene(OH), such as OH; and y is 1 or 2.

In one embodiment, B is selected from the group consisting of:

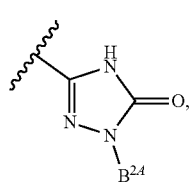
(B5)

wherein $B^{2A}$ is $C_{1-3}$alkyl, such as methyl.

In one embodiment, at least one $B^{3A}$ is $C_{1-6}$alkyl, such as methyl. In a second embodiment, at least one $B^{3A}$ is $C_{0-6}$alkylene(OH), such as OH.

In one embodiment, y is 1. In a second embodiment, y is 2.

In one embodiment, the invention provides a compound of formula (IA'):

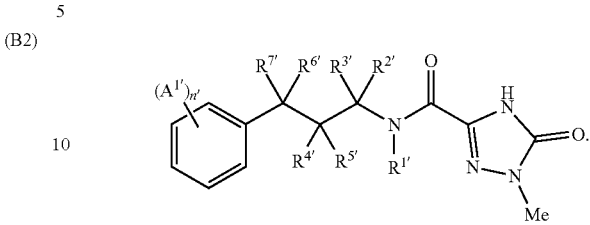

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is H, $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy;
n' is 0, 1 or 2; and
$A^{1'}$ is halo or $C_{1-6}$alkyl,
or a salt and/or solvate thereof.

In another embodiment, the invention provides a compound of formula (IA'):

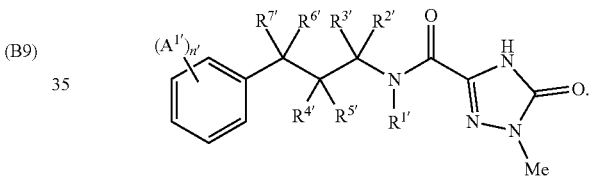

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy;
n' is 0, 1 or 2; and
$A^{1'}$ is halo or $C_{1-6}$alkyl,
or a salt and/or solvate thereof.

In one embodiment, the invention provides a compound of formula (IA"):

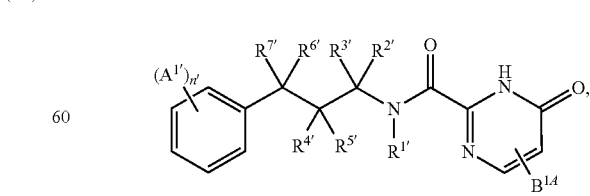

wherein:
$R^{1'}$ is H;
$R^{2'}$ is H;

$R^{3'}$ is H or $C_{1-4}$alkyl;
$R^{4'}$ is H or $C_{1-4}$alkyl;
$R^{5'}$ is H, $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy;
$B^{1A}$ is H or $C_{1-6}$alkyl, such as methyl;
n' is 0, 1 or 2; and
$A^{1'}$ is halo or $C_{1-6}$alkyl,
or a salt and/or solvate thereof.

In another embodiment, the invention provides a compound of formula (IA"):

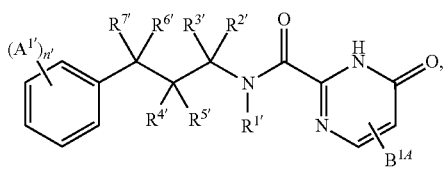

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is $C_{1-4}$alkyl or $C_{3-6}$cycloalkyl; or $R^{4'}$ and $R^{5'}$ together with the atom to which they are attached form a $C_{3-6}$cycloalkyl;
$R^{5'}$ is H;
$R^{7'}$ is H, $C_{1-6}$alkyl or $C_{1-6}$alkoxy;
$B^{1A}$ is H or $C_{1-6}$alkyl, such as methyl;
n' is 0, 1 or 2; and
$A^{1'}$ is halo or $C_{1-6}$alkyl,
or a salt and/or solvate thereof.

In one embodiment, the invention provides a compound of formula (IA'''):

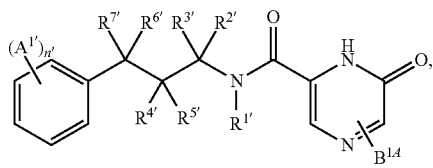

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is H, $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy;
$B^{1A}$ is H or $C_{1-6}$alkyl, such as methyl;
n' is 0, 1 or 2; and
$A^{1'}$ is halo or $C_{1-6}$alkyl,
or a salt and/or solvate thereof.

In one embodiment, the invention provides a compound of formula (IA'''):

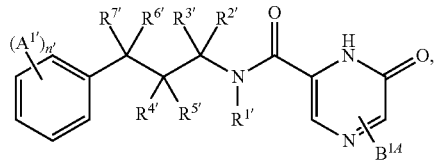

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy; $B^{1A}$ is H or $C_{1-6}$alkyl, such as methyl;
n' is 0, 1 or 2; and
$A^{1'}$ is halo or $C_{1-6}$alkyl,
or a salt and/or solvate thereof.

In one embodiment, $R^{3'}$ is H. In a second embodiment $R^{3'}$ is $C_{1-4}$alkyl, such as methyl or ethyl.

In one embodiment, $R^{4'}$ is H. In a second embodiment, $R^{4'}$ is $C_{1-4}$alkyl, such as methyl.

In one embodiment, $R^{5'}$ is H. In a second embodiment, $R^{5'}$ is $C_{1-4}$alkyl, such as methyl, ethyl or iso-propyl. In a third embodiment, $R^{5'}$ is $C_{3-6}$cycloalkyl, such as cyclopropyl.

In one embodiment, $R^{4'}$ and $R^{5'}$ together with the atom to which they are attached form a $C_{3-6}$cycloalkyl, such as cyclobutyl.

In one embodiment, $R^{7'}$ is H. In a second embodiment, $R^{7'}$ is $C_{1-6}$alkyl, such as methyl. In a third embodiment, $R^{7'}$ is $C_{1-6}$alkoxy, such as OMe.

In one embodiment, $B^{1A}$ is H. In a second embodiment, $B^{1A}$ is $C_{1-6}$alkyl, such as methyl.

In one embodiment, n' is 0. In a second embodiment, n' is 1. In a third embodiment, n' is 2.

In one embodiment, $A^{1'}$ is halo, such as F, Br or Cl. In a second embodiment, $A^{1'}$ is $C_{1-6}$ alkyl, such as methyl.

In the paragraphs that follow, references and preferences set out with respect to the compound of formula (I) or a salt and/or solvate thereof, and/or the compound of formula (IA), or a salt and/or solvate thereof regarding salts, isomers, processes, pharmaceutical compositions, compounds for use, use and method aspects apply equally to the compounds of formulae (IA'), (IA") and (IA''') or salts and/or solvates thereof.

In one embodiment, the compound of formula (I) is selected from the group consisting of:
N-((1-benzylcyclobutyl)methyl)-5-hydroxynicotinamide;
N-((1-benzylcyclobutyl)methyl)-5-hydroxy-6-methylnicotinamide;
N-((1-benzylcyclobutyl)methyl)-5-hydroxy-4-methylnicotinamide;
N-((1-benzylcyclobutyl)methyl)-1H-1,2,3-triazole-5-carboxamide;
N-((1-benzylcyclobutyl)methyl)-2-oxo-2,3-dihydropyrimidine-4-carboxamide;
N-((1-benzylcyclobutyl)methyl)-6-oxo-1,6-dihydropyrimidine-2-carboxamide;
N-((1-benzylcyclobutyl)methyl)-5-oxo-2,5-dihydro-1H-1,2,4-triazole-3-carboxamide;
N-((1-benzylcyclobutyl)methyl)-5-methyl-6-oxo-1,6-dihydropyrimidine-2-carboxamide;

N-((1-benzylcyclobutyl)methyl)-1-methyl-5-oxo-4,5-dihydro-1H-1,2,4-triazole-3-carboxamide;
N-((1-benzylcyclobutyl)methyl)-6-hydroxy-N-methylpyrazine-2-carboxamide;
N-(2,2-dimethyl-3-phenylpropyl)-6-hydroxypyrazine-2-carboxamide;
N-((1-(2-fluorobenzyl)cyclobutyl)methyl)-6-hydroxypyrazine-2-carboxamide;
N-((1-benzylcyclobutyl)methyl)-1-ethyl-5-oxo-4,5-dihydro-1H-1,2,4-triazole-3-carboxamide;
N-((1-(2,6-difluorobenzyl)cyclobutyl)methyl)-6-oxo-1,6-dihydropyrazine-2-carboxamide;
N-((1-(2,4-difluorobenzyl)cyclobutyl)methyl)-6-oxo-1,6-dihydropyrazine-2-carboxamide;
N-((1-(2,3-difluorobenzyl)cyclobutyl)methyl)-6-oxo-1,6-dihydropyrazine-2-carboxamide;
N-((1-benzylcyclopentyl)methyl)-6-oxo-1,6-dihydropyrazine-2-carboxamide;
N-((1-(2-methylbenzyl)cyclobutyl)methyl)-6-oxo-1,6-dihydropyrazine-2-carboxamide;
N-((1-(2-fluorobenzyl)cyclobutyl)methyl)-1-methyl-5-oxo-4,5-dihydro-1H-1,2,4-triazole-3-carboxamide;
N-((1-(2,6-difluorobenzyl)cyclobutyl)methyl)-1-methyl-5-oxo-4,5-dihydro-1H-1,2,4-triazole-3-carboxamide;
N-((1-(2,4-difluorobenzyl)cyclobutyl)methyl)-1-methyl-5-oxo-4,5-dihydro-1H-1,2,4-triazole-3-carboxamide;
N-(1-(1-benzylcyclobutyl)ethyl)-1-methyl-5-oxo-4,5-dihydro-1H-1,2,4-triazole-3 carboxamide;
(S)—N-(1-(1-benzylcyclobutyl)ethyl)-1-methyl-5-oxo-4,5-dihydro-1H-1,2,4-triazole-3-carboxamide;
1-methyl-5-oxo-N-((1-(1-phenylethyl)cyclobutyl)methyl)-4,5-dihydro-1H-1,2,4-triazole-3-carboxamide;
(S)-1-methyl-5-oxo-N-((1-(1-phenylethyl)cyclobutyl)methyl)-4,5-dihydro-1H-1,2,4-triazole-3-carboxamide;
(R)-1-methyl-5-oxo-N-((1-(1-phenylethyl)cyclobutyl)methyl)-4,5-dihydro-1H-1,2,4-triazole-3-carboxamide;
N-((1-(methoxy(phenyl)methyl)cyclobutyl)methyl)-1-methyl-5-oxo-4,5-dihydro-1H-1,2,4-triazole-3-carboxamide;
1-methyl-N-((1-(2-methylbenzyl)cyclobutyl)methyl)-5-oxo-4,5-dihydro-1H-1,2,4-triazole-3-carboxamide;
N-((1-(2-chlorobenzyl)cyclobutyl)methyl)-1-methyl-5-oxo-4,5-dihydro-1H-1,2,4-triazole-3-carboxamide;
N-(2,2-dimethyl-3-phenylpropyl)-1-methyl-5-oxo-4,5-dihydro-1H-1,2,4-triazole-3-carboxamide;
1-methyl-N-(2-methyl-3-phenylpropyl)-5-oxo-4,5-dihydro-1H-1,2,4-triazole-3-carboxamide;
N-((1-benzylcyclopropyl)methyl)-1-methyl-5-oxo-4,5-dihydro-1H-1,2,4-triazole-3-carboxamide;
N-(2,2-dimethyl-1-phenylpentan-3-yl)-1-methyl-5-oxo-4,5-dihydro-1H-1,2,4-triazole-3-carboxamide;
1-methyl-5-oxo-N-(1,1,1-trifluoro-3,3-dimethyl-4-phenylbutan-2-yl)-4,5-dihydro-1H-1,2,4-triazole-3-carboxamide;
N-(3-(2-bromophenyl)-2,2-dimethylpropyl)-1-methyl-5-oxo-4,5-dihydro-1H-1,2,4-triazole-3-carboxamide;
N-((1-(2-bromobenzyl)cyclobutyl)methyl)-1-methyl-5-oxo-4,5-dihydro-1H-1,2,4-triazole-3-carboxamide;
N-(3,3-dimethyl-4-phenylbutan-2-yl)-1-methyl-5-oxo-4,5-dihydro-1H-1,2,4-triazole-3-carboxamide;
(R)—N-(3,3-dimethyl-4-phenylbutan-2-yl)-1-methyl-5-oxo-4,5-dihydro-1H-1,2,4-triazole-3-carboxamide;
N-(2-benzylbutyl)-1-methyl-5-oxo-4,5-dihydro-1H-1,2,4-triazole-3-carboxamide;
N-(2-benzyl-3-hydroxy-2-methylpropyl)-1-methyl-5-oxo-4,5-dihydro-1H-1,2,4-triazole-3-carboxamide;
N-(2-benzyl-3-hydroxy-2-methylbutyl)-1-methyl-5-oxo-4,5-dihydro-1H-1,2,4-triazole-3-carboxamide;
N-(2-methoxy-3-phenylpropyl)-1-methyl-5-oxo-4,5-dihydro-1H-1,2,4-triazole-3-carboxamide;
N-(2-benzyl-2-methylbutyl)-1-methyl-5-oxo-4,5-dihydro-1H-1,2,4-triazole-3-carboxamide;
N-(2-benzyl-3-methylbutyl)-1-methyl-5-oxo-4,5-dihydro-1H-1,2,4-triazole-3-carboxamide;
(S)—N-(2-benzyl-3-methylbutyl)-1-methyl-5-oxo-4,5-dihydro-1H-1,2,4-triazole-3-carboxamide;
N-((1-benzylcyclohexyl)methyl)-6-oxo-1,6-dihydropyrazine-2-carboxamide;
N-((1-benzyl-3,3-difluorocyclobutyl)methyl)-6-oxo-1,6-dihydropyrazine-2-carboxamide;
N-((1-(3-fluorobenzyl)cyclobutyl)methyl)-6-hydroxypyrazine-2-carboxamide;
N-((1-(4-fluorobenzyl)cyclobutyl)methyl)-6-hydroxypyrazine-2-carboxamide;
N-(2-cyclobutyl-3-phenylpropyl)-1-methyl-5-oxo-4,5-dihydro-1H-1,2,4-triazole-3-carboxamide;
N-((1-(1-(2,4-difluorophenyl)ethyl)cyclobutyl)methyl)-1-methyl-5-oxo-4,5-dihydro-1H-1,2,4-triazole-3-carboxamide;
N-(2-cyclopropyl-3-phenylpropyl)-1-methyl-5-oxo-4,5-dihydro-1H-1,2,4-triazole-3-carboxamide;
(R)—N-(2-benzylbutyl)-1-methyl-5-oxo-4,5-dihydro-1H-1,2,4-triazole-3-carboxamide;
(S)—N-(2-benzylbutyl)-1-methyl-5-oxo-4,5-dihydro-1H-1,2,4-triazole-3-carboxamide;
N-(2-benzylpentyl)-1-methyl-5-oxo-4,5-dihydro-1H-1,2,4-triazole-3-carboxamide;
N-(2,2-dimethyl-3-phenylpropyl)-6-oxo-1,6-dihydropyridazine-3-carboxamide;
N-(2,2-dimethyl-3-phenylpropyl)-2-oxo-2,3-dihydrobenzo[d]oxazole-5-carboxamide;
1-methyl-N-((2-methyl-2,3-dihydro-1H-inden-2-yl)methyl)-5-oxo-4,5-dihydro-1H-1,2,4-triazole-3-carboxamide;
1-methyl-N-(3-methyl-3-phenylbutyl)-5-oxo-4,5-dihydro-1H-1,2,4-triazole-3-carboxamide;
1-methyl-5-oxo-N-((1,2,3,4-tetrahydronaphthalen-2-yl)methyl)-4,5-dihydro-1H-1,2,4-triazole-3-carboxamide;
N-((1-(2-methoxybenzyl)cyclobutyl)methyl)-1-methyl-5-oxo-4,5-dihydro-1H-1,2,4-triazole-3-carboxamide;
6-oxo-N-((1-(pyridin-2-ylmethyl)cyclobutyl)methyl)-1,6-dihydropyrazine-2-carboxamide;
N-((1-benzylcyclobutyl)methyl)-1-methyl-2-oxo-2,3-dihydro-1H-imidazole-4-carboxamide;
N-((1-benzylcyclobutyl)methyl)-3-methyl-1H-1,2,4-triazole-5-carboxamide;
N-(2-benzyl-3-hydroxypropyl)-1-methyl-5-oxo-4,5-dihydro-1H-1,2,4-triazole-3-carboxamide;
N-(2,2-dimethyl-3-phenylpropyl)-N,1-dimethyl-5-oxo-4,5-dihydro-1H-1,2,4-triazole-3-carboxamide;
N-((1-(2,4-Difluorobenzyl)cyclohexyl)methyl)-1-methyl-5-oxo-4,5-dihydro-1H-1,2,4-triazole-3-carboxamide;
N-((2S,3S)-3-Benzylpentan-2-yl)-1-methyl-5-oxo-4,5-dihydro-1H-1,2,4-triazole-3-carboxamide;
N-((1-(3-Methoxybenzyl)cyclobutyl)methyl)-1-methyl-5-oxo-4,5-dihydro-1H-1,2,4-triazole-3-carboxamide;
N-((1-(2-(Difluoromethyl)benzyl)cyclobutyl)methyl)-1-methyl-5-oxo-4,5-dihydro-1H-1,2,4-triazole-3-carboxamide;
N-((1-(3-Cyclopropylbenzyl)cyclobutyl)methyl)-1-methyl-5-oxo-4,5-dihydro-1H-1,2,4-triazole-3-carboxamide;
N-(2-Cyclopropyl-3-(3-fluorophenyl)propyl)-1-methyl-5-oxo-4,5-dihydro-1H-1,2,4-triazole-3-carboxamide;

N-((1-(3-Chlorobenzyl)cyclobutyl)methyl)-1-methyl-5-oxo-4,5-dihydro-1H-1,2,4-triazole-3-carboxamide;
1-Methyl-5-oxo-N-(2-(thiophen-2-ylmethyl)butyl)-4,5-dihydro-1H-1,2,4-triazole-3-carboxamide;
N-((1-(2,5-Difluorobenzyl)cyclobutyl)methyl)-1-methyl-5-oxo-4,5-dihydro-1H-1,2,4-triazole-3-carboxamide;
N-((1-(2-Ethylbenzyl)cyclobutyl)methyl)-1-methyl-5-oxo-4,5-dihydro-1H-1,2,4-triazole-3-carboxamide;
N-((1-(2-Fluoro-5-methylbenzyl)cyclobutyl)methyl)-1-methyl-5-oxo-4,5-dihydro-1H-1,2,4-triazole-3-carboxamide;
N-((1-(3-Fluorobenzyl)cyclobutyl)methyl)-1-methyl-5-oxo-4,5-dihydro-1H-1,2,4-triazole-3-carboxamide;
N-((1-(3-Chloro-2-fluorobenzyl)cyclobutyl)methyl)-1-methyl-5-oxo-4,5-dihydro-1H-1,2,4-triazole-3-carboxamide;
N-((1-(4-Fluoro-2-methylbenzyl)cyclobutyl)methyl)-1-methyl-5-oxo-4,5-dihydro-1H-1,2,4-triazole-3-carboxamide;
N-((1-(4-Fluoro-2-(trifluoromethyl)benzyl)cyclobutyl)methyl)-1-methyl-5-oxo-4,5-dihydro-1H-1,2,4-triazole-3-carboxamide;
N-((1-Benzylcyclobutyl)methyl)-5-oxo-4,5-dihydro-1,2,4-oxadiazole-3-carboxamide;
1-Methyl-N-((1-(3-methylbenzyl)cyclobutyl)methyl)-5-oxo-4,5-dihydro-1H-1,2,4-triazole-3-carboxamide;
N-((1-(4-Chloro-2-fluorobenzyl)cyclobutyl)methyl)-1-methyl-5-oxo-4,5-dihydro-1H-1,2,4-triazole-3-carboxamide;
N-((1-(4-Chloro-2-methylbenzyl)cyclobutyl)methyl)-1-methyl-5-oxo-4,5-dihydro-1H-1,2,4-triazole-3-carboxamide;
N-((1-(2,4-Difluorobenzyl)cyclopentyl)methyl)-1-methyl-5-oxo-4,5-dihydro-1H-1,2,4-triazole-3-carboxamide;
N-(2-Cyclopropyl-3-(2,4-difluorophenyl)propyl)-1-methyl-5-oxo-4,5-dihydro-1H-1,2,4-triazole-3-carboxamide;
N-((1-(2-Fluoro-3-methylbenzyl)cyclobutyl)methyl)-1-methyl-5-oxo-4,5-dihydro-1H-1,2,4-triazole-3-carboxamide;
N-((1-(2,3-Difluorobenzyl)cyclobutyl)methyl)-1-methyl-5-oxo-4,5-dihydro-1H-1,2,4-triazole-3-carboxamide;
(R)—N-(2-Cyclopropyl-3-(2,4-difluorophenyl)propyl)-1-methyl-5-oxo-4,5-dihydro-1H-1,2,4-triazole-3-carboxamide;
(S)—N-(2-cyclopropyl-3-(2,4-difluorophenyl)propyl)-1-methyl-5-oxo-4,5-dihydro-1H-1,2,4-triazole-3-carboxamide;
(S)—N-(2-(2,4-Difluorobenzyl)butyl)-1-methyl-5-oxo-4,5-dihydro-1H-1,2,4-triazole-3-carboxamide;
N-((1-(3-Bromobenzyl)cyclobutyl)methyl)-1-methyl-5-oxo-4,5-dihydro-1H-1,2,4-triazole-3-carboxamide;
N-((1-(3-Cyanobenzyl)cyclobutyl)methyl)-1-methyl-5-oxo-4,5-dihydro-1H-1,2,4-triazole-3-carboxamide; and
N-((1-(3,5-difluorobenzyl)cyclobutyl)methyl)-1-methyl-5-oxo-4,5-dihydro-1H-1,2,4-triazole-3-carboxamide;
or a salt and/or solvate of any one thereof.

In one embodiment, the compound of formula (I) is selected from the group consisting of:
N-((1-benzylcyclobutyl)methyl)-5-hydroxynicotinamide;
N-((1-benzylcyclobutyl)methyl)-5-hydroxy-6-methylnicotinamide;
N-((1-benzylcyclobutyl)methyl)-5-hydroxy-4-methylnicotinamide;
N-((1-benzylcyclobutyl)methyl)-1H-1,2,3-triazole-5-carboxamide;
N-((1-benzylcyclobutyl)methyl)-2-oxo-2,3-dihydropyrimidine-4-carboxamide;
N-((1-benzylcyclobutyl)methyl)-6-oxo-1,6-dihydropyrimidine-2-carboxamide;
N-((1-benzylcyclobutyl)methyl)-5-oxo-2,5-dihydro-1H-1,2,4-triazole-3-carboxamide;
N-((1-benzylcyclobutyl)methyl)-5-methyl-6-oxo-1,6-dihydropyrimidine-2-carboxamide;
N-((1-benzylcyclobutyl)methyl)-1-methyl-5-oxo-4,5-dihydro-1H-1,2,4-triazole-3-carboxamide;
N-((1-benzylcyclobutyl)methyl)-6-hydroxy-N-methylpyrazine-2-carboxamide;
N-(2,2-dimethyl-3-phenylpropyl)-6-hydroxypyrazine-2-carboxamide;
N-((1-(2-fluorobenzyl)cyclobutyl)methyl)-6-hydroxypyrazine-2-carboxamide;
N-((1-benzylcyclobutyl)methyl)-1-ethyl-5-oxo-4,5-dihydro-1H-1,2,4-triazole-3-carboxamide;
N-((1-(2,6-difluorobenzyl)cyclobutyl)methyl)-6-oxo-1,6-dihydropyrazine-2-carboxamide;
N-((1-(2,4-difluorobenzyl)cyclobutyl)methyl)-6-oxo-1,6-dihydropyrazine-2-carboxamide;
N-((1-(2,3-difluorobenzyl)cyclobutyl)methyl)-6-oxo-1,6-dihydropyrazine-2-carboxamide;
N-((1-benzylcyclopentyl)methyl)-6-oxo-1,6-dihydropyrazine-2-carboxamide;
N-((1-(2-methylbenzyl)cyclobutyl)methyl)-6-oxo-1,6-dihydropyrazine-2-carboxamide;
N-((1-(2-fluorobenzyl)cyclobutyl)methyl)-1-methyl-5-oxo-4,5-dihydro-1H-1,2,4-triazole-3-carboxamide;
N-((1-(2,6-difluorobenzyl)cyclobutyl)methyl)-1-methyl-5-oxo-4,5-dihydro-1H-1,2,4-triazole-3-carboxamide;
N-((1-(2,4-difluorobenzyl)cyclobutyl)methyl)-1-methyl-5-oxo-4,5-dihydro-1H-1,2,4-triazole-3-carboxamide;
N-(1-(1-benzylcyclobutyl)ethyl)-1-methyl-5-oxo-4,5-dihydro-1H-1,2,4-triazole-3 carboxamide;
(S)—N-(1-(1-benzylcyclobutyl)ethyl)-1-methyl-5-oxo-4,5-dihydro-1H-1,2,4-triazole-3-carboxamide;
(R)—N-(1-(1-benzylcyclobutyl)ethyl)-1-methyl-5-oxo-4,5-dihydro-1H-1,2,4-triazole-3-carboxamide;
1-methyl-5-oxo-N-((1-(1-phenylethyl)cyclobutyl)methyl)-4,5-dihydro-1H-1,2,4-triazole-3-carboxamide;
1-methyl-5-oxo-N-((1-(1-phenylethyl)cyclobutyl)methyl)-4,5-dihydro-1H-1,2,4-triazole-3-carboxamide;
(S)-1-methyl-5-oxo-N-((1-(1-phenylethyl)cyclobutyl)methyl)-4,5-dihydro-1H-1,2,4-triazole-3-carboxamide;
(R)-1-methyl-5-oxo-N-((1-(1-phenylethyl)cyclobutyl)methyl)-4,5-dihydro-1H-1,2,4-triazole-3-carboxamide;
N-((1-(methoxy(phenyl)methyl)cyclobutyl)methyl)-1-methyl-5-oxo-4,5-dihydro-1H-1,2,4-triazole-3-carboxamide;
1-methyl-N-((1-(2-methylbenzyl)cyclobutyl)methyl)-5-oxo-4,5-dihydro-1H-1,2,4-triazole-3-carboxamide;
N-((1-(2-chlorobenzyl)cyclobutyl)methyl)-1-methyl-5-oxo-4,5-dihydro-1H-1,2,4-triazole-3-carboxamide;
N-(2,2-dimethyl-3-phenylpropyl)-1-methyl-5-oxo-4,5-dihydro-1H-1,2,4-triazole-3-carboxamide;
1-methyl-N-(2-methyl-3-phenylpropyl)-5-oxo-4,5-dihydro-1H-1,2,4-triazole-3-carboxamide;
N-((1-benzylcyclopropyl)methyl)-1-methyl-5-oxo-4,5-dihydro-1H-1,2,4-triazole-3-carboxamide;
N-(2,2-dimethyl-1-phenylpentan-3-yl)-1-methyl-5-oxo-4,5-dihydro-1H-1,2,4-triazole-3-carboxamide;
1-methyl-5-oxo-N-(1,1,1-trifluoro-3,3-dimethyl-4-phenylbutan-2-yl)-4,5-dihydro-1H-1,2,4-triazole-3-carboxamide;
N-(3-(2-bromophenyl)-2,2-dimethylpropyl)-1-methyl-5-oxo-4,5-dihydro-1H-1,2,4-triazole-3-carboxamide;

N-((1-(2-bromobenzyl)cyclobutyl)methyl)-1-methyl-5-oxo-4,5-dihydro-1H-1,2,4-triazole-3-carboxamide;
N-(3,3-dimethyl-4-phenylbutan-2-yl)-1-methyl-5-oxo-4,5-dihydro-1H-1,2,4-triazole-3-carboxamide;
(S)—N-(3,3-dimethyl-4-phenylbutan-2-yl)-1-methyl-5-oxo-4,5-dihydro-1H-1,2,4-triazole-3-carboxamide;
(R)—N-(3,3-dimethyl-4-phenylbutan-2-yl)-1-methyl-5-oxo-4,5-dihydro-1H-1,2,4-triazole-3-carboxamide;
N-(2-benzylbutyl)-1-methyl-5-oxo-4,5-dihydro-1H-1,2,4-triazole-3-carboxamide;
N-(2-benzyl-3-hydroxy-2-methylpropyl)-1-methyl-5-oxo-4,5-dihydro-1H-1,2,4-triazole-3-carboxamide;
N-(2-benzyl-3-hydroxy-2-methylbutyl)-1-methyl-5-oxo-4,5-dihydro-1H-1,2,4-triazole-3-carboxamide;
N-(2-methoxy-3-phenylpropyl)-1-methyl-5-oxo-4,5-dihydro-1H-1,2,4-triazole-3-carboxamide;
N-(2-benzyl-2-methylbutyl)-1-methyl-5-oxo-4,5-dihydro-1H-1,2,4-triazole-3-carboxamide;
N-(2-benzyl-3-methylbutyl)-1-methyl-5-oxo-4,5-dihydro-1H-1,2,4-triazole-3-carboxamide;
N-[(2S)-2-benzyl-3-methylbutyl]-1-methyl-5-oxo-4H-1,2,4-triazole-3-carboxamide;
N-[(2R)-2-benzyl-3-methylbutyl]-1-methyl-5-oxo-4H-1,2,4-triazole-3-carboxamide N-((1-benzylcyclohexyl)methyl)-6-oxo-1,6-dihydropyrazine-2-carboxamide;
N-((1-benzyl-3,3-difluorocyclobutyl)methyl)-6-oxo-1,6-dihydropyrazine-2-carboxamide;
N-((1-(3-fluorobenzyl)cyclobutyl)methyl)-6-hydroxypyrazine-2-carboxamide;
N-((1-(4-fluorobenzyl)cyclobutyl)methyl)-6-hydroxypyrazine-2-carboxamide;
N-(2-cyclobutyl-3-phenylpropyl)-1-methyl-5-oxo-4,5-dihydro-1H-1,2,4-triazole-3-carboxamide;
N-((1-(1-(2,4-difluorophenyl)ethyl)cyclobutyl)methyl)-1-methyl-5-oxo-4,5-dihydro-1H-1,2,4-triazole-3-carboxamide;
N-(2-cyclopropyl-3-phenylpropyl)-1-methyl-5-oxo-4,5-dihydro-1H-1,2,4-triazole-3-carboxamide;
(R)—N-(2-benzylbutyl)-1-methyl-5-oxo-4,5-dihydro-1H-1,2,4-triazole-3-carboxamide;
(S)—N-(2-benzylbutyl)-1-methyl-5-oxo-4,5-dihydro-1H-1,2,4-triazole-3-carboxamide;
N-(2-benzylpentyl)-1-methyl-5-oxo-4,5-dihydro-1H-1,2,4-triazole-3-carboxamide;
N-(2,2-dimethyl-3-phenylpropyl)-6-oxo-1,6-dihydropyridazine-3-carboxamide;
N-(2,2-dimethyl-3-phenylpropyl)-2-oxo-2,3-dihydrobenzo[d]oxazole-5-carboxamide;
1-methyl-N-((2-methyl-2,3-dihydro-1H-inden-2-yl)methyl)-5-oxo-4,5-dihydro-1H-1,2,4-triazole-3-carboxamide;
1-methyl-N-(3-methyl-3-phenylbutyl)-5-oxo-4,5-dihydro-1H-1,2,4-triazole-3-carboxamide;
1-methyl-5-oxo-N-((1,2,3,4-tetrahydronaphthalen-2-yl)methyl)-4,5-dihydro-1H-1,2,4-triazole-3-carboxamide;
N-((1-(2-methoxybenzyl)cyclobutyl)methyl)-1-methyl-5-oxo-4,5-dihydro-1H-1,2,4-triazole-3-carboxamide;
6-oxo-N-((1-(pyridin-2-ylmethyl)cyclobutyl)methyl)-1,6-dihydropyrazine-2-carboxamide;
N-((1-benzylcyclobutyl)methyl)-1-methyl-2-oxo-2,3-dihydro-1H-imidazole-4-carboxamide;
N-(2-benzyl-3-hydroxypropyl)-1-methyl-5-oxo-4,5-dihydro-1H-1,2,4-triazole-3-carboxamide;
N-(2,2-dimethyl-3-phenylpropyl)-N,1-dimethyl-5-oxo-4,5-dihydro-1H-1,2,4-triazole-3-carboxamide;
N-((1-(2,4-Difluorobenzyl)cyclohexyl)methyl)-1-methyl-5-oxo-4,5-dihydro-1H-1,2,4-triazole-3-carboxamide;
N-((2S,3S)-3-Benzylpentan-2-yl)-1-methyl-5-oxo-4,5-dihydro-1H-1,2,4-triazole-3-carboxamide;
N-((1-(3-Methoxybenzyl)cyclobutyl)methyl)-1-methyl-5-oxo-4,5-dihydro-1H-1,2,4-triazole-3-carboxamide;
N-((1-(2-(Difluoromethyl)benzyl)cyclobutyl)methyl)-1-methyl-5-oxo-4,5-dihydro-1H-1,2,4-triazole-3-carboxamide;
N-((1-(3-Cyclopropylbenzyl)cyclobutyl)methyl)-1-methyl-5-oxo-4,5-dihydro-1H-1,2,4-triazole-3-carboxamide;
N-(2-Cyclopropyl-3-(3-fluorophenyl)propyl)-1-methyl-5-oxo-4,5-dihydro-1H-1,2,4-triazole-3-carboxamide;
N-((1-(3-Chlorobenzyl)cyclobutyl)methyl)-1-methyl-5-oxo-4,5-dihydro-1H-1,2,4-triazole-3-carboxamide;
1-Methyl-5-oxo-N-(2-(thiophen-2-ylmethyl)butyl)-4,5-dihydro-1H-1,2,4-triazole-3-carboxamide;
N-((1-(2,5-Difluorobenzyl)cyclobutyl)methyl)-1-methyl-5-oxo-4,5-dihydro-1H-1,2,4-triazole-3-carboxamide;
N-((1-(2-Ethylbenzyl)cyclobutyl)methyl)-1-methyl-5-oxo-4,5-dihydro-1H-1,2,4-triazole-3-carboxamide;
N-((1-(2-Fluoro-5-methylbenzyl)cyclobutyl)methyl)-1-methyl-5-oxo-4,5-dihydro-1H-1,2,4-triazole-3-carboxamide;
N-((1-(3-Fluorobenzyl)cyclobutyl)methyl)-1-methyl-5-oxo-4,5-dihydro-1H-1,2,4-triazole-3-carboxamide;
N-((1-(3-Chloro-2-fluorobenzyl)cyclobutyl)methyl)-1-methyl-5-oxo-4,5-dihydro-1H-1,2,4-triazole-3-carboxamide;
N-((1-(4-Fluoro-2-methylbenzyl)cyclobutyl)methyl)-1-methyl-5-oxo-4,5-dihydro-1H-1,2,4-triazole-3-carboxamide;
N-((1-(4-Fluoro-2-(trifluoromethyl)benzyl)cyclobutyl)methyl)-1-methyl-5-oxo-4,5-dihydro-1H-1,2,4-triazole-3-carboxamide;
N-((1-Benzylcyclobutyl)methyl)-5-oxo-4,5-dihydro-1,2,4-oxadiazole-3-carboxamide;
1-Methyl-N-((1-(3-methylbenzyl)cyclobutyl)methyl)-5-oxo-4,5-dihydro-1H-1,2,4-triazole-3-carboxamide;
N-((1-(4-Chloro-2-fluorobenzyl)cyclobutyl)methyl)-1-methyl-5-oxo-4,5-dihydro-1H-1,2,4-triazole-3-carboxamide;
N-((1-(4-Chloro-2-methylbenzyl)cyclobutyl)methyl)-1-methyl-5-oxo-4,5-dihydro-1H-1,2,4-triazole-3-carboxamide;
N-((1-(2,4-Difluorobenzyl)cyclopentyl)methyl)-1-methyl-5-oxo-4,5-dihydro-1H-1,2,4-triazole-3-carboxamide;
N-(2-Cyclopropyl-3-(2,4-difluorophenyl)propyl)-1-methyl-5-oxo-4,5-dihydro-1H-1,2,4-triazole-3-carboxamide;
N-((1-(2-Fluoro-3-methylbenzyl)cyclobutyl)methyl)-1-methyl-5-oxo-4,5-dihydro-1H-1,2,4-triazole-3-carboxamide;
N-((1-(2,3-Difluorobenzyl)cyclobutyl)methyl)-1-methyl-5-oxo-4,5-dihydro-1H-1,2,4-triazole-3-carboxamide;
(R)—N-(2-Cyclopropyl-3-(2,4-difluorophenyl)propyl)-1-methyl-5-oxo-4,5-dihydro-1H-1,2,4-triazole-3-carboxamide;
(S)—N-(2-cyclopropyl-3-(2,4-difluorophenyl)propyl)-1-methyl-5-oxo-4,5-dihydro-1H-1,2,4-triazole-3-carboxamide;
(S)—N-(2-(2,4-Difluorobenzyl)butyl)-1-methyl-5-oxo-4,5-dihydro-1H-1,2,4-triazole-3-carboxamide;
N-((1-(3-Bromobenzyl)cyclobutyl)methyl)-1-methyl-5-oxo-4,5-dihydro-1H-1,2,4-triazole-3-carboxamide;
N-((1-(3-Cyanobenzyl)cyclobutyl)methyl)-1-methyl-5-oxo-4,5-dihydro-1H-1,2,4-triazole-3-carboxamide;
N-((1-(3,5-difluorobenzyl)cyclobutyl)methyl)-1-methyl-5-oxo-4,5-dihydro-1H-1,2,4-triazole-3-carboxamide;

(R)—N-(2-cyclopropyl-3-(2,4,6-trifluorophenyl)propyl)-1-methyl-5-oxo-4,5-dihydro-1H-1,2,4-triazole-3-carboxamide;
(R)—N-(2-cyclopropyl-3-(3,4-difluorophenyl)propyl)-1-methyl-5-thioxo-4,5-dihydro-1H-1,2,4-triazole-3-carboxamide;
N-((1-(2,4-difluorobenzyl)cyclobutyl)methyl)-1-methyl-5-thioxo-4,5-dihydro-1H-1,2,4-triazole-3-carboxamide;
N-((2-(2,4-difluorobenzyl)tetrahydrofuran-2-yl)methyl)-1-methyl-5-oxo-4,5-dihydro-1H-1,2,4-triazole-3-carboxamide;
N-((4-(2,4-difluorobenzyl)tetrahydro-2H-pyran-4-yl)methyl)-1-methyl-5-oxo-4,5-dihydro-1H-1,2,4-triazole-3-carboxamide;
N-((1-(2,4-difluorobenzyl)spiro[2.2]pentan-1-yl)methyl)-6-oxo-1,6-dihydropyrazine-2-carboxamide;
N-((1-(2,4-difluorobenzyl)spiro[2.2]pentan-1-yl)methyl)-1-methyl-5-oxo-4,5-dihydro-1H-1,2,4-triazole-3-carboxamide;
(R)—N-(2-cyclopropyl-3-phenylpropyl)-1-methyl-5-oxo-4,5-dihydro-1H-1,2,4-triazole-3-carboxamide;
(S)-1-methyl-5-oxo-N-(2-(2,4,6-trifluorobenzyl)butyl)-4,5-dihydro-1H-1,2,4-triazole-3-carboxamide;
N-((1-(2,4-difluorobenzyl)cyclobutyl)methyl)-4-hydroxypicolinamide;
N-(2-(2,4-difluorobenzyl)-2-fluorobutyl)-1-methyl-5-oxo-4,5-dihydro-1H-1,2,4-triazole-3-carboxamide;
N-((1-(2,4-difluorobenzyl)cyclobutyl)methyl)-5-hydroxy-1-methyl-1H-pyrazole-3-carboxamide
(R)—N-(2-cyclopropyl-3-(4-fluoro-2-methylphenyl)propyl)-1-methyl-5-oxo-4,5-dihydro-1H-1,2,4-triazole-3-carboxamide;
N-((1-(2,4-difluorobenzyl)cyclobutyl)methyl)-5-oxo-4,5-dihydropyrazine-2-carboxamide N-((1-(3,4-difluorobenzyl)cyclobutyl)methyl)-6-oxo-1,6-dihydropyrimidine-2-carboxamide
N-((2R,3S)-3-benzylpentan-2-yl)-1-methyl-5-oxo-4,5-dihydro-1H-1,2,4-triazole-3-carboxamide;
N-((2S,3S)-3-benzylpentan-2-yl)-1-methyl-5-oxo-4,5-dihydro-1H-1,2,4-triazole-3-carboxamide;
(R)—N-(2-cyclopropyl-3-(2,4-difluorophenyl)propyl)-3-oxo-2,3-dihydroisoxazole-5-carboxamide;
(R)—N-(2-cyclopropyl-3-(2,4-difluorophenyl)propyl)-2-oxo-2,3-dihydrooxazole-4-carboxamide;
N-((1-(3,4-difluorobenzyl)cyclobutyl)methyl)-6-oxo-1,6-dihydropyrazine-2-carboxamide;
N-((2S,3S)-3-(2,4-difluorobenzyl)pentan-2-yl)-1-methyl-5-oxo-4,5-dihydro-1H-1,2,4-triazole-3-carboxamide;
N-((2R,3S)-3-(2,4-difluorobenzyl)pentan-2-yl)-1-methyl-5-oxo-4,5-dihydro-1H-1,2,4-triazole-3-carboxamide;
N-((1-(3,4-difluorobenzyl)cyclobutyl)methyl)-1-methyl-5-oxo-4,5-dihydro-1H-1,2,4-triazole-3-carboxamide;
(R)—N-(2-cyclopropyl-3-(3,4-difluorophenyl)propyl)-6-oxo-1,6-dihydropyrimidine-2-carboxamide;
N-((1-(2,5-difluorobenzyl)cyclobutyl)methyl)-6-oxo-1,6-dihydropyrimidine-2-carboxamide;
6-oxo-N-((1-(2,4,5-trifluorobenzyl)cyclobutyl)methyl)-1,6-dihydropyrazine-2-carboxamide;
(R)—N-(2-cyclopropyl-3-(2,4-difluorophenyl)propyl)-6-oxo-1,6-dihydropyrimidine-2-carboxamide;
(R)—N-(2-cyclopropyl-3-(3,4-difluorophenyl)propyl)-1-methyl-5-oxo-4,5-dihydro-1H-1,2,4-triazole-3-carboxamide;
(R)—N-(2-cyclopropyl-3-(3,4-difluorophenyl)propyl)-6-oxo-1,6-dihydropyrazine-2-carboxamide;
N-((1-(2,4-difluorobenzyl)cyclopentyl)methyl)-6-oxo-1,6-dihydropyrazine-2-carboxamide;
(R)—N-(2-cyclopropyl-3-(2,5-difluorophenyl)propyl)-6-oxo-1,6-dihydropyrimidine-2-carboxamide;
(R)—N-(2-cyclopropyl-3-(2,4-difluorophenyl)propyl)-6-oxo-1,6-dihydropyrazine-2-carboxamide;
(R)—N-(2-cyclopropyl-3-(2,5-difluorophenyl)propyl)-6-oxo-1,6-dihydropyridazine-3-carboxamide;
1-methyl-5-oxo-N-((1-(2,3,4-trifluorobenzyl)cyclobutyl)methyl)-4,5-dihydro-1H-1,2,4-triazole-3-carboxamide;
1-methyl-5-oxo-N-((1-(2,4,5-trifluorobenzyl)cyclobutyl)methyl)-4,5-dihydro-1H-1,2,4-triazole-3-carboxamide;
(R)—N-(2-cyclopropyl-3-(2,5-difluorophenyl)propyl)-6-oxo-1,6-dihydropyrazine-2-carboxamide;
(R)—N-(2-cyclopropyl-3-(2,5-difluorophenyl)propyl)-1-methyl-5-oxo-4,5-dihydro-1H-1,2,4-triazole-3-carboxamide;
N-((1-(2,4-difluorobenzyl)cyclobutyl)methyl)-6-oxo-1,6-dihydropyrimidine-2-carboxamide;
N-((1-(3-ethylbenzyl)cyclobutyl)methyl)-1-methyl-5-oxo-4,5-dihydro-1H-1,2,4-triazole-3-carboxamide;
(S)—N-(2-(2,4-difluorobenzyl)butyl)-6-oxo-1,6-dihydropyrazine-2-carboxamide;
N-(2-(3,4-difluorobenzyl)butyl)-1-methyl-5-oxo-4,5-dihydro-1H-1,2,4-triazole-3-carboxamide;
N-((1-(4-fluoro-2-methylbenzyl)cyclobutyl)methyl)-6-oxo-1,6-dihydropyrazine-2-carboxamide;
N-((1-(4-fluoro-2-methylbenzyl)cyclobutyl)methyl)-6-oxo-1,6-dihydropyrimidine-2-carboxamide;
N-((1-(2,4-difluorobenzyl)cyclobutyl)methyl)-1H-1,2,3-triazole-5-carboxamide;
N-((1-(2,4-difluorobenzyl)cyclobutyl)methyl)-4H-1,2,4-triazole-3-carboxamide;
N-(2-((2,3-dihydrobenzofuran-5-yl)methyl)butyl)-1-methyl-5-oxo-4,5-dihydro-1H-1,2,4-triazole-3-carboxamide;
N-((1-(2,5-difluorobenzyl)cyclobutyl)methyl)-6-oxo-1,6-dihydropyrazine-2-carboxamide;
N-((1-(2,4-difluorobenzyl)cyclobutyl)methyl)-6-oxo-1,6-dihydropyridazine-3-carboxamide;
N-((1-(3,5-difluorobenzyl)cyclobutyl)methyl)-6-oxo-1,6-dihydropyridazine-3-carboxamide;
N-((1-(3-fluorobenzyl)cyclobutyl)methyl)-6-oxo-1,6-dihydropyridazine-3-carboxamide;
N-((1-(2,4-difluorobenzyl)cyclobutyl)methyl)-4H-1,2,4-triazole-3-carboxamide;
1-methyl-N-((1-(2-(methylthio)benzyl)cyclobutyl)methyl)-5-oxo-4,5-dihydro-1H-1,2,4-triazole-3-carboxamide;
1-methyl-N-((1-(3-(methylthio)benzyl)cyclobutyl)methyl)-5-oxo-4,5-dihydro-1H-1,2,4-triazole-3-carboxamide;
(R)—N-(2-cyclopropyl-3-(2,4,6-trifluorophenyl)propyl)-6-oxo-1,6-dihydropyrimidine-2-carboxamide;
N-((4-(2,4-difluorobenzyl)tetrahydro-2H-pyran-4-yl)methyl)-3-oxo-2,3-dihydroisoxazole-5-carboxamide;
N-((4-(2,4-difluorobenzyl)tetrahydro-2H-pyran-4-yl)methyl)-6-oxo-1,6-dihydropyrimidine-2-carboxamide;
N-((1-(2,4-difluorobenzyl)spiro[2.2]pentan-1-yl)methyl)-6-oxo-1,6-dihydropyrimidine-2-carboxamide;
N-(2-cyclopropyl-3-(2,4-difluorophenyl)-2-methylpropyl)-6-oxo-1,6-dihydropyrimidine-2-carboxamide;
N-((2S)-2-cyclopropyl-3-(2,4-difluorophenyl)butyl)-6-oxo-1,6-dihydropyrimidine-2-carboxamide;
(R)—N-(2-cyclopropyl-3-(2,6-difluorophenyl)propyl)-6-oxo-1,6-dihydropyrimidine-2-carboxamide;
(R)—N-(2-cyclopropyl-3-(4-fluorophenyl)propyl)-1-methyl-5-oxo-4,5-dihydro-1H-1,2,4-triazole-3-carboxamide;
(S)—N-(2-(2,4-difluorobenzyl)butyl)-6-oxo-1,6-dihydropyrimidine-2-carboxamide;

(R)—N-(2-cyclopropyl-3-(2,4-difluorophenyl)propyl)-5-fluoro-6-oxo-1,6-dihydropyrimidine-2-carboxamide;
N-(3-(2-chloro-4-fluorophenyl)-2-cyclopropylpropyl)-1-methyl-5-oxo-4,5-dihydro-1H-1,2,4-triazole-3-carboxamide;
N-((1-(2,4-difluorobenzyl)spiro[2.2]pentan-1-yl)methyl)-5-oxo-4,5-dihydro-1,2,4-oxadiazole-3-carboxamide;
(R)—N-(2-cyclopropyl-3-(2,4-difluorophenyl)propyl)-5-oxo-4,5-dihydro-1,2,4-triazine-3-carboxamide;
N-((2S,3R)-2-cyclopropyl-3-(2,4-difluorophenyl)butyl)-1-methyl-5-oxo-4,5-dihydro-1H-1,2,4-triazole-3-carboxamide;
N-((2S,3S)-2-cyclopropyl-3-(2,4-difluorophenyl)butyl)-1-methyl-5-oxo-4,5-dihydro-1H-1,2,4-triazole-3-carboxamide;
N-((1-(2,4-difluorobenzyl)cyclobutyl)methyl)-5-oxo-4,5-dihydro-1,2,4-triazine-3-carboxamide;
N-(2-(2,4-difluorobenzyl)-2-ethylbutyl)-1-methyl-5-oxo-4,5-dihydro-1H-1,2,4-triazole-3-carboxamide;
N-((1-(3,4-difluorobenzyl)cyclobutyl)methyl)-5-oxo-4,5-dihydro-1,2,4-oxadiazole-3-carboxamide;
(R)—N-(2-cyclopropyl-3-(3,4-difluorophenyl)propyl)-5-oxo-4,5-dihydro-1,2,4-oxadiazole-3-carboxamide;
(R)—N-(2-cyclopropyl-3-(2,4-difluorophenyl)propyl)-5-oxo-4,5-dihydro-1,2,4-oxadiazole-3-carboxamide;
N-((1-(2,4-difluorobenzyl)cyclobutyl)methyl)-5-oxo-4,5-dihydro-1,2,4-oxadiazole-3-carboxamide;
N-((1-(2,4-difluorobenzyl)cyclobutyl)methyl)-5-(methoxymethyl)-4H-1,2,4-triazole-3-carboxamide;
(R)—N-(2-cyclopropyl-3-(2,5-difluorophenyl)propyl)-5-oxo-4,5-dihydro-1,2,4-oxadiazole-3-carboxamide;
(S)—N-(2-(2,4-difluorobenzyl)butyl)-5-oxo-4,5-dihydro-1,2,4-oxadiazole-3-carboxamide;
N-(2-cyclopropyl-3-(2,4-difluorophenyl)-2-methylpropyl)-1-methyl-5-oxo-4,5-dihydro-1H-1,2,4-triazole-3-carboxamide;
N-((1-(2,4-difluorobenzyl)cyclobutyl)methyl)-5-oxo-4,5-dihydro-1,3,4-oxadiazole-2-carboxamide;
(R)—N-(2-cyclopropyl-3-(2,6-difluorophenyl)propyl)-1-methyl-5-oxo-4,5-dihydro-1H-1,2,4-triazole-3-carboxamide;
N-((1-(2,4-difluorobenzyl)-3-fluorocyclobutyl)methyl)-6-oxo-1,6-dihydropyrimidine-2-carboxamide;
N-(2-(2,4-difluorobenzyl)-2-fluorobutyl)-6-oxo-1,6-dihydropyrimidine-2-carboxamide;
N-(2-cyclopropyl-3-(4-fluorophenyl)-2-methylpropyl)-6-oxo-1,6-dihydropyrimidine-2-carboxamide;
N-(2-cyclopropyl-3-(4-fluorophenyl)propyl)-6-oxo-1,6-dihydropyrimidine-2-carboxamide;
(R)-5-bromo-N-(2-cyclopropyl-3-(2,4-difluorophenyl)propyl)-6-oxo-1,6-dihydropyrimidine-2-carboxamide;
N-(3-(2-chloro-4,6-difluorophenyl)-2-cyclopropylpropyl)-1-methyl-5-oxo-4,5-dihydro-1H-1,2,4-triazole-3-carboxamide;
N-(2-(2,4-difluorobenzyl)-4,4,4-trifluorobutyl)-1-methyl-5-oxo-4,5-dihydro-1H-1,2,4-triazole-3-carboxamide;
N-(3-(4-chloro-2-fluorophenyl)-2-cyclopropylpropyl)-1-methyl-5-oxo-4,5-dihydro-1H-1,2,4-triazole-3-carboxamide;
(N-((2S,3S)-3-(2,4-difluorobenzyl)pentan-2-yl)-1-methyl-5-oxo-4,5-dihydro-1H-1,2,4-triazole-3-carboxamide;
N-((2R,3S)-3-(2,4-difluorobenzyl)pentan-2-yl)-1-methyl-5-oxo-4,5-dihydro-1H-1,2,4-triazole-3-carboxamide.
(N-((2S,3R)-2-cyclopropyl-3-(2,4-difluorophenyl)butyl)-6-oxo-1,6-dihydropyrimidine-2-carboxamide;
(N-((2S,3S)-2-cyclopropyl-3-(2,4-difluorophenyl)butyl)-6-oxo-1,6-dihydropyrimidine-2-carboxamide;
(S)—N-[2-cyclopropyl-2-methyl-3-(2,4,6-trifluorophenyl)propyl]-1-methyl-5-oxo-4H-1,2,4-triazole-3-carboxamide;
(R)—N-[2-cyclopropyl-2-methyl-3-(2,4,6-trifluorophenyl)propyl]-1-methyl-5-oxo-4H-1,2,4-triazole-3-carboxamide;
(S)—N-((2-(2,4-difluorobenzyl)tetrahydrofuran-2-yl)methyl)-1-methyl-5-oxo-4,5-dihydro-1H-1,2,4-triazole-3-carboxamide;
(R)—N-((2-(2,4-difluorobenzyl)tetrahydrofuran-2-yl)methyl)-1-methyl-5-oxo-4,5-dihydro-1H-1,2,4-triazole-3-carboxamide;
(S)—N-((1-(2,4-difluorobenzyl)spiro[2.2]pentan-1-yl)methyl)-1-methyl-5-oxo-4,5-dihydro-1H-1,2,4-triazole-3-carboxamide;
(R)—N-((1-(2,4-difluorobenzyl)spiro[2.2]pentan-1-yl)methyl)-1-methyl-5-oxo-4,5-dihydro-1H-1,2,4-triazole-3-carboxamide;
(S)—N-((1-(2,4-difluorobenzyl)spiro[2.2]pentan-1-yl)methyl)-5-oxo-4,5-dihydro-1,2,4-oxadiazole-3-carboxamide;
(R)—N-((1-(2,4-difluorobenzyl)spiro[2.2]pentan-1-yl)methyl)-5-oxo-4,5-dihydro-1,2,4-oxadiazole-3-carboxamide;
(S)—N-((1-(2,4-difluorobenzyl)spiro[2.2]pentan-1-yl)methyl)-6-oxo-1,6-dihydropyrimidine-2-carboxamide;
(R)—N-((1-(2,4-difluorobenzyl)spiro[2.2]pentan-1-yl)methyl)-6-oxo-1,6-dihydropyrimidine-2-carboxamide;
N-((2S,3R)-2-cyclopropyl-3-(2,4-difluorophenyl)butyl)-1-methyl-5-oxo-4,5-dihydro-1H-1,2,4-triazole-3-carboxamide;
N-((2S,3S)-2-cyclopropyl-3-(2,4-difluorophenyl)butyl)-1-methyl-5-oxo-4,5-dihydro-1H-1,2,4-triazole-3-carboxamide;
(S)—N-(2-cyclopropyl-3-(2,4-difluorophenyl)-2-methylpropyl)-1-methyl-5-oxo-4,5-dihydro-1H-1,2,4-triazole-3-carboxamide;
(R)—N-(2-cyclopropyl-3-(2,4-difluorophenyl)-2-methylpropyl)-1-methyl-5-oxo-4,5-dihydro-1H-1,2,4-triazole-3-carboxamide;
(R)—N-(3-(2-chloro-4-fluorophenyl)-2-cyclopropylpropyl)-1-methyl-5-oxo-4,5-dihydro-1H-1,2,4-triazole-3-carboxamide;
(S)—N-(3-(2-chloro-4-fluorophenyl)-2-cyclopropylpropyl)-1-methyl-5-oxo-4,5-dihydro-1H-1,2,4-triazole-3-carboxamide;
(S)—N-(2-cyclopropyl-3-(2,4-difluorophenyl)-2-methylpropyl)-6-oxo-1,6-dihydropyrimidine-2-carboxamide;
(R)—N-(2-cyclopropyl-3-(2,4-difluorophenyl)-2-methylpropyl)-6-oxo-1,6-dihydropyrimidine-2-carboxamide;
(R)—N-(2-(2,4-difluorobenzyl)-4,4,4-trifluorobutyl)-1-methyl-5-oxo-4,5-dihydro-1H-1,2,4-triazole-3-carboxamide;
(S)—N-(2-(2,4-difluorobenzyl)-4,4,4-trifluorobutyl)-1-methyl-5-oxo-4,5-dihydro-1H-1,2,4-triazole-3-carboxamide;
N-(((1s,3r)-1-(2,4-difluorobenzyl)-3-fluorocyclobutyl)methyl)-6-oxo-1,6-dihydropyrimidine-2-carboxamide;
N-(((1r,3s)-1-(2,4-difluorobenzyl)-3-fluorocyclobutyl)methyl)-6-oxo-1,6-dihydropyrimidine-2-carboxamide;
(S)—N-(2-cyclopropyl-3-(4-fluorophenyl)propyl)-6-oxo-1,6-dihydropyrimidine-2-carboxamide;
(R)—N-(2-cyclopropyl-3-(4-fluorophenyl)propyl)-6-oxo-1,6-dihydropyrimidine-2-carboxamide;
(S)—N-(2-cyclopropyl-3-(4-fluorophenyl)-2-methylpropyl)-6-oxo-1,6-dihydropyrimidine-2-carboxamide;

(R)—N-(2-cyclopropyl-3-(4-fluorophenyl)-2-methylpropyl)-6-oxo-1,6-dihydropyrimidine-2-carboxamide;
(R)—N-(3-(4-chloro-2-fluorophenyl)-2-cyclopropylpropyl)-1-methyl-5-oxo-4,5-dihydro-1H-1,2,4-triazole-3-carboxamide;
(S)—N-(3-(4-chloro-2-fluorophenyl)-2-cyclopropylpropyl)-1-methyl-5-oxo-4,5-dihydro-1H-1,2,4-triazole-3-carboxamide;
(S)-N-(2-(2,4-difluorobenzyl)-2-fluorobutyl)-6-oxo-1,6-dihydropyrimidine-2-carboxamide;
(R)—N-(2-(2,4-difluorobenzyl)-2-fluorobutyl)-6-oxo-1,6-dihydropyrimidine-2-carboxamide;
N-[(2R)-2-cyclopropyl-3-(2,4-difluorophenyl)-2-methylpropyl]-5-fluoro-4-oxo-3H-pyrimidine-2-carboxamide;
N-[(2S)-2-cyclopropyl-3-(2,4-difluorophenyl)-2-methylpropyl]-5-fluoro-4-oxo-3H-pyrimidine-2-carboxamide;
5-chloro-N-[(2R)-2-cyclopropyl-3-(2,4-difluorophenyl)-2-methylpropyl]-4-oxo-3H-pyrimidine-2-carboxamide;
5-chloro-N-[(2S)-2-cyclopropyl-3-(2,4-difluorophenyl)-2-methylpropyl]-4-oxo-3H-pyrimidine-2-carboxamide;
(S)—N-[2-cyclopropyl-3-(4-fluorophenyl)-2-methylpropyl]-5-fluoro-4-oxo-3H-pyrimidine-2-carboxamide;
(R)—N-[2-cyclopropyl-3-(4-fluorophenyl)-2-methylpropyl]-5-fluoro-4-oxo-3H-pyrimidine-2-carboxamide;
(S)-5-Chloro-N-[2-cyclopropyl-3-(4-fluorophenyl)-2-methylpropyl]-4-oxo-3H-pyrimidine-2-carboxamide;
(R)-5-Chloro-N-[2-cyclopropyl-3-(4-fluorophenyl)-2-methylpropyl]-4-oxo-3H-pyrimidine-2-carboxamide;
(S)—N-(2-cyclopropyl-3-(2,4-difluorophenyl)-2-methylpropyl)-5-methyl-6-oxo-1,6-dihydropyrimidine-2-carboxamide;
(R)—N-(2-cyclopropyl-3-(2,4-difluorophenyl)-2-methylpropyl)-5-methyl-6-oxo-1,6-dihydropyrimidine-2-carboxamide;
(S)—N-(2-cyclopropyl-3-(4-fluorophenyl)-2-methylpropyl)-5-methyl-6-oxo-1,6-dihydropyrimidine-2-carboxamide;
(R)—N-(2-cyclopropyl-3-(4-fluorophenyl)-2-methylpropyl)-5-methyl-6-oxo-1,6-dihydropyrimidine-2-carboxamide;
(S)—N-(2-cyclopropyl-3-(2,4-difluorophenyl)-2-methylpropyl)-3-hydroxyisoxazole-5-carboxamide;
(R)—N-(2-cyclopropyl-3-(2,4-difluorophenyl)-2-methylpropyl)-3-hydroxyisoxazole-5-carboxamide;
(S)—N-(2-cyclopropyl-3-(4-fluorophenyl)-2-methylpropyl)-3-hydroxyisoxazole-5-carboxamide;
(R)—N-(2-cyclopropyl-3-(4-fluorophenyl)-2-methylpropyl)-3-hydroxyisoxazole-5-carboxamide;
(S)—N-(2-cyclopropyl-3-(2,4-difluorophenyl)-2-methylpropyl)-5-oxo-4,5-dihydro-1,2,4-oxadiazole-3-carboxamide;
(R)—N-(2-cyclopropyl-3-(2,4-difluorophenyl)-2-methylpropyl)-5-oxo-4,5-dihydro-1,2,4-oxadiazole-3-carboxamide;
(S)—N-(2-cyclopropyl-3-(4-fluorophenyl)-2-methylpropyl)-5-oxo-4,5-dihydro-1,2,4-oxadiazole-3-carboxamide; and
(R)—N-(2-cyclopropyl-3-(4-fluorophenyl)-2-methylpropyl)-5-oxo-4,5-dihydro-1,2,4-oxadiazole-3-carboxamide;
or a salt and/or solvate of any one thereof.

The definition of the compounds of formula (I) is intended to include all tautomers of said compounds.

The compounds of the invention may be provided in the form of a pharmaceutically acceptable salt and/or solvate thereof. In particular, the compound of formula (I) may be provided in the form of a pharmaceutically acceptable salt and/or solvate, such as a pharmaceutically acceptable salt. In one embodiment, a compound of formula (I) is provided.

It will be appreciated that for use in medicine the salts of the compounds of formula (I) should be pharmaceutically acceptable. Non-pharmaceutically acceptable salts of the compounds of formula (I) may be of use in other contexts such as during preparation of the compounds of formula (I). Suitable pharmaceutically acceptable salts will be apparent to those skilled in the art. Pharmaceutically acceptable salts include those described by Berge et al. (1977). Such pharmaceutically acceptable salts include acid and base addition salts. Pharmaceutically acceptable acid additional salts may be formed with inorganic acids e.g. hydrochloric, hydrobromic, sulphuric, nitric or phosphoric acid and organic acids e.g. succinic, maleic, acetic, fumaric, citric, tartaric, benzoic, p-toluenesulfonic, methanesulfonic or naphthalenesulfonic acid. Other salts e.g. oxalates or formates, may be used, for example in the isolation of compounds of formula (I) and are included within the scope of this invention.

Certain compounds of formula (I) may form acid or base addition salts with one or more equivalents of the acid or base. The present invention includes within its scope all possible stoichiometric and non-stoichiometric forms.

The compounds of formula (I) may be prepared in crystalline or non-crystalline form and, if crystalline, may optionally be solvated, e.g. as the hydrate. This invention includes within its scope stoichiometric solvates (e.g. hydrates) as well as compounds containing variable amounts of solvent (e.g. water).

It is to be understood that the present invention encompasses all stereoisomers of formula (I) and their pharmaceutically acceptable derivatives, including all geometric, tautomeric and optical forms, and mixtures thereof (e.g. racemic mixtures). Where additional chiral centres are present in compounds of formula (I), the present invention includes within its scope all possible diastereoisomers, including mixtures thereof. The different isomeric forms may be separated or resolved one from the other by conventional methods, or any given isomer may be obtained by conventional synthetic methods or by stereospecific or asymmetric syntheses.

The present disclosure includes all isotopic forms of the compounds of the invention provided herein, whether in a form (I) wherein all atoms of a given atomic number have a mass number (or mixture of mass numbers) which predominates in nature (referred to herein as the "natural isotopic form") or (ii) wherein one or more atoms are replaced by atoms having the same atomic number, but a mass number different from the mass number of atoms which predominates in nature (referred to herein as an "unnatural variant isotopic form"). It is understood that an atom may naturally exist as a mixture of mass numbers. The term "unnatural variant isotopic form" also includes embodiments in which the proportion of an atom of given atomic number having a mass number found less commonly in nature (referred to herein as an "uncommon isotope") has been increased relative to that which is naturally occurring e.g. to the level of >20%, >50%, >75%, >90%, >95% or >99% by number of the atoms of that atomic number (the latter embodiment referred to as an "isotopically enriched variant form"). The term "unnatural variant isotopic form" also includes embodiments in which the proportion of an uncommon isotope has been reduced relative to that which is naturally occurring. Isotopic forms may include radioactive forms (i.e. they incorporate radioisotopes) and non-radioactive forms. Radioactive forms will typically be isotopically enriched variant forms.

An unnatural variant isotopic form of a compound may thus contain one or more artificial or uncommon isotopes such as deuterium ($^2H$ or D), carbon-11 ($^{11}C$), carbon-13 ($^{13}C$), carbon-14 ($^{14}C$), nitrogen-13 ($^{13}N$), nitrogen-15 ($^{15}N$), oxygen-15 ($^{15}O$), oxygen-17 ($^{17}O$), oxygen-18 ($^{18}O$), phosphorus-32 ($^{32}P$), sulphur-35 ($^{35}S$), chlorine-36 ($^{36}Cl$), chlorine-37 ($^{37}Cl$), fluorine-18 ($^{18}F$) iodine-123 ($^{123}I$), iodine-125 ($^{125}I$) in one or more atoms or may contain an increased proportion of said isotopes as compared with the proportion that predominates in nature in one or more atoms.

Unnatural variant isotopic forms comprising radioisotopes may, for example, be used for drug and/or substrate tissue distribution studies. The radioactive isotopes tritium, i.e. $^3H$, and carbon-14, i.e. $^{14}C$, are particularly useful for this purpose in view of their ease of incorporation and ready means of detection. Unnatural variant isotopic forms which incorporate deuterium i.e. 2H or D may afford certain therapeutic advantages resulting from greater metabolic stability, for example, increased in vivo half-life or reduced dosage requirements, and hence may be preferred in some circumstances. Further, unnatural variant isotopic forms may be prepared which incorporate positron emitting isotopes, such as $^{11}C$, $^{18}F$, $^{15}O$ and $^{13}N$, and would be useful in Positron Emission Topography (PET) studies for examining substrate receptor occupancy. In one embodiment, the compounds of the invention are provided in a natural isotopic form. In one embodiment, the compounds of the invention are provided in an unnatural variant isotopic form. In a specific embodiment, the unnatural variant isotopic form is a form in which deuterium (i.e. $^2H$ or D) is incorporated where hydrogen is specified in the chemical structure in one or more atoms of a compound of the invention. In one embodiment, the atoms of the compounds of the invention are in an isotopic form which is not radioactive. In one embodiment, one or more atoms of the compounds of the invention are in an isotopic form which is radioactive. Suitably radioactive isotopes are stable isotopes. Suitably the unnatural variant isotopic form is a pharmaceutically acceptable form.

In one embodiment, a compound of the invention is provided whereby a single atom of the compound exists in an unnatural variant isotopic form. In another embodiment, a compound of the invention is provided whereby two or more atoms exist in an unnatural variant isotopic form.

Unnatural isotopic variant forms can generally be prepared by conventional techniques known to those skilled in the art or by processes described herein e.g. processes analogous to those described in the accompanying Examples for preparing natural isotopic forms. Thus, unnatural isotopic variant forms could be prepared by using appropriate isotopically variant (or labelled) reagents in place of the normal reagents employed in the Examples. Since the compounds of formula (I) are intended for use in pharmaceutical compositions it will readily be understood that they are each preferably provided in substantially pure form, for example at least 60% pure, more suitably at least 75% pure and preferably at least 85%, especially at least 98% pure (% are on a weight for weight basis). Impure preparations of the compounds may be used for preparing the more pure forms used in the pharmaceutical compositions.

In general, the compounds of formula (I) may be made according to the organic synthesis techniques known to those skilled in this field, as well as by the representative methods set forth below, those in the Examples, and modifications thereof. In the following schemes, reactive groups can be protected with protecting groups and deprotected according to established techniques well known to the skilled person.

Generic Routes

Generic routes by which compound examples of the invention may be conveniently prepared are summarised below. In the following description, the groups $R^1$, $R^2$, $R^3$, $R^4$, $R^5$, $R^6$, $R^7$, A and B, are as defined above for the compounds of formula (I) unless otherwise stated.

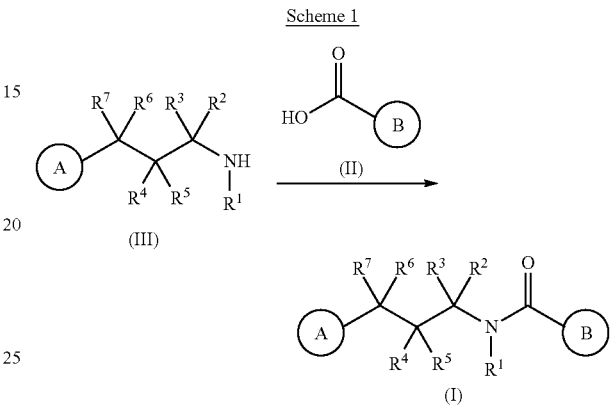

Scheme 1

Compounds of formula (I) may be prepared by reacting a compound of formula (II) with a compound of formula (III) under amide coupling conditions, using an agent such as EDC·HCl (N-ethyl-N'-(3-dimethylaminopropyl)carbodiimide hydrochloride) in a solvent e.g. dimethylformamide at room temperature. Alternative conditions known to the skilled person may be used e.g. HATU (1-[bis(dimethylamino)methylene]-1H-1,2,3-triazolo[4,5-b]pyridinium 3-oxide hexafluorophosphate) or PyBOP (benzotriazol-1-yloxytripyrrolidinophosphonium hexafluorophosphate) in the presence of a base e.g. N,N'-diisopropylethylamine and a solvent e.g. dimethylformamide; or $T_3P$ (1-Propanephosphonic anhydride) in the presence of a base e.g. triethylamine and a solvent e.g. dimethylformamide.

Compounds of formulae (II) and (III) are commercially available or may be prepared by methods known to the skilled person.

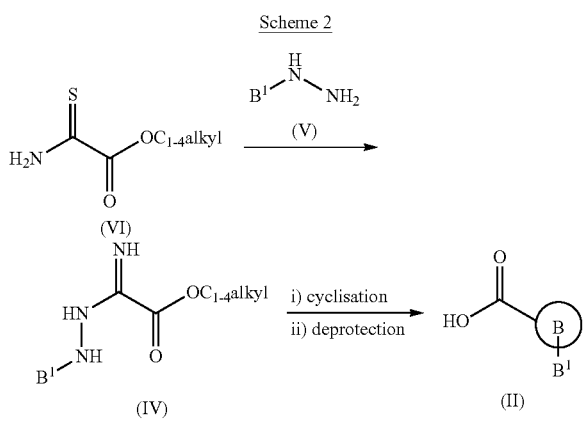

Scheme 2

Compounds of formula (II) wherein B is (B5) may be prepared by reacting a compound of formula (IV) with a reagent such as CDI (1,1'-carbonyldiimidazole) in a solvent such as dichloromethane followed by deprotection by ester hydrolysis e.g. with a base such as sodium hydroxide in a solvent such as a mixture of ethanol and water. Compounds of formula (IV) may be prepared by reacting a compound of formula (V) with a compound of formula (VI) in the presence of a base such as potassium carbonate, and a solvent such as ethanol.

Compounds of formulae (V) and (VI) are commercially available or may be made according to methods known to the skilled person.

Scheme 3

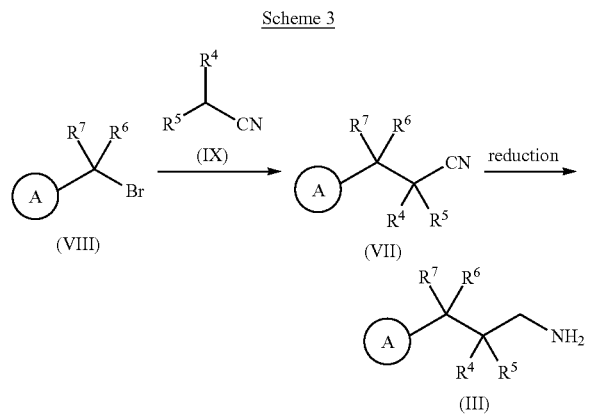

Compounds of formula (III) wherein $R^2$ and $R^3$ are H may be prepared by reacting a compound of formula (VII) with a reductant e.g. lithium aluminium hydride in a solvent such as THE. Compounds of formula (VII) may be prepared by reacting a compound of formula (Vill) with a compound of formula (IX) in the presence of a base such as lithium di-isopropylamide in a solvent e.g. THE.

Compounds of formulae (Vill) and (IX) are commercially available or may be made by methods known to the skilled person.

Scheme 4

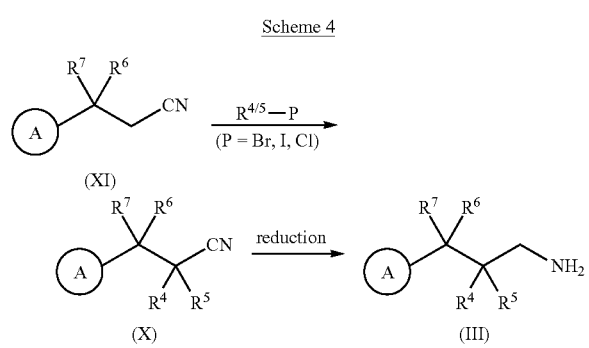

Compounds of formula (III) wherein $R^4$ and/or $R^5$ are not H may be prepared by reacting a compound of formula (X) under reduction conditions e.g. Rainey nickel and $H_2$ in a solvent such as methanol. Compounds of formula (X) may be prepared by reacting a compound of formula (XI) with an alkylating agent e.g. an alkyl halide in the presence of a base such as LiHMDS (lithium bis(trimethylsilyl)amide) in a solvent such as tetrahydrofuran. Mono- or di-addition (i.e. addition of $R^4$ and/or $R^5$) can be controlled by adjusting the equivalent of alkylating agent used.

Compounds of formula (XI) are commercially available or may be made by methods known to the skilled person.

Scheme 5

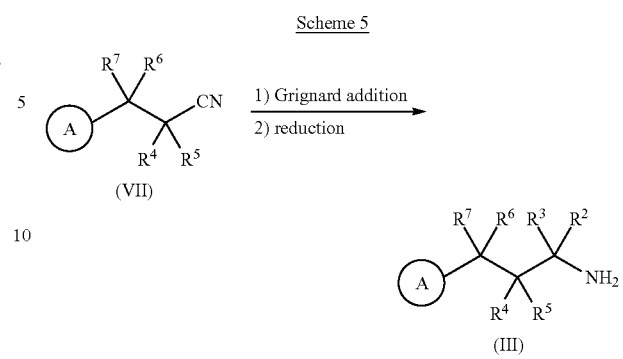

Compounds of formula (III) wherein at least one of $R^2$ or $R^3$ is not H may be prepared by reacting a compound of formula (VII) with a Grignard reagent e.g. $R^2$MgBr (where is $R^2$ is as defined elsewhere e.g. $C_{1-4}$alkyl) followed by reduction e.g. using sodium borohydride.

Scheme 6

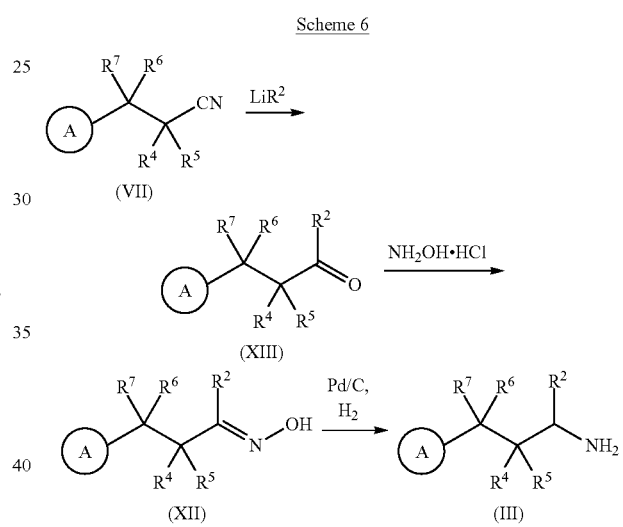

Alternatively, compounds of formula (III) wherein at least one of $R^2$ and $R^3$ is not H may be prepared by reacting a compound of formula (XII) under reduction conditions e.g. Pd on carbon in the presence of $H_2$, in a solvent such as methanol. Compounds of formula (XII) may be prepared by reacting compounds of formula (XIII) with a hydroxylamine e.g. $NH_2OH \cdot HCl$ in the presence of a base e.g. triethylamine in a solvent such as ethanol. Compounds of formula (XIII) may be prepared by reacting a compound of formula (VII) with an organolithium compound in a solvent e.g. tetrahydrofuran.

Compounds of formula (VII) are commercially available or may be made by methods known to the skilled person.

Scheme 7

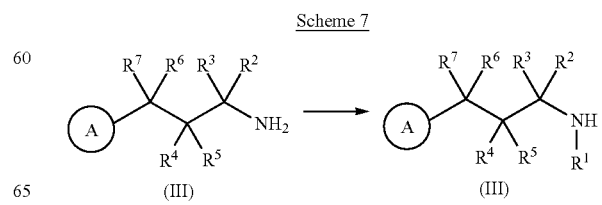

Compounds of formula (III) wherein $R^1$ is not H may be prepared by reacting a compound of formula (III) wherein $R^1$ is H under amination conditions e.g. formaldehyde in the presence of formic acid.

Scheme 8

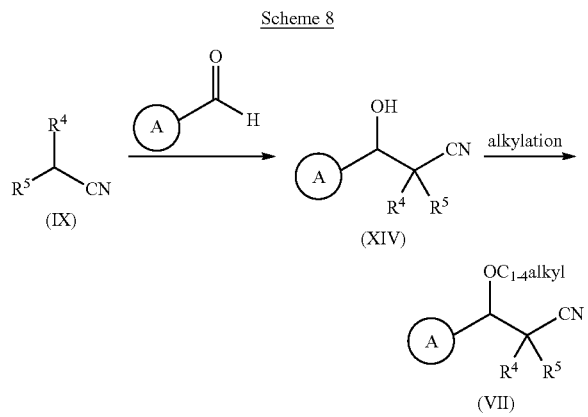

Compounds of formula (VII) wherein $R^7$ is $C_{1-4}$alkoxy may be obtained by reacting a compound of formula (XIV) with an alkylating agent e.g. methyl iodide in the presence of a base e.g. sodium hydride, in a solvent e.g. dimethylformamide. Compounds of formula (XIV) may be obtained by reacting a compound of formula (IX) with a commercially available aldehyde, such as benzaldehyde.

Scheme 9

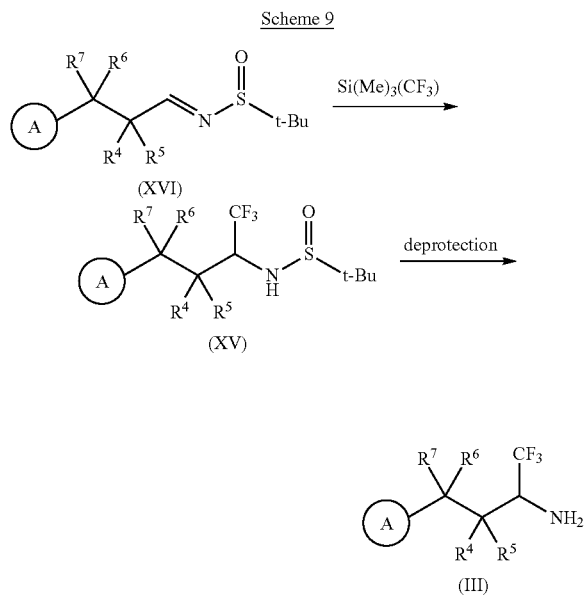

Compounds of formula (III) wherein $R^2$ is $C_{1-4}$haloalkyl may be prepared by reacting compound of formula (XV) under deprotection conditions e.g. 4N HCL in methanol. Compounds of formula (XV) may be obtained by reacting a compound of formula (XVI) with a nucleophile e.g. $Si(Me)_3(CF_3)$ in the presence of a base e.g. caesium fluoride in a solvent such as tetrahydrofuran.

Compounds of formula (XVI) are commercially available or may be made by methods known to the skilled person.

Scheme 10

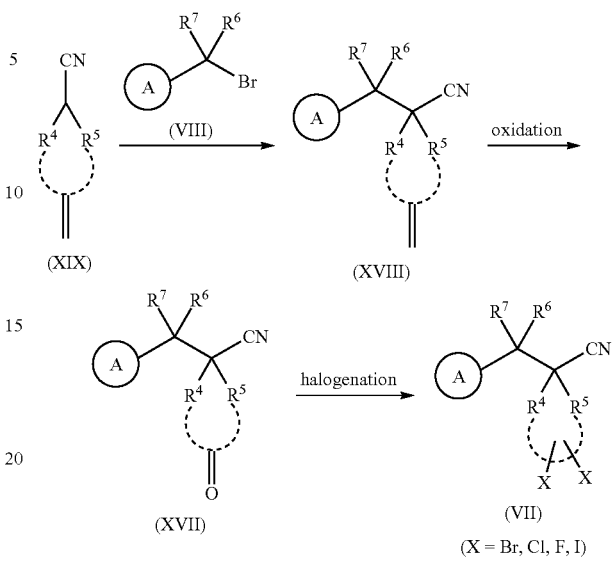

Compounds of formula (VII) wherein $R^4$ and $R^5$ together with the atom to which they are attached form a $C_{3-6}$cycloalkyl which is substituted by one or more halo may be prepared by reacting a compound of formula (XVII) with an appropriate reagent e.g. diethylaminosulfur trifluoride in a solvent such as dichloromethane. Compounds of formula (XVII) may be obtained by reacting a compound of formula (XVIII) under oxidation conditions using an oxidising agent e.g. sodium periodate, in the presence of a catalyst e.g. ruthenium trichloride in a solvent such as a mixture of dichloromethane, acetonitrile and water. Compounds of formula (XVIII) may be obtained by reacting a compound of formula (XIX) with a compound of formula (VIII) in the presence of a base, such as lithium di-isopropyl amide in a solvent such as THF.

Compounds of formula (XIX) are commercially available or may be made according to methods known to the skilled person.

The skilled person will appreciate that protecting groups may be used throughout the synthetic schemes described herein to give protected derivatives of any of the above compounds or generic formulae. Protective groups and the means for their removal are described in "Protective Groups in Organic Synthesis", by Theodora W. Greene and Peter G. M. Wuts, published by John Wiley & Sons Inc; 4th Rev Ed., 2006, ISBN-10: 0471697540. Examples of nitrogen protecting groups include trityl (Tr), tert-butyloxycarbonyl (BOC), 9-fluorenylmethyloxycarbonyl (Fmoc), acetyl (Ac), benzyl (Bn) and para-methoxy benzyl (PMB). Examples of oxygen protecting groups include acetyl (Ac), methoxymethyl (MOM), para-methoxybenzyl (PMB), benzyl, tert-butyl, methyl, ethyl, tetrahydropyranyl (THP), and silyl ethers and esters (such as trimethylsilyl (TMS), tert-butyldimethylsilyl (TBDMS), tri-iso-propylsilyloxymethyl (TOM), and triisopropylsilyl (TIPS) ethers and esters). Specific examples of carboxylic acid protecting groups include alkyl esters (such as $C_{1-6}$ alkyl and $C_{1-6}$ haloalkyl e.g. $C_{1-4}$ alkyl esters and $C_{1-4}$ haloalkyl esters), benzyl esters (including substituted benzyl esters such as p-methoxybenzyl esters), and silyl esters.

Processes

The invention also provides a process for preparing a compound of formula (I) or a salt and/or solvate thereof, which comprises reacting a compound of formula (II),

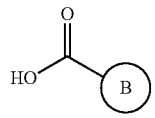
(II)

wherein B is as defined for the compound of formula (I); or salt thereof,
with a compound of formula (III),

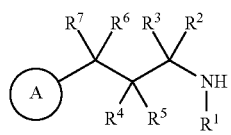
(III)

wherein $R^1$, $R^2$, $R^3$, $R^4$, $R^5$, $R^6$, $R^6$ and A are as defined for the compound of formula (I), or a salt thereof.

Intermediates

The invention also provides novel intermediates used in the preparation of compounds of formula (I). Particular intermediates of interest are those of the following general formulae, wherein the variable groups and associated preferences are as defined previously for compounds of formula (I). Therefore, in one embodiment the invention provides a compound selected from the group consisting of:

a compound of formula (II):

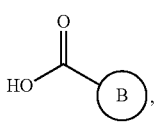
(II)

wherein B is as defined for the compound of formula (I);
a compound of formula (III):

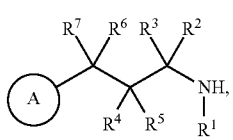
(III)

wherein $R^1$, $R^2$, $R^3$, $R^4$, $R^5$, $R^6$, $R^7$ and A are as defined for the compound of formula (I);
a compound of formula (IV):

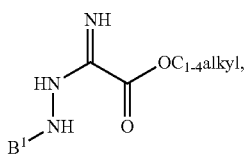
(IV)

wherein $B^1$ is as defined for the compound of formula (I);
a compound of formula (VII):

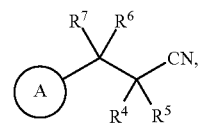
(VII)

wherein $R^4$, $R^5$, $R^6$, $R^7$ and A are as defined for the compound of formula (I);
a compound of formula (XII):

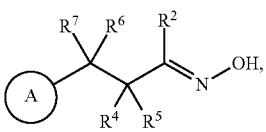
(XII)

wherein $R^2$, $R^4$, $R^5$, $R^6$, $R^7$ and A are as defined for the compound of formula (I);
a compound of formula (XIII):

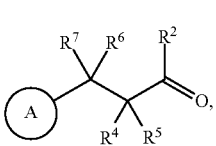
(XIII)

wherein $R^2$, $R^4$, $R^5$, $R^6$, $R^7$ and A are as defined for the compound of formula (I);
a compound of formula (XIV):

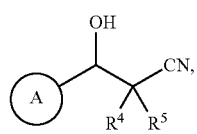
(XIV)

wherein $R^4$, $R^5$ and A are as defined for the compound of formula (I);
a compound of formula (XV):

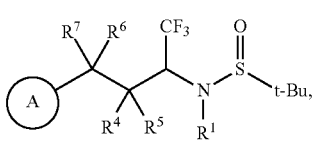
(XV)

wherein $R^1$, $R^4$, $R^5$, $R^6$, $R^7$ and A are as defined for the compound of formula (I);

a compound of formula (XVI):

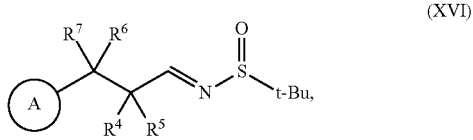
(XVI)

wherein $R^4$, $R^5$, $R^6$, $R^7$ and A are as defined for the compound of formula (I);
a compound of formula (XVII):

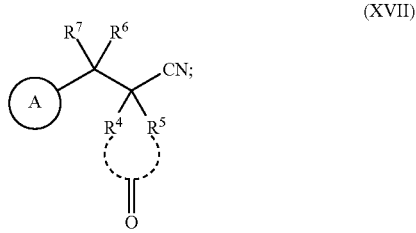
(XVII)

wherein $R^4$, $R^5$, $R^6$, $R^7$ and A are as defined for the compound of formula (I); and
a compound of formula (XVIII):

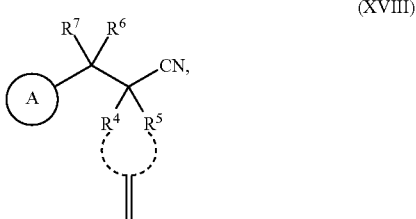
(XVIII)

wherein $R^4$, $R^5$, $R^6$, $R^7$ and A are as defined for the compound of formula (I),
or salts, such as pharmaceutically acceptable salts, of any one thereof.

Therapeutic Methods

The compounds of formula (I) of the present invention have utility as inhibitors of mPTP.

References to compounds of formula (I), or pharmaceutically acceptable salts and/or solvates thereof in the context of therapeutic and prophylactic methods as described below are understood to not include the proviso of formula (I) i.e N-((1-benzylcyclobutyl)methyl)-6-hydroxypyrazine-2-carboxamide:

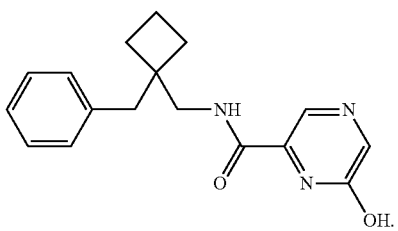 [SMILES: O=C(NCC1(Cc2ccccc2)CCC1)c1cncc(O)n1]

These compounds are commercially available and to date no utility (e.g. therapeutic utility) of these compounds has been described.

Therefore, the invention provides a compound of formula (I), or a pharmaceutically acceptable salt and/or solvate thereof, for use as a pharmaceutical, in particular in the treatment or prophylaxis of a disease or disorder in which inhibition of mPTP provides a therapeutic or prophylactic effect, for example those diseases and disorders mentioned herein below, wherein the proviso of formula (I) does not apply.

The invention also provides a compound of formula (I), or a pharmaceutically acceptable salt and/or solvate thereof, for use a pharmaceutical, in particular in the treatment of a disease or disorder in which inhibition of mPTP provides a therapeutic effect, for example those diseases and disorders mentioned herein below, wherein the proviso of formula (I) does not apply.

The invention also provides a compound of formula (I), or a pharmaceutically acceptable salt and/or solvate thereof, for use a pharmaceutical, in particular in the prophylaxis of a disease or disorder in which inhibition of mPTP provides a prophylactic effect, for example those diseases and disorders mentioned herein below, wherein the proviso of formula (I) does not apply.

The invention also provides the use of a compound of formula (I), or a pharmaceutically acceptable salt and/or solvate thereof, in the manufacture of a medicament, in particular for the treatment or prophylaxis of a disease or disorder in which inhibition of mPTP provides a therapeutic or prophylactic effect, for example those diseases and disorders mentioned herein below, wherein the proviso of formula (I) does not apply.

The invention also provides the use of a compound of formula (I), or a pharmaceutically acceptable salt and/or solvate thereof, in the manufacture of a medicament, in particular for the treatment of a disease or disorder in which inhibition of mPTP provides a therapeutic effect, for example those diseases and disorders mentioned herein below, wherein the proviso of formula (I) a does not apply.

The invention also provides the use of a compound of formula (I), or a pharmaceutically acceptable salt and/or solvate thereof, in the manufacture of a medicament, in particular for the prophylaxis of a disease or disorder in which inhibition of mPTP provides a prophylactic effect, for example those diseases and disorders mentioned herein below, wherein the proviso of formula (I) does not apply.

The invention also provides a method of preventing or treating a disease or disorder in which inhibition of mPTP provides a therapeutic or prophylactic effect in a subject, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

The invention also provides a method of treating a disease or disorder in which inhibition of mPTP provides a therapeutic effect in a subject, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

The invention also provides a method of preventing a disease or disorder in which inhibition of mPTP provides a prophylactic effect in a subject, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

The term 'treatment' or 'treating' as used herein includes the control, mitigation, reduction, or modulation of the disease state or its symptoms.

The term 'prophylaxis' or 'preventing' is used herein to mean preventing symptoms of a disease or disorder in a subject or preventing recurrence of symptoms of a disease or disorder in an afflicted subject and is not limited to complete prevention of an affliction.

In one embodiment, the disease or disorder is selected from degenerative or neurodegenerative diseases, disorders of the central nervous system, ischemia or re-perfusion injury, metabolic diseases, inflammatory or autoimmune diseases, diseases of aging and renal diseases.

In another embodiment, the disease or disorder is selected from degenerative or neurodegenerative diseases, disorders of the central nervous system, ischemia or re-perfusion injury, metabolic diseases, inflammatory or autoimmune diseases, diseases of aging, renal diseases, hearing loss, a disease or disorder of the eye, Charcot-Marie-Tooth disease (CMT1a) and Leigh syndrome disease.

In one particular embodiment, the disease or disorder is a degenerative or neurodegenerative disease, such as Parkinson's disease, dementia with Lewy bodies, Alzheimer's disease, amyotrophic lateral sclerosis, multiple sclerosis, frontal temporal dementia, chemotherapy induced neuropathy, Huntington's disease, spinocerebellar ataxias, progressive supranuclear palsy, hereditary spastic paraplegia, Duchenne muscular dystrophy, congenital muscular dystrophy, traumatic brain injury (such as concussion) and Friedreich's ataxia. In one preferred embodiment, the disease or disorder is Parkinson's disease. In one preferred embodiment, the disease or disorder is Alzheimer's disease. In one preferred embodiment, the disease or disorder is amyotrophic lateral sclerosis.

In another particular embodiment, the disease or disorder is a disease of the central nervous system, such as AIDS dementia complex, depressive disorders, schizophrenia and epilepsy.

In another embodiment, the disease or disorder is ischemia or re-perfusion injury, such as acute myocardial infarction, stroke, kidney ischemia reperfusion injury, and organ damage during transplantation.

In another embodiment, the disease or disorder is a metabolic disease, such as hepatic steatosis, diabetes, diabetic retinopathy, cognitive decline and other diabetes associated conditions, obesity and feeding behaviours, and non-alcoholic fatty liver disease.

In another embodiment, the disease or disorder is complication linked to a metabolic disease, such as diabetic neuropathy.

In another embodiment, the disease or disorder is an inflammatory or autoimmune disease, such as acute pancreatitis, systemic lupus, organ failure in sepsis and hepatitis.

In another embodiment, the disease or disorder is a disease of aging, such as bone repair, bone weakness in aging in osteoporosis and sarcopenia.

In another embodiment, the disease or disorder is a renal disease, such as chronic kidney disease associated with APOL1 genetic variants and chronic kidney disease.

In another embodiment, the disease or disorder is hearing loss, such as hearing loss due to aging, noise, concussion, traumatic brain injury (TBI), drug induced, and/or genetic hearing loss, including spinal muscular atrophy (SMA) syndrome (SMA1, SMA2, SMA3, and SMA4, also called Type I, II, III and IV).

In another embodiment, the disease or disorder is a disease or disorder of the eye, such as age-related macular degeneration.

In another embodiment, the disease or disorder is Charcot-Marie-Tooth disease (CMT1a).

In another embodiment, the disease or disorder is Leigh syndrome disease.

The compounds of formula (I) are expected to be useful in the treatment or prophylaxis of a mitochondrial disease.

Therefore, the invention provides a compound of formula (I), or a pharmaceutically acceptable salt and/or solvate thereof, for use in the treatment or prophylaxis of a mitochondrial disease, for example those diseases and disorders mentioned herein below, wherein the proviso of formula (I) does not apply.

The invention also provides a compound of formula (I), or a pharmaceutically acceptable salt and/or solvate thereof, for use in the treatment of a mitochondrial disease, for example those diseases and disorders mentioned herein below, wherein the proviso of formula (I) does not apply.

The invention also provides a compound of formula (I), or a pharmaceutically acceptable salt and/or solvate thereof, for use in the prophylaxis of a mitochondrial disease, for example those diseases and disorders mentioned herein below, wherein the proviso of formula (I) does not apply.

The invention also provides the use of a compound of formula (I), or a pharmaceutically acceptable salt and/or solvate thereof, in the manufacture of a medicament for the treatment or prophylaxis of a mitochondrial disease, for example those diseases and disorders mentioned herein below, wherein the proviso of formula (I) does not apply.

The invention also provides the use of a compound of formula (I), or a pharmaceutically acceptable salt and/or solvate thereof, in the manufacture of a medicament for the treatment of a mitochondrial disease, for example those diseases and disorders mentioned herein below, wherein the proviso of formula (I) does not apply.

The invention also provides the use of a compound of formula (I), or a pharmaceutically acceptable salt and/or solvate thereof, in the manufacture of a medicament for the prophylaxis of a mitochondrial disease, for example those diseases and disorders mentioned herein below, wherein the proviso of formula (I) does not apply.

The invention also provides a method of treating or preventing a mitochondrial disease in a subject, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

The invention also provides a method of treating a mitochondrial disease in a subject, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

The invention also provides a method of preventing a mitochondrial disease in a subject, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

Suitably, the mitochondrial disease is selected from Reye syndrome, Leber's hereditary optic neuropathy and associated disorders and disorders, such as those diseases and disorders disclosed in CA2884607A1 (Stealth Peptides International Inc.)

The compounds of formula (I) are expected to be useful in the treatment or prophylaxis of a disease or disorder associated with TDP-43 proteinopathy such as TDP-43 associated neurodegeneration.

Therefore, the invention provides a compound of formula (I), or a pharmaceutically acceptable salt and/or solvate thereof, for use in the treatment or prophylaxis of a disease or disorder associated with TDP-43 proteinopathy such as TDP-43 associated neurodegeneration, for example those diseases and disorders mentioned herein below, wherein the proviso of formula (I) does not apply.

The invention also provides a compound of formula (I), or a pharmaceutically acceptable salt and/or solvate thereof, for use in the treatment of a disease or disorder associated with TDP-43 proteinopathy such as TDP-43 associated neurodegeneration, for example those diseases and disorders mentioned herein below, wherein the proviso of formula (I) does not apply.

The invention also provides a compound of formula (I), or a pharmaceutically acceptable salt and/or solvate thereof, for use in the prophylaxis of a disease or disorder associated with TDP-43 proteinopathy such as TDP-43 associated neurodegeneration, for example those diseases and disorders mentioned herein below, wherein the proviso of formula (I) does not apply.

The invention also provides the use of a compound of formula (I), or a pharmaceutically acceptable salt and/or solvate thereof, in the manufacture of a medicament for the treatment or prophylaxis of a disease or disorder associated with TDP-43 proteinopathy such as TDP-43 associated neurodegeneration, for example those diseases and disorders mentioned herein below, wherein the proviso of formula (I) does not apply.

The invention also provides the use of a compound of formula (I), or a pharmaceutically acceptable salt and/or solvate thereof, in the manufacture of a medicament for the treatment of a disease or disorder associated with TDP-43 proteinopathy such as TDP-43 associated neurodegeneration, for example those diseases and disorders mentioned herein below, wherein the proviso of formula (I) does not apply.

The invention also provides the use of a compound of formula (I), or a pharmaceutically acceptable salt and/or solvate thereof, in the manufacture of a medicament for the prophylaxis of a disease or disorder associated with TDP-43 proteinopathy such as TDP-43 associated neurodegeneration, for example those diseases and disorders mentioned herein below, wherein the proviso of formula (I) does not apply.

The invention also provides a method of treating or preventing a disease or disorder associated with TDP-43 proteinopathy such as TDP-43 associated neurodegeneration, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

The invention also provides a method of treating a disease or disorder associated with TDP-43 proteinopathy such as TDP-43 associated neurodegeneration, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

The invention also provides a method of preventing a disease or disorder associated with TDP-43 proteinopathy such as TDP-43 associated neurodegeneration, which comprises administering to a subject in need thereof an effective amount of a compound of formula (I), or a pharmaceutically acceptable salt and/or solvate thereof, for example those diseases and disorders mentioned herein below, wherein the proviso of formula (I) does not apply.

Suitably, the disease or disorder associated with TDP-43 proteinopathy such as TDP-43 associated neurodegeneration is selected from Amyotrophic Lateral Sclerosis, Frontotemporal dementia, Facial onset sensory and motor neuronopathy, Primary lateral sclerosis, Progressive muscular atrophy, Inclusion body myopathy associated with early-onset Paget disease of the bone and Frontotemporal lobar degeneration dementia, Perry disease, Chronic traumatic encephalopathy, Severe traumatic brain injury, Alzheimer's disease, Hippocampal sclerosis dementia, Limbic-predominant age-related TDP-43 encephalopathy, and Cerebral age-related TDP-43 with sclerosis.

The invention also provides a compound of formula (I), or a pharmaceutically acceptable salt and/or solvate thereof, for use in the treatment or prophylaxis of a disease or disorder associated with fibrosis, wherein the proviso of formula (I) does not apply.

The invention also provides a compound of formula (I), or a pharmaceutically acceptable salt and/or solvate thereof, for use in the treatment of a disease or disorder associated with fibrosis, wherein the proviso of formula (I) does not apply.

The invention also provides a compound of formula (I), or a pharmaceutically acceptable salt and/or solvate thereof, for use in the prophylaxis of a disease or disorder associated with fibrosis, wherein the proviso of formula (I) does not apply.

The invention also provides the use of a compound of formula (I), or a pharmaceutically acceptable salt and/or solvate thereof, in the manufacture of a medicament for the treatment or prophylaxis of a disease or disorder associated with fibrosis, wherein the proviso of formula (I) does not apply.

The invention also provides the use of a compound of formula (I), or a pharmaceutically acceptable salt and/or solvate thereof, in the manufacture of a medicament for the treatment of a disease or disorder associated with fibrosis, wherein the proviso of formula (I)) does not apply.

The invention also provides the use of a compound of formula (I) or a pharmaceutically acceptable salt and/or solvate thereof, in the manufacture of a medicament for the prophylaxis of a disease or disorder associated with fibrosis, wherein the proviso of formula (I) does not apply.

The invention also provides a method of treating or preventing a disease or disorder associated with fibrosis, which comprises administering to a subject in need thereof an effective amount of a compound of formula (I) or a pharmaceutically acceptable salt and/or solvate thereof, wherein the proviso of formula (I) does not apply.

The invention also provides a method of treating a disease or disorder associated with fibrosis, which comprises administering to a subject in need thereof an effective amount of a compound of formula (I), or a pharmaceutically acceptable salt and/or solvate thereof, wherein the proviso of formula (I) does not apply.

The invention also provides a method of preventing a disease or disorder associated with fibrosis, which comprises administering to a subject in need thereof an effective amount of a compound of formula (I), or a pharmaceutically acceptable salt and/or solvate thereof, wherein the proviso of formula (I) does not apply.

Suitably, the disease or disorder associated with fibrosis is selected from chronic kidney disease, idiopathic pulmonary fibrosis, non-alcoholic steatohepatitis, primary biliary cholangitis and systemic sclerosis.

Suitably the subject is a mammal, in particular the subject is a human.

Pharmaceutical Compositions

For use in therapy the compounds of the invention are usually administered as a pharmaceutical composition. The invention also provides a pharmaceutical composition comprising a compound of formula (I), or a pharmaceutically acceptable salt and/or solvate (e.g. salt) thereof, and a pharmaceutically acceptable carrier or excipient, wherein the proviso of formula (I) does not apply.

In one embodiment, there is provided a pharmaceutical composition comprising a compound of formula (I), or a pharmaceutically acceptable salt and/or solvate (e.g. salt) thereof, for use in the treatment or prophylaxis of a disease or disorder as described herein, wherein the proviso of formula (I) does not apply. In one embodiment, there is provided a pharmaceutical composition comprising a compound of formula (I), or a pharmaceutically acceptable salt and/or solvate (e.g. salt) thereof, for use in the treatment of a disease or disorder as described herein, wherein the proviso of formula (I) does not apply. In one embodiment, there is provided a pharmaceutical composition comprising a compound of formula (I), or a pharmaceutically acceptable salt and/or solvate (e.g. salt) thereof, for use in the prophylaxis of a disease or disorder as described herein, wherein the proviso of formula (I) does not apply.

In a further embodiment, there is provided a method for the treatment or prophylaxis of a disease or disorder as described herein, which comprises administering to a subject in need thereof an effective amount of a pharmaceutical composition comprising a compound of formula (I) or a pharmaceutically acceptable salt and/or solvate (e.g. salt) thereof, wherein the proviso of formula (I) does not apply. In a further embodiment, there is provided a method for the treatment of a disease or disorder as described herein, which comprises administering to a subject in need thereof an effective amount of a pharmaceutical composition comprising a compound of formula (I) or a pharmaceutically acceptable salt and/or solvate (e.g. salt) thereof, wherein the proviso of formula (I) does not apply. In a further embodiment, there is provided a method for the prophylaxis of a disease or disorder as described herein, which comprises administering to a subject in need thereof an effective amount of a pharmaceutical composition comprising a compound of formula (I) or a pharmaceutically acceptable salt and/or solvate (e.g. salt) thereof, wherein the proviso of formula (I) does not apply. Pharmaceutical compositions of the invention may take the form of a pharmaceutical formulation as described below.

The invention also provides the use of a pharmaceutical composition comprising a compound of formula (I), or a pharmaceutically acceptable salt and/or solvate thereof (e.g. salt) thereof, in the manufacture of a medicament for the treatment or prophylaxis of a disease or disorder as described herein, wherein the proviso of formula (I) does not apply. The invention also provides the use of a pharmaceutical composition comprising a compound of formula (I), or a pharmaceutically acceptable salt and/or solvate thereof (e.g. salt) thereof, in the manufacture of a medicament for the treatment of a disease or disorder as described herein, wherein the proviso of formula (I) does not apply. The invention also provides the use of a pharmaceutical composition comprising a compound of formula (I), or a pharmaceutically acceptable salt and/or solvate thereof (e.g. salt) thereof, in the manufacture of a medicament for the prophylaxis of a disease or disorder as described herein, wherein the proviso of formula (I) does not apply.

The amount of active ingredient which is required to achieve a therapeutic effect will, of course, vary with the particular compound, the route of administration, the subject under treatment or prophylaxis, including the type, species, age, weight, sex, and medical condition of the subject and the renal and hepatic function of the subject, and the particular disorder or disease being treated or prevented, as well as its severity. An ordinarily skilled physician, veterinarian or clinician can readily determine and prescribe the effective amount of the drug required to prevent, counter or arrest the progress of the condition.

Oral dosages of the present invention, when used for the indicated effects, will range between about 0.01 mg per kg of body weight per day (mg/kg/day) to about 100 mg/kg/day, suitably 0.01 mg per kg of body weight per day (mg/kg/day) to 10 mg/kg/day, and most suitably 0.1 to 5.0 mg/kg/day, for adult humans. For oral administration, the compositions are suitably provided in the form of tablets or other forms of presentation provided in discrete units containing 0.01, 0.05, 0.1, 0.5, 1.0, 2.5, 5.0, 10.0, 15.0, 25.0, 50.0, 100, and 500 milligrams of the active ingredient for the symptomatic adjustment of the dosage to the patient to be treated. A medicament typically contains from about 0.01 mg to about 500 mg of the active ingredient, suitably from about 1 mg to about 100 mg of active ingredient. Intravenously, the most suitable doses will range from about 0.1 to about 10 mg/kg/minute during a constant rate infusion. Advantageously, compounds of the invention may be administered in a single daily dose, or the total daily dosage may be administered in divided doses of two, three or four times daily. Furthermore, suitably compounds of the invention can be administered in intranasal form via topical use of suitable intranasal vehicles, or via transdermal routes, using those forms of transdermal skin patches well known to those of ordinary skill in the art. To be administered in the form of a transdermal delivery system, the dosage administration will, of course, be continuous rather than intermittent throughout the dosage regimen.

The pharmaceutical formulations according to the invention include those suitable for oral, parenteral (including subcutaneous, intradermal, intramuscular, intravenous [bolus or infusion], and intraarticular), intranasal (also known as nasal administration), inhalation (including fine particle dusts or mists which may be generated by means of various types of metered dose pressurized aerosols, nebulizers or insufflators) insufflation, rectal, intraperitoneal, topical (including dermal, buccal, sublingual, and intraocular) and intrathecal administration, although the most suitable route may depend upon, for example, the condition and disorder of the recipient.

Suitable pharmaceutical formulations according to the invention are those suitable for oral, intrathecal and parenteral administration; and more suitably are those suitable for oral or intrathecal administration.

In one suitable embodiment a compound according to formula (I) is administered by intrathecal administration. Such a method of administration involves injection of the compound of the invention into the spinal canal, or into the subarachnoid space so that it reaches the cerebrospinal fluid.

This is advantageous for the administration of compounds which may not be able to pass the blood brain barrier via other routes of administration, such as oral administration.

Suitable pharmaceutical formulations may be administered intrathecally by continuous infusion such as with a catheter, or a pump, or intrathecally by a single bolus injection or by intermittent bolus injection. To be administered intrathecally, the pharmaceutical composition may be administered continuously or intermittently. The intermittent administration may be, for example, every thirty minutes, every hour, every several hours, every 24 hours, every couple of days (for example every 48 or 72 hours) or any combination thereof.

When the pharmaceutical formulation of the invention is administered continuously, implantable delivery devices, such as an implantable pump may be employed. Examples of such delivery devices include devices which can be implanted subcutaneously in the body or in the cranium, and provides an access port through which the pharmaceutical formulation may be delivered to the nerves or brain.

Intrathecal dosages of the present invention, when used for the indicated effects, will typically be less than 1 mg, such as less than 500 µg, for example less than 250 µg per kg of body weight when administered in a single dose or intermittently for adult humans. When administered continuously, the intrathecal dosages of the present invention will typically be less than 250 µg per kg body weight per hour, such as less than 125 µg per kg body weight per hour for adult humans.

In another suitable embodiment a compound according to formula (I) is administered by intranasal, inhalation (including fine particle dusts or mists which may be generated by means of various types of metered dose pressurized aerosols, nebulizers or insufflators) or insufflation administration. Such a method of administration allows for low doses of the compound of the invention to be administered, which can lead to a reduction in side-effects. For example, a daily dose of 10 to 0.01 µg, suitably 1 to 0.01 µg, and more suitably in the region of as low as 0.1 µg (100 ng) of compound of the invention may be used.

The formulations may conveniently be presented in unit dosage form and may be prepared by any of the methods well known in the art of pharmacy. All methods include the step of bringing the active ingredient into association with the carrier which constitutes one or more accessory ingredients. In general the formulations are prepared by uniformly and intimately bringing into association the active ingredient with liquid carriers or finely divided solid carriers or both and then, if necessary, shaping the product into the desired formulation.

Formulations of the present invention suitable for oral administration may be presented as discrete units such as capsules, cachets, pills or tablets each containing a predetermined amount of the active ingredient; as a powder or granules; as a solution or a suspension in an aqueous liquid or a non-aqueous liquid, for example as elixirs, tinctures, suspensions or syrups; or as an oil-in-water liquid emulsion or a water-in-oil liquid emulsion. The active ingredient may also be presented as a bolus, electuary or paste.

A tablet may be made by compression or moulding, optionally with one or more accessory ingredients. Compressed tablets may be prepared by compressing in a suitable machine the active ingredient in a free-flowing form such as a powder or granules, optionally mixed with a binder, lubricant, inert diluent, lubricating, surface active or dispersing agent. Moulded tablets may be made by moulding in a suitable machine a mixture of the powdered compound moistened with an inert liquid diluent. The tablets may optionally be coated or scored and may be formulated so as to provide slow or controlled release of the active ingredient therein. The compounds of formula (I) can, for example, be administered in a form suitable for immediate release or extended release. Immediate release or extended release can be achieved by the use of suitable pharmaceutical compositions comprising a compound of the present invention, or, particularly in the case of extended release, by the use of devices such as subcutaneous implants or osmotic pumps. The compounds of the invention may also be administered liposomally.

Exemplary compositions for oral administration include suspensions which can contain, for example, microcrystalline cellulose for imparting bulk, alginic acid or sodium alginate as a suspending agent, methylcellulose as a viscosity enhancer, and sweeteners or flavoring agents such as those known in the art; and immediate release tablets which can contain, for example, microcrystalline cellulose, dicalcium phosphate, starch, magnesium stearate, calcium sulfate, sorbitol, glucose and/or lactose and/or other excipients, binders, extenders, disintegrants, diluents and lubricants such as those known in the art. Suitable binders include starch, gelatin, natural sugars such as glucose or beta-lactose, corn sweeteners, natural and synthetic gums such as acacia, tragacanth or sodium alginate, carboxymethylcellulose, polyethylene glycol, waxes and the like. Disintegrators include without limitation starch, methylcellulose, agar, bentonite, xanthan gum and the like. The compounds of formula (I) can also be delivered through the oral cavity by sublingual and/or buccal administration. Molded tablets, compressed tablets or freeze-dried tablets are exemplary forms which may be used. Exemplary compositions include those formulating a compound of the present invention with fast dissolving diluents such as mannitol, lactose, sucrose and/or cyclodextrins. Also included in such formulations may be high molecular weight excipients such as celluloses (avicel) or polyethylene glycols (PEG). Such formulations can also include an excipient to aid mucosal adhesion such as hydroxy propyl cellulose (HPC), hydroxy propyl methyl cellulose (HPMC), sodium carboxy methyl cellulose (SCMC), maleic anhydride copolymer (e.g., Gantrez), and agents to control release such as polyacrylic copolymer (e.g. Carbopol 934). Lubricants, glidants, flavors, coloring agents and stabilizers may also be added for ease of fabrication and use. Lubricants used in these dosage forms include sodium oleate, sodium stearate, magnesium stearate, sodium benzoate, sodium acetate, sodium chloride and the like. For oral administration in liquid form, the oral drug components can be combined with any oral, non-toxic, pharmaceutically acceptable inert carrier such as ethanol, glycerol, water, and the like.

The compounds of formula (I) can also be administered in the form of liposome delivery systems, such as small unilamellar vesicles, large unilamellar vesicles and multilamellar vesicles. Liposomes can be formed from a variety of phospholipids, 1,2-dipalmitoylphosphatidylcholine, phosphatidyl ethanolamine (cephaline), or phosphatidylcholine (lecithin).

Formulations for parenteral administration include aqueous and non-aqueous sterile injection solutions which may contain anti-oxidants, buffers, bacteriostats and solutes which render the formulation isotonic with the blood of the intended recipient; and aqueous and non-aqueous sterile suspensions which may include suspending agents and thickening agents. The formulations may be presented in unit-dose or multi-dose containers, for example sealed ampoules and vials, and may be stored in a freeze-dried (lyophilised) condition requiring only the addition of the sterile liquid carrier, for example saline or water-for-injection, immediately prior to use. Extemporaneous injection solutions and suspensions may be prepared from sterile powders, granules and tablets of the kind previously described. Exemplary compositions for parenteral administration include injectable solutions or suspensions which can contain, for example, suitable non-toxic, parenterally acceptable diluents or solvents, such as mannitol, 1,3-butanediol, water, Ringer's solution, an isotonic sodium chloride solution, or other suitable dispersing or wetting and suspending agents, including synthetic mono- or diglycerides, and fatty acids, including oleic acid, or Cremaphor.

Exemplary compositions for intranasal, aerosol or inhalation administration include solutions in saline, which can contain, for example, benzyl alcohol or other suitable preservatives, absorption promoters to enhance bioavailability, and/or other solubilizing or dispersing agents such as those known in the art.

Formulations for rectal administration may be presented as a suppository with the usual carriers such as cocoa butter, synthetic glyceride esters or polyethylene glycol. Such carriers are typically solid at ordinary temperatures, but liquefy and/or dissolve in the rectal cavity to release the drug.

Formulations for topical administration in the mouth, for example buccally or sublingually, include lozenges comprising the active ingredient in a flavoured basis such as sucrose and acacia or tragacanth, and pastilles comprising the active ingredient in a basis such as gelatin and glycerine or sucrose and acacia. Exemplary compositions for topical administration include a topical carrier such as Plastibase (mineral oil gelled with polyethylene).

Suitable unit dosage formulations are those containing an effective dose, as hereinbefore recited, or an appropriate fraction thereof, of the active ingredient.

It should be understood that in addition to the ingredients particularly mentioned above, the formulations of this invention may include other agents conventional in the art having regard to the type of formulation in question, for example those suitable for oral administration may include flavouring agents.

The compounds of formula (I) are expected to display the advantageous property of inhibitory activity of mPTP as demonstrated in the assays of Biological Example 1 and Example 2 (preferably with a $pIC_{50}$ value of 6.0 and above in the rat liver assay and/or a $pIC_{50}$ value of 7.0 and above in the rat brain assay).

CLAUSES

The invention is further defined by the following clauses.
Clause 1. A compound according to formula (I):

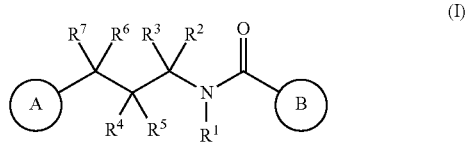

wherein:
$R^1$ is H or $C_{1-4}$alkyl;
$R^2$ is H, halo, $C_{1-4}$alkyl, $C_{1-4}$haloalkyl; $C_{1-4}$alkoxy, $C_{1-4}$haloalkoxy or $C_{0-4}$alkylene(OH);
$R^3$ is H, halo or $C_{1-4}$alkyl;
$R^4$ is H, halo or $C_{1-4}$alkyl;
$R^5$ is halo, $C_{1-6}$alkyl, $C_{1-6}$haloalkyl, $C_{1-6}$alkoxy, $C_{1-6}$haloalkoxy, $C_{2-6}$alkenyl, $C_{2-6}$haloalkenyl, $C_{0-6}$alkylene($C_{3-6}$cycloalkyl), $C_{0-6}$alkylene(OH); or $R^4$ and $R^5$ together with the atom to which they are attached form a $C_{5-11}$ spirocarbocyclyl, 4 to 7 membered heterocycle or $C_{3-6}$cycloalkyl wherein said spirocarbocyclyl, heterocycle or cycloalkyl may be optionally substituted by one or more groups selected from $C_{1-3}$alkyl, $C_{1-3}$haloalkyl and halo;
$R^6$ is H or $C_{1-4}$alkyl;
$R^7$ is H, halo, $C_{1-4}$alkyl, $C_{1-4}$haloalkyl, $C_{1-4}$alkoxy or $C_{1-4}$haloalkoxy;
A is a monocyclic or bicyclic aryl or a monocyclic or bicyclic heteroaryl, wherein said aryl or heteroaryl may be optionally substituted by one or more $A^1$;
  $A^1$ is independently selected from the group consisting of: $C_{1-3}$alkylthio, halo, $C_{1-6}$alkyl, $C_{1-6}$haloalkyl, $C_{1-6}$alkoxy, $C_{1-6}$haloalkoxy, $C_{3-6}$cycloalkyl, CN, OH, $NR^gR^h$, or $NHSO_2R^j$;
  $R^g$ is H or $C_{1-4}$alkyl;
  $R^h$ is H or $C_{1-4}$alkyl;
  $R^j$ is $C_{1-4}$alkyl;
or when A represents phenyl substituted by one or more $A^1$, $R^5$ together with a substituent $A^1$ in the ortho position are joined and together represent $(CH_2)_v$ wherein v represents 1, 2 or 3 and wherein one of the said $CH_2$ groups may optionally be replaced by 0;
B is a monocyclic or bicyclic heterocycle or a monocyclic or bicyclic heteroaryl, wherein said heterocycle or heteroaryl may be optionally substituted by one or more $B^1$;
$B^1$ is halo, $C_{1-6}$alkyl, $C_{1-6}$haloalkyl, $C_{1-6}$alkoxy, $C_{1-6}$haloalkoxy, oxo (=O), thiooxo (=S), or $C_{0-6}$alkylene(OH);
or a salt and/or solvate thereof,
and provided that formula (I) is not N-((1-benzylcyclobutyl)methyl)-6-hydroxypyrazine-2-carboxamide:

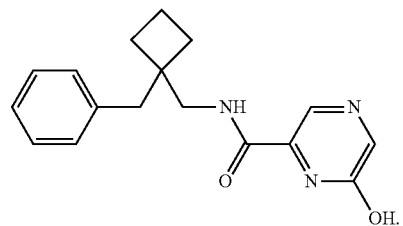 [SMILES: O=C(NCC1(Cc2ccccc2)CCC1)c1cncc(O)n1]

Clause 2. The compound of formula (IA) according to according to claim 1:

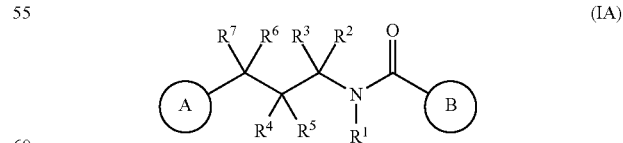

wherein:
$R^1$ is H or $C_{1-4}$alkyl;
$R^2$ is H, halo, $C_{1-4}$alkyl, $C_{1-4}$haloalkyl; $C_{1-4}$alkoxy, $C_{1-4}$haloalkoxy or $C_{0-4}$alkylene(OH);
$R^3$ is H, halo or $C_{1-4}$alkyl;
$R^4$ is H or $C_{1-4}$alkyl;

R⁵ is H, halo, $C_{1-6}$alkyl, $C_{1-6}$haloalkyl, $C_{1-6}$alkoxy, $C_{1-6}$haloalkoxy, $C_{2-6}$alkenyl, $C_{2-6}$haloalkenyl, $C_{0-6}$alkylene($C_{3-6}$cycloalkyl), $C_{0-6}$alkylene(OH); or R⁴ and R⁵ together with the atom to which they are attached form a $C_{3-6}$cycloalkyl wherein said cycloalkyl may be optionally substituted by one or more groups selected from $C_{1-6}$alkyl, $C_{1-3}$haloalkyl and halo;

R⁶ is H or $C_{1-4}$alkyl;

R⁷ is H, halo, $C_{1-4}$alkyl, $C_{1-4}$haloalkyl, $C_{1-4}$alkoxy or $C_{1-4}$haloalkoxy;

A is a monocyclic or bicyclic aryl or a monocyclic or bicyclic heteroaryl optionally substituted by one or more $A^1$;

$A^1$ is halo, $C_{1-6}$alkyl, $C_{1-6}$haloalkyl, $C_{1-6}$alkoxy, $C_{1-6}$haloalkoxy, $C_{3-6}$cycloalkyl, CN, OH, $NR^gR^h$, or $NHSO_2R^j$;
  $R^g$ is H or $C_{1-4}$alkyl;
  $R^h$ is H or $C_{1-4}$alkyl;
  $R^j$ is $C_{1-4}$alkyl;

or when A represents phenyl substituted by one or more $A^1$, R⁵ together with a substituent $A^1$ in the ortho position are joined and together represent $(CH_2)_v$ wherein v represents 1, 2 or 3 and wherein one of the said $CH_2$ groups may optionally be replaced by O;

B is a monocyclic or bicyclic heterocycle or a monocyclic or bicyclic heteroaryl which may be optionally substituted by one or more $B^1$;

$B^1$ is halo, $C_{1-6}$alkyl, $C_{1-6}$haloalkyl, $C_{1-6}$alkoxy, $C_{1-6}$haloalkoxy or $C_{0-6}$alkylene(OH);

or a salt and/or solvate thereof, and provided that formula (IA) is not N-((1-benzylcyclobutyl)methyl)-6-hydroxypyrazine-2-carboxamide:

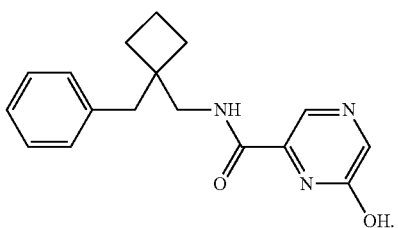 [SMILES: O=C(NCC1(Cc2ccccc2)CCC1)c1cncc(O)n1]

Clause 3. The compound, salt and/or solvate according to clause 1 or clause 2 which is the compound, pharmaceutically acceptable salt and/or solvate thereof.

Clause 4. The pharmaceutically acceptable salt and solvate according to clause 1 or clause 2.

Clause 5. The pharmaceutically acceptable salt according to clause 1 or clause 2.

Clause 6. The pharmaceutically acceptable solvate according to clause 1 or clause 2.

Clause 7. The compound according to clause 1 or clause 2.

Clause 8. The compound or salt and/or solvate thereof according to any one of clauses 1 to 7, which is a compound according to formula (IA):

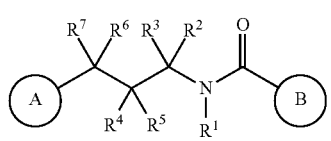

or a salt and/or solvate thereof.

Clause 9. The compound or salt and/or solvate thereof according to any one of clauses 1, 2 or 8, wherein R¹ is H.

Clause 10. The compound or salt and/or solvate thereof according to any one of clauses 1, 2 or 8, wherein R¹ is $C_{1-4}$alkyl, such as methyl.

Clause 11. The compound or salt and/or solvate thereof according to any one of clauses 1, 2 or 8 to 10, wherein R² is H.

Clause 12. The compound or salt and/or solvate thereof according to any one of clauses 1, 2 or 8 to 10, wherein R² is halo.

Clause 13. The compound or salt and/or solvate thereof according to any one of clauses 1, 2 or 8 to 10, wherein R² is $C_{1-4}$alkyl, such as methyl or ethyl.

Clause 14. The compound or salt and/or solvate thereof according to any one of clauses 1, 2 or 8 to 10, wherein R² is $C_{1-4}$haloalkyl, such as $CF_3$.

Clause 15. The compound or salt and/or solvate thereof according to any one of clauses 1, 2 or 8 to 10, wherein R² is $C_{1-4}$alkoxy.

Clause 16. The compound or salt and/or solvate thereof according to any one of clauses 1, 2 or 8 to 10, wherein R² is $C_{1-4}$haloalkoxy.

Clause 17. The compound or salt and/or solvate thereof according to any one of clauses 1, 2 or 8 to 10, wherein R² is $C_{0-4}$alkylene(OH), such as $CH_2CH_2OH$.

Clause 18. The compound or salt and/or solvate thereof according to any one of clauses 1, 2 or 8 to 15, wherein R³ is H.

Clause 19. The compound or salt and/or solvate thereof according to any one of clauses 1, 2 or 8 to 17, wherein R³ is halo.

Clause 20. The compound or salt and/or solvate thereof according to any one of clauses 1, 2 or 8 to 17, wherein R³ is $C_{1-4}$alkyl.

Clause 21. The compound or salt and/or solvate thereof according to any one of clauses 1, 2 or 8 to 10, wherein R² and R³ are each H.

Clause 22. The compound or salt and/or solvate thereof according to any one of clauses 1, 2 or 8 to 10, wherein R² is H and R³ is methyl.

Clause 23. The compound or salt and/or solvate thereof according to any one of clauses 1, 2 or 8 to 10, wherein R² is H and R³ is ethyl.

Clause 24. The compound or salt and/or solvate thereof according to any one of clauses 1, 2 or 8 to 23, wherein R⁴ is H.

Clause 25. The compound or salt and/or solvate thereof according to any one of clauses 1, 2 or 8 to 23, wherein R⁴ is $C_{1-4}$alkyl, such as methyl.

Clause 26. The compound or salt and/or solvate thereof according to any one of clauses 1, 2 or 8 to 23, wherein R⁴ is halo.

Clause 27. The compound or salt and/or solvate thereof according to any one of clauses 1, 2 or 8 to 26, wherein R⁵ is halo.

Clause 28. The compound, or salt and/or solvate thereof according to any one of clauses 1, 2 or 8 to 26, wherein R⁵ is $C_{1-6}$alkyl, such as methyl, ethyl, n-propyl or iso-propyl, especially ethyl.

Clause 29. The compound or salt and/or solvate thereof according to any one of clauses 1, 2 or 8 to 26, wherein R⁵ is $C_{1-6}$haloalkyl.

Clause 30. The compound or salt and/or solvate thereof according to any one of clauses 1, 2 or 8 to 26, wherein R⁵ is $C_{1-6}$alkoxy, such as OMe.

Clause 31. The compound or salt and/or solvate thereof according to any one of clauses 1, 2 or 8 to 26, wherein $R^5$ is $C_{1-6}$haloalkoxy.

Clause 32. The compound or salt and/or solvate thereof according to any one of clauses 1, 2 or 8 to 26, wherein $R^5$ is $C_{2-6}$alkenyl.

Clause 33. The compound or salt and/or solvate thereof according to any one of clauses 1, 2 or 8 to 26, wherein $R^5$ is $C_{2-6}$haloalkenyl.

Clause 34. The compound or salt and/or solvate thereof according to any one of clauses 1, 2 or 8 to 26, wherein $R^5$ is $C_{0-6}$alkylene($C_{3-6}$cycloalkyl), such as $C_{3-6}$cycloalkyl, for example cyclopropyl or cyclobutyl, especially cyclopropyl.

Clause 35. The compound or salt and/or solvate thereof according to any one of clauses 1, 2 or 8 to 26, wherein $R^5$ is $C_{3-6}$cycloalkyl.

Clause 36. The compound or salt and/or solvate thereof according to any one of clauses 1, 2 or 8 to 26, wherein $R^5$ is cyclobutyl.

Clause 37. The compound or salt and/or solvate thereof according to any one of clauses 1, 2 or 8 to 26, wherein $R^5$ is cyclopropyl.

Clause 38. The compound or salt and/or solvate thereof according to any one of clauses 1, 2 or 8 to 26, wherein $R^5$ is $C_{0-6}$alkylene(OH).

Clause 39. The compound or salt and/or solvate thereof according to clause 38, wherein $R^5$ is $CH_2OH$ or $CH(Me)(OH)$.

Clause 40. The compound or salt and/or solvate thereof according to any one of clauses 1, 2 or 8 to 23, wherein $R^4$ and $R^5$ are each methyl.

Clause 41. The compound or salt and/or solvate thereof according to any one of clauses 1, 2 or 8 to 23, wherein $R^4$ is H and $R^5$ is ethyl.

Clause 42. The compound or salt and/or solvate thereof according to any one of clauses 1, 2 or 8 to 21, wherein $R^4$ is H and $R^5$ is iso-propyl.

Clause 43. The compound or salt and/or solvate thereof according to any one of clauses 1, 2 or 8 to 23, wherein $R^4$ and $R^5$ together with the carbon atom to which they are attached form a $C_{5-11}$spirocarbocyclyl, 4 to 7 membered heterocycle or $C_{3-6}$cycloalkyl wherein said spirocarbocyclyl, heterocycle or cycloalkyl may be optionally substituted by one or more groups selected from $C_{1-3}$alkyl, $C_{1-3}$haloalkyl and halo.

Clause 44. The compound or salt and/or solvate thereof according to any one of clauses 1, 2 or 8 to 23, wherein $R^4$ and $R^5$ together with the carbon atom to which they are attached form an unsubstituted $C_{5-11}$spirocarbocyclyl, 4 to 7 membered heterocycle or $C_{3-6}$cycloalkyl.

Clause 45. The compound or salt and/or solvate thereof according to any one of clauses 1, 2 or 8 to 23, wherein $R^4$ and $R^5$ together with the atom to which they are attached form a $C_{3-6}$cycloalkyl.

Clause 46. The compound or salt and/or solvate thereof according to any one of clauses 1, 2 or 8 to 23, wherein $R^4$ and $R^5$ together with the atom to which they are attached form a 4-7 membered heterocycle.

Clause 47. The compound or salt and/or solvate thereof according to any one of clauses 1, 2 or 8 to 23, wherein $R^4$ and $R^5$ together with the atom to which they are attached form a $C_{5-11}$ spirocarbocyclyl.

Clause 48. The compound or salt and/or solvate thereof according to any one of clauses 1, 2 or 8 to 23, wherein $R^4$ and $R^5$ together with the atom to which they are attached form spiropentane.

Clause 49. The compound or salt and/or solvate thereof according to clause 45, where $R^4$ and $R^5$ with the atom to which they are attached form a cyclopropyl, cyclobutyl or cyclopentyl ring, especially a cyclobutyl ring.

Clause 50. The compound or salt and/or solvate thereof according to any one of clauses 1, 2 or 8 to 49, wherein $R^6$ is H.

Clause 51. The compound or salt and/or solvate thereof according to any one of clauses 1, 2 or 8 to 49, wherein $R^6$ is $C_{1-4}$alkyl, such as methyl.

Clause 52. The compound or salt and/or solvate thereof according to any one of clauses 1, 2 or 8 to 51, wherein $R^7$ is H.

Clause 53. The compound or salt and/or solvate thereof according to any one of clauses 1, 2 or 8 to 51, wherein $R^7$ is halo.

Clause 54. The compound or salt and/or solvate thereof according to any one of clauses 1, 2 or 8 to 51, wherein $R^7$ is $C_{1-4}$alkyl, such as methyl.

Clause 55. The compound or salt and/or solvate thereof according to any one of clauses 1, 2 or 8 to 51, wherein $R^7$ is $C_{1-4}$haloalkyl.

Clause 56. The compound or salt and/or solvate thereof according to any one of clauses 1, 2 or 8 to 51, wherein $R^7$ is $C_{1-4}$alkoxy, such as OMe.

Clause 57. The compound or salt and/or solvate thereof according to any one of clauses 1, 2 or 8 to 51, wherein $R^7$ is $C_{1-4}$haloalkoxy.

Clause 58. The compound or salt and/or solvate thereof according to any one of clauses 1, 2 or 8 to 49, wherein $R^6$ is H and $R^7$ is H.

Clause 59. The compound or salt and/or solvate thereof according to any one of clauses 1, 2 or 8 to 49, wherein $R^6$ is H and $R^7$ is methyl.

Clause 60. The compound or salt and/or solvate thereof according any one of clauses 1, 2 or 8 to 59, wherein at least one of $R^2$, $R^3$, $R^4$, $R^6$ or $R^7$ is not H.

Clause 61. The compound or salt and/or solvate thereof according to any one of clauses 1, 2 or 8 to 60, wherein A is a monocyclic aryl.

Clause 62. The compound or salt and/or solvate thereof according to clause 61, wherein A is phenyl.

Clause 63. The compound or salt and/or solvate thereof according to any one of clauses 1, 2 or 8 to 60, wherein A is a bicyclic aryl.

Clause 64. The compound or salt and/or solvate thereof according to any one of clauses 1, 2 or 8 to 60, wherein A is a monocyclic heteroaryl.

Clause 65. The compound or salt and/or solvate thereof according to any one of clauses 1, 2 or 8 to 60, wherein A is a bicyclic heteroaryl.

Clause 66. The compound or salt and/or solvate thereof according to any one of clauses 61 to 65, wherein A is substituted by one or more (such as one, two or three, for example one or two, particularly one) $A^1$.

Clause 67. The compound or salt and/or solvate thereof according to any one of clauses 61 to 65, wherein A is substituted by two $A^1$.

Clause 68. The compound or salt and/or solvate thereof according to any one of clauses 61 to 65, wherein A is substituted by one $A^1$.

Clause 69. The compound or salt and/or solvate thereof according to clause 66, wherein at least one $A^1$ is halo, such as F, Br or Cl, especially F.

Clause 70. The compound or salt and/or solvate thereof according to clause 66, wherein at least one $A^1$ is F, Br or Cl.

Clause 71. The compound or salt and/or solvate thereof according to clause 66, wherein at least one $A^1$ is F.

Clause 72. The compound or salt and/or solvate thereof according to any one of clauses 66 to 71, wherein at least one $A^1$ is $C_{1-6}$alkyl, such as methyl.

Clause 73. The compound or salt and/or solvate thereof according to any one of clauses 66 to 72, wherein at least one $A^1$ is $C_{1-6}$haloalkyl.

Clause 74. The compound or salt and/or solvate thereof according to any one of clauses 66 to 73, wherein at least one $A^1$ is $C_{1-6}$alkoxy, such as OMe.

Clause 75. The compound or salt and/or solvate thereof according to any one of clauses 66 to 74, wherein at least one $A^1$ is $C_{1-6}$haloalkoxy.

Clause 76. The compound or salt and/or solvate thereof according to any one of clauses 66 to 75, wherein at least one $A^1$ is $C_{3-6}$cycloalkyl.

Clause 77. The compound or salt and/or solvate thereof according to any one of clauses 66 to 76, wherein at least one $A^1$ is CN.

Clause 78. The compound or salt and/or solvate thereof according to any one of clauses 66 to 77, wherein at least one $A^1$ is OH.

Clause 79. The compound or salt and/or solvate thereof according to any one of clauses 66 to 78, at least one $A^1$ is $NR^gR^h$.

Clause 80. The compound or salt and/or solvate thereof according to clause 79, wherein $R^g$ is H.

Clause 81. The compound or salt and/or solvate thereof according to clause 79, wherein $R^g$ is $C_{1-4}$alkyl.

Clause 82. The compound or salt and/or solvate thereof according to any one of clauses 79 to 81, wherein $R^h$ is H.

Clause 83. The compound or salt and/or solvate thereof according to any one of clauses 79 to 81, wherein $R^h$ is $C_{1-4}$alkyl.

Clause 84. The compound or salt and/or solvate thereof according to any one of clauses 66 to 83, wherein at least one $A^1$ is $NHSO_2R^j$.

Clause 85. The compound or salt and/or solvate thereof according to any one of clauses 66 to 84, wherein at least one $A^1$ is $C_{1-3}$alkylthio.

Clause 86. The compound or salt and/or solvate thereof according to any one of clauses 61 to 55, wherein A is not substituted.

Clause 87. The compound or salt and/or solvate thereof according to clause 61 or 62, wherein A is selected from the group consisting of:

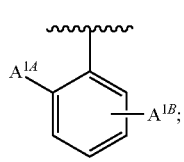

(A1)

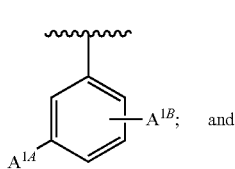

(A2) and

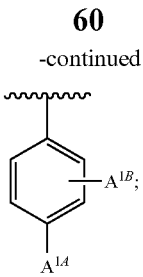

(A3)

wherein:
$A^{1A}$ is halo, such as F, Br or Cl; $C_{1-6}$alkyl, such as methyl; or $C_{1-6}$alkoxy, such as OMe; and
$A^{1B}$ is H or halo, such as F, Br or Cl, especially F.

Clause 88. The compound or salt and/or solvate thereof according to clause 61 or 62, wherein A is phenyl substituted by one or more $A^1$ and wherein $R^5$ together with a substituent $A^1$ in the ortho position are joined and together represent $(CH_2)_v$ wherein v represents 1, 2 or 3 and wherein one of the said $CH_2$ groups may optionally be replaced by 0.

Clause 89. The compound, or salt and/or solvate thereof according to clause 61 or 62, wherein A is phenyl substituted by one or more $A^1$ and wherein $R^5$ together with a substituent $A^1$ in the ortho position are joined and together represent $(CH_2)_v$ wherein v represents 1, 2 or 3.

Clause 90. The compound or salt and/or solvate thereof according to clause 88 or 89, wherein v is 1.

Clause 91. The compound or salt and/or solvate according to clause 88 or 89, wherein v is 2.

Clause 92. The compound or salt and/or solvate according to clause 88 or 89, wherein v is 3.

Clause 93. The compound or salt and/or solvate thereof according to any one of clauses 1, 2 or 8 to 92, wherein B is a monocyclic heterocycle.

Clause 94. The compound or salt and/or solvate thereof according to clause 93, wherein B is a 5-membered monocyclic heterocycle.

Clause 95. The compound or salt and/or solvate thereof according to clause 93, wherein B is a 6-membered monocyclic heterocycle.

Clause 96. The compound or salt and/or solvate thereof according to any one of clauses 1, 2 or 8 to 92, wherein B is a monocyclic heteroaryl.

Clause 97. The compound or salt and/or solvate thereof according to clause 96, wherein B is a 5-membered monocyclic heteroaryl.

Clause 98. The compound or salt and/or solvate thereof according to clause 96, wherein B is a 6-membered monocyclic heteroaryl.

Clause 99. The compound or salt and/or solvate thereof according to any one of clauses 1, 2 or 8 to 92, wherein B is a bicyclic heteroaryl.

Clause 100. The compound or salt and/or solvate thereof according to clause 99, wherein B is benzoxazolinone.

Clause 101. The compound or salt and/or solvate thereof according to any one of clauses 93 to 100, wherein B is substituted by one or more (such as one or two, especially one) $B^1$.

Clause 102. The compound or salt and/or solvate thereof according to any one of clauses 93 to 100, wherein B is substituted by one or two $B^1$.

Clause 103. The compound or salt and/or solvate thereof according to any one of clauses 93 to 100, wherein B is substituted by one $B^1$.

Clause 104. The compound or salt and/or solvate thereof according to any one of clauses 101 to 103, wherein at least one $B^1$ is halo.

Clause 105. The compound or salt and/or solvate thereof according to any one of clauses 101 to 104, wherein at least one $B^1$ is $C_{1-6}$alkyl, such as methyl.

Clause 106. The compound or salt and/or solvate thereof according to any one of clauses 101 to 105, wherein at least one $B^1$ is $C_{1-6}$haloalkyl.

Clause 107. The compound or salt and/or solvate thereof according to any one of clauses 101 to 106, wherein at least one $B^1$ is $C_{1-6}$alkoxy.

Clause 108. The compound or salt and/or solvate thereof according to any one of clauses 101 to 90, wherein at least one $B^1$ is $C_{1-6}$haloalkoxy.

Clause 109. The compound or salt and/or solvate thereof according to any one of clauses 101 to 107, wherein at least one $B^1$ is $C_{0-6}$alkylene(OH), such as OH.

Clause 110. The compound or salt and/or solvate thereof according to any one of clauses 101 to 108, wherein at least one $B^1$ is oxo (=O).

Clause 111. The compound or salt and/or solvate thereof according to any one of clauses 101 to 109, wherein at least one $B^1$ is thiooxo (=S), Clause 112. The compound or salt and/or solvate thereof according to any one of clauses 92 to 100, wherein B is not substituted.

Clause 113. The compound or salt and/or solvate thereof according to any one of clauses 93 to 111, wherein B is selected from the group consisting of:

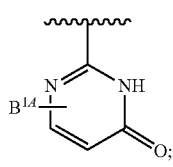
(B1)

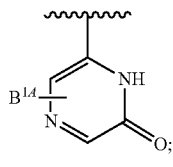
(B2)

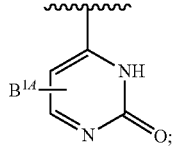
(B3)

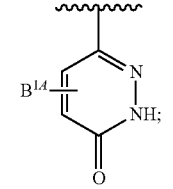
(B4)

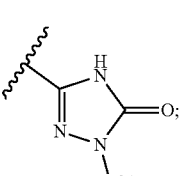
(B5)

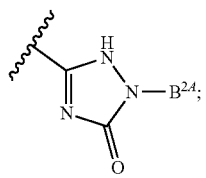
(B6)

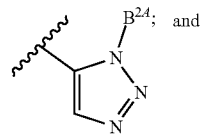
(B7)

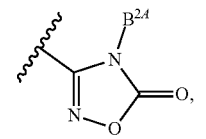
(B8)

such as

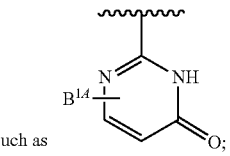
(B1)

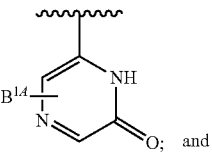
(B2)

and

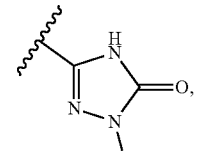
(B5)

wherein:
$B^{1A}$ is H or $C_{1-6}$alkyl, such as methyl; and
$B^{2A}$ is H or $C_{1-6}$alkyl, such as methyl.

Clause 114. The compound or salt and/or solvate thereof according to any one of clauses 93 to 111, wherein B is selected from the group consisting of:

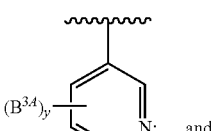
(B9)

and

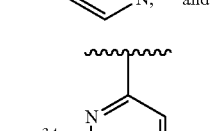
(B10)

wherein:
each $B^{3A}$ is independently selected from $C_{1-6}$alkyl, such as methyl; and $C_{0-6}$alkylene(OH), such as OH; and
y is 1 or 2.

Clause 115. The compound or salt and/or solvate thereof according to any one of clauses 93 to 111, wherein B is

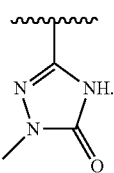

Clause 116. The compound or salt and/or solvate thereof according to clause 1 or clause 2, which is a compound of formula (IA'):

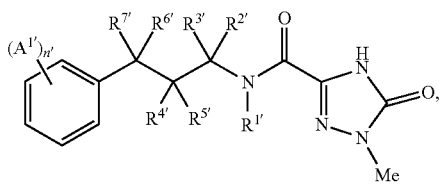

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is H, $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy;
n' is 0, 1 or 2; and
$A^{1'}$ is halo or $C_{1-6}$alkyl,
or a salt and/or solvate thereof.

Clause 117. The compound or salt and/or solvate thereof according to clause 1 or clause 2, which is a compound of formula (IA'):

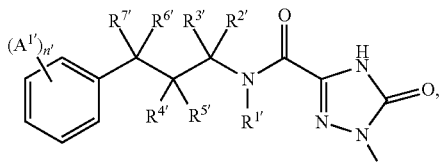

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy;
n' is 0, 1 or 2; and
$A^{1'}$ is halo or $C_{1-6}$alkyl,
or a salt and/or solvate thereof.

Clause 118. The compound or salt and/or solvate thereof according to clause 1 or clause 2, which is a compound of formula (IA''):

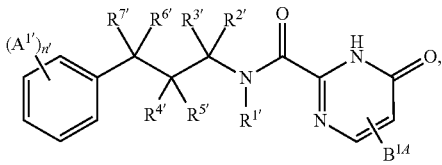

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is H, $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy;
$B^{4.1}$ is H or $C_{1-6}$alkyl, such as methyl;
n' is 0, 1 or 2; and
$A^{1'}$ is halo or $C_{1-6}$alkyl,
or a salt and/or solvate thereof.

Clause 119. The compound or salt and/or solvate thereof according to clause 1 or clause 2, which is a compound of formula (IA''):

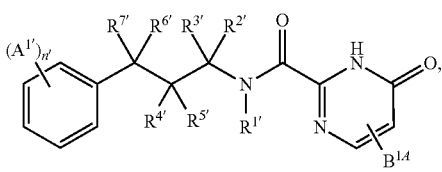

wherein:
$R^{1'}$ is H;
$R^{2'}$ is H;
$R^{3'}$ is H or $C_{1-4}$alkyl;
$R^{4'}$ is H or $C_{1-4}$alkyl;
$R^{5'}$ is $C_{1-4}$alkyl or $C_{3-6}$cycloalkyl; or $R^{4'}$ and $R^{5'}$ together with the atom to which they are attached form a $C_{3-6}$cycloalkyl;
$R^{6'}$ is H;
$R^{7'}$ is H, $C_{1-6}$alkyl or $C_{1-6}$alkoxy;
$B^{1.4}$ is H or $C_{1-6}$alkyl, such as methyl;
n' is 0, 1 or 2; and
$A^{1'}$ is halo or $C_{1-6}$alkyl,
or a salt and/or solvate thereof.

Clause 120. The compound or salt and/or solvate thereof according to clause 1 or clause 2, which is a compound of formula (IA'''):

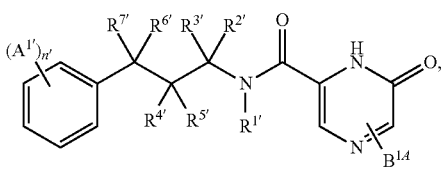

wherein:
R$^{1'}$ is H;
R$^{2'}$ is H;
R$^{3'}$ is H or C$_{1-4}$alkyl;
R$^{4'}$ is H or C$_{1-4}$alkyl;
R$^{5'}$ is H, C$_{1-4}$alkyl or C$_{3-6}$cycloalkyl; or R$^{4'}$ and R$^{5'}$ together with the atom to which they are attached form a C$_{3-6}$cycloalkyl;
R$^{6'}$ is H;
R$^{7'}$ is H, C$_{1-6}$alkyl or C$_{1-6}$alkoxy;
B$^{1A}$ is H or C$_{1-6}$alkyl, such as methyl;
n' is 0, 1 or 2; and
A$^{1'}$ is halo or C$_{1-6}$alkyl,
or a salt and/or solvate thereof.

Clause 121. The compound or salt and/or solvate thereof according to clause 1 or clause 2, which is a compound of formula (IA'''):

<chemical structure> wherein:
R$^{1'}$ is H;
R$^{2'}$ is H;
R$^{3'}$ is H or C$_{1-4}$alkyl;
R$^{4'}$ is H or C$_{1-4}$alkyl;
R$^{5'}$ is C$_{1-4}$alkyl or C$_{3-6}$cycloalkyl; or R$^{4'}$ and R$^{5'}$ together with the atom to which they are attached form a C$_{3-6}$cycloalkyl;
R$^{6'}$ is H;
R$^{7'}$ is H, C$_{1-6}$alkyl or C$_{1-6}$alkoxy;
B$^{1A}$ is H or C$_{1-6}$alkyl, such as methyl;
n' is 0, 1 or 2; and
A$^{1'}$ is halo or C$_{1-6}$alkyl,
or a salt and/or solvate thereof.

Clause 122. The compound or salt and/or solvate thereof according to any one of clauses 116 to 121, wherein R$^{3'}$ is H.

Clause 123. The compound or salt and/or solvate thereof according to any one of clauses 116 to 122, wherein R$^{4'}$ is H.

Clause 124. The compound or salt and/or solvate thereof according to any one of clauses 116 to 123, wherein R$^{5'}$ is C$_{1-4}$alkyl, such as methyl, ethyl or iso-propyl.

Clause 125 The compound or salt and/or solvate thereof according to any one of clauses 116 to 124, wherein R$^{5'}$ is C$_{3-6}$cycloalkyl, such as cyclopropyl.

Clause 126. The compound or salt and/or solvate thereof according to any one of clauses 116 to 121, wherein R$^{4'}$ and R$^{5'}$ together with the atom to which they are attached form a C$_{3-6}$cycloalkyl, such as cyclobutyl.

Clause 127. The compound or, salt and/or solvate thereof according to any one of clauses 116 to 126, wherein R$^{7'}$ is H.

Clause 128. The compound or salt and/or solvate thereof according to any one of clauses 116 to 126, wherein R$^{7'}$ is C$_{1-6}$alkyl, such as methyl.

Clause 129. The compound or salt and/or solvate thereof according to any one of clauses 116 to 126, wherein R$^{7'}$ is C$_{1-6}$alkoxy, such as OMe.

Clause 130. The compound or salt and/or solvate thereof according to any one of clauses 116 to 129, wherein B$^{1A}$ is H.

Clause 131. The compound or salt and/or solvate thereof according to any one of clauses 116 to 129, wherein B$^{1A}$ is C$_{1-6}$alkyl, such as methyl.

Clause 132. The compound or salt and/or solvate thereof according to any one of clauses 116 to 131, wherein n' is 2.

Clause 133. The compound or salt and/or solvate thereof according to any one of clauses 116 to 132, wherein at least one A$^1$ is halo, such as F, Br or Cl.

Clause 134. The compound or salt and/or solvate thereof according to any one of clauses 116 to 133, wherein n' is 0.

Clause 135. The compound or salt and/or solvate thereof according to any one of clauses 1, 2 or clauses 8 to 134, wherein R$^4$ and R$^5$ have the following stereochemistry:

<chemical structure>

Clause 136. The compound or salt and/or solvate thereof according to clause 1 or clause 2, selected from the group consisting of:
N-((1-benzylcyclobutyl)methyl)-5-hydroxynicotinamide;
N-((1-benzylcyclobutyl)methyl)-5-hydroxy-6-methylnicotinamide;
N-((1-benzylcyclobutyl)methyl)-5-hydroxy-4-methylnicotinamide;
N-((1-benzylcyclobutyl)methyl)-1H-1,2,3-triazole-5-carboxamide;
N-((1-benzylcyclobutyl)methyl)-2-oxo-2,3-dihydropyrimidine-4-carboxamide;
N-((1-benzylcyclobutyl)methyl)-6-oxo-1,6-dihydropyrimidine-2-carboxamide;
N-((1-benzylcyclobutyl)methyl)-5-oxo-2,5-dihydro-1H-1,2,4-triazole-3-carboxamide;
N-((1-benzylcyclobutyl)methyl)-5-methyl-6-oxo-1,6-dihydropyrimidine-2-carboxamide;
N-((1-benzylcyclobutyl)methyl)-1-methyl-5-oxo-4,5-dihydro-1H-1,2,4-triazole-3-carboxamide;
N-((1-benzylcyclobutyl)methyl)-6-hydroxy-N-methylpyrazine-2-carboxamide;
N-(2,2-dimethyl-3-phenylpropyl)-6-hydroxypyrazine-2-carboxamide;
N-((1-(2-fluorobenzyl)cyclobutyl)methyl)-6-hydroxypyrazine-2-carboxamide;
N-((1-benzylcyclobutyl)methyl)-1-ethyl-5-oxo-4,5-dihydro-1H-1,2,4-triazole-3-carboxamide;
N-((1-(2,6-difluorobenzyl)cyclobutyl)methyl)-6-oxo-1,6-dihydropyrazine-2-carboxamide;
N-((1-(2,4-difluorobenzyl)cyclobutyl)methyl)-6-oxo-1,6-dihydropyrazine-2-carboxamide;
N-((1-(2,3-difluorobenzyl)cyclobutyl)methyl)-6-oxo-1,6-dihydropyrazine-2-carboxamide;
N-((1-benzylcyclopentyl)methyl)-6-oxo-1,6-dihydropyrazine-2-carboxamide;
N-((1-(2-methylbenzyl)cyclobutyl)methyl)-6-oxo-1,6-dihydropyrazine-2-carboxamide;
N-((1-(2-fluorobenzyl)cyclobutyl)methyl)-1-methyl-5-oxo-4,5-dihydro-1H-1,2,4-triazole-3-carboxamide;
N-((1-(2,6-difluorobenzyl)cyclobutyl)methyl)-1-methyl-5-oxo-4,5-dihydro-1H-1,2,4-triazole-3-carboxamide;

N-((1-(2,4-difluorobenzyl)cyclobutyl)methyl)-1-methyl-5-oxo-4,5-dihydro-1H-1,2,4-triazole-3-carboxamide;
N-(1-(1-benzylcyclobutyl)ethyl)-1-methyl-5-oxo-4,5-dihydro-1H-1,2,4-triazole-3 carboxamide;
(S)—N-(1-(1-benzylcyclobutyl)ethyl)-1-methyl-5-oxo-4,5-dihydro-1H-1,2,4-triazole-3-carboxamide;
(R)—N-(1-(1-benzylcyclobutyl)ethyl)-1-methyl-5-oxo-4,5-dihydro-1H-1,2,4-triazole-3-carboxamide;
1-methyl-5-oxo-N-((1-(1-phenylethyl)cyclobutyl)methyl)-4,5-dihydro-1H-1,2,4-triazole-3-carboxamide;
1-methyl-5-oxo-N-((1-(1-phenylethyl)cyclobutyl)methyl)-4,5-dihydro-1H-1,2,4-triazole-3-carboxamide;
(S)-1-methyl-5-oxo-N-((1-(1-phenylethyl)cyclobutyl)methyl)-4,5-dihydro-1H-1,2,4-triazole-3-carboxamide;
(R)-1-methyl-5-oxo-N-((1-(1-phenylethyl)cyclobutyl)methyl)-4,5-dihydro-1H-1,2,4-triazole-3-carboxamide;
N-((1-(methoxy(phenyl)methyl)cyclobutyl)methyl)-1-methyl-5-oxo-4,5-dihydro-1H-1,2,4-triazole-3-carboxamide;
1-methyl-N-((1-(2-methylbenzyl)cyclobutyl)methyl)-5-oxo-4,5-dihydro-1H-1,2,4-triazole-3-carboxamide;
N-((1-(2-chlorobenzyl)cyclobutyl)methyl)-1-methyl-5-oxo-4,5-dihydro-1H-1,2,4-triazole-3-carboxamide;
N-(2,2-dimethyl-3-phenylpropyl)-1-methyl-5-oxo-4,5-dihydro-1H-1,2,4-triazole-3-carboxamide;
1-methyl-N-(2-methyl-3-phenylpropyl)-5-oxo-4,5-dihydro-1H-1,2,4-triazole-3-carboxamide;
N-((1-benzylcyclopropyl)methyl)-1-methyl-5-oxo-4,5-dihydro-1H-1,2,4-triazole-3-carboxamide;
N-(2,2-dimethyl-1-phenylpentan-3-yl)-1-methyl-5-oxo-4,5-dihydro-1H-1,2,4-triazole-3-carboxamide;
1-methyl-5-oxo-N-(1,1,1-trifluoro-3,3-dimethyl-4-phenylbutan-2-yl)-4,5-dihydro-1H-1,2,4-triazole-3-carboxamide;
N-(3-(2-bromophenyl)-2,2-dimethylpropyl)-1-methyl-5-oxo-4,5-dihydro-1H-1,2,4-triazole-3-carboxamide;
N-((1-(2-bromobenzyl)cyclobutyl)methyl)-1-methyl-5-oxo-4,5-dihydro-1H-1,2,4-triazole-3-carboxamide;
N-(3,3-dimethyl-4-phenylbutan-2-yl)-1-methyl-5-oxo-4,5-dihydro-1H-1,2,4-triazole-3-carboxamide;
(S)—N-(3,3-dimethyl-4-phenylbutan-2-yl)-1-methyl-5-oxo-4,5-dihydro-1H-1,2,4-triazole-3-carboxamide;
(R)—N-(3,3-dimethyl-4-phenylbutan-2-yl)-1-methyl-5-oxo-4,5-dihydro-1H-1,2,4-triazole-3-carboxamide;
N-(2-benzylbutyl)-1-methyl-5-oxo-4,5-dihydro-1H-1,2,4-triazole-3-carboxamide;
N-(2-benzyl-3-hydroxy-2-methylpropyl)-1-methyl-5-oxo-4,5-dihydro-1H-1,2,4-triazole-3-carboxamide;
N-(2-benzyl-3-hydroxy-2-methylbutyl)-1-methyl-5-oxo-4,5-dihydro-1H-1,2,4-triazole-3-carboxamide;
N-(2-methoxy-3-phenylpropyl)-1-methyl-5-oxo-4,5-dihydro-1H-1,2,4-triazole-3-carboxamide;
N-(2-benzyl-2-methylbutyl)-1-methyl-5-oxo-4,5-dihydro-1H-1,2,4-triazole-3-carboxamide;
N-(2-benzyl-3-methylbutyl)-1-methyl-5-oxo-4,5-dihydro-1H-1,2,4-triazole-3-carboxamide;
N-[(2S)-2-benzyl-3-methylbutyl]-1-methyl-5-oxo-4H-1,2,4-triazole-3-carboxamide;
N-[(2R)-2-benzyl-3-methylbutyl]-1-methyl-5-oxo-4H-1,2,4-triazole-3-carboxamide;
N-((1-benzylcyclohexyl)methyl)-6-oxo-1,6-dihydropyrazine-2-carboxamide;
N-((1-benzyl-3,3-difluorocyclobutyl)methyl)-6-oxo-1,6-dihydropyrazine-2-carboxamide;
N-((1-(3-fluorobenzyl)cyclobutyl)methyl)-6-hydroxypyrazine-2-carboxamide;
N-((1-(4-fluorobenzyl)cyclobutyl)methyl)-6-hydroxypyrazine-2-carboxamide;
N-(2-cyclobutyl-3-phenylpropyl)-1-methyl-5-oxo-4,5-dihydro-1H-1,2,4-triazole-3-carboxamide;
N-((1-(1-(2,4-difluorophenyl)ethyl)cyclobutyl)methyl)-1-methyl-5-oxo-4,5-dihydro-1H-1,2,4-triazole-3-carboxamide;
N-(2-cyclopropyl-3-phenylpropyl)-1-methyl-5-oxo-4,5-dihydro-1H-1,2,4-triazole-3-carboxamide;
(R)—N-(2-benzylbutyl)-1-methyl-5-oxo-4,5-dihydro-1H-1,2,4-triazole-3-carboxamide;
(S)—N-(2-benzylbutyl)-1-methyl-5-oxo-4,5-dihydro-1H-1,2,4-triazole-3-carboxamide;
N-(2-benzylpentyl)-1-methyl-5-oxo-4,5-dihydro-1H-1,2,4-triazole-3-carboxamide;
N-(2,2-dimethyl-3-phenylpropyl)-6-oxo-1,6-dihydropyridazine-3-carboxamide;
N-(2,2-dimethyl-3-phenylpropyl)-2-oxo-2,3-dihydrobenzo[d]oxazole-5-carboxamide;
1-methyl-N-((2-methyl-2,3-dihydro-1H-inden-2-yl)methyl)-5-oxo-4,5-dihydro-1H-1,2,4-triazole-3-carboxamide;
1-methyl-N-(3-methyl-3-phenylbutyl)-5-oxo-4,5-dihydro-1H-1,2,4-triazole-3-carboxamide;
1-methyl-5-oxo-N-((1,2,3,4-tetrahydronaphthalen-2-yl)methyl)-4,5-dihydro-1H-1,2,4-triazole-3-carboxamide;
N-((1-(2-methoxybenzyl)cyclobutyl)methyl)-1-methyl-5-oxo-4,5-dihydro-1H-1,2,4-triazole-3-carboxamide;
6-oxo-N-((1-(pyridin-2-ylmethyl)cyclobutyl)methyl)-1,6-dihydropyrazine-2-carboxamide;
N-((1-benzylcyclobutyl)methyl)-1-methyl-2-oxo-2,3-dihydro-1H-imidazole-4-carboxamide;
N-(2-benzyl-3-hydroxypropyl)-1-methyl-5-oxo-4,5-dihydro-1H-1,2,4-triazole-3-carboxamide;
N-(2,2-dimethyl-3-phenylpropyl)-N,1-dimethyl-5-oxo-4,5-dihydro-1H-1,2,4-triazole-3-carboxamide;
N-((1-(2,4-Difluorobenzyl)cyclohexyl)methyl)-1-methyl-5-oxo-4,5-dihydro-1H-1,2,4-triazole-3-carboxamide;
N-((2S,3S)-3-Benzylpentan-2-yl)-1-methyl-5-oxo-4,5-dihydro-1H-1,2,4-triazole-3-carboxamide;
N-((1-(3-Methoxybenzyl)cyclobutyl)methyl)-1-methyl-5-oxo-4,5-dihydro-1H-1,2,4-triazole-3-carboxamide;
N-((1-(2-(Difluoromethyl)benzyl)cyclobutyl)methyl)-1-methyl-5-oxo-4,5-dihydro-1H-1,2,4-triazole-3-carboxamide;
N-((1-(3-Cyclopropylbenzyl)cyclobutyl)methyl)-1-methyl-5-oxo-4,5-dihydro-1H-1,2,4-triazole-3-carboxamide;
N-(2-Cyclopropyl-3-(3-fluorophenyl)propyl)-1-methyl-5-oxo-4,5-dihydro-1H-1,2,4-triazole-3-carboxamide;
N-((1-(3-Chlorobenzyl)cyclobutyl)methyl)-1-methyl-5-oxo-4,5-dihydro-1H-1,2,4-triazole-3-carboxamide;
1-Methyl-5-oxo-N-(2-(thiophen-2-ylmethyl)butyl)-4,5-dihydro-1H-1,2,4-triazole-3-carboxamide;
N-((1-(2,5-Difluorobenzyl)cyclobutyl)methyl)-1-methyl-5-oxo-4,5-dihydro-1H-1,2,4-triazole-3-carboxamide;
N-((1-(2-Ethylbenzyl)cyclobutyl)methyl)-1-methyl-5-oxo-4,5-dihydro-1H-1,2,4-triazole-3-carboxamide;
N-((1-(2-Fluoro-5-methylbenzyl)cyclobutyl)methyl)-1-methyl-5-oxo-4,5-dihydro-1H-1,2,4-triazole-3-carboxamide;
N-((1-(3-Fluorobenzyl)cyclobutyl)methyl)-1-methyl-5-oxo-4,5-dihydro-1H-1,2,4-triazole-3-carboxamide;
N-((1-(3-Chloro-2-fluorobenzyl)cyclobutyl)methyl)-1-methyl-5-oxo-4,5-dihydro-1H-1,2,4-triazole-3-carboxamide;

N-((1-(4-Fluoro-2-methylbenzyl)cyclobutyl)methyl)-1-methyl-5-oxo-4,5-dihydro-1H-1,2,4-triazole-3-carboxamide;
N-((1-(4-Fluoro-2-(trifluoromethyl)benzyl)cyclobutyl)methyl)-1-methyl-5-oxo-4,5-dihydro-1H-1,2,4-triazole-3-carboxamide;
N-((1-Benzylcyclobutyl)methyl)-5-oxo-4,5-dihydro-1,2,4-oxadiazole-3-carboxamide;
1-Methyl-N-((1-(3-methylbenzyl)cyclobutyl)methyl)-5-oxo-4,5-dihydro-1H-1,2,4-triazole-3-carboxamide;
N-((1-(4-Chloro-2-fluorobenzyl)cyclobutyl)methyl)-1-methyl-5-oxo-4,5-dihydro-1H-1,2,4-triazole-3-carboxamide;
N-((1-(4-Chloro-2-methylbenzyl)cyclobutyl)methyl)-1-methyl-5-oxo-4,5-dihydro-1H-1,2,4-triazole-3-carboxamide;
N-((1-(2,4-Difluorobenzyl)cyclopentyl)methyl)-1-methyl-5-oxo-4,5-dihydro-1H-1,2,4-triazole-3-carboxamide;
N-(2-Cyclopropyl-3-(2,4-difluorophenyl)propyl)-1-methyl-5-oxo-4,5-dihydro-1H-1,2,4-triazole-3-carboxamide;
N-((1-(2-Fluoro-3-methylbenzyl)cyclobutyl)methyl)-1-methyl-5-oxo-4,5-dihydro-1H-1,2,4-triazole-3-carboxamide;
N-((1-(2,3-Difluorobenzyl)cyclobutyl)methyl)-1-methyl-5-oxo-4,5-dihydro-1H-1,2,4-triazole-3-carboxamide;
(R)—N-(2-Cyclopropyl-3-(2,4-difluorophenyl)propyl)-1-methyl-5-oxo-4,5-dihydro-1H-1,2,4-triazole-3-carboxamide;
(S)—N-(2-cyclopropyl-3-(2,4-difluorophenyl)propyl)-1-methyl-5-oxo-4,5-dihydro-1H-1,2,4-triazole-3-carboxamide;
(S)—N-(2-(2,4-Difluorobenzyl)butyl)-1-methyl-5-oxo-4,5-dihydro-1H-1,2,4-triazole-3-carboxamide;
N-((1-(3-Bromobenzyl)cyclobutyl)methyl)-1-methyl-5-oxo-4,5-dihydro-1H-1,2,4-triazole-3-carboxamide;
N-((1-(3-Cyanobenzyl)cyclobutyl)methyl)-1-methyl-5-oxo-4,5-dihydro-1H-1,2,4-triazole-3-carboxamide;
N-((1-(3,5-difluorobenzyl)cyclobutyl)methyl)-1-methyl-5-oxo-4,5-dihydro-1H-1,2,4-triazole-3-carboxamide;
(R)—N-(2-cyclopropyl-3-(2,4,6-trifluorophenyl)propyl)-1-methyl-5-oxo-4,5-dihydro-1H-1,2,4-triazole-3-carboxamide;
(R)—N-(2-cyclopropyl-3-(3,4-difluorophenyl)propyl)-1-methyl-5-thioxo-4,5-dihydro-1H-1,2,4-triazole-3-carboxamide;
N-((1-(2,4-difluorobenzyl)cyclobutyl)methyl)-1-methyl-5-thioxo-4,5-dihydro-1H-1,2,4-triazole-3-carboxamide;
N-((2-(2,4-difluorobenzyl)tetrahydrofuran-2-yl)methyl)-1-methyl-5-oxo-4,5-dihydro-1H-1,2,4-triazole-3-carboxamide;
N-((4-(2,4-difluorobenzyl)tetrahydro-2H-pyran-4-yl)methyl)-1-methyl-5-oxo-4,5-dihydro-1H-1,2,4-triazole-3-carboxamide;
N-((1-(2,4-difluorobenzyl)spiro[2.2]pentan-1-yl)methyl)-6-oxo-1,6-dihydropyrazine-2-carboxamide;
N-((1-(2,4-difluorobenzyl)spiro[2.2]pentan-1-yl)methyl)-1-methyl-5-oxo-4,5-dihydro-1H-1,2,4-triazole-3-carboxamide;
(R)—N-(2-cyclopropyl-3-phenylpropyl)-1-methyl-5-oxo-4,5-dihydro-1H-1,2,4-triazole-3-carboxamide;
(S)-1-methyl-5-oxo-N-(2-(2,4,6-trifluorobenzyl)butyl)-4,5-dihydro-1H-1,2,4-triazole-3-carboxamide;
N-((1-(2,4-difluorobenzyl)cyclobutyl)methyl)-4-hydroxypicolinamide;
N-(2-(2,4-difluorobenzyl)-2-fluorobutyl)-1-methyl-5-oxo-4,5-dihydro-1H-1,2,4-triazole-3-carboxamide;
N-((1-(2,4-difluorobenzyl)cyclobutyl)methyl)-5-hydroxy-1-methyl-1H-pyrazole-3-carboxamide (R)—N-(2-cyclopropyl-3-(4-fluoro-2-methylphenyl)propyl)-1-methyl-5-oxo-4,5-dihydro-1H-1,2,4-triazole-3-carboxamide;
N-((1-(2,4-difluorobenzyl)cyclobutyl)methyl)-5-oxo-4,5-dihydropyrazine-2-carboxamide
N-((1-(3,4-difluorobenzyl)cyclobutyl)methyl)-6-oxo-1,6-dihydropyrimidine-2-carboxamide
N-((2R,3S)-3-benzylpentan-2-yl)-1-methyl-5-oxo-4,5-dihydro-1H-1,2,4-triazole-3-carboxamide;
N-((2S,3S)-3-benzylpentan-2-yl)-1-methyl-5-oxo-4,5-dihydro-1H-1,2,4-triazole-3-carboxamide;
(R)—N-(2-cyclopropyl-3-(2,4-difluorophenyl)propyl)-3-oxo-2,3-dihydroisoxazole-5-carboxamide;
(R)—N-(2-cyclopropyl-3-(2,4-difluorophenyl)propyl)-2-oxo-2,3-dihydrooxazole-4-carboxamide;
N-((1-(3,4-difluorobenzyl)cyclobutyl)methyl)-6-oxo-1,6-dihydropyrazine-2-carboxamide;
N-((2S,3S)-3-(2,4-difluorobenzyl)pentan-2-yl)-1-methyl-5-oxo-4,5-dihydro-1H-1,2,4-triazole-3-carboxamide;
N-((2R,3S)-3-(2,4-difluorobenzyl)pentan-2-yl)-1-methyl-5-oxo-4,5-dihydro-1H-1,2,4-triazole-3-carboxamide;
N-((1-(3,4-difluorobenzyl)cyclobutyl)methyl)-1-methyl-5-oxo-4,5-dihydro-1H-1,2,4-triazole-3-carboxamide;
(R)—N-(2-cyclopropyl-3-(3,4-difluorophenyl)propyl)-6-oxo-1,6-dihydropyrimidine-2-carboxamide;
N-((1-(2,5-difluorobenzyl)cyclobutyl)methyl)-6-oxo-1,6-dihydropyrimidine-2-carboxamide;
6-oxo-N-((1-(2,4,5-trifluorobenzyl)cyclobutyl)methyl)-1,6-dihydropyrazine-2-carboxamide;
(R)—N-(2-cyclopropyl-3-(2,4-difluorophenyl)propyl)-6-oxo-1,6-dihydropyrimidine-2-carboxamide;
(R)—N-(2-cyclopropyl-3-(3,4-difluorophenyl)propyl)-1-methyl-5-oxo-4,5-dihydro-1H-1,2,4-triazole-3-carboxamide;
(R)—N-(2-cyclopropyl-3-(3,4-difluorophenyl)propyl)-6-oxo-1,6-dihydropyrazine-2-carboxamide;
N-((1-(2,4-difluorobenzyl)cyclopentyl)methyl)-6-oxo-1,6-dihydropyrazine-2-carboxamide;
(R)—N-(2-cyclopropyl-3-(2,5-difluorophenyl)propyl)-6-oxo-1,6-dihydropyrimidine-2-carboxamide;
(R)—N-(2-cyclopropyl-3-(2,4-difluorophenyl)propyl)-6-oxo-1,6-dihydropyrazine-2-carboxamide;
(R)—N-(2-cyclopropyl-3-(2,5-difluorophenyl)propyl)-6-oxo-1,6-dihydropyridazine-3-carboxamide;
1-methyl-5-oxo-N-((1-(2,3,4-trifluorobenzyl)cyclobutyl)methyl)-4,5-dihydro-1H-1,2,4-triazole-3-carboxamide;
1-methyl-5-oxo-N-((1-(2,4,5-trifluorobenzyl)cyclobutyl)methyl)-4,5-dihydro-1H-1,2,4-triazole-3-carboxamide;
(R)—N-(2-cyclopropyl-3-(2,5-difluorophenyl)propyl)-6-oxo-1,6-dihydropyrazine-2-carboxamide;
(R)—N-(2-cyclopropyl-3-(2,5-difluorophenyl)propyl)-1-methyl-5-oxo-4,5-dihydro-1H-1,2,4-triazole-3-carboxamide;
N-((1-(2,4-difluorobenzyl)cyclobutyl)methyl)-6-oxo-1,6-dihydropyrimidine-2-carboxamide;
N-((1-(3-ethylbenzyl)cyclobutyl)methyl)-1-methyl-5-oxo-4,5-dihydro-1H-1,2,4-triazole-3-carboxamide;
(S)—N-(2-(2,4-difluorobenzyl)butyl)-6-oxo-1,6-dihydropyrazine-2-carboxamide;
N-(2-(3,4-difluorobenzyl)butyl)-1-methyl-5-oxo-4,5-dihydro-1H-1,2,4-triazole-3-carboxamide;
N-((1-(4-fluoro-2-methylbenzyl)cyclobutyl)methyl)-6-oxo-1,6-dihydropyrazine-2-carboxamide;
N-((1-(4-fluoro-2-methylbenzyl)cyclobutyl)methyl)-6-oxo-1,6-dihydropyrimidine-2-carboxamide;

N-((1-(2,4-difluorobenzyl)cyclobutyl)methyl)-1H-1,2,3-triazole-5-carboxamide;
N-((1-(2,4-difluorobenzyl)cyclobutyl)methyl)-4H-1,2,4-triazole-3-carboxamide;
N-(2-((2,3-dihydrobenzofuran-5-yl)methyl)butyl)-1-methyl-5-oxo-4,5-dihydro-1H-1,2,4-triazole-3-carboxamide;
N-((1-(2,5-difluorobenzyl)cyclobutyl)methyl)-6-oxo-1,6-dihydropyrazine-2-carboxamide;
N-((1-(2,4-difluorobenzyl)cyclobutyl)methyl)-6-oxo-1,6-dihydropyridazine-3-carboxamide;
N-((1-(3,5-difluorobenzyl)cyclobutyl)methyl)-6-oxo-1,6-dihydropyridazine-3-carboxamide;
N-((1-(3-fluorobenzyl)cyclobutyl)methyl)-6-oxo-1,6-dihydropyridazine-3-carboxamide;
N-((1-(2,4-difluorobenzyl)cyclobutyl)methyl)-4H-1,2,4-triazole-3-carboxamide;
1-methyl-N-((1-(2-(methylthio)benzyl)cyclobutyl)methyl)-5-oxo-4,5-dihydro-1H-1,2,4-triazole-3-carboxamide;
1-methyl-N-((1-(3-(methylthio)benzyl)cyclobutyl)methyl)-5-oxo-4,5-dihydro-1H-1,2,4-triazole-3-carboxamide;
(R)—N-(2-cyclopropyl-3-(2,4,6-trifluorophenyl)propyl)-6-oxo-1,6-dihydropyrimidine-2-carboxamide;
N-(4-(2,4-difluorobenzyl)tetrahydro-2H-pyran-4-yl)methyl)-3-oxo-2,3-dihydroisoxazole-5-carboxamide;
N-((4-(2,4-difluorobenzyl)tetrahydro-2H-pyran-4-yl)methyl)-6-oxo-1,6-dihydropyrimidine-2-carboxamide;
N-((1-(2,4-difluorobenzyl)spiro[2.2]pentan-1-yl)methyl)-6-oxo-1,6-dihydropyrimidine-2-carboxamide;
N-(2-cyclopropyl-3-(2,4-difluorophenyl)-2-methylpropyl)-6-oxo-1,6-dihydropyrimidine-2-carboxamide;
N-((2S)-2-cyclopropyl-3-(2,4-difluorophenyl)butyl)-6-oxo-1,6-dihydropyrimidine-2-carboxamide;
(R)—N-(2-cyclopropyl-3-(2,6-difluorophenyl)propyl)-6-oxo-1,6-dihydropyrimidine-2-carboxamide;
(R)—N-(2-cyclopropyl-3-(4-fluorophenyl)propyl)-1-methyl-5-oxo-4,5-dihydro-1H-1,2,4-triazole-3-carboxamide;
(S)—N-(2-(2,4-difluorobenzyl)butyl)-6-oxo-1,6-dihydropyrimidine-2-carboxamide;
(R)—N-(2-cyclopropyl-3-(2,4-difluorophenyl)propyl)-5-fluoro-6-oxo-1,6-dihydropyrimidine-2-carboxamide;
N-(3-(2-chloro-4-fluorophenyl)-2-cyclopropylpropyl)-1-methyl-5-oxo-4,5-dihydro-1H-1,2,4-triazole-3-carboxamide;
N-((1-(2,4-difluorobenzyl)spiro[2.2]pentan-1-yl)methyl)-5-oxo-4,5-dihydro-1,2,4-oxadiazole-3-carboxamide;
(R)—N-(2-cyclopropyl-3-(2,4-difluorophenyl)propyl)-5-oxo-4,5-dihydro-1,2,4-triazine-3-carboxamide;
N-((2S,3R)-2-cyclopropyl-3-(2,4-difluorophenyl)butyl)-1-methyl-5-oxo-4,5-dihydro-1H-1,2,4-triazole-3-carboxamide;
N-((2S,3S)-2-cyclopropyl-3-(2,4-difluorophenyl)butyl)-1-methyl-5-oxo-4,5-dihydro-1H-1,2,4-triazole-3-carboxamide;
N-((1-(2,4-difluorobenzyl)cyclobutyl)methyl)-5-oxo-4,5-dihydro-1,2,4-triazine-3-carboxamide;
N-(2-(2,4-difluorobenzyl)-2-ethylbutyl)-1-methyl-5-oxo-4,5-dihydro-1H-1,2,4-triazole-3-carboxamide;
N-((1-(3,4-difluorobenzyl)cyclobutyl)methyl)-5-oxo-4,5-dihydro-1,2,4-oxadiazole-3-carboxamide;
(R)—N-(2-cyclopropyl-3-(3,4-difluorophenyl)propyl)-5-oxo-4,5-dihydro-1,2,4-oxadiazole-3-carboxamide;
(R)—N-(2-cyclopropyl-3-(2,4-difluorophenyl)propyl)-5-oxo-4,5-dihydro-1,2,4-oxadiazole-3-carboxamide;
N-((1-(2,4-difluorobenzyl)cyclobutyl)methyl)-5-oxo-4,5-dihydro-1,2,4-oxadiazole-3-carboxamide;
N-((1-(2,4-difluorobenzyl)cyclobutyl)methyl)-5-(methoxymethyl)-4H-1,2,4-triazole-3-carboxamide;
(R)—N-(2-cyclopropyl-3-(2,5-difluorophenyl)propyl)-5-oxo-4,5-dihydro-1,2,4-oxadiazole-3-carboxamide;
(S)—N-(2-(2,4-difluorobenzyl)butyl)-5-oxo-4,5-dihydro-1,2,4-oxadiazole-3-carboxamide;
N-(2-cyclopropyl-3-(2,4-difluorophenyl)-2-methylpropyl)-1-methyl-5-oxo-4,5-dihydro-1H-1,2,4-triazole-3-carboxamide;
N-((1-(2,4-difluorobenzyl)cyclobutyl)methyl)-5-oxo-4,5-dihydro-1,3,4-oxadiazole-2-carboxamide;
(R)—N-(2-cyclopropyl-3-(2,6-difluorophenyl)propyl)-1-methyl-5-oxo-4,5-dihydro-1H-1,2,4-triazole-3-carboxamide;
N-((1-(2,4-difluorobenzyl)-3-fluorocyclobutyl)methyl)-6-oxo-1,6-dihydropyrimidine-2-carboxamide;
N-(2-(2,4-difluorobenzyl)-2-fluorobutyl)-6-oxo-1,6-dihydropyrimidine-2-carboxamide;
N-(2-cyclopropyl-3-(4-fluorophenyl)-2-methylpropyl)-6-oxo-1,6-dihydropyrimidine-2-carboxamide;
N-(2-cyclopropyl-3-(4-fluorophenyl)propyl)-6-oxo-1,6-dihydropyrimidine-2-carboxamide;
(R)-5-bromo-N-(2-cyclopropyl-3-(2,4-difluorophenyl)propyl)-6-oxo-1,6-dihydropyrimidine-2-carboxamide;
N-(3-(2-chloro-4,6-difluorophenyl)-2-cyclopropylpropyl)-1-methyl-5-oxo-4,5-dihydro-1H-1,2,4-triazole-3-carboxamide;
N-(2-(2,4-difluorobenzyl)-4,4,4-trifluorobutyl)-1-methyl-5-oxo-4,5-dihydro-1H-1,2,4-triazole-3-carboxamide;
N-(3-(4-chloro-2-fluorophenyl)-2-cyclopropylpropyl)-1-methyl-5-oxo-4,5-dihydro-1H-1,2,4-triazole-3-carboxamide;
(N-((2S,3S)-3-(2,4-difluorobenzyl)pentan-2-yl)-1-methyl-5-oxo-4,5-dihydro-1H-1,2,4-triazole-3-carboxamide;
N-((2R,3S)-3-(2,4-difluorobenzyl)pentan-2-yl)-1-methyl-5-oxo-4,5-dihydro-1H-1,2,4-triazole-3-carboxamide.
(N-((2S,3R)-2-cyclopropyl-3-(2,4-difluorophenyl)butyl)-6-oxo-1,6-dihydropyrimidine-2-carboxamide;
(N-((2S,3S)-2-cyclopropyl-3-(2,4-difluorophenyl)butyl)-6-oxo-1,6-dihydropyrimidine-2-carboxamide;
(S)—N-[2-cyclopropyl-2-methyl-3-(2,4,6-trifluorophenyl)propyl]-1-methyl-5-oxo-4H-1,2,4-triazole-3-carboxamide;
(R)—N-[2-cyclopropyl-2-methyl-3-(2,4,6-trifluorophenyl)propyl]-1-methyl-5-oxo-4H-1,2,4-triazole-3-carboxamide;
(S)—N-((2-(2,4-difluorobenzyl)tetrahydrofuran-2-yl)methyl)-1-methyl-5-oxo-4,5-dihydro-1H-1,2,4-triazole-3-carboxamide;
(R)—N-((2-(2,4-difluorobenzyl)tetrahydrofuran-2-yl)methyl)-1-methyl-5-oxo-4,5-dihydro-1H-1,2,4-triazole-3-carboxamide;
(S)—N-((1-(2,4-difluorobenzyl)spiro[2.2]pentan-1-yl)methyl)-1-methyl-5-oxo-4,5-dihydro-1H-1,2,4-triazole-3-carboxamide;
(R)—N-((1-(2,4-difluorobenzyl)spiro[2.2]pentan-1-yl)methyl)-1-methyl-5-oxo-4,5-dihydro-1H-1,2,4-triazole-3-carboxamide;
(S)—N-((1-(2,4-difluorobenzyl)spiro[2.2]pentan-1-yl)methyl)-5-oxo-4,5-dihydro-1,2,4-oxadiazole-3-carboxamide;
(R)—N-((1-(2,4-difluorobenzyl)spiro[2.2]pentan-1-yl)methyl)-5-oxo-4,5-dihydro-1,2,4-oxadiazole-3-carboxamide;
(S)—N-((1-(2,4-difluorobenzyl)spiro[2.2]pentan-1-yl)methyl)-6-oxo-1,6-dihydropyrimidine-2-carboxamide;

(R)—N-((1-(2,4-difluorobenzyl)spiro[2.2]pentan-1-yl)
  methyl)-6-oxo-1,6-dihydropyrimidine-2-carboxamide;
N-((2S,3R)-2-cyclopropyl-3-(2,4-difluorophenyl)butyl)-1-
  methyl-5-oxo-4,5-dihydro-1H-1,2,4-triazole-3-carbox-
  amide;
N-((2S,3S)-2-cyclopropyl-3-(2,4-difluorophenyl)butyl)-1-
  methyl-5-oxo-4,5-dihydro-1H-1,2,4-triazole-3-carbox-
  amide;
(S)—N-(2-cyclopropyl-3-(2,4-difluorophenyl)-2-methyl-
  propyl)-1-methyl-5-oxo-4,5-dihydro-1H-1,2,4-triazole-3-
  carboxamide;
(R)—N-(2-cyclopropyl-3-(2,4-difluorophenyl)-2-methyl-
  propyl)-1-methyl-5-oxo-4,5-dihydro-1H-1,2,4-triazole-3-
  carboxamide;
(R)—N-(3-(2-chloro-4-fluorophenyl)-2-cyclopropylpro-
  pyl)-1-methyl-5-oxo-4,5-dihydro-1H-1,2,4-triazole-3-
  carboxamide;
(S)—N-(3-(2-chloro-4-fluorophenyl)-2-cyclopropylpro-
  pyl)-1-methyl-5-oxo-4,5-dihydro-1H-1,2,4-triazole-3-
  carboxamide;
(S)—N-(2-cyclopropyl-3-(2,4-difluorophenyl)-2-methyl-
  propyl)-6-oxo-1,6-dihydropyrimidine-2-carboxamide;
(R)—N-(2-cyclopropyl-3-(2,4-difluorophenyl)-2-methyl-
  propyl)-6-oxo-1,6-dihydropyrimidine-2-carboxamide;
(R)—N-(2-(2,4-difluorobenzyl)-4,4,4-trifluorobutyl)-1-
  methyl-5-oxo-4,5-dihydro-1H-1,2,4-triazole-3-carbox-
  amide;
(S)—N-(2-(2,4-difluorobenzyl)-4,4,4-trifluorobutyl)-1-
  methyl-5-oxo-4,5-dihydro-1H-1,2,4-triazole-3-carbox-
  amide;
N-(((1s,3r)-1-(2,4-difluorobenzyl)-3-fluorocyclobutyl)
  methyl)-6-oxo-1,6-dihydropyrimidine-2-carboxamide;
N-(((1r,3s)-1-(2,4-difluorobenzyl)-3-fluorocyclobutyl)
  methyl)-6-oxo-1,6-dihydropyrimidine-2-carboxamide;
(S)—N-(2-cyclopropyl-3-(4-fluorophenyl)propyl)-6-oxo-1,
  6-dihydropyrimidine-2-carboxamide;
(R)—N-(2-cyclopropyl-3-(4-fluorophenyl)propyl)-6-oxo-1,
  6-dihydropyrimidine-2-carboxamide;
(S)—N-(2-cyclopropyl-3-(4-fluorophenyl)-2-methylpro-
  pyl)-6-oxo-1,6-dihydropyrimidine-2-carboxamide;
(R)—N-(2-cyclopropyl-3-(4-fluorophenyl)-2-methylpro-
  pyl)-6-oxo-1,6-dihydropyrimidine-2-carboxamide;
(R)—N-(3-(4-chloro-2-fluorophenyl)-2-cyclopropylpro-
  pyl)-1-methyl-5-oxo-4,5-dihydro-1H-1,2,4-triazole-3-
  carboxamide;
(S)—N-(3-(4-chloro-2-fluorophenyl)-2-cyclopropylpro-
  pyl)-1-methyl-5-oxo-4,5-dihydro-1H-1,2,4-triazole-3-
  carboxamide;
(S)—N-(2-(2,4-difluorobenzyl)-2-fluorobutyl)-6-oxo-1,6-
  dihydropyrimidine-2-carboxamide;
(R)—N-(2-(2,4-difluorobenzyl)-2-fluorobutyl)-6-oxo-1,6-
  dihydropyrimidine-2-carboxamide;
N-[(2R)-2-cyclopropyl-3-(2,4-difluorophenyl)-2-methyl-
  propyl]-5-fluoro-4-oxo-3H-pyrimidine-2-carboxamide;
N-[(2S)-2-cyclopropyl-3-(2,4-difluorophenyl)-2-methyl-
  propyl]-5-fluoro-4-oxo-3H-pyrimidine-2-carboxamide;
5-chloro-N-[(2R)-2-cyclopropyl-3-(2,4-difluorophenyl)-2-
  methylpropyl]-4-oxo-3H-pyrimidine-2-carboxamide;
5-chloro-N-[(2S)-2-cyclopropyl-3-(2,4-difluorophenyl)-2-
  methylpropyl]-4-oxo-3H-pyrimidine-2-carboxamide;
(S)—N-[2-cyclopropyl-3-(4-fluorophenyl)-2-methylpro-
  pyl]-5-fluoro-4-oxo-3H-pyrimidine-2-carboxamide;
(R)—N-[2-cyclopropyl-3-(4-fluorophenyl)-2-methylpro-
  pyl]-5-fluoro-4-oxo-3H-pyrimidine-2-carboxamide;
(S)-5-Chloro-N-[2-cyclopropyl-3-(4-fluorophenyl)-2-meth-
  ylpropyl]-4-oxo-3H-pyrimidine-2-carboxamide;
(R)-5-Chloro-N-[2-cyclopropyl-3-(4-fluorophenyl)-2-meth-
  ylpropyl]-4-oxo-3H-pyrimidine-2-carboxamide;
(S)—N-(2-cyclopropyl-3-(2,4-difluorophenyl)-2-methyl-
  propyl)-5-methyl-6-oxo-1,6-dihydropyrimidine-2-car-
  boxamide;
(R)—N-(2-cyclopropyl-3-(2,4-difluorophenyl)-2-methyl-
  propyl)-5-methyl-6-oxo-1,6-dihydropyrimidine-2-car-
  boxamide;
(S)—N-(2-cyclopropyl-3-(4-fluorophenyl)-2-methylpro-
  pyl)-5-methyl-6-oxo-1,6-dihydropyrimidine-2-carbox-
  amide;
(R)—N-(2-cyclopropyl-3-(4-fluorophenyl)-2-methylpro-
  pyl)-5-methyl-6-oxo-1,6-dihydropyrimidine-2-carbox-
  amide;
(S)—N-(2-cyclopropyl-3-(2,4-difluorophenyl)-2-methyl-
  propyl)-3-hydroxyisoxazole-5-carboxamide;
(R)—N-(2-cyclopropyl-3-(2,4-difluorophenyl)-2-methyl-
  propyl)-3-hydroxyisoxazole-5-carboxamide;
(S)—N-(2-cyclopropyl-3-(4-fluorophenyl)-2-methylpro-
  pyl)-3-hydroxyisoxazole-5-carboxamide;
(R)—N-(2-cyclopropyl-3-(4-fluorophenyl)-2-methylpro-
  pyl)-3-hydroxyisoxazole-5-carboxamide;
(S)—N-(2-cyclopropyl-3-(2,4-difluorophenyl)-2-methyl-
  propyl)-5-oxo-4,5-dihydro-1,2,4-oxadiazole-3-carbox-
  amide;
(R)—N-(2-cyclopropyl-3-(2,4-difluorophenyl)-2-methyl-
  propyl)-5-oxo-4,5-dihydro-1,2,4-oxadiazole-3-carbox-
  amide;
(S)—N-(2-cyclopropyl-3-(4-fluorophenyl)-2-methylpro-
  pyl)-5-oxo-4,5-dihydro-1,2,4-oxadiazole-3-carboxamide;
  and
(R)—N-(2-cyclopropyl-3-(4-fluorophenyl)-2-methylpro-
  pyl)-5-oxo-4,5-dihydro-1,2,4-oxadiazole-3-carboxamide;
or a salt and/or solvate of any one thereof.

Clause 137. A pharmaceutical composition comprising the compound or pharmaceutically acceptable salt and/or solvate thereof according to any one of clauses 3 to 136, wherein the proviso of formula (I) does not apply.

Clause 138. The compound or pharmaceutically acceptable salt and/or solvate thereof according to any one of clauses 3 to 136, for use as a pharmaceutical, wherein the proviso of formula (I) does not apply.

Clause 139. The compound or pharmaceutically acceptable salt and/or solvate thereof according to any one of clauses 3 to 136, for use in the treatment or prophylaxis of a disease or disorder in which inhibition of mPTP provides a therapeutic or prophylactic effect, wherein the proviso of formula (I) does not apply.

Clause 140. Use of the compound or pharmaceutically acceptable salt and/or solvate thereof according to any one of clauses 3 to 136, in the manufacture of a medicament for the treatment of a disease or disorder in which inhibition of mPTP provides a therapeutic or prophylactic effect, wherein the proviso of formula (I) does not apply.

Clause 141. A method of preventing or treating a disorder in which inhibition of mPTP provides a therapeutic or prophylactic effect in a subject, which comprises administering to a subject in need thereof an effective amount of a compound or pharmaceutically acceptable salt and/or solvate thereof according to any one of clauses 3 to 136, wherein the proviso of formula (I) does not apply.

Clause 142. The compound or pharmaceutically acceptable salt and/or solvate thereof for use, use or method according to any one of clauses 139 to 141, wherein the disease or disorder is selected from degenerative or neurodegenerative diseases, disorders of the central nervous system, ischemia and re-perfusion injury, metabolic diseases, inflammatory or autoimmune diseases, diseases of aging and renal diseases.

Clause 143. The compound or pharmaceutically acceptable salt and/or solvate thereof for use, use or method according to any one of clauses 139 to 141, wherein the disease or disorder is selected from degenerative or neurodegenerative diseases, disorders of the central nervous system, ischemia and re-perfusion injury, metabolic diseases, inflammatory or autoimmune diseases, diseases of aging, renal diseases, hearing loss, a disease or disorder of the eye, Charcot-Marie-Tooth disease (CMT1a) and Leigh syndrome disease.

Clause 144. The compound or pharmaceutically acceptable salt and/or solvate thereof for use, use or method according to clause 143, wherein the disease or disorder is a degenerative or neurodegenerative disease, such as Parkinson's disease, dementia with Lewy Bodies, Alzheimer's disease, amyotrophic lateral sclerosis, multiple sclerosis, frontal temporal dementia, chemotherapy induced neuropathy, Huntington's disease, spinocerebellar ataxias, progressive supranuclear palsy, hereditary spastic paraplegia, Duchenne muscular dystrophy, congenital muscular dystrophy, traumatic brain injury (such as concussion) and Friedreich's ataxia.

Clause 145. The compound or pharmaceutically acceptable salt and/or solvate thereof for use, use or method according to clause 143, wherein the disease or disorder is a disease of the central nervous system, such as AIDS dementia complex, depressive disorders, schizophrenia and epilepsy.

Clause 146. The compound or pharmaceutically acceptable salt and/or solvate thereof for use, use or method according to clause 143, wherein the disease or disorder is ischemia or re-perfusion injury, such as acute myocardial infarction, stroke, kidney ischemia reperfusion injury, and organ damage during transplantation.

Clause 147. The compound or pharmaceutically acceptable salt and/or solvate thereof for use, use or method according to clause 143, wherein the disease or disorder is a metabolic disease, such as hepatic steatosis, diabetes, diabetic retinopathy, cognitive decline and other diabetes associated conditions, obesity and feeding behaviours, and non-alcoholic fatty liver disease.

Clause 148. The compound or pharmaceutically acceptable salt and/or solvate thereof for use, use or method according to clause 143, wherein the disease or disorder is a metabolic disease, such as hepatic steatosis, diabetes, diabetic retinopathy, cognitive decline and other diabetes associated conditions, obesity and feeding behaviours, diabetic neuropathy and non-alcoholic fatty liver disease.

Clause 149. The compound or pharmaceutically acceptable salt and/or solvate thereof for use, use or method according to clause 143, wherein the disease or disorder is an inflammatory or autoimmune disease, such as acute pancreatitis, systemic lupus, organ failure in sepsis and hepatitis.

Clause 150. The compound or pharmaceutically acceptable salt and/or solvate thereof for use, use or method according to clause 143, wherein the disease or disorder is a disease of aging, such as bone repair, bone weakness in aging in osteoporosis and sarcopenia.

Clause 151. The compound or pharmaceutically acceptable salt and/or solvate thereof for use, use or method according to clause 143, wherein the disease or disorder is a renal disease, such as chronic kidney disease associated with APOL1 genetic variants and chronic kidney disease.

Clause 152. The compound or pharmaceutically acceptable salt and/or solvate thereof for use, use or method according to clause 143, wherein the disease or disorder is a disease of aging, such as bone repair, bone weakness in aging in osteoporosis and sarcopenia.

Clause 153. The compound or pharmaceutically acceptable salt and/or solvate thereof for use, use or method according to clause 143, wherein the disease or disorder is hearing loss, such as hearing loss due to aging, noise, concussion, traumatic brain injury (TBI), drug induced, and/or genetic hearing loss, including spinal muscular atrophy (SMA) syndrome (SMA1, SMA2, SMA3, and SMA4, also called Type I, II, III and IV).

Clause 154. The compound or pharmaceutically acceptable salt and/or solvate thereof for use, use or method according to clause 143, wherein the disease or disorder is a disease or disorder of the eye, such as age-related macular degeneration.

Clause 155. The compound or pharmaceutically acceptable salt and/or solvate thereof for use, use or method according to clause 143, wherein the disease or disorder is Charcot-Marie-Tooth disease (CMT1a).

Clause 156. The compound or pharmaceutically acceptable salt and/or solvate thereof for use, use or method according to clause 143, wherein the disease or disorder is Leigh syndrome disease.

Clause 157. The compound or pharmaceutically acceptable salt and/or solvate thereof according to any one of clauses 3 to 136, for use in the treatment or prophylaxis of a mitochondrial disease, wherein the proviso of formula (I) does not apply.

Clause 158. The compound or pharmaceutically acceptable salt and/or solvate thereof according to any one of clauses 3 to 136, for use in the treatment or prophylaxis of a disease or disorder associated with TDP-43 proteinopathy such as TDP-43 associated neurodegeneration, wherein the proviso of formula (I) does not apply.

Clause 159. Use of a compound of formula (I) or a pharmaceutically acceptable salt and/or solvate thereof according to any one of clauses 3 to 136, in the manufacture of a medicament for the treatment or prophylaxis of a disease or disorder associated with TDP-43 proteinopathy such as TDP-43 associated neurodegeneration, wherein the proviso of formula (I) does not apply.

Clause 160. A method of treating or preventing a disease or disorder associated with TDP-43 proteinopathy such as TDP-43 associated neurodegeneration, which comprises administering to a subject in need thereof an effective amount of a compound or pharmaceutically acceptable salt and/or solvate thereof according to any one of clauses 3 to 136, wherein the proviso of formula (I) does not apply.

Clause 161. The compound or pharmaceutically acceptable salt and/or solvate for use, use or method according to any one of clauses 158 to 160, wherein the disease or disorder is selected from Amyotrophic Lateral Sclerosis, Frontotemporal dementia, Facial onset sensory and motor neuronopathy, Primary lateral sclerosis, Progressive muscular atrophy, Inclusion body myopathy associated with early-onset Paget disease of the bone and Frontotemporal lobar degeneration dementia, Perry disease, Chronic traumatic encephalopathy, Severe traumatic brain injury, Alzheimer's disease, Hippocampal sclerosis dementia, Limbic-predominant age-related TDP-43 encephalopathy, and Cerebral age-related TDP-43 with sclerosis.

Clause 162. The compound or pharmaceutically acceptable salt and/or solvate thereof according to any one of clauses 3 to 136, for use in the treatment or prophylaxis of a disease or disorder associated with fibrosis, wherein the proviso of formula (I) does not apply.

Clause 163. Use of a compound or pharmaceutically acceptable salt and/or solvate thereof according to any one of clauses 3 to 136, in the manufacture of a medicament for the treatment or prophylaxis of a disease or disorder associated with fibrosis, wherein the proviso of formula (I) does not apply.

Clause 164. A method of treating or preventing a disease or disorder associated with fibrosis, which comprises administering to a subject in need thereof an effective amount of a compound or pharmaceutically acceptable salt and/or solvate thereof according to any one of clauses 3 to 136, wherein the proviso of formula (I) does not apply.

Clause 165. The compound or pharmaceutically acceptable salt and/or solvate thereof for use, use or method according to any one of clauses 162 to 164, wherein the disease or disorder is selected from chronic kidney disease, idiopathic pulmonary fibrosis, non-alcoholic steatohepatitis, primary biliary cholangitis and systemic sclerosis.

Clause 166. A process for the preparation of a compound of formula (I) according to any one of clauses 1 to 136, or a salt and/or solvate thereof, which comprises reacting a compound of formula (11),

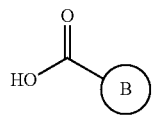
(II)

wherein B is as defined for the compound of formula (I); or salt thereof, with a compound of formula (III),

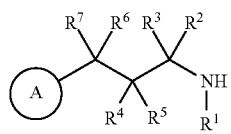
(III)

wherein $R^1$, $R^2$, $R^3$, $R^4$, $R^5$, $R^6$ and A are as defined for the compound of formula (I); or a salt thereof.

Clause 167. A compound selected from the group consisting of:

a compound of formula (II):

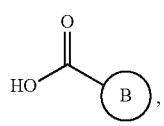
(II)

wherein B is as defined in any preceding clause;

a compound of formula (III):

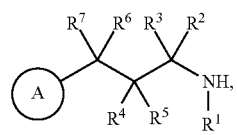
(III)

wherein $R^1$, $R^2$, $R^3$, $R^4$, $R^5$, $R^6$, $R^7$ and A are as defined in any preceding clause;

a compound of formula (IV):

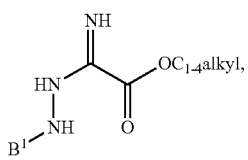
(IV)

wherein $B^1$ is as defined in any preceding clause;

a compound of formula (VII):

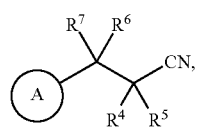
(VII)

wherein $R^4$, $R^5$, $R^6$, $R^7$ and A are as defined in any preceding clause;

a compound of formula (XII):

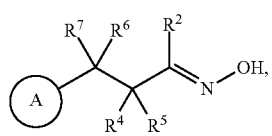
(XII)

wherein $R^2$, $R^4$, $R^5$, $R^6$, $R^7$ and A are as defined in any preceding clause;

a compound of formula (XIII):

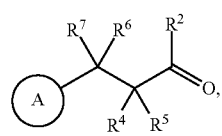
(XIII)

wherein $R^2$, $R^4$, $R^5$, $R^6$, $R^7$ and A are as defined in any preceding clause;

a compound of formula (XIV):

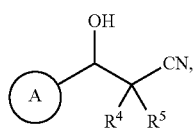

(XIV)

wherein $R^4$, $R^5$ and A are as defined in any preceding clause;

a compound of formula (XV):

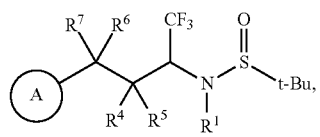

(XV)

wherein $R^4$, $R^5$, $R^6$, $R^7$ and A are as defined in any preceding clause;

a compound of formula (XVI):

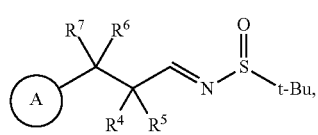

(XVI)

wherein $R^4$, $R^5$, $R^6$, $R^7$ and A are as defined in any preceding clause;

a compound of formula (XVII):

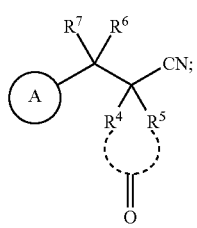

(XVII)

wherein $R^4$, $R^5$, $R^6$, $R^7$ and A are as defined in any preceding clause; and a compound of formula (XVIII):

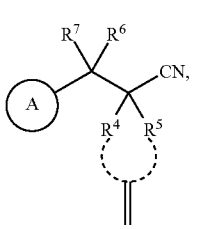

(XVIII)

wherein $R^4$, $R^5$, $R^6$, $R^7$ and A are as defined in any preceding clause, or salts, such as pharmaceutically acceptable salts, of any one thereof.

Clause 168. The compound, pharmaceutically acceptable salt and/or solvate thereof for use, use or method according to any one of clauses 1 to 95, wherein $R^4$ is H and $R^5$ is cyclopropyl. The invention is further exemplified by the following non-limiting examples.

EXAMPLES

The invention is illustrated by the compounds described below. The following examples describe the laboratory synthesis of specific compounds of the invention and are not meant to limit the scope of the invention in any way with respect to compounds or processes. It is understood that, although specific reagents, solvents, temperatures and time periods are used, there are many possible equivalent alternatives that can be used to produce similar results. The invention is meant to include such equivalents.

General Experimental Details

Starting materials, reagents and solvents were obtained from commercial suppliers and used without further purification unless otherwise stated. Unless otherwise stated, all compounds with chiral centres are racemic. Where reactions are described as having been carried out in a similar manner to earlier, more completely described reactions, the general reaction conditions used were essentially the same. Work up conditions used were of the types standard in the art, but may have been adapted from one reaction to another. The starting material may not necessarily have been prepared from the batch referred to. Compounds synthesised may have various purities, ranging from for example 85% to 99%. Calculations of number of moles and yield are in some cases adjusted for this.

Purity of final compounds was confirmed by HPLC/MS analysis and determined to be at least ≥90%, and in the significant majority of cases ≥95%. Analytical LCMS was conducted using the instrumentation shown in Table 1. $^1$H NMR were recorded at 300K in a Bruker 300 MHz instruments (ADVANCE III and ADVANCE III HD). Flash prep HPLC was conducted using the following columns: XBridge Prep C18 OBD Column, Sum, 19×150 mm; Welch Xtimate C18, 21.2×250 mm, Sum; SunFire Prep C18 OBD 19×150 mm×5 um. SFC purification was conducted using the following columns; (a) CHIRALPAK AS-H, 3*25 cm, Sum (b) SFC-YMC Cellulose-SB, 4.6×100 mm, 3 um.

TABLE 1

Analytical LC-MS conditions

| Instrument ID | Column | Mobile Phase | Flow Rate |
|---|---|---|---|
| LCMS01 | Halo-C18, 30*3.0 mm, 2.0 μm | A: $H_2O$/0.05% TFA; B: ACN | 1.5 mL/min |
| LCMS02 | Cortecs C18+, 50*3.0 mm, 2.7 μm | A: $H_2O$/0.05% TFA; B: ACN/0.05% TFA | 1.5 mL/min |
| LCMS03 | Halo-C18, 30*3.0 mm, 2.0 μm | A: $H_2O$/0.1% TFA; B: ACN/0.05% FA | 1.5 mL/min |
| LCMS04 | Kinetex XB-C18, 50*3.0 mm, 2.6 μm | A: $H_2O$/0.01% TFA; B: ACN/0.01% FA | 1.5 mL/min |

TABLE 1-continued

Analytical LC-MS conditions

| Instrument ID | Column | Mobile Phase | Flow Rate |
|---|---|---|---|
| LCMS05 | Poroshell HPH-C18, 50*3.0 mm, 2.7 μm | A: H$_2$O/5 mM NH$_4$HCO$_3$; B: MeOH | 1.0 mL/min |
| LCMS06 | Xbridge C18, 50*3.0 mm, 3.5 μm | A: H$_2$O/5 mM NH$_4$HCO$_3$ + 0.05% NH$_3$•H$_2$O; B: 5% H2O in ACN | 1.2 mL/min |
| LCMS07 | Poroshell HPH-C18, 50*3.0 mm, 2.7 μm | A: H$_2$O/0.05% NH$_3$•H$_2$O; B: ACN | 1.2 mL/min |
| LCMS08 | Halo C18, 50*3.0 mm, 2.7 μm | A: H$_2$O/0.05% TFA; B: ACN | 1.5 mL/min |
| LCMS09 | Poroshell HPH-C18, 50*3.0 mm, 2.7 μm | A: H$_2$O/0.05% NH$_3$•H$_2$O; B: ACN | 1.2 mL/min |

Synthesis of Example Compounds

Abbreviations

CH$_3$CN Acetonitrile
Cs$_2$CO$_3$ Cesium Carbonate
DCM Dichloromethane
DIPEA Diisopropylethylamine
DMF Dimethylformamide
Et$_3$N Triethylamine
EtOAc Ethyl acetate
EtOH Ethyl alcohol
FA Formic acid
HATU 1-[Bis(dimethylamino)methylene]-1H-1,2,3-triazolo[4,5-b]pyridinium 3-oxide hexafluorophosphate
HCl Hydrochloric acid
K$_2$CO$_3$ Potassium Carbonate
K$_3$PO$_4$ Potassium Phosphate
LAH Lithium aluminium hydride
LDA Lithium diisopropylamine
LiHMDS Lithium bis(trimethylsilyl)amide
MgSO$_4$ Magnesium sulfate
MeOH Methanol
NaHCO$_3$ Sodium bicarbonate
NaOAc Sodium acetate
NaOH Sodium hydroxide
Na$_2$SO$_4$ Sodium sulfate
NBS N-Bromosuccinimide
NCS N-Chlorosuccinimide
NH$_4$Cl Ammonium chloride
PE Petroleum ether
Pd(OAc)$_2$ Palladium(II) Acetate
Pd(dppf)Cl$_2$·CH$_2$Cl$_2$ Bis(diphenylphosphino)ferrocene]dichloropalladium(II), complex with dichloromethane
Pd(dppf)Cl$_2$ Bis(diphenylphosphino)ferrocene]dichloropalladium(II)
RT room temperature
o/n overnight (16 h)
TFA Trifluoroacetic acid
THF Tetrahydrofuran
THP Tetrahydropyranyl
T$_3$P Propanephosphonic anhydride

Intermediate 1: 1-methyl-5-oxo-4H-1,2,4-triazole-3-carboxylic acid

Step 1:

Into a 1 L round-bottom flask was added methyl hydrazine (35 g, 759.66 mmol, 1.00 equiv), K$_2$CO$_3$ (209.98 g, 1519.33 mmol, 2.00 equiv), EtOH (350 mL) and ethyl 2-amino-2-thioxoacetate (101.16 g, 759.66 mmol, 1.00 equiv) at room temperature. The mixture was stirred overnight and the resulting mixture filtered and the filter cake washed with EtOH (3×20 mL). The filtrate was concentrated under reduced pressure and the residue purified by silica gel column chromatography, eluting with PE/EtOAc (1:1) to afford ethyl 2-imino-2-(2-methylhydrazineyl)acetate (7 g) as a yellow oil.

Step 2:

Into a 500 mL round-bottom flask was added ethyl 2-imino-2-(2-methylhydrazineyl)acetate (7 g, 48.22 mmol, 1.00 equiv), DCM (150 mL) and CDI (23.46 g, 144.67 mmol, 3.00 equiv) at room temperature. The mixture was stirred overnight and the resulting mixture was concentrated under reduced pressure. The residue was purified by reverse flash chromatography. This resulted in ethyl 1-methyl-5-oxo-4H-1,2,4-triazole-3-carboxylate (4.5 g, 54% yield) as a light yellow solid.

Step 3:

83

-continued

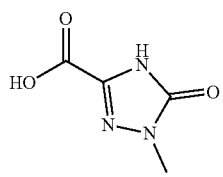

Into a 250 mL round-bottom flask was added ethyl 1-methyl-5-oxo-4H-1,2,4-triazole-3-carboxylate (2.5 g, 14.61 mmol, 1.00 equiv), EtOH (100 mL) and NaOH (1.75

84 g, 43.82 mmol, 3.00 equiv) at temperature. The mixture was stirred overnight at RT. The mixture as acidified to 5 with conc. HCl. The resulting mixture was concentrated under reduced pressure. The residue was purified by reverse flash chromatography to afford 1-methyl-5-oxo-4H-1,2,4-triazole-3-carboxylic acid (1.7 g, 81% yield) as a white solid.

LC-MS (ES, m/z): [M−H]⁻=142

Method A: Chiral Route

Intermediate 2: (R)-2-cyclopropyl-3-(2,4,6-trifluorophenyl)propan-1-amine

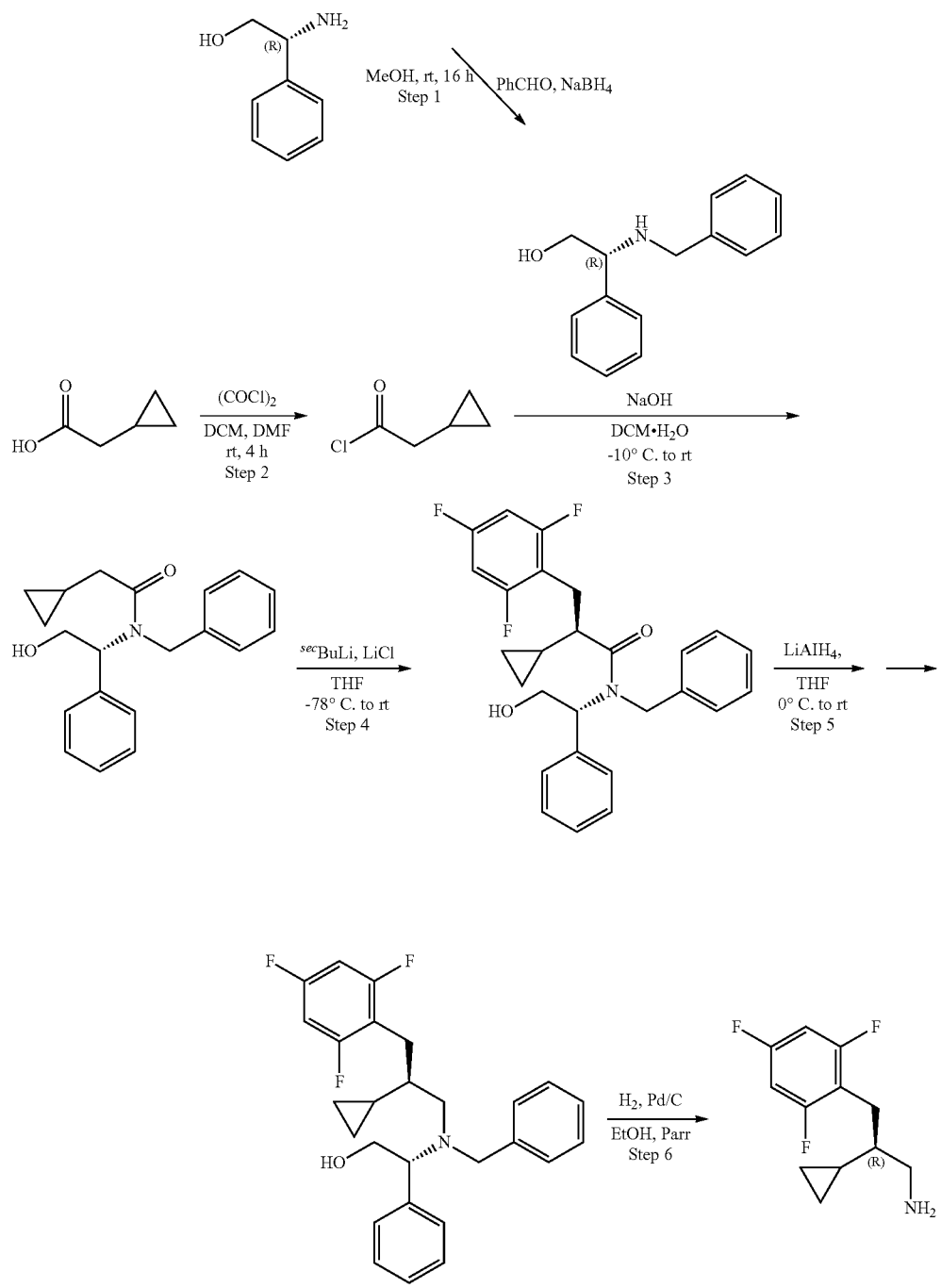

Step 1:

To (R)-2-amino-2-phenylethan-1-ol (10 g, 72.9 mmol) in methanol (250 mL) was added benzaldehyde (7.4 mL, 72.9 mmol) and the reaction mixture stirred at room temperature overnight. To the reaction mixture was added sodium borohydride (3420 mg, 90.4 mmol) portion wise and the reaction mixture stirred at room temperature for 1 hour. Reaction mixture was diluted with water (600 mL) and extracted with DCM (3×600 mL). Organic layers were combined, washed with brine (800 mL), passed through a phase separator cartridge (Biotage) and solvent removed in vacuo to give (R)-2-(benzylamino)-2-phenylethan-1-ol (16.2 g, 67.1 mmol, 92%) as a light yellow solid.

Step 2:

To a solution of 2-cyclopropylacetic acid (4.1 mL, 42.5 mmol) in DCM (90 mL) was added a solution of oxalyl chloride (7.3 mL, 85.1 mmol) in DCM (10 mL). To this was added 2 drops of DMF and the reaction mixture stirred at room temperature for 4 hours. Solvent was removed in vacuo to give 2-cyclopropylacetyl chloride (5040 mg, 42.5 mmol, 100%) as a yellow oil.

Step 3:

To (R)-2-(benzylamino)-2-phenylethan-1-ol (7710 mg, 33.9 mmol) in DCM (210 mL) was added sodium hydroxide (2849 mg, 71.2 mmol) in water (115 mL), and the reaction mixture cooled to −10° C. To this was added 2-cyclopropylacetyl chloride (5027 mg, 42.4 mmol) in DCM (20 mL) and the reaction mixture stirred at −10° C. for 15 minutes, then allowed to warm to room temperature and stirred for 15 minutes.

Reaction mixture was diluted with DCM (600 mL) and water (300 mL) and the layers separated. Aqueous fraction was extracted with DCM (300 mL). Organic layers were combined, passed through a phase separator cartridge (Biotage) and solvent removed in vacuo to give a crude yellow oil. This was purified by flash column chromatography to give (R)—N-benzyl-2-cyclopropyl-N-(2-hydroxy-1-phenylethyl)acetamide (6535 mg, 19.4 mmol, 57%) as a light yellow gum.

Step 4:

To (R)—N-benzyl-2-cyclopropyl-N-(2-hydroxy-1-phenylethyl)acetamide (1250 mg, 4.04 mmol) in tetrahydrofuran (18 mL) was added lithium chloride (685 mg, 16.2 mmol), and the reaction mixture cooled to −78° C. To this was added sec-butyllithium 1.4M solution in cyclohexane (14 mL, 20.2 mmol) dropwise and the reaction mixture stirred at −78° C. for 30 minutes. To this was then added 2,4,6-trifluorobenzyl bromide (1.0 mL, 7.60 mmol) dropwise and the reaction mixture stirred at −78° C. for 1 hour, then allowed to warm to room temperature over 1 hour. The reaction mixture was quenched with saturated aqueous NH₄Cl solution (80 mL) and extracted with EtOAc (150 mL). The organic layer was passed through a phase separator cartridge (Biotage) and solvent removed in vacuo to give a crude oil. This was purified by flash column chromatography to give (R)—N-benzyl-2-cyclopropyl-N—((R)-2-hydroxy-1-phenylethyl)-3-(2,4,6-trifluorophenyl)propanamide (1098 mg, 2.42 mmol, 59%) as a light yellow oil.

Step 5:

To (R)—N-benzyl-2-cyclopropyl-N—((R)-2-hydroxy-1-phenylethyl)-3-(2,4,6-trifluorophenyl)propanamide (1098 mg, 2.42 mmol) in tetrahydrofuran (14 mL) under nitrogen was added lithium aluminium hydride 1.0 M in THF (4.2 mL, 4.24 mmol) at 0° C. Reaction was allowed to warm to room temperature and stirred at room temperature for 2 hours.

Reaction was cooled to below 10° C., quenched with aqueous Rochelle's salt (30 mL) and extracted with EtOAc (100 mL). Organic layer was passed through a phase separator cartridge (Biotage) and solvent removed in vacuo to give a light yellow oil. Crude was dissolved in minimal MeOH and pipetted on to an SCX-2 cartridge (Biotage). The cartridge was washed with MeOH (4 CVs) and flushed with 3.5 M NH₃/MeOH (6 CVs) to give (R)-2-(benzyl((R)-2-cyclopropyl-3-(2,4,6-trifluorophenyl)propyl)amino)-2-phenylethan-1-ol (1027 mg, 2.34 mmol, 96%) as a colourless oil.

Step 6:

To (R)-2-(benzyl((R)-2-cyclopropyl-3-(2,4,6-trifluorophenyl)propyl)amino)-2-phenylethan-1-ol (550 mg, 0.9 mmol) in ethanol (40 mL) in a 500 mL Parr flask was added 10% wt palladium on carbon (0.940 mmol). The reaction flask was evacuated and then back-filled with nitrogen (×3) then hydrogen (×1). The reaction mixture was shaken under an atmosphere of hydrogen at 35 psi at room temperature for 19 hours. UPLC showed no SM remaining with formation of desired product as well as partly deprotected material (only Bn group removed). Additional Pd/C (excess) was added to the reaction mixture. The reaction flask was evacuated and then back-filled with nitrogen (×3) then hydrogen (×1). The reaction mixture was shaken under an atmosphere of hydrogen at 35 psi at room temperature for an additional 5 hours. UPLC showed no SM remaining with formation of desired product and by-product. Reaction was stopped to prevent loss of product and increase of impurities. Mixture was passed through fritted filter, washed with MeOH (150 mL) and solvent was removed in vacuo. The gum was then dissolved in minimal MeOH and pipetted onto a SCX-2 cartridge (Biotage). Cartridge was washed with MeOH (4 CVs) and flushed with 3.5 M NH3/MeOH (6 CVs) to give (R)-2-cyclopropyl-3-(2,4,6-trifluorophenyl)propan-1-amine (128 mg, 0.336 mmol, 37%, 60% pure) as a light yellow oil. This material was further used as it was.

The following amine intermediates were synthesised using a similar methodology to the one outlined above for Intermediate 2 (Method A) using commercially available starting materials or benzyl bromide intermediates:

TABLE 2

| Intermediate No. | Amine Intermediate |
|---|---|
| 3 | H₂N-CH₂-CH(cyclopropyl)-CH₂-(3,4-difluorophenyl) |
| 4 | H₂N-CH₂-CH(cyclopropyl)-CH₂-(2,4-difluorophenyl) |
| 5 | H₂N-CH₂-CH(cyclopropyl)-CH₂-phenyl |
| 6 | H₂N-CH₂-CH(cyclopropyl)-CH₂-(2,4,6-trifluorophenyl) |

TABLE 2-continued

| Intermediate No. | Amine Intermediate |
|---|---|
| 7 From Intermediate 63 | ![structure: H2N-CH2-CH(CH3)-aryl(2,4-diF), cyclopropyl substituent] |
| 8 | ![structure: H2N-CH2-CH(cyclopropyl)-CH2-aryl(2,6-diF)] |
| 9 | ![structure: H2N-CH2-CH(cyclopropyl)-CH2-aryl(2-Me,4-F)] |
| 10 | ![structure: H2N-CH2-CH(cyclopropyl)-CH2-aryl(4-F)] |
| 11 | ![structure: H2N-CH2-CH(Et)-CH2-aryl(2,4-diF)] |
| 12 | ![structure: H2N-CH2-CH(cyclopropyl)-CH2-aryl(2,5-diF)] |

Method B: KHMDS Route

Intermediate 13A: 1-(3,4-difluorobenzyl)cyclobutane-1-carbonitrile

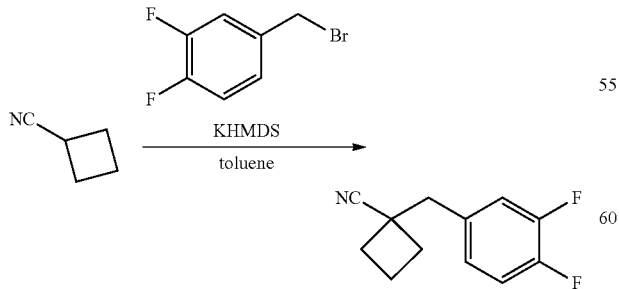

To a flask purged and maintained with nitrogen was added cyclobutanecarbonitrile (0.25 mL, 2.66 mmol) and toluene (5.0 mL), and the solution cooled to 0° C. To the reaction mixture was added potassium bis(trimethylsilyl)amide solution (1M in THF) (4.5 mL, 4.47 mmol) dropwise and the reaction mixture stirred at 0° C. for 2 hours. To this was then added 3,4-difluorobenzyl bromide (0.31 mL, 2.42 mmol) and the reaction mixture stirred at room temperature for 18 hours.

The reaction mixture was quenched with aqueous $NH_4Cl$ solution (20 mL) and extracted with EtOAc (50 mL). Organic layer was passed through a phase separator cartridge (Biotage) and solvent removed in vacuo give a crude.

This was purified by flash column chromatography to 1-(3,4-difluorobenzyl)cyclobutane-1-carbonitrile (366 mg, 1.77 mmol, 73%) as a yellow oil.

The following intermediates were synthesised using a similar methodology to the one outlined above for Intermediate 13A (Method B) using commercially available starting materials or benzyl bromide Intermediates:

TABLE 3

| Intermediate No. | Nitrile Intermediate |
|---|---|
| 14A | ![structure: NC-cyclobutyl-CH2-aryl(2,4-diF)] |
| 15A | ![structure: NC-spiro cyclopropyl-CH2-aryl(2,4-diF)] |
| 16A | ![structure: NC-(4,4-difluorocyclohexyl)-CH2-aryl(2,4-diF)] |
| 17A | ![structure: NC-C(Et)(Et)-CH2-aryl(2,4-diF)] |
| 18A | ![structure: NC-cyclobutyl-CH2-aryl(2,5-diF)] |
| 19A | ![structure: NC-cyclobutyl-CH2-aryl(2,4,5-triF)] |

TABLE 3-continued

| Intermediate No. | Nitrile Intermediate |
|---|---|
| 20A | 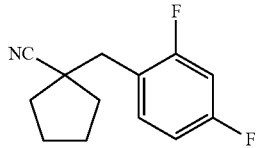 [SMILES: N#CC1(Cc2ccc(F)cc2F)CCCC1] |
| 21A | 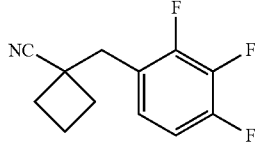 [SMILES: N#CC1(Cc2ccc(F)c(F)c2F)CCC1] |
| 22A From Intermediate 64 | 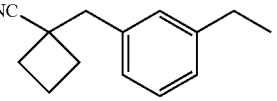 |
| 23A | 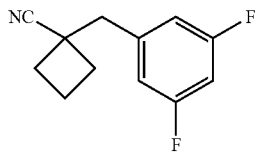 [SMILES: N#CC1(Cc2cc(F)cc(F)c2)CCC1] |
| 24A | 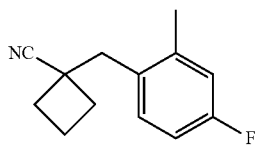 |
| 25A | 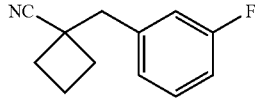 [SMILES: N#CC1(Cc2cccc(F)c2)CCC1] |
| 26A From Intermediate 65 | 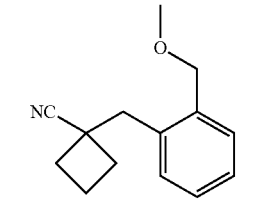 [SMILES: COCc1ccccc1CC1(C#N)CCC1] |
| 27A From Intermediate 67 | 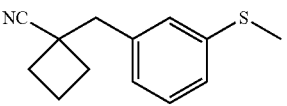 |
| 28A | 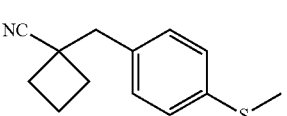 |

Method C: LiTMP Route

Intermediate 29A: 4-(2,4-difluorobenzyl)tetrahydro-2H-pyran-4-carbonitrile

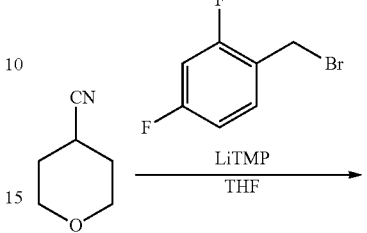

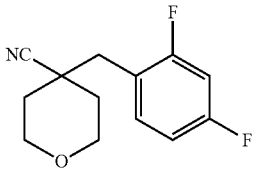

A vacuum dried flask evacuated and filled with N2 was charged with tetrahydrofuran (10 mL) and 2,2,6,6-tetramethylpiperidine (1.1 mL, 6.18 mmol) and the solution was cooled to −78 C. N-butyllithium (2.5 mL, 6.18 mmol) was added dropwise and the solution stirred for 15 mins, allowing it to warm to −50 C, then cooled back to −78 C. Tetrahydro-2H-pyran-4-carbonitrile (572 mg, 5.15 mmol) was added as a solution of THF (2 mL) and the mixture was stirred for 1 hr at −78 C, then warmed to −50 C before being cooled to −78 C and the addition of 2,4-difluoro benzyl bromide (0.66 mL, 5.15 mmol) was done. The solution was allowed to warm to RT, then heated to 60 C for 1 hr. The temperature was reduced to 40 C and the reaction was stirred over 2 days.

The reaction was diluted with water and EtOAc, the layers separated and then the aqueous fraction was extracted with EtOAc (3×). The organic fractions were combined and washed with dilute citric acid, water and brine, then dried over MgSO4 and the solvent removed. Crude was purified by flash column chromatography to afford 4-(2,4-difluorobenzyl)tetrahydro-2H-pyran-4-carbonitrile (998 mg, 4.21 mmol, 82%) as a light yellow oil.

Method D: NaHMDS Route

Intermediate 30A: 2-(2,4-difluorobenzyl)tetrahydrofuran-2-carbonitrile

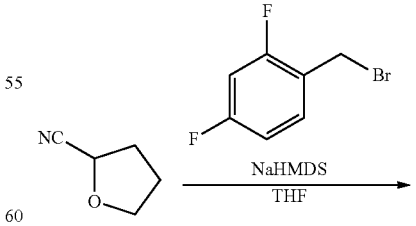

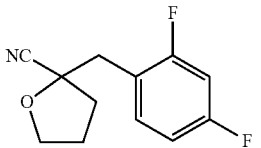

To a flask purged and maintained with nitrogen was added tetrahydrofuran-2-carbonitrile (225 mg, 2.32 mmol) in tetrahydrofuran (7.7 mL) and the solution was cooled to −78° C. Sodium bis(trimethylsilyl)amide solution 1.0 M in THF (2.3 mL, 2.32 mmol) was added dropwise and the mixture stirred for 50 minutes at −78° C. Then 2,4-difluoro benzyl bromide (99 uL, 0.773 mmol) in tetrahydrofuran (3.9 mL) was added and the mixture stirred at −78° C. for 1.5 h. The reaction was quenched with NH₄Cl (6 mL) and the aqueous phase extracted with EtOAc (3×50 mL). The combined organic extracts were washed with H₂O (30 mL), passed through a phase separator cartridge (Biotage), and concentrated in vacuo to give a crude oil.

This was purified by flash column chromatography to give 2-(2,4-difluorobenzyl)tetrahydrofuran-2-carbonitrile (92 mg, 0.412 mmol, 53%) as a colourless oil.

Intermediate 31A:
1-(2-(methylthio)benzyl)cyclobutane-1-carbonitrile

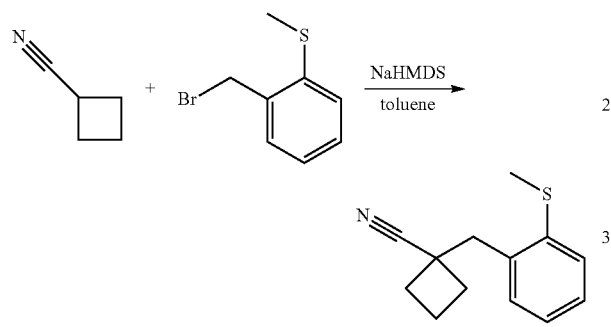

Sodium bis(trimethylsilyl)amide (1.19 g, 6.48 mmol) was added to an ice-cold solution of cyclobutanecarbonitrile (0.500 mL, 7.07 mmol) in toluene (10 mL) under N₂. The reaction mixture was stirred for at room temperature for 1 hour, then a solution of 1-(bromomethyl)-2-methylsulfanyl-benzene (Intermediate 66) (1.28 g, 5.90 mmol) in toluene (5 mL) added. The reaction was allowed to stir overnight at room temperature, then heated to 40° C. for 30 minutes. Water was added and the solution extracted with DCM (3×). The combined organics were washed successively with water and sat. brine solution, dried (MgSO₄) and the solvent evaporated in vacuo. The crude product was purified by flash column chromatography (Biotage Isolera Selekt, 25 g Sfar column) eluting with isohexane-EtOAc (0-20%) afford 1-(2-(methylthio)benzyl)cyclobutane-1-carbonitrile (1.20 g, 94%) as a colourless oil.

Method E: LDA Route

Intermediate 32A: 3-(2-chloro-4-fluorophenyl)-2-cyclopropylpropanenitrile

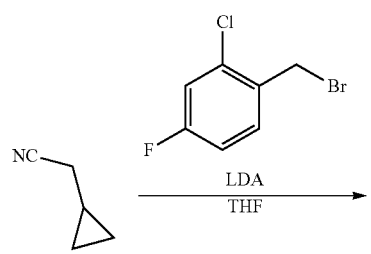

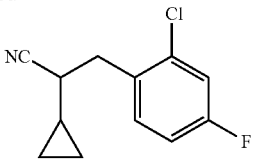

To a 2-necked flask purged and maintained with nitrogen was added 2-cyclopropylacetonitrile (0.45 mL, 4.92 mmol) and tetrahydrofuran (12 mL), and the reaction mixture cooled to −78° C. To the reaction mixture was added lithium diisopropyl amide (LDA 1M in THF) (5.4 mL, 5.37 mmol) dropwise and the reaction mixture stirred at −78° C. for 1 hour. To this was then added 2-chloro-4-fluorobenzyl bromide (1000 mg, 4.47 mmol) and the reaction mixture stirred at −78° C. for a further 1 hour. To the reaction mixture was added water and extracted with EtOAc (2×). Combined organic layers were passed through a phase separator cartridge (Biotage) and solvent removed in vacuo give a crude oil. This was purified by flash column chromatography to afford 3-(2-chloro-4-fluorophenyl)-2-cyclopropylpropanenitrile (414 mg, 1.85 mmol, 41%) as a colourless oil.

The following intermediates were synthesised using a similar methodology to the one outlined above for Intermediate 32A (Method E) using commercially available starting materials or other amine Intermediates:

TABLE 4

| Intermediate No. | Nitrile Intermediate |
|---|---|
| 33A | NC——F (3-fluorobenzyl with cyclopropyl) |
| 34A From Intermediate 69 | NC——2,4-difluorobenzyl with ethyl |

Method F: Horner-Wandsworth-Emmons Route

Intermediate 35A:
2-(Isoquinolin-6-ylmethyl)butanenitrile

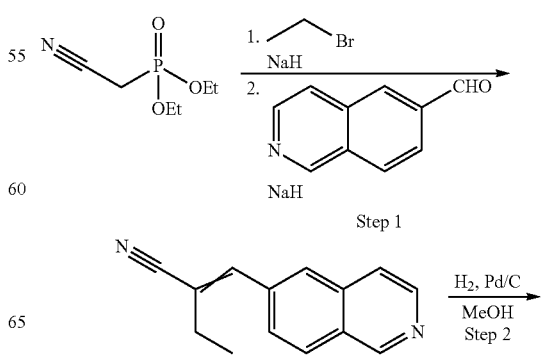

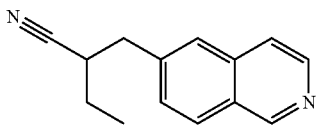

Step 1:

To sodium hydride (60% dispersion in oil) (27 mg, 0.668 mmol) in N,N-dimethylformamide (1.2 mL) was added diethyl cyanomethylphosphonate (103 uL, 0.636 mmol) at 0° C. and stirred at 0° C. for 10 minutes. To this was added bromoethane (52 uL, 0.700 mmol) and the reaction mixture allowed to warm to room temperature and stirred at room temperature for 1 hour.

To the reaction mixture was added N,N-dimethylformamide (1.2 mL) and sodium hydride (60% dispersion in oil) (27 mg, 0.668 mmol) at 0° C. and stirred at 0° C. for 15 minutes. To this was then added isoquinoline-6-carboxaldehyde (100 mg, 0.636 mmol) in N,N-dimethylformamide (1.2 mL) and the reaction mixture stirred at room temperature overnight.

The reaction was concentrated, the residue was diluted with DCM (15 mL) and washed with brine (2×15 mL). The organic layer was passed through a phase separator cartridge (Biotage) and concentrated in vacuo to give a dark purple oil. Crude material was purified by flash column chromatography to give 2-(isoquinolin-6-ylmethylene)butanenitrile (90 mg, 0.432 mmol, 68%) as a yellow oil.

Step 2:

2-(isoquinolin-6-ylmethylene)butanenitrile (90 mg, 0.432 mmol) in methanol (10 mL) was evacuated and refilled with nitrogen (×3). Palladium on carbon (10%) (50 mg, 0.470 mmol) was added and the flask was then refilled with hydrogen at 1 atm. The reaction mixture was stirred at room temperature under an $H_2$ balloon for 18 hours.

Reaction was filtered through a celite cartridge (Biotage) and washed with MeOH. Solvent was removed in vacuo to give 2-(isoquinolin-6-ylmethyl)butanenitrile (53 mg, 0.252 mmol, 58%) as a pale yellow oil.

The following intermediates were synthesised using a similar methodology to the one outlined above for Intermediate 35A (Method F) using commercially available starting materials:

TABLE 5

| Intermediate No | Nitrile Intermediate |
| --- | --- |
| 36A | NC—CH(Et)—CH2—(3,4-difluorophenyl) |
| 37A | NC—CH(Et)—CH2—(2,3-dihydrobenzofuran-5-yl) |

Intermediate 38A: (E)-2-((2,3-dihydrobenzo[b][1,4]dioxin-6-yl)methylene)butanenitrile

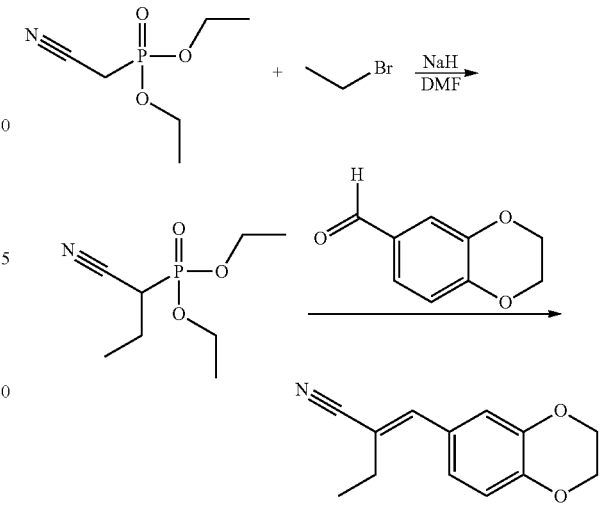

To sodium hydride (60% dispersion in oil, 119 mg, 2.96 mmol) in N,N-dimethylformamide (5.0 mL) was added diethyl cyanomethylphosphonate (0.46 mL, 2.82 mmol) at 0° C. and the reaction mixture stirred for 10 minutes. Bromoethane (0.23 mL, 3.10 mmol) was added and the reaction mixture stirred at room temperature for 1 hour. To the reaction mixture was added N,N-dimethylformamide (5.0 mL) and sodium hydride (60% dispersion in mineral oil, 119 mg, 2.96 mmol) at 0° C. and the reaction mixture stirred for 15 minutes. To this was added 2,3-dihydrobenzo[b][1,4]dioxine-6-carbaldehyde (463 mg, 2.82 mmol) in N,N-dimethylformamide (5.0 mL) and the reaction mixture stirred at room temperature overnight. The solvent was evaporated in vacuo and the residue dissolved in chloroform. The solution was washed with sat. brine solution and the organic phase passed through a phase separator cartridge (Biotage). The solvent was evaporated in vacuo and the crude product purified by flash column chromatography (Biotage Isolera Four, 25 g Sfar column) eluting with isohexane-EtOAc (0-30%) to afford (2E)-2-(2,3-dihydro-1,4-benzodioxin-6-ylmethylene)butanenitrile (380 mg, 1.77 mmol, 63%) as a yellow oil.

Intermediate 39A: 2-cyclopropyl-3-(2,4-difluorophenyl)-2-methylpropanenitrile

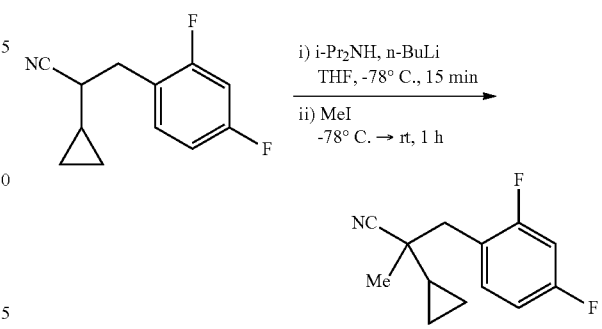

To a 2-necked flask purged and maintained with nitrogen was added diisopropylamine (1.58 mL, 11.6 mmol) in tetrahydrofuran (22 mL). The mixture was cooled to −78° C., and n-butyllithium (4.63 mL, 11.6 mmol) was added dropwise. After 5 minutes at −78° C., 2-cyclopropyl-3-(2,4-difluorophenyl)propanenitrile (2.00 g, 9.65 mmol) in tetrahydrofuran (22 mL) was added dropwise over 10 minutes. The mixture was stirred for 20 minutes at −78° C., then iodomethane (0.728 mL, 11.6 mmol) was added in one portion. The reaction mixture was allowed to warm to room temperature whilst maintaining stirring over 1 h. Water (40 mL) and EtOAc (60 mL) were added and the layers separated. Aqueous layer was further extracted with EtOAc (2×40 mL). Organic layers were combined and passed through a phase separator cartridge (Biotage) and concentrated in vacuo to give a crude oil. This was purified by flash column chromatography to give 2-cyclopropyl-3-(2,4-difluorophenyl)-2-methylpropanenitrile (1.26 g, 5.69 mmol, 59%) as a yellow oil.

Method G: Nitrile Reduction

In order to convert the nitrile intermediates synthesised using methods B—F to the corresponding amines, a LiAlH$_4$ reduction was employed:

Preparation of Intermediate 13B:
(1-(3,4-difluorobenzyl)cyclobutyl)methanamine

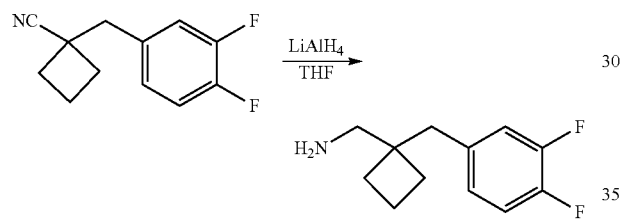

To 2-necked flask purged and maintained with nitrogen was added 1-(3,4-difluorobenzyl)cyclobutane-1-carbonitrile (366 mg, 1.77 mmol) in tetrahydrofuran (8.0 mL). The reaction mixture was cooled to 0° C. and to this was added dropwise at 0-5° C. lithium aluminium hydride 1.0 M in THF (5.3 mL, 5.3 mmols). The resulting reaction mixture was stirred at room temperature for 1 hour.

Reaction was cooled to 0° C., quenched with aqueous Rochelle's salt solution (10 mL) and extracted with EtOAc (50 mL). Organic layer was washed with brine (50 mL), passed through a phase separator cartridge (Biotage) and solvent removed in vacuo to give a crude oil.

This was dissolved in minimal MeOH and pipetted onto an SCX-2 cartridge (Biotage). The cartridge was washed with MeOH (4 CVs) and flushed with NH3/MeOH (6 CVs) to give (1-(3,4-difluorobenzyl)cyclobutyl)methanamine (277 mg, 1.18 mmol, 67%) as a light yellow oil.

The amines below were synthesised using similar methodology to Intermediate 13B above:

TABLE 6

| Intermediate Number | Amine Intermediate |
|---|---|
| 14B | 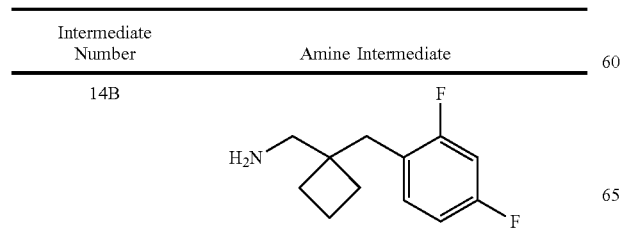 |

TABLE 6-continued

| Intermediate Number | Amine Intermediate |
|---|---|
| 15B | |
| 16B | |
| 17B | |
| 18B | |
| 19B | |
| 20B | |
| 21B | |
| 22B | |
| 23B | |

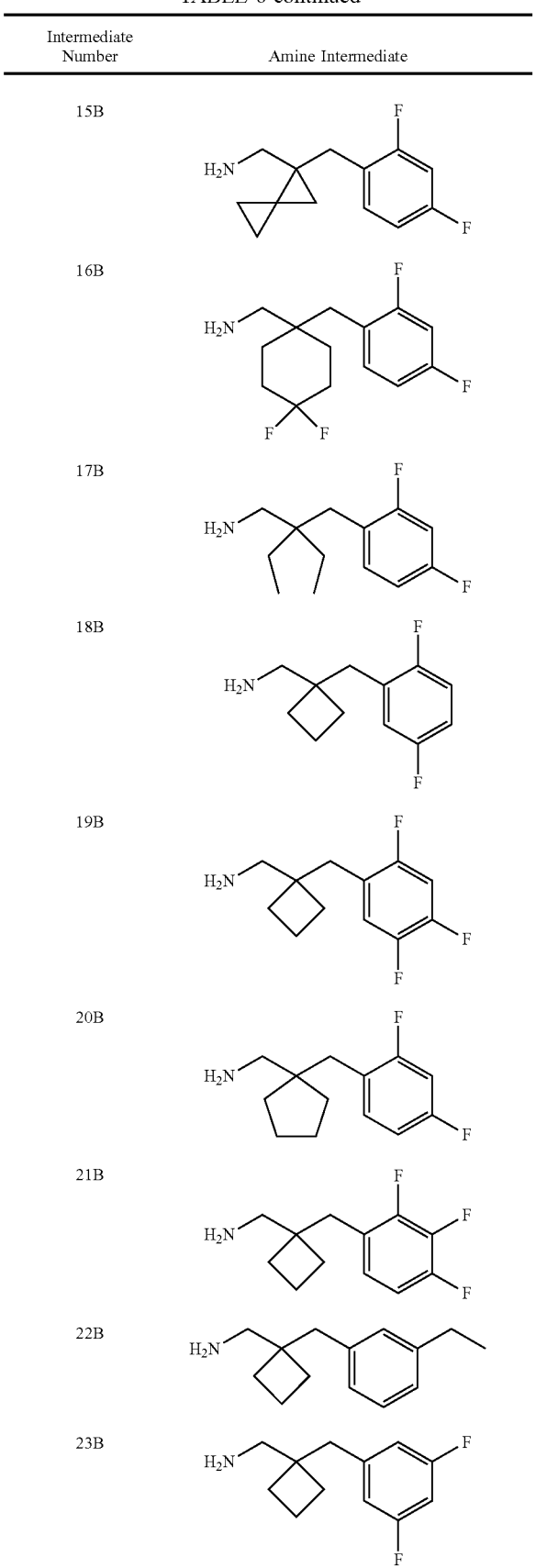

TABLE 6-continued

| Intermediate Number | Amine Intermediate |
|---|---|
| 24B | |
| 25B | |
| 26B | |
| 27B | |
| 28B | |
| 29B | |
| 30B | |
| 31B | |
| 32B | |
| 33B | |
| 34B | |
| 35B | |
| 36B | |
| 37B | |
| 39B | |

Intermediate 38B: 2-((2,3-dihydrobenzo[b][1,4]dioxin-6-yl)methyl)butan-1-amine To (2E)-2-(2,3-dihydro-1,4-benzodioxin-6-ylmethylene)butanenitrile (380 mg, 1.77 mmol) in THF (8.0 mL) at 0° C. was added lithium aluminium hydride solution (1.0M in THF, 5.30 mL, 5.30 mmol) dropwise. The mixture was stirred at room temperature for 2 hours, cooled to 0° C., quenched with aq. Rochelle's salt solution and extracted with EtOAc. The organic phase was washed with sat. brine solution, passed through a phase separator cartridge (Biotage) and the solvent removed in vacuo. The crude material was dissolved in minimal MeOH and loaded on to an SCX-2 cartridge (Biotage). The cartridge was washed with MeOH and eluted with NH$_3$-MeOH. The solvent was evaporated in vacuo to give 2-(2,3-dihydro-1,4-benzodioxin-6-ylmethyl)butan-1-amine (350 mg, 90%) as a yellow oil.

Method H: Head Group Syntheses

Intermediate 40: 5-fluoro-6-methoxy-1,6-dihydropyrimidine-2-carboxylic acid

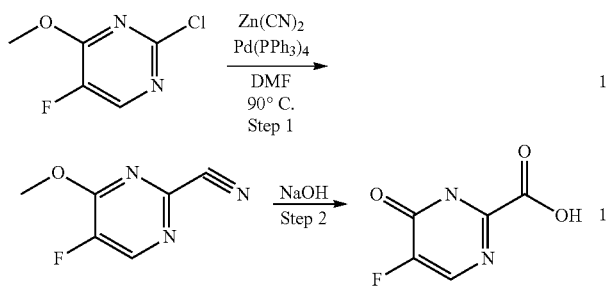

Step 1:
To 2-chloro-5-fluoro-6-methoxy-1,6-dihydropyrimidine (500 mg, 3.08 mmol) in N,N-dimethylformamide (7.0 mL) was added zinc cyanide (361 mg, 3.08 mmol), and nitrogen bubbled through the reaction mixture for 10 minutes. To this was then added tetrakis(triphenylphosphine)palladium(0) (355 mg, 0.308 mmol) and nitrogen bubbled through the reaction mixture for a further 10 minutes. The reaction mixture was heated at 90° C. for 3 days.

Reaction mixture was quenched with concentrated aqueous ammonium hydroxide (1 mL) and brine (5 mL) and extracted with EtOAc (2×10 mL). Organic layers were combined, washed with brine (5 mL), passed through a phase separator cartridge (Biotage) and solvent removed in vacuo to give a crude oil.

This was purified by flash column chromatography to give 5-fluoro-4-methoxypyrimidine-2-carbonitrile (45 mg, 0.293 mmol, 10%) as a yellow oil.

Step 2:
To 5-fluoro-4-methoxypyrimidine-2-carbonitrile (45 mg, 0.293 mmol) was added 1M sodium hydroxide solution (3.0 mL, 78.0 mmol) and the reaction mixture was stirred at room temperature for 18 hours. Reaction mixture was acidified to pH3 with aqueous 1M HCl. Aqueous fraction was washed with DCM (4×10 mL). Attempts to extract desired product were unsuccessful. Solvent was removed in vacuo to give crude 5-fluoro-6-oxo-1,6-dihydropyrimidine-2-carboxylic acid (200 mg) as a white solid. Solid presumed to mostly be NaCl salt. The final compound was taken through to the next coupling step as it was.

Intermediate 41: 1-methyl-5-thioxo-4,5-dihydro-1H-1,2,4-triazole-3-carboxylic acid

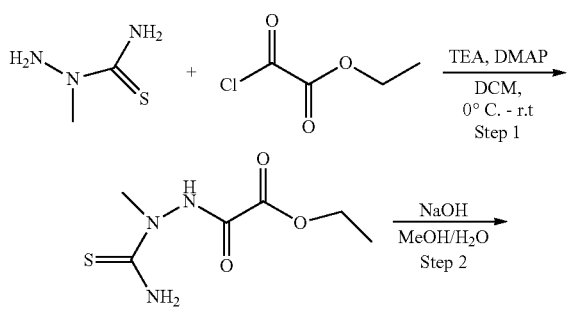

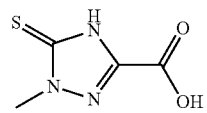

Step 1:
1-methylhydrazine-1-carbothioamide (1000 mg, 9.51 mmol), triethylamine (13 mL, 95.1 mmol) and 4-(dimethylamino)pyridine (46 mg, 0.380 mmol) were dissolved in DCM (20 mL). The reaction was cooled to 0 C and ethyl 2-chloro-2-oxoacetate (1.2 mL, 10.5 mmol) was added dropwise. The reaction mixture turned from colourless to deep orange. It was allowed to warm to room temperature and stirred overnight. The reaction mixture was acidified to pH5 using aqueous HCl and this was then extracted with DCM (3×20 mL). The combined organic fractions were concentrated under vacuum to give an orange gum of ethyl 2-(2-carbamothioyl-2-methylhydrazineyl)-2-oxoacetate (1686 mg, 8.2152 mmol, 86%).

Step 2:
Ethyl 2-(2-carbamothioyl-2-methylhydrazineyl)-2-oxoacetate (1600 mg, 7.8 mmol) was dissolved in MeOH (10 mL). NaOH (936 mg, 23.4 mmol) was added and the reaction was heated to 60 C for 1 h. H$_2$O (10 mL) was added and the reaction was further heated to 90 C for 1 h. The reaction mixture was concentrated and the residue redissolved in minimal amounts of water/EtOH (4 mL) and extracted with DCM (5×30 mL). The organic phases were combined and passed through a phase separator cartridge (Biotage) and then concentrated to give 1-methyl-5-thioxo-4,5-dihydro-1H-1,2,4-triazole-3-carboxylic acid as a yellow gum (300 mg, 1.88 mmol, 24%).

Intermediate 42: Ethyl 5-oxo-4,5-dihydro-1,2,4-triazine-3-carboxylate

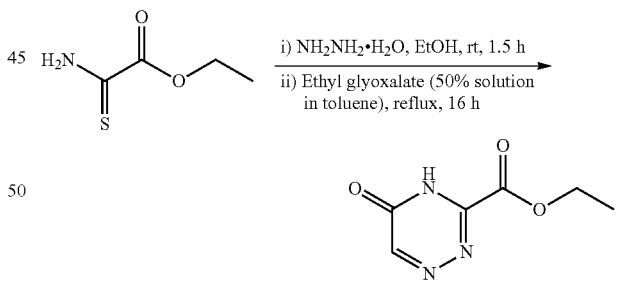

To ethyl 2-amino-2-thioxoacetate (500 mg, 3.75 mmol) in ethanol (15 mL) was added hydrazine hydrate (184 uL, 3.75 mmol) and the reaction mixture stirred at room temperature for 1.5 hours. To this was then added ethyl glyoxalate (50% solution in toluene) (0.76 mL, 7.51 mmol) and the reaction mixture stirred at reflux for 16 hours. Reaction mixture was allowed to cool to room temperature, water (20 mL) added and washed with DCM (20 mL). UPLC showed impurities in organic layer and product in aqueous. Aqueous layer was concentrated in vacuo to give ethyl 5-oxo-4,5-dihydro-1,2,4-triazine-3-carboxylate (473 mg, 2.29 mmol, 61%) as a crude brown oil.

Intermediate 43: Ethyl 5-ethoxy-1,3,4-oxadiazole-2-carboxylate

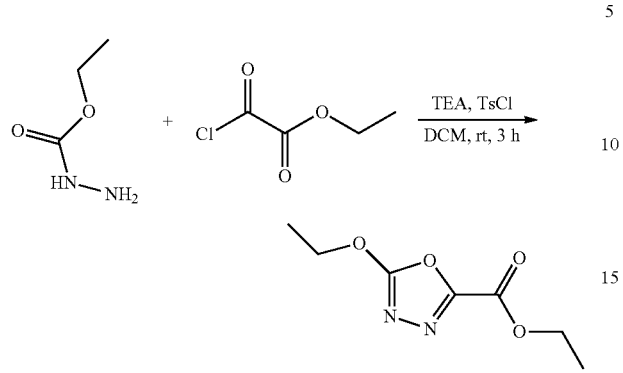

Ethyl hydrazinecarboxylate (500 mg, 4.80 mmol), ethyl chlorooxoacetate (0.54 mL, 4.80 mmol), triethylamine (2.0 mL, 14.4 mmol) and p-toluene sulfonyl chloride (916 mg, 4.80 mmol) were combined and stirred in DCM at room temperature for 3 h. The reaction mixture was evaporated and purified by flash column chromatography to give crude ethyl 5-ethoxy-1,3,4-oxadiazole-2-carboxylate (140 mg, 0.75 mmol, 16%) as a yellow oil. Crude was used in further steps without purification.

Intermediate 44: 4-methyl-5-oxo-4,5-dihydro-1H-1,2,4-triazole-3-carboxylic acid

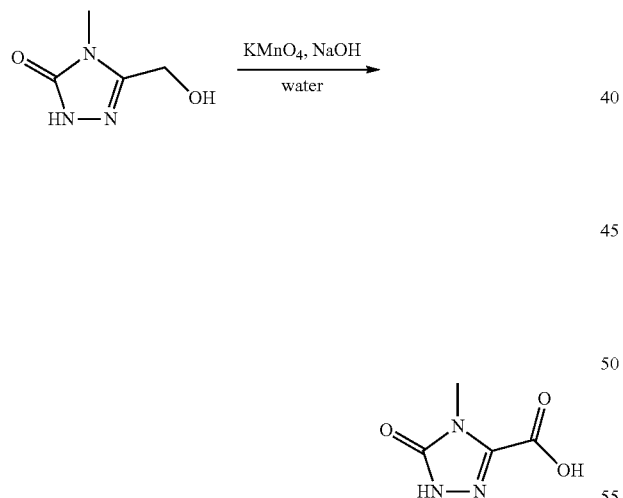

5-(hydroxymethyl)-4-methyl-2,4-dihydro-3H-1,2,4-triazol-3-one (400 mg, 3.10 mmol) was dissolved in water (10 mL). Potassium permanganate (1469 mg, 9.29 mmol) was added, followed by a 1M NaOH solution in water (4.65 mL, 4.65 mmol). The reaction mixture was heated to 80 C O/N. The reaction mixture was filtered on celite to remove the insoluble inorganics and the filtrate was evaporated to dryness to afford crude 4-methyl-5-oxo-1H-1,2,4-triazole-3-carboxylic acid (1160 mg, 8.1062 mmol, 262%). Crude was used in further steps without purification.

Intermediate 45: 2-(2,4-difluorobenzyl)-2-fluorobutan-1-amine

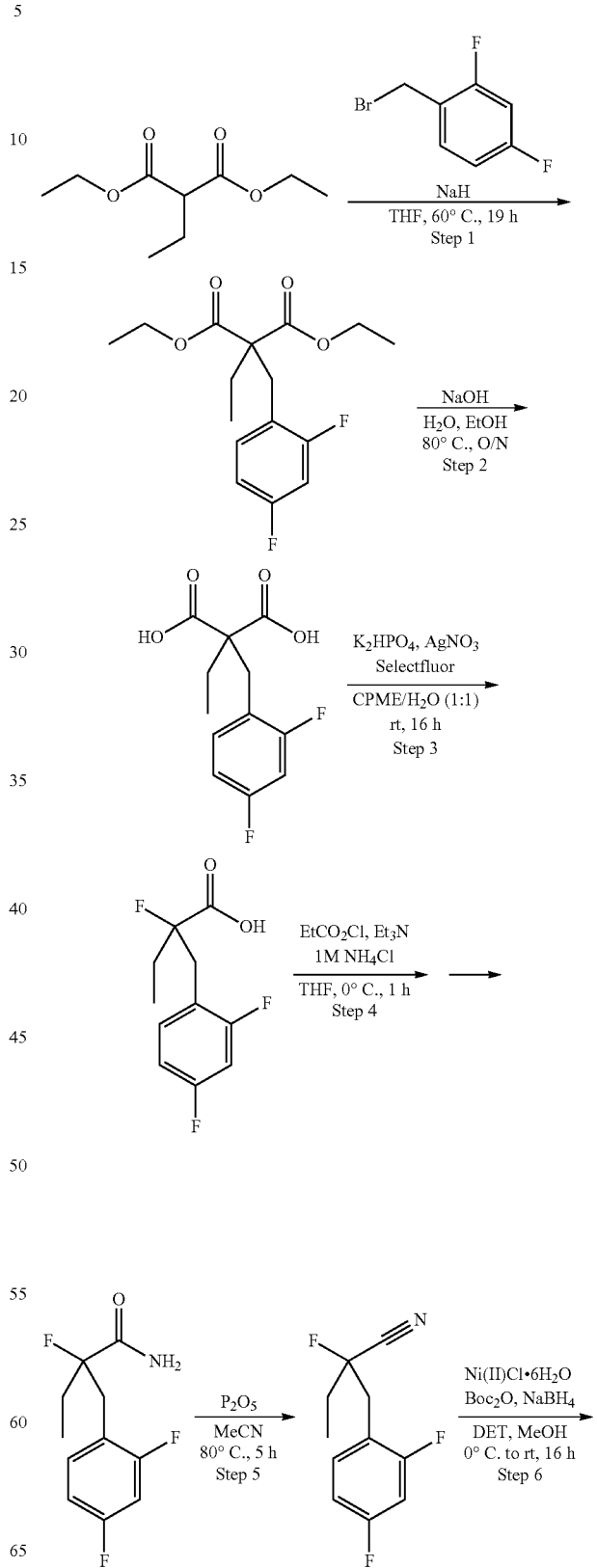

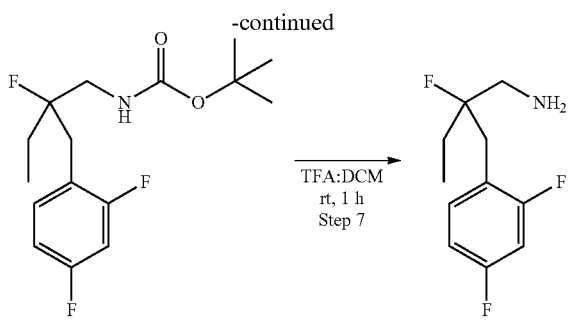

Step 1:

To sodium hydride (60% dispersion in oil) (638 mg, 15.9 mmol) in tetrahydrofuran (8.0 mL) was added diethyl ethylmalonate (2.0 mL, 10.6 mmol) in tetrahydrofuran (4.0 mL) under nitrogen. The reaction mixture was stirred at room temperature for 15 minutes. To this was then added 2,4-difluoro benzyl bromide (1.5 mL, 11.7 mmol) in tetrahydrofuran (4.0 mL) dropwise. The resulting mixture was stirred at reflux for 20 hours. Reaction mixture was cooled to 0° C. and acidified with aqueous 1M HCl (10 mL) and extracted with Et$_2$O (3×60 mL). Organic layers were combined and washed with saturated aqueous NaHCO$_3$ solution (15 mL), brine (15 mL), then passed through a phase separator cartridge (Biotage) and the solvent removed in vacuo to give a crude colourless oil. This was purified by flash column chromatography to give diethyl 2-(2,4-difluorobenzyl)-2-ethylmalonate (2575 mg, 7.54 mmol, 71%) as a colourless oil.

Step 2:

To diethyl 2-(2,4-difluorobenzyl)-2-ethylmalonate (2575 mg, 7.54 mmol) in ethanol (14 mL) was added aqueous 5M NaOH solution (5.9 mL, 35.3 mmol) and the reaction mixture was refluxed for 18 hours. The solvent was removed in vacuo, then to the residue was added water (10 mL) and washed with isohexane (15 mL). Aqueous fraction was cooled to 0° C., acidified with aqueous 5M HCl and extracted with Et$_2$O (3×15 mL). Organic layers were combined, washed with brine, passed through a phase separator cartridge (Biotage) and the solvent removed in vacuo to give 2-(2,4-difluorobenzyl)-2-ethylmalonic acid (1910 mg, 7.03 mmol, 93%) as an orange oil.

Step 3:

To a flask was added Selectfluor (4974 mg, 14.0 mmol), di-potassium hydrogen phosphate (4891 mg, 28.1 mmol) and silver nitrate (328 mg, 1.40 mmol) and purged with nitrogen for 10 minutes. To this was then added 2-(2,4-difluorobenzyl)-2-ethylmalonic acid (1908 mg, 7.02 mmol) in cyclopentylmethylether (CPME) (35 mL) and water (35 mL), and the reaction mixture purged with nitrogen for 10 minutes. The mixture was stirred at room temperature for 16 hours. Reaction was quenched with aqueous 3M HCl (10 mL) and extracted with EtOAc (2×30 mL). Organic layers were combined, passed through a phase separator cartridge (Biotage) and the solvent removed in vacuo to give 2-(2,4-difluorobenzyl)-2-fluorobutanoic acid (1880 mg, 5.66 mmol, 81%) as a crude orange oil.

Step 4:

To 2-(2,4-difluorobenzyl)-2-fluorobutanoic acid (746 mg, 2.25 mmol) in tetrahydrofuran (75 mL) at 0° C. was added ethyl chloroformate (301 uL, 3.15 mmol) and triethylamine (0.94 mL, 6.75 mmol), and the reaction mixture stirred at 0° C. for 30 mins. To this was then added aqueous 1M ammonium chloride (10 mL, 10.0 mmol) and the resultant reaction mixture stirred at 0° C. for a further 30 mins. To the reaction mixture was added water (60 mL) and extracted with EtOAc (3×80 mL). The organic layers were combined, washed with brine (80 mL), passed through a phase separator cartridge (Biotage) and solvent removed in vacuo to give a crude solid. This was purified by flash column chromatography to give 2-(2,4-difluorobenzyl)-2-fluorobutanamide (450 mg, 1.94 mmol, 86%) as a white solid.

Step 5:

To a stirred solution of 2-(2,4-difluorobenzyl)-2-fluorobutanamide (400 mg, 1.56 mmol) in acetonitrile (8.0 mL) at room temperature was added phosphorus pentoxide (884 mg, 3.11 mmol), and the reaction mixture stirred at reflux for 4 hours. To the reaction mixture was added DCM (40 mL) and washed with a dilute aqueous NaHCO$_3$ solution (15 mL) and water (15 mL). Organic layer was passed through a phase separator cartridge (Biotage) and solvent removed in vacuo to give product as a crude yellow oil. Oil was purified by flash column chromatography to give 2-(2,4-difluorobenzyl)-2-fluorobutanenitrile (273 mg, 1.28 mmol, 82%) as a colourless oil.

Step 6:

To 2-(2,4-difluorobenzyl)-2-fluorobutanenitrile (273 mg, 1.28 mmol) in methanol (12 mL) was added nickel(II) chloride hexahydrate (31 mg, 0.131 mmol) and di-tert-butyl dicarbonate (315 mg, 1.44 mmol) at 0° C. The reaction was cooled to −5° C. and sodium borohydride (99 mg, 2.63 mmol) was very slowly added over the course of 2 minutes. The reaction was then allowed to warm to room temperature and stirred overnight. To this was then added diethylenetriamine (142 uL, 1.31 mmol) and the reaction mixture stirred for a further 30 minutes. Reaction mixture was quenched with saturated aqueous NaHCO$_3$ solution (40 mL) and extracted with EtOAc (3×80 mL). Organic layers were combined, washed with brine (100 mL), passed through a phase separator cartridge (Biotage) and solvent removed in vacuo to give tert-butyl (2-(2,4-difluorobenzyl)-2-fluorobutyl)carbamate as a crude oil (227 mg).

Step 7:

To crude tert-butyl (2-(2,4-difluorobenzyl)-2-fluorobutyl)carbamate (508 mg, 1.60 mmol) in dichloromethane (3.0 mL) was added trifluoroacetic acid (1.0 mL) and the reaction mixture stirred at room temperature for 1 hour. Solvent was removed in vacuo and the oil was dissolved in minimal MeOH and pipetted on to an SCX-2 cartridge (Biotage). The column was flushed with MeOH (4 CVs) followed by 3.5M NH3/MeOH (6 CVs). Fractions containing product were combined and solvent removed in vacuo to give 2-(2,4-difluorobenzyl)-2-fluorobutan-1-amine as crude product post SCX-2 (254 mg, 35% pure by UPLC) as a light yellow oil. This was used in the subsequent steps.

Intermediate 46: C1 Methylated Amines

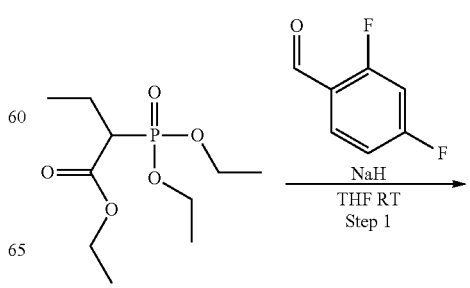

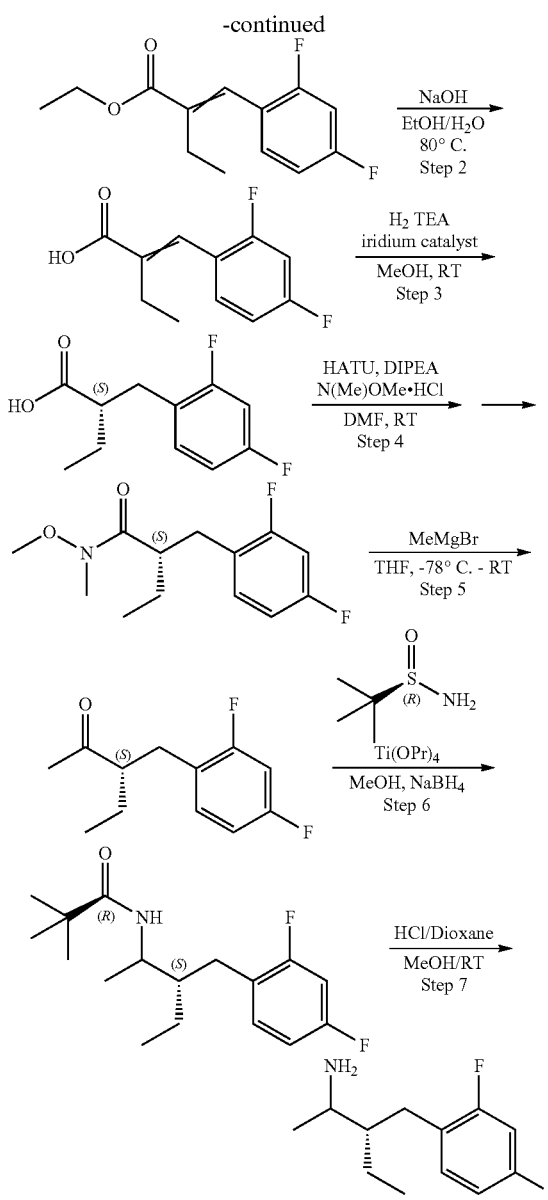

Step 1:

2,4-Difluorobenzaldehyde (8.03 g, 56.5 mmol) and triethyl 2-phosphonobutyrate (13 mL, 56.5 mmol) were combined in THF (150 ml). Sodium hydride (60% dispersion in oil) (2.37 g, 98.9 mmol) was added portion wise over 5 mins at room temperature, heated to reflux for 3.5 hrs, then stirred at room temperature for 16 hrs. Water was added (50 mL) and the reaction stirred at room temperature for 30 mins. The product was extracted from the aqueous fraction into EtOAc and the organic layer dried over $MgSO_4$, decanted and evaporated to a yellow oil. Purification by flash column chromatography afforded ethyl 2-(2,4-difluorobenzylidene)butanoate (8.06 g, 35 mmol, 63%).

Step 2:

Ethyl 2-(2,4-difluorobenzylidene)butanoate (9.92 g, 41.3 mmol) was suspended in ethanol (5 mL) and water (35 mL) and sodium hydroxide (2.81 g, 70.1 mmol) was added. The reaction was heated to 80° C. overnight. The reaction was cooled to room temperature and diluted further with water (25 mL). The pH was adjusted to pH2 with aqueous HCl, affording a white precipitate. The product was extracted into EtOAc and the organic fraction dried over $MgSO_4$, filtered and the solvent evaporated to a yield 2-(2,4-difluorobenzylidene)butanoic acid (8.3 g, 39.1 mmol, 95%) as a light pink solid.

Step 3:

Freshly made (Sa,S)-DTB-Bn-SIPHOX-Ir-(COD)-BARF catalyst (100 mg, 0.052 mmol) and 2-(2,4-difluorobenzylidene)butanoic acid (3.0 g, 14.1 mmol) were combined and placed under vacuum, then purged with Ar. Anhydrous methanol was added and the material was degassed again and placed under an Ar atmosphere. Triethylamine (0.56 mL, 3.97 mmol) was added and the reaction was degassed and purged with hydrogen gas (3×) and the reaction was stirred at room temperature under a balloon of hydrogen for 16 hrs. The reaction was evaporated then water added and acidified with aqueous HCl to pH=1, then the product extracted into EtOAc. The organic layer was washed with water and brine and dried over $MgSO_4$, filtered and then the solvent was removed in vacuo to afford the product (S)-2-(2,4-difluorobenzyl)butanoic acid (3.3 g 14 mmol, 100%) as a white solid.

Step 4:

(S)-2-(2,4-difluorobenzyl)butanoic acid (3.3 g, 14 mmol), N,O-dimethylhydroxylamine hydrochloride (1.6 g, 16 mmol), HATU (6 g, 16 mmol), N,N-diisopropylethylamine (7.4 g, 58 mmol, 10 mL) were combined in DMF (100 mL) and stirred at RT for 16 hrs. The reaction was poured over water-ice and stirred, then partitioned with EtOAc and the layers were separated. The aqueous fraction was extracted with EtOAc and the combined organics washed with water, then brine and dried over $MgSO_4$, filtered and the solvent evaporated. Purification by column chromatography afforded (S)-2-(2,4-difluorobenzyl)-N-methoxy-N-methylbutanamide (3.3 g, 13 mmol, 79%) as a clear yellow oil.

Step 5:

(S)-2-(2,4-difluorobenzyl)-N-methoxy-N-methylbutanamide (3.0 g, 12 mmol) was taken into dry THF (30 ml) and was cooled to −78° C. under nitrogen. Methylmagnesium bromide solution (3.0 M, 15.8 ml, 47.7 mmol) was added dropwise via syringe, the reaction was stirred at −78° C. for 30 mins, then allowed to warm to room temperature with stirring for an additional 2 hrs. The reaction was concentrated in vacuo to a thick slurry and worked up with the addition of dilute citric acid and water, stirred and the product extracted into EtOAc. The organic fraction was washed with water, then brine and dried over $MgSO_4$. The suspension was filtered and evaporated to yield (S)-3-(2,4-difluorobenzyl)pentan-2-one (2.45 g, 11.5 mmol, 99%) as a yellow oil.

Step 6:

(S)-3-(2,4-difluorobenzyl)pentan-2-one (150 mg, 0.707 mmol) and titanium (IV) isopropoxide (402 mg, 430 μL, 1.41 mmol) were combined and (R)-2-methylpropane-2-sulfinamide (146 mg, 1.20 mmol) was added. The reaction mixture was heated to 50° C. for 2 days. The turbid suspension was cooled to 0° C. then methanol (5 ml) added. The solution was stirred at 0° C. for 10 mins to equilibrate then sodium borhydride (53 mg, 2.42 mmol) was added. The reaction was then warmed to RT and stirred for 16 hrs. Water was added—forming a white precipitate, this was removed by filtration through celite and the resulting aqueous layer was extracted with EtOAc. The organic layer was washed with water then brine and dried over $MgSO_4$, then the solvent removed and dried under vacuum overnight to afford (R)—N-((3S)-3-(2,4-difluorobenzyl)pentan-2-yl)-2-methyl-propane-2-sulfinamide (204 mg, 0.64 mmol, 91%) as a yellow oil.

Step 7:

(R)—N-((3S)-3-(2,4-difluorobenzyl)pentan-2-yl)-2-methylpropane-2-sulfinamide (204 mg, 0.643 mmol) was taken into methanol (10 mL) and 4M HCl in dioxane (806 ul, 3.2 mmol) was added. The reaction was stirred at room temperature overnight. The material was concentrated in vacuo, redissolved in methanol and loaded onto an SCX-2 column (Biotage). The column was washed with MeOH, then flushed with 2 M NH3/methanol and the solvents removed to give the crude product (3S)-3-(2,4-difluorobenzyl)pentan-2-amine (70 mg, 0.328 mmol, 51.07%) as a pale yellow oil. This was further used as it was.

A similar method was used to synthesise the chiral amine below:

TABLE 7

| Intermediate No. | Amine Intermediate |
|---|---|
| 47 | [structure] |

The following intermediate was synthesised using a similar methodology to the one outlined above for Intermediate 13A (Method B) using commercially available starting materials:

TABLE 8

| Intermediate No | Nitrile Intermediate |
|---|---|
| 48A | [structure] |

Intermediate 48B: 1-(2,4-Difluorobenzyl)-3-fluoro-cyclobutane-1-carbonitrile

Step 1:

1-(2,4-Difluorobenzyl)-3-methoxycyclobutane-1-carbonitrile (670 mg, 2.82 mmol) and tetrabutylammonium iodide (1.10 g 2.97 mmol) were dissolved in chloroform (4.5 mL). Borontrifluoride diethyletherate (366 μL, 2.97 mmol) was added and the mixture stirred at 65° C. for 4 hours. The mixture was diluted with sat. NaHCO$_{3(aq)}$ (30 mL) and extracted with DCM (30 mL). The organic phase was washed successively with sat. Na$_2$SO$_{3(aq)}$ then water (30 mL). The organic phase was passed through a phase separator and the eluent evaporated in vacuo. The crude product was purified by flash chromatography (Biotage, 25 g Sfar column) eluting with isohexane-EtOAc (0-60%) to yield 1-(2,4-difluorobenzyl)-3-hydroxycyclobutane-1-carbonitrile (300 mg, 48%) as a colourless oil.

Step 2:

To 1-(2,4-difluorobenzyl)-3-hydroxycyclobutane-1-carbonitrile (200 mg, 0.896 mmol) in dichloromethane (3.6 mL) at −78° C. was added dropwise (diethylamino)sulfur trifluoride (237 μL, 1.79 mmol) and the mixture stirred at room temperature for 4 days. The reaction mixture was cooled to 0° C. and quenched with cold sat. NaHCO$_{3(aq)}$. The aqueous phase was extracted with DCM (3×). The combined organics were passed through a phase separator and the eluent evaporated in vacuo.

A separate reaction was also carried out using 1-(2,4-difluorobenzyl)-3-hydroxycyclobutane-1-carbonitrile (50 mg, 0.224 mmol) in DCM (0.9 mL) at −78° C. To the solution was added dropwise (diethylamino)sulfur trifluoride (59 μL, 0.448 mmol). the mixture stirred at room temperature for 7 days. The reaction mixture was cooled to 0° C. and quenched with cold sat. NaHCO$_{3(aq)}$ (1.5 mL).

The aqueous phase was extracted with DCM (5 mL). The combined organics were passed through a phase separator and the eluent evaporated in vacuo.

The two crude mixtures were combined, and the desired product purified by flash chromatography (Biotage, 25 g Sfar column) eluting with isohexane-EtOAc (0-40%) to yield 1-(2,4-difluorobenzyl)-3-fluorocyclobutane-1-carbonitrile (122 mg, 48% combined yield) as a colourless oil.

The following intermediates were synthesised using a similar methodology to the one outlined above for Intermediate 32A (Method E) using commercially available starting materials or the benzyl bromide intermediate 68:

TABLE 9

| Intermediate No. | Nitrile Intermediate |
|---|---|
| 49A From Intermediate 68 | 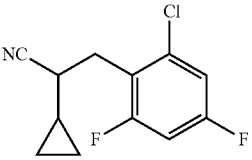 [SMILES: N#CC(Cc1c(F)cc(F)cc1Cl)C1CC1] |
| 50A | 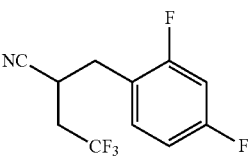 |
| 51A | 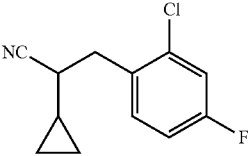 [SMILES: N#CC(Cc1ccc(F)cc1Cl)C1CC1] |
| 52A | 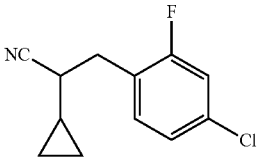 [SMILES: N#CC(Cc1ccc(Cl)cc1F)C1CC1] |
| 53A | 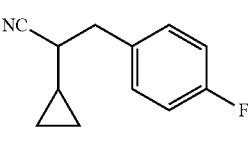 [SMILES: N#CC(Cc1ccc(F)cc1)C1CC1] |

Intermediate 54A: 2-Cyclopropyl-3-(4-fluorophenyl)-2-methylpropanenitrile

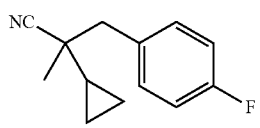

2-Cyclopropyl-3-(4-fluorophenyl)-2-methylpropanenitrile was synthesised using a similar methodology to Intermediate 39A (2-Cyclopropyl-3-(2,4-difluorophenyl)-2-methylpropanenitrile).

The following amines were synthesised using a similar methodology to the one outlined above for Intermediate 13 A (Method G) Nitrile Reduction. On occasion, additional heating was applied to the reaction for a couple of hours to complete the conversion:

TABLE 10

| Intermediate No | Amine Intermediate |
|---|---|
| 49B | 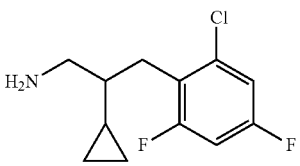 [SMILES: NCC(Cc1c(F)cc(F)cc1Cl)C1CC1] |
| 50B | 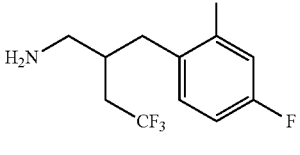 |
| 51B | 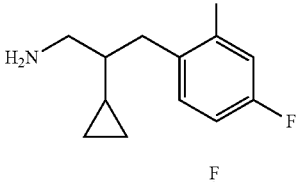 |
| 52B | 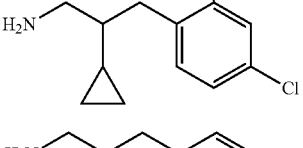 |
| 53B | 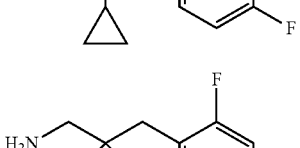 |
| 48C | 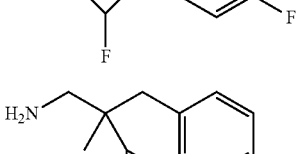 |
| 54B | 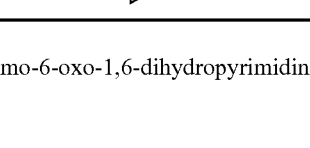 |

Intermediate 55: 5-Bromo-6-oxo-1,6-dihydropyrimidine-2-carboxylic acid

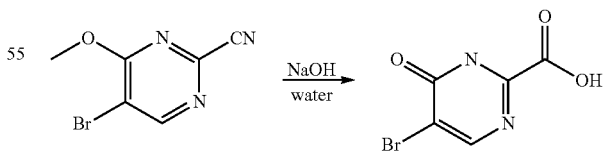

5-Bromo-4-methoxy-pyrimidine-2-carbonitrile (250 mg, 1.17 mmol) in 1M sodium hydroxide solution (4.0 mL, 4.00 mmol) was stirred at 35° C. for 6 h then stirred at rt for 16 hours. The solution was adjusted to pH3 with 1M HCl and the mixture concentrated in vacuo to give the crude product as a white solid. The crude product was taken through to the next step without further purification.

Intermediates 56 and 57: 2-Cyclopropyl-3-(2,4-difluorophenyl)-2-methylpropan-1-amine Enantiomer A and B

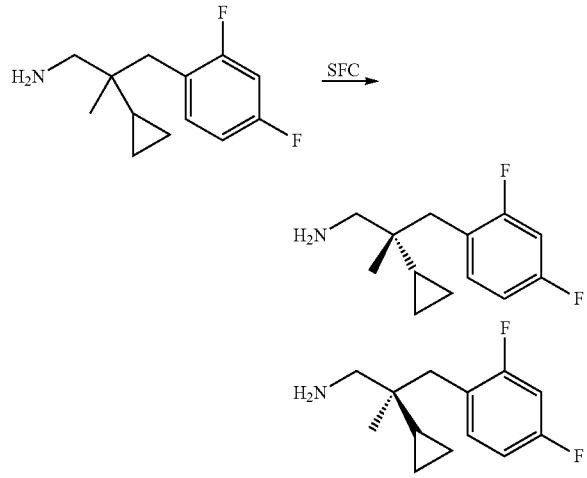

2-Cyclopropyl-3-(2,4-difluorophenyl)-2-methylpropan-1-amine (Intermediate 39B) (18 g, 80 mmol) was separated by SFC with the following conditions: Column: CHIRALPAK AY-H, 3*25 cm, 10 μm; Mobile Phase: 45% EtOH (containing 0.1% 2M NH₃ in MeOH)/CO₂; Flow rate: 100 mL/min. Sample Solvent: MeOH; Injection Volume: 1.5 mL. Concentration of the appropriate fractions gave:

Enantiomer A. Rt 3.9 min

LCMS (ES, m/z): 226.2 [M+H]$^+$ $^1$H-NMR: (300 MHz, DMSO-d$_6$, ppm): δ 7.33 (td, J=8.7, 6.9 Hz, 1H), 7.11 (ddd, J=10.4, 9.4, 2.6 Hz, 1H), 6.98 (tdd, J=8.5, 2.7, 1.0 Hz, 1H), 2.59 (d, J=1.9 Hz, 2H), 2.36 (d, J=1.8 Hz, 2H), 1.39 (s, 2H), 0.67 (tt, J=8.6, 5.7 Hz, 1H), 0.41 (d, J=1.3 Hz, 3H), 0.26-0.07 (m, 3H), 0.04--0.09 (m, 1H);

$^{19}$F-NMR: (282 MHz, DMSO-d$_6$, ppm): 5-111.2, -113.7.

Enantiomer B. Rt 1.98 min

LCMS (ES, m/z): 226.2 [M+H]$^+$ $^1$H-NMR: (300 MHz, DMSO-d$_6$, ppm): δ 7.33 (td, J=8.7, 6.9 Hz, 1H), 7.11 (ddd, J=10.4, 9.4, 2.6 Hz, 1H), 6.98 (tdd, J=8.5, 2.7, 1.0 Hz, 1H), 2.59 (d, J=1.9 Hz, 2H), 2.36 (d, J=1.8 Hz, 2H), 1.39 (s, 2H), 0.67 (tt, J=8.6, 5.7 Hz, 1H), 0.41 (d, J=1.3 Hz, 3H), 0.26-0.07 (m, 3H), 0.04--0.09 (m, 1H);

$^{19}$F-NMR: (282 MHz, DMSO-d$_6$, ppm): δ -111.2, -113.7.

Intermediates 58 and 59: 2-Cyclopropyl-3-(4-fluorophenyl)-2-methylpropan-1-amine Enantiomer A and Enantiomer B

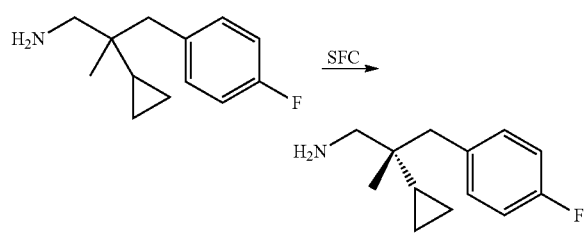

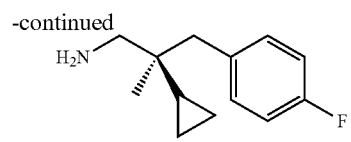

2-Cyclopropyl-3-(4-fluorophenyl)-2-methylpropan-1-amine (Intermediate 54B) (15 g, 72 mmol) was purified by SFC with the following conditions: Column: CHIRALPAK AY-H, 3*25 cm, 10 μm; Mobile Phase: 50% EtOH (containing 0.1% 2 M NH₃ in MeOH)/CO₂; Flow rate: 100 mL/min; Sample Solvent: MeOH; Injection Volume: 1 mL. Concentration of the appropriate fractions gave:

Enantiomer A. Rt 2.5 min (2S)-2-cyclopropyl-3-(4-fluorophenyl)-2-methylpropan-1-amine (5.7 g, 36% yield) as a light-yellow oil.

LCMS: (ES, m/z): 208.1 [M+H]$^+$ $^1$H NMR: (400 MHz, DMSO-d$_6$, ppm): δ 7.28-7.17 (m, 2H), 7.12-7.01 (m, 2H), 2.55 (s, 2H), 2.32 (s, 2H), 1.50 (s, 2H), 0.65-0.57 (m, 1H), 0.41 (s, 3H), 0.27-0.11 (m, 3H), 0.10-0.01 (m, 1H).

$^{19}$F NMR: (282 MHz, DMSO-d$_6$, ppm): δ -117.9.

Enantiomer B. Rt 1.95 min

LCMS: (ES, m/z): 208.2 [M+H]$^+$ $^1$H NMR: (300 MHz, DMSO-d$_6$, ppm): δ 7.29-7.15 (m, 2H), 7.11-7.04 (m, 2H), 2.56 (s, 2H), 2.33 (s, 2H), 1.76 (s, 2H), 0.67-0.57 (m, 1H), 0.41 (s, 3H), 0.26-0.10 (m, 3H), 0.09-0.02 (m, 1H).

$^{19}$F NMR: (282 MHz, DMSO-d$_6$, ppm): δ -117.7.

Benzyl Alcohol Intermediates:

Intermediate 60: (2-(methoxymethyl)phenyl)methanol

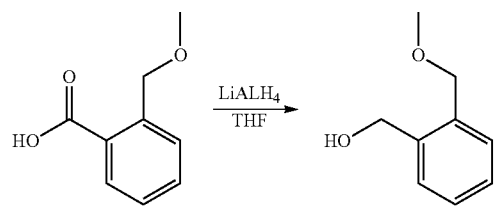

To a 3-necked flask purged and maintained with nitrogen was added 2-(methoxymethyl)benzoic acid (900 mg, 5.42 mmol) in tetrahydrofuran (18 mL). The reaction mixture was cooled to 0° C. and to this was added lithium aluminium hydride 1.0 M in THF (16.2 mL, 16.2 mmol) dropwise at 0-5° C. The resulting reaction mixture was stirred at room temperature for 2 hours.

Reaction was cooled to 0° C., quenched with aqueous Rochelle's salt solution (50 mL) and extracted with EtOAc (100 mL). Organic layer was washed with brine (50 mL), passed through a phase separator cartridge (Biotage) and solvent removed in vacuo to give a crude oil.

Crude was purified by flash column to give (2-(methoxymethyl)phenyl)methanol (774 mg, 5.08 mmol, 94%) as a colourless oil.

The following compounds were synthesised using a similar methodology to the one outlined above for Intermediate 60:

TABLE 11

| Intermediate No. | Benzyl alcohol intermediate |
| --- | --- |
| 61 | 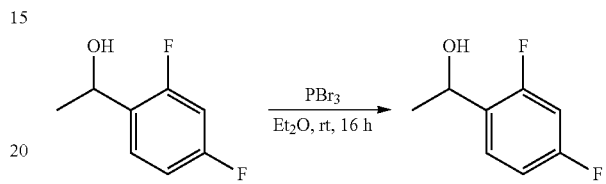 |

Intermediate 62: (3-ethylphenyl)methanol

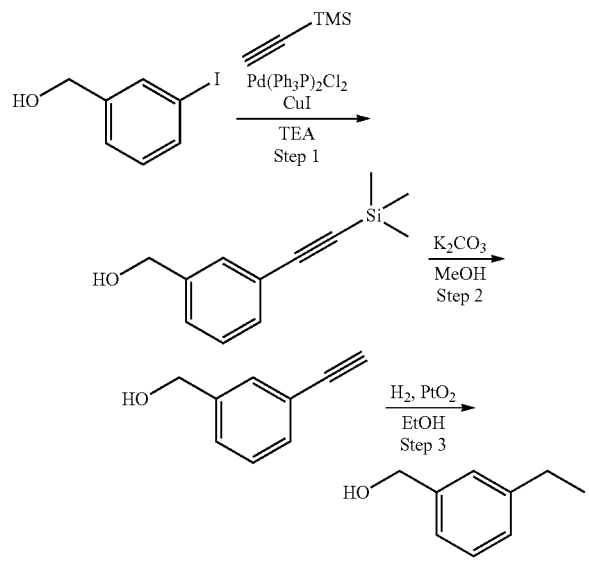

Step 1:

To a microwave vial was added (3-iodophenyl)methanol (814 uL, 6.41 mmol), bis(triphenylphosphine)palladium(II) dichloride (84 mg, 0.120 mmol), copper(I) iodide (49 mg, 0.255 mmol) and triethylamine (7.5 mL, 54.0 mmol), and the reaction mixture was purged with nitrogen for 10 minutes, while sonicating. (Trimethylsilyl)acetylene (1367 uL, 9.60 mmol) was added to the reaction mixture and this was stirred at 100° C. for 2 hours in a microwave reactor. Reaction mixture was diluted with EtOAc (150 mL) and washed with 1M HCl (80 mL×2), water (80 mL) and brine (80 mL). Organic layer was passed through a phase separator cartridge (Biotage) and solvent removed in vacuo. The crude was purified by flash column chromatography to give (3-((trimethylsilyl)ethynyl)phenyl)methanol (1.05 g, 4.89 mmol, 76%) as an orange oil.

Step 2:

To (3-((trimethylsilyl)ethynyl)phenyl)methanol (1290 mg, 6.31 mmol) in methanol (18 mL) was added potassium carbonate (4363 mg, 31.6 mmol) and the reaction mixture stirred at room temperature for 1 hour.

Solvent was removed in vacuo, the residue was diluted with water (100 mL) and washed with diethyl ether (3×100 mL). Organic layers were combined, passed through a phase separator cartridge (Biotage) and solvent removed in vacuo. Oil was purified by flash column chromatography to give (3-ethynylphenyl)methanol (759 mg, 5.74 mmol, 91%) as a yellow oil.

Step 3:

To (3-ethynylphenyl)methanol (758 mg, 5.74 mmol) in ethanol (80 mL) was added Platinum (IV) oxide, Adam's catalyst (391 mg, 1.72 mmol). The reaction mixture was evacuated and refilled with nitrogen (×3) and the flask was then refilled with hydrogen at 1 atm. The reaction mixture was stirred at room temperature under an $H_2$ atmosphere for 1 hour.

The mixture was filtered through a celite cartridge (Biotage) and washed with MeOH (3 CVs). Solvent was removed in vacuo to give (3-ethylphenyl)methanol (575 mg, 4.22 mmol, 74%) as a yellow oil.

Benzyl Bromide Intermediates

Intermediate 63:
1-(1-bromoethyl)-2,4-difluorobenzene

To 1-(2,4-difluorophenyl)ethan-1-ol (2500 mg, 15.8 mmol) in diethyl ether (80 mL) was added phosphorous tribromide (1.7 mL, 17.4 mmol) and the mixture stirred at room temperature overnight.

The reaction was diluted with $Et_2O$ (20 mL) and $H_2O$ (50 mL) was added. The organic layer was passed through a phase separator cartridge (Biotage) and concentrated under reduced pressure to give a crude oil.

This was purified by flash column chromatography to give 1-(1-bromoethyl)-2,4-difluorobenzene (2.96 g, 13.4 mmol, 85%) as a colourless oil.

The following compounds were synthesised using a similar methodology to the one outlined above for Intermediate 63 using commercially available starting materials or benzyl alcohol intermediates. In some instances, the reaction mixture was stirred at room temperature for a different length of time:

TABLE 12

| Intermediate No. | Benzyl bromide intermediate |
| --- | --- |
| 64 From Intermediate 62 | |
| 65 From Intermediate 60 | |
| 66 | |
| 67 From Intermediate 61 | |

TABLE 12-continued

| Intermediate No. | Benzyl bromide intermediate |
|---|---|
| 68 | (2-bromomethyl-3-chloro-1,5-difluorobenzene structure) |

Intermediate 69:
2-(2,4-difluorobenzyl)-N-methylbutan-1-amine

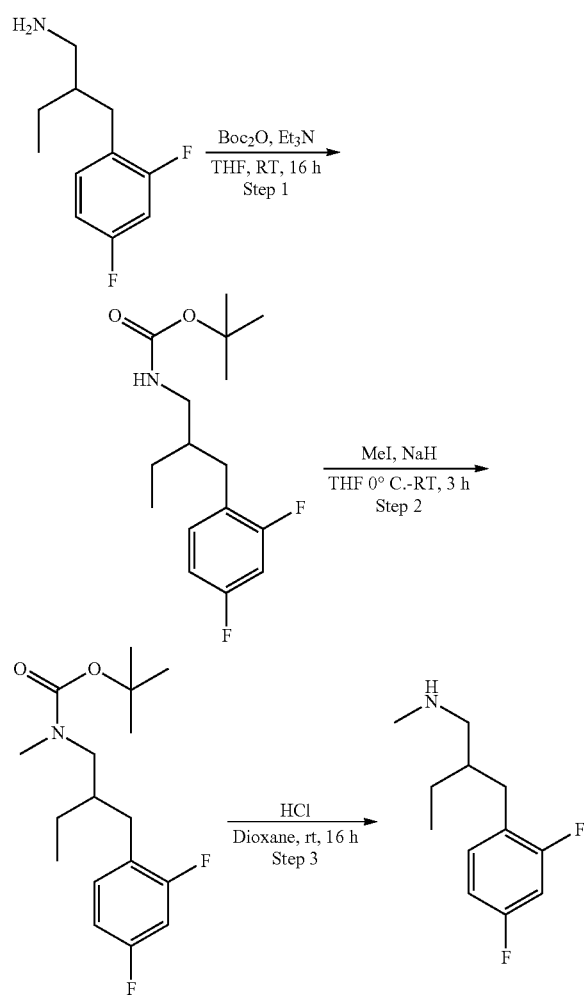

Step 1:

Di-tert-butyl dicarbonate (361 mg, 1.66 mmol) was dissolved in tetrahydrofuran (3.0 mL) under nitrogen and 2-(2,4-difluorobenzyl)butan-1-amine (220 mg, 1.10 mmol) added as a solution in tetrahydrofuran (3.0 mL) followed by triethylamine (0.18 mL, 1.33 mmol). The reaction was stirred at room temperature overnight. The reaction was diluted with water (5 mL) and extracted with DCM (3×10 mL), combined organic fractions were washed with brine (10 mL) and passed through a phase separator cartridge (Biotage) and evaporated to dryness. The material was purified by flash column chromatography to afford tert-butyl (2-(2,4-difluorobenzyl)butyl)carbamate (330 mg, 1.10 mmol, 100%) as a colourless oil.

Step 2:

Tert-butyl (2-(2,4-difluorobenzyl)butyl)carbamate (330 mg, 1.10 mmol) was dissolved in tetrahydrofuran (10 mL) under $N_2$ and cooled to 0° C. Sodium hydride (60% dispersion in oil) (53 mg, 1.32 mmol) was added portion wise over 5 minutes and the solution stirred for ca. 10 mins. Iodomethane (83 uL, 1.32 mmol) was added and the solution was allowed to warm to room temperature over 3 h. The reaction was diluted with water (10 mL) and extracted with DCM (3×10 mL). The combined organic layers were washed with brine (10 mL) and passed through a phase separator cartridge (Biotage). The solution was evaporated to dryness and the residue was purified by flash column chromatography to afford tert-butyl (2-(2,4-difluorobenzyl)butyl)(methyl)carbamate (200 mg, 0.638 mmol, 58%) as a colourless oil.

Step 3:

Tert-butyl (2-(2,4-difluorobenzyl)butyl)(methyl)carbamate (200 mg, 0.638 mmol) was dissolved in 1,4-dioxane (10 mL) and hydrochloric acid 1 M in dioxane (319 uL, 1.28 mmol) added. The solution was stirred at room temperature overnight before dilution with water (15 mL) and extraction with DCM (3×15 mL). The combined organic layers were washed with brine (15 mL) and passed through a phase separator cartridge (Biotage). The solution was evaporated and the residue was purified by flash column chromatography to afford 2-(2,4-difluorobenzyl)-N-methylbutan-1-amine (120 mg, 0.563 mmol, 88%) as a colourless oil.

Example 1: N-((1-benzylcyclobutyl)methyl)-5-hydroxynicotinamide

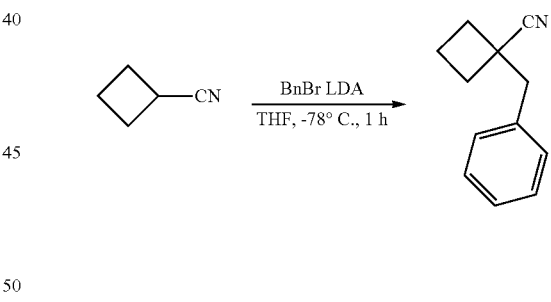

Into a 500-mL 3-necked round-bottom flask purged and maintained with an inert atmosphere of nitrogen, was placed cyclobutanecarbonitrile (6.00 g, 73.97 mmol, 1.00 equiv) and THF (200 mL). LDA (43.00 mL, 317.11 mmol, 1.20 equiv) was added dropwise with stirring at −78° C. and stirred for a further 1 hr at −78° C. Benzyl bromide (15.18 g, 88.76 mmol, 1.20 equiv) was added dropwise with stirring and the resulting solution was stirred for 1 hr at −78° C. The reaction was quenched by the addition of 100 mL of water and extracted with 3×200 mL of ethyl acetate and the combined fractions washed with brine. The organic layer was dried over anhydrous sodium sulfate and concentrated. The residue was applied onto a silica gel column eluting with THF:petroleum ether (0:100-1:50). This resulted in 7 g (55% yield) of 1-benzylcyclobutane-1-carbonitrile as light yellow oil.

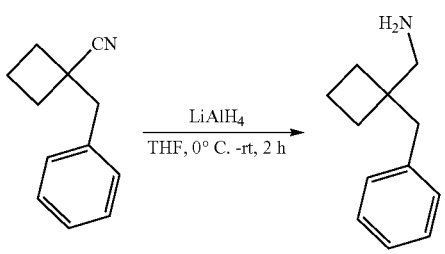 [SMILES: N#CC1(Cc2ccccc2)CCC1 ; "LiAlH4" ; NCC1(Cc2ccccc2)CCC1]

Into a 500-mL 3-necked round-bottom flask purged and maintained with an inert atmosphere of nitrogen, was placed 1-benzylcyclobutane-1-carbonitrile (5.10 g, 29.78 mmol, 1.00 equiv) and THF (150.00 mL). LiAlH$_4$ (2.26 g, 59.56 mmol, 2.00 equiv) was added in portions at 0-5° C. The resulting solution was stirred for 2 hr at room temperature and cooled to 0° C. The reaction was quenched by the addition of 2.5 mL of water, followed by the addition of 7.5 mL of 15% NaOH and again with 2.5 mL of water. The solids were filtered off and the filtrate concentrated. This resulted in 3 g (57% yield) of 1-(1-benzylcyclobutyl)methanamine as a colorless liquid.

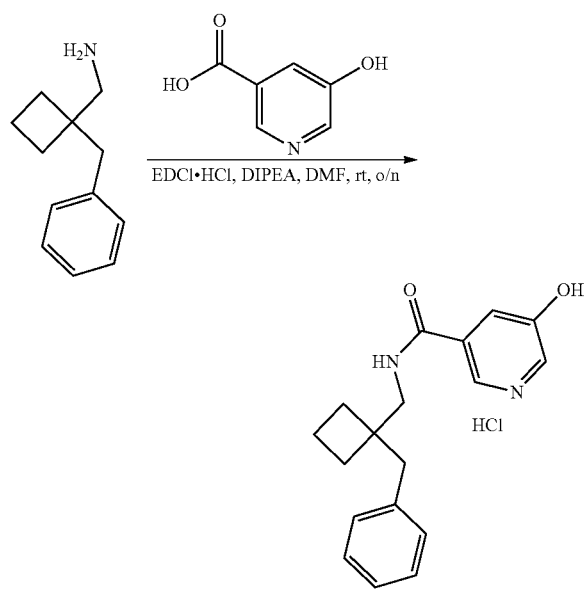

Into a 8-mL sealed tube, was placed 1-(1-benzylcyclobutyl)methanamine (110.00 mg, 0.63 mmol, 1.00 equiv), 5-hydroxypyridine-3-carboxylic acid (104.76 mg, 0.75 mmol, 1.2 equiv), EDCI·HCl (180.46 mg, 0.94 mmol, 1.50 equiv), DIPEA (203.175 mg, 1.575 mmol, 2.5 equiv) and DMF (3.00 mL). The resulting solution was stirred overnight at room temperature. The mixture was purified by Prep-HPLC. This resulted in 24.3 mg of N-[(1-benzylcyclobutyl)methyl]-5-hydroxypyridine-3-carboxamide hydrochloride as an off-white solid.

LC-MS (ES, m/z): [M+H]$^+$=297

H-NMR (300 MHz, DMSO-d$_6$, ppm): δ 10.87 (brs, 1H), 8.63-8.60 (m, 2H), 8.36 (s, 1H), 7.81 (s, 1H), 7.33-7.19 (m, 5H), 3.30 (d, J=6.0 Hz, 2H), 2.76 (s, 2H), 1.86-1.64 (m, 6H).

Example 2: N-((1-benzylcyclobutyl)methyl)-6-hydroxypyrazine-2-carboxamide

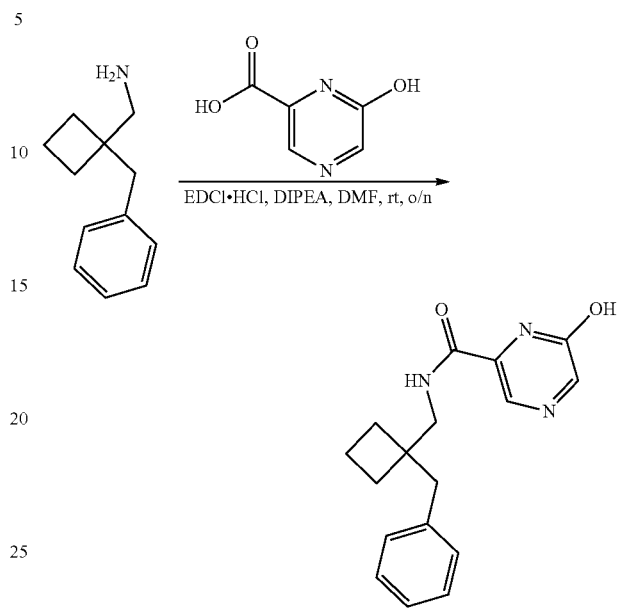

Prepared as for Example 1 using 1-(1-benzylcyclobutyl)methanamine (300.00 mg, 1.71 mmol, 1.00 equiv) and 6-hydroxypyrazine-2-carboxylic acid (287.75 mg, 2.05 mmol, 1.20 equiv) to give the product as a white solid (23.3 mg).

LC-MS (ES, m/z): [M+H]$^+$=298

H-NMR (300 MHz, DMSO-d$_6$, ppm): δ 8.25-8.20 (m, 1H), 8.07 (s, 1H), 7.85 (s, 1H), 7.31-7.17 (m, 5H), 3.23 (d, J=6.3 Hz, 2H), 2.64 (s, 2H), 1.82-1.63 (m, 6H).

Example 3: N-((1-benzylcyclobutyl)methyl)-5-hydroxy-6-methylnicotinamide

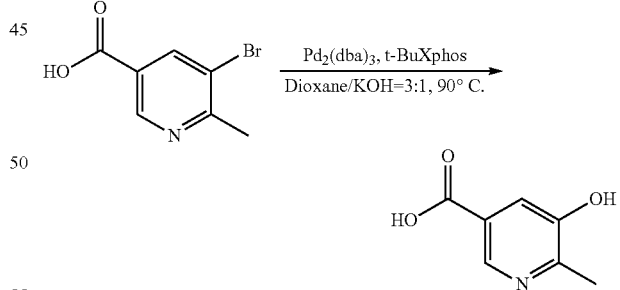

Into a 40-mL vial purged and maintained under an inert atmosphere of nitrogen, was placed 5-bromo-6-methylpyridine-3-carboxylic acid (300.00 mg, 1.39 mmol, 1.00 equiv), dioxane/KOH (aq.2M) (12.00 mL), Pd$_2$(dba)$_3$ (63.58 mg, 0.069 mmol, 0.05 equiv) and t-BuXphos (58.97 mg, 0.139 mmol, 0.10 equiv). The resulting solution was stirred for 12 h at 90° C. The reaction mixture was cooled to room temperature and diluted with 10 mL of water. The pH of the solution was adjusted to 5 with HCl (3 mol/L), and the resulting solution extracted with 2×15 mL of ethyl acetate. The organic layer was concentrated and the residue was purified by Flash-Prep-HPLC. This resulted in 130 mg (61% yield) of 5-hydroxy-6-methylpyridine-3-carboxylic acid.

with 2×15 mL of ethyl acetate and the organic layer was concentrated and the residue was purified by Flash-Prep-HPLC. This resulted in 130 mg (61% yield) of 5-hydroxy-4-methylpyridine-3-carboxylic acid as a white solid.

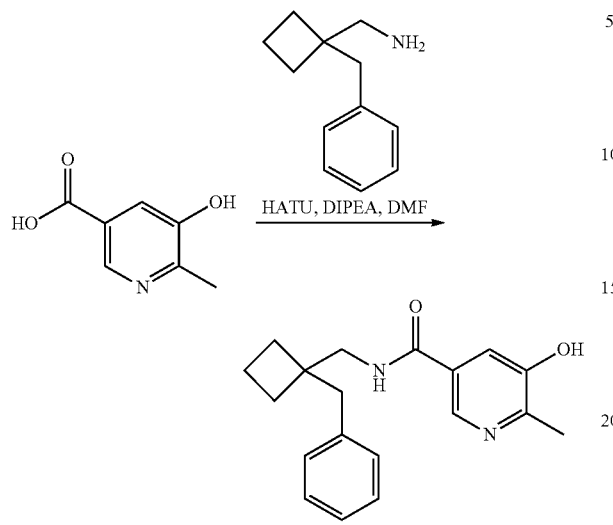

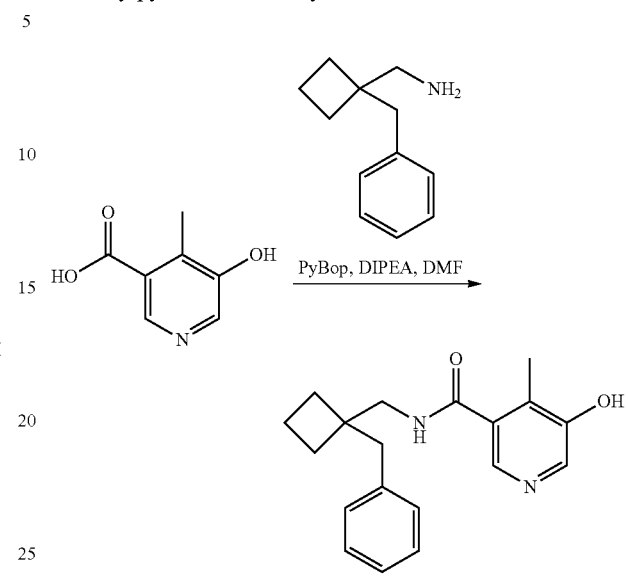

Into a vial, was placed 5-hydroxy-6-methylpyridine-3-carboxylic acid (100.00 mg, 0.653 mmol, 1.00 equiv), DMF (3.00 mL), HATU (322.78 mg, 0.85 mmol, 1.30 equiv), DIPEA (168.79 mg, 1.31 mmol, 2.00 equiv), and 1-(1-benzylcyclobutyl)methanamine (125.90 mg, 0.72 mmol, 1.10 equiv). The resulting solution was stirred for 5 h at room temperature. The mixture was concentrated and purified by Prep-HPLC. This resulted in 20 mg of N-[(1-benzylcyclobutyl)methyl]-5-hydroxy-6-methylpyridine-3-carboxamide as an off-white solid.

LC-MS (ES, m/z): [M+H]$^+$=311

H-NMR (300 MHz, DMSO-d$_6$, ppm): 10.02 (s, 1H), 8.44-8.38 (m, 2H), 7.49 (s, 1H), 7.32-7.19 (m, 5H), 3.32-3.27 (m, 2H), 2.75 (s, 2H), 2.37 (s, 3H), 1.85-1.63 (m, 6H).

Example 4: N-((1-benzylcyclobutyl)methyl)-5-hydroxy-4-methylnicotinamide

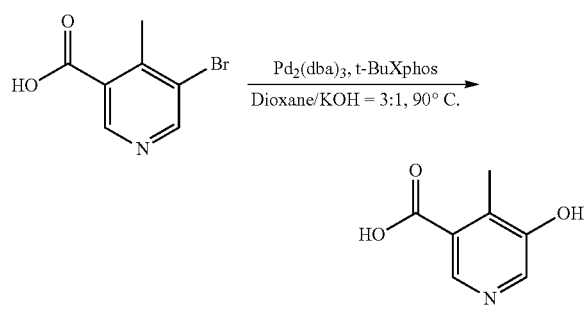

Into a vial purged and maintained under an inert atmosphere of nitrogen, was placed 5-bromo-4-methylpyridine-3-carboxylic acid (300.00 mg, 1.389 mmol, 1.00 equiv), dioxane/KOH (aq.2M) (12.00 mL), Pd$_2$(dba)$_3$ (63.58 mg, 0.069 mmol, 0.05 equiv), t-BuXphos (58.97 mg, 0.139 mmol, 0.10 equiv). The resulting solution was stirred for 12 hr at 90° C. The reaction mixture was cooled to room temperature and the pH of the solution was adjusted to 5 with HCl (3 mol/L). The resulting solution was extracted Into a, was placed 5-hydroxy-4-methylpyridine-3-carboxylic acid (80.00 mg, 0.522 mmol, 1.00 equiv), DMF (3.00 mL), 1-(1-benzylcyclobutyl)methanamine (100.72 mg, 0.574 mmol, 1.10 equiv), DIPEA (135.04 mg, 1.044 mmol, 2.00 equiv), and PyBop (353.41 mg, 0.679 mmol, 1.30 equiv). The resulting solution was stirred for 5 hr at room temperature, concentrated and purified by Prep-HPLC. This resulted in 15 mg of N-[(1-benzylcyclobutyl)methyl]-5-hydroxy-4-methylpyridine-3-carboxamide as an off-white solid.

LC-MS (ES, m/z): [M+H]$^+$=311

H-NMR (300 MHz, DMSO-d$_6$, ppm): 9.87 (s, 1H), 8.43-8.41 (m, 1H), 8.06 (d, J=2.7 Hz, 1H), 7.33-7.20 (m, 5H), 7.09 (d, J=2.7 Hz, 1H), 3.32-3.14 (m, 2H), 2.80 (s, 2H), 2.41 (s, 3H), 1.97-1.70 (m, 6H).

Example 5: N-((1-benzylcyclobutyl)methyl)-1H-1,2,3-triazole-5-carboxamide

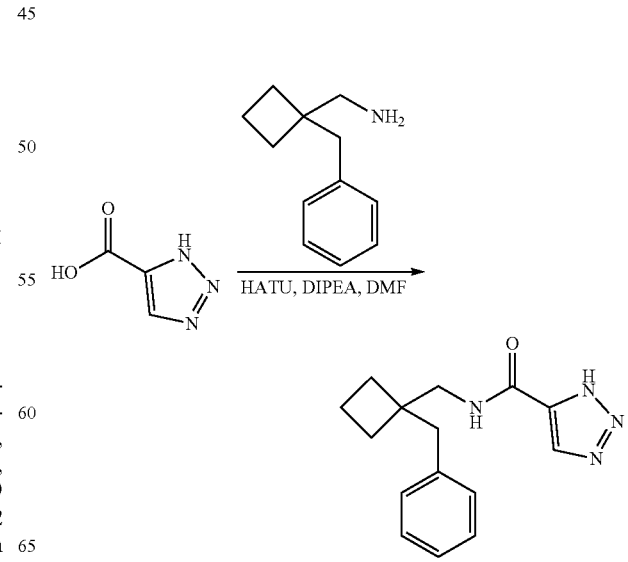

Prepared as for Example 3 using 3H-1,2,3-triazole-4-carboxylic acid (40.00 mg, 0.35 mmol, 1.00 equiv) and 1-(1-benzylcyclobutyl)methanamine (65.10 mg, 0.37 mmol, 1.05 equiv). This resulted in 18 mg of N-[(1-benzylcyclobutyl)methyl]-3H-1,2,3-triazole-4-carboxamide as a off-white solid.

LC-MS (ES, m/z): [M+H]$^+$=271

H-NMR (300 MHz, DMSO-d$_6$, ppm): 8.32-8.30 (m, 2H), 7.32-7.21 (m, 5H), 3.31-3.29 (m, 2H), 2.73 (s, 2H), 1.91-1.62 (m, 6H).

Example 6: N-((1-benzylcyclobutyl)methyl)-2-oxo-2,3-dihydropyrimidine-4-carboxamide

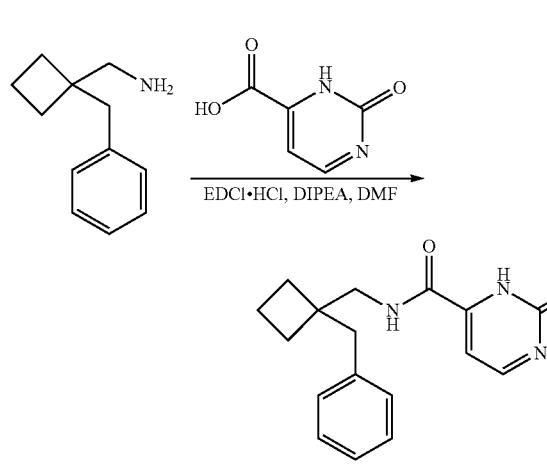

Prepared according to Example 1 using 1-(1-benzylcyclobutyl)methanamine (100.00 mg, 0.571 mmol, 1.00 equiv) and 2-oxo-3H-pyrimidine-4-carboxylic acid (79.93 mg, 0.571 mmol, 1.00 equiv). This resulted in 15 mg of N-[(1-benzylcyclobutyl)methyl]-2-oxo-3H-pyrimidine-4-carboxamide as an off-white solid.

LC-MS (ES, m/z): [M+H]$^+$=298

H-NMR (400 MHz, DMSO-d$_6$, ppm) δ, 8.66-8.57 (m, 1H), 8.17 (d, J=6.0 Hz, 1H), 7.31-7.20 (m, 5H), 6.87 (d, J=6.0 Hz, 1H), 3.29 (d, J=6.4 Hz, 2H), 2.71 (s, 2H), 1.84-1.81 (m, 4H), 1.75-1.71 (m, 1H), 1.69-1.59 (m, 1H).

Example 7: N-((1-benzylcyclobutyl)methyl)-6-oxo-1,6-dihydropyrimidine-2-carboxamide

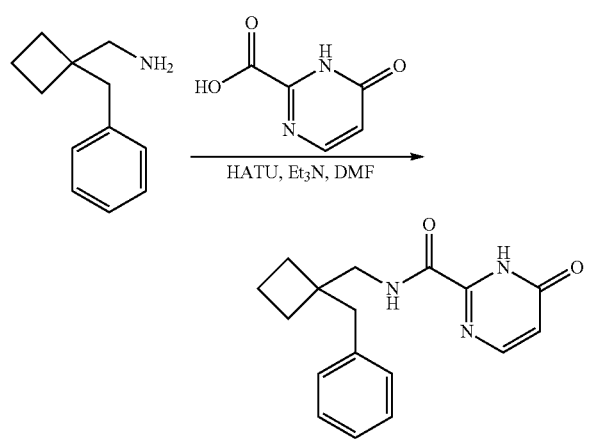

Prepared according to Example 3 using 1-(1-benzylcyclobutyl)methanamine (60.00 mg, 0.342 mmol, 1.00 equiv) and 4-oxo-3H-pyrimidine-2-carboxylic acid (47.96 mg, 0.342 mmol, 1.00 equiv). This resulted in 10 mg of N-[(1-benzylcyclobutyl)methyl]-4-oxo-3H-pyrimidine-2-carboxamide as an off-white solid.

LC-MS (ES, m/z): [M+H]$^+$=298

H-NMR (300 MHz, DMSO-d$_6$, ppm) δ 8.783 (m, 1H), 7.95-7.92 (m, 1H), 7.30-7.21 (m, 5H), 6.38-6.36 (m, 1H), 3.35-3.30 (m, 2H), 2.71 (s, 2H), 1.86-1.61 (m, 6H), Example 8: N-((1-benzylcyclobutyl)methyl)-5-oxo-2,5-dihydro-1H-1,2,4-triazole-3-carboxamide

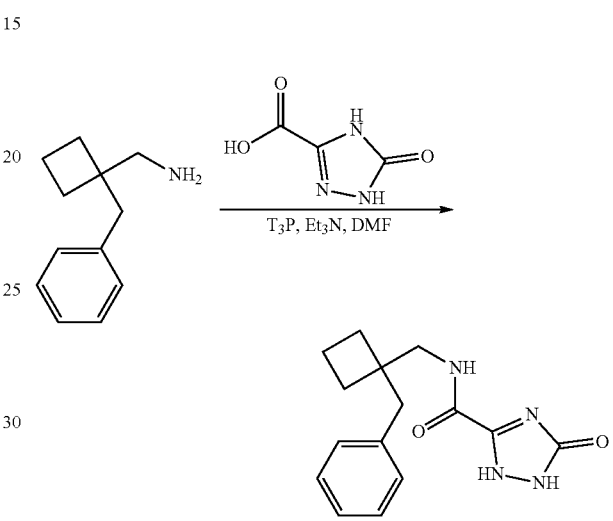

To a stirred mixture of (1-benzylcyclobutyl)methanamine (68.7 mg, 0.393 mmol, 1.00 equiv) and 5-oxo-4,5-dihydro-1H-1,2,4-triazole-3-carboxylic acid (50.70 mg, 0.393 mmol, 1.00 equiv) in DMF was added T$_3$P (187.78 mg, 0.590 mmol, 1.50 equiv) and TEA (119.44 mg, 1.179 mmol, 3.00 equiv) at room temperature under nitrogen atmosphere. The resulting mixture was stirred overnight at room temperature under nitrogen atmosphere. The mixture was purified by Prep-HPLC to afford N-((1-benzylcyclobutyl)methyl)-5-oxo-2,5-dihydro-1H-1,2,4-triazole-3-carboxamide (9 mg) as an off-white solid. LC-MS (ES, m/z): [M+H]$^+$=287

Example 9: N-((1-benzylcyclobutyl)methyl)-5-methyl-6-oxo-1,6-dihydropyrimidine-2-carboxamide

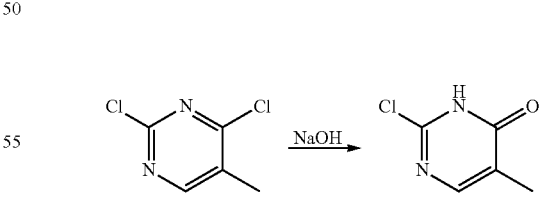

To a stirred mixture of 2,4-dichloro-5-methylpyrimidine (5 g, 30.67 mmol, 1.00 equiv) in THF and water was added NaOH (9.82 g, 245.40 mmol, 8.00 equiv) in portions at room temperature under nitrogen atmosphere. The resulting mixture was stirred for 10 h at 60° C. under a nitrogen atmosphere. The mixture was acidified to pH 5 with conc. HCl and the aqueous layer extracted with EtOAc (3×40 mL), dried over sodium sulfate and concentrated. The crude product was used directly in the next step.

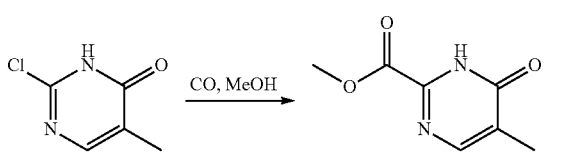

To a solution of 2-chloro-5-methyl-3H-pyrimidin-4-one (500 mg, 3.46 mmol, 1.00 equiv) in 10 mL MeOH was added TEA (1049.98 mg, 10.38 mmol, 3.00 equiv) and Pd(dppf)Cl$_2$ (10%, 50 mg) in a pressure vessel. The mixture was purged with nitrogen for 5 min and then was pressurized to 20 atm with carbon monoxide at 120° C. for overnight. The reaction mixture was cooled to room temperature and filtered to remove insoluble solids. The mixture was concentrated and this resulted in methyl 5-methyl-4-oxo-3H-pyrimidine-2-carboxylate (250 mg, 43% yield) as a yellow solid.

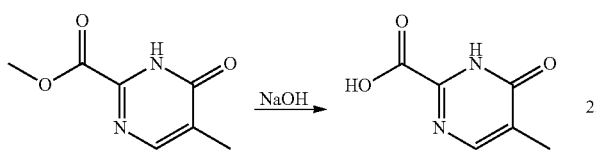

To a stirred mixture of methyl 5-methyl-4-oxo-3H-pyrimidine-2-carboxylate (190 mg, 1.13 mmol, 1.00 equiv) and MeOH (5 mL) in water were added NaOH (90.39 mg, 2.26 mmol, 2.00 equiv) at room temperature under nitrogen atmosphere. The resulting mixture was stirred for 3 h at room temperature. The mixture was acidified to pH-6 with 1 M HCl aq. The precipitated solids were collected resulting in 5-methyl-4-oxo-3H-pyrimidine-2-carboxylic acid (60 mg, 34% yield) as an off-white solid.

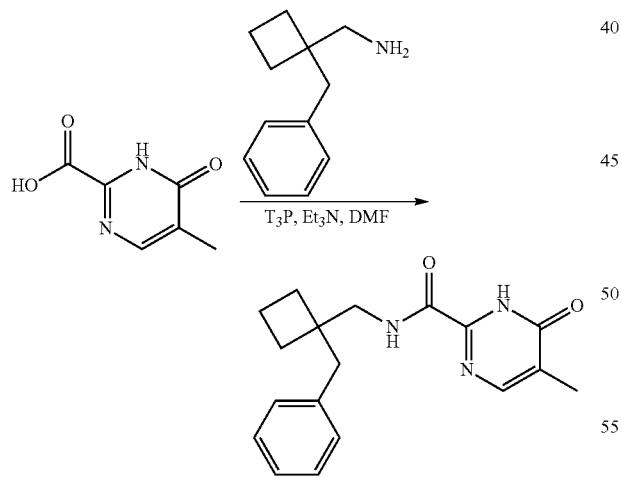

Prepared as for Example 8 using 5-methyl-4-oxo-3H-pyrimidine-2-carboxylic acid (50 mg, 0.324 mmol, 1.00 equiv) and 1-(1-benzylcyclobutyl)methanamine (56.86 mg, 0.324 mmol, 1.00 equiv).

LC-MS (ES, m/z): [M+H]$^+$=312

H-NMR (400 MHz, DMSO-d$_6$, ppm) δ 8.79-8.76 (m, 1H), 7.89 (s, 1H), 7.31-7.19 (m, 5H), 3.30-3.28 (d, J=6.4 Hz, 2H), 2.71 (s, 2H), 1.97 (s, 3H), 1.85-1.81 (m, 4H), 1.77-1.70 (m, 1H), 1.68-1.59 (m, 1H)

Example 10: N-((1-benzylcyclobutyl)methyl)-1-methyl-5-oxo-4,5-dihydro-1H-1,2,4-triazole-3-carboxamide

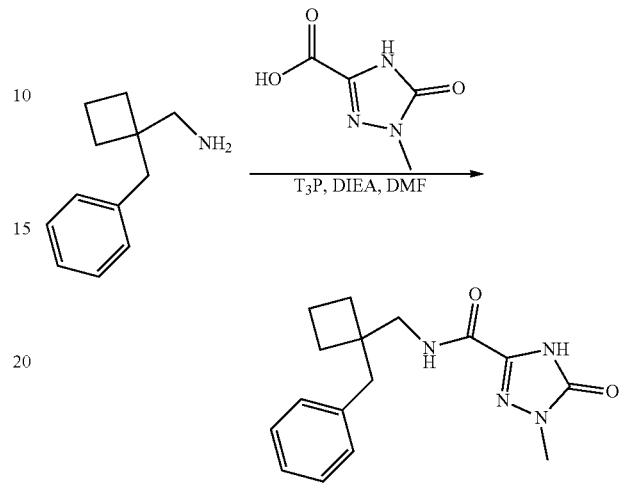

Prepared as for Example 8 using 1-(1-benzylcyclobutyl)methanamine (Example 1, 310 mg, 1.77 mmol, 1.00 equiv) and 1-methyl-5-oxo-4H-1,2,4-triazole-3-carboxylic acid (Intermediate 1, 278.41 mg, 1.95 mmol, 1.10 equiv).

LC-MS (ES, m/z): [M+H]$^+$=301

H-NMR (300 MHz, DMSO-d$_6$, ppm): 11.67 (brs, 1H), 8.51-8.48 (m, 1H), 7.31-7.19 (m, 5H), 3.56 (s, 3H), 3.25-3.23 (m, 2H), 2.70 (s, 2H), 1.86-1.59 (m, 6H).

Example 11: N-((1-benzylcyclobutyl)methyl)-6-hydroxy-N-methylpyrazine-2-carboxamide

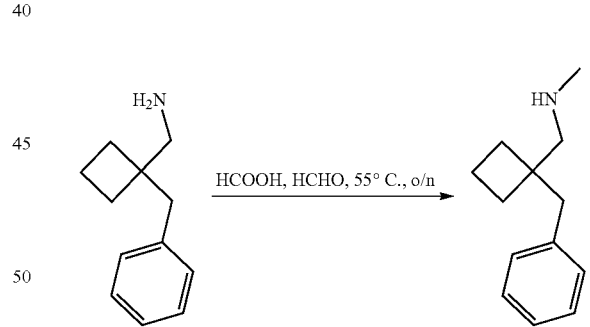

Into a 40-mL sealed tube, was placed 1-(1-benzylcyclobutyl)methanamine (Example 1, 300.00 mg, 1.71 mmol, 1.00 equiv), HCOOH (5.00 mL) and HCHO (37% aqueous) (5.00 mL). The resulting solution was stirred overnight at 55° C. The reaction mixture was cooled to room temperature. The resulting mixture was concentrated and the resulting solution was diluted with 150 mL of EtOAc and washed with 2×80 ml of 10% NaHCO$_3$ and sat·NaCl. The organic layer was dried over anhydrous sodium sulfate and concentrated. The residue was applied onto a silica gel column eluting with THF:PE (1:5-1:3). This resulted in 130 mg (40% yield) of [(1-benzylcyclobutyl)methyl](methyl)amine as colorless oil.

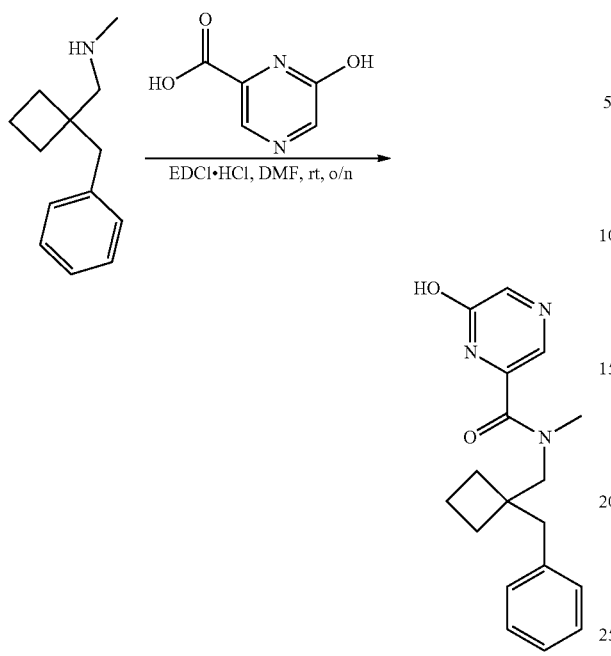

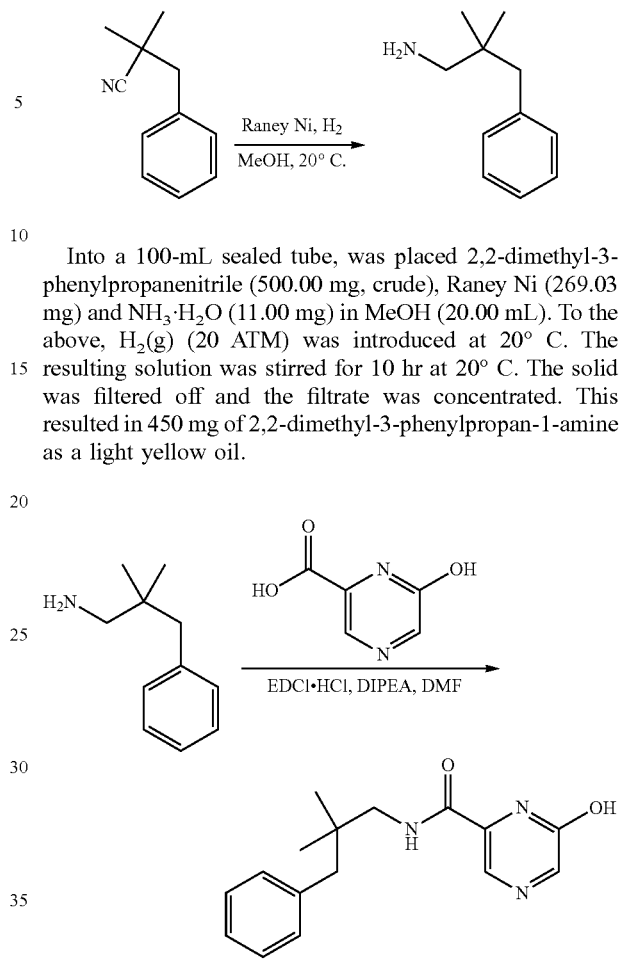

Into a 100-mL sealed tube, was placed 2,2-dimethyl-3-phenylpropanenitrile (500.00 mg, crude), Raney Ni (269.03 mg) and NH$_3$·H$_2$O (11.00 mg) in MeOH (20.00 mL). To the above, H$_2$(g) (20 ATM) was introduced at 20° C. The resulting solution was stirred for 10 hr at 20° C. The solid was filtered off and the filtrate was concentrated. This resulted in 450 mg of 2,2-dimethyl-3-phenylpropan-1-amine as a light yellow oil.

Into a 8-mL sealed tube, was placed [(1-benzylcyclobutyl)methyl](methyl)amine (130.00 mg, 0.69 mmol, 1.00 equiv), 6-hydroxypyrazine-2-carboxylic acid (115.45 mg, 0.82 mmol, 1.20 equiv), EDCI·HCl (197.47 mg, 1.03 mmol, 1.50 equiv) and DMF (4.00 mL). The resulting solution was stirred overnight at room temperature and purified by Flash-Prep-HPLC. This resulted in 12.2 mg of N-[(1-benzylcyclobutyl)methyl]-6-hydroxy-N-methylpyrazine-2-carboxamide as a light yellow solid.

LC-MS (ES, m/z): [M+H]$^+$=312

H-NMR (300 MHz, DMSO-d$_6$, ppm): δ 8.08 (s, 1H), 7.92 (s, 1H), 7.27-7.21 (m, 5H), 3.68 (s, 2H), 3.01 (s, 3H), 2.74-2.72 (m, 2H), 2.05-1.85 (m, 4H), 1.74-1.55 (m, 2H).

Example 12: N-(2,2-dimethyl-3-phenylpropyl)-6-hydroxypyrazine-2-carboxamide

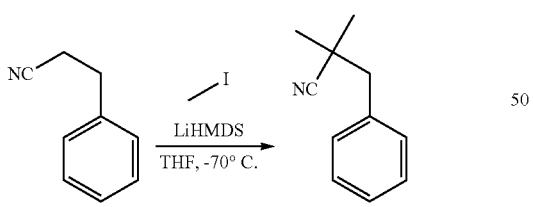

Into a 100-mL 3-necked round-bottom flask, was placed benzylacetonitrile (500.00 mg, 3.81 mmol, 1.00 equiv) and THF (20.00 mL) and cooled to −70° C. LiHMDS (3188.91 mg, 19.06 mmol, 5.00 equiv) was added dropwise, followed by CH$_3$I (2164.07 mg, 15.246 mmol, 4.00 equiv). The resulting solution was stirred for 2 hr at −70° C. The reaction was then quenched by the addition of 20 mL of water and extracted with 2×20 mL of ethyl acetate. The organic layer was washed with brine and dried over anhydrous sodium sulfate and concentrated. This resulted in 500 mg of 2,2-dimethyl-3-phenylpropanenitrile as a light yellow oil which was used for the next step without further purification.

Prepared as for Example 1 using 2,2-dimethyl-3-phenylpropan-1-amine (100.00 mg, 0.613 mmol, 1.00 equiv) and 6-hydroxypyrazine-2-carboxylic acid (85.81 mg, 0.613 mmol, 1.00 equiv).

LC-MS (ES, m/z): [M+H]$^+$=286

H-NMR (300 MHz, DMSO-d$_6$, ppm) δ 8.50 (s, 1H), 8.30 (s, 2H), 7.32-7.30 (m, 2H), 7.24-7.17 (m, 3H), 3.21 (d, J=6.6 Hz, 2H), 2.55 (s, 2H), 0.84 (s, 6H).

Example 13: N-((1-(2-fluorobenzyl)cyclobutyl)methyl)-6-hydroxypyrazine-2-carboxamide

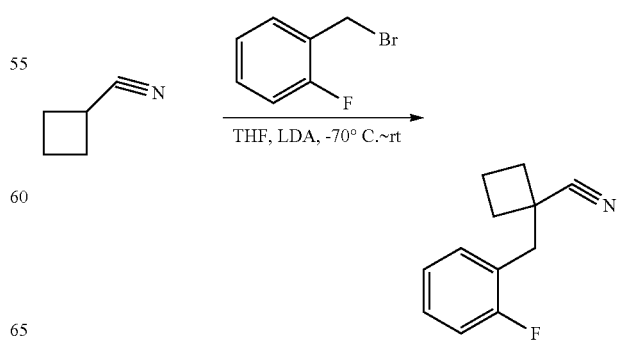

Into a 250-mL 3-necked round-bottom flask purged and maintained with an inert atmosphere of nitrogen, was placed cyclobutanecarbonitrile (2.00 g, 24.65 mmol, 1.00 equiv) and THF (100.00 mL). This was followed by the addition of LDA (2.0 M in THF) (14.2 mL, 28.35 mmol, 1.15 equiv) dropwise with stirring at −78° C. The resulting solution was stirred for 30 mins at this temperature and a solution of 1-(bromomethyl)-2-fluorobenzene (5.13 g, 27.14 mmol, 1.10 equiv) in THF (10 mL) was added dropwise. The reaction mixture was warmed to room temperature and stirred for additional 1 h. The reaction was then quenched by the addition of 50 mL of water and extracted with 2×50 mL of ethyl acetate, the organic layer was dried and concentrated. The residue was applied onto a silica gel column eluting with ethyl acetate/petroleum ether (1/20). This resulted in 2.5 g (53% yield) of 1-[(2-fluorophenyl)methyl] cyclobutane-1-carbonitrile as a light yellow oil.

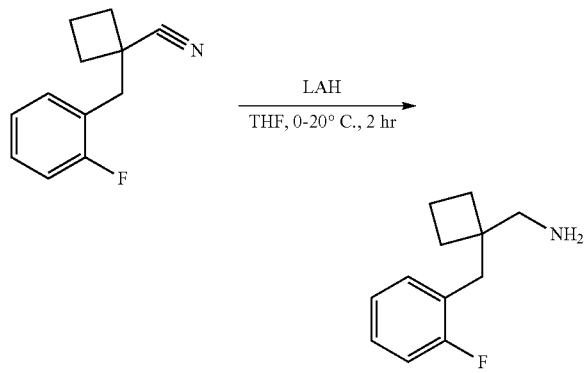

Into a 250-mL 3-necked round-bottom flask purged and maintained with an inert atmosphere of nitrogen, was placed 1-[(2-fluorophenyl)methyl]cyclobutane-1-carbonitrile (2.10 g, 11.09 mmol, 1.00 equiv) and THF (100.00 mL). This was followed by the addition of LiAlH₄ (0.93 g, 22.18 mmol, 2.00 equiv) in portions at 0-5° C. The resulting solution was stirred for 2 hr at room temperature. The reaction mixture was cooled to 0° C. and quenched by the addition of 2.5 mL of water, followed by 7.5 mL of 15% NaOH and again with 2.5 mL of water. The solids were filtered off and the filtrate concentrated. This resulted in 2.1 g (97% yield) of 1-[1-[(2-fluorophenyl)methyl]cyclobutyl]methanamine as light yellow oil.

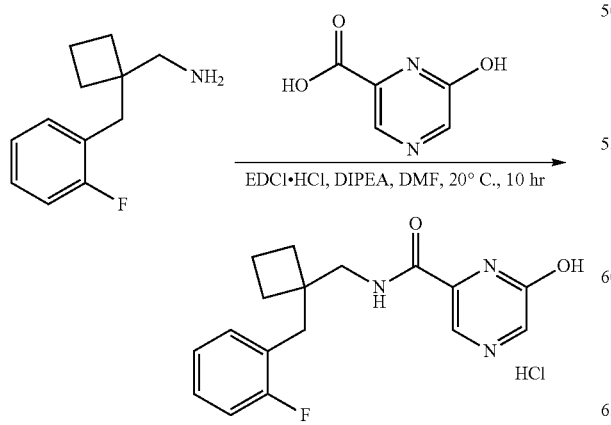

Prepared as for Example 1 using 1-[1-[(2-fluorophenyl) methyl]cyclobutyl]methanamine (100.00 mg, 0.517 mmol, 1.00 equiv) and 6-hydroxypyrazine-2-carboxylic acid (72.49 mg, 0.517 mmol, 1.00 equiv).

LC-MS (ES, m/z): [M+H]⁺=316

H-NMR (300 MHz, DMSO-d₆, ppm) δ 8.53-8.41 (m, 2H), 8.31 (s, 1H), 7.40-7.33 (m, 1H), 7.33-7.26 (m, 1H), 7.21-7.14 (m, 2H), 3.50 (s, 2H), 2.77 (s, 2H), 1.91-1.78 (m, 5H), 1.68-1.58 (m, 1H).

Example 14: N-((1-benzylcyclobutyl)methyl)-1-ethyl-5-oxo-4,5-dihydro-1H-1,2,4-triazole-3-carboxamide

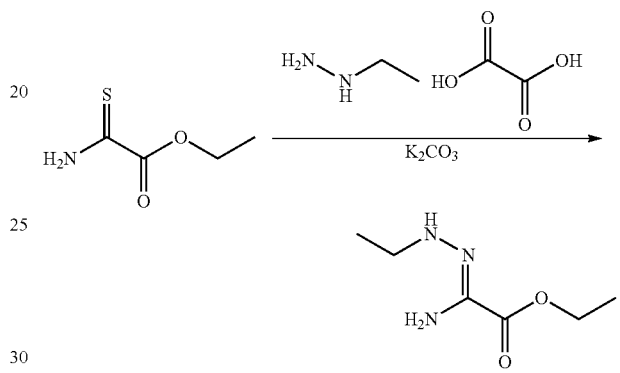

To a stirred mixture of ethyl carbamothioylformate (1 g, 7.51 mmol, 1.00 equiv) and ethylhydrazine (451.30 mg, 7.51 mmol, 1.00 equiv) in acetonitrile was added K₂CO₃ (2075.63 mg, 15.02 mmol, 2.00 equiv) in portions at room temperature under a nitrogen atmosphere. The resulting mixture was stirred overnight at room temperature under nitrogen atmosphere and filtered. The filter cake was washed with DCM (2×2 50 mL). The filtrate was concentrated under reduced pressure and the residue was purified by silica gel column chromatography, eluting with DCM/MeOH (10:1) to afford ethyl [(Z)—N'-(ethylamino)carbamimidoyl]formate (1.1 g, 92% yield) as a light yellow oil.

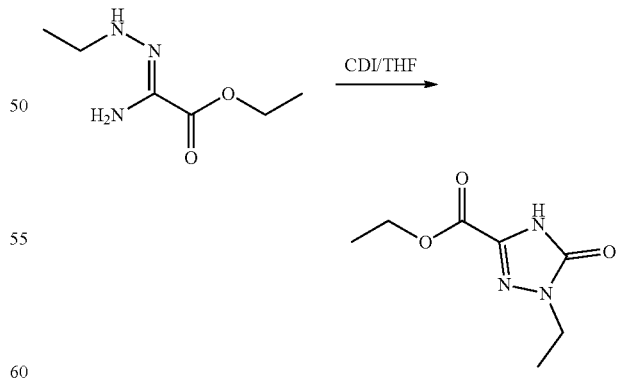

To a stirred mixture of ethyl [(Z)—N'-(ethylamino)carbamimidoyl]formate (1 g, 6.28 mmol, 1.00 equiv) in THF was added CDI (1.02 g, 6.28 mmol, 1.00 equiv) in portions at room temperature under nitrogen atmosphere. The resulting mixture was stirred overnight at room temperature under nitrogen atmosphere and concentrated. The residue was purified by Prep-HPLC to afford ethyl 1-ethyl-5-oxo-4H-1,2,4-triazole-3-carboxylate (300 mg, 26% yield) as a light yellow solid.

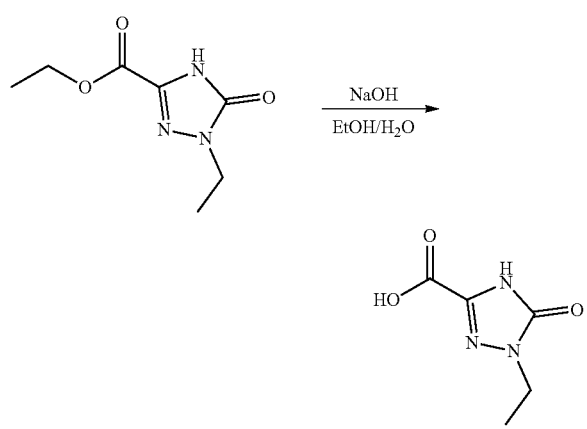

To a stirred mixture of ethyl 1-ethyl-5-oxo-4H-1,2,4-triazole-3-carboxylate (270 mg, 1.458 mmol, 1.00 equiv) in EtOH and H₂O was added NaOH (116.63 mg, 2.916 mmol, 2.00 equiv) at room temperature. The resulting mixture was stirred overnight and the mixture was concentrated. The crude product was purified by Prep-HPLC to afford 1-ethyl-5-oxo-4H-1,2,4-triazole-3-carboxylic acid (100 mg, 43% yield) as a light yellow solid.

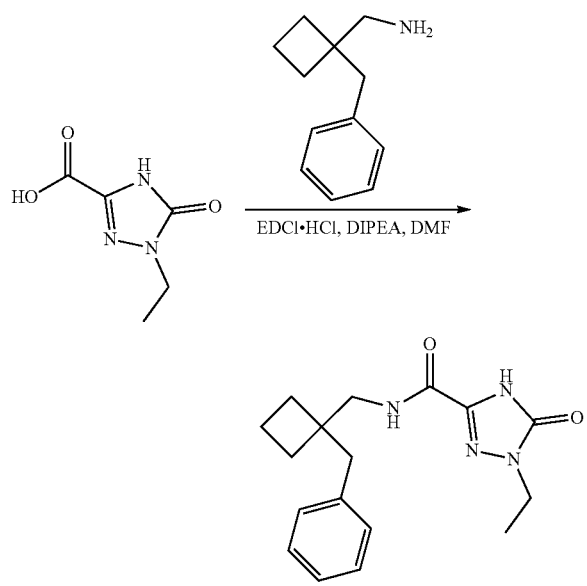

Prepared as for Example 1 using 1-ethyl-5-oxo-4H-1,2,4-triazole-3-carboxylic acid (50 mg, 0.318 mmol, 1.00 equiv) and 1-(1-benzylcyclobutyl)methanamine (55.77 mg, 0.318 mmol, 1.00 equiv).

LC-MS (ES, m/z): [M+H]⁺=315

H-NMR (400 MHz, DMSO-$d_6$, ppm) δ 12.24 (brs, 1H), 8.45-8.42 (m, 1H), 7.31-7.25 (m, 4H), 7.24-7.19 (m, 1H), 3.77-3.72 (m, 2H), 3.30-3.25 (m, 2H), 2.70 (s, 2H), 1.81-1.69 (m, 5H), 1.65-1.59 (m, 1H), 1.26-1.24 (m, 3H), Example 15: N-((1-(2,6-difluorobenzyl)cyclobutyl)methyl)-6-oxo-1,6-dihydropyrazine-2-carboxamide

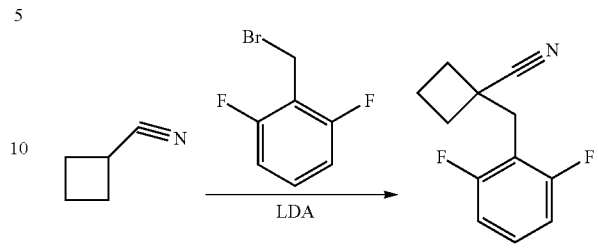

Into a 250-mL 3-necked round-bottom flask purged and maintained with an inert atmosphere of nitrogen, was placed cyclobutanecarbonitrile (1.00 g, 12.33 mmol, 1.00 equiv) and THF (50.00 mL). This was followed by the addition of LDA (2.0 M in THF) (6.78 mL, 13.56 mmol, 1.10 equiv) dropwise with stirring at −78° C. The resulting solution was stirred for 30 mins at this temperature and a solution of 2-(bromomethyl)-1,3-difluorobenzene (3.06 g, 14.79 mmol, 1.20 equiv) in THF (10 mL) added dropwise at −78° C. The reaction mixture was allowed to warm to room temperature and stirred for an additional 1 h. The reaction was then quenched by the addition of 50 mL of water and extracted with 2×50 mL of ethyl acetate, the organic layer was dried and concentrated. The residue was applied onto a silica gel column with ethyl acetate/petroleum ether (1/20), resulting in 1.24 g (48% yield) of 1-[(2,6-difluorophenyl)methyl]cyclobutane-1-carbonitrile as a light yellow oil.

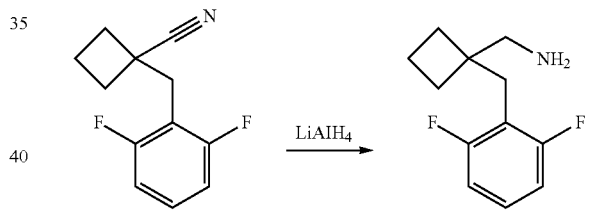

Into a 50-mL 3-necked round-bottom flask purged and maintained under an inert atmosphere of nitrogen, was placed 1-[(2,6-difluorophenyl)methyl]cyclobutane-1-carbonitrile (450.00 mg, 2.17 mmol, 1.00 equiv) and THF (15.00 mL). This was followed by the addition of LiAlH₄ (164.84 mg, 4.34 mmol, 2.00 equiv) in portions at 0-5° C. The resulting solution was warmed to room temperature and stirred for 2 hr. The reaction mixture was cooled to 0° C. and quenched by the addition of 2.5 mL of water, 7.5 mL of 15% NaOH and another 2.5 mL of water. The solids were filtered off and the filtrate was concentrated. This resulted in 390 mg (85% yield) of 1-[1-[(2,6-difluorophenyl)methyl]cyclobutyl]methanamine as light yellow oil.

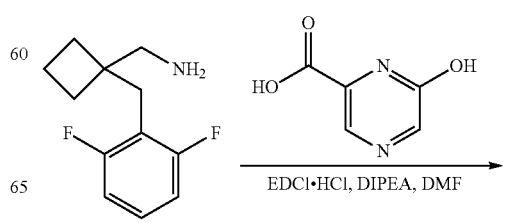

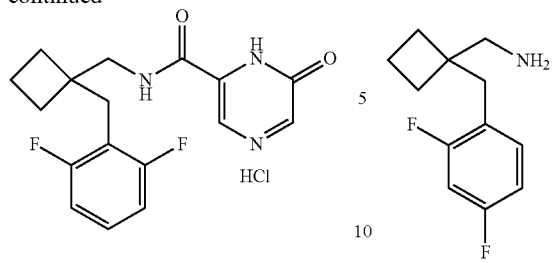
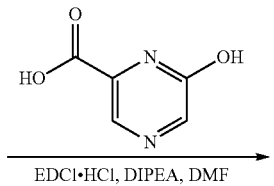

Prepared as for Example 1 using 1-[1-[(2,6-difluorophenyl)methyl]cyclobutyl]methanamine (50.00 mg, 0.24 mmol, 1.00 equiv) and 6-hydroxypyrazine-2-carboxylic acid (33.16 mg, 0.24 mmol, 1.00 equiv).

LC-MS (ES, m/z): [M+H]⁺=334

H-NMR (300 MHz, DMSO-d₆, ppm): 8.53-8.46 (m, 2H), 8.31 (m, 1H), 7.39-7.32 (m, 1H), 7.15-7.10 (m, 2H), 3.44-3.42 (m, 2H), 2.73 (s, 2H), 1.98-1.64 (m, 6H).

Example 16: N-((1-(2,4-difluorobenzyl)cyclobutyl)methyl)-6-oxo-1,6-dihydropyrazine-2-carboxamide

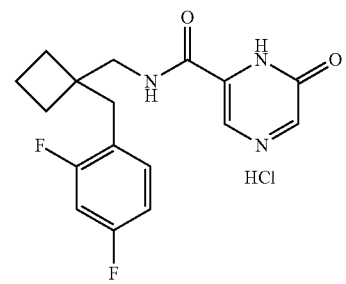

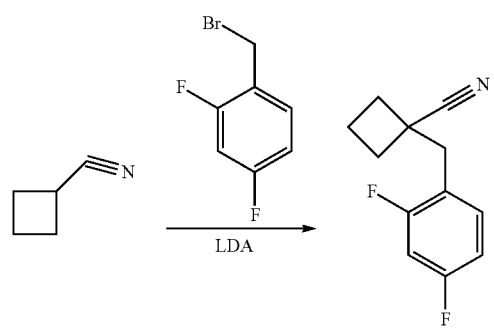

Prepared as for 1-[(2,6-difluorophenyl)methyl]cyclobutane-1-carbonitrile (Example 16) using cyclobutanecarbonitrile (1.00 g, 12.33 mmol, 1.00 equiv) and THF (50.00 mL) and 1-(bromomethyl)-2,4-difluorobenzene (3.06 g, 14.79 mmol, 1.20 equiv).

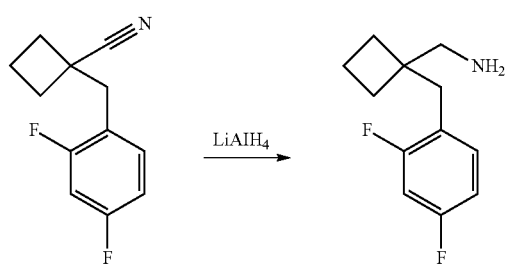

Prepared as for 1-[1-[(2,6-difluorophenyl)methyl]cyclobutyl]methanamine am 6 using 1-[(2,6-difluorophenyl)methyl]cyclobutane-1-carbonitrile (450.00 mg, 2.17 mmol, 1.00 equiv) and LiAlH₄ (164.84 mg, 4.34 mmol, 2.00 equiv).

Prepared as for Example 1 using 1-[1-[(2,4-difluorophenyl)methyl]cyclobutyl]methanamine (45.00 mg, 0.21 mmol, 1.00 equiv) and 6-hydroxypyrazine-2-carboxylic acid (29.84 mg, 0.21 mmol, 1.00 equiv).

LC-MS (ES, m/z): [M+H]⁺=334

H-NMR (300 MHz, DMSO-d₆, ppm): 8.51-8.39 (m, 2H), 8.30 (s, 1H), 7.48-7.40 (m, 1H), 7.24-7.17 (m, 1H), 7.08-7.03 (m, 1H), 3.68-3.36 (m, 2H), 2.73 (s, 2H), 1.91-1.62 (m, 6H).

Example 17: N-((1-(2,3-difluorobenzyl)cyclobutyl)methyl)-6-oxo-1,6-dihydropyrazine-2-carboxamide

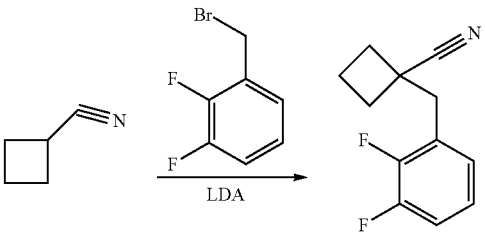 [SMILES: N#CC1CCC1 ; Fc1cccc(CBr)c1F ; N#CC1(Cc2cccc(F)c2F)CCC1]

Prepared as for 1-[(2,6-difluorophenyl)methyl]cyclobutane-1-carbonitrile (Example 16) using cyclobutanecarbonitrile (0.50 g, 6.16 mmol, 1.00 equiv) and THF (10 mL) and 1-(bromomethyl)-2,3-difluorobenzene (1.53 g, 7.40 mmol, 1.20 equiv).

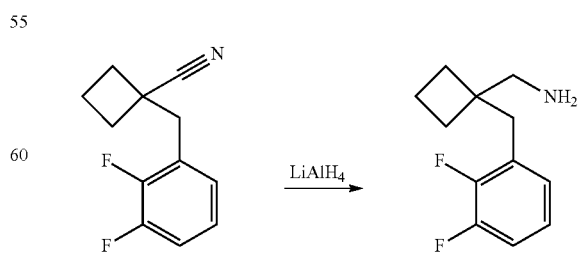

Prepared as for 1-[1-[(2,6-difluorophenyl)methyl]cyclobutyl]methanamine (Example 16) using 1-[(2,6-difluorophenyl)methyl]cyclobutane-1-carbonitrile (450.00 mg, 2.17 mmol, 1.00 equiv) and LiAlH₄ (164.84 mg, 4.34 mmol, 2.00 equiv).

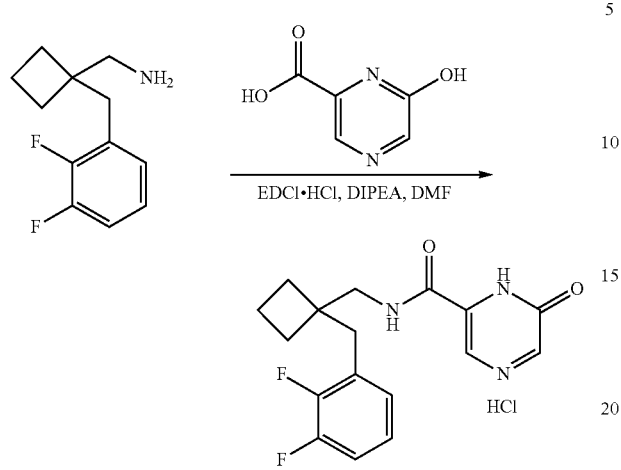

Prepared as for Example 1 using 1-[1-[(2,3-difluorophenyl)methyl]cyclobutyl]methanamine (50.00 mg, 0.24 mmol, 1.00 equiv) and 6-hydroxypyrazine-2-carboxylic acid (33.16 mg, 0.24 mmol, 1.00 equiv).

LC-MS (ES, m/z): [M+H]⁺=334

H-NMR (300 MHz, DMSO-d₆, ppm): 8.51-8.41 (m, 2H), 8.31 (m, 1H), 7.31-7.16 (m, 3H), 3.40-3.34 (m, 2H), 3.10 (s, 2H), 2.07-1.24 (m, 6H).

Example 18: N-((1-benzylcyclopentyl)methyl)-6-oxo-1,6-dihydropyrazine-2-carboxamide

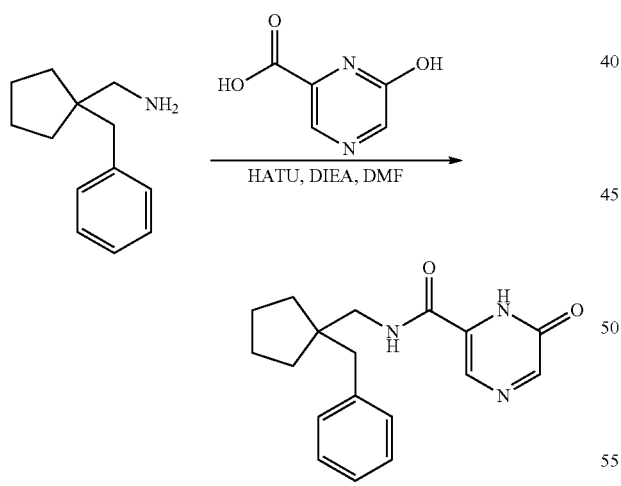

Prepared as for Example 3 using 6-hydroxypyrazine-2-carboxylic acid (37.00 mg, 0.26 mmol, 1.00 equiv) and 1-(1-benzylcyclopentyl)methanamine (Prepared according to the method for 1-(1-benzylcyclobutyl)methanamine using cyclopentane carbonitrile (Example 1), 50.00 mg, 0.26 mmol, 1.00 equiv).

LC-MS (ES, m/z): [M+H]⁺=312

H-NMR (300 MHz, DMSO-d₆, ppm): 11.98 (brs, 1H), 8.55-8.22 (m, 3H), 7.32-7.21 (m, 5H), 3.22-3.20 (m, 2H), 2.51 (s, 2H), 1.58-1.44 (m, 8H).

Example 19: N-((1-(2-methylbenzyl)cyclobutyl)methyl)-6-oxo-1,6-dihydropyrazine-2-carboxamide

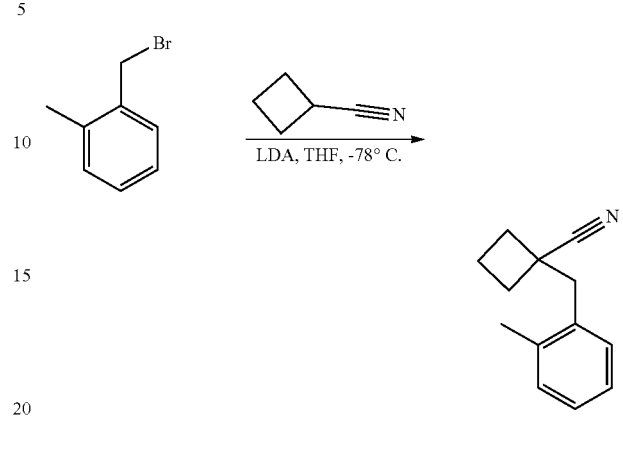

Prepared as for 1-[1-[(2,6-difluorophenyl)methyl]cyclobutyl]methanamine (Example 16) using cyclobutanecarbonitrile (1.2 g, 14.79 mmol, 1.00 equiv) and 1-(bromomethyl)-2-methylbenzene (3.01 g, 16.27 mmol, 1.10 equiv).

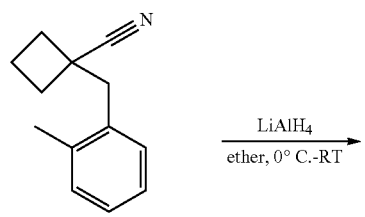

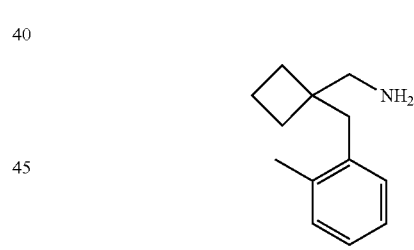

Prepared as for 1-[1-[(2,6-difluorophenyl)methyl]cyclobutyl]methanamine (Example 16) using 1-[(2-methylphenyl)methyl]cyclobutane-1-carbonitrile (350 mg, 1.89 mmol, 1.00 equiv) and LiAlH₄ (215.10 mg, 5.67 mmol, 3.00 equiv).

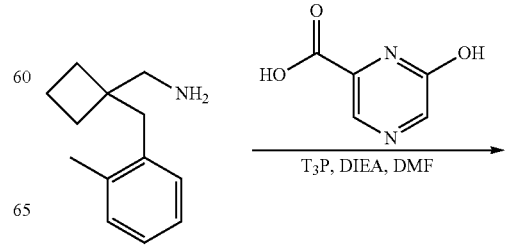

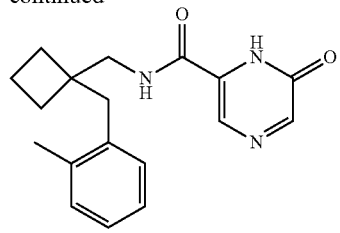

Prepared as for Example 8 using 1-{1-[(2-methylphenyl)methyl]cyclobutyl}methanamine (100 mg, 0.53 mmol, 1.00 equiv) and 6-hydroxypyrazine-2-carboxylic acid (81.41 mg, 0.58 mmol, 1.10 equiv).

LC-MS (ES, m/z): [M+H]$^+$=312

H-NMR (300 MHz, DMSO-d$_6$, ppm): 8.49-8.41 (m, 2H), 8.21 (s, 1H), 7.19-7.11 (m, 5H), 3.52-3.48 (m, 2H), 2.79 (s, 2H), 2.20 (s, 3H), 1.99-1.56 (m, 6H)

Example 20: N-((1-(2-fluorobenzyl)cyclobutyl)methyl)-1-methyl-5-oxo-4,5-dihydro-1H-1,2,4-triazole-3-carboxamide

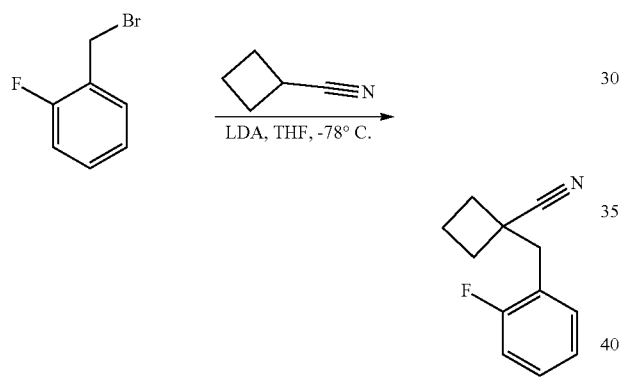

Prepared as for 1-[1-[(2,6-difluorophenyl)methyl]cyclobutyl]methanamine (Example 16) using cyclobutanecarbonitrile (1.2 g, 14.79 mmol, 1.00 equiv) and 1-(bromomethyl)-2-fluorobenzene (3.08 g, 16.27 mmol, 1.10 equiv).

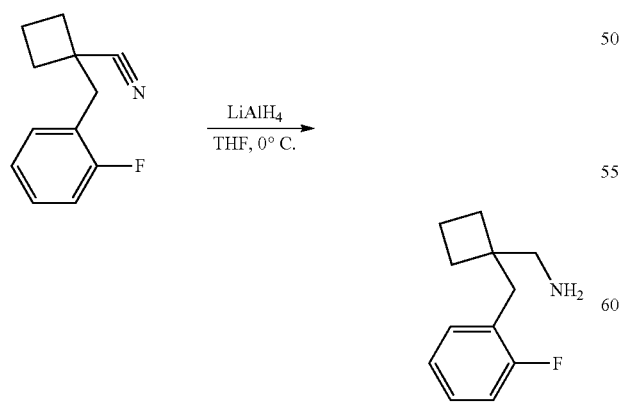

Prepared as for 1-[1-[(2,6-difluorophenyl)methyl]cyclobutyl]methanamine (Example 16) using 1-[(2-fluorophenyl)methyl]cyclobutane-1-carbonitrile (500.00 mg, 2.642 mmol, 1.00 equiv) and LiAlH4 (200.57 mg, 5.284 mmol, 2.00 equiv).

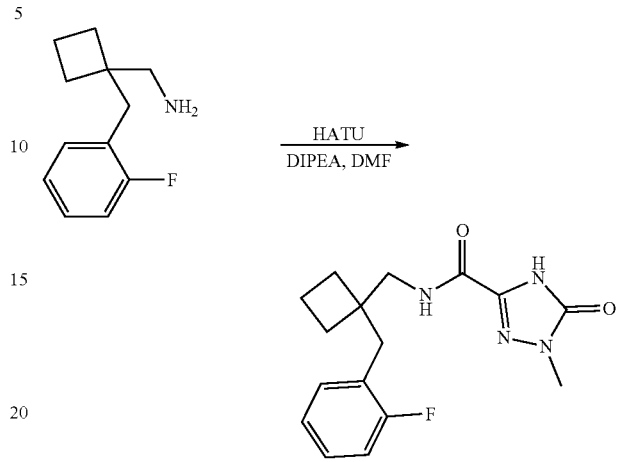

Prepared as for Example 3 using 1-[1-[(2-fluorophenyl)methyl]cyclobutyl]methanamine (30.00 mg, 0.155 mmol, 1.00 equiv) and 1-methyl-5-oxo-4H-1,2,4-triazole-3-carboxylic acid (Intermediate 1, 22.21 mg, 0.155 mmol, 1.00 equiv).

LC-MS (ES, m/z): [M+H]$^+$=319

H-NMR (300 MHz, DMSO-d$_6$, ppm) δ12.28 (s, 1H), 8.57-8.54 (m, 1H), 7.41-7.36 (m, 1H), 7.33-7.24 (m, 1H), 7.20-7.12 (m, 2H), 3.30-3.28 (m, 2H), 2.73 (s, 2H), 1.89-1.64 (m, 5H), 1.61-1.52 (m, 1H)

Example 21: N-((1-(2,6-difluorobenzyl)cyclobutyl)methyl)-1-methyl-5-oxo-4,5-dihydro-1H-1,2,4-triazole-3-carboxamide

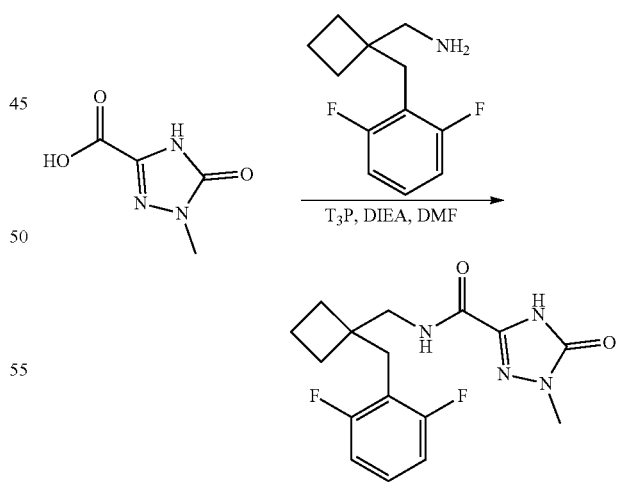

Prepared as for Example 8 using 1-{1-[(2,6-difluorophenyl)methyl]cyclobutyl}methanamine (Example 16, 40 mg, 0.19 mmol, 1.00 equiv), and 1-methyl-5-oxo-4H-1,2,4-triazole-3-carboxylic acid (Intermediate 1, 29.81 mg, 0.21 mmol, 1.10 equiv).

LC-MS (ES, m/z): [M+H]$^+$=337

H-NMR (300 MHz, DMSO-d$_6$, ppm): 12.28 (s, 1H), 8.64-8.60 (m, 1H), 7.40-7.34 (m, 1H), 7.15-7.09 (m, 2H), 3.37-3.32 (m, 5H), 2.72 (s, 2H), 1.86-1.51 (m, 6H).

Example 22: N-((1-(2,4-difluorobenzyl)cyclobutyl)methyl)-1-methyl-5-oxo-4,5-dihydro-1H-1,2,4-triazole-3-carboxamide

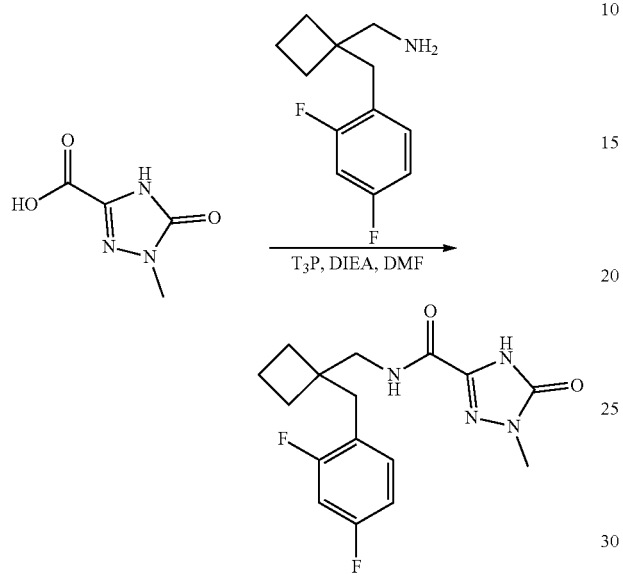

Prepared as for Example 8 using 1-{1-[(2,4-difluorophenyl)methyl]cyclobutyl}methanamine (Example 17, 40 mg, 0.19 mmol, 1.00 equiv) and 1-methyl-5-oxo-4H-1,2,4-triazole-3-carboxylic acid (Intermediate 1, 29.81 mg, 0.21 mmol, 1.10 equiv).

LC-MS (ES, m/z): [M+H]$^+$=337

H-NMR (300 MHz, DMSO-d$_6$, ppm): 12.29 (s, 1H), 8.61-8.57 (m, 1H), 7.50-7.42 (m, 1H), 7.24-7.18 (m, 1H), 7.17-7.02 (m, 1H), 3.37 (s, 3H), 3.32-3.27 (m, 2H), 2.71 (s, 2H), 1.86-1.59 (m, 6H).

Example 23: N-(1-(1-benzylcyclobutyl)ethyl)-1-methyl-5-oxo-4,5-dihydro-1H-1,2,4-triazole-3 carboxamide

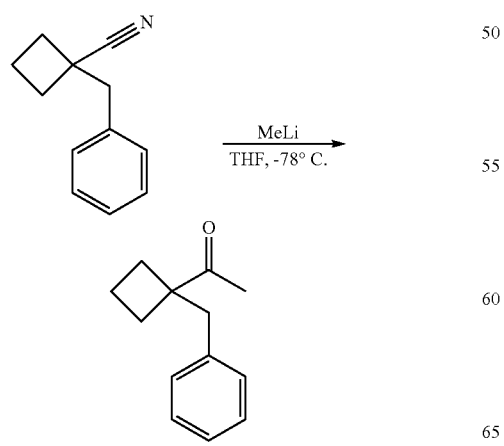

To a stirred mixture of 1-benzylcyclobutane-1-carbonitrile (2.9 g, 16.935 mmol, 1.00 equiv) in THF was added 1M CH$_3$Li (16.9 mL, 1.00 equiv) dropwise at −78° C. under nitrogen atmosphere. The resulting mixture was stirred for 3 h and quenched by the addition of sat. NH4Cl (aq.) (20 mL) at −78° C. The aqueous layer was extracted with EtOAc (2×40 mL). The organic layer was concentrated and the residue was purified by silica gel column chromatography, eluting with PE/EA (7:1) to afford 1-(1-benzylcyclobutyl)ethanone (1.5 g, 47% yield) as a light yellow oil.

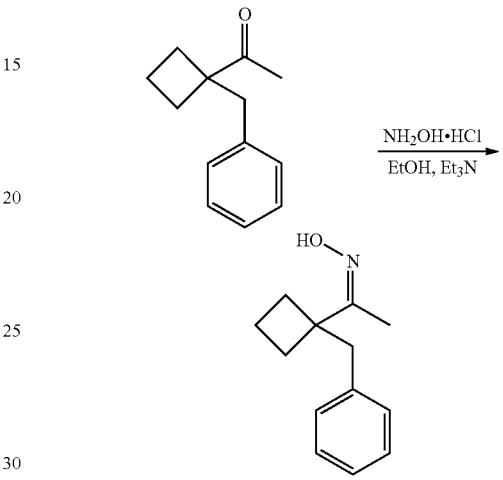

To a stirred mixture of 1-(1-benzylcyclobutyl)ethanone (1.4 g, 7.436 mmol, 1.00 equiv) and NH$_2$OH·HCl (0.52 g, 7.436 mmol, 1.00 equiv) in EtOH was added TEA (2.26 g, 22.308 mmol, 3.00 equiv) in portions at room temperature under nitrogen atmosphere. The resulting mixture was stirred for 10 h at room temperature under nitrogen atmosphere and quenched with water at room temperature. The aqueous layer was extracted with EtOAc (2×20 mL) and concentrated. The residue was purified by silica gel column chromatography, eluting with PE/EtOAc (1:1) to afford (Z)—N-[1-(1-benzylcyclobutyl)ethylidene]hydroxylamine (350 mg, 23% yield) as a light yellow oil.

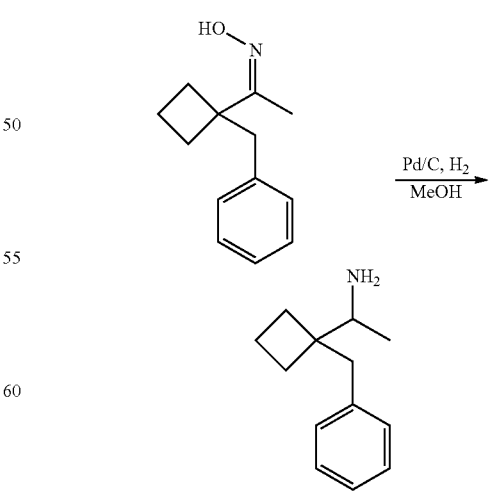

To a solution of (Z)—N-[1-(1-benzylcyclobutyl)ethylidene]hydroxylamine (250 mg, 1.230 mmol, 1.00 equiv) in 50 mL MeOH was added Pd/C (0.1 g) under nitrogen atmosphere. The mixture was hydrogenated at room temperature for 5 h under hydrogen atmosphere using a hydrogen balloon. The resulting mixture was filtered and the catalyst washed with MeOH (2×20 mL). The filtrate was concentrated under reduced pressure. This resulted in 1-(1-benzylcyclobutyl)ethanamine (180 mg) as a light yellow solid.

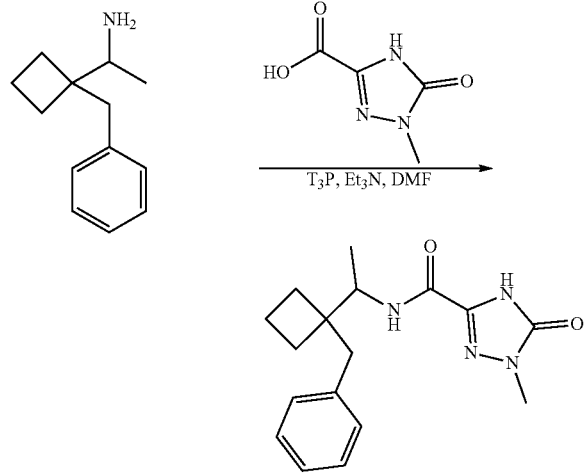

Prepared as for Example 8 using 1-(1-benzylcyclobutyl)ethanamine (100 mg, 0.528 mmol, 1.00 equiv) and 1-methyl-5-oxo-4H-1,2,4-triazole-3-carboxylic acid (Intermediate 1, 75.59 mg, 0.528 mmol, 1.00 equiv).

LC-MS (ES, m/z): [M+H]$^+$=315

H-NMR (400 MHz, DMSO-d$_6$, ppm) δ 12.21 (brs, 1H), 8.15-8.13 (m, 1H), 7.32-7.21 (m, 5H), 4.16-4.12 (m, 1H), 3.30 (s, 3H), 2.82-2.62 (m, 2H), 2.10-1.30 (m, 6H), 1.12-1.10 (m, 3H).

Examples 24A and B: N-(1-(1-benzylcyclobutyl)ethyl)-1-methyl-5-oxo-4,5-dihydro-1H-1,2,4-triazole-3-carboxamide (Enantiomer B) and N-(1-(1-benzylcyclobutyl)ethyl)-1-methyl-5-oxo-4,5-dihydro-1H-1,2,4-triazole-3-carboxamide (Enantiomer A)

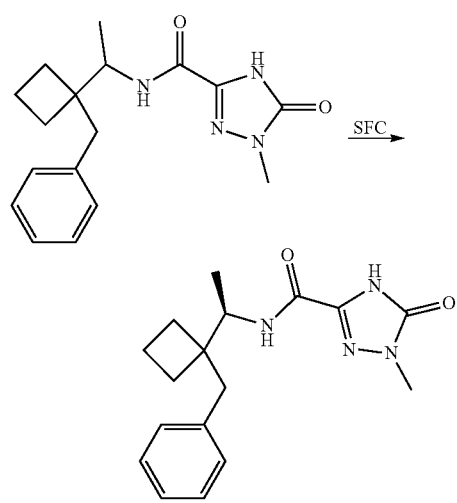

N-[1-(1-benzylcyclobutyl)ethyl]-1-methyl-5-oxo-4H-1,2,4-triazole-3-carboxamide, Example 23) was purified by Prep-SFC (Column: CHIRAL ART Cellulose-SB, 3*25 cm, 5 μm; Mobile Phase A: CO$_2$, Mobile Phase B: MeOH—Preparative; Flow rate: 80 mL/min; Gradient: isocratic 35% B; Column Temperature (° C.): 35; Back Pressure (bar): 100; Wave Length: 220 nm; RT1(min): 3.6; RT2(min): 5.5; Sample Solvent: MeOH-HPLC; Injection Volume: 3 mL; Number Of Runs: 4, retention time of Enantiomer A: 1.47 min; retention time of Enantiomer B: 1.82 min) to afford N-(1-(1-benzylcyclobutyl)ethyl)-1-methyl-5-oxo-4,5-dihydro-1H-1,2,4-triazole-3-carboxamide (13 mg) as a off-white solid and N-(1-(1-benzylcyclobutyl)ethyl)-1-methyl-5-oxo-4,5-dihydro-1H-1,2,4-triazole-3-carboxamide (9.1 mg) as a off-white solid.

LC-MS Enantiomer A (ES, m/z): [M+H]$^+$=315
LC-MS Enantiomer B (ES, m/z): [M+H]$^+$=315

H-NMR Enantiomer A (400 MHz, DMSO-d, ppm) δ 12.20 (brs, 1H), 8.14 (d, J=5.6 Hz, 1H), 7.33-7.23 (m, 5H), 4.17-4.13 (m, 1H), 3.36 (s, 3H), 2.82-2.63 (m, 2H), 2.08-1.98 (m, 1H), 1.87-1.81 (m, 2H), 1.77-1.67 (m, 1H), 1.66-1.53 (m, 1H), 1.44-1.33 (m, 1H) 1.13 (d, J=8.0 Hz, 3H)

H-NMR Enantiomer B (400 MHz, DMSO-d$_6$, ppm) δ 12.20 (brs, 1H), 8.14 (d, J=5.6 Hz, 1H), 7.33-7.23 (m, 5H), 4.17-4.13 (m, 1H), 3.36 (s, 3H), 2.82-2.63 (m, 2H), 2.08-1.98 (m, 1H), 1.87-1.81 (m, 2H), 1.77-1.67 (m, 1H), 1.66-1.53 (m, 1H), 1.44-1.33 (m, 1H) 1.13 (d, J=8.0 Hz, 3H)

One of Enantiomers A and B is (S)—N-(1-(1-benzylcyclobutyl)ethyl)-1-methyl-5-oxo-4,5-dihydro-1H-1,2,4-triazole-3-carboxamide and the other is (R)—N-(1-(1-benzylcyclobutyl)ethyl)-1-methyl-5-oxo-4,5-dihydro-1H-1,2,4-triazole-3-carboxamide.

Example 25: 1-methyl-5-oxo-N-((1-(1-phenylethyl)cyclobutyl)methyl)-4,5-dihydro-1H-1,2,4-triazole-3-carboxamide

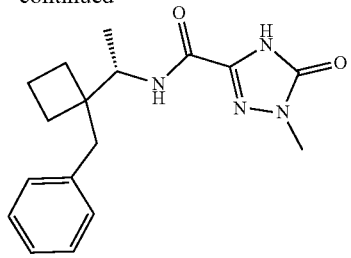

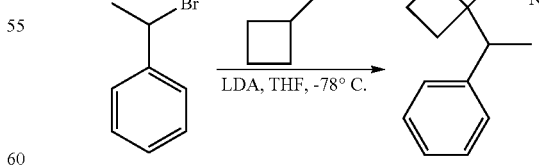

In a 100-mL round bottom flask, to a solution of cyclobutanecarbonitrile (1.31 g, 16.15 mmol, 1.00 equiv) in THF (10 mL) was added dropwise LDA (1 M in THF, 19.5 mL, 19.50 mmol) at −78° C. under N$_2$ atmosphere. The reaction mixture was stirred at −78° C. for 30 mins. Then a solution of (1-bromoethyl)benzene (3 g, 16.21 mmol, 1.00 equiv) in 5 mL THF was added dropwise and the mixture was stirred for another 60 mins. The reaction was quenched with water/sat. NH₄Cl (30 mL), and then the mixture was extracted with ether/EtOAc (2×40 mL). The combined organic extracts were washed with brine (50 mL), dried over anhydrous Na₂SO₄, and concentrated under vacuum to yield a crude product which was directly purified by flash chromatography (EtOAc/PE=1/3) mixture to yield. This resulted in 1-(1-phenylethyl)cyclobutane-1-carbonitrile (1.25 g, 42% yield) as a light yellow oil.

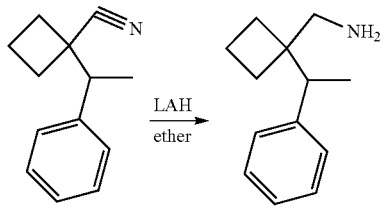

To a stirred solution of 1-(1-phenylethyl)cyclobutane-1-carbonitrile (500 mg, 2.70 mmol, 1.00 equiv) in diethyl ether was added LAH (204.86 mg, 5.40 mmol, 2.00 equiv) in portions at 0° C. under nitrogen atmosphere. The reaction was quenched by the addition of 15% NaOH (aq.) (0.2 mL) at 0° C. The resulting mixture was filtered and the filter cake was washed with dichloromethane (20 mL). The filtrate was concentrated under reduced pressure. This resulted in 1-[1-(1-phenylethyl)cyclobutyl]methanamine (350 mg, 69% yield) as a light yellow oil.

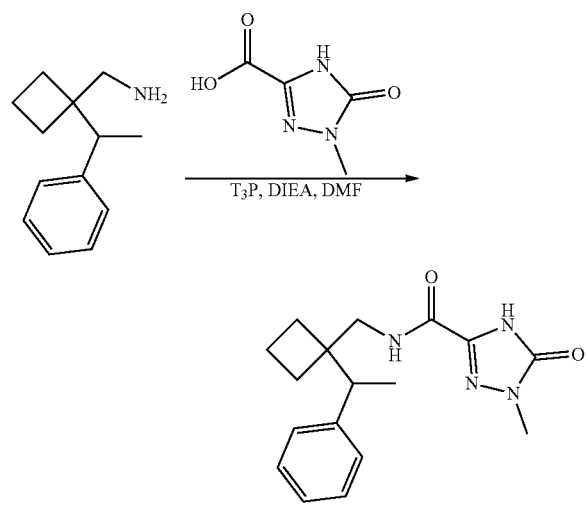

Prepared as for Example 8 using 1-methyl-5-oxo-4H-1,2,4-triazole-3-carboxylic acid (Intermediate 1, 30.24 mg, 0.211 mmol, 1.00 equiv) and 1-[1-(1-phenylethyl)cyclobutyl]methanamine (40 mg, 0.211 mmol, 1.00 equiv).

LC-MS (ES, m/z): [M+H]⁺=315

H-NMR (400 MHz, DMSO-d₆, ppm): 11.50 (brs, 1H), 8.38 (s, 1H), 7.30-7.17 (m, 5H), 3.52-3.31 (m, 4H), 3.31-3.16 (m, 1H), 2.89-2.84 (m, 1H), 2.01-1.94 (m, 1H), 1.83-1.77 (m, 2H), 1.69-1.68 (m, 2H), 1.52-1.49 (m, 1H), 1.18-1.25 (m, 3H).

Example 26 and 27: 1-methyl-5-oxo-N-((1-(1-phenylethyl)cyclobutyl)methyl)-4,5-dihydro-1H-1,2,4-triazole-3-carboxamide (Enantiomer A) and 1-methyl-5-oxo-N-((1-(1-phenylethyl)cyclobutyl)methyl)-4,5-dihydro-1H-1,2,4-triazole-3-carboxamide (Enantiomer B)

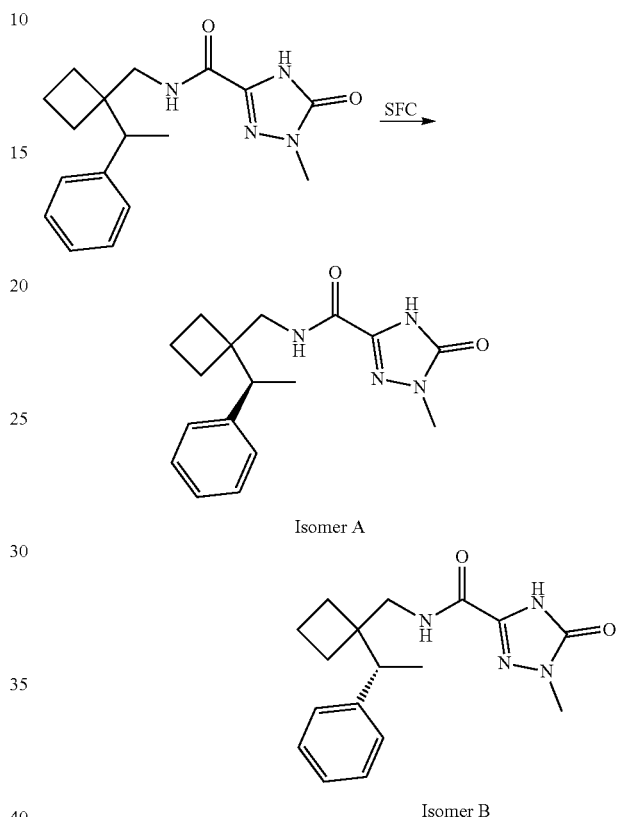

The racemic product Example 25 (50 mg) was purified by Chiral SFC to afford 1-methyl-5-oxo-N-((1-(1-phenylethyl)cyclobutyl)methyl)-4,5-dihydro-1H-1,2,4-triazole-3-carboxamide Enantiomer A (20 mg) as a white solid and 1-methyl-5-oxo-N-({1-[(1R)-1-phenylethyl]cyclobutyl}methyl)-4H-1,2,4-triazole-3-carboxamide Enantiomer B (30 mg) as a white solid.

LC-MS (Enantiomer A) (ES, m/z): [M+H]⁺=315

LC-MS (Enantiomer B) (ES, m/z): [M+H]⁺=315

H-NMR (Enantiomer A) (300 MHz, DMSO-d₆, ppm): 12.00 (brs, 1H), 8.41-8.37 (m, 1H), 7.28-7.19 (m, 5H), 3.37-3.35 (m, 1H), 3.19 (s, 3H), 3.17-3.15 (m, 1H), 2.90-2.83 (m, 1H), 2.01-1.53 (m, 6H), 1.28-1.23 (m, 3H).

H-NMR (Enantiomer B) (300 MHz, DMSO-d₆, ppm): 12.00 (brs, 1H), 8.41-8.37 (m, 1H), 7.28-7.19 (m, 5H), 3.37-3.35 (m, 1H), 3.19 (s, 3H), 3.17-3.15 (m, 1H), 2.90-2.83 (m, 1H), 2.01-1.53 (m, 6H), 1.28-1.23 (m, 3H).

One of Enantiomers A and B is (S)-1-methyl-5-oxo-N-((1-(1-phenylethyl)cyclobutyl)methyl)-4,5-dihydro-1H-1,2,4-triazole-3-carboxamide and the other is (R)-1-methyl-5-oxo-N-((1-(1-phenylethyl)cyclobutyl)methyl)-4,5-dihydro-1H-1,2,4-triazole-3-carboxamide.

Example 28: N-((1-(methoxy(phenyl)methyl)cyclobutyl)methyl)-1-methyl-5-oxo-4,5-dihydro-1H-1,2,4-triazole-3-carboxamide

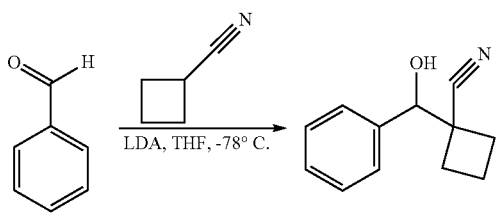

To a solution of cyclobutanecarbonitrile (2.29 g, 28.27 mmol, 1.00 equiv) in THF (20 mL) was added dropwise LDA (1 M in THF, 36.75 mL, 36.75 mmol, 1.30 equiv) at −78° C. under a $N_2$ atmosphere. The reaction mixture was stirred at −78° C. for 30 mins, then a solution of benzaldehyde (3 g, 28.27 mmol, 1.00 equiv) in 5 mL THF was added dropwise and the mixture was stirred for another 60 mins. The reaction was quenched with water/sat. $NH_4Cl$ 30 mL), and the mixture extracted with ether/EtOAc (2×40 mL). The combined organic extracts were washed with brine (50 mL), dried over anhydrous $Na_2SO_4$, and concentrated under vacuum to yield a crude product which was directly purified by flash chromatography (EtOAc/PE=1/3) mixture to yield. This resulted in 1-[hydroxy(phenyl)methyl]cyclobutane-1-carbonitrile (1.8 g, 34% yield) as a light yellow oil.

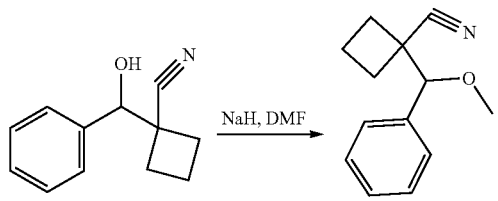

To a solution of 1-[hydroxy(phenyl)methyl]cyclobutane-1-carbonitrile (400 mg, 2.14 mmol, 1.00 equiv) in DMF was added NaH (111 mg, 2.78 mmol, 1.30 equiv) at 0° C. The mixture was stirred for 15 min. $CH_3I$ (333.54 mg, 2.350 mmol, 1.10 equiv) added and the mixture was allowed to warm to RT and stirred for 5 h. The reaction mixture was quenched by water and extracted with DCM (3×25 mL). The organic layer was concentrated under reduced pressure. The residue was purified by silica gel column chromatography, eluted with PE/EtOAc (5:1) to afford 1-[methoxy(phenyl)methyl]cyclobutane-1-carbonitrile (300 mg, 70% yield) as a light yellow oil.

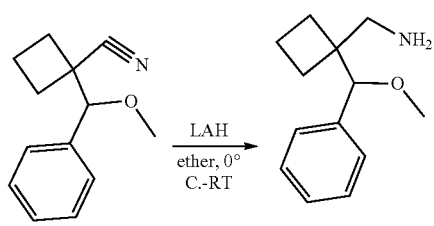

To a stirred solution/mixture of 1-[methoxy(phenyl)methyl]cyclobutane-1-carbonitrile (260 mg, 1.29 mmol, 1.00 equiv) in ethyl ether (10 mL) was added LAH (98.06 mg, 2.58 mmol, 2.00 equiv) in portions at 0° C. The resulting mixture was stirred for additional 3 h at room temperature. The reaction was quenched by the addition of NaOH (aq. 15%) (0.02 mL) at 0° C. The resulting mixture was filtered; the filter cake was washed with THF. The filtrate was concentrated under reduced pressure. This resulted in 1-{1-[methoxy(phenyl)methyl]cyclobutyl}methanamine (220 mg, 83% yield) as a light yellow oil.

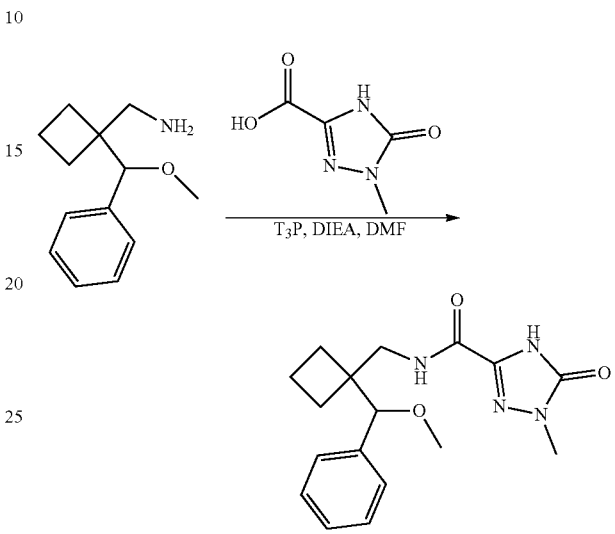

Prepared as for Example 8 using 1-methyl-5-oxo-4H-1,2,4-triazole-3-carboxylic acid (Intermediate 1, 9.76 mg, 0.068 mmol, 1.00 equiv) and 1-{1-[methoxy(phenyl)methyl]cyclobutyl}methanamine (14 mg, 0.068 mmol, 1.00 equiv).

LC-MS (ES, m/z): [M+H]$^+$=331

H-NMR (400 MHz, DMSO-$d_6$, ppm): 12.28 (s, 1H), 8.29 (s, 1H), 7.39-7.30 (m, 5H), 4.27 (s, 1H), 3.35-3.20 (m, 5H), 3.16 (s, 3H), 2.10-1.93 (m, 2H), 1.80-1.71 (m, 2H), 1.65-1.55 (m, 2H).

Example 29: 1-methyl-N-((1-(2-methylbenzyl)cyclobutyl)methyl)-5-oxo-4,5-dihydro-1H-1,2,4-triazole-3-carboxamide

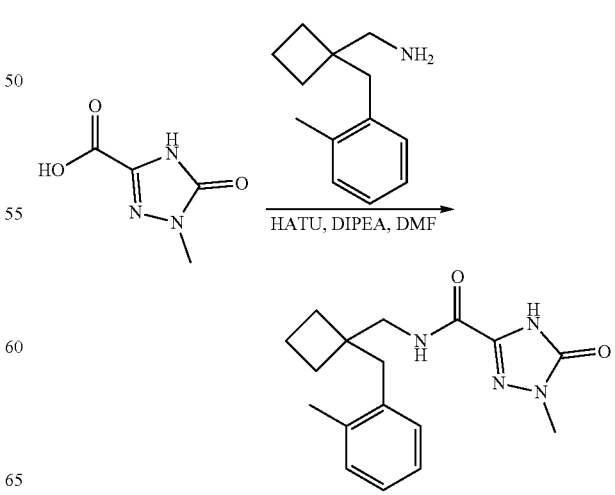

Prepared as for Example 3 using 1-{1-[(2-methylphenyl)methyl]cyclobutyl}methanamine (Example 21, 45 mg, 0.24 mmol, 1.00 equiv) and 1-methyl-5-oxo-4H-1,2,4-triazole-3-carboxylic acid (Intermediate 1, 37.42 mg, 0.26 mmol, 1.10 equiv).

LC-MS (ES, m/z): [M+H]⁺=315

H-NMR (400 MHz, DMSO-d₆, ppm): 12.27 (s, 1H), 8.66 (s, 1H), 7.15-7.11 (m, 4H), 3.42 (s, 2H), 3.36 (s, 3H), 2.67 (s, 2H), 2.19 (s, 3H), 1.82-1.69 (m, 5H), 1.50-1.46 (m, 1H).

Example 30: N-((1-(2-chlorobenzyl)cyclobutyl)methyl)-1-methyl-5-oxo-4,5-dihydro-1H-1,2,4-triazole-3-carboxamide

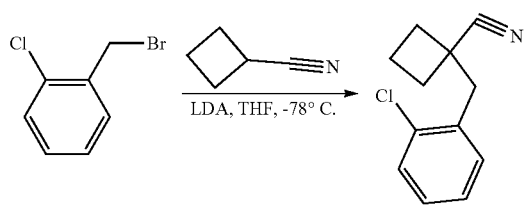

Prepared as for 1-[1-[(2,6-difluorophenyl)methyl]cyclobutyl]methanamine (Example 16) using 1-(bromomethyl)-2-chlorobenzene (1 g, 4.867 mmol, 1.00 equiv) and cyclobutanecarbonitrile (0.39 g, 4.867 mmol, 1.00 equiv).

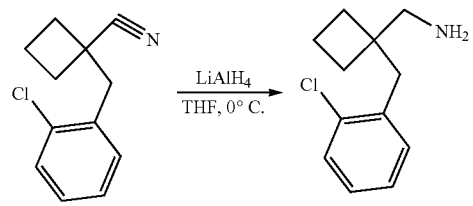 [SMILES: N#CC1(Cc2ccccc2Cl)CCC1 ; "LiAlH4" ; NCC1(Cc2ccccc2Cl)CCC1]

Prepared as for 1-[1-[(2,6-difluorophenyl)methyl]cyclobutyl]methanamine (Example 16) using 1-[(2-chlorophenyl)methyl]cyclobutane-1-carbonitrile (500 mg, 2.431 mmol, 1.00 equiv) and LiAlH₄ (184.52 mg, 4.862 mmol, 2.00 equiv).

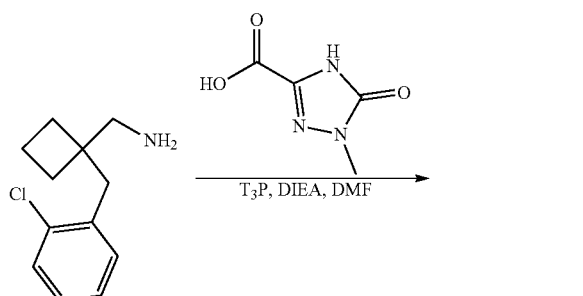

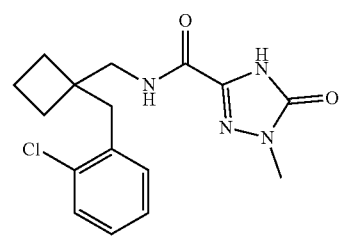

Prepared as for Example 8 using 1-{1-[(2-chlorophenyl)methyl]cyclobutyl}methanamine (50 mg, 0.238 mmol, 1.00 equiv) and 1-methyl-5-oxo-2H-1,2,4-triazole-3-carboxylic acid (34.12 mg, 0.238 mmol, 1.00 equiv).

LC-MS (ES, m/z): [M+H]⁺=335

H-NMR (400 MHz, DMSO-d₆, ppm) δ 12.28 (brs, 1H), 8.65-8.62 (m, 1H), 7.45-7.41 (m, 2H), 7.32-7.24 (m, 2H), 3.39-3.31 (m, 5H), 2.83 (s, 2H), 1.87-1.72 (m, 5H), 1.56-1.53 (m, 1H).

Example 31: N-(2,2-dimethyl-3-phenylpropyl)-1-methyl-5-oxo-4,5-dihydro-1H-1,2,4-triazole-3-carboxamide

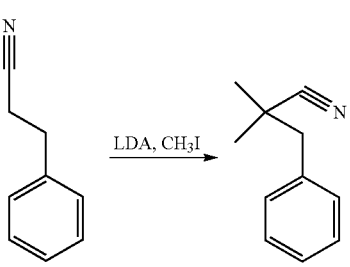

To a stirred solution of benzylacetonitrile (1 g, 7.623 mmol, 1.00 equiv) and CH₃a (5.41 g, 38.115 mmol, 5.00 equiv) in THF was added a 2.0 M THF solution of LDA (19.06 mL, 38.12 mmol, 5.00 equiv) dropwise at −78° C. under nitrogen atmosphere. The resulting mixture was stirred for 2 h at −78° C. and quenched by the addition of sat. NH₄Cl (aq.) (20 mL) at −78° C. The aqueous layer was extracted with EtOAc (2×20 mL). The organic layer was concentrated and the residue was purified by silica gel column chromatography, eluting with PE/EtOAc (10:1) to afford 2,2-dimethyl-3-phenylpropanenitrile (0.9 g, 74% yield) as a light yellow oil.

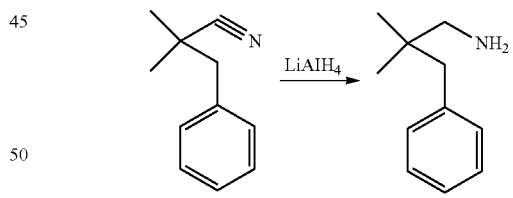

To a stirred solution/mixture of 2,2-dimethyl-3-phenylpropanenitrile (500 mg, 3.140 mmol, 1.00 equiv) in THF was added LiAlH₄ (119.18 mg, 3.140 mmol, 1.00 equiv) in portions at room temperature under nitrogen atmosphere. The resulting mixture was stirred for 2 h at room temperature under nitrogen atmosphere and quenched with water at room temperature. The resulting mixture was filtered, and the filter cake was washed with acetonitrile. The filtrate was concentrated and this resulted in 2,2-dimethyl-3-phenylpropan-1-amine (300 mg, 58% yield) as a light yellow oil.

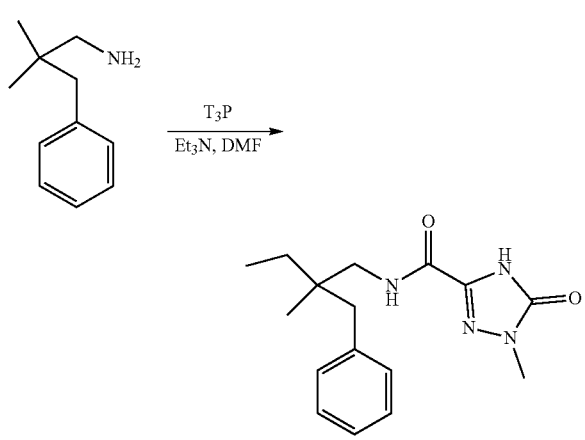

Prepared according to Example 8 using 1-[1-(cyclohexylmethyl)cyclobutyl]methanamine (100 mg, 0.552 mmol, 1.00 equiv) and 1-methyl-5-oxo-4H-1,2,4-triazole-3-carboxylic acid (Intermediate 1, 78.92 mg, 0.552 mmol, 1.00 equiv).

LC-MS (ES, m/z): $[M+H]^+ = 289$

H-NMR (400 MHz, DMSO-$d_6$, ppm) δ 12.38 (brs, 1H), 8.46-8.43 (m, 1H), 7.29-7.16 (m, 5H), 3.36 (s, 3H), 3.11 (d, J=6.4 Hz, 2H), 2.51-2.50 (m, 2H), 0.80 (s, 6H)

Example 32: 1-methyl-N-(2-methyl-3-phenylpropyl)-5-oxo-4,5-dihydro-1H-1,2,4-triazole-3-carboxamide

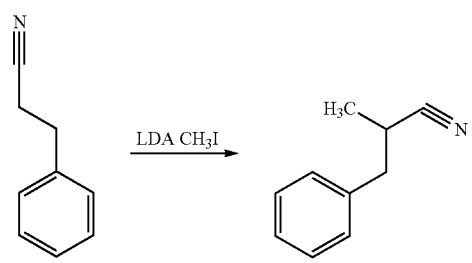

To a stirred solution of benzylacetonitrile (1 g, 7.623 mmol, 1.00 equiv) in THF were added 2.0 M THF solution of LDA (4.193 mL, 8.385 mmol, 1.10 equiv) dropwise at −78° C. under nitrogen atmosphere. The resulting mixture was stirred for 30 mins at −78° C. under nitrogen atmosphere and CH$_3$I (1.19 g, 8.385 mmol, 1.10 equiv) added dropwise at −78° C. under nitrogen atmosphere. The resulting mixture was stirred for 1 h at −78° C. under nitrogen atmosphere. The reaction was quenched by the addition of sat. NH$_4$Cl (aq.) at −30° C. The aqueous layer was extracted with EtOAc (2×30 mL). The organic layer was concentrated and the crude product was used in the next step directly without further purification.

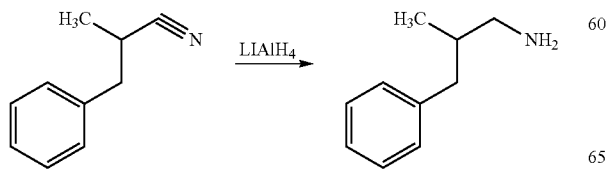

To a stirred solution of 2-methyl-3-phenylpropanenitrile (900 mg, 6.198 mmol, 1.00 equiv) in THF was added LiAlH$_4$ (470.49 mg, 12.396 mmol, 2.00 equiv) in portions at 0° C. under nitrogen atmosphere. The resulting mixture was stirred for 2 h at room temperature under nitrogen atmosphere and quenched by the addition of water (0.5 mL) at 0° C. The resulting mixture was filtered and the filter cake was washed with THF (2×20 mL). The filtrate was concentrated under reduced pressure. The crude product was used in the next step directly without further purification.

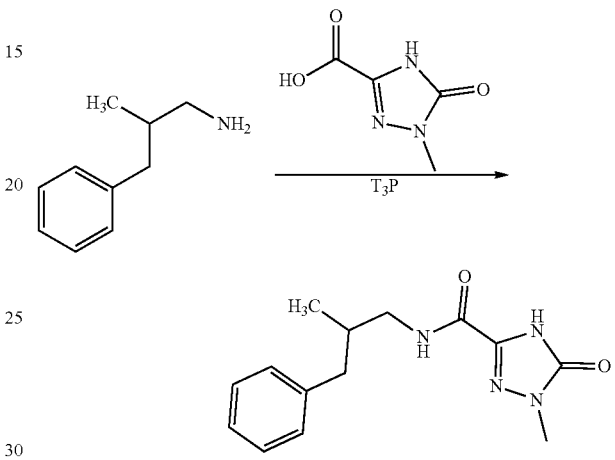

Prepared as for Example 8 using 2-methyl-3-phenylpropan-1-amine (50 mg, 0.335 mmol, 1.00 equiv) and 1-methyl-5-oxo-4H-1,2,4-triazole-3-carboxylic acid (Intermediate 1, 47.94 mg, 0.335 mmol, 1.00 equiv).

LC-MS (ES, m/z): $[M+H]^+ = 275$

H-NMR (400 MHz, DMSO-$d_6$, ppm) δ 12.25 (brs, 1H), 8.66-8.63 (m, 1H), 7.30-7.26 (m 2H), 7.19-7.17 (m, 3H), 3.35 (s, 3H), 3.20-3.14 (m, 1H), 3.12-3.04 (m, 1H), 2.71-2.66 (m, 1H), 2.34-2.281 (m, 1H), 2.11-1.951 (m, 1H), 0.78-0.76 (d, J=8.0 Hz, 3H)

Example 33: N-((1-benzylcyclopropyl)methyl)-1-methyl-5-oxo-4,5-dihydro-1H-1,2,4-triazole-3-carboxamide

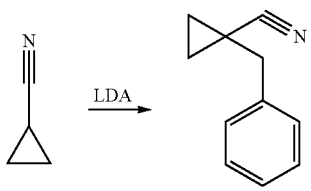 [SMILES: N#CC1CC1 ; N#CC1(Cc2ccccc2)CC1]

Prepared as for 1-[(2,6-difluorophenyl)methyl]cyclobutane-1-carbonitrile (Example 16) using cyclopropyl nitrile (1 g, 14.905 mmol, 1.00 equiv) and benzyl bromide (3.06 g, 17.886 mmol, 1.20 equiv).

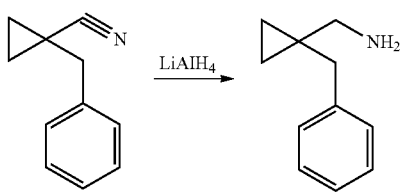

Prepared as for 1-[1-[(2,6-difluorophenyl)methyl]cyclobutyl]methanamine (Example 16) using 1-benzylcyclopropane-1-carbonitrile (500 mg, 3.180 mmol, 1.00 equiv) and LiAlH₄ (241.41 mg, 6.360 mmol, 2.00 equiv).

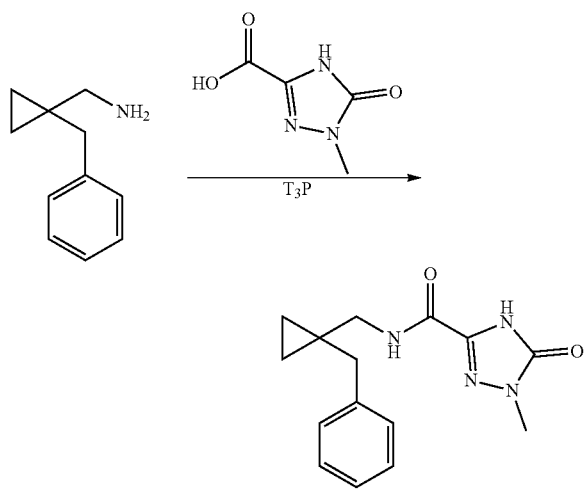

Prepared as for Example 8 using 1-(1-benzylcyclopropyl)methanamine (100 mg, 0.620 mmol, 1.00 equiv) and 1-methyl-5-oxo-4H-1,2,4-triazole-3-carboxylic acid (Intermediate 1, 88.75 mg, 0.620 mmol, 1.00 equiv).

LC-MS (ES, m/z): [M+H]⁺=287

H-NMR (400 MHz, DMSO-d₆, ppm) δ 8.53-8.50 (m, 1H), 7.30-7.25 (m, 4H), 7.20-7.17 (m, 1H), 3.36 (s, 3H), 3.12-3.11 (m, 2H), 2.60 (s, 2H), 0.53-0.50 (m, 2H), 0.40-0.38 (m, 2H).

Example 34: N-(2,2-dimethyl-1-phenylpentan-3-yl)-1-methyl-5-oxo-4,5-dihydro-1H-1,2,4-triazole-3-carboxamide

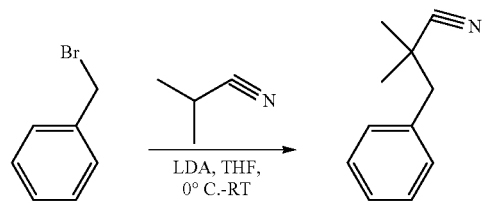

Prepared as for 1-[(2,6-difluorophenyl)methyl]cyclobutane-1-carbonitrile (Example 16) using isobutyronitrile (0.40 g, 5.85 mmol, 1.00 equiv) and benzyl bromide (1 g, 5.847 mmol, 1.00 equiv).

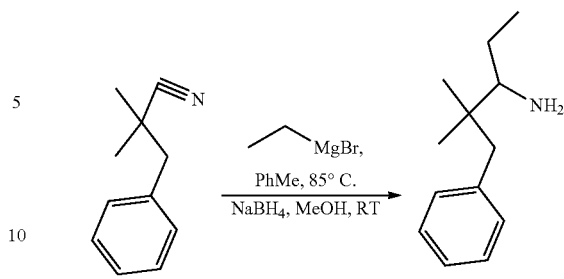

To a stirred solution of 2,2-dimethyl-3-phenylpropanenitrile (500 mg, 3.14 mmol, 1.00 equiv) in PhMe (10 mL) was added ethylmagnesium bromide (627.72 mg, 4.71 mmol, 1.50 equiv) dropwise at 0° C. and stirred for 60 min at 85° C. under nitrogen atmosphere. The reaction was monitored by LCMS. The reaction was cooled and concentrated under reduced pressure. The residue was dissolved in MeOH (10 mL) and NaBH₄ (178.20 mg, 4.71 mmol, 1.50 equiv) added in portions at 0° C. and stirred at room temperature for 1 h. The reaction was diluted with EtOAc (50 mL) and quenched by the addition of sat. sodium hyposulfite (aq.) (10 mL) at room temperature. The organic layer was concentrated and the residue was purified by silica gel column chromatography, eluting with PE/EtOAc (8:1) to afford 2,2-dimethyl-1-phenylpentan-3-amine (300 mg, 50% yield) as a light yellow oil.

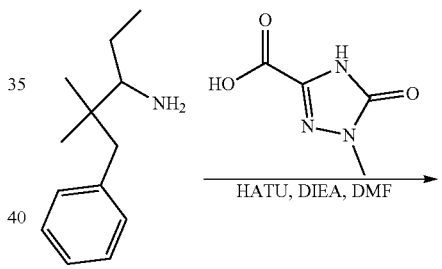

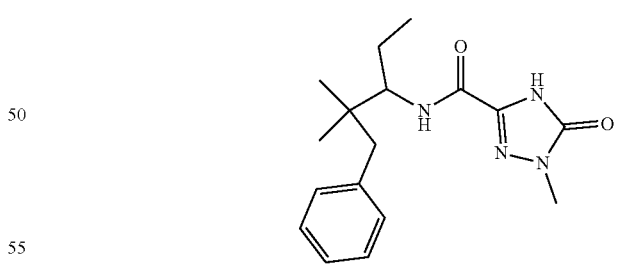

Prepared according to Example 3 using 2,2-dimethyl-1-phenylpentan-3-amine (50 mg, 0.26 mmol, 1.00 equiv) and 1-methyl-5-oxo-4H-1,2,4-triazole-3-carboxylic acid (Intermediate 1, 41.14 mg, 0.29 mmol, 1.10 equiv).

LC-MS (ES, m/z): [M+H]⁺=317

H-NMR (400 MHz, CDCl3, ppm): 9.81 (brs, 1H), 7.32-7.15 (m, 5H), 6.38-6.35 (m, 1H), 3.91-3.86 (m, 1H), 3.53 (s, 3H), 2.65-2.58 (m, 2H), 1.97-1.92 (m, 1H), 1.44-1.36 (m, 1H), 0.99-0.96 (m, 3H), 0.91 (s, 6H).

Example 35: 1-methyl-5-oxo-N-(1,1,1-trifluoro-3,3-dimethyl-4-phenylbutan-2-yl)-4,5-dihydro-1H-1,2,4-triazole-3-carboxamide

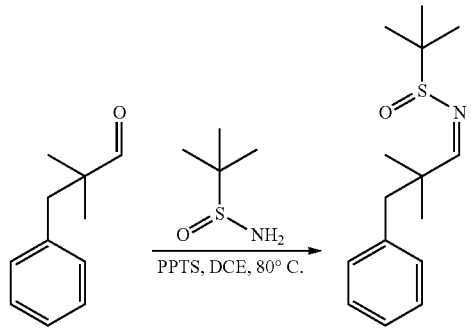

Into a 100 mL 3-necked round-bottom flask containing 2,2-dimethyl-3-phenylpropanal (2 g, 12.33 mmol, 1.00 equiv), DCE (40 mL) and tert-butanesulfinamide (2.24 g, 18.492 mmol, 1.50 equiv) was added MgSO₄ (0.90 g, 36.984 mmol, 3.00 equiv) and PPTS (0.62 g, 2.466 mmol, 0.20 equiv) at RT under nitrogen atmosphere. The resulting mixture was stirred for 12 h at 85° C. The resulting mixture was filtered and the filter cake was washed with DCM (3×100 mL). The filtrate was concentrated under reduced pressure. The residue was purified by silica gel column chromatography, eluted with PE/EtOAc (12:1) to afford N-[(1Z)-2,2-dimethyl-3-phenylpropylidene]-2-methylpropane-2-sulfinamide (1.6 g, 49% yield).

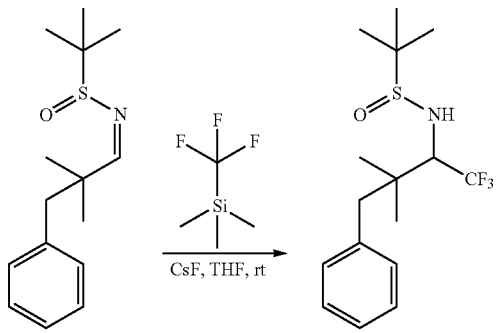

To a stirred solution/mixture of N-[(1Z)-2,2-dimethyl-3-phenylpropylidene]-2-methylpropane-2-sulfinamide (1.5 g, 5.651 mmol, 1.00 equiv) in THF (30 mL) at room temperature was added CsF (0.43 g, 2.825 mmol, 0.5 equiv) followed by trifluoromethyltrimethylsilane (2.81 g, 19.779 mmol, 3.50 equiv) dropwise under nitrogen atmosphere. The resulting mixture was stirred for 10 h at room temperature and the resulting mixture was diluted with EtOAc (100 mL). The reaction was quenched by the addition of water/ice (100 mL) and the aqueous layer was extracted with EtOAc (3×100 mL). The combined fractions were washed with brine, dried over sodium sulfate and concentrated under vacuum. The residue was purified by silica gel column chromatography, eluting with PE/EtOAc (10:1) to afford N-(3-benzyl-1,1,1-trifluoro-3-methylbutan-2-yl)-2-methylpropane-2-sulfinamide (0.42 g, 22% yield) as a yellow oil.

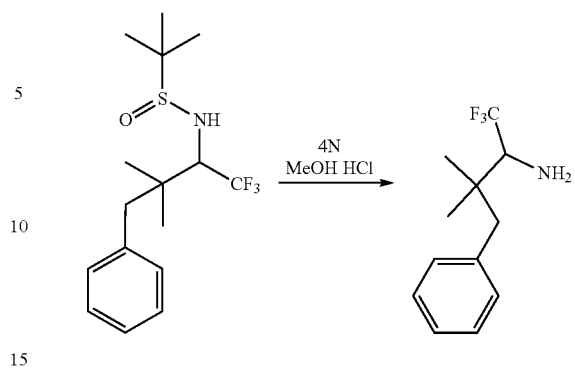

Into a 100 mL 3-necked round-bottom flask containing N-(3-benzyl-1,1,1-trifluoro-3-methylbutan-2-yl)-2-methylpropane-2-sulfinamide (0.42 g, 1.252 mmol, 1.00 equiv) methanol (10 mL) was added 4N HCl in MeOH (1.57 mL, 6.260 mmol, 5.00 equiv)) at room temperature. The resulting mixture was stirred for 3 h and concentrated under reduced pressure. The residue was basified to pH 8 with saturated NaHCO₃ (aq.) and the aqueous layer was extracted with EtOAc (3×50 mL). The combined fractions were concentrated under vacuum. This resulted in 1,1,1-trifluoro-3,3-dimethyl-4-phenylbutan-2-amine (130 mg, 45% yield) as a yellow oil.

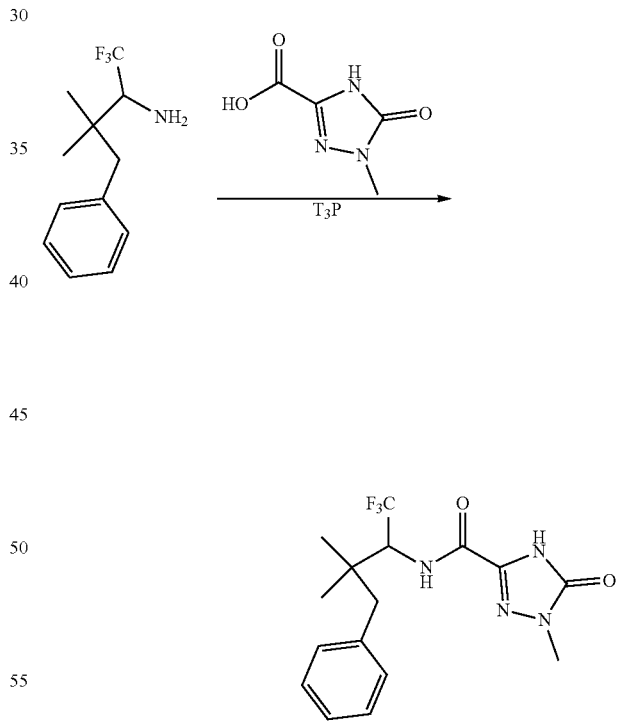

Prepared as for Example 8 using 1,1,1-trifluoro-3,3-dimethyl-4-phenylbutan-2-amine (90 mg, 0.393 mmol, 1.00 equiv) and 1-methyl-5-oxo-2H-1,2,4-triazole-3-carboxylic acid (56.30 mg, 0.393 mmol, 1.00 equiv).

LC-MS (ES, m/z): [M+H]⁺=357

H-NMR (300 MHz, CDCl₃, ppm) δ 7.30-7.11 (m, 5H), 8.65-8.62 (m, 1H), 6.84 (d, J=9.3 Hz, 1H), 4.64-4.58 (m, 1H), 3.62 (s, 3H), 2.74 (s, 2H), 1.10 (s, 6H)

Example 36: N-(3-(2-bromophenyl)-2,2-dimethyl-propyl)-1-methyl-5-oxo-4,5-dihydro-1H-1,2,4-triazole-3-carboxamide

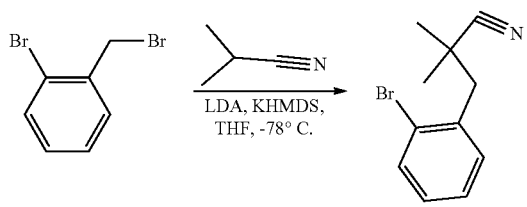

Prepared as for 1-[(2,6-difluorophenyl)methyl]cyclobutane-1-carbonitrile (Example 16) using 1-bromo-2-(bromomethyl)benzene (2 g, 8.00 mmol, 1.00 equiv) and isobutyronitrile (0.55 g, 8.00 mmol, 1.00 equiv).

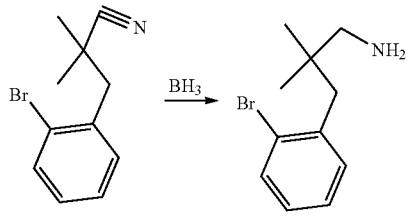

To a stirred solution of 3-(2-bromophenyl)-2,2-dimethyl-propanenitrile (1 g, 4.20 mmol, 1.00 equiv) in THF was added 1 M BH$_3$-THF (21 mL g, 21.00 mmol, 5.00 equiv) dropwise at 0° C. under nitrogen atmosphere. The resulting mixture was stirred for 5 h at 50° C. under nitrogen atmosphere. The reaction was quenched by the addition of MeOH (10 mL) at 0° C. The mixture was concentrated and the residue was purified by silica gel column chromatography, eluting with CH$_2$Cl$_2$/MeOH (10:1) to afford 3-(2-bromophenyl)-2,2-dimethylpropan-1-amine (0.5 g, 49% yield) as a light yellow oil.

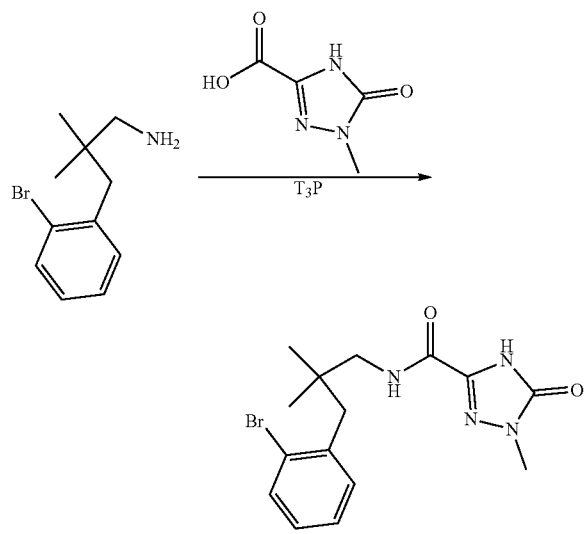

Prepared as for Example 8 using 3-(2-bromophenyl)-2,2-dimethylpropan-1-amine (50 mg, 0.206 mmol, 1.00 equiv) and 1-methyl-5-oxo-4H-1,2,4-triazole-3-carboxylic acid (Intermediate 1, 29.55 mg, 0.206 mmol, 1.00 equiv).

LC-MS (ES, m/z): [M+H]$^+$=367

H-NMR (400 MHz, DMSO-d$_6$, ppm) δ 12.28 (brs, 1H), 8.65-8.62 (m, 1H), 7.61-7.60 (m, 1H), 7.38-7.30 (m, 2H), 7.18-7.14 (m, 1H), 3.40 (s, 3H), 3.19 (s, 2H), 2.76 (s, 2H), 0.96 (s, 6H).

Example 37: N-((1-(2-bromobenzyl)cyclobutyl)methyl)-1-methyl-5-oxo-4,5-dihydro-1H-1,2,4-triazole-3-carboxamide

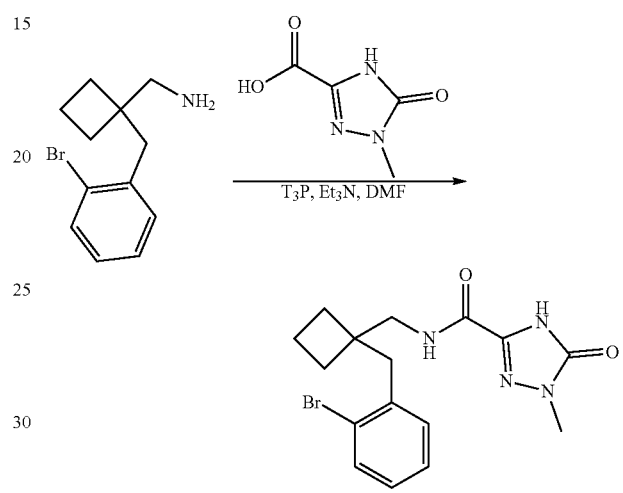

Prepared as for Example 8 using 1-{1-[(2-bromophenyl)methyl]cyclobutyl}methanamine (Prepared from cyclobutanecarbonitrile and 1-bromo-2-(bromomethyl)benzene according to Example 37 step 1-2, 100 mg, 0.393 mmol, 1.00 equiv) and 1-methyl-5-oxo-2H-1,2,4-triazole-3-carboxylic acid (56.30 mg, 0.393 mmol, 1.00 equiv).

LC-MS (ES, m/z): [M+H]$^+$=379

H-NMR (400 MHz, DMSO-d$_6$, ppm) δ 8.67-8.64 (m, 1H), 7.61 (d, J=8.0 Hz, 1H), 7.42-7.41 (m, 1H), 7.36-7.31 (m, 1H), 7.20-7.16 (m, 1H), 3.40 (d, J=8.0 Hz, 2H), 3.36 (s, 3H), 2.83 (s, 2H), 1.85-1.73 (m, 5H), 1.53-1.52 (m, 1H)

Example 38: N-(3,3-dimethyl-4-phenylbutan-2-yl)-1-methyl-5-oxo-4,5-dihydro-1H-1,2,4-triazole-3-carboxamide

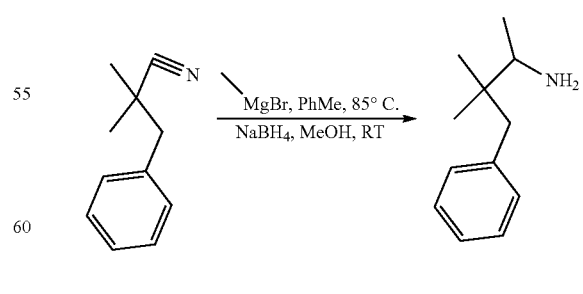

To a stirred solution of 2,2-dimethyl-3-phenylpropanenitrile (500 mg, 3.14 mmol, 1.00 equiv) in PhMe (10 mL) was added 1M bromo(methyl)magnesium (4.7 mL, 4.71 mmol, 1.50 equiv) dropwise at 0° C. under nitrogen atmosphere over 30 min. The resulting mixture was stirred for 60 min at 85° C. under nitrogen atmosphere and concentrated under reduced pressure. The residue was dissolved in MeOH (10 mL) and NaBH₄ (178.20 mg, 4.71 mmol, 1.50 equiv) added in portions at 0° C. The reaction mixture was warmed to room temperature and concentrated. The residue was dissolved in EtOAc (50 mL) and quenched by addition of sat. sodium hyposulfite (aq.) (10 mL). The organic layer was collected, washed with brine, dried over sodium sulfate and concentrated. The residue was purified by silica gel column chromatography, eluting with PE/EtOAc (8:1) to afford 3,3-dimethyl-4-phenylbutan-2-amine (300 mg, 54% yield) as a light yellow oil.

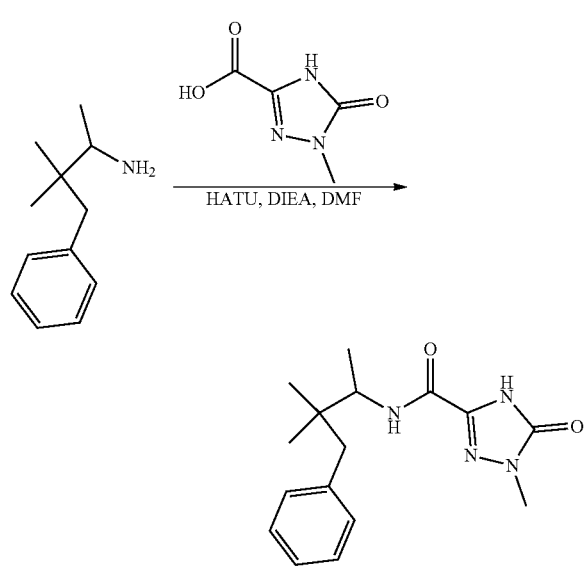

Prepared as for Example 3 using 3,3-dimethyl-4-phenylbutan-2-amine (50 mg, 0.28 mmol, 1.00 equiv) and 1-methyl-5-oxo-4H-1,2,4-triazole-3-carboxylic acid (Intermediate 1, 44.39 mg, 0.31 mmol, 1.10 equiv).

LC-MS (ES, m/z): [M+H]⁺=303

H-NMR (300 MHz, CDCl3, ppm): 7.31-7.13 (m, 5H), 6.58-6.55 (m, 1H), 4.15-4.05 (m, 1H), 3.52 (s, 3H), 2.64-2.54 (m, 2H), 1.25 (d, J=6.6 Hz, 3H), 0.90 (s, 6H).

Examples 39A and 39B: N-(3,3-dimethyl-4-phenylbutan-2-yl)-1-methyl-5-oxo-4,5-dihydro-1H-1,2,4-triazole-3-carboxamide (Enantiomer B) and N-(3,3-dimethyl-4-phenylbutan-2-yl)-1-methyl-5-oxo-4,5-dihydro-1H-1,2,4-triazole-3-carboxamide (Enantiomer A)

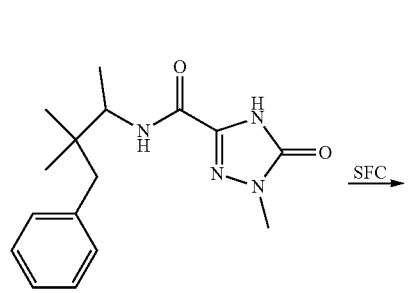

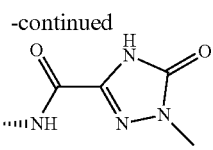

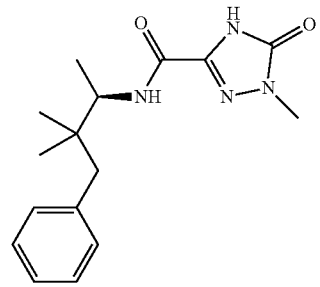

The N-(3,3-dimethyl-4-phenylbutan-2-yl)-1-methyl-5-oxo-4,5-dihydro-1H-1,2,4-triazole-3-carboxamide (Example 38, 45 mg) was purified by Chiral HPLC with the following conditions: YMC Cellulose-SB, 100×4.6 mm, 3 μm 121AB00077, mobile phase A, n-Hexane/DCM=3/1, mobile phase B Ethanol (0.1% FA), 10% to 50% gradient in 15 min; detector, UV 254 nm and 220 nm to afford Enantiomer A (16 mg, 35%) as an off-white solid and Enantiomer B (16 mg, 35%) as an off-white solid. Retention time of isomer A: 1.68 min; retention time of isomer B: 2.10 min.

LCMS (Enantiomer A) (ES, m/z): [M+H]=303
LCMS (Enantiomer B) (ES, m/z): [M+H]=303
H-NMR (Enantiomer A) (300 MHz, CDCl3, ppm): δ 10.13 (s, 1H), 7.33-7.29 (m, 1H), 7.27-7.21 (m, 1H), 7.19-7.14 (m, 2H), 6.57 (d, 1H), 4.12 (t, 1H), 3.52 (s, 3H), 2.68-2.56 (m, 2H), 1.27 (d, J=6.8 Hz, 3H), 0.92 (d, J=4.5 Hz, 6H).
H-NMR (Enantiomer B) (300 MHz, DMSO-d6, ppm): δ 12.19 (s, 1H), 8.11 (d, J=9.6 Hz, 1H), 7.32-7.24 (m, 2H), 7.23-7.12 (m, 3H), 3.97 (dq, J=9.6, 6.8 Hz, 1H), 3.36 (s, 3H), 2.54 (s, 2H), 1.17 (d, J=6.9 Hz, 3H), 0.77 (s, 6H).

One of Enantiomers A and B is (S)—N-(3,3-dimethyl-4-phenylbutan-2-yl)-1-methyl-5-oxo-4,5-dihydro-1H-1,2,4-triazole-3-carboxamide and the other is (R)—N-(3,3-dimethyl-4-phenylbutan-2-yl)-1-methyl-5-oxo-4,5-dihydro-1H-1,2,4-triazole-3-carboxamide.

Example 40: N-(2-benzylbutyl)-1-methyl-5-oxo-4,5-dihydro-1H-1,2,4-triazole-3-carboxamide

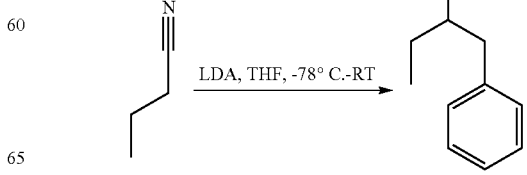

In a 50-mL round bottom flask, to a solution of butyronitrile (500 mg, 7.24 mmol, 1.1 equiv) in THF (30 mL) was added LDA (0.5 mL, 9.87 mmol, 1.5 equiv) dropwise at −78° C. under N₂ atmosphere. The reaction mixture was stirred at −78° C. for 30 mins. A solution of BnBr (1124.96 mg, 6.58 mmol, 1 equiv) in 10 mL THF was added dropwise and the mixture was stirred for another 60 mins. The reaction was quenched with water/sat. NH₄Cl (5 mL), and then the mixture was extracted with EtOAc (2×15 mL). The combined organic extracts were washed with brine (10 mL), dried over anhydrous Na₂SO₄ and concentrated. The residue was purified by silica gel column chromatography, eluting with PE/EtOAc (8:1) to afford 2-benzylbutanenitrile (380 mg, 36%) as a colorless oil.

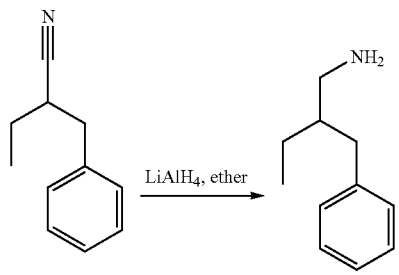

To a solution of 2-benzylbutanenitrile (300 mg, 1.88 mmol, 1 equiv) in ether (10.00 mL, 96.39 mmol, 51.16 equiv) was added LiAlH4 (214.52 mg, 5.65 mmol, 3 equiv) at 0° C. The mixture was stirred for 60 min. The reaction mixture was quenched by water and extracted with DCM (20 mL). Desired product could be detected by LCMS. The residue was purified by silica gel column chromatography, eluted with CH₂Cl2/MeOH (8:1) to afford [2-(aminomethyl) butyl]benzene (210 mg, 68%) as a colorless oil.

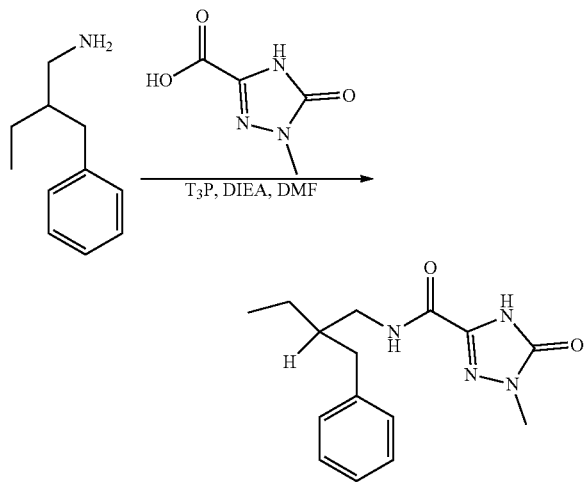

Prepared as for Example 8 using [2-(aminomethyl) butyl]benzene (30 mg, 0.18 mmol, 1 equiv) and 1-methyl-5-oxo-4H-1,2,4-triazole-3-carboxylic acid (Intermediate 1, 28.92 mg, 0.20 mmol, 1.1 equiv).

LCMS (ES, m/z): [M+H]⁺=289

H-NMR (300 MHz, DMSO-d6, ppm): δ 8.70-8.49 (m, 1H), 7.45-7.11 (m, 5H), 3.35 (s, 3H), 3.16 (t, 2H), 2.60 (t, 1H), 1.99-1.82 (m, 1H), 1.70-1.35 (m, 1H), 1.30-1.16 (m, 2H), 0.86 (t, 3H).

Example 41: N-(2-benzyl-3-hydroxy-2-methylpropyl)-1-methyl-5-oxo-4,5-dihydro-1H-1,2,4-triazole-3-carboxamide

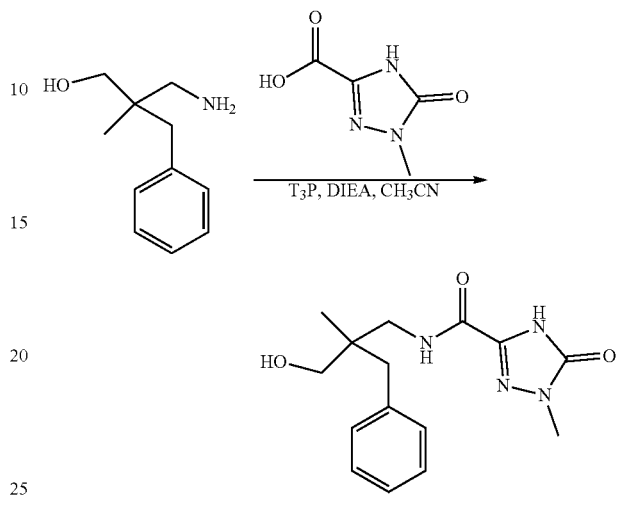

Prepared as for Example 8 using 3-amino-2-benzyl-2-methylpropan-1-ol (915796-29-1, 30 mg, 0.17 mmol, 1 equiv) and 1-methyl-5-oxo-4H-1,2,4-triazole-3-carboxylic acid (Intermediate 1, 26.34 mg, 0.18 mmol, 1.1 equiv).

LCMS (ES, m/z): [M+H]⁺=305

H-NMR (300 MHz, DMSO-d6, ppm): δ 12.30 (s, 1H), 8.41 (t, J=6.2 Hz, 1H), 7.33-7.24 (m, 2H), 7.20 (td, J=5.9, 1.7 Hz, 3H), 3.35 (s, 3H), 3.19 (d, J=6.3 Hz, 2H), 3.13 (d, J=2.6 Hz, 2H), 2.63 (d, J=13.0 Hz, 1H), 2.46 (s, 1H), 0.64 (s, 3H).

Example 42: N-(2-benzyl-3-hydroxy-2-methylbutyl)-1-methyl-5-oxo-4,5-dihydro-1H-1,2,4-triazole-3-carboxamide

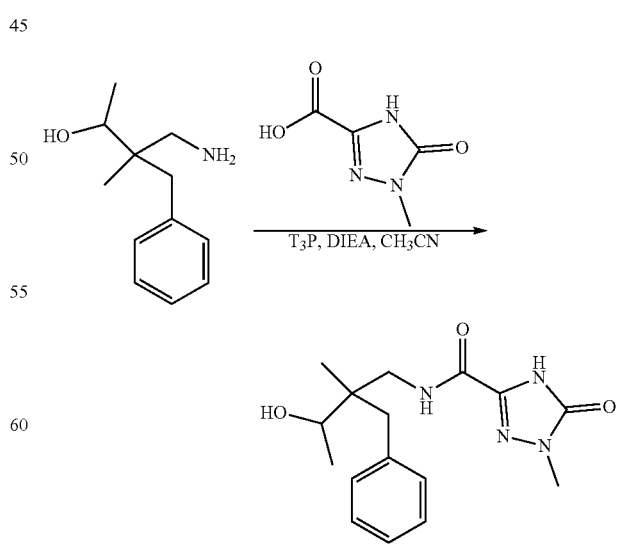

Prepared as for Example using 4-amino-3-benzyl-3-methylbutan-2-ol (1483742-87-5, 30 mg, 0.16 mmol, 1 equiv) in MeCN (3 mL) and 1-methyl-5-oxo-4H-1,2,4-triazole-3-carboxylic acid (Intermediate 1, 24.43 mg, 0.17 mmol, 1.1 equiv).

LCMS (ES, m/z): [M+H]$^+$=319

H-NMR (300 MHz, DMSO-d6, ppm): δ 7.33-7.24 (m, 2H), 7.20 (m, 3H), 3.79-3.68 (m, 2H) 3.35 (s, 3H), 3.19 (m, 1H), 3.13 (m 2H), 2.63 (m, 2H), 1.27 (d, 3H), 0.91 (d, 3H).

Example 43: N-(2-methoxy-3-phenylpropyl)-1-methyl-5-oxo-4,5-dihydro-1H-1,2,4-triazole-3-carboxamide

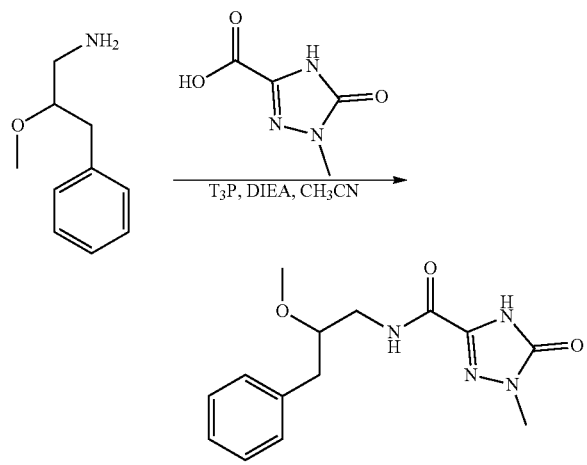

Prepared as for Example 8 using 2-methoxy-3-phenylpropan-1-amine (30 mg, 0.18 mmol, 1 equiv) and 1-methyl-5-oxo-4H-1,2,4-triazole-3-carboxylic acid (Intermediate 1, 28.58 mg, 0.20 mmol, 1.1 equiv).

LCMS (ES, m/z): [M+H]$^+$=291

H-NMR (300 MHz, CDCl3, ppm): δ 10.52 (s, 1H), 7.37-7.29 (m, 2H), 7.24 (m, 3H), 6.98 (s, 1H), 3.72-3.55 (m, 2H), 3.51 (s, 3H), 3.42 (s, 3H), 3.32 (t, J=12.4, 5.6 Hz, 1H), 2.94 (dd, J=14.1, 5.9 Hz, 1H), 2.77 (m, 1H).

Example 44: N-(2-benzyl-2-methylbutyl)-1-methyl-5-oxo-4,5-dihydro-1H-1,2,4-triazole-3-carboxamide

To a solution of 2-benzylbutanenitrile (900 mg, 5.65 mmol, 1 equiv) in THF (10 mL) under nitrogen at −78° C. was added LiHMDS (1891.54 mg, 11.30 mmol, 2 equiv) and the reaction mixture stirred for 30 min. This was followed by the addition of CH$_3$I (2406.77 mg, 16.96 mmol, 3 equiv) dropwise at −78° C. The resulting mixture was stirred for 1 h at −78 and warmed to 0° C. The reaction was quenched with sat. NH4Cl (aq.) at 0° C. and extracted with EtOAc (2×10 mL). The combined organic layers were washed with brine and dried over anhydrous Na$_2$SO$_4$ and concentrated under reduced pressure. The residue was purified by silica gel column chromatography, eluting with PE/EtOAc (12:1) to afford 2-benzyl-2-methylbutanenitrile (850 mg, 87%) as a colorless oil.

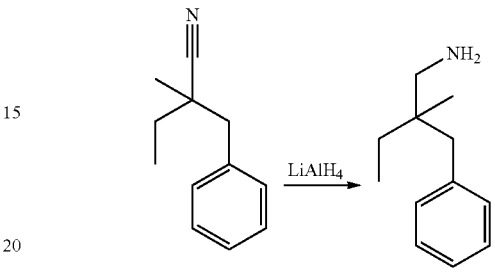

To a solution of 2-benzyl-2-methylbutanenitrile (150 mg, 0.87 mmol, 1 equiv) in ether (10 mL, 96.39 mmol, 111.34 equiv) was added LiAlH$_4$ (65.71 mg, 1.73 mmol, 2 equiv) in portions at 0° C. The reaction mixture was allowed to stir for 1 h at 0° C. and quenched by the addition of water (0.8 mL). The resulting mixture was filtered and concentrated under reduced pressure to afford [2-(aminomethyl)-2-methylbutyl]benzene (100 mg, 65%) as an off-white oil.

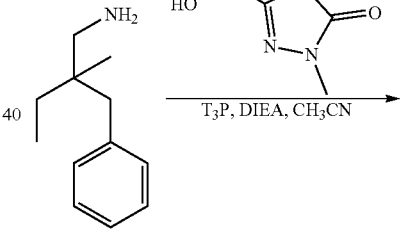

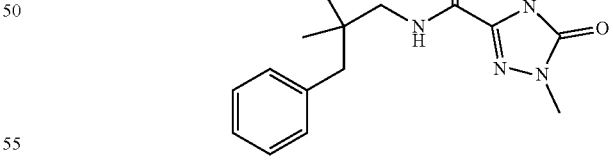

Prepared as for Example 8 using [2-(aminomethyl)-2-methylbutyl]benzene (40 mg, 0.23 mmol, 1 equiv) and 1-methyl-5-oxo-4H-1,2,4-triazole-3-carboxylic acid (Intermediate 1, 35.51 mg, 0.25 mmol, 1.1 equiv).

LCMS (ES, m/z): [M+H]$^+$=303

H-NMR (300 MHz, DMSO-d6, ppm): δ 12.25 (s, 1H), 8.26 (t, J=6.5 Hz, 1H), 7.34-7.23 (m, 2H), 7.23-7.12 (m, 3H), 3.33 (s, 3H), 3.20-3.06 (m, 2H), 2.53 (s, 2H), 1.30-1.08 (m, 2H), 0.87 (t, J=7.4 Hz, 3H), 0.75 (s, 3H).

Example 45: N-(2-benzyl-3-methylbutyl)-1-methyl-5-oxo-4,5-dihydro-1H-1,2,4-triazole-3-carboxamide

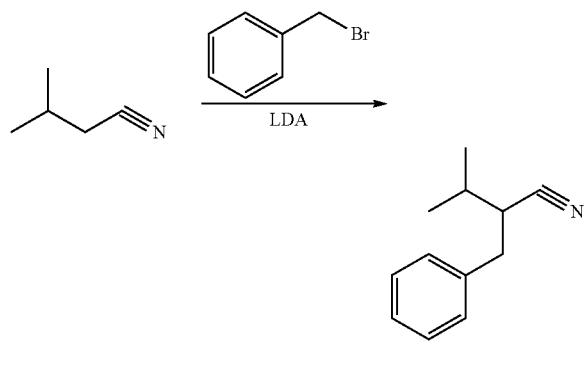

Prepared as for 1-[(2,6-difluorophenyl)methyl]cyclobutane-1-carbonitrile (Example 16) using butanenitrile, 3-methyl- (500 mg, 6.01 mmol, 1 equiv) and benzyl bromide (1.03 g, 6.01 mmol, 1 equiv).

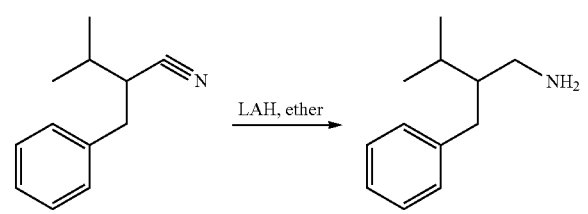

Prepared as for 1-[1-[(2,6-difluorophenyl)methyl]cyclobutyl]methanamine (Example 16) using 2-benzyl-3-methylbutanenitrile (200 mg, 1.15 mmol, 1 equiv) in ether (3 mL) and LiAlH$_4$ (87.61 mg, 2.31 mmol, 2 equiv).

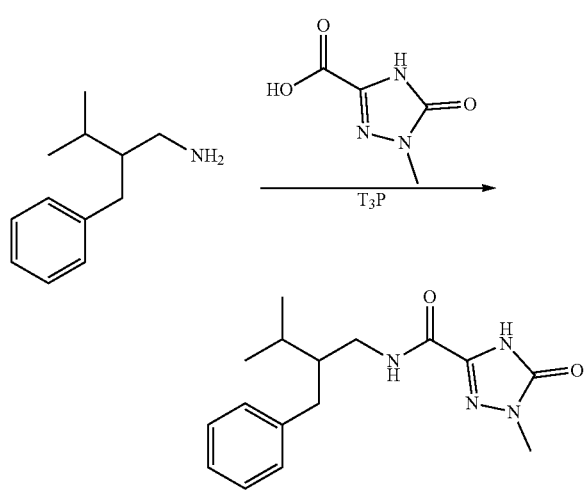

Prepared as for Example 8 using [2-(aminomethyl)-3-methylbutyl]benzene (30 mg, 0.17 mmol, 1 equiv) and 1-methyl-5-oxo-4H-1,2,4-triazole-3-carboxylic acid (Intermediate 1, 26.64 mg, 0.19 mmol, 1.1 equiv).

LCMS (ES, m/z): [M+H]$^+$=303

H-NMR (300 MHz, DMSO-d6, ppm): δ 12.20 (s, 1H), 8.53 (m, 1H), 7.33-7.10 (m, 5H), 3.34 (s, 3H), 3.29-3.19 (m, 1H), 3.03 (m, 1H), 2.61-2.54 (m, 1H), 2.46-2.38 (m, 1H), 1.92 (m, 1H), 1.76-1.60 (m, 1H), 0.89 (t, 6H).

Examples 46A and 46B: N-[(2R)-2-benzyl-3-methylbutyl]-1-methyl-5-oxo-4H-1,2,4-triazole-3-carboxamide (Enantiomer B) and N-[(2S)-2-benzyl-3-methylbutyl)-1-methyl-5-oxo-4,5-dihydro-1H-1,2,4-triazole-3-carboxamide (Enantiomer A)

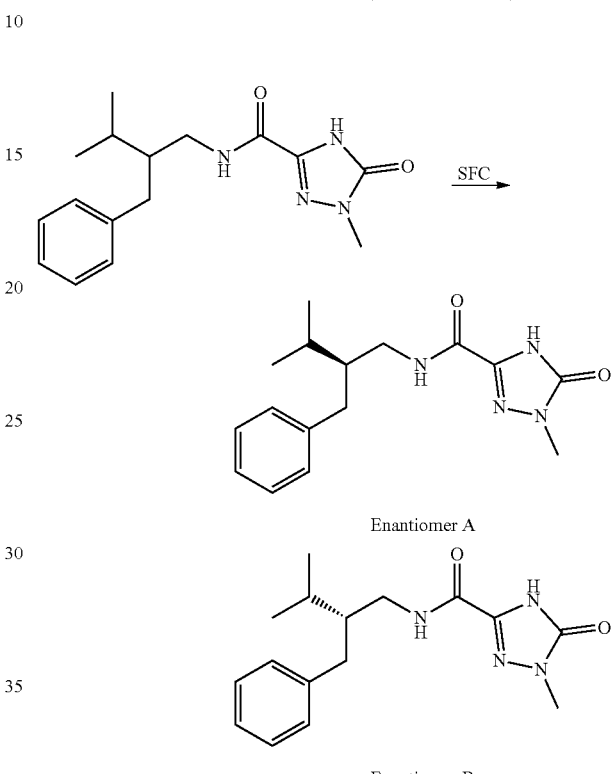

Enantiomer A

Enantiomer B

The N-(2-benzyl-3-methylbutyl)-1-methyl-5-oxo-4H-1,2,4-triazole-3-carboxamide (13 mg) was purified by Chiral HPLC with the following conditions: YMC Cellulose-SB, 100×4.6 mm, 3 μm 121AB00077, mobile phase A, n-Hexane/DCM=3/1, mobile phase B Ethanol (0.1% FA), 10% to 50% gradient in 15 min; detector, UV 254 nm and 220 nm to afford N-[(2S)-2-benzyl-3-methylbutyl]-1-methyl-5-oxo-4H-1,2,4-triazole-3-carboxamide (4 mg, 31%) as an off-white solid and N-[(2R)-2-benzyl-3-methylbutyl]-1-methyl-5-oxo-4H-1,2,4-triazole-3-carboxamide (4 mg, 31%) as an off-white solid. Stereochemistry was inferred. Retention time of isomer A: 2.53 min; retention time of isomer B: 3.14 min.

LCMS (Enantiomer A) (ES, m/z): [M+H]$^+$=303

LCMS (Enantiomer B) (ES, m/z): [M+H]$^+$=303

H-NMR (Enantiomer A) (300 MHz, MeOH-d$^4$, ppm): 7.28-7.12 (m, 5H), 3.45 (s, 3H), 3.44-3.32 (m, 1H), 3.26-3.19 (m, 1H), 2.74-2.67 (m, 1H), 2.55-2.48 (m, 1H), 2.05-2.01 (m, 1H), 1.99-1.82 (m, 1H), 1.06-0.91 (m, 6H).

H-NMR (Enantiomer B) (300 MHz, MeOH-d$^4$, ppm): 7.28-7.12 (m, 5H), 3.45 (s, 3H), 3.42-3.32 (m, 1H), 3.26-3.19 (m, 1H), 2.74-2.67 (m, 1H), 2.55-2.48 (m, 1H), 2.05-2.00 (m, 1H), 1.99-1.81 (m, 1H), 1.06-0.91 (m, 6H)

Example 47: N-((1-benzylcyclohexyl)methyl)-6-oxo-1,6-dihydropyrazine-2-carboxamide

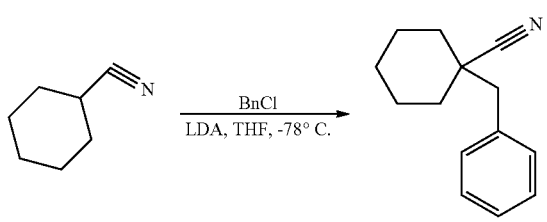 [SMILES: N#CC1CCCCC1 ; "BnCl" ; N#CC1(Cc2ccccc2)CCCCC1]

Prepared according to Example 16 (1-[(2,6-difluorophenyl)methyl]cyclobutane-1-carbonitrile) using cyclohexanecarbonitrile (400.00 mg, 3.66 mmol, 1.00 equiv) and benzyl chloride (556.54 mg, 4.40 mmol, 1.20 equiv). This resulted in 330 mg (45% yield) of 1-benzylcyclohexane-1-carbonitrile as yellow oil.

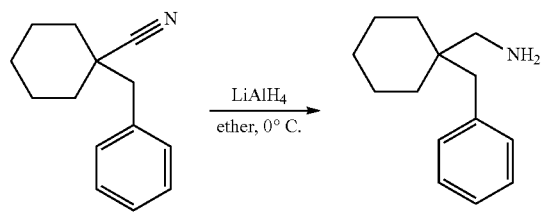 [SMILES: N#CC1(Cc2ccccc2)CCCCC1 ; "LiAlH4" ; NCC1(Cc2ccccc2)CCCCC1]

1-[1-[(2,6-difluorophenyl)methyl]cyclobutyl]methanamine using 1-benzylcyclohexane-1-carbonitrile (290.00 mg, 1.46 mmol, 1.00 equiv) and LiAlH$_4$ (110.45 mg, 2.91 mmol, 2.00 equiv).

This resulted in 230 mg (78% yield) of 1-(1-benzylcyclohexyl)methanamine as yellow oil.

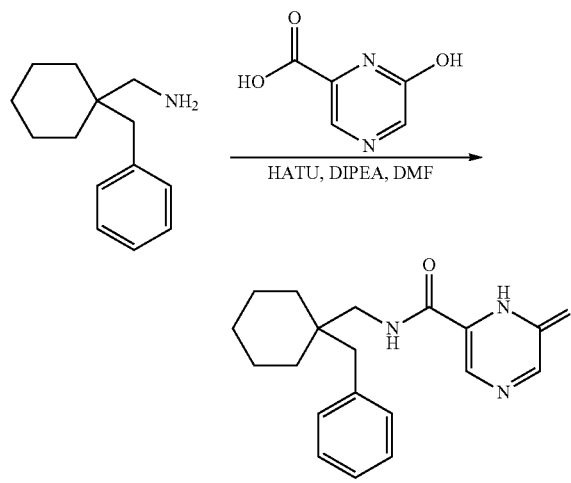

Prepared according to Example 3 using 6-hydroxypyrazine-2-carboxylic acid (41.34 mg, 0.30 mmol, 1.00 equiv) and 1-(1-benzylcyclohexyl)methanamine (60.00 mg, 0.30 mmol, 1.00 equiv) resulting in 21 mg (17% yield) of N-[(1-benzylcyclohexyl)methyl]-6-oxo-1H-pyrazine-2-carboxamide as an off-white solid.

LC-MS (ES, m/z): [M+H]$^+$=326

H-NMR (300 MHz, DMSO-d$_6$, ppm): δ 8.51 (br 1H), 8.31 (s, 1H), 8.12 (br, 1H), 7.32-7.18 (m, 5H), 3.30-3.21 (m, 2H), 2.63 (s, 2H), 1.53-1.24 (m, 10H).

Example 48: N-((1-benzyl-3,3-difluorocyclobutyl)methyl)-6-oxo-1,6-dihydropyrazine-2-carboxamide

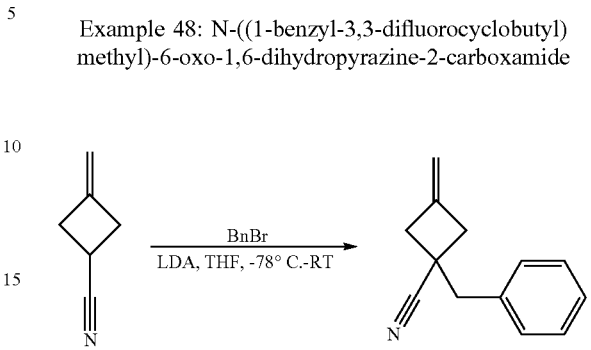

To a stirred solution of 3-methylidenecyclobutane-1-carbonitrile (1 g, 10.74 mmol, 1.00 equiv) and benzyl bromide (1.84 g, 10.74 mmol, 1.00 equiv) in THF (40 mL) was added 1M LDA (21.45 mL, 21.476 mmol, 2.00 equiv) dropwise at −78° C. under nitrogen atmosphere. The resulting mixture was stirred for 10 h at room temperature under nitrogen atmosphere. The reaction was quenched with sat. NH$_4$Cl (10 mL) at −30 degrees C. and the aqueous layer was extracted with EtOAc (2×30 mL). The organic layer was dried and concentrated. The residue was purified by silica gel column chromatography, eluted with PE/EtOAc (10:1) to afford 1-benzyl-3-methylidenecyclobutane-1-carbonitrile (800 mg, 41% yield) as a light yellow oil.

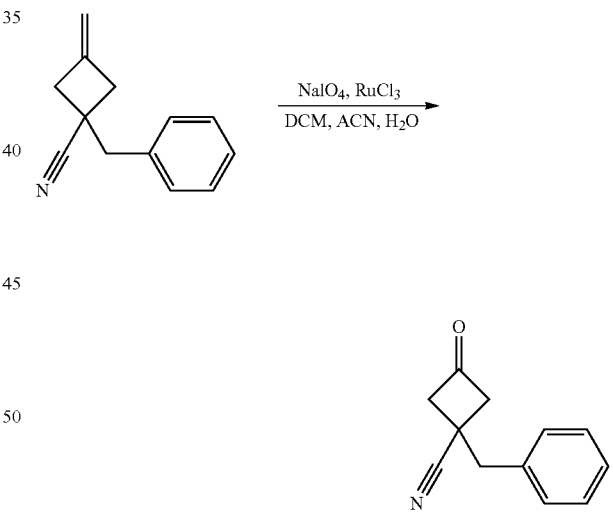

To a stirred mixture of 1-benzyl-3-methylidenecyclobutane-1-carbonitrile (800 mg, 4.366 mmol, 1.00 equiv) and NaIO$_4$ (93.38 mg, 0.437 mmol, 0.10 equiv) in DCM (20 mL), CH$_3$CN (10 mL) and H$_2$O (10 mL) was added RuCl$_3$·H$_2$O (4.92 g, 21.830 mmol, 5.00 equiv) in portions at room temperature under nitrogen atmosphere. The resulting mixture was stirred overnight at room temperature. The mixture was extracted with DCM (2×30 mL). The organic layer was dried and concentrated. The residue was purified by silica gel column chromatography, eluted with PE/EtOAc (10:1) to afford 1-benzyl-3-oxocyclobutane-1-carbonitrile (500 mg, 62% yield) as a light yellow oil.

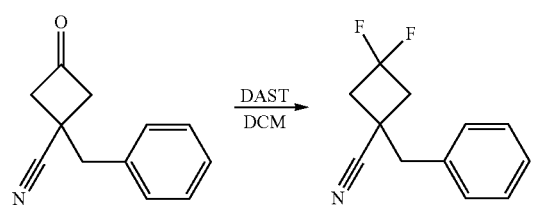

To a stirred mixture of 1-benzyl-3-oxocyclobutane-1-carbonitrile (500 mg, 2.699 mmol, 1.00 equiv) in DCM (20 mL) was added DAST (870.23 mg, 5.398 mmol, 2.00 equiv) in portions at room temperature under nitrogen atmosphere. The resulting mixture was stirred overnight and the mixture diluted with 10 mL water and extracted with DCM (2×10 mL). The organic layer was dried and concentrated. The crude product (320 mg) was used in the next step directly without further purification.

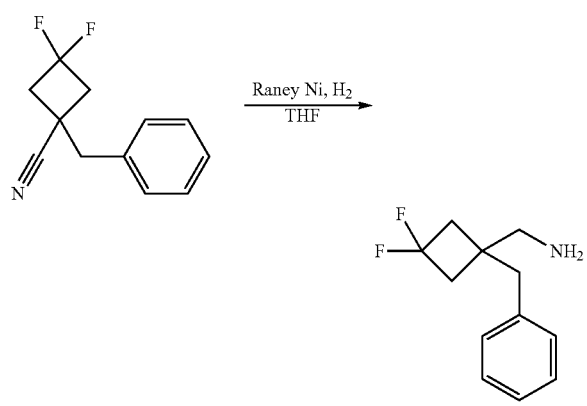

To a solution of 1-benzyl-3,3-difluorocyclobutane-1-carbonitrile (320 mg, 1.361 mmol, 1.00 equiv) in 20 mL MeOH was added Raney-Ni (58.28 mg, 0.680 mmol, 0.50 equiv). The mixture was purged with nitrogen for 5 min and then was pressurized to 2 atm with H$_2$ and stirred overnight at room temperature. The mixture was filtrated and the organic layer was concentrated. The crude product (250 mg) was used in the next step directly without further purification.

Prepared according to Example 1 using 1-(1-benzyl-3,3-difluorocyclobutyl)methanamine (100 mg, 0.473 mmol, 1.00 equiv) and 6-oxo-1H-pyrazine-2-carboxylic acid (66.32 mg, 0.473 mmol, 1.00 equiv) to afford 45 mg N-[(1-benzyl-3,3-difluorocyclobutyl)methyl]-6-oxo-1H-pyrazine-2-carboxamide as an off-white solid.

LC-MS (ES, m/z): [M+H]$^+$=334

H-NMR (400 MHz, DMSO-d$_6$, ppm) δ 12.04 (br, 1H), 8.61-8.58 (br, 2H), 8.30 (br, 1H), 7.35-7.24 (m, 5H), 3.41 (d, J=8.0 Hz, 2H), 2.85 (s, 2H), 2.67-2.53 (m, 4H).

Example 49: N-((1-(3-fluorobenzyl)cyclobutyl)methyl)-6-hydroxypyrazine-2-carboxamide

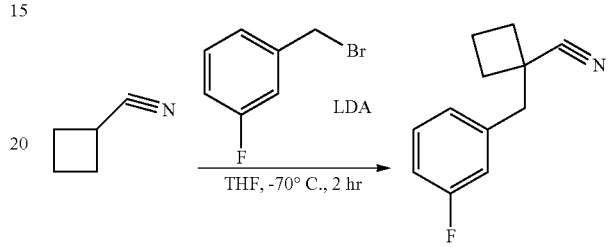

Prepared according Example 1, Step 1 using cyclobutanecarbonitrile (2.00 g, 24.65 mmol, 1.00 equiv) in THF (50 mL) and 1-(bromomethyl)-3-fluorobenzene (4.66 g, 24.65 mmol, 1.00 equiv) to give 2.1 g (45% yield) of 1-[(3-fluorophenyl)methyl]cyclobutane-1-carbonitrile as light yellow oil.

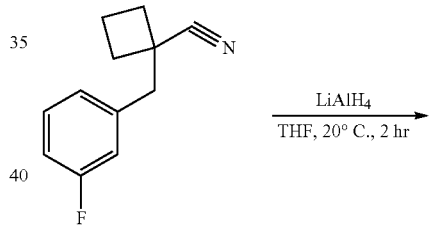

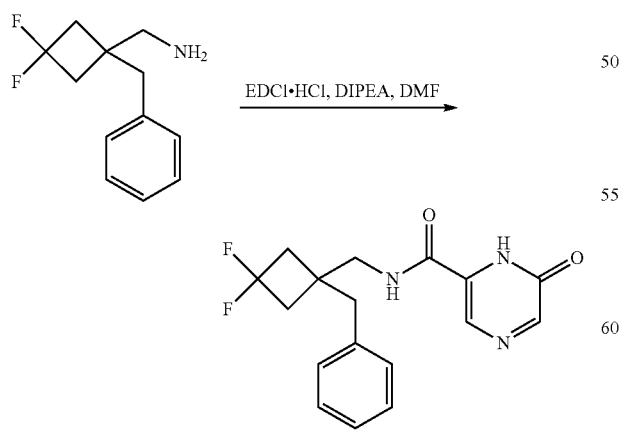

Prepared according to Example 1, step 2 using 1-[(3-fluorophenyl)methyl]cyclobutane-1-carbonitrile (2.50 g, 13.21 mmol, 1.00 equiv) and LiAlH4 (1.00 g, 26.42 mmol, 2.00 equiv) t2.1 g (82% yield) of 1-[1-[(3-fluorophenyl)methyl]cyclobutyl]methanamine as a light yellow oil which was used in the next step without further purification.

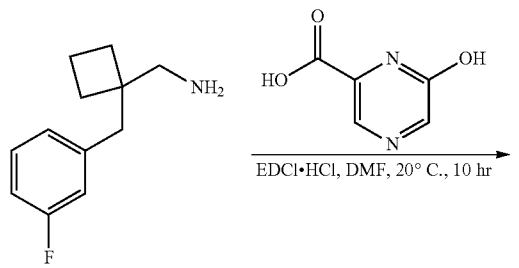

Prepared according to Example 1, step 3 using 1-[1-[(3-fluorophenyl)methyl]cyclobutyl]methanamine (100.00 mg, 0.517 mmol, 1.00 equiv) and 6-hydroxypyrazine-2-carboxylic acid (72.49 mg, 0.517 mmol, 1.00 equiv). The crude product was purified by Prep-HPLC. This resulted in 15 mg (9.19% yield) of N-([1-[(3-fluorophenyl)methyl]cyclobutyl]methyl)-6-hydroxypyrazine-2-carboxamide HCL salt as an off-white solid.

LC-MS (ES, m/z): [M+H]$^+$=316

H-NMR (300 MHz, DMSO-d$_6$, ppm) δ 8.50 (br, 1H), 8.37 (br, 1H), 8.30 (s, 1H), 7.38-7.30 (m, 1H), 7.16-7.01 (m, 3H), 3.60-3.20 (m, 2H), 2.76 (s, 2H), 1.90-1.69 (m, 6H).

Example 50: N-((1-(4-fluorobenzyl)cyclobutyl)methyl)-6-hydroxypyrazine-2-carboxamide

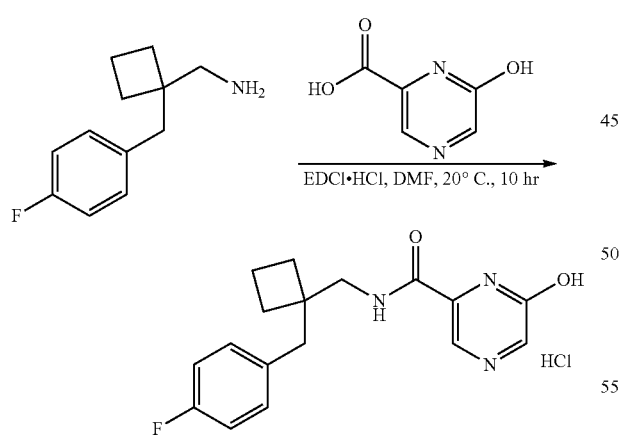

Prepared according to Example 1, step 3 using 1-[1-[(4-fluorophenyl)methyl]cyclobutyl]methanamine (1439896-37-3, 100.00 mg, 0.517 mmol, 1.00 equiv) and 6-hydroxypyrazine-2-carboxylic acid (72.49 mg, 0.517 mmol, 1.00 equiv). The crude mixture was purified by Prep-HPLC resulting in 15 mg (9.19% yield) of N-([1-[(4-fluorophenyl)methyl]cyclobutyl]methyl)-6-hydroxypyrazine-2-carboxamide HCl salt as an off-white solid.

LC-MS (ES, m/z): [M+H]$^+$=316

H-NMR (300 MHz, DMSO-d$_6$, ppm) δ 8.58 (br, 1H), 8.41-8.30 (m, 2H), 7.33-7.28 (m, 2H), 7.15-7.09 (m, 2H), 3.40-3.20 (m, 2H), 2.73 (s, 2H), 1.88-1.67 (m, 6H).

Example 51: N-(2-cyclobutyl-3-phenylpropyl)-1-methyl-5-oxo-4,5-dihydro-1H-1,2,4-triazole-3-carboxamide

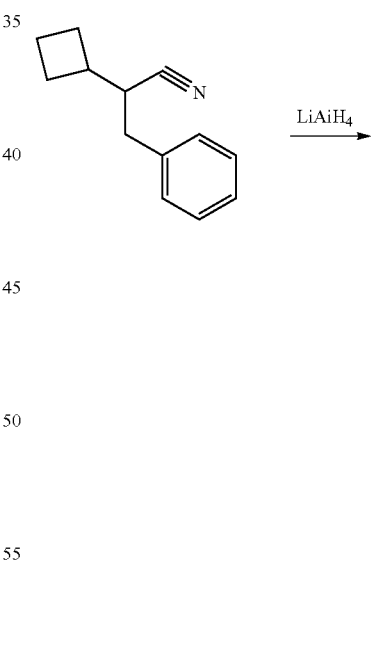

Prepared according to Example 1, Step 1 using 2-cyclobutylacetonitrile (100 mg, 1.051 mmol, 1 equiv) and benzyl bromide (197.74 mg; 1.156 mmol, 1.1 equiv). Purification by silica gel column chromatography, eluted with PE/THF (10:1) afforded 2-cyclobutyl-3-phenylpropanenitrile (80 mg, 41.08%) as a light yellow oil.

Prepared according to Example 1, Step 2 using 2-cyclobutyl-3-phenylpropanenitrile (50 mg, 0.270 mmol, 1 equiv) and LiAlH$_4$ (10.24 mg, 0.270 mmol, 1.00 equiv) resulting in 2-cyclobutyl-3-phenylpropan-1-amine (30 mg, 58.72%) as a light yellow oil which was used in the next step without further purification.

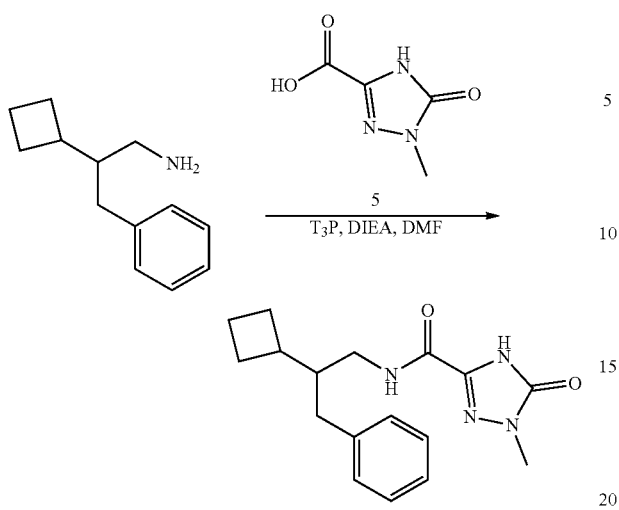

Prepared according to Example 8 using 2-cyclobutyl-3-phenylpropan-1-amine (30 mg, 0.158 mmol, 1 equiv) and 1-methyl-5-oxo-4H-1,2,4-triazole-3-carboxylic acid (Intermediate 1, 24.95 mg, 0.174 mmol, 1.1 equiv). The crude product was purified by Prep-HPLC to afford N-(2-cyclobutyl-3-phenylpropyl)-1-methyl-5-oxo-4H-1,2,4-triazole-3-carboxamide (11 mg, 22%) as a white solid.

LC-MS (ES, m/z): [M+H]$^+$=315.

1H NMR (300 MHz, Chloroform-d) δ 7.32 (m, 2H), 7.20 (m, 3H), 6.41 (m, 1H), 3.49 (s, 3H), 3.34 (m, 1H), 3.22 (m, 1H), 2.77 (m, 1H), 2.38 (m, 1H), 2.25 (m, 1H), 2.11-2.03 (m, 2H), 1.91 (m, 2H), 1.84-1.76 (m, 3H).

Example 52: N-((1-(1-(2,4-difluorophenyl)ethyl)cyclobutyl)methyl)-1-methyl-5-oxo-4,5-dihydro-1H-1,2,4-triazole-3-carboxamide

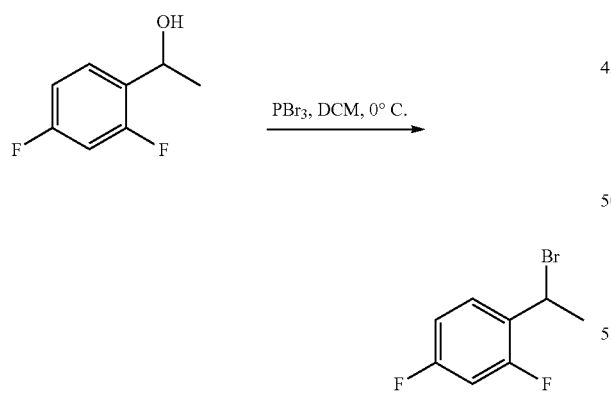

A solution of 1-(2,4-difluorophenyl) ethanol (1 g, 6.32 mmol, 1 equiv) and PBr$_3$ (1.80 mL, 18.97 mmol, 3 equiv) in DCM (10 mL) was stirred for 2 h at 0° C. under nitrogen atmosphere. The resulting mixture was concentrated under reduced pressure. The residue was purified by silica gel column chromatography, eluted with PE/EtOAc (12/1) to afford 1-(1-bromoethyl)-2,4-difluorobenzene (800 mg, 57%) as a colorless oil.

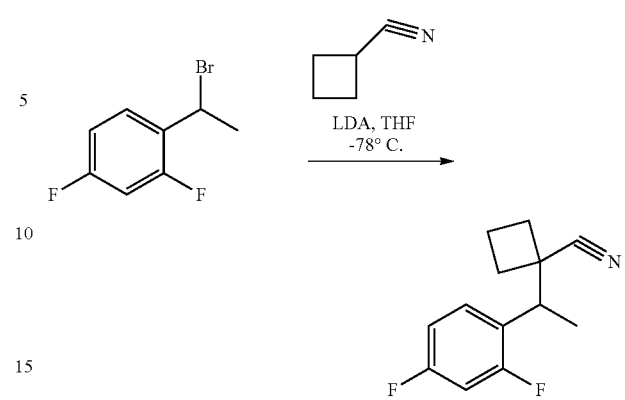

A solution of cyclobutanecarbonitrile (0.81 g, 9.95 mmol, 1.1 equiv) in THF (30 mL) was treated with LDA (2 M in THF) (1.07 g, 9.95 mmol, 1.1 equiv) for 30 min at −78° C. under nitrogen atmosphere followed by the addition of 1-(1-bromoethyl)-2,4-difluorobenzene (2 g, 9.05 mmol, 1 equiv) dropwise at −78° C. and warmed to room temperature. The reaction was cooled to 0° C. and quenched by the addition of sat. NH$_4$Cl (aq.) (20 mL). The resulting mixture was extracted with EtOAc (3×40 mL) and dried over anhydrous Na$_2$SO$_4$ and concentrated under reduced pressure. The residue was purified by silica gel column chromatography, eluted with PE/EtOAc (12/1) to afford 1-[1-(2,4-difluorophenyl) ethyl]cyclobutane-1-carbonitrile (1.1 g, 55%) as a colorless oil.

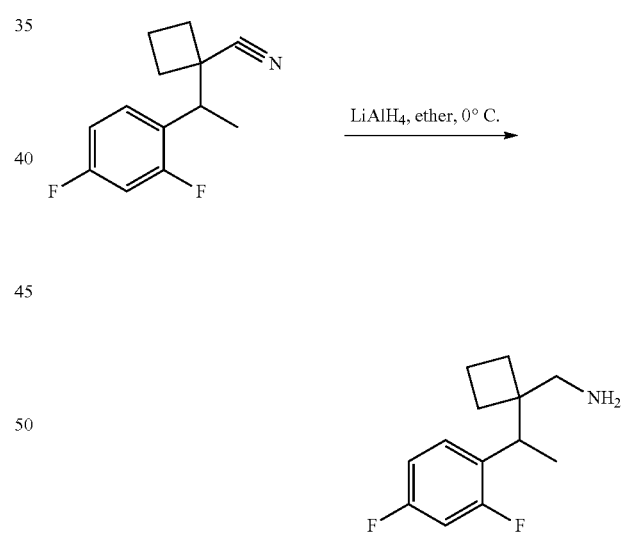

A solution of 1-[1-(2,4-difluorophenyl)ethyl]cyclobutane-1-carbonitrile (700 mg, 3.16 mmol, 1 equiv) in ether (5 mL) was treated with LiAlH$_4$ (360.20 mg, 9.49 mmol, 3 equiv) for 1 h at 0° C. under a nitrogen atmosphere. The reaction was quenched by the addition of water (3 mL) at 0° C. The resulting mixture was filtered and the filter cake was washed with ethyl ether (3×10 mL). The filtrate was concentrated under reduced pressure. The residue was purified by silica gel column chromatography, eluting with CH$_2$Cl$_2$/MeOH (5/1) to afford 1-{1-[1-(2,4-difluorophenyl)ethyl]cyclobutyl}methanamine (220 mg, 31%) as a colorless oil.

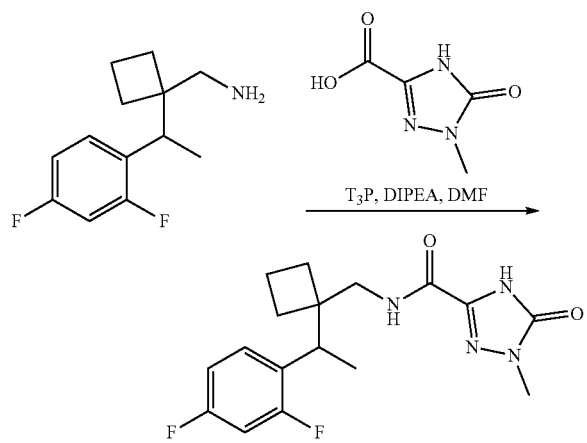

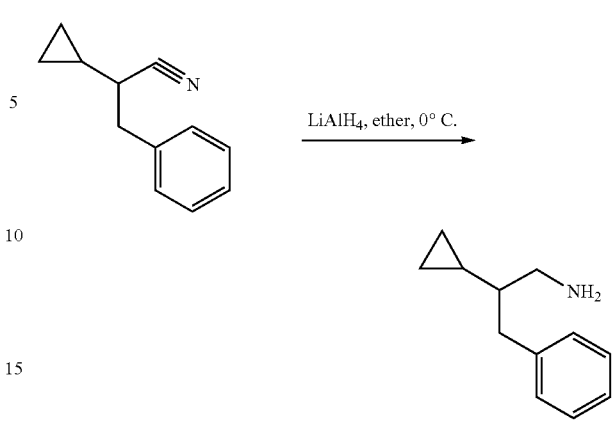

Prepared according to Example 8 using 1-{1-[1-(2,4-difluorophenyl)ethyl]cyclobutyl}methanamine (50 mg, 0.22 mmol, 1 equiv) and 1-methyl-5-oxo-4H-1,2,4-triazole-3-carboxylic acid (Intermediate 1, 34.94 mg, 0.24 mmol, 1.1 equiv). The residue obtained after work up was purified by reverse flash chromatography with the following conditions: MeCN in water, 10% to 50% gradient in 10 min; detector, UV 254 nm to afford N-({1-[1-(2,4-difluorophenyl)ethyl]cyclobutyl}methyl)-1-methyl-5-oxo-4H-1,2,4-triazole-3-carboxamide (10 mg, 13%) as an off-white solid. LCMS (ES, m/z): [M+H]$^+$=351

H-NMR (300 MHz, Chloroform-d) δ 9.29 (s, 1H), 7.27-7.12 (m, 1H), 6.98-6.72 (m, 2H), 6.61 (s, 1H), 3.85-3.67 (m, 1H), 3.51 (s, 3H), 3.25 (m, 2H), 2.17-1.96 (m, 3H), 1.83-1.66 (m, 3H), 1.34 (d, J=7.2 Hz, 3H).

Example 53: N-(2-cyclopropyl-3-phenylpropyl)-1-methyl-5-oxo-4,5-dihydro-1H-1,2,4-triazole-3-carboxamide

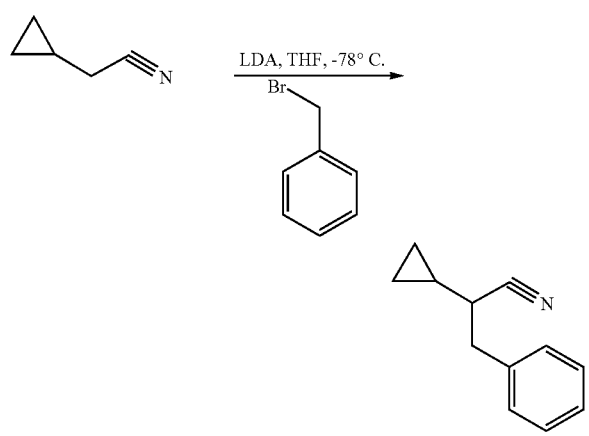

Prepared according Example 1, Step 1 using 2-cyclopropylacetonitrile (2 g, 24.66 mmol, 1 equiv) and benzyl bromide (4.64 g, 27.12 mmol, 1.1 equiv). The residue obtained after work up was purified by silica gel column chromatography, eluting with PE/EtOAc (12:1) to afford 2-cyclopropyl-3-phenylpropanenitrile (1.2 g, 28%) as a colorless oil.

Prepared according Example 1, Step 2 using 2-cyclopropyl-3-phenylpropanenitrile (1 g, 5.84 mmol, 1 equiv) and LiAlH4 (1.11 g, 29.20 mmol, 5 equiv) The residue obtained after work up was purified by silica gel column chromatography, eluting with CH2Cl2/MeOH (8:1) to afford 2-cyclopropyl-3-phenylpropan-1-amine (500 mg, 49%) as a light yellow oil.

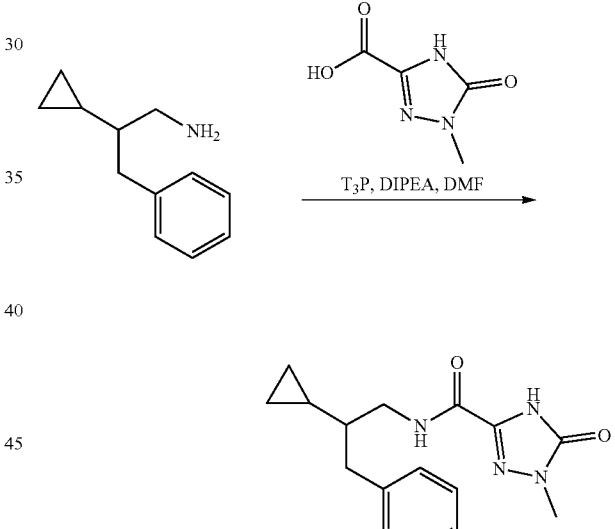

Prepared according to Example 8 using 2-cyclopropyl-3-phenylpropan-1-amine (50 mg, 0.29 mmol, 1 equiv) and 1-methyl-5-oxo-4H-1,2,4-triazole-3-carboxylic acid (Intermediate 1, 44.90 mg, 0.31 mmol, 1.1 equiv). The residue obtained after work up was purified by reverse flash chromatography with the following conditions: mobile phase, MeCN in water, 10% to 50% gradient in 10 min; detector, UV 254 nm to afford N-(2-cyclopropyl-3-phenylpropyl)-1-methyl-5-oxo-4H-1,2,4-triazole-3-carboxamide (11 mg, 13%) as an off-white solid.

LC-MS (ES, m/z): [M+H]$^+$=301

H-NMR (300 MHz, Methanol-d4) δ 7.31-7.13 (m, 5H), 3.47 (s, 3H), 3.41-3.36 (m, 2H), 2.76 (d, J=6.7 Hz, 2H), 1.23 (d, m, 1H), 0.63-0.53 (m, 1H), 0.50-0.41 (m, 1H), 0.37 (m, 1H), 0.25-0.13 (m, 1H), −0.07--0.18 (m, 1H).

Examples 54A and 54B: (R)—N-(2-benzylbutyl)-1-methyl-5-oxo-4,5-dihydro-1H-1,2,4-triazole-3-carboxamide and (Enantiomer A) (S)—N-(2-benzylbutyl)-1-methyl-5-oxo-4,5-dihydro-1H-1,2,4-triazole-3-carboxamide (Enantiomer B)

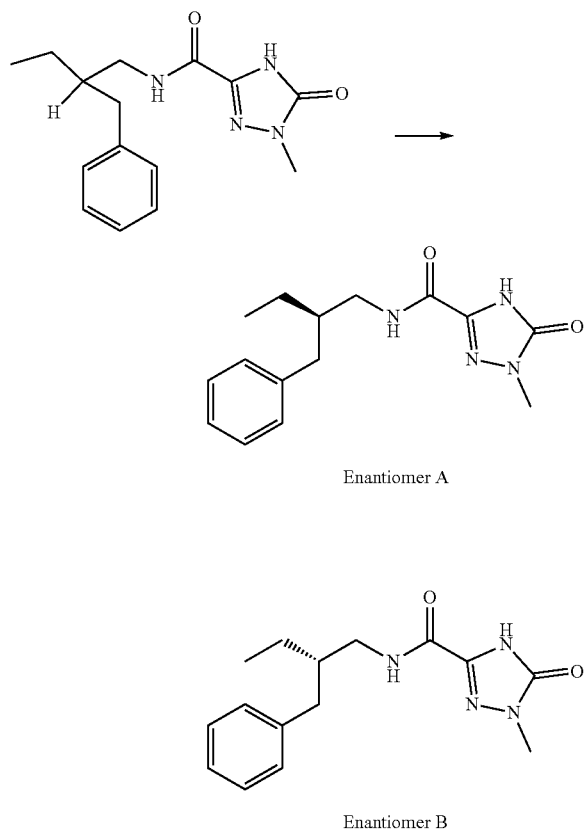

The N-(2-benzylbutyl)-1-methyl-5-oxo-4H-1,2,4-triazole-3-carboxamide (Example 40, 90 mg) was purified by Chiral HPLC with the following conditions: CHIRALPAK IE-3, 100×4.6 mm, 3 um IE30CS—VH001, mobile phase A, n-Hexane (0.1% TFA), mobile phase B, EtOH/MeOH=1/1, 10% to 50% gradient in 15 min; detector, UV 254 and 220 nm to afford (S)—N-(2-benzylbutyl)-1-methyl-5-oxo-4H-1,2,4-triazole-3-carboxamide (31 mg, 34%) as an off-white solid and (R)—N-(2-benzylbutyl)-1-methyl-5-oxo-4H-1,2,4-triazole-3-carboxamide (31 mg, 34%) as an off-white solid. Retention time of isomer A: 1.25 min; retention time of isomer B: 1.26 min Stereochemistry was inferred. LC-MS (Enantiomer A) (ES, m/z): [M+H]$^+$=289; LC-MS (Enantiomer B,) (ES, m/z): [M+H]$^+$=289

H-NMR (Enantiomer A)(400 MHz, Chloroform-d) δ 7.31 (m, 2H), 7.21 (m, 3H), 6.52 (m, 1H), 3.50 (s, 3H), 3.41 (m, 1H), 3.34-3.36 (m, 1H), 2.74-2.69 (m, 1H), 2.60-2.52 (m, 1H), 1.92 (m, 1H), 1.42 (m, 2H), 1.00 (t, J=7.4 Hz, 3H); H-NMR (Isomer B)(400 MHz, Chloroform-d) δ 7.31 (m, 2H), 7.21 (m, 3H), 6.52 (m, 1H), 3.50 (s, 3H), 3.41 (m, 1H), 3.34-3.36 (m, 1H), 2.74-2.69 (m, 1H), 2.60-2.52 (m, 1H), 1.92 (m, 1H), 1.42 (m, 2H), 1.00 (t, J=7.4 Hz, 3H); Chiral HPLC (Enantiomer A): retention time=3.42 min; Chiral HPLC (Enantiomer B): retention time=4.32 mins

Example 55: N-(2-benzylpentyl)-1-methyl-5-oxo-4,5-dihydro-1H-1,2,4-triazole-3-carboxamide

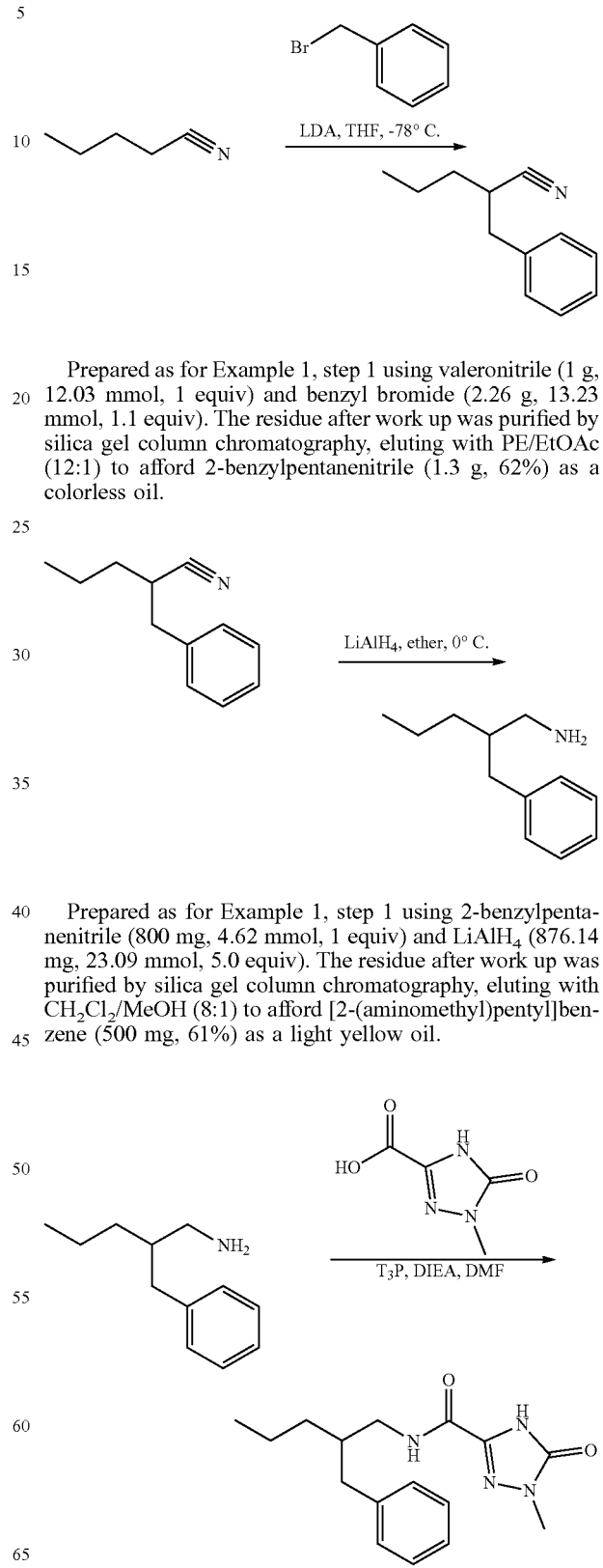

Prepared as for Example 1, step 1 using valeronitrile (1 g, 12.03 mmol, 1 equiv) and benzyl bromide (2.26 g, 13.23 mmol, 1.1 equiv). The residue after work up was purified by silica gel column chromatography, eluting with PE/EtOAc (12:1) to afford 2-benzylpentanenitrile (1.3 g, 62%) as a colorless oil.

Prepared as for Example 1, step 1 using 2-benzylpentanenitrile (800 mg, 4.62 mmol, 1 equiv) and LiAlH$_4$ (876.14 mg, 23.09 mmol, 5.0 equiv). The residue after work up was purified by silica gel column chromatography, eluting with CH$_2$Cl$_2$/MeOH (8:1) to afford [2-(aminomethyl)pentyl]benzene (500 mg, 61%) as a light yellow oil.

Prepared as for Example 8 using [2-(aminomethyl)pentyl]benzene (50 mg, 0.28 mmol, 1 equiv) and 1-methyl-5-oxo-4H-1,2,4-triazole-3-carboxylic acid (Intermediate 1, 44.39 mg, 0.31 mmol, 1.1 equiv). The residue after work up was purified by reverse flash chromatography with the following conditions: mobile phase, MeCN in water, 10% to 50% gradient in 10 min; detector, UV 254 nm to afford N-(2-benzylpentyl)-1-methyl-5-oxo-4H-1,2,4-triazole-3-carboxamide (12 mg, 14%) as an off-white solid.

LC-MS (ES, m/z): [M+H]$^+$=303

H-NMR (300 MHz, Chloroform-d) δ 7.30-7.27 (m, 2H), 7.24-7.15 (m, 3H), 6.93 (m, 1H), 3.48 (s, 3H), 3.44-3.21 (m, 2H), 2.67 (m, 2H), 1.96 (m, 1H), 1.48-1.27 (m, 4H), 0.91 (t, J=6.7 Hz, 3H).

The following examples were synthesised as for Example 8 using the corresponding amine (Example 32) and commercially available carboxylic acid.

TABLE 13

Synthesis of certain Example compounds

| Acid and CAS | Example No and structure | LCMS | $^1$H-NMR |
|---|---|---|---|
| 6-oxo-1,6-dihydropyridazine-3-carboxylic acid 37972-69-3 | Example 56 | 286[M + H]$^+$ | (400 MHz, Chloroform-d) δ 11.98 (s, 1H), 8.10 (d, J = 9.9 Hz, 1H), 7.31 (dd, J = 8.1, 6.3 Hz, 2H), 7.28-7.23 (m, 1H), 7.21-7.13 (m, 3H), 7.07 (d, J = 9.8 Hz, 1H), 3.32 (d, J = 6.4 Hz, 2H), 2.61 (s, 2H), 0.97 (s, 6H). |
| 2-oxo-2,3-dihydrobenzo[d]oxazole-5-carboxylic acid, 65422-72-2 | Example 57 | 325 [M + H]+ | (400 MHz, DMSO-d6) δ 11.83 (s, 1H), 8.35 (t, J = 6.3 Hz, 1H), 7.65 (dd, J = 8.4, 1.8 Hz, 1H), 7.56 (d, J = 1.7 Hz, 1H), 7.36 (d, J = 8.4 Hz, 1H), 7.29 (t, J = 7.2 Hz, 2H), 7.25-7.16 (m, 3H), 3.19 (d, J = 6.3 Hz, 2H), 2.56 (s, 2H), 0.82 (s, 6H). |

The following examples were synthesised as for Example 8 using 1-methyl-5-oxo-4H-1,2,4-triazole-3-carboxylic acid (Intermediate 1) and the commercially available amine with dimethylacetamide as solvent.

TABLE 14

Synthesis of certain Example compounds

| Amine and CAS | Example No and structure | LCMS | $^1$H-NMR |
|---|---|---|---|
| (2-methyl-2,3-dihydro-1H-inden-2-yl)methanamine, 759424-59-4 | Example 58 | 273[M + H]+ | (300 MHz, Chloroform-d) δ 7.23 (d, J = 7.7 Hz, 1H), 7.15-7.03 (m, 2H), 6.85 (m, 1H), 5.57 (q, J = 7.7 Hz, 1H), 3.49 (s, 3H), 3.11-2.82 (m, 2H), 2.67 (m, 1H), 2.38 (s, 3H), 1.96 (m, 1H). |

TABLE 14-continued

Synthesis of certain Example compounds

| Amine and CAS | Example No and structure | LCMS | ¹H-NMR |
|---|---|---|---|
| 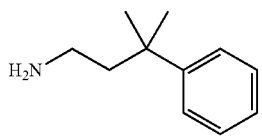<br>3-Methyl-3-phenyl-butylamine, 17684-34-3 | 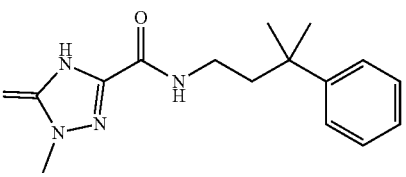<br>Example 59 | 273[M + H]+ | (300 MHz, Chloroform-d) δ 7.31 (s, 1H), 7.26 (s, 1H), 7.24-7.14 (m, 1H), 7.13-7.04 (m, 2H), 6.83 (s, 1H), 3.51 (s, 3H), 3.50-3.44 (m, 2H), 1.91 (m, 1H), 1.48-1.36 (m, 1H), 1.03 (m, 2H). |
| 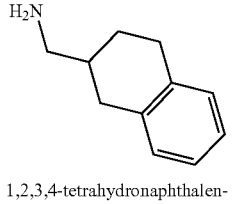<br>1,2,3,4-tetrahydronaphthalen-2-ylmethanamine, 129280-17-7 | 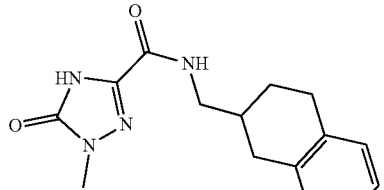<br>Example 60 | 351[M + H]+ | (400 MHz, Chloroform-d) δ 7.31 (m, 4H), 7.26-7.16 (m, 6H), 6.44 (s, 1H), 3.48 (s, 3H), 3.38 (m, 2H), 2.73 (d, J = 13.9, 7.5 Hz, 2H), 2.63 (d, J = 13.9, 7.8 Hz, 2H), 2.33 (m, 1H) |

Example 61: N-((1-(2-methoxybenzyl)cyclobutyl)methyl)-1-methyl-5-oxo-4,5-dihydro-1H-1,2,4-triazole-3-carboxamide

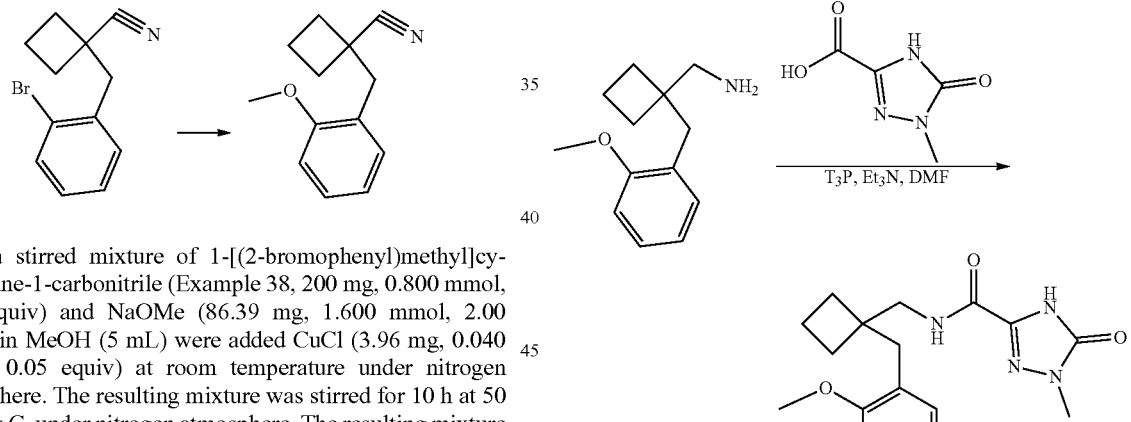

To a stirred mixture of 1-[(2-bromophenyl)methyl]cyclobutane-1-carbonitrile (Example 38, 200 mg, 0.800 mmol, 1.00 equiv) and NaOMe (86.39 mg, 1.600 mmol, 2.00 equiv) in MeOH (5 mL) were added CuCl (3.96 mg, 0.040 mmol, 0.05 equiv) at room temperature under nitrogen atmosphere. The resulting mixture was stirred for 10 h at 50 degrees C. under nitrogen atmosphere. The resulting mixture was concentrated under reduced pressure. The residue was purified by silica gel column chromatography, eluted with PE/EA (1:1) to afford 1-[(2-methoxyphenyl)methyl]cyclobutane-1-carbonitrile (100 mg, 62% yield) as a light yellow solid.

Prepared according to Example 1, Step 2 using 1-[(2-methoxyphenyl)methyl]cyclobutane-1-carbonitrile (90 mg, 0.447 mmol, 1.00 equiv) and LiAlH₄ (33.94 mg, 0.894 mmol, 2.00 equiv) resulting in 1-{1-[(2-methoxyphenyl)methyl]cyclobutyl}methanamine (70 mg, 76% yield) as a light yellow solid which was used directly in the last step.

To a stirred mixture of 1-{1-[(2-methoxyphenyl)methyl]cyclobutyl}methanamine (50 mg, 0.244 mmol, 1.00 equiv) and 1-methyl-5-oxo-2H-1,2,4-triazole-3-carboxylic acid (34.85 mg, 0.244 mmol, 1.00 equiv) in DMF (2 mL) were added T₃P (116.24 mg, 0.366 mmol, 1.50 equiv) and Et₃N (73.93 mg, 0.732 mmol, 3.00 equiv) dropwise at room temperature under nitrogen atmosphere. The resulting mixture was stirred overnight at room temperature under nitrogen atmosphere and purified by prep-HPLC to afford N-({1-[(2-methoxyphenyl)methyl]cyclobutyl}methyl)-1-methyl-5-oxo-2H-1,2,4-triazole-3-carboxamide (11 mg) as an off-white solid.

LC-MS (ES, m/z): [M+H]⁺=331

H-NMR (400 MHz, DMSO-d₆, ppm) δ 12.33 (s, 1H), 8.27-8.21 (m, 1H), 7.22-7.20 (m, 2H), 7.02-7.00 (m, 1H), 6.93-6.88 (m, 1H), 3.83 (s, 3H), 3.37 (s, 3H), 3.18 (d, J=6.4 Hz, 2H), 2.72 (s, 2H), 1.81-1.73 (m, 6H)

The following Examples were prepared using analogous methods disclosed for Examples 1 to 61:

TABLE 15

Synthesis of certain Example compounds

| Example No | Name | Structure | LCMS; m/z, Rt | 1H NMR |
|---|---|---|---|---|
| 62 | 6-oxo-N-((1-(pyridin-2-ylmethyl)cyclobutyl)methyl)-1,6-dihydropyrazine-2-carboxamide | | [M + H]$^+$ = 299; 2.1 min | (300 MHz, DMSO-d$_6$, ppm): 8.55-8.51 (m, 2H), 8.17 (s, 1H), 7.94 (s, 1H), 7.73-7.68 (m, 1H), 7.31-7.20 (m, 2H), 3.31-3.29 (m, 2H), 2.85 (s, 2H), 1.90-1.54 (m, 6H) |
| 63 | N-((1-benzylcyclobutyl)methyl)-1-methyl-2-oxo-2,3-dihydro-1H-imidazole-4-carboxamide | | [M + H]$^+$ = 300; 1.2 min | (300 MHz, DMSO-d$_6$, ppm): 10.46 (s, 1H), 7.60 (br, 1H), 7.31-7.20 (m, 6H), 3.25-3.20 (m, 2H), 3.15 (s, 3H), 2.75 (s, 2H), 1.90-1.74 (m, 6H). |
| 64 | N-((1-benzylcyclobutyl)methyl)-3-methyl-1H-1,2,4-triazole-5-carboxamide | | [M + H]$^+$ = 285; 3.2 min | (300 MHz, DMSO-d$_6$, ppm): 14.05 (s, 1H), 8.20 (br, 1H), 7.31-7.18 (m, 5H), 3.31-3.28 (m, 2H), 2.70 (s, 2H), 2.33 (s, 3H), 1.83-1.64 (m, 6H). |
| 65 | N-((1-benzylcyclobutyl)methyl)-5-oxomorpholine-3-carboxamide | | [M + H]$^+$ = 303; 1.2 min | (400 MHz, DMSO-d$_6$, ppm) δ 8.19 (br, 1H), 7.87 (br, 1H), 7.30-7.30 (m, 5H), 4.09-4.10 (m, 1H), 3.97 (s, 2H), 3.95-3.83 (m, 2H), 3.22-3.03 (m, 2H), 2.68 (s, 2H), 1.85-1.59 (m, 6H). |
| 66 | N-((1-benzylcyclobutyl)methyl)-4-oxo-3,4-dihydroquinazoline-2-carboxamide | | [M + H]$^+$ = 348; 1.76 min | (300 MHz, DMSO-d$_6$, ppm): 12.26 (br, 1H), 8.76 (br, 1H), 8.17 (d, J = 5.1 Hz, 1H), 7.92-7.80 (m, 2H), 7.63-7.60 (m, 1H), 7.33-7.21 (m, 5H), 3.41-3.36 (m, 2H), 2.76 (s, 2H), 1.89-1.62 (m, 6H). |
| 67 | N-(2,2-dimethyl-3-phenylpropyl)-1-methyl-6-oxo-1,6-dihydropyridazine-3-carboxamide | | [M + H]$^+$ = 300; 1.40 min | (400 MHz, DMSO-d$_6$, ppm) δ 8.22 (t, J = 6.6 Hz, 1H), 7.85 (d, J = 9.6 Hz, 1H), 7.29 (dd, J = 8.0, 6.5 Hz, 2H), 7.25-7.15 (m, 3H), 7.01 (d, J = 9.6 Hz, 1H), 3.74 (s, 3H), 3.18 (d, J = 6.6 Hz, 2H), 2.54 (s, 2H), 0.82 (s, 6H). |

TABLE 15-continued

Synthesis of certain Example compounds

| Example No | Name | Structure | LCMS; m/z, Rt | 1H NMR |
|---|---|---|---|---|
| 68 | N-(2,2-dimethyl-3-phenylpropyl)-3-methyl-2,4-dioxo-1,2,3,4-tetrahydro-pyrimidine-5-carboxamide | | [M + H]⁺ = 316; 1.4 min | (400 MHz, DMSO-$d_6$, ppm) δ 11.99 (s, 1H), 9.05 (t, J = 6.0 Hz, 1H), 8.16 (s, 1H), 7.29 (dd, J = 8.0, 6.6 Hz, 2H), 7.25-7.18 (m, 1H), 7.18-7.12 (m, 2H), 3.21 (s, 3H), 3.13 (d, J = 6.0 Hz, 2H), 2.53 (s, 2H), 0.84 (s, 6H). |
| 69 | N-(2,2-dimethyl-3-phenylpropyl)-3-(trifluoromethyl)-1H-pyrazole-5-carboxamide | | [M + H]⁺ = 326; 2.95 min | (400 MHz, DMSO-$d_6$, ppm) δ 14.41 (s, 1H), 8.48 (t, J = 6.0 Hz, 1H), 7.42 (s, 1H), 7.29 (dd, J = 7.9, 6.6 Hz, 2H), 7.25-7.16 (m, 3H), 3.19 (d, J = 6.3 Hz, 2H), 2.56 (s, 2H), 0.83 (s, 6H). |
| 70 | N-(2-benzyl-3-hydroxypropyl)-1-methyl-5-oxo-4,5-dihydro-1H-1,2,4-triazole-3-carboxamide | | [M + H]⁺ = 291; 1.35 min | (400 MHz, Chloroform-d, ppm) δ (7.33 m, 2H), 7.22 (m, 3H), 7.08 (s, 1H), 3.68 (m, 1H), 3.60-3.43 (m, 6H), 2.75 (m, 1H), 2.62 (m, 1H), 2.10 (m, 1H). |
| 71 | 1-methyl-5-oxo-N-(1,1,1-trifluoro-5-phenylpentan-3-yl)-4,5-dihydro-1H-1,2,4-triazole-3-carboxamide | | [M + H]⁺ = 343; 1.26 min | (300 MHz, Chloroform-d, ppm) δ 7.33 (m, 2H), 7.21 (m, 3H), 6.59 (s, 1H), 4.38 (s, 1H), 3.53 (s, 3H), 2.73 (t, 2H), 2.47 (t, 2H), 2.05 (t, 2H). |
| 72 | N-(2,2-dimethyl-3-phenylpropyl)-N,1-dimethyl-5-oxo-4,5-dihydro-1H-1,2,4-triazole-3-carboxamide | | [M + H]⁺ = 303; 0.86 min | (300 MHz, Chloroform-d, ppm) δ 7.19 (m, 3H), 7.06 (m, 2H), 4.01 (s, 1H), 3.83-3.51 (m, 6H), 3.37 (s, 1H), 3.17 (s, 1H), 2.60 (s, 2H), 0.94 (s, 6H). |

Example 73: N-((1-(2,4-Difluorobenzyl)cyclohexyl)methyl)-1-methyl-5-oxo-4,5-dihydro-1H-1,2,4-triazole-3-carboxamide

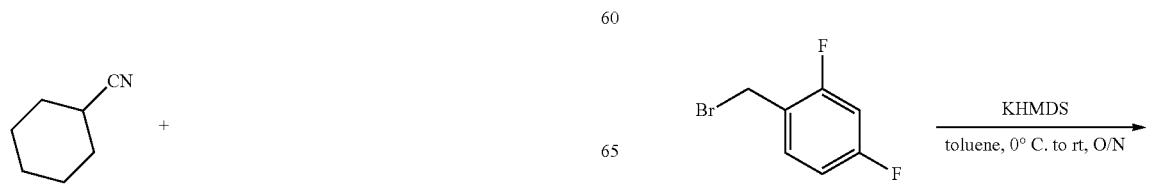

-continued

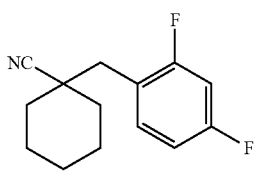

To a flask purged and maintained with nitrogen was added cyclohexane carbonitrile (0.33 mL, 2.75 mmol) in toluene (10 mL). The reaction mixture was cooled to 0° C. and cold potassium bis(trimethylsilyl)azanide (1.0M in THF, 2.7 mL, 2.70 mmol) was added and stirred for 1 hr at 0° C. A solution of 1-(bromomethyl)-2,4-difluorobenzene (0.33 mL, 2.61 mmol) in toluene (2 mL) was added and the reaction mixture stirred at RT for 16 hrs and then heated at 80° C. for 3 hrs. The reaction mixture was cooled and diluted with water-citric acid. The mixture was extracted with DCM, dried (MgSO₄), filtered, and the filtrate passed through a phase separator cartridge (Biotage). The solvent was evaporated in vacuo. The crude product was purified by flash chromatography (Biotage) eluting with isohexane-EtOAc (0-15%) to yield 1-(2,4-difluorobenzyl)cyclohexane-1-carbonitrile as a colourless oil (618 mg, 96%).

¹H-NMR (400 MHz, CHLOROFORM-D) δ 7.40-7.32 (m, 1H), 6.89-6.74 (m, 2H), 2.83 (d, J=1.4 Hz, 2H), 1.92-1.81 (m, 3H), 1.76-1.50 (m, 7H), 1-47-1.31 (m, 3H), 1.24-1.11 (m, 1H)—contains solvent and other impurities which over integrate the aliphatic region.

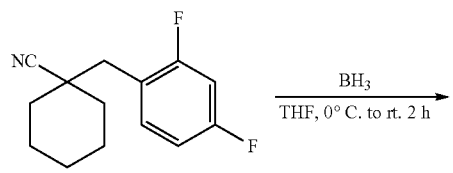

To a flask purged and maintained with nitrogen was added 1-(2,4-difluorobenzyl)cyclohexane-1-carbonitrile (300 mg, 1.28 mmol) as a solution in THF (10 mL). The solution was cooled to 0° C. under N₂ then borane (1.0M in THF, 2.55 mL, 2.55 mmol) was added dropwise. The reaction mixture was warmed to RT, then stirred at reflux for 2 hrs. The reaction mixture was cooled to 0° C. and quenched with methanol. The crude product was purified by catch release cartridge (Biotage SCX-2) washing with ether and methanol, then eluting with 3M NH₃-MeOH. The solvent was evaporated in vacuo to yield (1-(2,4-difluorobenzyl)cyclohexyl)methanamine as a colourless oil (305 mg, 100%).
¹H-NMR (400 MHz, CHLOROFORM-D) δ 7.05-7.17 (1H), 6.70-6.81 (2H), 3.66-3.73 (m, 4H), 2.58-2.60 (m, 2H), 2.47-2.49 (m, 2H), 1.33-1.43 (m, 10H).

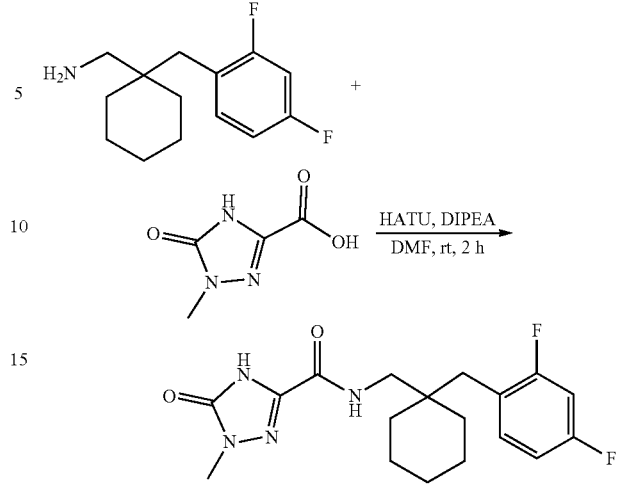

To a flask was added DMF (5.0 mL) followed by 5-hydroxy-1-methyl-1H-1,2,4-triazole-3-carboxylic acid (60 mg, 0.418 mmol), HATU (159 mg, 0.418 mmol), TEA (0.058 mL, 0.418 mmol), and (1-(2,4-difluorobenzyl)cyclohexyl)methanamine (100 mg, 0.418 mmol). The reaction mixture was stirred o/n at RT. The DMF was evaporated in vacuo and the residue diluted with 1:1 MeCN-MeOH and directly purified by prep-LCMS (pH2 Formic acid, 30-70% MeCN followed by organic wash). Fractions containing desired product were combined and the solvent evaporated in vacuo. The residue was lyophilised from 1:1 MeCN—H₂O to yield N-((1-(2,4-difluorobenzyl)cyclohexyl)methyl)-1-methyl-5-oxo-4,5-dihydro-1H-1,2,4-triazole-3-carboxamide (36 mg, 245%) as a white solid. ¹H-NMR (400 MHz, DMSO-D6) δ 12.28 (s, 1H), 8.25 (t, J=6.4 Hz, 1H), 7.33 (td, J=8.7, 6.9 Hz, 1H), 7.19 (td, J=9.8, 2.3 Hz, 1H), 7.03 (td, J=8.5, 2.3 Hz, 1H), 3.36 (s, 3H), 3.21 (d, J=6.4 Hz, 2H), 2.57-2.64 (2H), 1.54-1.32 (m, 7H), 1.16-1.08 (m, 3H).
UPLC_PH2_MECN_QC_V1, 4.92 min, [M+H+]=365.3, 100%; UPLC_PH9_MECN_QC_V1, 4.02 min, [M+H+] 365.3, 100%

Example 74: N-((2S,3S)-3-Benzylpentan-2-yl)-1-methyl-5-oxo-4,5-dihydro-1H-1,2,4-triazole-3-carboxamide

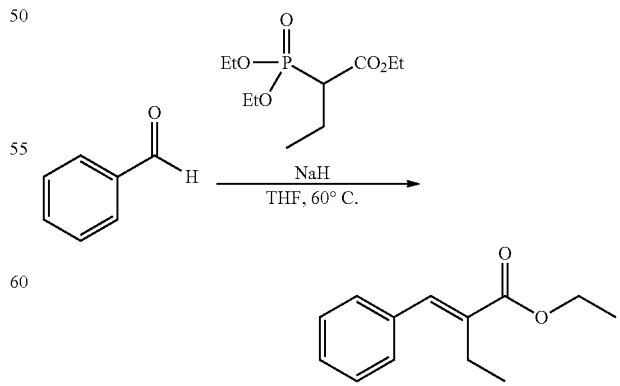

Benzaldehyde (2.00 g, 18.8 mmol) and triethyl 2-phosphonobutyrate (4.50 mL, 18.8 mmol) were dissolved in dry THF (50 mL). Sodium hydride (60% dispersion in oil, 0.81 g, 33.9 mmol) was added portion wise over 5 mins at RT and the solution then stirred at reflux for 3.5 hrs, then stirred at RT for 16 hrs. Water was added (50 mL) and the reaction stirred at RT for 30 mins. The product was extracted with EtOAc, dried (MgSO₄), filtered and the solvent evaporated in vacuo. The crude product was purified by flash chromatography (Biotage; 100 g Sfar column) eluting with isohexane-EtOAc (0-10%) to yield ethyl 2-benzylidenebutanoate as a pale-yellow oil (3.09 g, 80%). ¹H-NMR (400 MHz, CHLOROFORM-D) δ 7.65 (s, 0.8H), 7.41-7.27 (m, 4.5H), 7.25-7.22 (m, 0.5H), 6.62 (s, 0.2H), 4.28 (q, J=7.2 Hz, 1.6H), 4.16-4.10 (m, 0.4H), 2.55 (q, J=7.5 Hz, 1.6H), 2.46 (qd, J=7.5, 1.5 Hz, 0.4H), 1.36 (t, J=7.1 Hz, 2.4H), 1.20-1.09 (m, 3.6H)—mix of cis and trans isomers aprox 4:1.

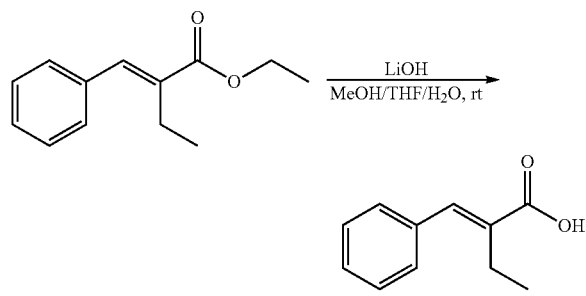

Ethyl 2-benzylidenebutanoate (1.14 g, 5.58 mmol) was dissolved in a mixture of 2:1:1 methanol-THF-water (20 mL) and lithium hydroxide (668 mg, 27.9 mmol) was added. The reaction mixture was stirred at reflux for 5 hrs, then cooled to RT and poured into water. The solution was acidified to pH2, affording a white precipitate in suspension. The product was extracted with EtOAc (3×10 mL), and the combined organics dried (MgSO₄), filtered and the solvent evaporated in vacuo. The crude product was recrystallized from hexanes (cooling to 0° C.) to precipitate the product. The solvent was evaporated by glass pipette and the crystals washed with ice cold hexanes and dried under vacuum o/n to afford 2-benzylidenebutanoic acid as a white solid (1.00 g, 100%). ¹H-NMR (400 MHz, CHLOROFORM-D) δ 7.78 (s, 1H), 7.40 (t, J=4.1 Hz, 4H), 7.38-7.31 (m, 1H), 2.57 (q, J=7.5 Hz, 2H), 1.21 (t, J=7.6 Hz, 3H)

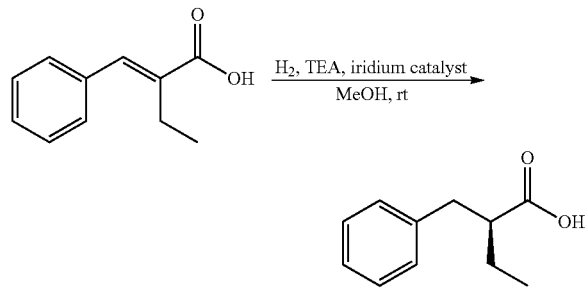

[(1S)-7-[(4S)-'-Benzyl-4,5-dihydr'oxazol-2-yl]-1,3'-spirobi[indane]-4'-yl]-bis(3,5-ditert-butylphenyl)phosphanebis 1,5-cyclooctadienirridium (ii)-tetrakis[3,5-bis(trifluoromethyl)phenyl]boranuide (15.0 mg, 0.0079 mmol) and 2-benzylidenebutanoic acid (1.00 g, 5.61 mmol) were combined and placed under vacuum, then purged with Ar. Anhydrous MeOH was added and the material degassed and placed under an Ar atmosphere. TEA (0.56 mL, 3.97 mmol) was added, and the reaction was degassed and purged with hydrogen gas (3×) then the reaction was stirred at RT under hydrogen o/n. The solvent was evaporated in vacuo then water added, and the mixture acidified to pH1 with HCl₍aq₎. The product was extracted into 1:1 EtOAc-DCM (3×). The combined organics were dried (MgSO₄), filtered and the crude product purified by flash chromatography (Biotage, 10 g Sfar column) eluting with isohexane-EtOAc (0-20%) to yield (S)-2-benzylbutanoic acid (1.00 g, 99%) as a pale-yellow oil.

¹H-NMR (400 MHz, CHLOROFORM-D) δ 7.29-7.23 (m, 1H), 7.22-7.16 (m, 4H), 2.97 (dd, J=13.7 Hz, 8.2 Hz, 1H), 2.75 (q, J=6.9 Hz, 1H), 2.61 (qd, J=7.8, 5.3 Hz, 1H), 1.71-1.52 (m, 2H), 0.97-0.92 m. 3H).

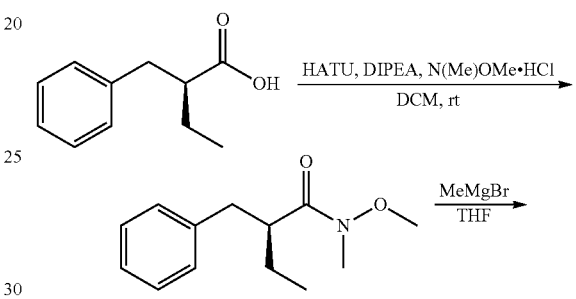

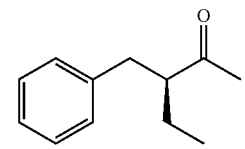

(S)-2-Benzylbutanoic acid (721 mg, 4.05 mmol), N,O-dimethylhydroxylamine hydrochloride (805 mg, 8.1 mmol), HATU (1.85 g, 4.85 mmol) and DIPEA (2.61 g, 20.2 mmol) were dissolved in DCM (100 mL) and stirred at RT o/n. Water was added and the reaction mixture stirred and the layers separated. The aqueous phase was extracted with DCM and the combined organics dried (MgSO₄), filtered and the solvent evaporated in vacuo. The crude product was purified by flash chromatography (Biotage, 10 g Sfar column) eluting with isohexane-EtOAc (0-100%) to yield (S)-2-benzyl-N-methoxy-N-methylbutanamide (889 mg, 99%) as a clear gum. This material was used crude in the next step.

(S)-2-Benzyl-N-methoxy-N-methylbutanamide (889 mg, 4.02 mmol) was dissolved in dry THF (10 mL) and cooled to −60° C. under nitrogen. Methylmagnesium bromide solution (3.0M in THF, 2.01 mL, 6.03 mmol) was added dropwise and the solution warmed to RT and stirred for 2 hrs. The reaction mixture was diluted with citric acid-water and DCM and the layers separated. The aqueous phase was extracted with DCM and the combined organics dried (MgSO₄), filtered and the solvent evaporated in vacuo to yield (S)-3-benzylpentan-2-one (677 mg, 96%).

¹H-NMR (400 MHz, CHLOROFORM-D) δ 7.28-7.23 (m, 2H), 7.19-7.12 (m, 3H), 2.87 (dd, J=12.8, 7.8 Hz, 1H), 2.78-2.64 (m, 2H), 2.00 (s, 3H), 1.70-1.59 (m, 1H), 1.57-1.46 (m, 1H), 0.91-0.84 (m, 3H)

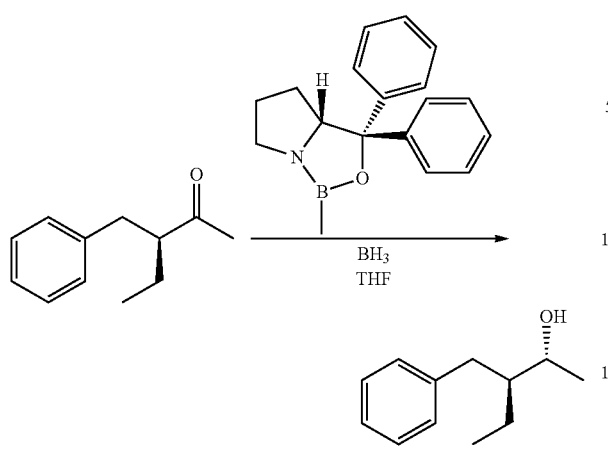

A solution of (R)-(+)-2-methyl-CBS-oxazaborolidine (53 mg, 0.192 mmol) in dry THF (5 mL) was treated with borane (1.2 mL, 1.15 mmol) at RT and the mixture stirred for 15 minutes, then a solution of (S)-3-benzylpentan-2-one (338 mg, 1.92 mmol) in THF (2.0 mL) was added dropwise at RT. The reaction mixture was stirred at RT o/n. Water was added and the mixture extracted with DCM. The organic phase was evaporated in vacuo and the crude product purified by flash chromatography (Biotage, 10 g Sfar column) eluting with isohexane-EtOAc (0-20%) to yield (2R,3S)-3-benzylpentan-2-ol (294 mg, 86%) as a colourless oil. $^1$H-NMR (400 MHz, CHLOROFORM-D) δ 7.28-7.26 (m, 2H), 7.19-7.15 (m, 3H), 3.85 (qd, J=6.5, 3.8 Hz, 1H), 2.77-2.67 (m, 1H), 2.55 (ddd, J=25.0, 13.7, 8.0 Hz, 1H), 1.66-1.58 (m, 1H), 1.40-1.30 (m, 2H), 1.16 (d, J=6.4 Hz, 3H), 0.90 (t, J=7.3 Hz, 3H)

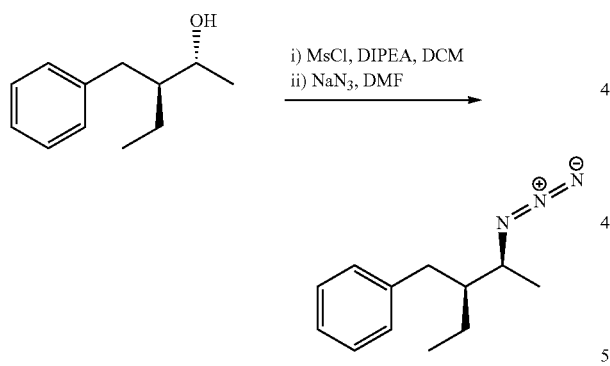

Stage 1:
(2R,3S)-3-Benzylpentan-2-ol (50 mg, 0.280 mmol), methanesulfonyl chloride (0.022 mL, 0.280 mmol) and TEA (0.039 mL, 0.280 mmol) were combined in DCM and a crystal of DMAP was added. The reaction mixture was stirred at reflux o/n then cooled to RT. The reaction mixture was diluted with water and DCM. The layers were separated, and the organic phase passed through a phase separator cartridge (Biotage). The solvent was evaporated in vacuo to yield crude mesylated intermediate.

Stage 2:
The crude mesylate was dissolved in DMF (5 mL) and NaN$_3$ (37 mg, 0.561 mmol) added. The solution was stirred at 80° C. o/n. The reaction mixture was cooled to RT and partitioned between water and EtOAc. The aqueous phase was extracted with EtOAc (5×). The combined organics were washed with water (3×) followed by saturated brine solution. The organic phase was dried (MgSO$_4$), filtered and the solvent evaporated in vacuo to yield crude ((2S,3S)-3-azido-2-ethylbutyl)benzene) as a pale-yellow oil. No further purification was performed.
$^1$H-NMR (400 MHz, CHLOROFORM-D) δ 7.29 (t, J=7.3 Hz, 2H), 7.19 (q, J=6.9 Hz, 3H), 3.61-3.53 (m, 1H), 2.69-2.54 (m, 2H), 1.73-1.59 (m, 1H), 1.48-1.29 (m, 2H), 1.24 (t, J=7.1 Hz, 3H), 0.92 (t, J=7.6 Hz, 3H)

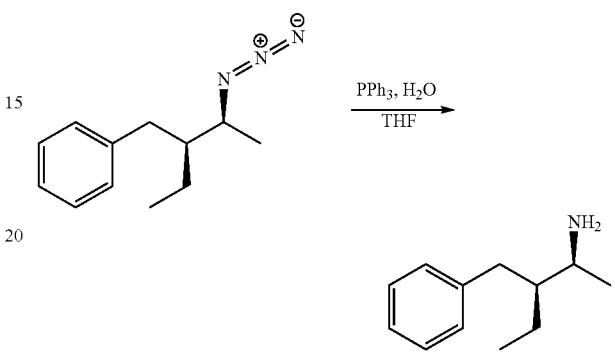

Crude ((2S,3S)-3-azido-2-ethylbutyl)benzene was dissolved in THF, triphenylphosphine (64 mg, 0.245 mmol) was added and the mixture stirred at reflux for 4 hrs. Water was added and the solvent evaporated in vacuo. The residue was dissolved in methanol and purified by a catch release cartridge (Biotage SCX-2) washing with successively with methanol, EtOAc and MeOH. The product was eluted with 3M NH$_3$-MeOH, and the solvent evaporated in vacuo to yield crude (2S,3S)-3-benzylpentan-2-amine which contained approximately 50% Ph$_3$PO. The material was carried onto the next step without further purification.

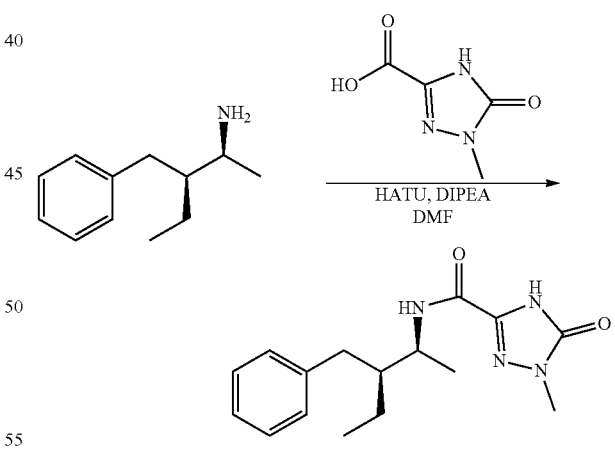

(2S,3S)-3-Benzylpentan-2-amine (33 mg, 0.186 mmol), DIPEA (0.032 mL, 0.186 mmol), 5-hydroxy-1-methyl-1H-1,2,4-triazole-3-carboxylic acid (27 mg, 0.186 mmol) and HATU (71 mg, 0.186 mmol) were combined in DMF (1.0 mL) and the reaction mixture stirred o/n at RT. The crude reaction mixture was diluted with MeCN and directly purified by prep LCMS. Fractions containing desired product were combined and the solvent evaporated in vacuo. The resulting white solid was re-dissolved in 1:1 MeCN—H$_2$O then lyophilised to yield N-((2S,3S)-3-benzylpentan-2-yl)-1-methyl-5-oxo-4,5-dihydro-1H-1,2,4-triazole-3-carboxamide (9 mg, 16%) as a white solid. ¹H-NMR (400 MHz, CHLOROFORM-D) δ 7.30-7.27 (m, 2H), 7.20-7.17 (m, 3H), 4.27-4.18 (m, 1H), 3.48 (t, J=6.4 Hz, 3H), 2.71-2.56 (m, 2H), 1.89-1.78 (m, 1H), 1.43-1.33 (m, 2H), 1.24 (d, J=6.9 Hz, 2.5H), 1.20 (d, J=6.9 Hz, 0.5H), 0.99 (t, J=7.3 Hz, 0.5H), 0.93 (t, J=7.3 Hz, 2.5H)—diastereomers observed; UPLC_PH2_MECN_QC_V1 Rt 4.52 mins, M+H+303.1, 100%; UPLC_PH9_MECN_QC_V1 Rt 3.73 mins, M+H+ 303.1, 100%

Example 75: N-((1-(3-Methoxybenzyl)cyclobutyl)methyl)-1-methyl-5-oxo-4,5-dihydro-1H-1,2,4-triazole-3-carboxamide

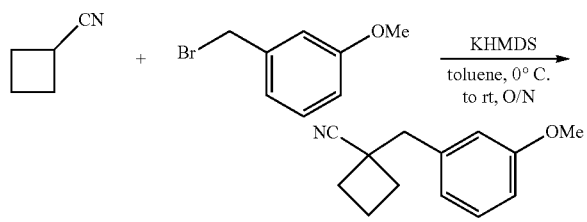

To a flask purged and maintained with nitrogen was added cyclobutanecarbonitrile (0.195 mL, 2.74 mmol) and toluene (5.0 mL) and the reaction mixture cooled to 0° C. To the reaction mixture was added potassium bis(trimethylsilyl) amide solution (1.0M in THF, 4.6 mL, 4.60 mmol) dropwise and the reaction mixture stirred at 0° C. for 2 hrs. To this was added 1-(bromomethyl)-3-methoxybenzene (0.34 mL, 2.46 mmol) and the reaction mixture stirred at RT o/n. Sat. NH₄Cl₍aq₎ (40 mL) was added, and the mixture extracted with EtOAc (80 mL). The organic phase was passed through a phase separator cartridge (Biotage) and the solvent evaporated in vacuo. The crude oil was purified by flash chromatography (Biotage, 10 g Sfar) eluting with isohexane-EtOAc 178yclobuteneyield 1-(3-methoxybenzyl)cyclobutane-1-carbonitrile (200 mg, 1.38 mmol) as a yellow oil. ¹H-NMR (400 MHz, CHLOROFORM-D) δ 7.22 (t, J=7.8 Hz, 1H), 6.86-6.79 (m, 3H), 3.77 (s, 3H), 2.94 (s, 2H), 2.45-2.37 (m, 2H), 2.22-2.10 (m, 3H), 2.06-1.95 (m, 1H)

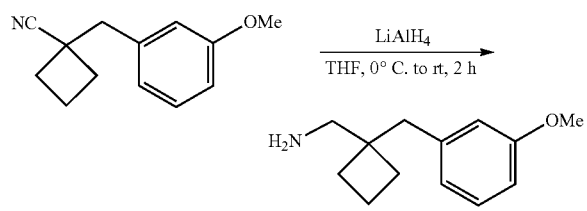

To a flask purged and maintained with ni178yclobuteneadded 1-(3-methoxybenzyl)cyclobutane-1-carbonitrile (200 mg, 0.994 mmol) in anhydrous THF (2.5 mL). The reaction mixture was cooled to 0° C. and LiAlH₄ (1.0M in THF, 3.00 mL, 3.00 mmol) added dropwise at 0° C. The reaction mixture was stirred at RT for 2 hrs. The reaction mixture was cooled to 0° C., quenched with aqueous Rochelle's salt (10 mL) and extracted with EtOAc (20 mL). The organic phase was washed with sat. brine solution (10 ml), passed through a phase separator cartridge (Biotage) and the solvent evaporated in vacuo to yield crude (1-(3-methoxybenzyl)cyclobutyl)methanamine as a pale yellow oil. No further purification was performed.

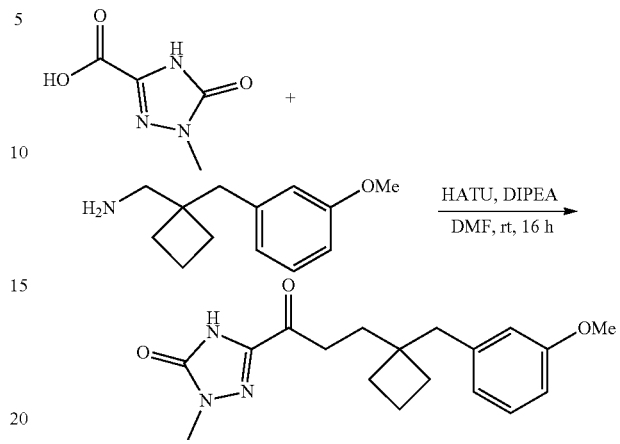

To a solution of 1-methyl-5-oxo-4H-1,2,4-triazole-3-carboxylate (50 mg, 0.292 mmol) and crude (1-(3-methoxybenzyl)cyclobutyl)methanamine (113 mg, 0.55 mmol) in DMF (2.5 mL) was added HATU (209 mg, 0.55 mmol) and the reaction mixture stirred at RT for 16 hrs. The crude product was directly purified by prep LCMS. Fractions containing desired product were combined, the solvent evaporated in vacuo and the product lyophilised from 1:1 MeCN—H₂O to yield N-((1-(3-methoxybenzyl)cyclobutyl)methyl)-1-methyl-5-oxo-4,5-dihydro-1H-1,2,4-triazole-3-carboxamide (48.2 mg, 26%) as a white solid. ¹H-NMR (400 MHz, CHLOROFORM-D) δ 7.22 (t, J=7.8 Hz, 1H), 6.79-6.75 (m, 2H), 6.73 (t, J=1.8 Hz, 1H), 6.52 (t, J=6.0 Hz, 1H), 3.79 (s, 3H), 3.49 (s, 3H), 3.45 (d, J=6.4 Hz, 2H), 2.77 (s, 2H), 2.05-1.82 (m, 6H). QC in pH2=100%, RT 4.39 min, MZ 331.1 [M+H]⁺; in pH9=100-%, RT 3.62 min, MZ 331.1 [M+H]⁺

Example 76: N-((1-(2-(Difluoromethyl)benzyl)cyclobutyl)methyl)-1-methyl-5-oxo-4,5-dihydro-1H-1,2,4-triazole-3-carboxamide

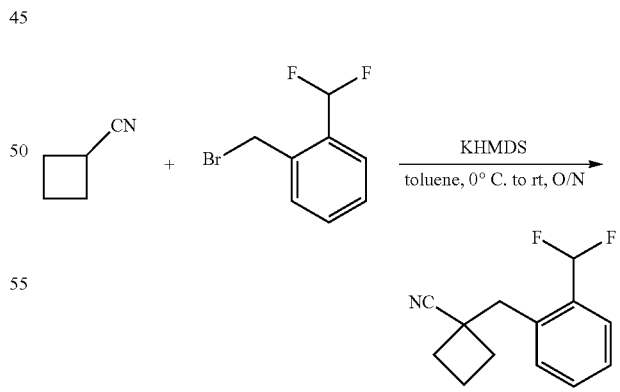

Potassium bis(trimethylsilyl)azanide (1.50 mL, 1.49 mmol) was added to an ice-cold solution of cyclobutanecarbonitrile (0.19 mL, 2.71 mmol) in toluene (10 mL) under N₂ and the mixture stirred for 1 hr at 0° C. A solution of 1-(bromomethyl)-2-(difluoromethyl) benzene (300 mg, 1.36 mmol) in toluene (2.0 mL) was added and the reaction mixture allowed to warm to RT and stirred o/n at RT. The solution was quenched with dilute citric acid and extracted with DCM (3×). The combined organics were passed through a phase separator cartridge (Biotage) and the filtrate evaporated in vacuo. The crude product was purified by flash chromatography (Biotage, 10 g Sfar column) eluting with isohexane-EtAOc (0-100%) to yield 1-(2-(difluoromethyl) benzyl)cyclobutane-1-carbonitrile as a colourless oil (217 mg, 0.980 mmol).

$^1$H-NMR (400 MHz, CHLOROFORM-D) δ 7.55 (d, J=7.3 Hz, 1H), 7.48-7.34 (m, 3H), 6.82 (t, J=55.2 Hz, 1H), 3.24 (d, J=14.7 Hz, 2H), 2.58-2.48 (m, 2H), 2.29-2.17 (m, 3H), 2.10-2.00 (m, 1H).

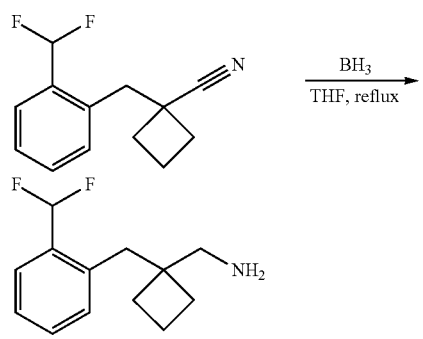

To a solution of 1-(2-(difluoromethyl)benzyl)cyclobutane-1-carbonitrile (217 mg, 0.981 mmol) in THF (10 mL) was added borane (2.9 mL, 2.94 mmol). The reaction mixture was stirred at reflux for 4 hrs. The reaction was cooled to RT and MeOH added. The solvent was evaporated in vacuo and the crude product purified by catch release cartridge (Biotage SCX-2) washing with MeOH (3×) and eluted with 2M NH$_3$-MeOH. The solvent was evaporated in vacuo to yield crude (1-(2-(difluoromethyl)benzyl)cyclobutyl)methanamine which was not purified further.

$^1$H-NMR (400 MHz, CHLOROFORM-D) δ 7.61 (d, J=7.8 Hz, 1H), 7.41-7.37 (m, 1H), 7.34-7.30 (m, 1H), 7.26-7.22 (m, 1H), 7.01 (d, J=55.4 Hz, 1H), 2.92-2.88 (m, 2H), 2.74 (s, 2H), 2.04-1.71 (m, 6H).

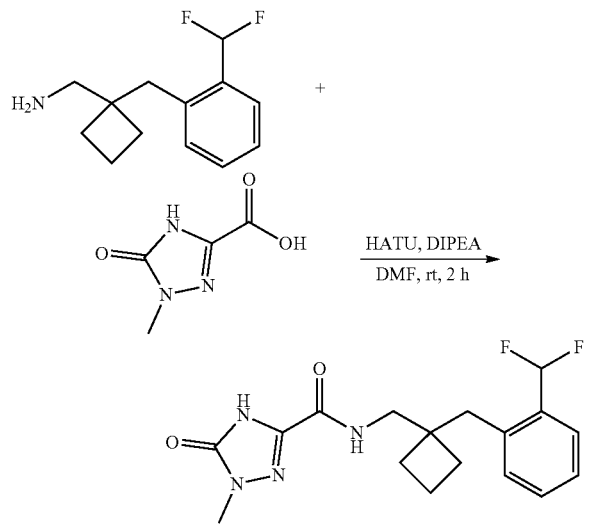

To 5-hydroxy-1-methyl-1H-1,2,4-triazole-3-carboxylic acid (40 mg, 0.28 mmol), (1-(2-(difluoromethyl)benzyl) cyclobutyl)methanamine (63 mg, 0.28 mmol) and DIPEA (0.150 mL, 0.839 mmol) in DMF (3.0 mL) was added HATU (106 mg, 0.280 mmol) and the reaction mixture stirred at RT for 2 hrs. The crude product was directly purified by prep LCMS. Desired fractions containing product were combined, the solvent evaporated in vacuo and the residue lyophilised from 1:1 MeCN—H$_2$O to yield N-((1-(2-(difluoromethyl)benzyl)cyclobutyl)methyl)-1-methyl-5-oxo-4,5-dihydro-1H-1,2,4-triazole-3-carboxamide (65.3 mg, 67%) as a white solid. $^1$H-NMR (400 MHz, CHLOROFORM-D) δ 9.62 (s, 1H), 7.56 (d, J=7.8 Hz, 1H), 7.43 (t, J=7.8 Hz, 1H), 7.35-7.28 (m, 2H), 6.82 (d, J=55.0 Hz, 1H), 6.63 (t, J=5.0 Hz, 1H), 3.57 (d, J=6.4 Hz, 2H), 3.48 (s, 3H), 2.90 (s, 2H), 2.05-1.75 (m, 6H); QC in pH2=99.43%, RT 4.49 min, MZ 351.1 [M+H]$^+$ QC in pH9=100%, RT 3.75 min, MZ 351.1 [M+H]$^+$ Example 77: N-((1-(3-Cyclopropylbenzyl)cyclobutyl)methyl)-1-methyl-5-oxo-4,5-dihydro-1H-1,2,4-triazole-3-carboxamide

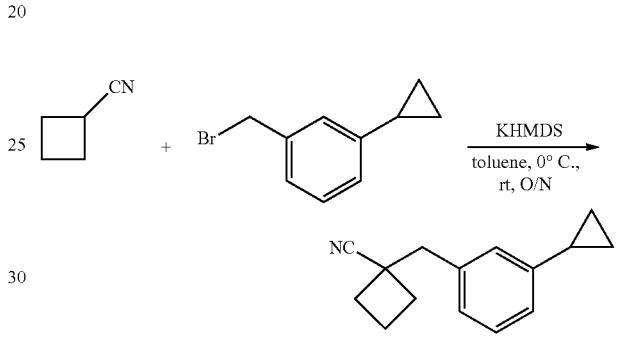

To a flask purged and filled with nitrogen was added cyclobutanecarbonitrile (0.24 mL, 2.61 mmol) and toluene (4.0 mL) and the reaction mixture cooled to 0° C. To the reaction mixture was added potassium bis(trimethylsilyl) amide solution (1.0M in THF, 4.4 mL, 4.40 mmol) dropwise and the reaction mixture stirred at 0° C. for 2 hrs. 1-(Bromomethyl)-3-cyclopropylbenzene (500 mg, 2.37 mmol) dissolved in toluene (0.5 mL) was added slowly, and the reaction mixture stirred at RT for 16 hrs. To the reaction mixture was added sat. NH$_4$Cl$_{(aq)}$ (20 mL) and extracted with EtOAc (50 mL). The organic phase was passed through a phase separator cartridge (Biotage) and the solvent evaporated in vacuo. The crude product was purified by flash chromatography (Biotage, 10 g Sfar column) eluting with isohexane-EtOAc (0-15%) to yield 1-(3-cyclopropylbenzyl) cyclobutane-1-carbonitrile (190 mg, 38%) as a pale yellow oil. $^1$H-NMR (400 MHz, DMSO-D6) δ 7.21-7.18 (m, 1H), 7.05 (dd, J=6.2, 1.6 Hz, 1H), 6.98 (td, J=3.0, 1.5 Hz, 2H), 2.97 (s, 2H), 2.36-2.19 (m, 4H), 2.08-2.00 (m, 2H), 1.92-1.85 (m, 1H), 0.96-0.92 (m, 2H), 0.67-0.63 (m, 2H)

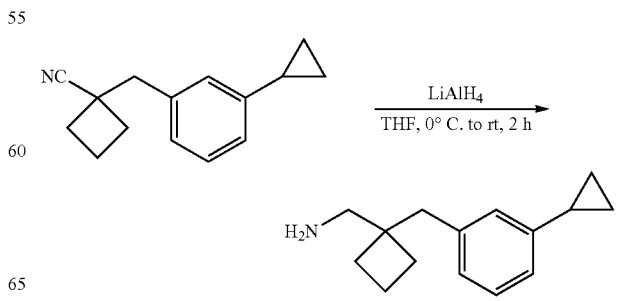

To a flask purged and under nitrogen was added 1-(3-cyclopropylbenzyl)cyclobutane-1-carbonitrile (180 mg, 0.852 mmol) in THF (3.7 mL). The reaction mixture was cooled to 0° C. and LiAlH₄ (1.0M in THF, 2.60 mL, 2.60 mmol) added dropwise at 0° C. The reaction mixture was allowed to warm to RT and stirred at RT for 2 hrs. The reaction mixture was cooled to 0° and quenched with aqueous Rochelle's salt solution (10 mL). The mixture was extracted with EtOAc (40 mL). The organic phase was washed with sat. brine solution, passed through a phase separator cartridge (Biotage) and the solvent evaporated in vacuo. The residue was purified by catch release cartridge (Biotage SCX-2, 2 g), washing with MeOH (4 CVs) and eluting with 0.7M NH₃-MeOH (6 CVs). Fractions containing product were combined and the solvent evaporated in vacuo to yield (1-(3-cyclopropylbenzyl)cyclobutyl)methanamine (0.15 g, 78%) as a colourless oil. LC-MS in pH9; RT 1.86 min, MZ 216.2 [M+H]⁺

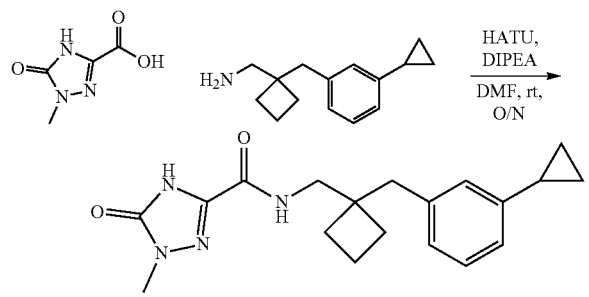

5-Hydroxy-1-methyl-1H-1,2,4-triazole-3-carboxylic acid (50 mg, 0.349 mmol) and (1-(3-cyclopropylbenzyl)cyclobutyl)methanamine (75 mg, 0.349 mmol) were dissolved in DMF (2.0 mL). DIPEA (0.18 mL, 1.05 mmol) and HATU (159 mg, 0.419 mmol) were added, and the reaction mixture stirred o/n at RT. The crude product was directly purified by prep-LCMS and fractions containing desired product were combined and the solvent evaporated in vacuo. The residue was lyophilised from 1:1 MeCN—H₂O to N-((1-(3-cyclopropylbenzyl)cyclobutyl)methyl)-1-methyl-5-oxo-4,5-dihydro-1H-1,2,4-triazole-3-carboxamide (47.8 mg, 40%) as a white solid.

¹H-NMR (400 MHz, DMSO-D6) δ 12.27 (s, 1H), 8.46 (t, J=6.2 Hz, 1H), 7.14 (t, J=7.6 Hz, 1H), 7.00 (d, J=7.3 Hz, 1H), 6.94-6.89 (m, 2H), 3.36 (s, 3H), 3.23 (d, J=6.4 Hz, 2H), 2.65 (s, 2H), 1.90-1.58 (m, 7H), 0.94-0.89 (m, 2H), 0.64 (td, J=5.7, 3.7 Hz, 2H). QC in pH2=100%, RT 4.03 min, MZ 341.2 [M+H]⁺; QC in pH9=100%, RT 4.82 min, MZ 341.1 [M+H]⁺.

Example 78: N-(2-Cyclopropyl-3-(3-fluorophenyl)propyl)-1-methyl-5-oxo-4,5-dihydro-1H-1,2,4-triazole-3-carboxamide

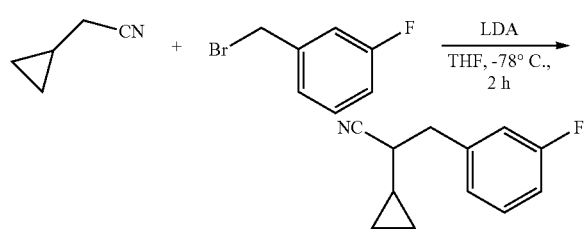

To a flask purged and filled with nitrogen was added cyclopropylacetonitrile (1.10 mL, 11.6 mmol) and THF (26 mL). The reaction mixture was cooled to -78° C. and LDA (2M in THF, 13.0 mL, 25.4 mmol) added dropwise. The reaction mixture was stirred at -78° C. for 1 hr. To this was added 1-(bromomethyl)-3-chlorobenzene (1.30 mL, 10.6 mmol) and the reaction mixture stirred at -78° C. for 1 hr. The reaction mixture was quenched with 1:1 water-sat. NH₄Cl solution (10 mL) and extracted with EtOAc (40 mL). The organic phase was passed through a phase separator cartridge (Biotage) and the filtrate evaporated in vacuo. The crude product was purified by flash chromatography (Biotage, 50 g Sfar column) eluting with isohexane-EtOAc (0-10%) to yield 2-cyclopropyl-3-(3-fluorophenyl)propanenitrile (422 mg, 21%) as a yellow oil. 1H-NMR (400 MHz, DMSO-D6) δ 7.41-7.35 (m, 1H), 7.19-7.07 (m, 3H), 3.10-2.71 (m, 3H), 1.10-1.00 (m, 1H), 0.60-0.50 (m, 1H), 0.39-0.29 (m, 2H)—1H under solvent or water peak

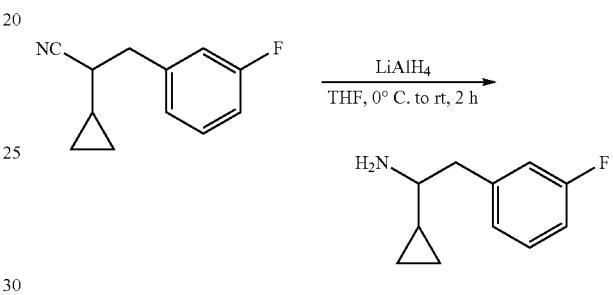

To a flask purged and under nitrogen was added 2-cyclopropyl-3-(3-fluorophenyl)propanenitrile (422 mg, 2.23 mmol) in THF (9.7 mL). The reaction mixture was cooled to 0° C. and LiAlH₄ (1 OM in THF, 6.7 mL, 6.70 mmol) added dropwise at 0° C. The reaction mixture was stirred at rt for 2 hrs. The mixture was cooled to 0° C., quenched with aqueous Rochelle's salt solution (10 mL) and extracted with EtOAc (40 mL). The organic phase was washed with sat. brine solution, passed through a phase separator cartridge (Biotage) and the solvent evaporated in vacuo. The residue purified by a catch release cartridge (Biotage SCX-2, 10 g), washing with MeOH (4 CVs) and eluted with 0.7M NH₃-MeOH (6 CVs). Fractions containing desired product were combined and the solvent evaporated in vacuo to yield 2-cyclopropyl-3-(3-fluorophenyl)propan-1-amine (350 mg, 81%) as a yellow oil. LC-MS in pH9; RT 1.29 min, MZ 194.2 [M+H]⁺

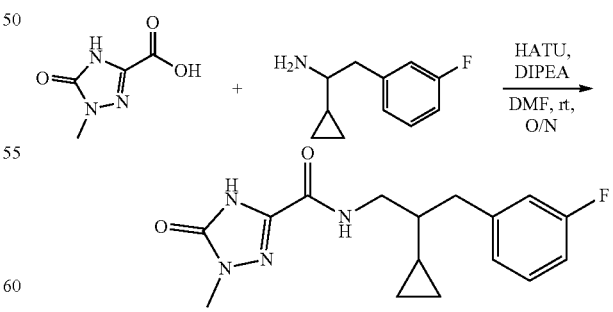

5-Hydroxy-1-methyl-1H-1,2,4-triazole-3-carboxylic acid (50 mg, 0.349 mmol) and 2-cyclopropyl-3-(3-fluorophenyl)propan-1-amine (68 mg, 0.349 mmol) were dissolved in DMF (2.0 mL). DIPEA (0.18 mL, 1.05 mmol) and HATU (159 mg, 0.419 mmol) were added and the reaction mixture stirred o/n at RT. The product was directly purified by prep-LCMS (Waters Xbridge C18 250 nm×19 nm, 5um; 1.6 min_pH2 Formic acid) and fractions containing desired product combined, and the solvent evaporated in vacuo. The residue was lyophilised from 1:1 MeCN—H$_2$O to yield N-[2-cyclopropyl-3-(3-fluorophenyl)propyl]-1-methyl-5-oxo-4H-1,2,4-triazole-3-carboxamide (25 mg, 22) as a white solid. $^1$H NMR (400 MHz, CHLOROFORM-D) δ 9.70 (s, 1H), 7.24-7.20 (m, 1H), 6.96-6.87 (m, 3H), 6.73 (t, J=5.5 Hz, 1H), 3.51-3.36 (m, 5H), 2.76 (ddd, J=46.5, 13.7, 6.6 Hz, 2H), 1.14 (dt, J=22.3, 7.0 Hz, 1H), 0.63-0.43 (m, 3H), 0.21 (t, J=9.2 Hz, 1H), −0.00-0.06 (m, 1H) QC in pH2=100%, RT 4.30 min, MZ 319.2 [M+H]$^+$; QC in pH9=100%, RT 3.53 min, MZ 319.2 [M+H]$^+$.

Example 79: N-((1-(3-Chlorobenzyl)cyclobutyl)methyl)-1-methyl-5-oxo-4,5-dihydro-1H-1,2,4-triazole-3-carboxamide

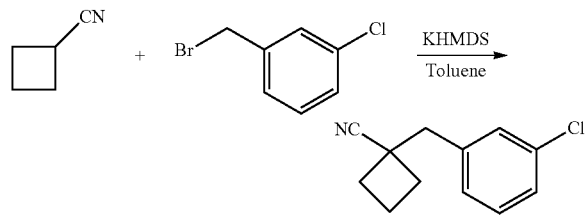

To a flask purged and under nitrogen were added cyclobutanecarbonitrile (0.25 mL, 2.68 mmol) and toluene (5.0 mL) and the reaction mixture cooled to 0° C. To the reaction mixture was added potassium bis(trimethylsilyl)amide solution (1.0M in THF, 4.5 mL, 4.50 mmol) dropwise and the reaction mixture stirred at 0° C. for 2 hours. 3-Chlorobenzyl bromide (0.32 mL, 2.43 mmol) was added, and the reaction mixture stirred at RT o/n. To the reaction mixture was added sat. NH$_4$Cl$_{(aq)}$ and the solution extracted with EtOAc. The organic phase was passed through a phase separator cartridge (Biotage) and filtrate evaporated in vacuo. This crude product was purified by flash chromatography (Biotage Isolera Four, 10 g Sfar column) eluting with isohexane-EtOAc (0-10%) to yield 1-(3-chlorobenzyl)cyclobutane-1-carbonitrile (319 mg, 64%) as a colourless oil. LC-MS in pH2; RT 1.89 min, MZ 229.1 [M+Na]$^+$

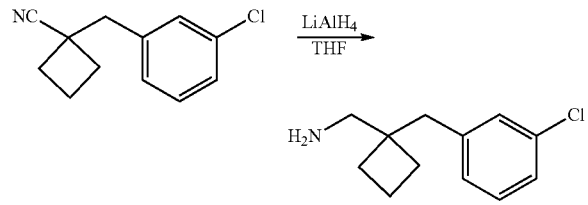

To a flask purged and maintained with nitrogen was added 1-(3-chlorobenzyl)cyclobutane-1-carbonitrile (319 mg, 1.55 mmol) in THF (7.0 mL). The reaction mixture was cooled to 0° C. and LiAlH$_4$ (1.0M in THF, 3.1 mL, 3.10 mmol) added dropwise at 0° C. The reaction mixture was stirred at RT for 2 hrs. The mixture was cooled to 0° C. and quenched with aqueous Rochelle's solution. The mixture was extracted with EtOAc, washed with sat. brine solution and the solvent evaporated in vacuo. The product was purified by catch release cartridge (Biotage SCX-2, 5 g) washing with MeOH and eluted with 1M NH$_3$-MeOH. Fractions containing desired product were combined and the solvent evaporated in vacuo to yield (1-(3-chlorobenzyl)cyclobutyl)methanamine (278 mg, 79%) as a colourless gum. LC-MS in pH2; RT 1.28 min, MZ 210.2 [M+H]$^+$

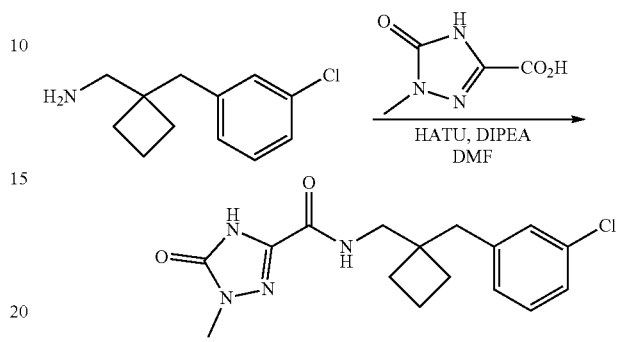

(1-(3-Chlorobenzyl)cyclobutyl)methanamine (74 mg, 0.351 mmol) and 5-hydroxy-1-methyl-1H-1,2,4-triazole-3-carboxylic acid (50 mg, 0.349 mmol) were dissolved in DMF (5.0 mL). DIPEA (0.18 mL, 1.05 mmol) and HATU (160 mg, 0.421 mmol) were added and the mixture stirred at RT for 2 hrs. The crude product was directly purified by prep-LCMS (SunFire C18 OBD 19 mm×250 mm, 5 um, Solvent A:Water+0.1% Formic acid, Solvent B:MeCN, 2.4 min_pH2 Formic acid, 30-70% MeCN followed by organic wash). Fractions containing desired product were combined, the solvent evaporated in vacuo and lyophilised from 1:1 MeCN—H$_2$O to yield N-((1-(3-chlorobenzyl)cyclobutyl)methyl)-1-methyl-5-oxo-4,5-dihydro-1H-1,2,4-triazole-3-carboxamide (41.8 mg, 36%) as a white solid. $^1$H-NMR (400 MHz, CHLOROFORM-D) δ 9.61 (s, 1H), 7.22-7.18 (m, 2H), 7.17 (d, J=1.8 Hz, 1H), 7.00-7.08 (1H), 6.48 (t, J=5.7 Hz, 1H), 3.48 (s, 3H), 3.44 (d, J=6.0 Hz, 2H), 2.74 (s, 2H), 2.03-1.78 (m, 6H); QC in pH2=100%, RT 4.60 min, MZ 335.1 [M+H]$^+$; QC in pH9=99.3%, RT 3.83 min, MZ 335.1 [M+H]$^+$ Example 80: 1-Methyl-5-oxo-N-(2-(thiophen-2-ylmethyl)butyl)-4,5-dihydro-1H-1,2,4-triazole-3-carboxamide

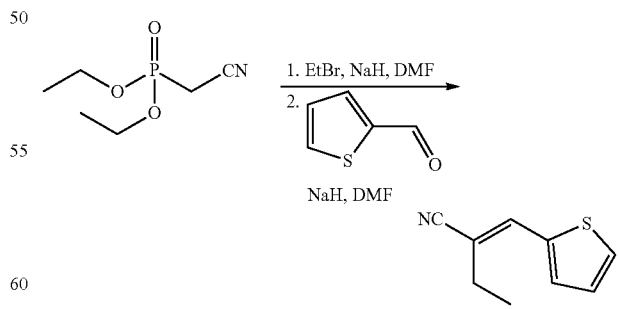

To sodium hydride (60% dispersion in oil, 119 mg, 2.96 mmol) in DMF (5.0 mL) was added diethyl cyanomethylphosphonate (0.46 mL, 2.82 mmol) at 0° C. and stirred at 0° C. for 10 minutes. Bromoethane (0.23 mL, 3.10 mmol) was added, and the reaction stirred at RT for 1 hr. DMF (5.0 mL) and sodium hydride (60% dispersion in oil, 119 mg, 2.96 mmol) were added at 0° C. and the mixture stirred at 0° C. for 15 minutes. Thiophene-2-carbaldehyde (317 mg, 2.82 mmol) in DMF (5.0 mL) was added and the reaction mixture stirred at RT o/n. The solvent was evaporated in vacuo and the residue partitioned between DCM and water. The aqueous phase extracted with DCM and the combined organics passed through a phase separator cartridge (Biotage) and the filtrate evaporated in vacuo. The crude material was purified by flash chromatography (Biotage Isolera Four, 25 g Sfar column) eluting with isohexane-EtOAc (0-10%) to yield (E)-2-(thiophen-2-ylmethylene)butanenitrile (351 mg, 76%) as a colourless oil.

LC-MS in pH2; RT 1.80 min, MZ 163.9 [M+H]$^+$

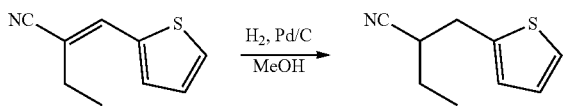

(E)-2-(Thiophen-2-ylmethylene)butanenitrile (351 mg, 2.15 mmol) was dissolved in MeOH (20 mL). Palladium on carbon (a spatula, excess) was added, and the solution degassed and flushed with $N_2$ twice, then evacuated and filled with $H_2$. The mixture was stirred at RT o/n. The solution was filtered over celite and the solvent evaporated in vacuo to yield 2-(thiophen-2-ylmethyl)butanenitrile (329 mg, 93%) as a colourless oil. LC-MS in pH2; RT 1.75 min, MZ no ionisation.

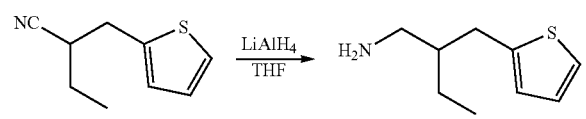

To a flask purged and maintained with nitrogen was added 2-(thiophen-2-ylmethyl)butanenitrile (329 mg, 1.99 mmol) in THF (10 mL). The reaction mixture was cooled to 0° C. and LiAlH$_4$ (1.0M in THF, 6.0 mL, 6.00 mmol) added dropwise at 0° C. The reaction mixture was stirred at RT for 40 minutes. The mixture was cooled to 0° C., quenched with aqueous Rochelle's salt solution and extracted with EtOAc (2×). The combined organics were passed through a phase separator cartridge (Biotage) and the filtrate evaporated in vacuo. Th residue was dissolved in MeOH and purified by catch release cartridge (Biotage SCX-2) washing with MeOH (3×) and eluting with 1M NH$_3$-MeOH. Fractions containing desired product were combined and the solvent evaporated in vacuo to yield 2-(thiophen-2-ylmethyl)butan-1-amine (270 mg, 52%) as a yellow oil. LC-MS in pH2; RT 1.12 min, MZ 170.1 [M+H].

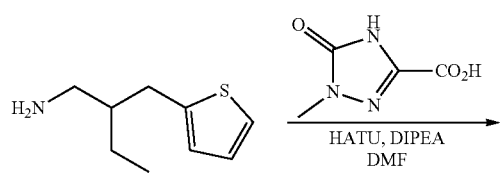

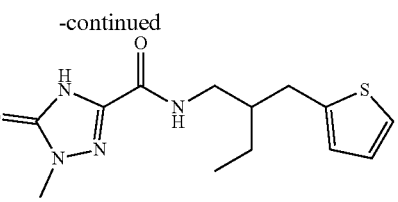

2-(Thiophen-2-ylmethyl)butan-1-amine (59 mg, 0.349 mmol) and 5-hydroxy-1-methyl-1H-1,2,4-triazole-3-carboxylic acid (50 mg, 0.349 mmol) were dissolved in DMF (2.0 mL). DIPEA (0.18 mL, 1.05 mmol) and HATU (160 mg, 0.421 mmol) were added, and the mixture stirred at RT o/n. The crude product was directly purified by prep-LCMS (SunFire C18 OBD 19 mm×250 mm, Sum, Solvent A:Water+0.1% Formic acid, pH2, Solvent B:MeCN, 2.4 min_pH2 Formic acid, 30-70% MeCN followed by organic wash). Fractions containing desired product were combined, the solvent evaporated in vacuo, and the residue lyophilised from 1:1 MeCN—H$_2$O to yield 1-methyl-5-oxo-N-(2-(thiophen-2-ylmethyl)butyl)-4,5-dihydro-1H-1,2,4-triazole-3-carboxamide (46.9 mg, 46%) as a white solid. $^1$H-NMR (400 MHz, DMSO-D6) δ 12.24 (s, 1H), 8.64 (t, J=6.0 Hz, 1H), 7.32 (dd, J=5.0, 0.9 Hz, 1H), 6.94 (q, J=2.7 Hz, 1H), 6.89 (d, J=2.7 Hz, 1H), 3.35 (s, 3H), 3.18 (td, J=6.4, 1.8 Hz, 2H), 2.82 (dd, J=14.7, 6.0 Hz, 1H), 2.72 (q, J=7.5 Hz, 1H), 1.93-1.83 (m, 1H), 1.31-1.24 (m, 2H), 0.87 (t, J=7.3 Hz, 3H); QC in pH2=100%, RT 4.17 min, MZ 295.1 [M+H]$^+$; QC in pH9=100%, RT 3.38 min, MZ 295.0 [M+H]$^+$ Example 81: N-((1-(2,5-Difluorobenzyl)cyclobutyl)methyl)-1-methyl-5-oxo-4,5-dihydro-1H-1,2,4-triazole-3-carboxamide

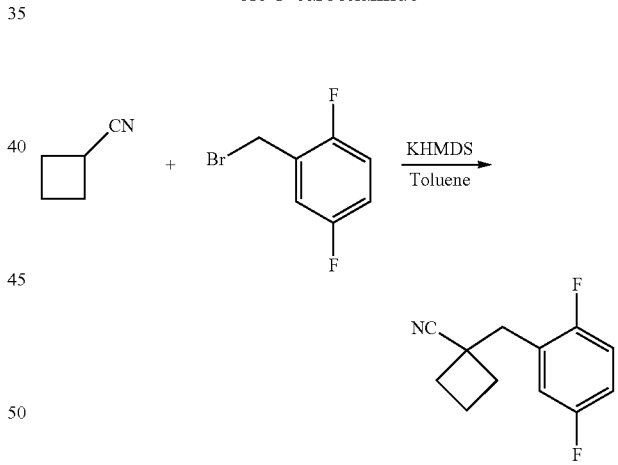

To a flask was added cyclobutanecarbonitrile (0.23 mL, 2.42 mmol) and toluene (5.0 mL), and the reaction mixture cooled to 0° C. Potassium bis(trimethylsilyl)amide solution (1.0M in THF, 4.5 mL, 4.50 mmol) was added dropwise and the reaction mixture stirred at 0° C. for 2 hours. 2-(Bromomethyl)-1,4-difluorobenzene (0.31 mL, 2.42 mmol) was added, and the reaction mixture stirred at RT o/n. The reaction mixture was quenched with sat. NH$_4$Cl$_{(aq)}$ and the layers separated. The aqueous phase was extracted with EtOAc (2×). The combined organics were passed through a phase separator cartridge (Biotage) and the solvent evaporated in vacuo. The crude product was purified by flash chromatography (Biotage Isolera Four, 10 g Sfar column) eluting with isohexane-EtOAc (0-20%) to yield 1-(2,5- difluorobenzyl)cyclobutane-1-carbonitrile (239 mg, 48%) as a colourless gum. LC-MS in pH2; RT 1.83 min, MZ no ionisation

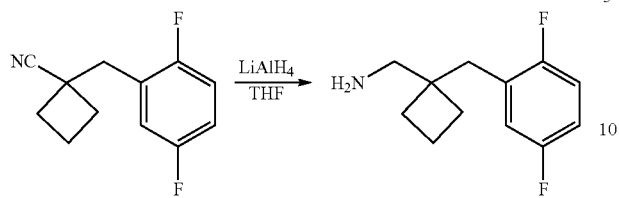

To a flask purged and maintained with nitrogen was added 1-(2,5-difluorobenzyl)cyclobutane-1-carbonitrile (239 mg, 1.15 mmol) in THF (7.0 mL). The reaction mixture was cooled to 0° C. and LiAlH$_4$ (1.0M in THF, 3.5 mL, 3.50 mmol) added dropwise at 0° C. The reaction mixture was stirred at RT for 1 hr. The reaction mixture was cooled to 0° C., quenched with aqueous Rochelle's salt solution and extracted with EtOAc (3×). The combined organics were passed through a phase separator cartridge (Biotage) and the solvent evaporated in vacuo. The crude product was purified by catch release cartridge (Biotage SCX-2) washing with MeOH (3×) and eluted with 1 M NH$_3$-MeOH. Fractions containing product were combined and the solvent evaporated in vacuo to give (1-(2,5-difluorobenzyl)cyclobutyl) methanamine (161 mg, 66%) as a yellow oil. LC-MS in pH2; RT 1.24 min, MZ 212.1 [M+H]$^+$

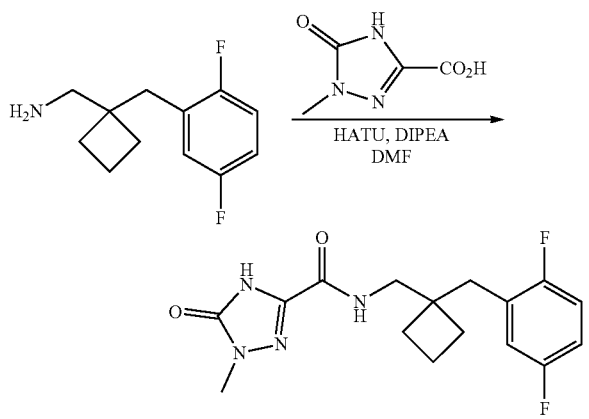

(1-(2,5-Difluorobenzyl)cyclobutyl)methanamine (74 mg, 0.349 mmol) and 5-hydroxy-1-methyl-1H-1,2,4-triazole-3-carboxylic acid (50 mg, 0.349 mmol) were dissolved in DMF (3.0 mL). DIPEA (0.18 mL, 1.05 mmol) and HATU (160 mg, 0.421 mmol) were added, and the mixture stirred at RT for 2 hrs. The crude product was directly purified by prep-LCMS (SunFire C18 OBD 19 mm×250 mm, 5 um, Solvent A:Water+0.1% Formic acid, pH2, Solvent B:MeCN, 2.4 min_pH2 Formic acid, 30-70% MeCN followed by organic wash). Fractions containing desired product were combined and the solvent evaporated in vacuo. The product was lyophilised from 1:1 MeCN—H$_2$O to yield N-((1-(2,5-difluorobenzyl)cyclobutyl)methyl)-1-methyl-5-oxo-4,5-dihydro-1H-1,2,4-triazole-3-carboxamide (27 mg, 23%) as a white solid.

$^1$H-NMR (400 MHz, DMSO-D6) δ 12.29 (s, 1H), 8.63 (t, J=6.2 Hz, 1H), 7.36-7.32 (m, 1H), 7.23 (td, J=9.3, 4.9 Hz, 1H), 7.15-7.09 (m, 1H), 3.37 (s, 3H), 3.30 (d, J=6.4 Hz, 2H), 2.73 (s, 2H), 1.89-1.59 (m, 6H). QC in pH2=100%, RT 4.49 min, MZ 337.0 [M+H]$^+$; QC in pH9=100%, RT 3.66 min, MZ 337.0 [M+H]$^+$ Example 82: N-((1-(2-Ethylbenzyl)cyclobutyl) methyl)-1-methyl-5-oxo-4,5-dihydro-1H-1,2,4-triazole-3-carboxamide

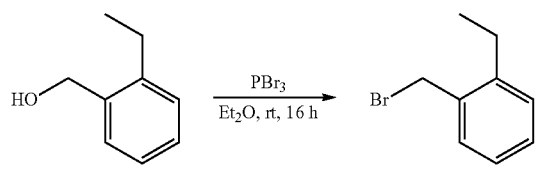

Phosphorous tribromide (0.35 mL, 3.67 mmol) was added to (2-ethylphenyl)methanol (0.49 mL, 3.67 mmol) in Et$_2$O (45 mL) and the mixture stirred at RT o/n. The mixture was diluted with Et$_2$O (60 mL) and washed with water (100 mL). The combined organics were passed through a phase separator cartridge (Biotage) and the solvent evaporated in vacuo. The residue was purified by flash chromatography (Biotage, 25 g Sfar column) eluting with isohexane-EtOAc (0-10%) to yield 1-(bromomethyl)-2-ethylbenzene (656 mg, 90%) as a clear oil. LC-MS in pH9; RT 1.98 min, MZ 216.2 ni ionisation

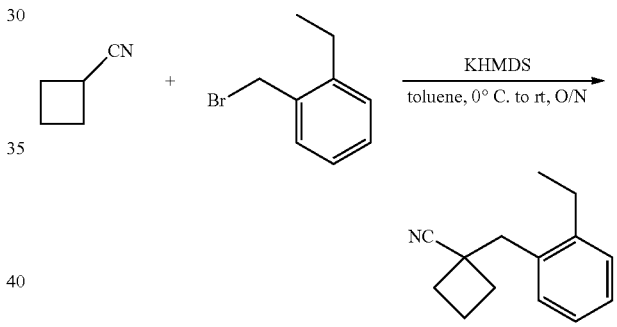

To a flask purged and maintained with nitrogen was added cyclobutanecarbonitrile (0.28 mL, 2.98 mmol) and toluene (6.0 mL), and the reaction mixture cooled to 0° C. Potassium bis(trimethylsilyl)amide solution (1.0M in THF, 4.7 mL, 4.70 mmol) was added dropwise and the reaction mixture stirred at 0° C. for 2 hrs. 1-(Bromomethyl)-2-ethylbenzene (653 mg, 3.28 mmol) was added portion wise and the reaction mixture stirred at RT o/n. The reaction mixture was quenched with sat. NH$_4$Cl$_{(aq)}$ and extracted with EtOAc (2×). The combined organics were passed through a phase separator cartridge (Biotage) and the filtrate evaporated in vacuo. The crude product was purified by flash chromatography (Biotage, 25 g Sfar column) eluting with isohexane-EtOAc (0-10%) to yield 1-(2-ethylbenzyl)cyclobutane-1-carbonitrile (273 mg, 46%) as a clear oil. LC-MS in pH9; RT 1.94 min, MZ no ionisation

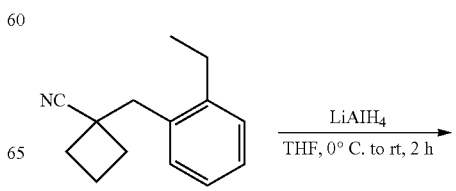

-continued

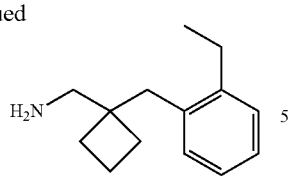

To a flask purged and maintained with nitrogen was added 1-(2-ethylbenzyl)cyclobutane-1-carbonitrile (273 mg, 1.37 mmol) in THF (7.0 mL). The reaction mixture was cooled to 0° C. and LiAlH$_4$ (1.0M in THF, 2.7 mL, 2.70 mmol) was added dropwise at 0° C. The reaction mixture was stirred at RT for 2 hrs. The reaction mixture was cooled to 0° C. and quenched with aqueous Rochelle's salt solution (20 mL) and extracted with EtOAc. The organic phase was washed with sat. brine solution, and the solvent evaporated in vacuo to give crude (1-(2-ethylbenzyl)cyclobutyl)methanamine (209 mg, 75%) as a colourless oil. The crude product was purified no further. LC-MS in pH9; RT 1.80 min, MZ 204.2 [M+H]$^+$

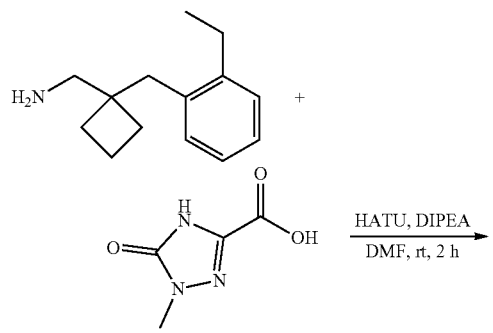

To 5-hydroxy-1-methyl-1H-1,2,4-triazole-3-carboxylic acid (40 mg, 0.280 mmol), (1-(2-ethylbenzyl)cyclobutyl)methanamine (63 mg, 0.307 mmol) and DIPEA (0.15 mL, 0.839 mmol) in DMF (2.5 mL) was added HATU (128 mg, 0.335 mmol) and the reaction mixture stirred at RT for 2 hrs. The solvent was evaporated in vacua and the crude product directly purified by prep-LCMS (2.4 min_pH2 Formic acid, 30-70% MeCN followed by organic wash). Fractions containing desired product were combined, the solvent evaporated in vacua and the residue lyophilised from 1:1 MeCN—H$_2$O to yield N-((1-(2-ethylbenzyl)cyclobutyl)methyl)-1-methyl-5-oxo-4,5-dihydro-1H-1,2,4-triazole-3-carboxamide (34 mg, 37%) as a white solid. $^1$H-NMR (400 MHz, DMSO-D6) δ 12.26 (s, 1H), 8.65 (t, J=6.0 Hz, 1H), 7.20-7.10 (m, 4H), 3.42 (d, J=6.4 Hz, 2H), 3.36 (s, 3H), 2.64 (s, 2H), 2.55-2.50 (m, 2H), 1.81-1.69 (m, 5H), 1.44 (t, J=8.2 Hz, 1H), 1.09 (t, J=7.6 Hz, 3H). QC in pH2=100%, RT 4.64 min, MZ 327.1 [M−H]$^-$ QC in pH9=98.0%, RT 3.98 min, MZ 327.1 [M−H]$^-$ Example 83: N-((1-(2-Fluoro-5-methylbenzyl)cyclobutyl)methyl)-1-methyl-5-oxo-4,5-dihydro-1H-1,2,4-triazole-3-carboxamide

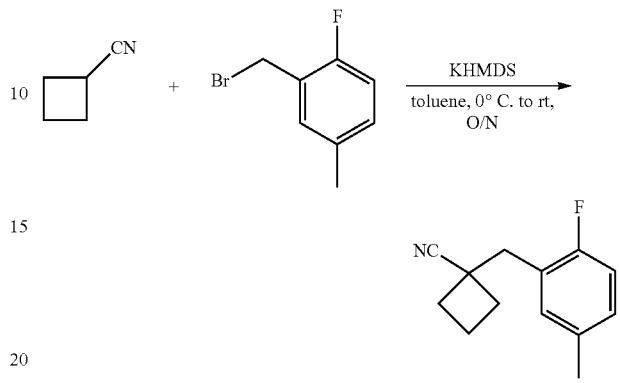

To a flask purged and maintained with nitrogen was added cyclobutanecarbonitrile (0.21 mL, 2.22 mmol) and toluene (6.0 mL), and the reaction mixture cooled to 0° C. Potassium bis(trimethylsilyl)amide solution (1.0M in THF, 3.50 mL, 3.50 mmol) was added dropwise and the reaction mixture stirred at 0° C. for 2 hrs. 2-Fluoro-5-methylbenzyl bromide (496 mg, 2.44 mmol) was added portion wise and the reaction mixture stirred at RT o/n. The reaction mixture was quenched with sat. NH$_4$Cl$_{(aq)}$ and extracted with EtOAc (2×). The combined organics were passed through a phase separator cartridge (Biotage) and the filtrate evaporated in vacuo. The residue was purified by flash chromatography (Biotage, 10 g Sfar column) eluting with isohexane-EtOAc (0-10%) to yield 1-(2-fluoro-5-methylbenzyl)cyclobutane-1-carbonitrile (339 mg, 75%) as a clear oil. LC-MS in pH9; RT 1.90 min, MZ 204.1 [M+H]$^+$

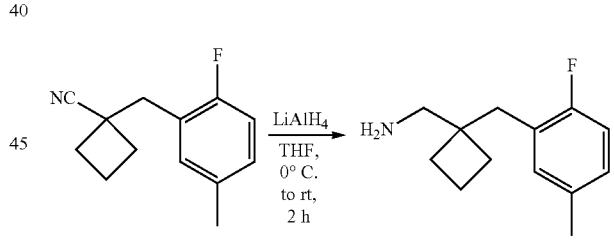

To a flask purged and maintained with nitrogen was added 1-(2-fluoro-5-methylbenzyl)cyclobutane-1-carbonitrile (339 mg, 1.67 mmol) in THF (8.5 mL). The reaction mixture was cooled to 0° C. and LiAlH$_4$ (1.0M in THF, 3.30 mL, 3.30 mmol) added dropwise at 0° C. The reaction mixture was stirred at RT for 2 hrs. The reaction mixture was cooled to 0° C. and quenched with aqueous Rochelle's salt solution (20 mL) and extracted with EtOAc. The organic phase was washed with sat. brine solution and the solvent evaporated in vacuo. The residue was purified by catch release cartridge (Biotage SCX-2), washing with MeOH and eluted with 1M NH$_3$-MeOH. Fractions containing desired product were combined and the solvent evaporated in vacuo to yield (1-(2-fluoro-5-methylbenzyl)cyclobutyl)methanamine (338 mg, 98%) as a clear oil.

LC-MS in pH9; RT 1.77 min, MZ 208.2 [M+H]$^+$

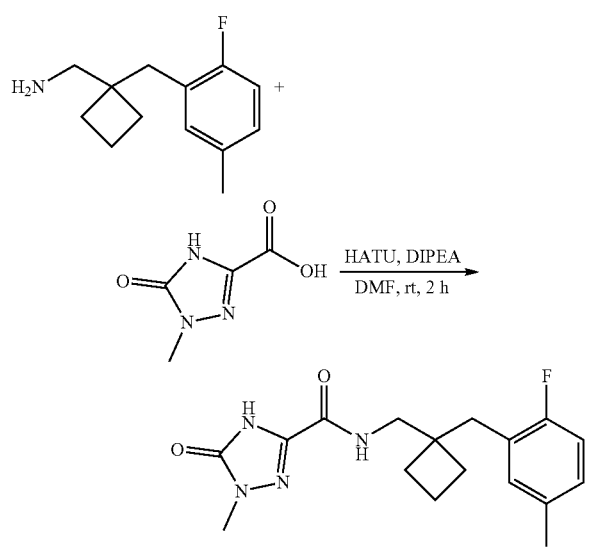

5-Hydroxy-1-methyl-1H-1,2,4-triazole-3-carboxylic acid (40 mg, 0.280 mmol), (1-(2-fluoro-5-methylbenzyl)cyclobutyl)methanamine (58 mg, 0.280 mmol) and DIPEA (0.15 mL, 0.839 mmol) were dissolved in DMF (2.5 mL). HATU (128 mg, 0.335 mmol) was added, and the reaction mixture stirred at RT for 2 hrs. The solvent was evaporated in vacuo and the residue directly purified by prep-LCMS (2.4 min_pH2 Formic acid, 30-70% MeCN followed by organic wash). Fractions containing desired product were combined, the solvent evaporated in vacuo and the product lyophilised from 1:1 MeCN—H$_2$O to yield N-((1-(2-fluoro-5-methylbenzyl)cyclobutyl)methyl)-1-methyl-5-oxo-4,5-dihydro-1H-1,2,4-triazole-3-carboxamide (20.8 mg, 22%) as a white solid. $^1$H-NMR (400 MHz, DMSO-D6) δ 11.82-12.21 (1H), 8.54 (t, J=6.4 Hz, 1H), 7.16 (d, J=7.8 Hz, 1H), 7.08-7.01 (m, 2H), 3.36 (s, 3H), 3.28 (d, J=6.4 Hz, 2H), 2.67 (d, J=1.6 Hz, 2H), 2.27 (s, 3H), 1.86-1.56 (m, 6H); QC in pH2=100%, RT 4.75 min, MZ 333.0 [M+H]$^+$; QC in pH9=100%, RT 4.06 min, MZ 333.0 [M+H]$^+$ Example 84: N-((1-(3-Fluorobenzyl)cyclobutyl)methyl)-1-methyl-5-oxo-4,5-dihydro-1H-1,2,4-triazole-3-carboxamide

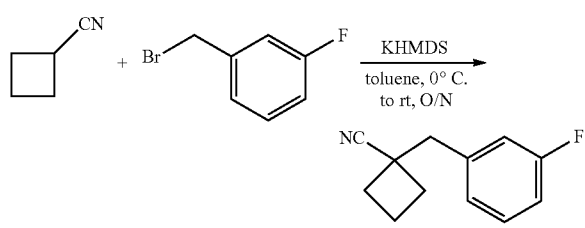

To a flask purged and maintained with nitrogen was added cyclobutanecarbonitrile (0.22 mL, 2.40 mmol) and toluene (8.0 mL), and the reaction mixture cooled to 0° C. Potassium bis(trimethylsilyl)amide solution (1.0M in THF, 3.80 mL, 3.80 mmol) was added dropwise and the reaction mixture stirred at 0° C. for 2 hrs. 1-(Bromomethyl)-3-fluorobenzene (500 mg, 2.64 mmol) was added portion wise and the reaction mixture stirred at RT overnight. The reaction mixture was quenched with sat. NH$_4$Cl$_{(aq)}$ and extracted with EtOAc (2×). The combined organics passed through a phase separator cartridge (Biotage) and evaporated in vacuo. The residue was purified by flash chromatography (Biotage, 10 g Sfar column) eluting with isohexane-EtOAc (0-10%) to yield (1-(3-fluorobenzyl)cyclobutyl)methanamine (170 mg, 0.898 mmol, 37%) as a colourless oil. LC-MS in pH9; RT 1.80 min, MZ no ionisation

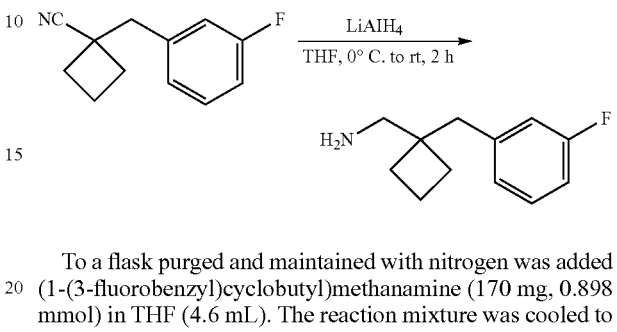

To a flask purged and maintained with nitrogen was added (1-(3-fluorobenzyl)cyclobutyl)methanamine (170 mg, 0.898 mmol) in THF (4.6 mL). The reaction mixture was cooled to 0° C. and LiAlH$_4$ (1.0M in THF, 1.80 mL, 1.80 mmol) added dropwise at 0° C. The reaction mixture was stirred at RT for 2 hrs. The reaction was cooled to 0° C. and quenched with aqueous Rochelle's salt solution (20 mL) and extracted with EtOAc. The organic phase was washed with sat. brine solution and the solvent evaporated in vacuo. The product was purified by catch release cartridge (Biotage SCX-2 cartridge), washing with MeOH (3×) and eluted with 1M NH$_3$-MeOH. Fractions containing desired product were combined and the solvent evaporated in vacuo to yield (1-(3-fluorobenzyl)cyclobutyl)methanamine (147 mg, 85%) as a yellow oil. LC-MS in pH9; RT 1.69 min, MZ 194.2 [M+H]$^+$

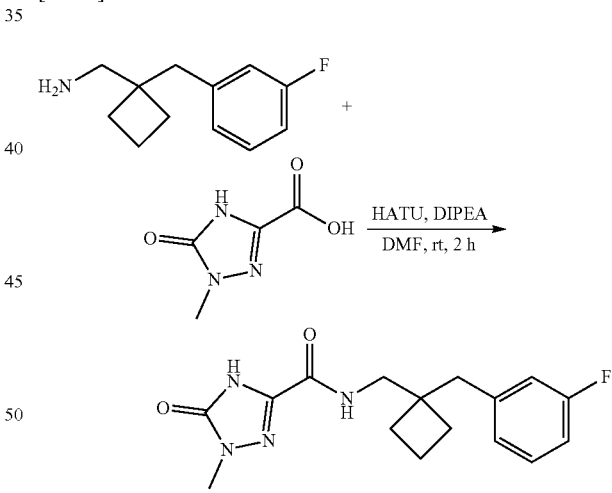

5-Hydroxy-1-methyl-1H-1,2,4-triazole-3-carboxylic acid (40 mg, 0.280 mmol), (1-(3-fluorobenzyl)cyclobutyl)methanamine (54 mg, 0.280 mmol) and DIPEA (0.15 mL, 0.839 mmol) were dissolved in DMF (2.5 mL). HATU (128 mg, 0.335 mmol) was added, and the reaction mixture stirred at RT for 2 hrs. The solvent was evaporated in vacuo and the residue directly purified by prep-LCMS (2.4 min_pH2 Formic acid, 30-70% MeCN followed by organic wash). Fractions containing desired product were combined, the solvent evaporated in vacuo and the product lyophilised from 1:1 MeCN—H$_2$O to yield N-((1-(3-fluorobenzyl)cyclobutyl)methyl)-1-methyl-5-oxo-4,5-dihydro-1H-1,2,4-triazole-3-carboxamide (22.1 mg, 25%) as a white solid. $^1$H-NMR (400

MHz, DMSO-D6) δ 12.28 (s, 1H), 8.56 (t, J=6.2 Hz, 1H), 7.32 (td, J=8.0, 6.4 Hz, 1H), 7.16 (dd, J=10.1, 1.8 Hz, 1H), 7.11 (d, J=7.8 Hz, 1H), 7.03 (td, J=8.5, 2.4 Hz, 1H), 3.36 (s, 3H), 3.24 (d, J=6.4 Hz, 2H), 2.72 (s, 2H), 1.84-1.60 (m, 6H). QC in pH2=100%, RT 4.46 min, MZ 319.0 [M+H]$^+$; QC in pH9=100%, RT 3.72 min, MZ 319.1 [M+H]$^+$ Example 85: N-((1-(3-Chloro-2-fluorobenzyl)cyclobutyl)methyl)-1-methyl-5-oxo-4,5-dihydro-1H-1,2,4-triazole-3-carboxamide

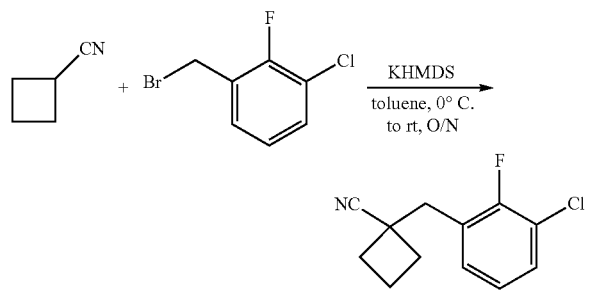

To a flask purged and maintained with nitrogen was added cyclobutanecarbonitrile (0.19 mL, 2.03 mmol) and toluene (8.0 mL), and the reaction mixture cooled to 0° C. Potassium bis(trimethylsilyl)amide solution (1.0M in THF, 3.2 mL, 3.20 mmol) was added dropwise and the reaction mixture stirred at 0° C. for 2 hours. 1-(Bromomethyl)-3-chloro-2-fluorobenzene (0.30 mL, 2.24 mmol) was added portion wise and the reaction mixture stirred at RT o/n. The reaction was quenched with sat. NH$_4$Cl$_{(aq)}$ and extracted with EtOAc (2×). The combined organics were passed through a phase separator cartridge (Biotage) and evaporated in vacuo. The residue was purified by flash chromatography (Biotage, 10 g Sfar column) eluting with isohexane-EtOAc (0-10%) to yield 1-(3-chloro-2-fluorobenzyl)cyclobutane-1-carbonitrile (281 mg, 62%) as a yellow oil. $^1$H-NMR (400 MHz, DMSO-D6) δ 7.54-7.49 (m, 1H), 7.42-7.36 (m, 1H), 7.26-7.21 (m, 1H), 3.20-3.14 (m, 2H), 2.42-2.35 (m, 2H), 2.32-2.25 (m, 2H), 2.13-1.95 (m, 2H).

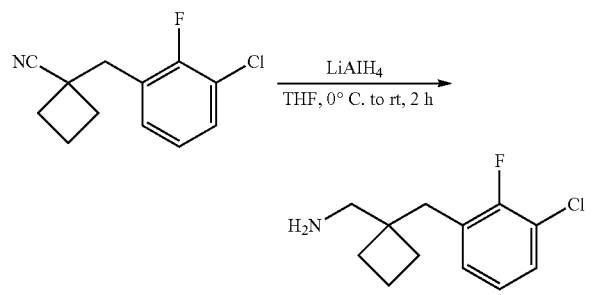

To a flask purged and maintained with nitrogen was added 1-(3-chloro-2-fluorobenzyl)cyclobutane-1-carbonitrile (201 mg, 0.898 mmol) in THF (3.9 mL). The reaction mixture was cooled to 0° C. and LiAlH$_4$ (1.0M in THF, 1.80 mL, 1.80 mmol) added dropwise at 0° C. The reaction mixture was stirred at RT for 2 hrs then cooled to 0° C., quenched with aqueous Rochelle's salt solution (20 mL) and extracted with EtOAc. The organic phase was washed with sat. brine solution and the solvent evaporated in vacuo. The product was purified by catch release cartridge (Biotage SCX-2), washing with MeOH and eluted with 1M NH$_3$-MeOH. Fractions containing desired product were combined and the solvent evaporated in vacuo to yield ((1-(3-chloro-2-fluorobenzyl)cyclobutyl)methanamine (205 mg, 100%) as a yellow oil. LC-MS in pH9; RT 1.82 min, MZ 228.1 [M+H]$^+$

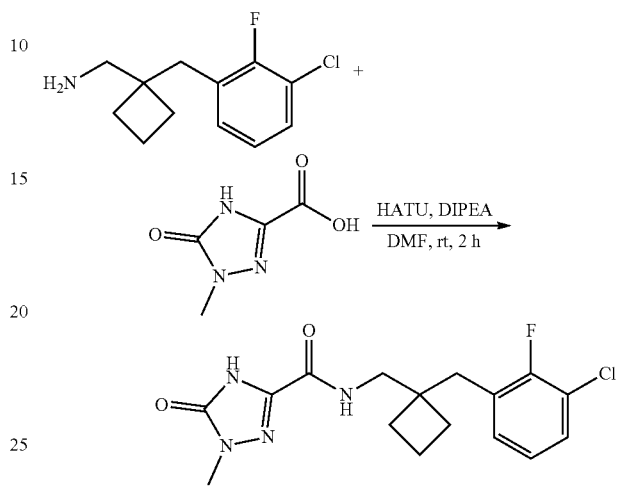

5-Hydroxy-1-methyl-1H-1,2,4-triazole-3-carboxylic acid (40 mg, 0.280 mmol), (1-(3-chloro-2-fluorobenzyl)cyclobutyl)methanamine (64 mg, 0.280 mmol) and DIPEA (0.15 mL, 0.839 mmol) were dissolved in DMF (2.5 mL). HATU (128 mg, 0.335 mmol) was added, and the reaction mixture stirred at RT for 2 hrs. The solvent was evaporated in vacuo and the product directly purified by prep-LCMS (2.7 min_pH2 Formic acid, 40-75% MeCN followed by organic wash). Fractions containing desired product were combined, the solvent evaporated in vacuo and the product lyophilised from 1:1 MeCN—H$_2$O to afford N-((1-(3-chloro-2-fluorobenzyl)cyclobutyl)methyl)-1-methyl-5-oxo-4,5-dihydro-1H-1,2,4-triazole-3-carboxamide (18.1 mg, 18%) as a white solid. $^1$H-NMR (400 MHz, DMSO-D6) δ 8.61 (t, J=6.2 Hz, 1H), 7.47-7.43 (m, 1H), 7.40-7.36 (m, 1H), 7.18 (t, J=7.6 Hz, 1H), 3.36 (s, 3H), 3.29 (d, J=6.4 Hz, 2H), 2.77 (d, J=1.4 Hz, 2H), 1.86-1.54 (m, 6H); QC in pH2=100%, RT 4.73 min, MZ 353.0 [M+H]$^+$; QC in pH9=100%, RT 3.99 min, MZ 353.0 [M+H]$^+$ Example 86: N-((1-(4-Fluoro-2-methylbenzyl)cyclobutyl)methyl)-1-methyl-5-oxo-4,5-dihydro-1H-1,2,4-triazole-3-carboxamide

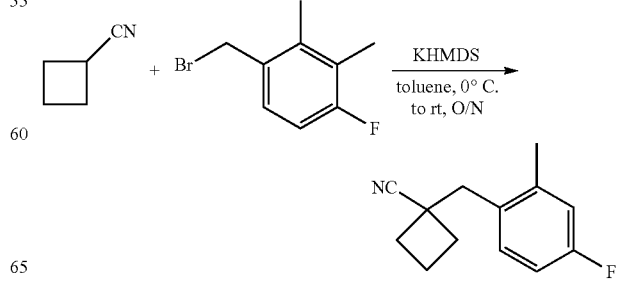

To a flask purged and maintained with nitrogen was added cyclobutanecarbonitrile (0.25 mL, 2.71 mmol) and toluene (5.0 mL), and the reaction mixture cooled to 0° C. Potassium bis(trimethylsilyl)amide solution (1.0M in THF, 4.60 mL, 4.60 mmol) was added dropwise and the reaction mixture stirred at 0° C. for 2 hrs. 1-(Bromomethyl)-4-fluoro-2-methylbenzene (0.34 mL, 2.46 mmol) was added and the reaction mixture stirred at RT for 16 hrs. To the reaction mixture was added sat. $NH_4Cl_{(aq)}$ (40 mL) and extracted with EtOAc (80 mL). The organic phase was passed through a phase separator cartridge (Biotage) and the solvent evaporated in vacuo. The crude product was purified by flash chromatography (Biotage, 10 g Sfar) eluting with iso-hexane-EtOAc (0-20%). Fractions containing desired product were combined and the solvent evaporated in vacuo to yield 1-(4-fluoro-2-methylbenzyl)cyclobutane-1-carbonitrile (280 mg, 56%) as a yellow oil. $^1$H-NMR (400 MHz, DMSO-D6) b 7.24 (dd, J=8.5, 6.2 Hz, 1H), 7.06 (dd, J=10.1, 2.7 Hz, 1H), 6.99 (td, J=8.6, 2.9 Hz, 1H), 3.05 (s, 2H), 2.42-2.35 (m, 2H), 2.33 (s, 3H), 2.30-2.22 (m, 2H), 2.14-1.97 (m, 2H)

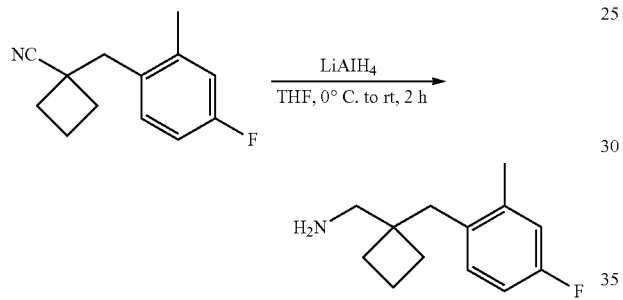

To a flask purged and maintained with nitrogen was added 1-[(4-fluoro-2-methyl-phenyl)methyl]cyclobutanecarbonitrile (140 mg, 0.689 mmol) in THF (4.0 mL). The reaction mixture was cooled to 0° C. and $LiAlH_4$ (1.0M in THF, 1.40 mL, 1.40 mmol) added dropwise at 0° C. The reaction mixture was stirred at RT for 2 hrs. The reaction was cooled to 0° C., quenched with aqueous 0.3M Rochelle's salt solution (10 mL) and extracted with EtOAc (20 mL). The organic phase was washed with sat. brine solution (10 mL), passed through a phase separator cartridge (Biotage) and the solvent evaporated in vacuo to yield crude (1-(4-fluoro-2-methylbenzyl)cyclobutyl)methanamine (121 mg, 78%) as a pale yellow oil. LC-MS in pH9; RT 1.68 min, MZ 208.2 $[M+H]^+$

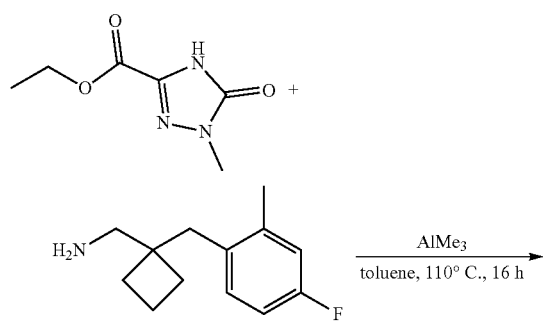

-continued

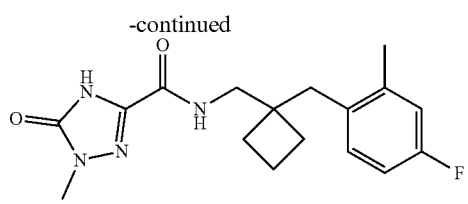

To ethyl 1-methyl-5-oxo-4H-1,2,4-triazole-3-carboxylate ((prepared according to step 2, Intermediate 1, 50 mg, 0.292 mmol) and 1-(4-fluoro-2-methylbenzyl)cyclobutane-1-carbonitrile (73 mg, 0.351 mmol) and toluene (4.0 mL) in a microwave vial was added trimethylaluminium solution (2.0M in hexanes, 0.18 mL, 0.360 mmol) dropwise, and the reaction mixture stirred at 110° C. for 16 hrs. 1N $HCl_{(aq)}$ (20 mL) was added and the aqueous phase extracted with EtOAc (50 mL). The organic phase was passed through a phase separator cartridge (Biotage) and the solvent evaporated in vacuo. The crude product was directly purified by prep-LCMS (2.1 min_pH9 Ammonium Bicarb, 20-60% MeCN followed by organic wash). Fractions containing desired product were combined, the solvent evaporated in vacuo and the product lyophilised from 1:1 MeCN—$H_2O$ to yield N-((1-(4-fluoro-2-methylbenzyl)cyclobutyl)methyl)-1-methyl-5-oxo-4,5-dihydro-1H-1,2,4-triazole-3-carboxamide (27.1 mg, 28%) as a white solid. $^1$H-NMR (400 MHz, DMSO-D6) δ 11.89 (s, 1H), 8.59 (t, J=6.4 Hz, 1H), 7.20 (dd, J=8.4, 6.3 Hz, 1H), 7.02 (dd, J=10.1, 2.7 Hz, 1H), 6.95 (td, J=8.5, 2.9 Hz, 1H), 3.39 (d, J=6.4 Hz, 2H), 3.35 (s, 3H), 2.63 (d, J=8.2 Hz, 2H), 2.20 (s, 3H), 1.82-1.47 (m, 6H) QC in pH2=99.1%, RT 4.64 min, MZ 331.1 [M–H]$^-$; QC in pH9=99.0%, RT 3.98 min, MZ 331.1 [M–H]$^-$.

Example 87: N-((1-(4-Fluoro-2-(trifluoromethyl)benzyl)cyclobutyl)methyl)-1-methyl-5-oxo-4,5-dihydro-1H-1,2,4-triazole-3-carboxamide

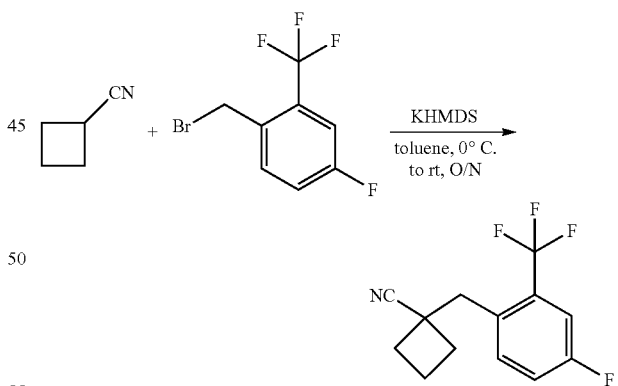

To a flask purged and maintained with nitrogen was added cyclobutanecarbonitrile (0.40 mL, 4.28 mmol) and toluene (10 mL). The reaction mixture cooled to 0° C. and potassium bis(trimethylsilyl)amide solution (1.0M in THF, 7.2 mL, 7.20 mmol) added dropwise. The reaction mixture was stirred at 0° C. for 2 hrs. 1-(Bromomethyl)-4-fluoro-2-(trifluoromethyl)benzene (1.00 g mg, 3.89 mmol) was added and the reaction mixture stirred at RT for 16 hrs. Sat. $NH_4Cl_{(aq)}$ (100 mL) was added and the solution extracted with EtOAc (150 mL). The organic phase was passed through a phase separator cartridge (Biotage) and the solvent evaporated in vacuo. The crude product was purified by flash chromatography (Biotage, 25 g Sfar column) eluting with isohexane-EtOAc (0-10%) to yield 1-(4-fluoro-2-(trifluoromethyl)benzyl)cyclobutane-1-carbonitrile (586 mg, 59%) as an orange oil. ¹H-NMR (400 MHz, DMSO-D6) δ 7.65 (dd, J=9.2, 1.8 Hz, 1H), 7.59-7.57 (m, 2H), 3.24 (s, 2H), 2.48-2.32 (m, 4H), 2.18-1.95 (m, 2H)

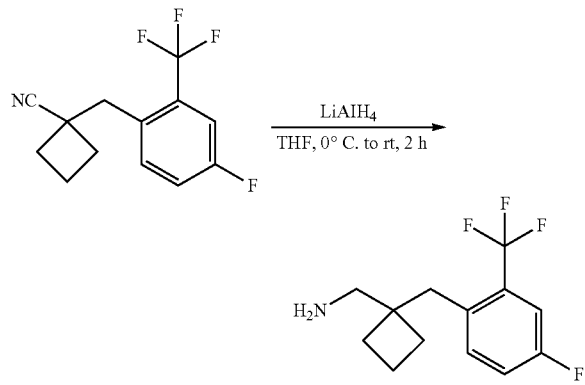

To a flask purged and maintained with nitrogen was added 1-(4-fluoro-2-(trifluoromethyl)benzyl)cyclobutane-1-carbonitrile (587 mg, 2.28 mmol) in THF (10 mL). The reaction mixture was cooled to 0° C. and LiAlH₄ (1.0M in THF, 4.6 mL, 4.60 mmol) added dropwise at 0° C. The reaction mixture was stirred at RT for 2 hrs. The reaction mixture was cooled to 0° C., quenched with 0.3M Rochelle's salt solution (20 mL) and extracted with EtOAc (60 mL). The organic phase was washed with sat. brine solution (50 mL) and the solvent evaporated in vacuo. The crude product was purified by catch release cartridge (Biotage SCX-2 cartridge), washing with MeOH and eluted with 1M NH₃-MeOH. Fractions containing desired product were combined and the solvent evaporated in vacuo to yield (1-(4-fluoro-2-(trifluoromethyl)benzyl)cyclobutyl)methanamine (489 mg, 67%) as a dark orange oil. LC-MS in pH9; RT 1.80 min, MZ_262.2 [M+H]⁺

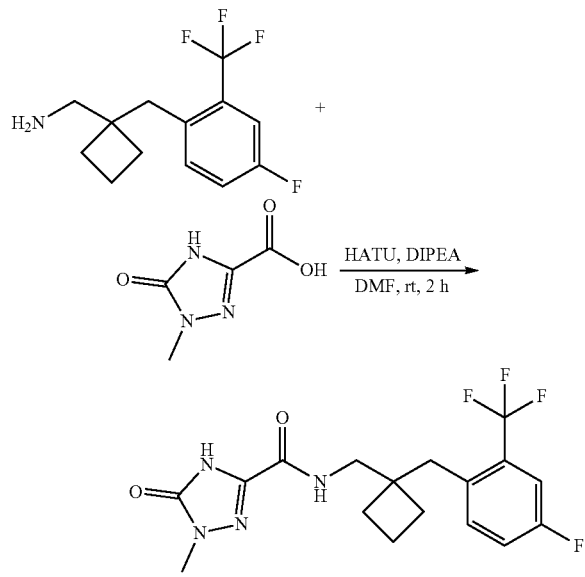

5-Hydroxy-1-methyl-1H-1,2,4-triazole-3-carboxylic acid (50 mg, 0.349 mmol), (1-(4-fluoro-2-(trifluoromethyl)benzyl)cyclobutyl)methanamine (107 mg, 0.349 mmol) and DIPEA (0.18 mL, 1.05 mmol) were dissolved in DMF (2.0 mL). HATU (159 mg, 0.419 mmol) was added, and the reaction mixture stirred at RT for 4 hrs. The solvent was evaporated in vacuo and the crude product directly purified by prep-LCMS (2.4 min_pH2 Formic acid, 30-70% MeCN followed by organic wash). Fractions containing desired product were combined, the solvent evaporated in vacuo and the product lyophilised from 1:1 MeCN—H₂O to yield N-((1-(4-fluoro-2-(trifluoromethyl)benzyl)cyclobutyl)methyl)-1-methyl-5-oxo-4,5-dihydro-1H-1,2,4-triazole-3-carboxamide (35.5 mg, 26%) as a white solid. ¹H-NMR (400 MHz, DMSO-D6) δ 12.25 (s, 1H), 8.66 (t, J=6.4 Hz, 1H), 7.58-7.48 (m, 3H), 3.42 (d, J=6.4 Hz, 2H), 3.36 (s, 3H), 2.81 (s, 2H), 1.86-1.71 (m, 5H), 1.51-1.46 (m, 1H); QC in pH2=100%, RT 4.82 min, MZ 385.1 [M–H]⁻

QC in pH9=100%, RT 4.26 min, MZ 385.1 [M–H]⁻

Example 88: N-((1-Benzylcyclobutyl)methyl)-5-oxo-4,5-dihydro-1,2,4-oxadiazole-3-carboxamide

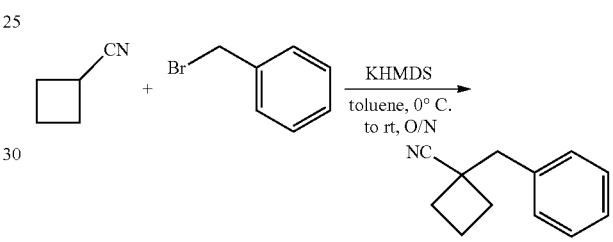

To a flask purged and maintained with nitrogen was added cyclobutariecarbonitrile (0.60 mL, 6.43 mmol) and toluene (10 mL), and the reaction mixture cooled to 0° C. Potassium bis(trimethylsilyl)amide solution (1.0M in THF, 11.0 mL, 11.0 mmol) was added dropwise and the reaction mixture stirred at 0° C. for 2 hrs. Benzyl bromide (0.70 mL, 5.85 mmol) was added and the reaction mixture stirred at RT for 16 hrs. Sat. NH₄Cl₍ₐq₎ (50 mL) was added and the solution extracted with EtOAc (80 mL). The organic phase was passed through a phase separator cartridge (Biotage) and the filtrate evaporated in vacuo. The crude product was purified by flash chromatography (Biotage, 10 g Sfar column) eluting with isohexane-EtOAc (0-10%) to yield 1-benzylcyclobutane-1-carbonitrile (687 mg, 69%) as a pale-yellow oil. ¹H-NMR (400 MHz, DMSO-D6) δ 7.37-7.25 (m, 5H), 3.03 (s, 2H), 2.37-2.22 (m, 4H), 2.10-2.00 (m, 2H).

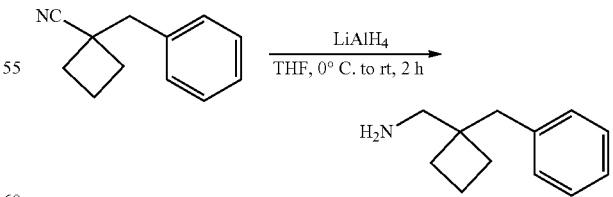

To a flask purged and maintained with nitrogen was added 1-benzylcyclobutane-1-carbonitrile (343 mg, 2.00 mmol) in THF (7.0 mL). The reaction mixture was cooled to 0° C. and LiAlH₄ (1.0M in THF, 4.0 mL, 4.00 mmol) added dropwise at 0° C. The reaction mixture was stirred at RT for 2 hrs. The reaction mixture was cooled to 0° C., quenched with aqueous Rochelle's salt solution (20 mL) and extracted with EtOAc. The organic phase was washed with sat. brine solution and the solvent evaporated in vacuo. The crude product was purified by catch release cartridge (Biotage SCX-2) washing with MeOH and eluted with 1M NH₃-MeOH. Fractions containing desired product were combined and the solvent evaporated in vacuo to yield (1-benzylcyclobutyl)methanamine (238 mg, 68%) as a yellow oil. LC-MS in pH9; RT 1.54 min, MZ 176.1 [M+H]⁺

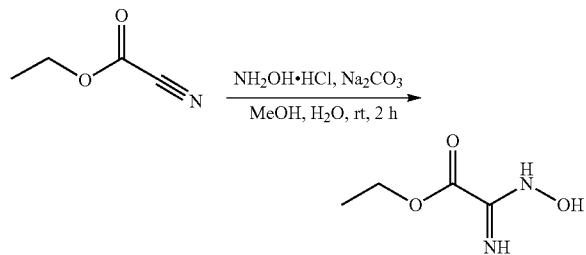

To ethyl cyanoformate (0.93 mL, 10.1 mmol) in methanol (11 mL) and water (11 mL) was added hydroxylamine hydrochloride (1.05 g, 15.1 mmol) and sodium carbonate (1.07 g mg, 10.1 mmol), and the reaction mixture stirred at RT for 2 hrs. The organic solvent was removed in vacuo and the aqueous extracted with DCM (8×50 mL). The combined organics were passed through a phase separator cartridge (Biotage) and the solvent evaporated in vacuo to yield ethyl 2-(hydroxyamino)-2-iminoacetate (333 mg, 25%) as a white solid. LC-MS in pH2; RT 0.55 min, MZ 133.1 [M+H]⁺

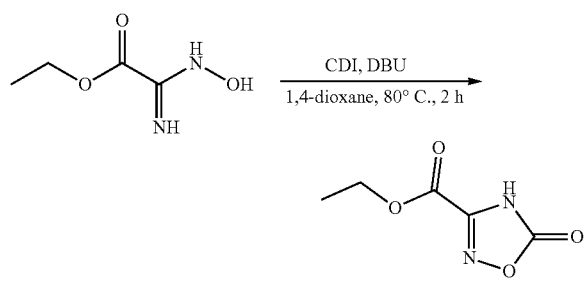

Ethyl 2-(hydroxyamino)-2-iminoacetate (2.54 g, 19.2 mmol) was dissolved in 1,4-dioxane (40 mL). CDI (3.74 g, 23.1 mmol) and DBU (3.50 mL, 23.1 mmol) were added, and the reaction mixture stirred at 80° C. for 2 hrs. The reaction mixture was diluted with 1N HCl$_{(aq)}$ (50 mL) and extracted with EtOAc (250 mL). The organic phase was washed with sat. brine solution (100 mL), passed through a phase separator cartridge (Biotage) and the solvent evaporated in vacuo to yield ethyl 5-oxo-4,5-dihydro-1,2,4-oxadiazole-3-carboxylate (2.54 g, 79%) as a yellow oil. LC-MS in pH2; RT 1.04 min, MZ 157.1 [M−H]⁻

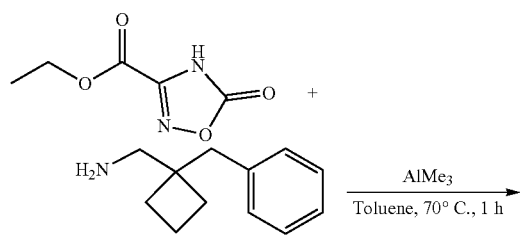

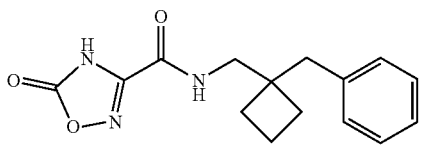

Ethyl 5-oxo-4,5-dihydro-1,2,4-oxadiazole-3-carboxylate (98 mg, 0.620 mmol) and (1-benzylcyclobutyl)methanamine (119 mg, 0.682 mmol) were dissolved in toluene (4.0 mL). Trimethylaluminium solution (2.0M in hexanes, 0.18 mL, 0.360 mmol) was added dropwise and the reaction mixture stirred at 70° C. for 1 hr. To the reaction mixture was added aqueous 0.1N HCl$_{(aq)}$ (2 mL) and extracted with EtOAc (10 mL). The organic phase was passed through a celite cartridge (Biotage) and the solvent evaporated in vacuo. The crude product was purified by prep-LCMS (2.4 min_pH2 Formic acid MeCN followed by organic wash). Fractions containing desired product were combined and the solvent evaporated in vacuo. The product was lyophilised from 1:1 MeCN—H₂O to yield N-((1-benzylcyclobutyl)methyl)-5-oxo-4,5-dihydro-1,2,4-oxadiazole-3-carboxamide (56.4 mg, 32%) as an off-white solid. ¹H-NMR (400 MHz, DMSO-D6) δ 13.05-13.24 (1H), 8.99-9.07 (1H), 7.17-7.32 (5H), 3.18-3.27 (2H), 2.69-2.74 (2H), 1.56-1.87 (6H). QC in pH2=100%, RT 4.84 min, MZ 286.1 [M−H]⁻; QC in pH9=100%, RT 3.50 min, MZ 286.1 [M−H]⁻

Example 89: 1-Methyl-N-((1-(3-methylbenzyl)cyclobutyl)methyl)-5-oxo-4,5-dihydro-1H-1,2,4-triazole-3-carboxamide

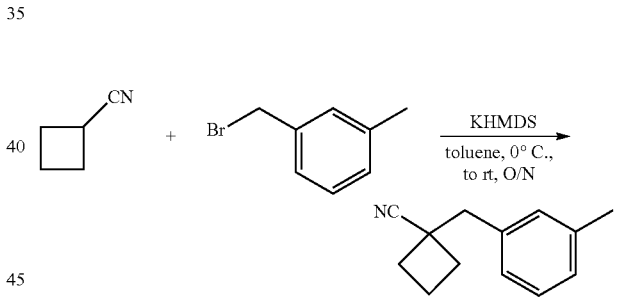

To a flask purged and maintained with nitrogen was added cyclobutanecarbonitrile (0.28 mL, 2.97 mmol) and toluene (7.0 mL) and the reaction mixture cooled to 0° C. Potassium bis(trimethylsilyl)amide solution (1.0M in THF, 5.0 mL, 5.00 mmol) was added dropwise and the reaction mixture stirred at 0° C. for 2 hrs. 1-(Bromomethyl)-3-methylbenzene (0.36 mL, 2.70 mmol) was added and the mixture stirred at RT for 16 hrs. NH₄Cl$_{(aq)}$ (20 mL) was added and the mixture extracted with EtOAc (50 mL). The organic phase was passed through a phase separator cartridge (Biotage) and the solvent evaporated in vacuo. The crude product was purified by flash chromatography (Biotage, 10 g Sfar column) eluting with isohexane-EtOAc (0-10%). Fractions containing product were combined and the solvent evaporated in vacuo to yield 1-(3-methylbenzyl)cyclobutane-1-carbonitrile (331 mg, 66%) as a pale yellow oil. ¹H-NMR (400 MHz, DMSO-D6) δ 7.24-7.19 (m, 1H), 7.10-7.08 (m, 3H), 2.98 (s, 2H), 2.36-2.32 (m, 2H), 2.29 (s, 3H), 2.27-2.20 (m, 2H), 2.08-2.00 (in, 2H).

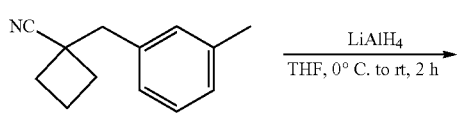

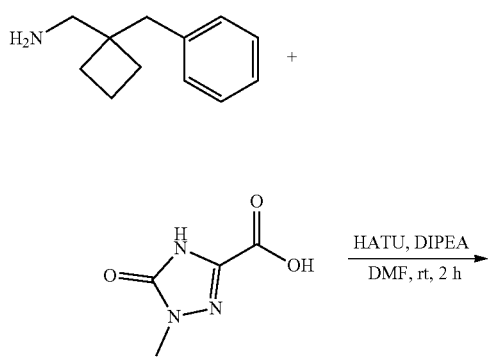

To a flask purged and maintained with nitrogen was added 1-(3-methylbenzyl)cocofane-1-carbonitrile (331 mg, 1.79 mmol) in THF (8.0 mL). The reaction mixture was cooled to 0° C. and LiAlH₄ (1.0M in THF, 3.6 mL, 3.60 mmol) added dropwise at 0° C. The reaction mixture was stirred at RT for 2 hrs. The reaction mixture was cooled to 0° C. and quenched with aqueous Rochelle's salt solution (10 mL) and extracted with EtOAc (50 mL). The organic phase was washed with sat. brine solution (50 mL) and the solvent evaporated in vacuo to yield (1-benzylcyclobutyl)methanamine (313 mg, 85%) as a pale yellow oil. LC-MS in pH9; RT 1.70 min, MZ 190.2 [M+H]⁺

5-Hydroxy-1-methyl-1H-1,2,4-triazole-3-carboxylic acid (40 mg, 0.280 mmol), (1-benzylcyclobutyl)methanamine (58 mg, 0.280 mmol) and DIPEA (0.15 mL, 0.839 mmol) were dissolved in DMF (3.0 mL). HATU (128 mg, 0.335 mmol) was added, and the reaction mixture stirred at RT for 2 hrs. The solvent was evaporated in vacuo and the crude product purified by prep-LCMS (2.4 min_pH2 Formic acid, 30-72% MeCN followed by organic wash). Fractions containing desired product were combined, the solvent evaporated in vacuo and the product lyophilised from 1:1 MeCN—H₂O to yield 1-methyl-N-((1-(3-methylbenzyl)cyclobutyl)methyl)-5-oxo-4,5-dihydro-1H-1,2,4-triazole-3-carboxamide (29 mg, 33%) as a white solid. 1H-NMR (400 MHz, DMSO-D6) δ 12.26 (s, 1H), 8.50 (t, J=6.2 Hz, 1H), 7.16 (t, J=7.3 Hz, 1H), 7.06-7.01 (m, 3H), 3.36 (s, 3H), 3.24 (d, J=6.0 Hz, 2H), 2.65 (s, 2H), 2.28 (s, 3H), 1.85-1.57 (m, 6H). QC in pH2=100%, RT 4.60 min, MZ 315.2 [M+H]⁺ QC in pH9=100%, RT 3.82 min, MZ 315.2 [M+H]⁺

Example 90: N-((1-(4-Chloro-2-fluorobenzyl)cyclobutyl)methyl)-1-methyl-5-oxo-4,5-dihydro-1H-1,2,4-triazole-3-carboxamide

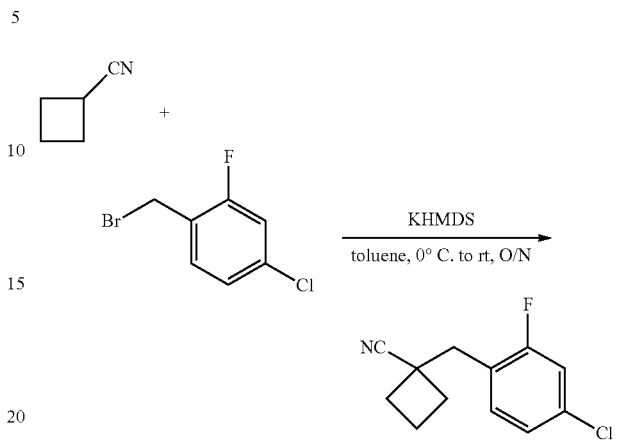

To a flask purged and maintained with nitrogen was added cyclobutanecarbonitrile (0.23 mL, 2.46 mmol) and toluene (6.0 mL), and the reaction mixture cooled to 0° C. Potassium bis(trimethylsilyl)amide solution (1.0M in THF, 4.10 mL, 4.10 mmol) was added dropwise and the reaction mixture stirred at 0° C. for 2 hrs. 1-(Bromomethyl)-4-chloro-2-fluorobenzene (0.30 mL, 2.24 mmol) was added and the reaction mixture stirred at RT for 16 hrs. NH₄Cl₍aq₎ (20 mL) was added and the solution extracted with EtOAc (50 mL). The organic phase was passed through a phase separator cartridge (Biotage) and the solvent evaporated in vacuo. The crude product was purified by flash chromatography (Biotage, 10 g Sfar column) eluting with isohexane-EtOAc (0-10%). Fractions containing desired product were combined and the solvent evaporated in vacuo to yield 1-(4-chloro-2-fluorobenzyl)cyclobutane-1-carbonitrile (347 mg, 69%) as a yellow oil. ¹H-NMR (400 MHz, DMSO-D6) δ 7.47-7.41 (m, 2H), 7.31 (dd, J=8.5, 2.1 Hz, 1H), 3.10 (s, 2H), 2.40-2.23 (m, 4H), 2.12-1.99 (m, 2H).

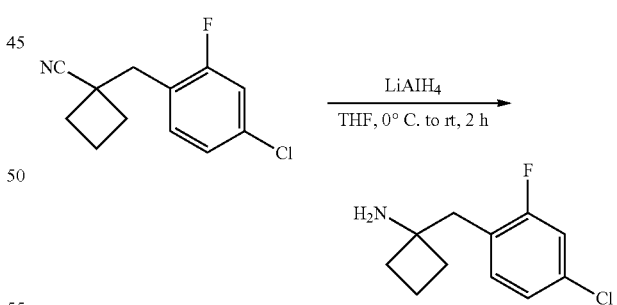

To a flask purged and maintained with nitrogen was added 1-(4-chloro-2-fluorobenzyl)cyclobutane-1-carbonitrile (347 mg, 1.55 mmol) in THF (7.0 mL). The reaction mixture was cooled to 0° C. and LiAlH₄ (1.0M in THF, 3.1 mL, 3.10 mmol) added dropwise at 0° C. The reaction mixture was stirred at RT for 2 hrs. The reaction mixture was cooled to 0° C., quenched with aqueous 0.3M Rochelle's salt solution (5 mL) and extracted with EtOAc (50 mL). The organic phase was washed with sat. brine solution (50 mL), passed through a phase separator cartridge (Biotage) and the solvent evaporated in vacuo. The crude product was purified by catch release cartridge (Biotage SCX-2) washing with MeOH (3×) and eluted with 1M NH₃-MeOH. Fractions containing desired product were combined and the solvent evaporated in vacuo to yield (1-(4-chloro-2-fluorobenzyl) cyclobutyl)methanamine (245 mg, 59%) as a pale yellow oil. LC-MS in pH9; RT 1.79 min, MZ 228.2 [M+H]⁺

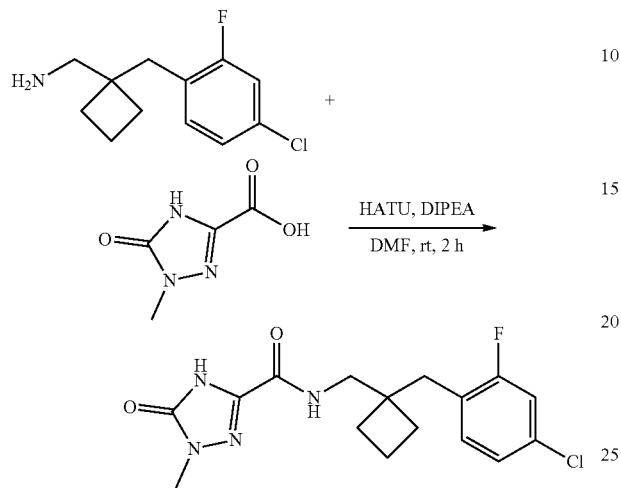

5-Hydroxy-1-methyl-1H-1,2,4-triazole-3-carboxylic acid (40 mg, 0.280 mmol), (1-(4-chloro-2-fluorobenzyl)cyclobutyl)methanamine (75 mg, 0.280 mmol) and DIPEA (0.15 mL, 0.839 mmol) were dissolved in DMF (2.5 mL). HATU (128 mg, 0.335 mmol) was added, and the reaction mixture stirred at RT for 2 hrs. The solvent was evaporated in vacuo and the crude product purified by prep-LCMS (2.4 min_pH2 Formic acid, 30-72% MeCN followed by organic wash). Fractions containing desired product were combined, the solvent evaporated in vacuo and the product lyophilised from 1:1 MeCN—H₂O. The product was then dried in a vacuum oven at 40° C. for 3 hours to yield N-((1-(4-chloro-2-fluorobenzyl)cyclobutyl)methyl)-1-methyl-5-oxo-4,5-dihydro-1H-1,2,4-triazole-3-carboxamide (27 mg, 27%) as a white solid. ¹H-NMR (400 MHz, DMSO-D6) δ 12.28 (s, 1H), 8.58 (t, J=6.2 Hz, 1H), 7.46-7.37 (m, 2H), 7.24 (dd, J=8.5, 2.1 Hz, 1H), 3.36 (s, 3H), 3.28 (d, J=6.4 Hz, 2H), 2.71 (s, 2H), 1.85-1.56 (m, 6H). QC in pH2=100%, RT 4.70 min, MZ 353.2 [M+H]⁺ QC in pH9=100%, RT 3.92 min, MZ 353.2 [M+H]⁺

Example 91: N-((1-(4-Chloro-2-methylbenzyl)cyclobutyl)methyl)-1-methyl-5-oxo-4,5-dihydro-1H-1,2,4-triazole-3-carboxamide

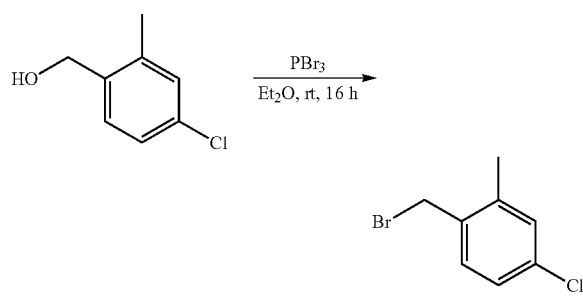

To 4-chloro-2-methylbenzyl alcohol (600 mg, 3.83 mmol) in Et₂O (45 mL) was added phosphorous tribromide (0.40 mL, 4.21 mmol) and the reaction mixture stirred at RT o/n. The reaction mixture was diluted with Et₂O (60 mL) and washed with water (100 mL). The organic phase was passed through a phase separator cartridge (Biotage) and the solvent evaporated in vacuo. The crude product was purified by flash chromatography (Biotage, 25 g Sfar column) eluting with isohexane-EtOAc (0-20%) to yield 1-(bromomethyl)-4-chloro-2-methylbenzene (693 mg, 82%) as a colourless oil. LC-MS in pH2; RT 2.01 min, MZ no ionisation

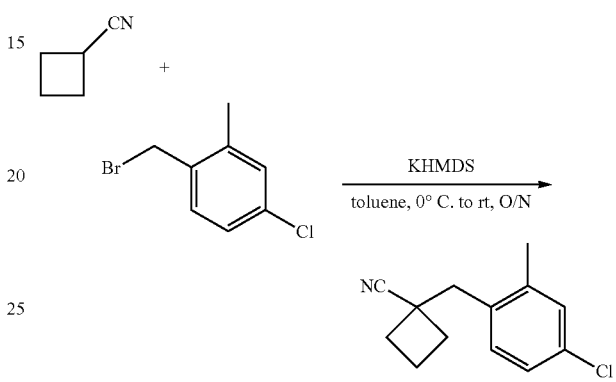

To a flask purged and maintained with nitrogen was added cyclobutanecarbonitrile (0.32 mL, 3.47 mmol) and toluene (8.0 mL), and the reaction mixture cooled to 0° C. Potassium bis(trimethylsilyl)amide solution (1.0M in THF, 5.80 mL, 5.80 mmol) was added dropwise and the reaction mixture stirred at 0° C. for 2 hrs. 1-(Bromomethyl)-4-chloro-2-methylbenzene (693 mg, 3.16 mmol) was added and the mixture stirred at RT for 16 hrs. Sat. NH₄Cl₍aq₎ (20 mL) was added and extracted with EtOAc (50 mL). The organic phase was passed through a phase separator cartridge (Biotage) and the solvent evaporated in vacuo. The crude product was purified by flash chromatography (Biotage, 10 g Sfar column) eluting with isohexane-EtOAc (0-10%) to yield 1-(4-chloro-2-methylbenzyl)cyclobutane-1-carbonitrile (197 mg, 28%) as a yellow oil. ¹H-NMR (400 MHz, DMSO-D6) δ 7.30 (s, 1H), 7.22 (dd, J=7.8, 1.8 Hz, 2H), 3.07 (s, 2H), 2.42-2.35 (m, 2H), 2.33 (s, 3H), 2.30-2.23 (m, 2H), 2.13-1.98 (m, 2H).

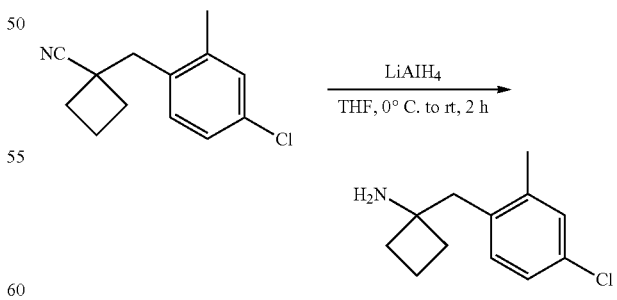

To a flask purged and maintained with nitrogen was added 1-(4-chloro-2-methylbenzyl)cyclobutane-1-carbonitrile (197 mg, 0.897 mmol) in THF (4.0 mL). The reaction mixture was cooled to 0° C. and LiAlH₄ (1.0M in THF, 1.80 mL, 1.80 mmol) added dropwise at 0° C. The reaction mixture was stirred at RT for 2 hrs. The reaction mixture was cooled to 0° C., quenched with aqueous 0.3M Rochelle's salt solution (10 mL) and extracted with EtOAc (50 mL). The organic phase was washed with sat. brine solution (50 mL) and the solvent evaporated in vacuo. The product was purified by catch release cartridge (Biotage SCX-2), washing with MeOH and eluted with 1M NH₃-MeOH. Fractions containing desired product were combined and the solvent evaporated in vacuo to yield (1-(4-chloro-2-methylbenzyl)cyclobutyl)methanamine (128 mg, 56%) as a pale-yellow oil. LC-MS in pH9; RT 1.83 min, MZ 224.2 [M+H]⁺

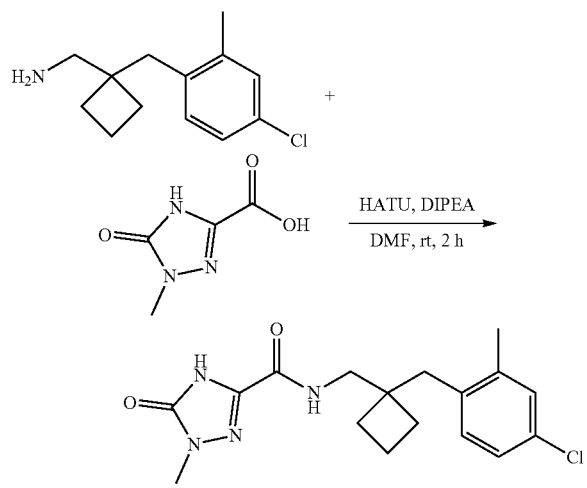

5-Hydroxy-1-methyl-1H-1,2,4-triazole-3-carboxylic acid (40 mg, 0.280 mmol), (1-(4-chloro-2-methylbenzyl)cyclobutyl)methanamine (78 mg, 0.307 mmol) and DIPEA (0.15 mL, 0.839 mmol)I were dissolved in DMF (2.5 mL). HATU (128 mg, 0.335 mmol) was added, and the reaction mixture stirred at RT for 2 hrs. The solvent was evaporated in vacuo and the crude product was purified by prep-LCMS (2.4 min_pH2 Formic acid, 30-72% MeCN followed by organic wash). Fractions containing product were combined, the solvent evaporated in vacuo and the product lyophilised from 1:1 MeCN—H₂O to yield N-((1-(4-chloro-2-methylbenzyl)cyclobutyl)methyl)-1-methyl-5-oxo-4,5-dihydro-1H-1,2,4-triazole-3-carboxamide (26 mg, 27%) as a white solid. ¹H-NMR (400 MHz, DMSO-D6) δ 12.27 (s, 1H), 8.62 (t, J=6.2 Hz, 1H), 7.25 (s, 1H), 7.18 (dd, J=10.1, 8.2 Hz, 2H), 3.39 (d, J=6.4 Hz, 2H), 3.35 (s, 3H), 2.62 (s, 2H), 2.18 (s, 3H), 1.83-1.67 (m, 5H), 1.51-1.47 (m, 1H). QC in pH2=100%, RT 4.95 min, MZ 347.0 [M–H]⁻; QC in pH9=100%, RT 4.26 min, MZ 347.0 [M–H]⁻

Example 92: N-((1-(2,4-Difluorobenzyl)cyclopentyl)methyl)-1-methyl-5-oxo-4,5-dihydro-1H-1,2,4-triazole-3-carboxamide

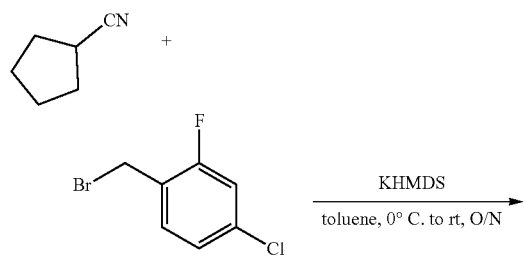

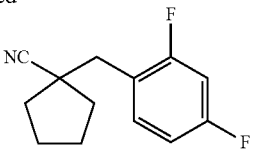

To a flask purged and maintained with nitrogen was added cyclopentanecarbonitrile (0.28 mL, 2.66 mmol) and toluene (7.0 mL). The reaction mixture was cooled to 0° C. Potassium bis(trimethylsilyl)amide solution (1.0M in THF, 4.50 mL, 4.50 mmol) was added dropwise and the reaction mixture stirred at 0° C. for 2 hrs. 2,4-Difluoro benzyl bromide (0.31 mL, 2.42 mmol) was added, and the reaction mixture stirred at RT for 16 hours. Sat. NH₄Cl$_{(aq)}$ (10 mL) was added, and the solution extracted with EtOAc (40 mL). The organic phase was passed through a phase separator cartridge (Biotage) and the solvent evaporated in vacuo. The crude product was purified by flash chromatography (Biotage, 10 g Sfar column) eluting with isohexane-EtOAc (0-10%) to yield 1-(2,4-difluorobenzyl)cyclopentane-1-carbonitrile (323 mg, 60%) as a colourless oil. ¹H-NMR (400 MHz, DMSO-D6) δ 7.47 (td, J=8.6, 6.6 Hz, 1H), 7.28-7.23 (m, 1H), 7.14-7.08 (m, 1H), 2.95 (d, J=0.7 Hz, 2H), 1.97-1.89 (m, 2H), 1.80-1.69 (m, 6H).

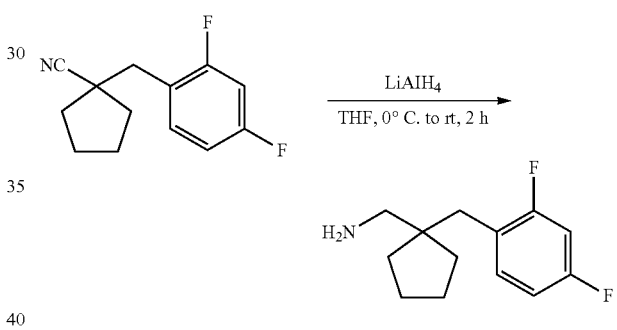

To a flask purged and maintained with nitrogen was added 1-(2,4-difluorobenzyl)cyclopentane-1-carbonitrile (323 mg, 1.46 mmol) in THF (6.0 mL). The reaction mixture was cooled to 0° C. and LiAlH₄ (1.0M in THF, 2.90 mL, 2.90 mmol) added dropwise at 0° C. The reaction mixture was stirred at RT for 2 hrs. The reaction mixture was cooled to 0° C., quenched with aqueous Rochelle's salt solution (5 mL) and extracted with EtOAc (30 mL). The organic phase was washed with sat. brine solution (30 mL), passed through a phase separator cartridge (Biotage) and the filtrate evaporated in vacuo. The crude product was purified by catch release cartridge (Biotage SCX-2), washing with MeOH and eluting with 1M NH₃-MeOH. The fractions containing desired product were combined and the solvent evaporated in vacuo to yield (1-(2,4-difluorobenzyl)cyclopentyl)methanamine (203.1 mg, 0.6581 mmol, 45.123%) as a pale-yellow oil.

LC-MS in pH9; RT 1.75 min, MZ 226.2 [M+H]⁺

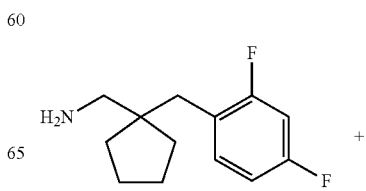

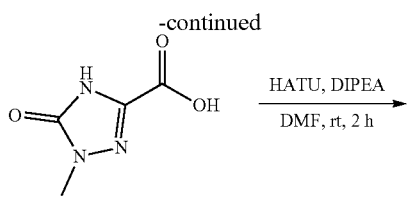

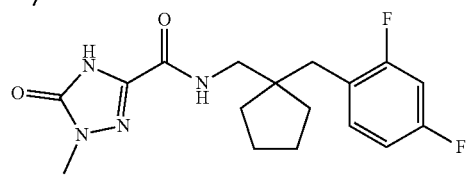

To 5-Hydroxy-1-methyl-1H-1,2,4-triazole-3-carboxylic acid (40 mg, 0.280 mmol), (1-(2,4-difluorobenzyl)cyclopentyl)methanamine (63 mg, 0.280 mmol) and DIPEA (0.15 mL, 0.839 mmol) in DMF (2.5 mL) was added HATU (128 mg, 0.335 mmol) and the reaction mixture stirred at RT for 2 hrs. The solvent was evaporated in vacuo and the crude product directly purified by prep-LCMS (2.4 min_pH2 Formic acid, 30-72% MeCN followed by organic wash). Fractions containing desired product were combined, the solvent evaporated in vacuo and the product lyophilised from 1:1 MeCN—H$_2$O to yield N-((1-(2,4-difluorobenzyl)cyclopentyl)methyl)-1-methyl-5-oxo-4,5-dihydro-1H-1,2,4-triazole-3-carboxamide (33 mg, 34%) as a white solid. $^1$H-NMR (400 MHz, DMSO-D6) δ 12.27 (s, 1H), 8.43 (t, J=6.4 Hz, 1H), 7.41 (td, J=8.7, 6.9 Hz, 1H), 7.21-7.15 (m, 1H), 7.02 (td, J=8.5, 2.3 Hz, 1H), 3.36 (s, 3H), 3.17 (d, J=6.4 Hz, 2H), 2.67-2.65 (m, 2H), 1.59-1.23 (m, 8H). QC in pH2=100%, RT 4.80 min, MZ 351.1 [M+H]$^+$; QC in pH9=100%, RT 4.05 min, MZ 351.1 [M+H]$^+$ Example 93: N-(2-Cyclopropyl-3-(2,4-difluorophenyl)propyl)-1-methyl-5-oxo-4,5-dihydro-1H-1,2,4-triazole-3-carboxamide isohexane-EtOAc (0-20%) to yield 2-cyclopropyl-3-(2,4-difluorophenyl)propanenitrile (116 mg, 23%) as a colourless oil. $^1$H-NMR (400 MHz, DMSO-D6) δ 7.49-7.41 (m, 1H), 7.27-7.21 (m, 1H), 7.12-7.06 (m, 1H), 3.00 (d, J=7.3 Hz, 2H), 2.72-2.67 (m, 1H), 1.11-1.03 (m, 1H), 0.59-0.51 (m, 2H), 0.39-0.23 (m, 2H).

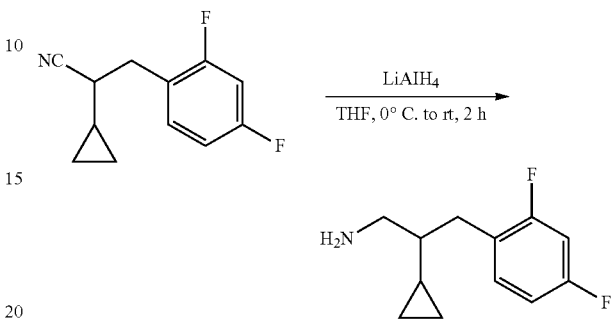

To a flask purged and maintained with nitrogen was added 2-cyclopropyl-3-(2,4-difluorophenyl)propanenitrile (116 mg, 0.561 mmol) in THF (4.0 mL). The reaction mixture was cooled to 0° C. and LiAlH$_4$ (1.0M in THF, 1.10 mL, 1.10 mmol) added dropwise at 0° C. The reaction mixture was stirred at RT for 2 hrs. The reaction mixture was cooled to 0° C., quenched with aqueous Rochelle's salt solution (5 mL) and extracted with EtOAc (30 mL). The organic phase was washed with sat. brine solution (30 mL), passed through a phase separator cartridge (Biotage) and the filtrate evaporated in vacuo. The crude product was purified by catch release cartridge (Biotage SCX-2), washing with MeOH and eluted with 1M NH$_3$-MeOH. Fractions containing desired product were combined and the solvent evaporated in vacuo to yield 2-cyclopropyl-3-(2,4-difluorophenyl)propan-1-amine (53 mg, 24%) as a pale-yellow oil. LC-MS in pH9; RT 1.54 min, MZ 212.2 [M+H]$^+$

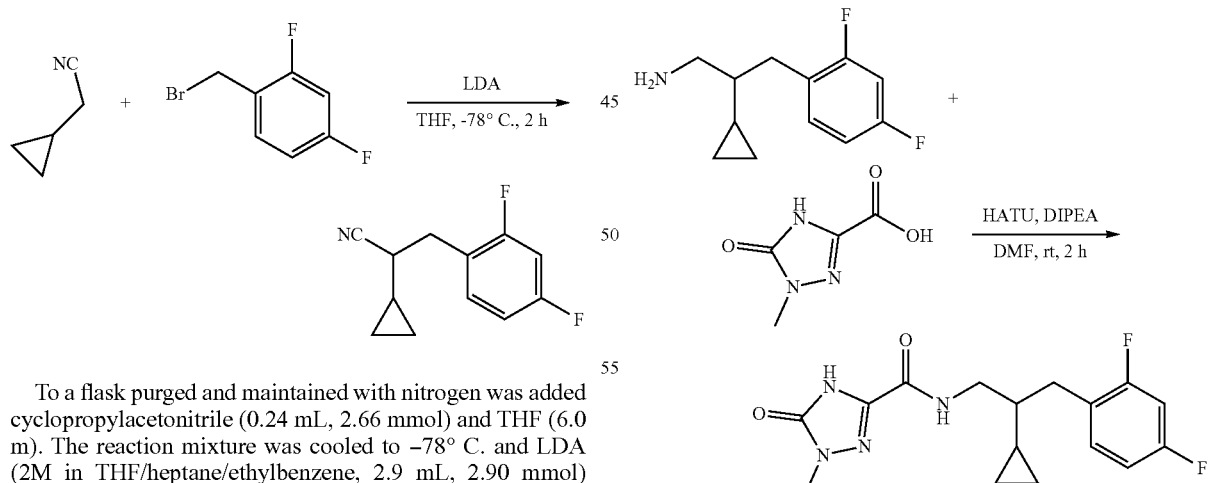

To a flask purged and maintained with nitrogen was added cyclopropylacetonitrile (0.24 mL, 2.66 mmol) and THF (6.0 m). The reaction mixture was cooled to –78° C. and LDA (2M in THF/heptane/ethylbenzene, 2.9 mL, 2.90 mmol) added dropwise. The reaction mixture was stirred at –78° C. for 1 hr. 2,4-Difluoro benzyl bromide (0.31 mL, 2.42 mmol) was added, and the reaction mixture stirred at –78° C. for 1 hr. Water (10 mL) was added and the mixture extracted with EtOAc (2×40 mL). The combined organics were passed through a phase separator cartridge (Biotage) and the filtrate evaporated in vacuo. The crude product was purified by flash chromatography (Biotage, 10 g Sfar column) eluting with To 5-Hydroxy-1-methyl-1H-1,2,4-triazole-3-carboxylic acid (19 mg, 0.133 mmol), 2-cyclopropyl-3-(2,4-difluorophenyl)propan-1-amine (52 mg, 0.133 mmol) and DIPEA (0.069 mL, 0.398 mmol) in DMF (2.5 mL) was added HATU (64 mg, 0.159 mmol), and the reaction mixture was stirred at RT for 2 hrs. The solvent was evaporated in vacuo and the crude product directly purified by prep-LCMS (2.4 min_pH2 Formic acid, 30-72% MeCN followed by organic wash). Fractions containing desired product were combined and the solvent evaporated in vacuo. The product was lyophilised from 1:1 MeCN—H₂O to yield N-(2-cyclopropyl-3-(2,4-difluorophenyl)propyl)-1-methyl-5-oxo-4,5-dihydro-1H-1,2,4-triazole-3-carboxamide (11 mg, 25%) as a white solid. ¹H-NMR (400 MHz, DMSO-D6) δ 12.18 (s, 1H), 8.50 (t, J=6.0 Hz, 1H), 7.32 (q, J=7.9 Hz, 1H), 7.08 (td, J=10.0, 2.7 Hz, 1H), 6.95-6.92 (m, 1H), 3.30 (s, 3H), 3.23 (d, J=6.0 Hz, 1H), 3.18-3.12 (m, 1H), 2.70-2.63 (m, 1H), 2.56 (dd, J=13.7, 7.8 Hz, 1H), 1.09 (dt, J=23.5, 7.0 Hz, 1H), 0.52-0.43 (m, 1H), 0.32-0.26 (m, 1H), 0.21-0.14 (m, 1H), −0.00 (td, J=9.4, 4.7 Hz, 1H), −0.37 (td, J=9.4, 4.9 Hz, 1H); QC in pH2=100%, RT 4.47 min, MZ 335.1 [M−H]⁻; QC in pH9=100%, RT 3.83 min, MZ 335.1 [M−H]⁻

Example 94: N-((1-(2-Fluoro-3-methylbenzyl)cyclobutyl)methyl)-1-methyl-5-oxo-4,5-dihydro-1H-1,2,4-triazole-3-carboxamide

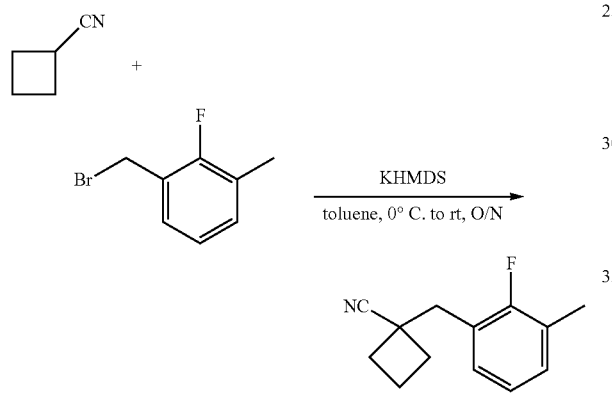

To a flask purged and maintained with nitrogen was added cyclobutanecarbonitrile (0.25 mL, 2.71 mmol) and toluene (5.0 mL), and the reaction mixture cooled to 0° C. Potassium bis(trimethylsilyl)amide solution (1.0M in THF, 4.60 mL, 4.60 mmol) was added dropwise and the reaction mixture stirred at 0° C. for 2 hrs. 2-Fluoro-3-methylbenzyl bromide (500 mg, 2.46 mmol) was added and the reaction mixture stirred at RT for 16 hrs. Sat. NH₄Cl₍ₐq₎ (20 mL) was added and extracted with EtOAc (50 mL). The organic phase was passed through a phase separator cartridge (Biotage) and the solvent evaporated in vacuo. The crude product was purified by flash chromatography (Biotage, 10 g Sfar column) eluting with isohexane-EtOAc (0-10%) to yield 1-(2-fluoro-3-methylbenzyl)cyclobutane-1-carbonitrile (255 mg, 51%) as a pale-yellow oil. ¹H-NMR (400 MHz, DMSO-D6) δ 7.22-7.17 (m, 2H), 7.09-7.03 (m, 1H), 3.08-3.05 (m, 2H), 2.40-2.33 (m, 2H), 2.30-2.21 (m, 5H), 2.12-1.97 (m, 2H)

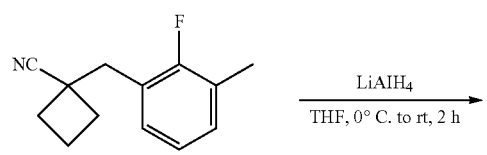

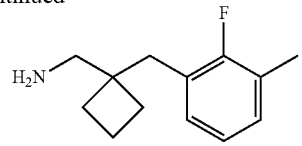

To a flask purged and maintained with nitrogen was added 1-(2-fluoro-3-methylbenzyl)cyclobutane-1-carbonitrile (255 mg, 1.25 mmol) in THF (7.0 mL). The reaction mixture was cooled to 0° C. and LiAlH4 (1.0M in THF, 3.80 mL, 3.80 mmol) was added dropwise at 0° C. The reaction mixture was stirred at RT for 2 hrs, cooled to 0° C., quenched with aqueous 0.3M Rochelle's salt solution (10 mL) and extracted with EtOAc (40 mL). The organic phase was washed with sat. brine solution (30 mL), passed through a phase separator cartridge (Biotage) and the filtrate evaporated in vacuo. The crude product was purified by catch release cartridge (Biotage SCX-2) washing with MeOH and eluting with 1M NH₃-MeOH. Fractions containing desired product were combined and solvent evaporated in vacuo to yield (1-(2-fluoro-3-methylbenzyl)cyclobutyl)methanamine (158 mg, 59%) as a colourless oil. LC-MS in pH9; RT 1.70 min, MZ 208.2 [M+H]⁺

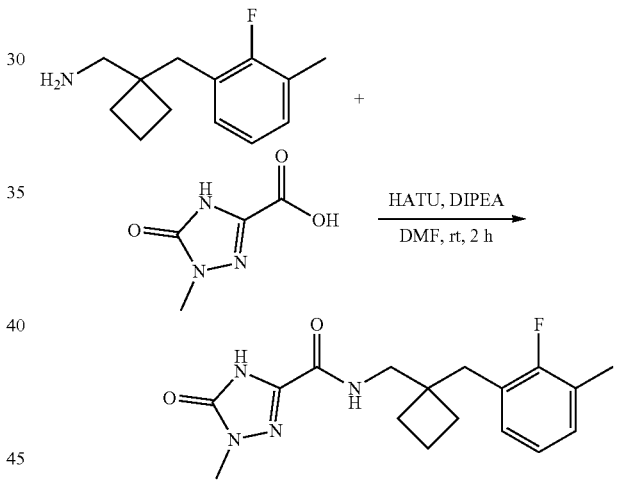

To 5-Hydroxy-1-methyl-1H-1,2,4-triazole-3-carboxylic acid (40 mg, 0.280 mmol), (1-(2-fluoro-3-methylbenzyl)cyclobutyl)methanamine (58 mg, 0.280 mmol) and DIPEA (0.15 mL, 0.839 mmol) in DMF (2.0 mL) was added HATU (128 mg, 0.335 mmol) and the reaction mixture stirred at RT for 2 hrs. The solvent was evaporated in vacuo and the crude product directly purified by prep-LCMS (2.4 min_pH2 Formic acid, 40-75% MeCN followed by organic wash followed by organic wash). Fractions containing desired product were combined, the solvent evaporated in vacuo and the residue lyophilised from 1:1 MeCN—H₂O to yield N-((1-(2-fluoro-3-methylbenzyl)cyclobutyl)methyl)-1-methyl-5-oxo-4,5-dihydro-1H-1,2,4-triazole-3-carboxamide (35 mg, 37%) as a white solid. ¹H-NMR (400 MHz, DMSO-D6) δ 12.20 (s, 1H), 8.53 (t, J=6.2 Hz, 1H), 7.19-7.12 (m, 2H), 7.02 (t, J=7.6 Hz, 1H), 3.36 (s, 3H), 3.28 (d, J=6.4 Hz, 2H), 2.71 (s, 2H), 2.23 (d, J=2.1 Hz, 3H), 1.87-1.55 (m, 6H); QC in pH2=100%, RT 4.76 min, MZ 331.1 [M−H]⁻; QC in pH9=100%, RT 3.99 min, MZ 331.0 [M−H]⁻

Example 95: N-((1-(2,3-Difluorobenzyl)cyclobutyl)methyl)-1-methyl-5-oxo-4,5-dihydro-1H-1,2,4-triazole-3-carboxamide

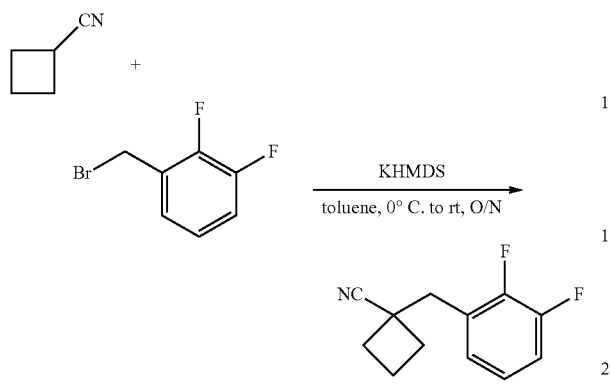

To a flask purged and maintained with nitrogen was added cyclobutanecarbonitrile (0.21 mL, 2.19 mmol) and toluene (6.0 mL), and the reaction mixture cooled to 0° C. Potassium bis(trimethylsilyl)amide solution (1.0M in THF, 3.40 mL, 3.40 mmol) was added dropwise and the reaction mixture stirred at 0° C. for 2 hrs. 2,3-Difluorobenzyl bromide (0.31 mL, 2.41 mmol) was added portion-wise and the reaction mixture stirred at RT o/n. Sat. $NH_4Cl_{(aq)}$ was added and extracted with EtOAc (2×). The combined organics were passed through a phase separator cartridge (Biotage) and the filtrate evaporated in vacuo. The residue was purified by flash chromatography (Biotage, 10 g Sfar column) eluting with isohexane-EtOAc (0-10%) to afford 1-(2,3-difluorobenzyl)cyclobutane-1-carbonitrile (334 mg, 74%) as a yellow oil. $^1$H-NMR (400 MHz, DMSO-D6) δ 7.41-7.31 (m, 1H), 7.26-7.16 (m, 2H), 3.18-3.15 (m, 2H), 2.41-2.23 (m, 4H), 2.12-1.96 (m, 2H).

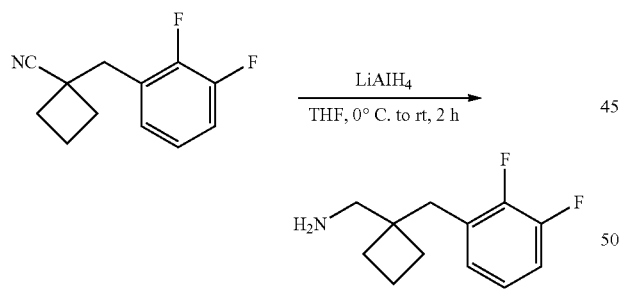

To a flask purged and maintained with nitrogen was added 1-(2,3-difluorobenzyl)cyclobutane-1-carbonitrile (255 mg, 1.25 mmol) in THF (7.0 mL). The reaction mixture was cooled to 0° C. and LiAlH₄ (1.0M in THF, 3.80 mL, 3.80 mmol) was added dropwise at 0° C. The reaction mixture was stirred at RT for 2 hrs. The reaction was cooled to 0° C. and quenched with aqueous Rochelle's salt solution (10 mL) and extracted with EtOAc (40 mL). The organic phase was washed with sat. brine solution (30 mL), passed through a phase separator cartridge (Biotage) and the filtrate evaporated in vacuo. The crude product was purified by catch release cartridge (Biotage SCX-2 cartridge) washing with MeOH and eluting with 1M NH₃-MeOH. Fractions containing desired product were combined and the solvent evaporated in vacuo to yield (1-(2,3-difluorobenzyl)cyclobutyl)methanamine (258 mg, 67%) as a pale-yellow oil. LC-MS in pH9; RT 1.63 min, MZ 212.2 [M+H]⁺

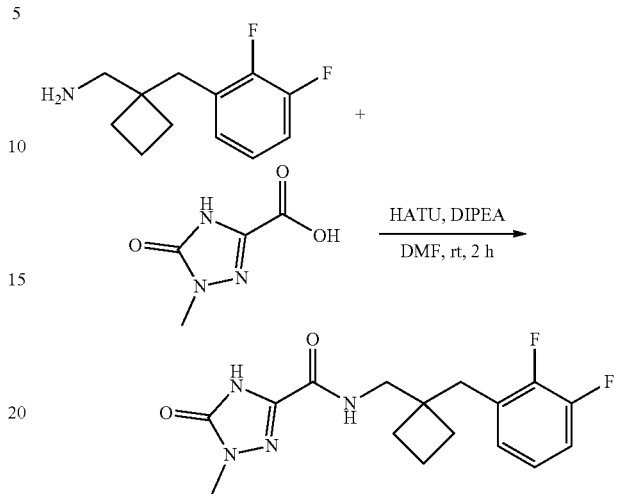

To 5-Hydroxy-1-methyl-1H-1,2,4-triazole-3-carboxylic acid (40 mg, 0.280 mmol), (1-(2,3-difluorobenzyl)cyclobutyl)methanamine (59 mg, 0.280 mmol) and DIPEA (0.15 mL, 0.839 mmol) in DMF (2.0 mL) was added HATU (128 mg, 0.335 mmol) and the reaction mixture stirred at RT for 2 hrs. The solvent was evaporated in vacuo and the crude product directly purified by prep-LCMS (2.4 min_pH2 Formic acid, 40-75% MeCN followed by organic wash followed by organic wash). Fractions containing desired product were combined, the solvent evaporated in vacuo and the residue lyophilised from 1:1 MeCN—H₂O to yield N-((1-(2,3-difluorobenzyl)cyclobutyl)methyl)-1-methyl-5-oxo-4,5-dihydro-1H-1,2,4-triazole-3-carboxamide (33 mg, 36%) as a white solid. $^1$H-NMR (400 MHz, DMSO-D6) δ 12.07-12.40 (1H), 8.54 (t, J=6.2 Hz, 1H), 7.25 (q, J=8.7 Hz, 1H), 7.19-7.11 (m, 2H), 3.32 (s, 3H), 3.25 (s, 2H), 2.73 (s, 2H), 1.85-1.55 (m, 6H); QC in pH2=100%, RT 4.50 min, MZ 335.0 [M−H]⁻; QC in pH9=98.9%, RT 3.77 min, MZ 335.0 [M−H]⁻

Examples 96 and 97: (R)—N-(2-Cyclopropyl-3-(2,4-difluorophenyl)propyl)-1-methyl-5-oxo-4,5-dihydro-1H-1,2,4-triazole-3-carboxamide and (S)—N-(2-cyclopropyl-3-(2,4-difluorophenyl)propyl)-1-methyl-5-oxo-4,5-dihydro-1H-1,2,4-triazole-3-carboxamide

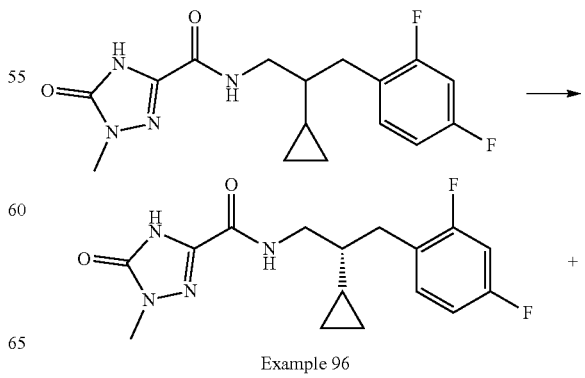

Example 96

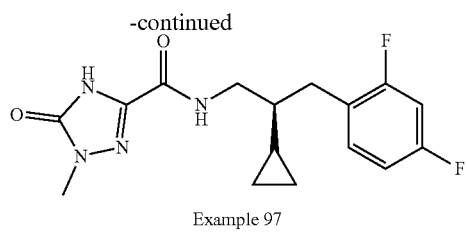

Example 97

50 mg of racemic compound (prepared according to Example 93) was submitted for chiral separation (Daicel ChiralPak AD, 250 mm×4.6 mm, 5 μm; 50/50 Ethanol/Methanol+0.1% TFA (overall) v/v) to give N-[(2R)-2-cyclopropyl-3-(2,4-difluorophenyl)propyl]-1-methyl-5-oxo-4H-1,2,4-triazole-3-carboxamide (22 mg, 0.0645 mmol) as a white solid and N-[(2S)-2-cyclopropyl-3-(2,4-difluorophenyl)propyl]-1-methyl-5-oxo-4H-1,2,4-triazole-3-carboxamide (22 mg, 0.0645 mmol) as a white solid.

Stereochemistry is inferred. (R)—N-(2-Cyclopropyl-3-(2,4-difluorophenyl)propyl)-1-methyl-5-oxo-4,5-dihydro-1H-1,2,4-triazole-3-carboxamide: $^1$H-NMR (400 MHz, DMSO-D6) δ 12.18 (s, 1H), 8.50 (t, J=6.2 Hz, 1H), 7.32 (q, J=8.1 Hz, 1H), 7.08 (td, J=10.0, 2.6 Hz, 1H), 6.97-6.91 (m, 1H), 3.30 (s, 3H), 3.24 (t, J=6.4 Hz, 1H), 3.18-3.12 (m, 1H), 2.67 (q, J=6.6 Hz, 1H), 2.56 (dd, J=13.5, 7.6 Hz, 1H), 1.14-1.05 (m, 1H), 0.47 (tt, J=12.9, 4.7 Hz, 1H), 0.32-0.26 (m, 1H), 0.21-0.14 (m, 1H), −0.00 (td, J=9.4, 5.0 Hz, 1H), −0.37 (td, J=9.4, 4.9 Hz, 1H); (R)—N-(2-Cyclopropyl-3-(2,4-difluorophenyl)propyl)-1-methyl-5-oxo-4,5-dihydro-1H-1,2,4-triazole-3-carboxamide: QC in pH2=100%, RT 4.48 min, MZ 335.1 [M−H]$^-$; QC in pH9=100%, RT 3.74 min, MZ 335.0 [M−H]$^-$ (S)—N-(2-cyclopropyl-3-(2,4-difluorophenyl)propyl)-1-methyl-5-oxo-4,5-dihydro-1H-1,2,4-triazole-3-carboxamide: $^1$H-NMR (400 MHz, DMSO-D6) δ 12.22 (s, 1H), 8.55 (t, J=6.2 Hz, 1H), 7.36 (q, J=8.1 Hz, 1H), 7.12 (td, J=9.8, 2.7 Hz, 1H), 7.02-6.96 (m, 1H), 3.35 (s, 3H), 3.29 (t, J=6.4 Hz, 1H), 3.23-3.16 (m, 1H), 2.74-2.67 (m, 1H), 2.60 (dd, J=13.7, 7.8 Hz, 1H), 1.18-1.09 (m, 1H), 0.52 (tt, J=13.0, 4.9 Hz, 1H), 0.37-0.30 (m, 1H), 0.25-0.19 (m, 1H), 0.05 (td, J=9.4, 4.9 Hz, 1H), −0.32 (td, J=9.4, 4.9 Hz, 1H); (S)—N-(2-cyclopropyl-3-(2,4-difluorophenyl)propyl)-1-methyl-5-oxo-4,5-dihydro-1H-1,2,4-triazole-3-carboxamide: QC in pH2=100%, RT 4.48 min, MZ 335.1 [M−H]$^-$; QC in pH9=100%, RT 3.74 min, MZ 335.0 [M−H]$^-$ Example 98: (S)—N-(2-(2,4-Difluorobenzyl)butyl)-1-methyl-5-oxo-4,5-dihydro-1H-1,2,4-triazole-3-carboxamide

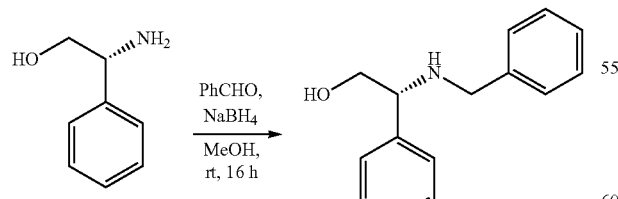

To (R)-2-amino-2-phenylethan-1-ol (2.00 g, 14.6 mmol) in MeOH (50 mL) was added benzaldehyde (1.50 mL, 14.6 mmol) and the reaction mixture stirred at RT o/n. Sodium borohydride (684 mg, 18.1 mmol) was added portion-wise and the reaction mixture stirred at RT for 1 hr. The reaction mixture was diluted with water (100 mL) and extracted with DCM (3×100 mL). The combined organics were washed with sat. brine solution (150 mL), passed through a phase separator cartridge (Biotage) and the filtrate evaporated in vacuo to yield (R)-2-(benzylamino)-2-phenylethan-1-ol (3.04 g, 84%) as a white solid. LC-MS in pH9; RT 1.66 min, MZ 228.3 [M+H]$^+$

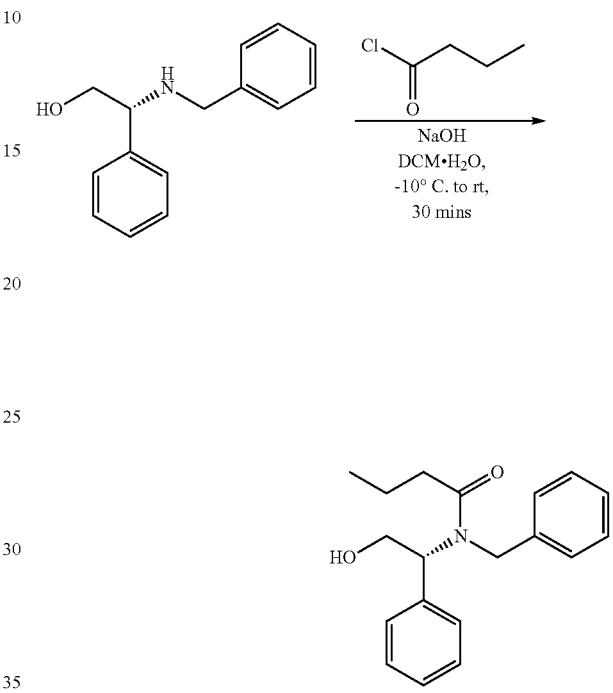

To (R)-2-(benzylamino)-2-phenylethan-1-ol (1.50 g, 6.60 mmol) and sodium hydroxide (554 mg, 13.9 mmol) in 2:1 DCM-H$_2$O (89 mL) at −10° C. was added butyryl chloride (0.86 mL, 8.25 mmol) and the reaction mixture stirred at −10° C. under nitrogen for 15 minutes. The reaction mixture was warmed to RT and stirred at RT for 15 minutes. The reaction mixture was diluted with DCM (80 mL) and water (50 mL), and the layers separated. The aqueous phase was extracted with DCM (100 mL) and the combined organics passed through a phase separator cartridge (Biotage). The filtrate was evaporated in vacuo. The crude product was purified by flash chromatography (Biotage, 50 g Sfar column) eluting with isohexane-EtOAc (0-50%) to yield (R)—N-benzyl-N-(2-hydroxy-1-phenylethyl)butyramide (1.68 g, 86%) as a colourless oil. LC-MS in pH9; RT 1.74 min, MZ 298.1 [M+H]$^+$

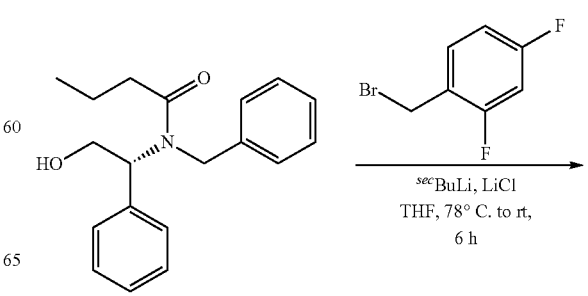

-continued

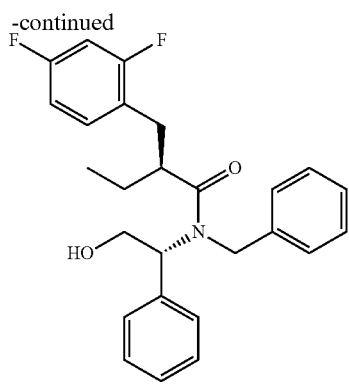

To a flask under nitrogen was added (R)—N-benzyl-N-(2-hydroxy-1-phenylethyl)butyramide (713 mg, 2.40 mmol) and lithium chloride (407 mg, 9.59 mmol) in THF (10 mL) and the reaction mixture cooled to −78° C. Sec-BuLi (1.4M in cyclohexane, 13.0 mL, 18.2 mmol) was added dropwise and the reaction mixture stirred at −78° C. for 30 minutes. 2,4-Difluoro benzyl bromide (0.77 mL, 5.99 mmol) was added dropwise, and the reaction mixture stirred at −78° C. for 1 hr and then allowed to warm to RT over 2 hours. The reaction mixture was quenched with sat. NH$_4$Cl$_{(aq)}$ (10 mL) and extracted with EtOAc (60 mL). The organic phase was passed through a phase separator cartridge (Biotage) and the filtrate evaporated in vacuo. The crude product was purified by flash chromatography (Biotage, 50 g Sfar column) eluting with isohexane-EtOAc (0-50%) to yield (S)—N-benzyl-2-(2,4-difluorobenzyl)-N—((R)-2-hydroxy-1-phenylethyl)butanamide (649 mg, 58%) as a colourless oil. LC-MS in pH9; RT 2.01 min, MZ 424.2 [M+H]$^+$

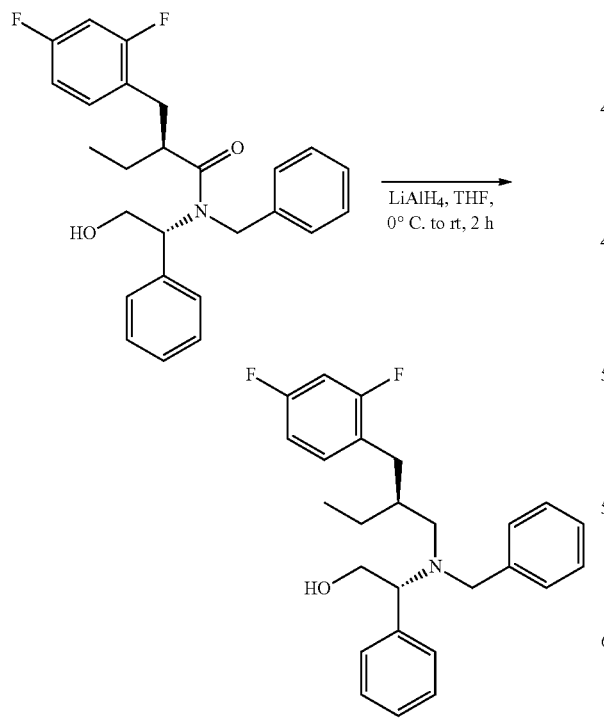

To (S)—N-benzyl-2-(2,4-difluorobenzyl)-N—((R)-2-hydroxy-1-phenylethyl)butanamide (1.07 g, 2.53 mmol) in THF (25 mL) under nitrogen was added LiAlH$_4$ (1.0M in THF, 6.30 mL, 6.30 mmol) at 0° C. The reaction was allowed to warm to RT and stirred at RT for 2 hrs. The reaction mixture was cooled to below 10° C., quenched with aqueous Rochelle's salt (20 mL) and extracted with EtOAc (60 mL). The organic phase was passed through a phase separator cartridge (Biotage) and the filtrate evaporated in vacuo. The crude product was purified by catch release cartridge (Biotage SCX-2) washing with MeOH and eluted with 1M NH$_3$-MeOH. The fractions containing desired product were combined and the solvent evaporated in vacuo to yield (R)-2-(benzyl((S)-2-(2,4-difluorobenzyl)butyl)amino)-2-phenylethan-1-ol (791 mg, 60%) as a colourless oil. LC-MS in pH9; RT 2.31 min, MZ 410.2 [M+H]$^+$

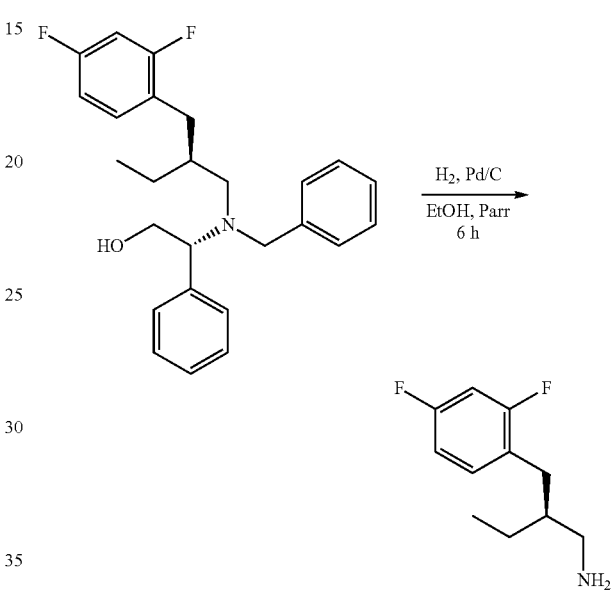

To (R)-2-(benzyl((S)-2-(2,4-difluorobenzyl)butyl)amino)-2-phenylethan-1-ol (358 mg, 0.874 mmol) in EtOH (50 mL) in a 500 mL Parr flask was added a spatula of 10% wt palladium on carbon (spatula, excess). The reaction flask was evacuated and then backfilled with nitrogen (×3) then hydrogen (×1). The reaction mixture was shaken under an atmosphere of hydrogen at 30 psi at RT for 6 hrs. The reaction mixture was filtered through a 10 g celite cartridge (Biotage) and washed with MeOH (100 mL). The filtrate was evaporated in vacuo and the crude product purified by catch release cartridge (Biotage SCX-2) washing with MeOH and eluted with 1M NH$_3$-MeOH. Fractions containing desired product were combined and the solvent evaporated in vacuo to yield (S)-2-(2,4-difluorobenzyl)butan-1-amine (106 mg, 61%) as a pale-yellow oil. LC-MS in pH9; RT 1.52 min, MZ 200.1 [M+H]$^+$

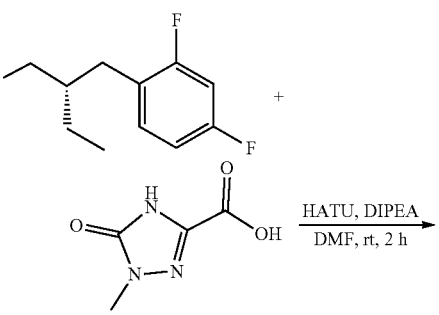

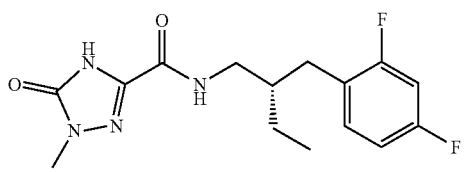

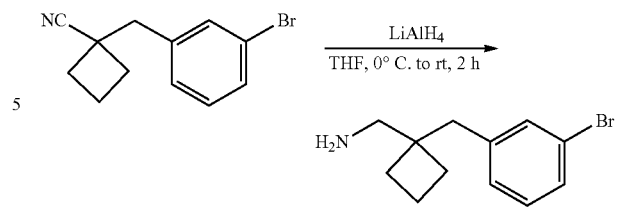

To 5-Hydroxy-1-methyl-1H-1,2,4-triazole-3-carboxylic acid (40 mg, 0.280 mmol), (S)-2-(2,4-difluorobenzyl)butan-1-amine (80 mg, 0.280 mmol) and DIPEA (0.15 mL, 0.839 mmol) in DMF (2.0 mL) was added HATU (128 mg, 0.335 mmol) and the reaction mixture stirred at RT for 2 hrs. The solvent was evaporated in vacuo and the crude product directly purified by prep-LCMS (2.4 min_pH2 Formic acid, 40-75% MeCN followed by organic wash). Fractions containing desired product were combined, the solvent evaporated in vacuo and the residue lyophilised from 1:1 MeCN—H$_2$O to yield (S)—N-(2-(2,4-difluorobenzyl)butyl)-1-methyl-5-oxo-4,5-dihydro-1H-1,2,4-triazole-3-carboxamide (25 mg, 27%) as a white solid. $^1$H-NMR (400 MHz, DMSO-D6) δ 12.18 (s, 1H), 8.56 (s, 1H), 7.39-7.32 (m, 1H), 7.18-7.11 (m, 1H), 7.02-6.98 (m, 1H), 3.33 (d, J=3.7 Hz, 3H), 3.21-3.15 (m, 1H), 3.11-3.08 (m, 1H), 2.56 (d, J=19.7 Hz, 2H), 1.87-1.84 (m, 1H), 1.30-1.12 (m, 2H), 0.84 (qd, J=7.8, 3.2 Hz, 3H); QC in pH2=100%, RT 4.44 min, MZ 323.0 [M−H]$^−$; QC in pH9=100%, RT 3.72 min, MZ 323.0 [M−H]$^−$ To a flask purged and maintained with nitrogen was added 1-(3-bromobenzyl)cyclobutane-1-carbonitrile (255 mg, 1.25 mmol) in THF (7.0 mL). The reaction mixture was cooled to 0° C. and LiAlH$_4$ (1.0M in THF, 3.80 mL, 3.80 mmol) added dropwise at 0° C. The reaction mixture was stirred at RT for 2 hrs. The reaction mixture was cooled to 0° C., quenched with aqueous 0.3M Rochelle's salt solution (20 mL) and extracted with EtOAc (80 mL). The organic phase was washed with sat. brine solution (30 mL), passed through a phase separator cartridge (Biotage) and the filtrate evaporated in vacuo. The crude product was purified by catch release cartridge (Biotage SCX-2), washing with MeOH and eluted with 1M NH$_3$-MeOH. Fractions containing desired product were combined and the solvent evaporated in vacuo. The crude was further purified by Teledyne (flash reverse phase, pH9, 0-70% MeCN/H$_2$O gradient) to yield (1-(3-bromobenzyl)cyclobutyl)methanamine (117 mg, 16%) as a dark yellow oil. LC-MS in pH9; RT 1.75 min, MZ 253.0; 255.0 [M+H]$^+$

Example 99: N-((1-(3-Bromobenzyl)cyclobutyl)methyl)-1-methyl-5-oxo-4,5-dihydro-1H-1,2,4-triazole-3-carboxamide

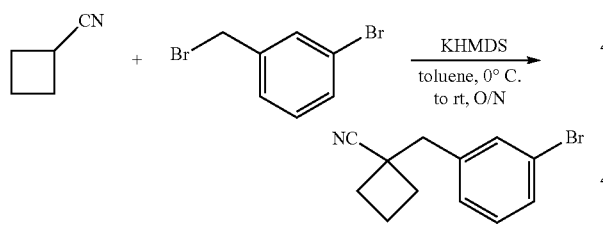

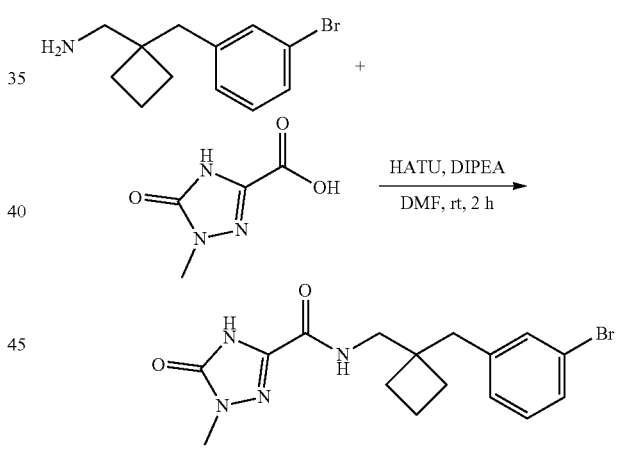

To a flask purged and maintained with nitrogen was added cyclobutanecarbonitrile (0.82 mL, 8.80 mmol) and toluene (20 mL), and the reaction mixture cooled to 0° C. Potassium bis(trimethylsilyl)amide solution (1.0M in THF, 15.0 mL, 15.0 mmol) was added dropwise and the reaction mixture stirred at 0° C. for 2 hrs. 3-Bromobenzyl bromide (2.00 g, 8.00 mmol) was added and the reaction mixture stirred at RT for 16 hrs. Sat. NH$_4$Cl$_{(aq)}$ (40 mL) was added and extracted with EtOAc (100 mL). The organic phase was passed through a phase separator cartridge (Biotage) and the solvent evaporated in vacuo. The crude product was purified by flash chromatography (Biotage, 10 g Sfar column) eluting with isohexane-EtOAc (0-10%) to yield 1-(3-bromobenzyl)cyclobutane-1-carbonitrile (510 mg, 25%) as a yellow oil. $^1$H-NMR (400 MHz, DMSO-D6) δ 7.55-7.53 (m, 1H), 7.50-7.47 (m, 1H), 7.35-7.30 (m, 2H), 3.04 (d, J=8.7 Hz, 2H), 2.38-2.30 (m, 2H), 2.28-2.20 (m, 2H), 2.09-2.01 (m, 2H).

To 5-hydroxy-1-methyl-1H-1,2,4-triazole-3-carboxylic acid (35 mg, 0.245 mmol), (1-(3-bromobenzyl)cyclobutyl)methanamine (96 mg, 0.245 mmol) and DIPEA (0.13 mL, 0.734 mmol) in DMF (2.0 mL) was added HATU (112 mg, 0.294 mmol) and the reaction mixture stirred at RT for 2 hrs. The solvent was evaporated in vacuo and the crude product directly purified by prep-LCMS (2.7 min_pH2 Formic acid, 40-75% MeCN followed by organic wash). Fractions containing desired product were combined, the solvent evaporated in vacuo and the residue lyophilised from 1:1 MeCN—H$_2$O to yield N-((1-(3-bromobenzyl)cyclobutyl)methyl)-1-methyl-5-oxo-4,5-dihydro-1H-1,2,4-triazole-3-carboxamide (18 mg, 20%) as a white solid.

$^1$H-NMR (400 MHz, DMSO-D6) δ 12.19 (s, 1H), 8.58 (t, J=6.2 Hz, 1H), 7.54 (d, J=1.8 Hz, 1H), 7.41 (dt, J=7.5, 1.8 Hz, 1H), 7.30-7.23 (m, 2H), 3.36 (s, 3H), 3.24 (d, J=6.4 Hz,

2H), 2.70 (s, 2H), 1.85-1.61 (m, 6H). QC in pH2=100%, RT 4.78 min, MZ 378.9 [M−H]⁻; QC in pH9=100%, RT 3.98 min, MZ 379.0 [M−H]⁻

Example 100: N-((1-(3-Cyanobenzyl)cyclobutyl)methyl)-1-methyl-5-oxo-4,5-dihydro-1H-1,2,4-triazole-3-carboxamide

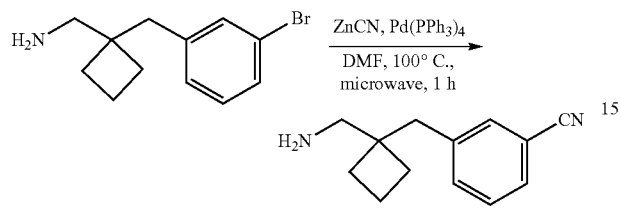

To a microwave vial was added (1-(3-bromobenzyl)cyclobutyl)methanamine (90 mg, 0.354 mmol) in DMF (3.0 mL) and tetrakis(triphenylphosphine)palladium(0) (82 mg, 0.0708 mmol) was added and nitrogen bubbled through the reaction mixture for 10 minutes. Zinc cyanide (50 mg, 0.425 mmol) was added, and the reaction mixture heated in a microwave reactor at 100° C. for 1 hr. Sat. NaHCO$_{3(aq)}$ (10 mL) and EtOAc (20 mL) were added and the layers separated. The aqueous phase was extracted with EtOAc (10 mL) and the combined organics evaporated in vacuo. The crude product was purified by prep-LCMS (2.1 min_pH9 Ammonium Bicarb, 20-60% MeCN followed by organic wash). Fractions containing product were combined, the solvent evaporated in vacuo and the product lyophilised from 1:1 MeCN—H$_2$O to yield 3-((1-(aminomethyl)cyclobutyl)methyl)benzonitrile (24 mg, 33%) as a colourless oil. LC-MS in pH9; RT 1.47 min, MZ 201.1 [M+H]⁺

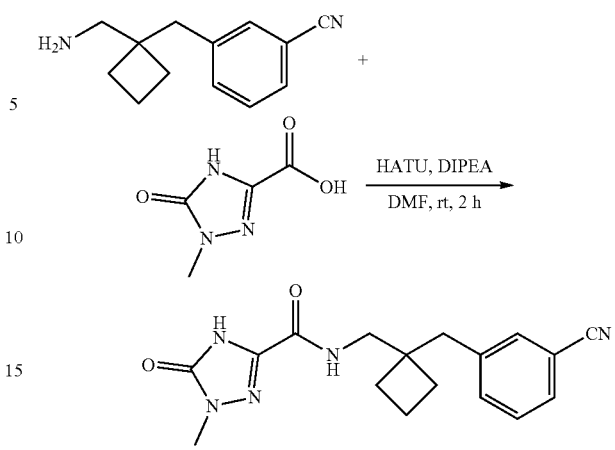

To 5-hydroxy-1-methyl-1H-1,2,4-triazole-3-carboxylic acid (17 mg, 0.118 mmol), 3-((1-(aminomethyl)cyclobutyl)methyl)benzonitrile (24 mg, 0.118 mmol) and DIPEA (62 µL, 0.354 mmol) in DMF (1.5 mL) was added HATU (54 mg, 0.142 mmol) and the reaction mixture stirred at RT for 2 hrs. The crude product was directly purified by prep-LCMS (2.1 min_pH2 Formic acid, 20-60% MeCN followed by organic wash). Fractions containing desired product were combined, the solvent evaporated in vacuo and the product lyophilised from 1:1 MeCN—H$_2$O to yield N-((1-(3-cyanobenzyl)cyclobutyl)methyl)-1-methyl-5-oxo-4,5-dihydro-1H-1,2,4-triazole-3-carboxamide (18 mg, 47%) as a white solid. $^1$H-NMR (400 MHz, DMSO-D6) δ 12.28 (s, 1H), 8.64 (t, J=6.2 Hz, 1H), 7.83 (s, 1H), 7.70-7.64 (2, 2H), 7.50 (t, J=7.8 Hz, 1H), 3.37 (s, 3H), 3.24 (d, J=6.4 Hz, 2H), 2.77 (s, 2H), 1.86-1.61 (in, 6H); QC in pH2=100%, RT 4.09 m, MZ 324.1 [M−H]⁻; QC in pH9=100%, RT 3.34 min, MZ 324.1 [M−H]⁻

The following compounds were prepared utilising analogous methods to those described for Examples 1 to 100:

TABLE 16

| Example No. | Example Name and structure | LCMS; m/z, Rt (pH2) | $^1$H-NMR |
|---|---|---|---|
| Reference Example 101 | 2-methyl-5-(3-methyl-3-phenylpyrrolidine-1-carbonyl)-2,4-dihydro-3H-1,2,4-triazol-3-one | [M + H]⁺ = 287.1; 3.99 min | 1H-NMR (400 MHz, DMSO-D6) δ 8.30 (s, 1H), 7.31 (d, J = 3.7 Hz, 4H), 7.21-7.19 (m, 1H), 4.11-3.88 (m, 2H), 3.79-3.52 (m, 2H), 2.95-2.78 (m, 3H), 2.22-2.03 (m, 2H), 1.29 (m, 3H) |
| Example 102 | N-((1-(4-fluoro-2-(trifluoromethoxy)benzyl)cyclobutyl)methyl)-1-methyl-5-oxo-4,5-dihydro-1H-1,2,4-triazole-3-carboxamide | [M + H]⁺ = 403.3; 4.85 min | 1H-NMR (400 MHz, CHLOROFORM-D) δ 10.28 (s, 1H), 7.29-7.27 (m, 1H), 7.04-6.97 (m, 2H), 6.77 (t, J = 6.0 Hz, 1H), 3.49 (s, 3H), 3.40 (d, J = 6.4 Hz, 2H), 2.82 (s, 2H), 2.04-1.79 (m, 6H) |

TABLE 16-continued

| Example No. | Example Name and structure | LCMS; m/z, Rt (pH2) | ¹H-NMR |
|---|---|---|---|
| Example 103 | N-(2-cyclopentyl-3-(2,4-difluorophenyl)propyl)-1-methyl-5-oxo-4,5-dihydro-1H-1,2,4-triazole-3-carboxamide | [M + H]⁺ = 365.1; 5.07 min | ¹H-NMR (400 MHz, DMSO-D6) δ 12.19 (s, 1H), 8.44 (t, J = 6.0 Hz, 1H), 7.39 (dd, J = 15.6, 8.7 Hz, 1H), 7.13 (td, J = 10.0, 2.4 Hz, 1H), 6.98 (td, J = 8.5, 2.4 Hz, 1H), 3.34 (s, 3H), 3.25-3.08 (m, 2H), 2.63 (dd, J = 14.0, 5.3 Hz, 1H), 2.55-2.51 (m, 1H), 1.94-1.67 (m, 4H), 1.61-1.45 (m, 4H), 1.23 (dd, J = 17.6, 9.4 Hz, 2H) |
| Example 104 | N-((1-(2-fluoro-4-(trifluoromethyl)benzyl)cyclobutyl)methyl)-1-methyl-5-oxo-4,5-dihydro-1H-1,2,4-triazole-3-carboxamide | [M + H]⁺ = 387.2; 4.78 min | 1H-NMR (400 MHz, CHLOROFORM-D) δ 9.79 (s, 1H), 7.39-7.31 (m, 3H), 6.73 (d, J = 6.0 Hz, 1H), 3.49 (s, 3H), 3.44 (d, J = 6.4 Hz, 2H), 2.86 (s, 2H), 2.01-1.79 (m, 6H) |
| Example 105 | N-((1-(2,4-difluorobenzyl)cyclobutyl)methyl)-5-(trifluoromethyl)-4H-1,2,4-triazole-3-carboxamide | [M + H]⁺ = 375.2; 5.36 min | 1H-NMR (400 MHz, DMSO-D6) δ 9.06 (t, J = 6.0 Hz, 1H), 7.44 (td, J = 8.7, 6.9 Hz, 1H), 7.16 (td, J = 9.8, 2.6 Hz, 1H), 7.00 (td, J = 8.4, 2.7 Hz, 1H), 3.32 (d, J = 6.4 Hz, 2H), 2.69 (s, 2H), 1.88-1.81 (m, 2H), 1.74-1.67 (m, 3H), 1.58-1.51 (m, 1H) |
| Example 106 | 1-methyl-N-((1-(4-(methylthio)benzyl)cyclobutyl)methyl)-5-oxo-4,5-dihydro-1H-1,2,4-triazole-3-carboxamide | [M + H]⁺ = 347.0; 4.69 min | 1H-NMR (400 MHz, DMSO-D6) δ 12.26 (s, 1H), 8.51 (t, J = 6.4 Hz, 1H), 7.23-7.17 (m, 4H), 3.37 (s, 3H), 3.24 (d, J = 6.0 Hz, 2H), 2.67 (s, 2H), 2.46 (s, 3H), 1.86-1.59 (m, 6H) |
| Example 107 | N-((1-(2,4-difluorobenzyl)cyclobutyl)methyl)-1,4-dimethyl-5-oxo-4,5-dihydro-1H-1,2,4-triazole-3-carboxamide | [M + H]⁺ = 351.0; 4.92 min | 1H-NMR (400 MHz, DMSO-D6) δ 8.66 (t, J = 6.2 Hz, 1H), 7.46-7.40 (m, 1H), 7.22-7.17 (m, 1H), 7.04 (t, J = 8.5 Hz, 1H), 3.41 (s, 3H), 3.37 (s, 3H), 2.65-2.72 (2H), 1.53-1.90 (6H). |
| Example 108 | N-((1-(2,6-dimethylbenzyl)cyclobutyl)methyl)-1-methyl-5-oxo-4,5-dihydro-1H-1,2,4-triazole-3-carboxamide | [M − H]⁻ = 327.2; 4.82 min | 1H-NMR (400 MHz, DMSO-D6) δ 12.09-12.44 (1H), 8.78 (t, J = 6.4 Hz, 1H), 7.01 (d, J = 2.7 Hz, 3H), 3.56 (d, J = 6.9 Hz, 2H), 3.36 (s, 3H), 2.58 (s, 2H), 2.14 (s, 6H), 1.84-1.57 (m, 5H), 1.31 (dd, J = 19.0, 8.5 Hz, 1H). |

TABLE 16-continued

| Example No. | Example Name and structure | LCMS; m/z, Rt (pH2) | ¹H-NMR |
|---|---|---|---|
| Example 109 | N-((1-(2,6-dimethylbenzyl)cyclobutyl)methyl)-1-methyl-5-oxo-4,5-dihydro-1H-1,2,4-triazole-3-carboxamide<br><br>1-methyl-5-oxo-N-((1-(3-(trifluoromethoxy)benzyl)cyclobutyl)methyl)-4,5-dihydro-1H-1,2,4-triazole-3-carboxamide | [M + H]⁺ = 383.1; 4.93 min | 1H-NMR (400 MHz, DMSO-D6) δ 12.27 (s, 1H), 8.61 (t, J = 6.4 Hz, 1H), 7.42 (t, J = 8.0 Hz, 1H), 7.32 (d, J = 6.9 Hz, 2H), 7.22-7.19 (m, 1H), 3.36 (s, 3H), 3.24 (d, J = 6.4 Hz, 2H), 2.76 (s, 2H), 1.86-1.59 (m, 6H) |
| Example 110 | 1-methyl-5-oxo-N-((1-(3-(trifluoromethyl)benzyl)cyclobutyl)methyl)-4,5-dihydro-1H-1,2,4-triazole-3-carboxamide | [M + H]⁺ = 369.2; 4.70 min | 1H-NMR (400 MHz, DMSO-D6) δ 12.26 (s, 1H), 8.62 (t, J = 6.2 Hz, 1H), 7.68-7.50 (m, 4H), 3.36 (s, 3H), 3.24 (d, J = 6.4 Hz, 2H), 2.81 (s, 2H), 1.83-1.59 (m, 6H) |
| Example 111 | N-((1-(4-ethylbenzyl)cyclobutyl)methyl)-1-methyl-5-oxo-4,5-dihydro-1H-1,2,4-triazole-3-carboxamide | [M + H]⁺ = 329.1; 4.99 min | 1H-NMR (400 MHz, DMSO-D6) δ 12.22 (s, 1H), 8.43 (t, J = 6.2 Hz, 1H), 7.09 (q, J = 8.4 Hz, 4H), 3.33 (d, J = 10.1 Hz, 3H), 3.19 (d, J = 6.4 Hz, 2H), 2.62 (s, 2H), 2.53 (q, J = 7.5 Hz, 2H), 1.81-1.53 (m, 6H), 1.13 (t, J = 7.8 Hz, 3H) |
| Example 112 | 1-methyl-5-oxo-N-(2-(thiazol-4-ylmethyl)butyl)-4,5-dihydro-1H-1,2,4-triazole-3-carboxamide | [M − H]⁻ = 294.0; 3.30 min | 1H-NMR (400 MHz, DMSO-D6) δ 11.94-12.42 (1H), 9.01 (d, J = 1.8 Hz, 1H), 8.57 (t, J = 6.0 Hz, 1H), 7.39 (d, J = 1.6 Hz, 1H), 3.33 (s, 3H), 3.17 (qd, J = 13.4, 6.5 Hz, 2H), 2.72 (qd, J = 14.7, 6.6 Hz, 2H), 2.04-1.98 (m, 1H), 1.26-1.16 (m, 2H), 0.85 (t, J = 7.6 Hz, 3H) |
| Example 113 | 1-methyl-N-(2-((1-methyl-1H-pyrazol-4-yl)methyl)butyl)-5-oxo-4,5-dihydro-1H-1,2,4-triazole-3-carboxamide | [M − H]⁻ = 291.1; 3.17 min | 1H-NMR (400 MHz, DMSO-D6) δ 11.76-12.31 (1H), 8.54 (t, J = 6.0 Hz, 1H), 7.46 (s, 1H), 7.22 (s, 1H), 3.75 (s, 3H), 3.33 (s, 3H), 3.10 (t, J = 6.4 Hz, 2H), 2.34 (qd, J = 14.3, 6.4 Hz, 2H), 1.74-1.68 (m, 1H), 1.19 (qd, J = 13.9, 6.8 Hz, 2H), 0.85 (t, J = 7.3 Hz, 3H) |

TABLE 16-continued

| Example No. | Example Name and structure | LCMS; m/z, Rt (pH2) | ¹H-NMR |
|---|---|---|---|
| Reference Example 114 | 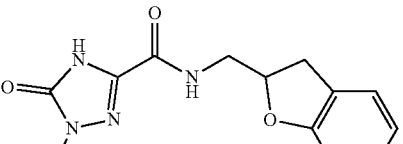<br>N-((2,3-dihydrobenzofuran-2-yl)methyl)-1-methyl-5-oxo-4,5-dihydro-1H-1,2,4-triazole-3-carboxamide | [M + H]⁺ = 275.2; 3.42 min | 1H-NMR (400 MHz, DMSO-D6) δ 12.28 (s, 1H), 8.76 (t, J = 6.0 Hz, 1H), 7.20 (d, J = 8.2 Hz, 1H), 7.09 (t, J = 8.2 Hz, 1H), 6.82 (t, J = 7.6 Hz, 1H), 6.75 (d, J = 7.8 Hz, 1H), 4.95-4.90 (m, 1H), 3.54-3.39 (m, 2H), 3.35 (s, 3H), 3.27-3.17 (m, 1H), 2.96 (dd, J = 16.0, 6.9 Hz, 1H) |
| Reference Example 115 | 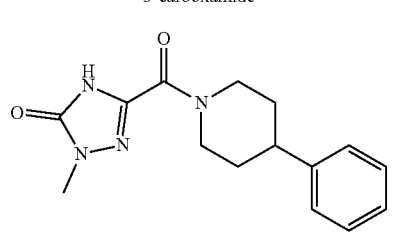<br>2-methyl-5-(4-phenylpiperidine-1-carbonyl)-2,4-dihydro-3H-1,2,4-triazol-3-one | [M − H]⁻ = 287.1; 4.08 min | 1H-NMR (400 MHz, DMSO-D6) δ 7.32-7.18 (m, 5H), 4.91 (d, J = 13.7 Hz, 1H), 4.56 (d, J = 12.8 Hz, 1H), 3.34 (d, J = 4.1 Hz, 3H), 3.22 (t, J = 11.9 Hz, 1H), 2.89-2.81 (m, 2H), 1.86 (t, J = 9.8 Hz, 2H), 1.68-1.49 (m, 2H). |

Example 116: N-((1-(3,5-difluorobenzyl)cyclobutyl)methyl)-1-methyl-5-oxo-4,5-dihydro-1H-1,2,4-triazole-3-carboxamide

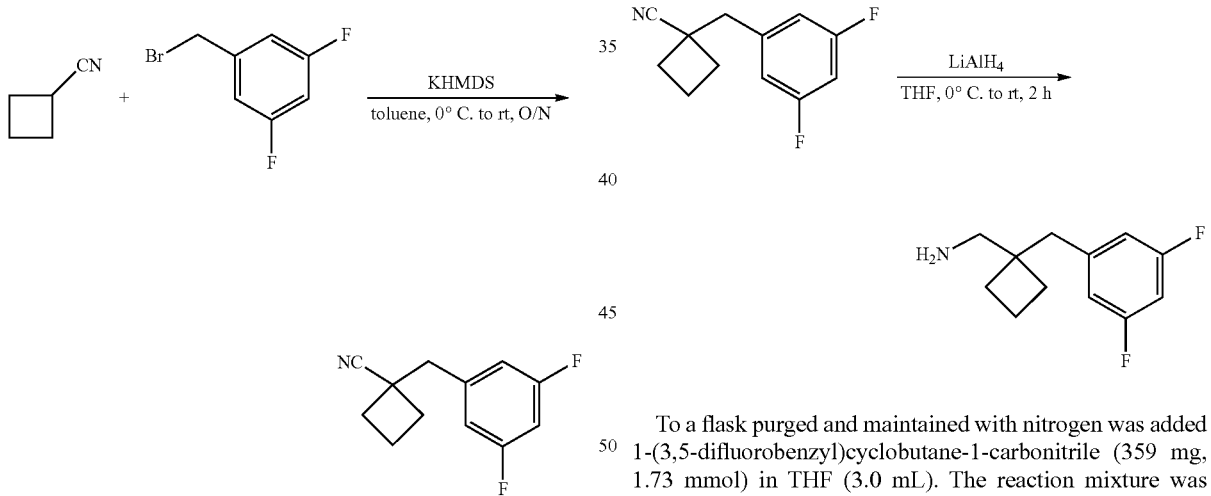

Cyclobutanecarbonitrile (0.25 mL, 2.66 mmol) was dissolved in toluene (6.0 mL) and the reaction mixture cooled to 0° C. Potassium bis(trimethylsilyl)amide solution (1.0M in THF, 4.50 mL, 4.50 mmol) was added dropwise and the reaction mixture stirred at 0° C. for 2 hours. 3,5-Difluorobenzyl bromide (0.31 mL, 2.42 mmol) was added, and the reaction stirred at RT for 16 hours. The reaction mixture was quenched with saturated NH₄Cl$_{(aq)}$ and the layers separated. The aqueous phase was extracted with EtOAc (2×). The combined organics were passed through a phase separator cartridge (Biotage) and the solvent evaporated in vacuo. The crude product was purified by flash column chromatography (Biotage Isolera Four, 10 g Sfar column) eluting with isohexane-EtOAc (0-10%) to yield crude 1-(3,5-difluorobenzyl)cyclobutane-1-carbonitrile (360 mg, 72%) as a pale yellow oil. The crude product was purified no further and directly used in the next step.

To a flask purged and maintained with nitrogen was added 1-(3,5-difluorobenzyl)cyclobutane-1-carbonitrile (359 mg, 1.73 mmol) in THF (3.0 mL). The reaction mixture was cooled to 0° C. and LiAlH₄ (1.0M in THF, 5.20 mL, 5.20 mmol) added dropwise at 0° C. The reaction mixture was stirred at RT for 2 hrs. The reaction mixture was cooled to 0° C., quenched with aqueous Rochelle's salt solution and extracted with EtOAc. The organic phase was washed with sat. brine solution, passed through a phase separator cartridge (Biotage) and the solvent evaporated in vacuo. The crude product was purified by catch release cartridge (Biotage SCX-2), washing with MeOH (3×) and eluting with 1M NH₃-MeOH. Fractions containing product were combined and the solvent was evaporated in vacuo to yield (1-(3,5-difluorobenzyl)cyclobutyl)methanamine (365 mg, 99%) as a colourless oil.

¹H-NMR (400 MHz, CHLOROFORM-D) δ 8.43 (s, 2H), 7.24-6.47 (m, 3H), 3.38-2.90 (m, 4H), 2.25-1.78 (m, 4H)

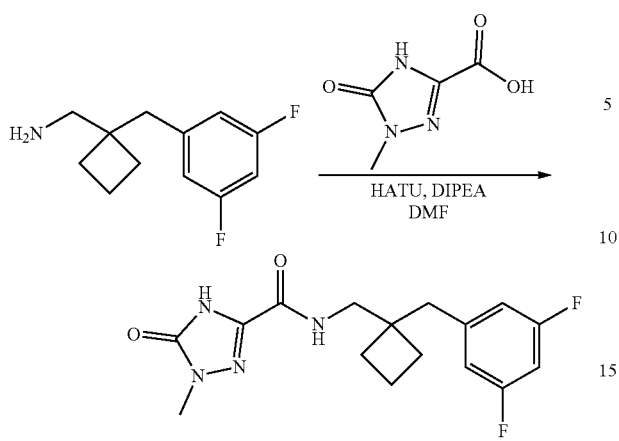

5-Hydroxy-1-methyl-1H-1,2,4-triazole-3-carboxylic acid (50 mg, 0.349 mmol) and (1-(3,5-difluorobenzyl)cyclobutyl)methanamine (100 mg, 0.473 mmol) were dissolved in DMF (1.0 mL). DIPEA (0.250 mL, 1.42 mmol) and HATU (180 mg, 0.473 mmol) were added and the reaction mixture stirred at RT o/n. The crude product directly purified by prep-LCMS. Fractions containing desired product were combined and the solvent evaporated in vacuo. The product was lyophilised from 1:1 MeCN—H$_2$O to afford N-((1-(3,5-difluorobenzyl)cyclobutyl)methyl)-1-methyl-5-oxo-4,5-dihydro-1H-1,2,4-triazole-3-carboxamide (13.8 mg, 9%) as a white solid. $^1$H-NMR (400 MHz, CHLOROFORM-D) δ 9.86 (s, 1H), 6.75-6.66 (m, 3H), 6.52 (t, J=5.7 Hz, 1H), 3.49 (s, 3H), 3.46 (d, J=6.0 Hz, 2H), 2.76 (s, 2H), 2.03-1.81 (m, 6H); QC in pH2=100%, RT 4.53 min, MZ 337.0 [M+H]$^+$; QC in pH9=100%, RT 3.69 min, MZ 337.0 [M+H]$^+$ Method I: HATU Coupling Synthesis of Example 117 (R)—N-(2-cyclopropyl-3-(2,4,6-trifluorophenyl)propyl)-1-methyl-5-oxo-4,5-dihydro-1H-1,2,4-triazole-3-carboxamide

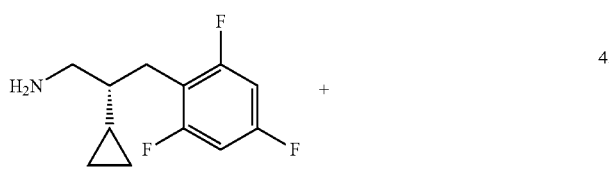

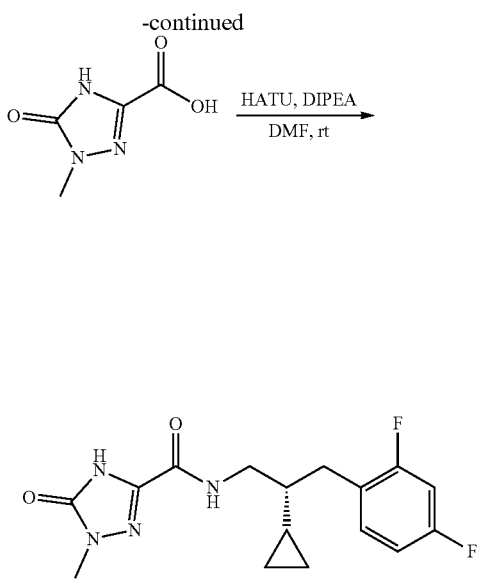

To 1-methyl-5-oxo-4,H-1,2,4-triazole-3-carboxylic acid (Intermediate 1, 48 mg, 0.335 mmol), (R)-2-cyclopropyl-3-(2,4,6-trifluorophenyl)propan-1-amine (Intermediate 2, 128 mg, 0.335 mmol) and N,N-Diisopropylethylamine (175 uL, 1.01 mmol) in N,N-dimethylformamide (1.0 mL) was added HATU (153 mg, 0.403 mmol) and the mixture stirred at room temperature for 16 hours. Reaction mixture was purified by prep HPLC and the fractions containing product were combined, solvent removed in vacuo and the residue lyophilised from 1:1 MeCN:H$_2$O to give (R)—N-(2-cyclopropyl-3-(2,4,6-trifluorophenyl)propyl)-1-methyl-5-oxo-4,5-dihydro-1H-1,2,4-triazole-3-carboxamide (43 mg, 0.120 mmol, 36%) as a white solid. 1H-NMR (400 MHz, DMSO-D6) δ 12.23 (s, 1H), 8.60 (t, J=6.2 Hz, 1H), 7.15-7.07 (m, 2H), 3.34 (s, 3H), 3.33 (s, 1H), 3.23-3.17 (m, 1H), 2.73-2.54 (m, 2H), 1.14-1.05 (m, 1H), 0.57-0.49 (m, 1H), 0.36-0.29 (m, 1H), 0.23-0.16 (m, 1H), 0.01 (td, J=9.4, 4.9 Hz, 1H), −0.43 (td, J=9.5, 4.9 Hz, 1H) LC-MS (ES, m/z): [M+H]$^+$=355.2

The following compounds were prepared using analogous methods to those described for Example 117 (using Method I:)

TABLE 17

| Example No | Example Name and Structure | Prepared using | 1H-NMR | LCMS |
|---|---|---|---|---|
| 118 | (R)-N-(2-cyclopropyl-3-(3,4-difluorophenyl)propyl)-1-methyl-5-thioxo-4,5-dihydro-1H-1,2,4-triazole-3-carboxamide | Intermediate 3 and Intermediate 41 | 1H-NMR (400 MHz, DMSO-D6) δ 7.24 (d, J = 23.8 Hz, 2H), 7.02 (m, 2H), 3.56 (s, 3H), 3.18 (s, 2H), 2.64-2.51 (m, 2H), 1.10 (d, J = 20.1 Hz, 1H), 0.43 (d, J = 17.9 Hz, 1H), 0.30 (d, J = 13.3 Hz, 1H), 0.22 (d, J = 17.9 Hz, 1H), 0.04 (s, 1H), −0.25 (d, J = 14.2 Hz, 1H) | LC-MS (ES, m/z): [M − H]− = 351.1 |

TABLE 17-continued

| Example No | Example Name and Structure | Prepared using | 1H-NMR | LCMS |
|---|---|---|---|---|
| 119 | N-((1-(2,4-difluorobenzyl)cyclobutyl)methyl)-1-methyl-5-thioxo-4,5-dihydro-1H-1,2,4-triazole-3-carboxamide | Intermediate 3 and Intermediate 41 | 1H-NMR (400 MHz, DMSO-D6) δ 8.63 (s, 1H), 7.45 (td, J = 8.7, 6.9 Hz, 1H), 7.20 (td, J = 10.0, 2.6 Hz, 1H), 7.05 (td, J = 8.5, 2.4 Hz, 1H), 3.68 (s, 3H), 3.29 (d, J = 6.4 Hz, 2H), 2.72 (s, 2H), 1.67-1.92 (m, 5H), 1.53-1.66 (m, 1H) | LC-MS(ES, m/z): [M − H]− = 351.1 |
| 120 | N-((2-(2,4-difluorobenzyl)tetrahydrofuran-2-yl)methyl)-1-methyl-5-oxo-4,5-dihydro-1H-1,2,4-triazole-3-carboxamide | Intermediate 1 and Intermediate 30B | 1H-NMR (400 MHz, DMSO-D6) δ 12.29 (s, 1H), 8.25 (t, J = 6.4 Hz, 1H), 7.41 (dd, J = 15.6, 8.7 Hz, 1H), 7.16 (td, J = 9.8, 2.6 Hz, 1H), 7.01 (td, J = 8.5, 2.4 Hz, 1H), 3.71 (q, J = 7.0 Hz, 1H), 3.53 (q, J = 7.2 Hz, 1H), 3.37-3.34 (m, 4H), 3.25 (q, J = 6.6 Hz, 1H), 2.78 (dd, J = 25.4, 14.4 Hz, 2H), 1.86-1.74 (m, 2H), 1.62-1.50 (m, 2H) | LC-MS (ES, m/z): [M + H]+ = 353.2 |
| 121 | N-((4-(2,4-difluorobenzyl)tetrahydro-2H-pyran-4-yl)methyl)-1-methyl-5-oxo-4,5-dihydro-1H-1,2,4-triazole-3-carboxamide | Intermediate 1 and Intermediate 29B | 1H-NMR (400 MHz, CHLOROFORM-D) δ 7.15-7.09 (m, 1H), 6.90-6.82 (m, 3H), 3.81-3.71 (m, 4H), 3.50 (s, 3H), 3.36-3.32 (m, 2H), 2.70 (d, J = 0.9 Hz, 2H), 1.57-1.43 (m, 4H) | LC-MS (ES, m/z): [M + H]+ = 367.0 |
| 122 | N-((1-(2,4-difluorobenzyl)spiro[2.2]pentan-1-yl)methyl)-6-oxo-1,6-dihydropyrazine-2-carboxamide | LHS Intermediate (commercially available) and Intermediate 15B | 1H-NMR (400 MHz, DMSO-D6) δ 12.10 (s, 1H), 8.32-8.55 (m, 1H), 8.21 (m, 2H), 7.36 (dd, J = 15.6, 8.7 Hz, 1H), 7.13 (td, J = 9.8, 2.4 Hz, 1H), 6.99 (td, J = 8.4, 2.3 Hz, 1H), 3.36 (s, 1H), 3.26 (dd, J = 13.7, 6.0 Hz, 1H), 2.81 (d, J = 15.1 Hz, 1H), 2.65 (d, J = 14.2 Hz, 1H), 0.95-0.90 (m, 2H), 0.83-0.79 (m, 2H), 0.74-0.64 (m, 2H) | LC-MS (ES, m/z): [M + H]+ = 346.2 |
| 123 | N-((1-(2,4-difluorobenzyl)spiro[2.2]pentan-1-yl)methyl)-1-methyl-5-oxo-4,5-dihydro-1H-1,2,4-triazole-3-carboxamide | Intermediate 1 and Intermediate 15B | 1H-NMR (400 MHz, DMSO-D6) δ 12.24 (s, 1H), 8.47 (t, J = 5.7 Hz, 1H), 7.33 (dd, J = 15.3, 8.5 Hz, 1H), 7.14 (td, J = 10.0, 2.4 Hz, 1H), 6.99 (td, J = 8.5, 2.3 Hz, 1H), 3.34 (s, 3H), 3.22 (d, J = 6.0 Hz, 2H), 2.81 (d, J = 15.1 Hz, 1H), 2.64 (d, J = 15.1 Hz, 1H), 0.92 (dd, J = 10.8, 4.4 Hz, 2H), 0.79-0.75 (m, 2H), 0.67-0.59 (m, 2H) | LC-MS (ES, m/z): [M + H]+ = 349.1 |
| 124 | (R)-N-(2-cyclopropyl-3-phenylpropyl)-1-methyl-5-oxo-4,5-dihydro-1H-1,2,4-triazole-3-carboxamide | Intermediate 1 and Intermediate 5 | 1H-NMR (400 MHz, DMSO-D6) δ 12.17 (s, 1H), 8.46 (t, J = 6.0 Hz, 1H), 7.23-7.10 (m, 5H), 3.30 (s, 3H), 3.16 (dq, J = 25.0, 6.6 Hz, 2H), 2.60 (dq, J = 30.8, 6.7 Hz, 2H), 1.18-1.11 (m, 1H), 0.47-0.41 (m, 1H), 0.33-0.18 (m, 2H), 0.03 (td, J = 9.0, 4.7 Hz, 1H), −0.25 (td, J = 9.3, 4.9 Hz, 1H) | LC-MS (ES, m/z): [M − H]− 299.2 |

TABLE 17-continued

| Example No | Example Name and Structure | Prepared using | 1H-NMR | LCMS |
|---|---|---|---|---|
| 125 | 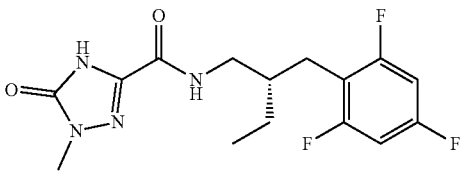<br>(S)-1-methyl-5-oxo-N-(2-(2,4,6-trifluorobenzyl)butyl)-4,5-dihydro-1H-1,2,4-triazole-3-carboxamide | Intermediate 1 and Intermediate 6 | 1H-NMR (400 MHz, DMSO-D6) δ 12.22 (s, 1H), 8.60 (t, J = 6.0 Hz, 1H), 7.17-7.10 (m, 2H), 3.33 (s, 3H), 3.23-3.16 (m, 1H), 3.10-3.04 (m, 1H), 2.53 (s, 2H), 1.82 (td, J = 13.2, 6.7 Hz, 1H), 1.24 (qt, J = 21.4, 7.0 Hz, 2H), 0.86 (t, J = 7.3 Hz, 3H) | LC-MS (ES, m/z): [M − H]− = 341.1 |
| 126 | 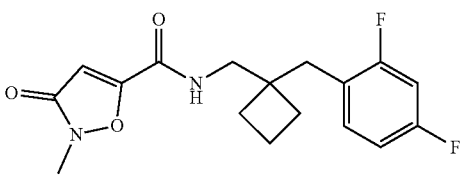<br>N-((1-(2,4-difluorobenzyl)cyclobutyl)methyl)-2-methyl-3-oxo-2,3-dihydroisoxazole-5-carboxamide | LHS Intermediate commercially available and Intermediate 14B | 1H-NMR (400 MHz, DMSO-D6) δ 8.83 (t, J = 6.0 Hz, 1H), 7.42 (td, J = 8.6, 6.7 Hz, 1H), 7.20 (ddd, J = 11.2, 8.5, 1.6 Hz, 1H), 7.07-7.02 (m, 1H), 6.49 (s, 1H), 3.49 (s, 3H), 3.29 (d, J = 6.0 Hz, 2H), 2.71 (s, 2H), 1.87-1.54 (m, 6H). | LC-MS (ES, m/z): [M + H]+ = 337.2 |
| 127 | 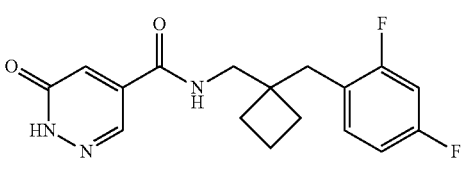<br>N-((1-(2,4-difluorobenzyl)cyclobutyl)methyl)-6-oxo-1,6-dihydropyridazine-4-carboxamide | LHS Intermediate commercially available and Intermediate 14B | 1H-NMR (400 MHz, CHLOROFORM-D) δ 10.69 (s, 1H), 8.12-8.08 (m, 1H), 7.22-7.16 (m, 1H), 7.08-7.04 (m, 1H), 6.88-6.79 (m, 2H), 6.29 (s, 1H), 3.43 (d, J = 6.1 Hz, 2H), 2.78 (s, 2H), 2.03-1.78 (m, 6H) | LC-MS (ES, m/z): [M − H]− = 332.2 |
| 128 | 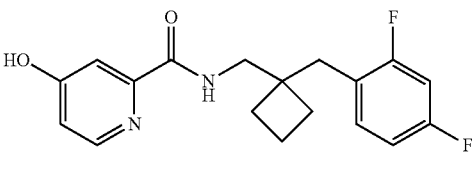<br>N-((1-(2,4-difluorobenzyl)cyclobutyl)methyl)-4-hydroxypicolinamide | LHS Intermediate commercially available and Intermediate 14B | 1H-NMR (400 MHz, DMSO-D6) δ 8.65 (d, J = 6.0 Hz, 1H), 8.31 (d, J = 5.5 Hz, 1H), 7.45 (dd, J = 17.2, 7.1 Hz, 2H), 7.24-7.18 (m, 1H), 7.08-7.03 (m, 1H), 6.92 (d, J = 3.2 Hz, 1H), 3.36 (d, J = 6.4 Hz, 2H), 2.74 (s, 2H), 1.88-1.74 (m, 5H), 1.71-1.61 (m, 1H) | LC-MS (ES, m/z): [M + H]+ = 333.2 |
| 129 | 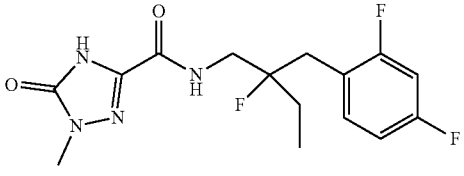<br>N-(2-(2,4-difluorobenzyl)-2-fluorobutyl)-1-methyl-5-oxo-4,5-dihydro-1H-1,2,4-triazole-3-carboxamide | Intermediate 1 and Intermediate 45 | 1H-NMR (400 MHz, DMSO-D6) δ 12.28 (s, 1H), 8.53 (t, J = 6.4 Hz, 1H), 7.35 (dd, J = 15.6, 8.7 Hz, 1H), 7.17 (td, J = 9.8, 2.7 Hz, 1H), 7.01 (td, J = 8.5, 2.3 Hz, 1H), 3.54-3.40 (m, 2H), 3.31 (s, 3H), 2.95-2.89 (m, 2H), 1.56-1.41 (m, 2H), 0.86 (q, J = 7.3 Hz, 3H) | LC-MS (ES, m/z): [M − H]− = 341.1 |
| 130 | 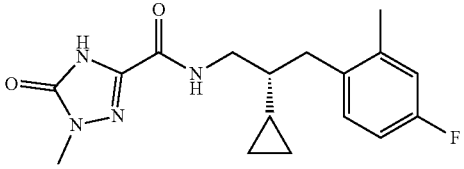<br>N-((1-(2,4-difluorobenzyl)cyclobutyl)methyl)-5-hydroxy-1-methyl-1H-pyrazole-3-carboxamide | LHS Intermediate commercially available and Intermediate 14B | 1H-NMR (400 MHz, CHLOROFORM-D) δ 10.23 (s, 0.3H), 7.21-7.08 (m, 1.5H), 6.86-6.76 (m, 2.3H), 5.90 (s, 0.4H), 3.65 (s, 1H), 3.51 (s, 1H), 3.40-3.37 (m, 3H), 2.77 (s, 2H), 2.01-1.76 (m, 6H) | LC-MS (ES, m/z): [M + H]+ = 336.2 |

TABLE 17-continued

| Example No | Example Name and Structure | Prepared using | 1H-NMR | LCMS |
|---|---|---|---|---|
| 131 | 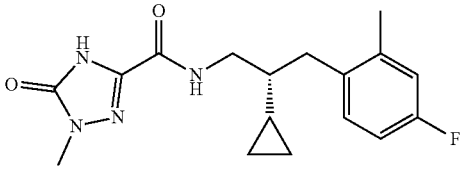<br>(R)-N-(2-cyclopropyl-3-(4-fluoro-2-methylphenyl)propyl)-1-methyl-5-oxo-4,5-dihydro-1H-1,2,4-triazole-3-carboxamide | Intermediate 1 and Intermediate 9 | 1H-NMR (400 MHz, DMSO-D6) δ 12.18 (s, 1H), 8.50 (t, J = 5.7 Hz, 1H), 7.18 (dd, J = 8.5, 6.2 Hz, 1H), 6.96-6.86 (m, 2H), 3.34 (s, 3H), 3.28 (d, J = 6.9 Hz, 1H), 3.21-3.14 (m, 1H), 2.68 (dd, J = 14.2, 6.0 Hz, 1H), 2.58 (t, J = 7.1 Hz, 1H), 2.23 (s, 3H), 1.12 (dd, J = 16.7, 7.6 Hz, 1H), 0.58-0.52 (m, 1H), 0.35-0.29 (m, 1H), 0.24-0.18 (m, 1H), 0.05-0.00 (m, 1H), −0.38 (td, J = 9.4, 4.9 Hz, 1H) | LC-MS (ES, m/z): [M + H]+ = 333.1 |
| 132 | 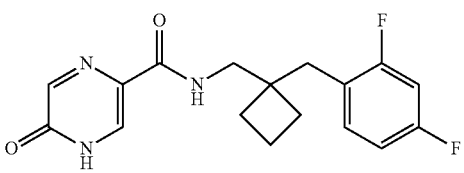<br>N-((1-(2,4-difluorobenzyl)cyclobutyl)methyl)-5-oxo-4,5-dihydropyrazine-2-carboxamide | LHS Intermediate commercially available and Intermediate 14B | 1H-NMR (400 MHz, DMSO-D6) δ 8.21 (t, J = 6.2 Hz, 1H), 7.99-7.96 (m, 2H), 7.46 (td, J = 8.7, 6.7 Hz, 1H), 7.23-7.18 (m, 1H), 7.07-7.02 (m, 1H), 3.34 (s, 2H), 2.71 (s, 2H), 1.91-1.58 (m, 6H) | LC-MS (ES, m/z): [M − H]− = 332.1 |
| 133 | 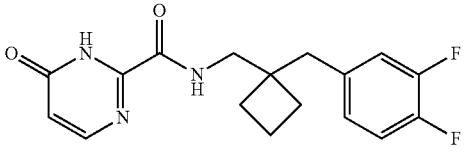<br>N-((1-(3,4-difluorobenzyl)cyclobutyl)methyl)-6-oxo-1,6-dihydropyrimidine-2-carboxamide | LHS Intermediate commercially available and Intermediate 13B | 1H-NMR (400 MHz, DMSO-D6) δ 8.89 (s, 1H), 8.00 (s, 1H), 7.42 (ddd, J = 12.1, 8.0, 2.1 Hz, 1H), 7.37-7.30 (m, 1H), 7.15-7.12 (m, 1H), 6.50 (s, 1H), 3.30 (d, J = 6.9 Hz, 2H), 2.72 (s, 2H), 1.89-1.66 (m, 6H) | LC-MS (ES, m/z): [M − H]− = 332.1 |
| 134 | 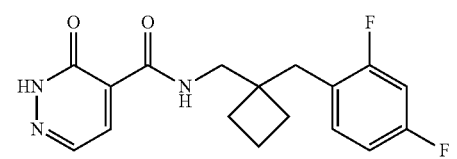 [SMILES: O=C(NCC1(Cc2ccc(F)cc2F)CCC1)c1ccn[nH]c1=O]<br>N-((1-(2,4-difluorobenzyl)cyclobutyl)methyl)-3-oxo-2,3-dihydropyridazine-4-carboxamide | LHS Intermediate commercially available and Intermediate 14B | 1H-NMR (400 MHz, DMSO-D6) δ 9.82 (t, J = 5.7 Hz, 1H), 8.18 (d, J = 4.1 Hz, 1H), 8.08 (d, J = 4.1 Hz, 1H), 7.39 (td, J = 8.7, 6.9 Hz, 1H), 7.21 (td, J = 10.0, 2.3 Hz, 1H), 7.05 (td, J = 8.5, 2.7 Hz, 1H), 3.36 (d, J = 6.0 Hz, 2H), 2.76 (s, 2H), 1.90-1.70 (m, 6H) | LC-MS (ES, m/z): [M − H]− = 332.1 |
| 135 (A) and 135 (B) | 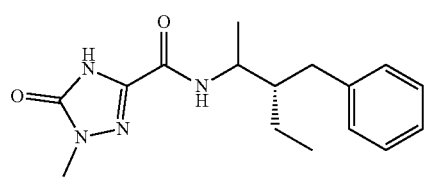<br>N-((3S)-3-benzylpentan-2-yl)-1-methyl-5-oxo-4,5-dihydro-1H-1,2,4-triazole-3-carboxamide<br>Mixture of diastereosomers 74:26<br>N-((2R,3S)-3-benzylpentan-2-yl)-1-methyl-5-oxo-4,5-dihydro-1H-1,2,4-triazole-3-carboxamide and the other is N-((2S,3S)-3-benzylpentan-2-yl)-1-methyl-5-oxo-4,5-dihydro-1H-1,2,4-triazole-3-carboxamide | Intermediate 1 and Intermediate 47 | 1H-NMR (400 MHz, CHLOROFORM-D) δ 10.26 (s, 0.3H), 7.28-7.24 (m, 2H), 7.16 (m, 3H), 6.43 (m, 1H), 4.30-4.19 (m, 1H), 3.47 (s, 0.75H), 3.45 (s, 2.1H), 2.72-2.55 (m, 2H), 1.91-1.78 (m, 1H), 1.47-1.30 (m, 2H), 1.23 (d, J = 6.9 Hz, 0.75H), 1.20 (d, J = 6.9 Hz, 2.2H), 0.98 (t, J = 7.6 Hz, 2.2H), 0.93 (t, J = 7.6 Hz, 0.78H) | LC-MS (ES, m/z): [M + H]+ = 303.2 |

TABLE 17-continued

| Example No | Example Name and Structure | Prepared using | 1H-NMR | LCMS |
|---|---|---|---|---|
| 136 | (R)-N-(2-cyclopropyl-3-(2,4-difluorophenyl)propyl)-3-oxo-2,3-dihydroisoxazole-5-carboxamide | LHS Intermediate commercially available and Intermediate 4 | 1H-NMR (400 MHz, DMSO-D6) δ 11.64 (s, 0.7H), 8.76 (t, J = 6.0 Hz, 0.7H), 7.40-7.31 (m, 1H), 7.21-7.08 (m, 1H), 7.02-6.95 (m, 1H), 6.53 (s, 0.7H), 6.17 (t, J = 5.7 Hz, 0.2H), 3.34 (q, J = 6.6 Hz, 1H), 3.23-2.99 (m, 1H), 2.74-2.61 (m, 1H), 1.16-0.85 (m, 1H), 0.59-0.45 (m, 1H), 0.38-0.32 (m, 1H), 0.27-0.18 (m, 1H), 0.04 (dt, J = 18.8, 4.6 Hz, 1H), −0.31 (qd, J = 9.2, 4.6 Hz, 1H) | LC-MS (ES, m/z): [M − H]− = 321.1 |
| 137 | (R)-N-(2-cyclopropyl-3-(2,4-difluorophenyl)propyl)-2-oxo-2,3-dihydrooxazole-4-carboxamide | LHS Intermediate commercially available and Intermediate 4 | 1H-NMR (400 MHz, DMSO-D6) δ 11.17 (s, 1H), 8.23 (t, J = 5.7 Hz, 1H), 7.64 (s, 1H), 7.36 (dd, J = 15.6, 8.7 Hz, 1H), 7.14 (td, J = 9.8, 2.4 Hz, 1H), 7.00 (td, J = 8.5, 2.1 Hz, 1H), 3.20-3.12 (m, 1H), 2.75-2.61 (m, 2H), 1.10-1.01 (m, 1H), 0.56 (tt, J = 13.1, 4.9 Hz, 1H), 0.40-0.33 (m, 1H), 0.28-0.22 (m, 1H), 0.07 (td, J = 9.3, 4.9 Hz, 1H), −0.29 (td, J = 9.4, 4.9 Hz, 1H) | LC-MS (ES, m/z): [M − H]− = 321.1 |
| 138 | N-((1-(2,4-difluorobenzyl)cyclobutyl)methyl)-5-oxo-4,5-dihydropyrazine-2-carboxamide | LHS Intermediate commercially available and Intermediate 4 | 1H-NMR (400 MHz, DMSO-D6) δ 8.26 (t, J = 6.0 Hz, 1H), 7.96-7.91 (m, 2H), 7.35 (q, J = 8.2 Hz, 1H), 7.12 (td, J = 10.0, 2.6 Hz, 1H), 7.00-6.95 (m, 1H), 3.32-3.24 (m, 2H), 2.73-2.59 (m, 2H), 1.14 (dd, J = 16.7, 7.1 Hz, 1H), 0.53 (dt, J = 13.6, 4.2 Hz, 1H), 0.38-0.32 (m, 1H), 0.26-0.20 (m, 1H), 0.06 (td, J = 9.2, 5.0 Hz, 1H), −0.30 (td, J = 9.3, 4.9 Hz, 1H) | LC-MS (ES, m/z): [M + H]+ = 334.1 |
| 139 | N-((1-(3,4-difluorobenzyl)cyclobutyl)methyl)-6-oxo-1,6-dihydropyrazine-2-carboxamide | LHS Intermediate commercially available and Intermediate 13B | 1H-NMR (400 MHz, DMSO-D6) δ 8.42 (s, 1H), 8.34 (t, J = 6.0 Hz, 1H), 8.20 (m, 1H), 7.40-7.30 (m, 2H), 7.12-7.09 (m, 1H), 3.31 (d, J = 6.4 Hz, 2H), 2.71 (s, 2H), 1.88-1.64 (m, 6H) | LC-MS (ES, m/z): [M − H]− = 332.2 |
| 140 | 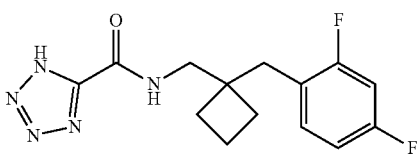<br>N-((1-(2,4-difluorobenzyl)cyclobutyl)methyl)-1H-tetrazole-5-carboxamide | LHS Intermediate commercially available and Intermediate 14B | 1H-NMR (400 MHz, DMSO-D6) δ 8.12 (s, 1H), 7.47 (dd, J = 15.6, 8.7 Hz, 1H), 7.21 (td, J = 9.8, 2.6 Hz, 1H), 7.11-7.03 (m, 1H), 2.73 (s, 2H), 1.86-1.25 (m, 6H) | LC-MS (ES, m/z): [M − H]− = 306.1 |

TABLE 17-continued

| Example No | Example Name and Structure | Prepared using | 1H-NMR | LCMS |
|---|---|---|---|---|
| 141 (A) and 141 (B) | 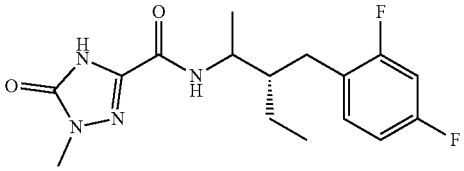<br>N-(3S)-3-(2,4-difluorobenzyl)pentan-2-yl)-1-methyl-5-oxo-4,5-dihydro-1H-1,2,4-triazole-3-carboxamide<br>Mixture of diastereosomers 85:15%<br>One of diastereoisomers is N-((2S,3S)-3-(2,4-difluorobenzyl)pentan-2-yl)-1-methyl-5-oxo-4,5-dihydro-1H-1,2,4-triazole-3-carboxamide and the other is N-((2R,3S)-3-(2,4-difluorobenzyl)pentan-2-yl)-1-methyl-5-oxo-4,5-dihydro-1H-1,2,4-triazole-3-carboxamide | Intermediate 1 and Intermediate 46 | 1H-NMR (400 MHz, CHLOROFORM-D) δ 7.21-7.12 (m, 1H), 6.83-6.74 (m, 2H), 6.46 (m, 1H), 4.27-4.17 (m, 1H), 3.49 (s, 0.5H), 3.48 (s, 2.5H), 2.72-2.50 (m, 2H), 1.88-1.77 (m, 1H), 1.46-1.28 (m, 2H), 1.24 (d, J = 6.9 Hz, 0.5H), 1.21 (d, J = 6.9 Hz, 2.5H), 0.99 (t, J = 7.3 Hz, 2.7H), 0.94 (t, J = 7.3 Hz, 0.3H) | LC-MS (ES, m/z): [M + H]+ = 339.2 |
| 142 | 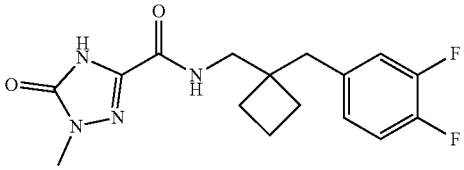 [SMILES: Cn1nc(C(=O)NCC2(Cc3ccc(F)c(F)c3)CCC2)[nH]c1=O]<br>N-((1-(3,4-difluorobenzyl)cyclobutyl)methyl)-1-methyl-5-oxo-4,5-dihydro-1H-1,2,4-triazole-3-carboxamide | Intermediate 1 and Intermediate 13B | 1H-NMR (400 MHz, DMSO-D6) δ 12.29 (s, 1H), 8.62 (t, J = 6.2 Hz, 1H), 7.43 (ddd, J = 12.2, 8.0, 2.0 Hz, 1H), 7.36-7.29 (m, 1H), 7.14-7.11 (m, 1H), 3.36 (s, 3H), 3.23 (d, J = 6.4 Hz, 2H), 2.69 (s, 2H), 1.85-1.60 (m, 6H) | LC-MS (ES, m/z): [M − H]− = 335.1 |
| 143 | 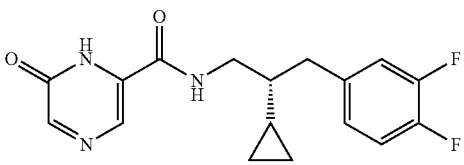<br>(R)-N-(2-cyclopropyl-3-(3,4-difluorophenyl)propyl)-6-oxo-1,6-dihydropyrimidine-2-carboxamide | LHS Intermediate commercially available and Intermediate 3 | 1H-NMR (400 MHz, DMSO-D6) δ 9.00 (s, 0.2H), 8.90 (s, 0.8H), 7.99 (s, 0.8H), 7.67 (s, 0.2H), 7.34-7.25 (m, 2H), 7.07-7.04 (m, 1H), 6.49 (d, J = 7.8 Hz, 0.9H), 6.08 (d, J = 6.9 Hz, 0.1H), 3.30-3.22 (m, 2H), 2.60-2.75 (m, 2H), 1.25-1.17 (m, 1H), 0.57-0.48 (m, 1H), 0.41-0.35 (m, 1H), 0.32-0.26 (m, 1H), 0.11 (td, J = 9.2, 5.0 Hz, 1H), −0.16 (td, J = 9.4, 4.9 Hz, 1H). Rotamers observed | LC-MS (ES, m/z): [M + H]+ = 334.2 |
| 144 | 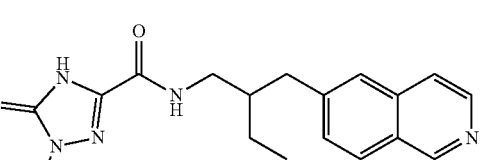<br>N-(2-(isoquinolin-6-ylmethyl)butyl)-1-methyl-5-oxo-4,5-dihydro-1H-1,2,4-triazole-3-carboxamide | Intermediate 1 and Intermediate 35B | 1H-NMR (400 MHz, DMSO-D6) δ 12.21 (s, 1H), 8.64 (t, J = 6.0 Hz, 1H), 7.07-7.02 (m, 6H), 3.32 (s, 3H), 2.87 (dd, J = 16.5, 4.1 Hz, 1H), 2.80-2.66 (m, 3H), 2.36 (dd, J = 16.5, 10.5 Hz, 1H), 1.90-1.87 (m, 1H), 1.73-1.64 (m, 1H), 1.61-1.48 (m, 2H), 1.39-1.29 (m, 1H) | LC-MS (ES, m/z): [M + H]+ = 340.2 |
| 145 | 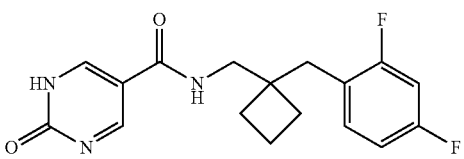<br>N-((1-(2,4-difluorobenzyl)cyclobutyl)methyl)-2-oxo-1,2-dihydropyrimidine-5-carboxamide | LHS Intermediate commercially available and Intermediate 14B | 1H-NMR (400 MHz, DMSO-D6) δ 12.33 (s, 1H), 8.71 (s, 2H), 8.24 (t, J = 5.7 Hz, 1H), 7.41 (dd, J = 15.6, 8.7 Hz, 1H), 7.21-7.16 (m, 1H), 7.06-7.02 (m, 1H), 3.29 (d, J = 6.4 Hz, 2H), 2.73 (s, 2H), 1.83-1.62 (m, 6H) | LC-MS (ES, m/z): [M + H]+ = 334.2 |

TABLE 17-continued

| Example No | Example Name and Structure | Prepared using | 1H-NMR | LCMS |
|---|---|---|---|---|
| 146 | 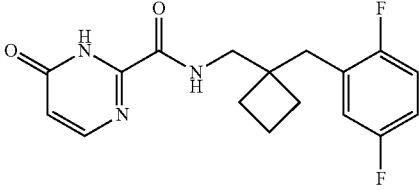<br>N-((1-(2,5-difluorobenzyl)cyclobutyl)methyl)-6-oxo-1,6-dihydropyrimidine-2-carboxamide | LHS Intermediate commercially available and Intermediate 18B | 1H-NMR (400 MHz, DMSO-D6) δ 8.93 (t, J = 6.2 Hz, 1H), 7.95 (d, J = 4.6 Hz, 1H), 7.34-7.30 (m, 1H), 7.23 (td, J = 9.2, 4.6 Hz, 1H), 7.15-7.09 (m, 1H), 6.42 (d, J = 4.1 Hz, 1H), 3.34 (d, J = 6.9 Hz, 2H), 2.74 (s, 2H), 1.90-1.61 (m, 6H) | LC-MS (ES, m/z): [M + H]+ = 334.2 |
| 147 | 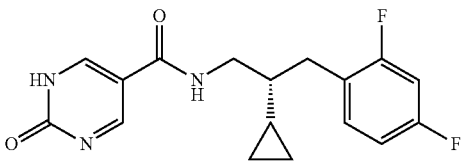<br>(R)-N-(2-cyclopropyl-3-(2,4-difluorophenyl)propyl)-2-oxo-1,2-dihydropyrimidine-5-carboxamide | LHS Intermediate commercially available and Intermediate 4 | 1H-NMR (400 MHz, DMSO-D6) δ 12.28 (s, 1H), 8.64 (s, 2H), 8.27 (t, J = 5.0 Hz, 1H), 7.39-7.31 (m, 1H), 7.15-7.09 (m, 1H), 7.01-6.95 (m, 1H), 3.24-3.14 (m, 2H), 2.76-2.59 (m, 2H), 1.14-1.06 (m, 1H), 0.60-0.51 (m, 1H), 0.38-0.32 (m, 1H), 0.27-0.20 (m, 1H), 0.08-0.01 (m, 1H), −0.27−−0.34 (m, 1H) | LC-MS (ES, m/z): [M + H]+ = 334.1 |
| 148 | 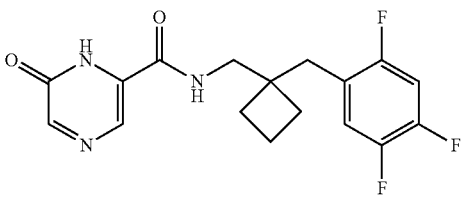<br>6-oxo-N-((1-(2,4,5-trifluorobenzyl)cyclobutyl)methyl)-1,6-dihydropyrazine-2-carboxamide | LHS Intermediate commercially available and Intermediate 19B | 1H-NMR (400 MHz, DMSO-D6) δ 12.09 (s, 0.4H), 8.53-8.42 (m, 1.4H), 8.29 (s, 0.9H), 7.63-7.57 (m, 1H), 7.55-7.48 (m, 1H), 6.52 (s, 0.6H), 3.38 (d, J = 6.4 Hz, 2H), 2.73 (s, 2H), 1.89-1.63 (m, 6H) | LC-MS (ES, m/z): [M + H]+ = 352.2 |
| 149 | 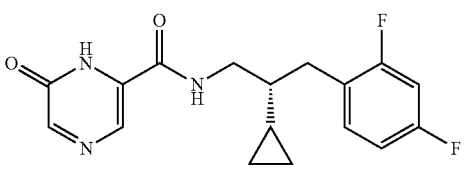<br>(R)-N-(2-cyclopropyl-3-(2,4-difluorophenyl)propyl)-6-oxo-1,6-dihydropyrimidine-2-carboxamide | LHS Intermediate commercially available and Intermediate 4 | 1H-NMR (400 MHz, DMSO-D6) δ 8.95 (t, J = 6.2 Hz, 1H), 7.93 (d, J = 6.4 Hz, 1H), 7.37 (dd, J = 15.3, 8.5 Hz, 1H), 7.13 (td, J = 9.8, 2.7 Hz, 1H), 6.98 (td, J = 8.5, 2.6 Hz, 1H), 6.54-6.39 (m, 1H), 3.26 (m, 2H), 2.76-2.61 (m, 2H), 1.21-1.15 (m, 1H), 0.57-0.52 (m, 1H), 0.39-0.32 (m, 1H), 0.28-0.21 (m, 1H), 0.07 (td, J = 9.4, 5.0 Hz, 1H), −0.29 (td, J = 9.4, 4.9 Hz, 1H) | LC-MS (ES, m/z): [M + H]+ = 334.1 |
| 150 | 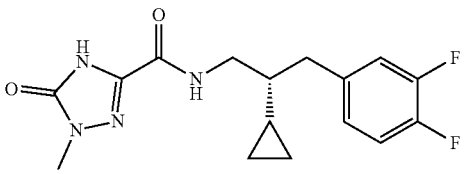<br>(R)-N-(2-cyclopropyl-3-(3,4-difluorophenyl)propyl)-1-methyl-5-oxo-4,5-dihydro-1H-1,2,4-triazole-3-carboxamide | Intermediate 1 and Intermediate 3 | 1H-NMR (400 MHz, DMSO-D6) δ 12.22 (s, 1H), 8.51 (t, J = 6.0 Hz, 1H), 7.34-7.26 (m, 2H), 7.07-7.04 (m, 1H), 3.35 (s, 3H), 3.22 (qd, J = 13.1, 6.6 Hz, 2H), 2.65 (dq, J = 31.8, 6.8 Hz, 2H), 1.21-1.05 (m, 1H), 0.54-0.45 (m, 1H), 0.40-0.33 (m, 1H), 0.31-0.24 (m, 1H), 0.09 (td, J = 9.2, 4.9 Hz, 1H), −0.18 (td, J = 9.4, 5.0 Hz, 1H) | LC-MS (ES, m/z): [M − H]− = 335.2 |

TABLE 17-continued

| Example No | Example Name and Structure | Prepared using | 1H-NMR | LCMS |
|---|---|---|---|---|
| 151 | 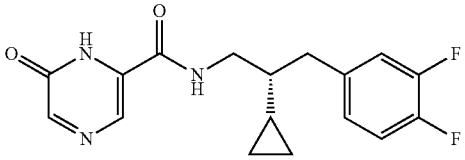<br>(R)-N-(2-cyclopropyl-3-(3,4-difluorophenyl)propyl)-6-oxo-1,6-dihydropyrazine-2-carboxamide | LHS Intermediate commercially available and Intermeidate 3 | 1H-NMR (400 MHz, DMSO-D6) δ 8.38-8.35 (m, 2H), 8.18 (m, 1H), 7.32-7.25 (m, 2H), 7.07-7.03 (m, 1H), 3.29 (t, J = 6.4 Hz, 2H), 2.71-2.61 (m, 2H), 1.23-1.12 (m, 1H), 0.53 (tt, J = 12.9, 4.9 Hz, 1H), 0.42-0.35 (m, 1H), 0.32-0.25 (m, 1H), 0.11 (td, J = 9.2, 5.0 Hz, 1H), −0.15 (td, J = 9.4, 4.9 Hz, 1H) | LC-MS (ES, m/z): [M − H]− = 332.1 |
| 152 | 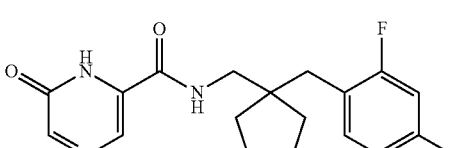<br>N-((1-(2,4-difluorobenzyl)cyclopentyl)methyl)-6-oxo-1,6-dihydropyrazine-2-carboxamide | LHS Intermediate commercially available and Intermediate 20B | 1H-NMR (400 MHz, DMSO-D6) δ 12.06 (s, 0.7H), 8.49 (s, 0.7H), 8.33-8.27 (m, 1.8H), 7.40 (td, J = 8.7, 6.9 Hz, 1H), 7.19 (td, J = 9.8, 2.3 Hz, 1H), 7.04 (td, J = 8.6, 2.1 Hz, 1H), 3.24 (d, J = 6.4 Hz, 2H), 2.67 (s, 2H), 1.63-1.36 (m, 8H) | LC-MS (ES, m/z): [M − H]− = 346.1 |
| 153 | 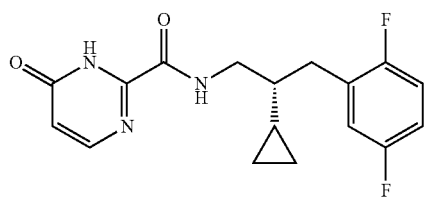<br>(R)-N-(2-cyclopropyl-3-(2,5-difluorophenyl)propyl)-6-oxo-1,6-dihydropyrimidine-2-carboxamide | LHS Intermediate commercially available and Intermediate 12 | 1H-NMR (400 MHz, DMSO-D6) δ 8.97 (s, 1H), 7.98 (s, 1H), 7.24-7.19 (m, 1H), 7.15 (td, J = 9.2, 5.0 Hz, 1H), 7.07-7.01 (m, 1H), 6.51 (s, 1H), 3.35 (q, J = 6.6 Hz, 1H), 3.38-3.30-3.20 (m, 1H), 2.80-2.70 (m, 1H), 2.70-2.60 (m, 1H), 1.27-1.18 (m, 1H), 0.61-0.52 (m, 1H), 0.39-0.32 (m, 1H), 0.28-0.21 (m, 1H), 0.08 (td, J = 9.4, 5.0 Hz, 1H), −0.27 (td, J = 9.4, 4.7 Hz, Hz, 1H) | LC-MS (ES, m/z): [M + H]+ = 334.2 |
| 154 | 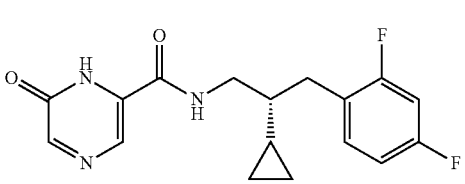<br>(R)-N-(2-cyclopropyl-3-(2,4-difluorophenyl)propyl)-6-oxo-1,6-dihydropyrazine-2-carboxamide | LHS Intermediate commercially available and Intermediate 4 | 1H-NMR (400 MHz, DMSO-D6) δ 11.95 (s, 1H), 8.44 (s, 2H), 8.27 (s, 1H), 7.37 (td, J = 8.7, 6.9 Hz, 1H), 7.13 (td, J = 10.0, 2.3 Hz, 1H), 6.99 (td, J = 8.5, 2.4 Hz, 1H), 3.42-3.30 (m, 2H), 2.77-2.64 (m, 2H), 1.21-1.11 (m, 1H), 0.58 (tt, J = 13.0, 4.8 Hz, 1H), 0.42-0.36 (m, 1H), 0.30-0.23 (m, 1H), 0.10 (td, J = 9.3, 5.2 Hz, 1H), −0.26 (td, J = 9.5, 4.9 Hz, 1H) | LC-MS (ES, m/z): [M − H]− = 332.1 |
| 155 | 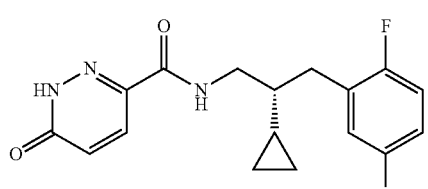<br>(R)-N-(2-cyclopropyl-3-(2,5-difluorophenyl)propyl)-6-oxo-1,6-dihydropyridazine-2-carboxamide | LHS Intermediate commercially available and Intermediate 12 | 1H-NMR (400 MHz, DMSO-D6) δ 8.36 (t, J = 6.0 Hz, 1H), 7.81 (d, J = 10.1 Hz, 1H), 7.19 (qd, J = 5.9, 2.7 Hz, 1H), 7.16-7.11 (m, 1H), 7.07-7.01 (m, 1H), 6.95 (d, J = 10.1 Hz, 1H), 3.40-3.30 (m, 1H), 3.30-3.20 (m, 1H), 2.78-2.69 (m, 1H), 2.67-2.60 (m, 1H), 1.24-1.16 (m, 1H), 0.55 (tt, J = 13.0, 4.9 Hz, 1H), 0.38-0.31 (m, 1H), 0.27-0.20 (m, 1H), 0.07 (td, J = 9.3, 4.9 Hz, 1H), −0.27 (td, J = 9.3, 4.9 Hz, 1H) | LC-MS (ES, m/z): [M + H]+ = 334.1 |

TABLE 17-continued

| Example No | Example Name and Structure | Prepared using | 1H-NMR | LCMS |
|---|---|---|---|---|
| 156 | 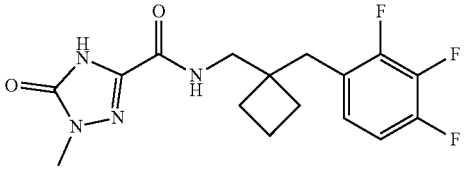<br>1-methyl-5-oxo-N-((1-(2,3,4-trifluorobenzyl)cyclobutyl)methyl)-4,5-dihydro-1H-1,2,4-triazole-3-carboxamide | Intermediate 1 and Intermediate 21B | 1H-NMR (400 MHz, DMSO-D6) δ 12.29 (s, 1H), 8.62 (t, J = 6.4 Hz, 1H), 7.30-7.26 (m, 2H), 3.37 (s, 3H), 3.30 (d, J = 6.4 Hz, 2H), 2.76 (s, 2H), 1.89-1.58 (m, 6H) | LC-MS (ES, m/z): [M + H]+ = 355.0 |
| 157 | 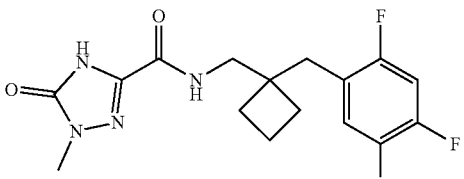<br>1-methyl-5-oxo-N-((1-(2,4,5-trifluorobenzyl)cyclobutyl)methyl)-4,5-dihydro-1H-1,2,4-triazole-3-carboxamide | Intermediate 1 and Intermediate 19B | 1H-NMR (400 MHz, DMSO-D6) δ 12.30 (s, 1H), 8.63 (t, J = 6.2 Hz, 1H), 7.66-7.60 (m, 1H), 7.55-7.48 (m, 1H), 3.37 (s, 3H), 3.29 (d, J = 6.4 Hz, 2H), 2.70 (s, 2H), 1.88-1.60 (m, 6H) | LC-MS (ES, m/z): [M + H]+ = 355.1 |
| 158 | 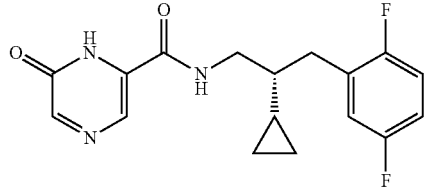<br>(R)-N-(2-cyclopropyl-3-(2,5-difluorophenyl)propyl)-6-oxo-1,6-dihydropyrazine-2-carboxamide | LHS Intermediate commercially available and Intermediate 12 | 1H-NMR (400 MHz, DMSO-D6) δ 8.45-8.42 (m, 2H), 8.24 (s, 1H), 7.20 (qd, J = 6.0, 3.0 Hz, 1H), 7.17-7.12 (m, 1H), 7.07-7.01 (m, 1H), 3.42-3.28 (m, 2H), 2.70 (dq, J = 33.1, 6.9 Hz, 2H), 1.24-1.14 (m, 1H), 0.58 (tt, J = 13.0, 4.8 Hz, 1H), 0.42-0.35 (m, 1H), 0.29-0.23 (m, 1H), 0.10 (td, J = 9.4, 4.9 Hz, 1H), −0.24 (td, J = 9.4, 5.0 Hz, 1H) | LC-MS (ES, m/z): [M + H]+ = 334.0 |
| 159 | 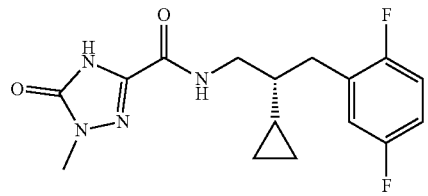<br>(R)-N-(2-cyclopropyl-3-(2,5-difluorophenyl)propyl)-1methyl-5-oxo-4,5-dihydro-1H-1,2,4-triazole-3-carboxamide | Intermediate 1 and Intermediate 12 | 1H-NMR (400 MHz, DMSO-D6) δ 12.21 (s, 0.7H), 8.55 (t, J = 6.0 Hz, 1H), 7.24-7.19 (m, 1H), 7.15 (td, J = 9.2, 4.6 Hz, 1H), 7.08-7.02 (m, 1H), 3.34 (s, 3H), 3.30-3.25 (m, 1H), 3.24-3.16 (m, 1H), 2.73 (dd, J = 14.0, 6.2 Hz, 1H), 2.61 (dd, J = 13.5, 7.6 Hz, 1H), 1.22-1.13 (m, 1H), 0.54 (tt, J = 13.1, 5.0 Hz, 1H), 0.38-0.31 (m, 1H), 0.26-0.20 (m, 1H), 0.06 (td, J = 9.3, 4.9 Hz, 1H), −0.29 (td, J = 9.4, 4.9 Hz, 1H) | LC-MS (ES, m/z): [M − H]− = 335.1 |
| 160 | 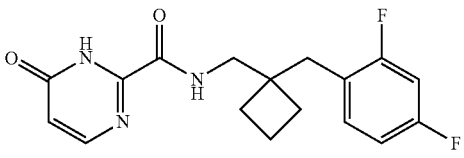<br>N-((1-(2,4-difluorobenzyl)cyclobutyl)methyl)-6-oxo-1,6-dihydropyrimidine-2-carboxamide | LHS Intermediate commercially available and Intermediate 14B | 1H-NMR (400 MHz, DMSO-D6) δ 8.83 (t, J = 6.4 Hz, 1H), 7.90-7.80 (m, 1H), 7.44-7.33 (m, 1H), 7.19-7.13 (m, 1H), 7.00 (td, J = 8.4, 2.6 Hz, 1H), 6.34-6.23 (m, 1H), 3.29 (s, 2H), 2.68-2.61 (m, 2H), 1.83-1.52 (m, 6H). Rotamers observed | LC-MS (ES, m/z): [M + H]+ = 334.1 |

TABLE 17-continued

| Example No | Example Name and Structure | Prepared using | 1H-NMR | LCMS |
|---|---|---|---|---|
| 161 | 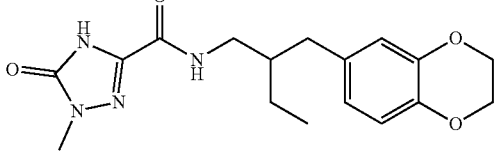<br>N-(2-((2,3-dihydrobenzo[b][1,4]dioxin-6-yl)methyl)butyl)-1-methyl-5-oxo-4,5-dihydro-1H-1,2,4-triazole-3-carboxamide | Intermediate 1 and Intermediate 38B | 1H-NMR (400 MHz, DMSO-D6) δ 12.23 (s, 1H), 8.54 (t, J = 5.7 Hz, 1H), 6.74 (d, J = 8.2 Hz, 1H), 6.69 (d, J = 1.8 Hz, 1H), 6.63 (dd, J = 8.2, 1.8 Hz, 1H), 4.20 (s, 4H), 3.35 (s, 3H), 3.19-3.07 (m, 2H), 2.46 (q, J = 6.9 Hz, 1H), 2.39-2.34 (m, 1H), 1.86-1.79 (m, 1H), 1.25-1.18 (m, 2H), 0.85 (t, J = 7.3 Hz, 3H) | LC-MS (ES, m/z): [M + H]+ = 347.1 |
| 162 | 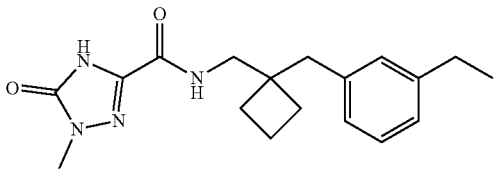 [SMILES: CCc1cccc(CC2(CNC(=O)c3nn(C)c(=O)[nH]3)CCC2)c1]<br>N-((1-(3-ethylbenzyl)cyclobutyl)methyl)-1-methyl-5-oxo-4,5-dihydro-1H-1,2,4-triazole-3-carboxamide | Intermediate 1 and Intermediate 22B | 1H-NMR (400 MHz, DMSO-D6) δ 12.27 (s, 1H), 8.49 (t, J = 6.2 Hz 1H), 7.19 (t, J = 7.6 Hz, 1H), 7.09-7.04 (m, 3H), 3.36 (s, 3H), 3.25 (d, J = 6.4 Hz, 2H), 2.68 (s, 2H), 2.58 (q, J = 7.6 Hz, 2H), 1.86-1.58 (m, 6H), 1.17 (t, J = 7.8 Hz, 3H) | LC-MS (ES, m/z): [M − H]− = 327.2 |
| 163 | 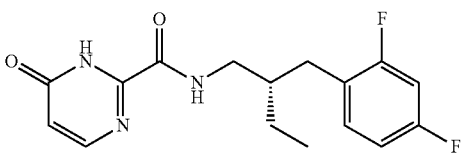<br>(S)-N-(2-(2,4-difluorobenzyl)butyl)-6-oxo-1,6-dihydropyrazine-2-carboxamide | LHS Intermediate commercially available and Intermediate 11 | 1H-NMR (400 MHz, DMSO-D6) δ 8.40 (t, J = 6.2 Hz, 2H), 8.21 (s, 1H), 7.36 (td, J = 8.6, 6.6 Hz, 1H), 7.18-7.12 (m, 1H), 7.03-6.98 (m, 1H), 3.26-3.17 (m, 2H), 2.57 (d, J = 6.9 Hz, 2H), 1.90-1.84 (m, 1H), 1.34-1.19 (m, 2H), 0.91-0.83 (m, 3H) | LC-MS (ES, m/z): [M − H]− = 320.1 |
| 164 | 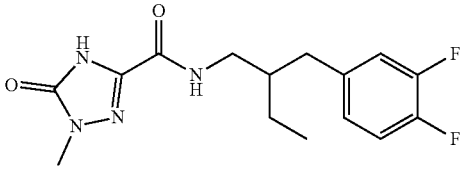<br>N-(2-(3,4-difluorobenzyl)butyl)-1-methyl-5-oxo-4,5-dihydro-1H-1,2,4-triazole-3-carboxamide | Intermediate 1 and Intermediate 36B | 1H-NMR (400 MHz, DMSO-D6) δ 12.22 (s, 1H), 8.56 (t, J = 6.0 Hz, 1H), 7.35-7.28 (m, 2H), 7.06-7.03 (m, 1H), 3.35 (s, 3H), 3.20-3.07 (m, 2H), 2.60-2.53 (m, 2H), 1.91-1.85 (m, 1H), 1.23 (qd, J = 14.1, 7.1 Hz, 2H), 0.87 (t, J = 7.3 Hz, 3H) | LC-MS (ES, m/z): [M + H]+ = 325.1 |
| 165 | 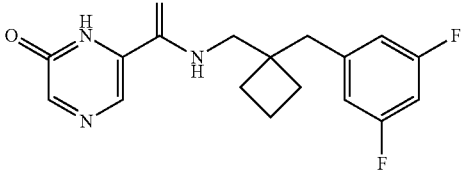<br>N-((1-(3,5-difluorobenzyl)cyclobutyl)methyl)-6-oxo-1,6-dihydropyrazine-2-carboxamide | LHS Intermediate commercially available and Intermediate 23B | 1H-NMR (400 MHz, CHLOROFORM-D) δ 8.41 (s, 1H), 8.39 (s, 1H), 7.50 (s, 1H), 6.83 (s, 1H), 6.77-6.68 (m, 2H), 3.55 (d, J = 6.4 Hz, 2H), 2.80 (s, 2H), 2.05-1.86 (m, 6H) | LC-MS (ES, m/z): [M − H]− = 332.1 |
| 166 | 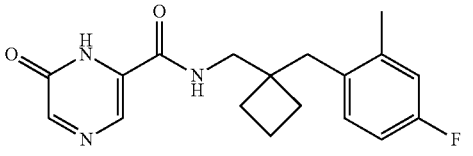<br>N-((1-(4-fluoro-2-methylbenzyl)cyclobutyl)methyl)-6-oxo-1,6-dihydropyrazine-2-carboxamide | LHS Intermediate commercially available and Intermediate 24B | 1H-NMR (400 MHz, DMSO-D6) δ 12.11 (s, 1H), 8.45 (q, J = 6.1 Hz, 2H), 8.28 (s, 1H), 7.20 (dd, J = 8.5, 6.2 Hz, 1H), 7.03 (dd, J = 10.1, 2.7 Hz, 1H), 6.96 (td, J = 8.5, 2.7 Hz, 1H), 3.49 (d, J = 6.4 Hz, 2H), 2.65 (s, 2H), 2.21 (s, 3H), 1.85-1.72 (m, 5H), 1.60-1.54 (m, 1H) | LC-MS (ES, m/z): [M + H]+ = 330.2 |

TABLE 17-continued

| Example No | Example Name and Structure | Prepared using | 1H-NMR | LCMS |
|---|---|---|---|---|
| 167 | 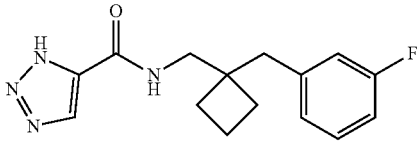<br>N-((1-(3-fluorobenzyl)cyclobutyl)methyl)-1H-1,2,3-triazole-5-carboxamide | LHS Intermediate commercially available and Intermediate 25B | 1H-NMR (400 MHz, DMSO-D6) δ 8.35-8.30 (m, 2H), 7.35-7.30 (m, 1H), 7.18-7.15 (m, 1H), 7.11 (d, J = 8.2 Hz, 1H), 7.03 (td, J = 8.5, 3.1 Hz, 1H), 3.30 (d, J = 6.4 Hz, 2H), 2.75 (s, 2H), 1.90-1.72 (m, 5H), 1.69-1.60 (m, 1H) | LC-MS (ES, m/z): [M + H]+ 289.1 |
| 168 | 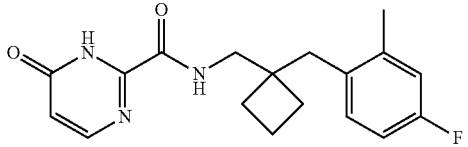 [SMILES: Cc1cc(F)ccc1CC1(CNC(=O)c2nccc(=O)[nH]2)CCC1]<br>N-((1-(4-fluoro-2-methylbenzyl)cyclobutyl)methyl)-6-oxo-1,6-dihydropyrimidine-2-carboxamide | LHS Intermediate commercially available and Intermediate 24B | 1H-NMR (400 MHz, DMSO-D6) δ 9.01 (s, 0.2H), 8.90 (s, 0.8H), 7.98 (s, 0.8H), 7.64 (s, 0.2H), 7.16 (dd, J = 8.2, 6.4 Hz, 1H), 6.98 (dd, J =10.1, 2.7 Hz, 1H), 6.91 (td, J = 8.5, 2.7 Hz, 1H), 6.46 (d, J = 6.4 Hz, 0.8H), 6.06 (s, 0.2H), 3.41 (d, J = 6.4 Hz, 2H), 2.60 (s, 2H), 2.15 (s, 3H), 1.80-1.64 (m, 5H), 1.51-1.44 (m, 1H) | LC-MS (ES, m/z): [M + H]+ 330.2 |
| 169 | 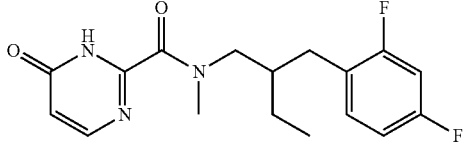<br>N-(2-(2,4-difluorobenzyl)butyl)-N-methyl-6-oxo-1,6-dihydropyrazine-2-carboxamide | LHS Intermediate commercially available and Intermediate 34B | 1H-NMR (400 MHz, DMSO-D6) δ 8.06 (d, J = 13.7 Hz, 1H), 7.88 (s, 1H), 7.39 (dd, J = 15.3, 8.5 Hz, 0.6H), 7.25-7.08 (m, 1.6H), 7.03 (td, J = 8.5, 2.3 Hz, 0.5H), 6.98-6.94 (m, 0.5H), 2.94 (s, 1.4H), 2.90 (s, 1.7H), 2.64-2.54 (m, 1H), 2.44-2.32 (m, 1H), 2.08-2.01 (m, 1H), 1.83-1.76 (m, 0.4H), 1.28 (dt, J = 18.0, 7.2 Hz, 1.5H), 1.19 (q, J = 7.0 Hz, 0.5H), 1.13-1.06 (m, 0.5H), 0.88 (t, J = 7.6 Hz, 1.7H), 0.71 (t, J = 7.3 Hz, 1.5H). Rotamers observed | LC-MS (ES, m/z): [M + H]+ = 336.2 |
| 170 | 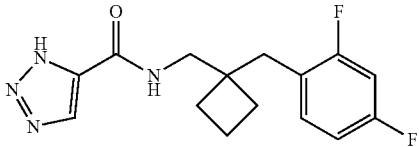<br>N-((1-(2,4-difluorobenzyl)cyclobutyl)methyl)-1H-1,2,3-triazole-5-carboxamide | LHS Intermediate commercially available and Intermediate 14B | 1H-NMR (400 MHz, DMSO-D6) δ 8.37 (t, J = 6.4 Hz, 1H), 8.33 (s, 1H), 7.46 (td, J = 8.7, 6.9 Hz, 1H), 7.20 (td, J = 10.0, 2.6 Hz, 1H), 7.04 (td, J = 8.5, 2.1 Hz, 1H), 3.33 (d, J = 6.4 Hz, 2H), 2.73 (s, 2H), 1.91-1.55 (m, 6H) | LC-MS (ES, m/z): [M + H]+ = 307.2 |
| 171 | 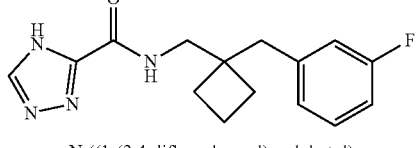<br>N-((1-(2,4-difluorobenzyl)cyclobutyl)methyl)-4H-1,2,4-triazole-3-carboxamide | LHS Intermediate commercially available and Intermediate 25B | 1H-NMR (400 MHz, DMSO-D6) δ 8.47 (s, 1H), 7.35-7.30 (m, 1H), 7.16 (dd, J = 10.3, 2.1 Hz, 1H), 7.11 (d, J = 7.8 Hz, 1H), 7.03 (td, J = 8.6, 2.6 Hz, 1H), 2.75 (s, 2H), 1.59-1.92 (6H) | LC-MS (ES, m/z): [M + H]+ = 289.2 |
| 172 | 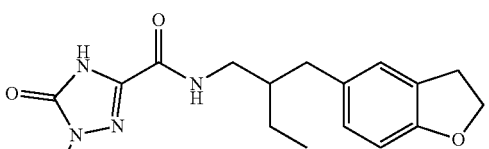<br>N-(2-(2,3-dihydrobenzofuran-5-yl)methyl)butyl)-1-methyl-5-oxo-4,5-dihydro-1H-1,2,4-triazole-3-carboxamide | Intermediate 1 and Intermediate 37B | 1H-NMR (400 MHz, DMSO-D6) δ 12.20 (s, 1H), 8.51 (t, J = 6.0 Hz, 1H), 7.03 (s, 1H), 6.87 (dd, J = 8.2, 1.8 Hz, 1H), 6.63 (d, J = 7.8 Hz, 1H), 4.46 (t, J = 8.7 Hz, 2H), 3.33 (s, 3H), 3.18-3.06 (m, 4H), 2.46 (d, J = 6.4 Hz, 1H), 2.38 (q, J = 7.0 Hz, 1H), 1.86-1.76 (m, 1H), 1.24-1.17 (m, 2H), 0.84 (t, J = 7.6 Hz, 3H) | LC-MS (ES, m/z): [M − H]− = 329.1 |

TABLE 17-continued

| Example No | Example Name and Structure | Prepared using | 1H-NMR | LCMS |
|---|---|---|---|---|
| 173 | 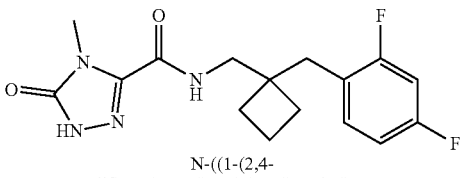<br>N-((1-(2,4-difluorobenzyl)cyclobutyl)methyl)-4-methyl-5-oxo-4,5-dihydro-1H-1,2,4-triazole-3-carboxamide | Intermediate 14B and Intermediate 44 | 1H-NMR (400 MHz, DMSO-D6) δ 12.23 (s, 0.4H), 8.63 (t, J = 6.4 Hz, 0.4H), 8.11 (d, J = 16.0 Hz, 1H), 7.46-7.32 (m, 1H), 7.22-7.16 (m, 1H), 7.07-7.01 (m, 1H), 3.27 (d, J = 6.4 Hz, 1H), 3.12 (d, J = 6.0 Hz, 1H), 2.71-2.65 (m, 2H), 1.87-1.54 (m, 6H). Rotamers observed | LC-MS (ES, m/z): [M + H]+ = 337.2 |
| 174 | 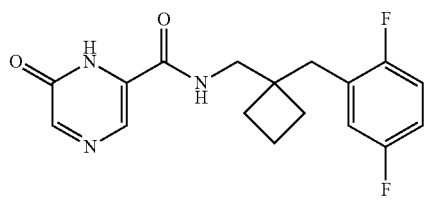<br>N-((1-(2,5-difluorobenzyl)cyclobutyl)methyl)-6-oxo-1,6-dihydropyrazine-2-carboxamide | LHS Intermediate commercially available and Intermediate 18B | 1H-NMR (400 MHz, DMSO-D6) δ 12.05 (s, 0.5H), 8.70-8.35 (m, 1H), 8.31 (s, 1H), 7.33-7.29 (m, 1H), 7.24 (td, J = 9.3, 4.9 Hz, 1H), 7.15-7.09 (m, 1H), 3.39 (d, J = 6.4 Hz, 2H), 2.76 (s, 2H), 1.87-1.63 (m, 6H) | LC-MS (ES, m/z): [M + H]+ = 334.2 |
| 175 | 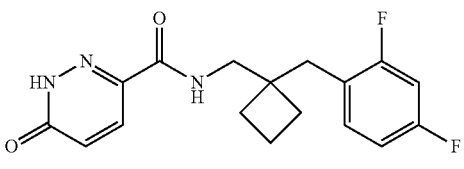<br>N-((1-(2,4-difluorobenzyl)cyclobutyl)methyl)-6-oxo-1,6-dihydropyridazine-3-carboxamide | LHS Intermediate commercially available and Intermediate 14B | 1H-NMR (400 MHz, DMSO-D6) δ 8.34 (t, J = 6.4 Hz, 1H), 7.83 (d, J = 10.1 Hz, 1H), 7.44 (dd, J = 15.6, 8.7 Hz, 1H), 7.19 (td, J = 10.0, 2.6 Hz, 1H), 7.04 (td, J = 8.5, 2.0 Hz, 1H), 6.97 (dd, J = 10.1, 2.3 Hz, 1H), 2.71 (s, 2H), 1.85-1.58 (m, 6H) | LC-MS (ES, m/z): [M + H]+ = 334.2 |
| 176 | 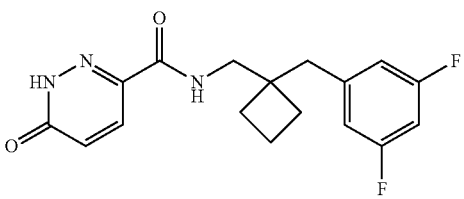<br>N-((1-(3,5-difluorobenzyl)cyclobutyl)methyl)-6-oxo-1,6-dihydropyridazine-3-carboxamide | LHS Intermediate commercially available and Intermediate 23B | 1H-NMR (400 MHz, CHLOROFORM-D) δ 11.29 (s, 1H), 8.09-8.01 (m, 1H), 7.04 (d, J = 10.1 Hz, 1H), 6.98 (t, J = 6.0 Hz, 1H), 6.73-6.63 (m, 2H), 6.57-6.44 (m, 1H), 3.48 (d, J = 6.0 Hz, 2H), 2.76 (s, 2H), 2.13-1.79 (m, 6H) | LC-MS (ES, m/z): [M − H]− = 332.1 |
| 177 | 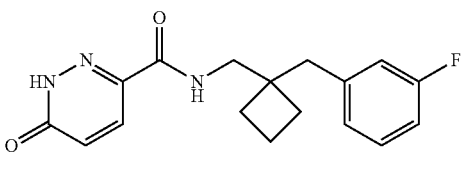<br>N-((1-(3-fluorobenzyl)cyclobutyl)methyl)-6-oxo-1,6-dihydropyridazine-3-carboxamide | LHS Intermediate commercially available and Intermediate 25B | 1H-NMR (400 MHz, DMSO-D6) δ 8.34 (t, J = 6.4 Hz, 1H), 7.83 (d, J = 10.1 Hz, 1H), 7.44 (dd, J = 15.6, 8.7 Hz, 1H), 7.22-7.17 (m, 1H), 7.04 (td, J = 8.4, 2.4 Hz, 1H), 6.97 (dd, J = 9.8, 2.1 Hz, 1H), 2.71 (s, 2H), 1.86-1.58 (m, 6H) | LC-MS (ES, m/z): [M − H]− = 316.2 |
| 178 | 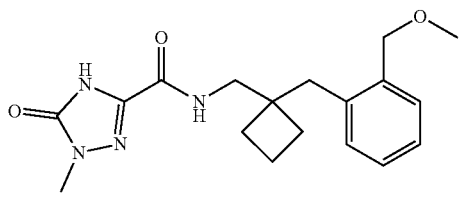<br>N-((1-(2-(methoxymethyl)benzyl)cyclobutyl)methyl)-1-methyl-5-oxo-4,5-dihydro-1H-1,2,4-triazole-3-carboxamide | Intermediate 1 and Intermediate 26B | 1H-NMR (400 MHz, DMSO-D6) δ 12.26 (s, 1H), 8.58 (t, J = 6.2 Hz, 1H), 7.33 (d, J = 7.8 Hz, 1H), 7.27-7.19 (m, 3H), 4.32 (s, 2H), 3.39 (d, J = 6.4 Hz, 2H), 3.35 (s, 3H), 3.27 (s, 3H), 2.69 (s, 2H), 1.82-1.71 (m, 5H), 1.52-1.47 (m, 1H) | LC-MS (ES, m/z): [M − H]− = 343.1 |

TABLE 17-continued

| Example No | Example Name and Structure | Prepared using | 1H-NMR | LCMS |
|---|---|---|---|---|
| 179 | N-(2-(2,4-difluorobenzyl)butyl)-N,1-dimethyl-5-oxo-4,5-dihydro-1H-1,2,4-triazole-3-carboxamide | Intermediate 1 and Intermediate 34B | 1H-NMR (400 MHz, DMSO-D6) δ 12.07 (s, 1H), 7.38-7.28 (m, 1H), 7.16 (td, J = 9.8, 2.3 Hz, 1H), 7.01 (t, J = 8.5 Hz, 1H), 3.78 (dd, J = 7.3, 4.6 Hz, 0.5H), 3.44 (dd, J = 13.3, 7.8 Hz, 0.5H), 3.36 (d, J = 7.3 Hz, 0.4H), 3.31 (s, 6H), 3.28 (s, 1H), 3.24 (s, 2H), 2.92 (s, 1H), 2.07-1.95 (m, 1H), 1.25-1.15 (m, 2H), 0.88-0.81 (m, 3H) | LC-MS (ES, m/z): [M + H]+ = 339.0 |
| 180 | N-((1-(2,4-difluorobenzyl)cyclobutyl)methyl)-4H-1,2,4-triazole-3-carboxamide | LHS Intermediate commercially available and Intermediate 14B | 1H-NMR (400 MHz, DMSO-D6) δ 8.90-8.60 (s, 1H), 8.34 (s, 0.5H), 8.12 (s, 0.2H), 7.46 (dd, J = 15.3, 8.5 Hz, 1H), 7.20 (td, J = 9.8, 2.4 Hz, 1H), 7.04 (td, J = 8.5, 2.3 Hz, 1H), 2.73 (s, 2H), 1.91-1.56 (m, 6H) | LC-MS (ES, m/z): [M + H]+ = 307.2 |
| 181 | 1-methyl-N-((1-(2-(methylthio)benzyl)cyclobutyl)methyl)-5-oxo-4,5-dihydro-1H-1,2,4-triazole-3-carboxamide | Intermediate 1 and Intermediate 31B | 1H-NMR (400 MHz, CHLOROFORM-D) δ 9.85 (s, 1H), 7.35 (t, J = 6.0 Hz, 1H), 7.22-7.26 (2H), 7.17-7.22 (1H), 7.10-7.15 (1H), 3.49 (s, 3H), 3.46 (d, J = 6.4 Hz, 2H), 2.91 (s, 2H), 2.48 (s, 3H), 2.04-1.95 (m, 3H), 1.86-1.77 (m, 3H) | LC-MS (ES, m/z): [M + H]+ = 347.2 |
| 182 | 1-methyl-N-((1-(3-(methylthio)benzyl)cyclobutyl)methyl)-5-oxo-4,5-dihydro-1H-1,2,4-triazole-3-carboxamide | Intermediate 1 and Intermediate 27B | 1H-NMR (400 MHz, DMSO-D6) δ 12.27 (s, 1H), 8.53 (t, J = 6.2 Hz, 1H), 7.22 (t, J = 7.6 Hz, 1H), 7.16 (s, 1H), 7.10 (d, J = 8.2 Hz, 1H), 7.03 (d, J = 7.3 Hz, 1H), 3.36 (s, 3H), 3.24 (d, J = 6.4 Hz, 2H), 2.68 (s, 2H), 2.45 (s, 3H), 1.83-1.62 (m, 6H) | LC-MS (ES, m/z): [M + H]+ = 347.2 |

Method J: T3P Coupling

Example 183: (R)—N-(2-cyclopropyl-3-(2,4,6-trifluorophenyl)propyl)-6-oxo-1,6-dihydropyrimidine-2-carboxamide

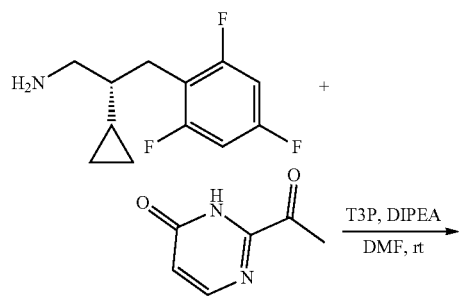

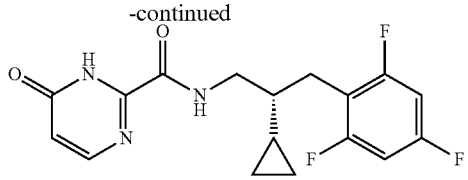

To 6-oxo-1,6-dihydropyrimidine-2-carboxylic acid (commercially available, 47 mg, 0.335 mmol), (R)-2-cyclopropyl-3-(2,4,6-trifluorophenyl)propan-1-amine (Intermediate 2, 128 mg, 0.335 mmol) and N,N-Diisopropylethylamine (175 uL, 1.01 mmol) in N,N-dimethylformamide (1.0 mL) was added propylphosphonic anhydride solution (T3P) (240 uL, 0.403 mmol), and the reaction mixture stirred at room temperature for 2 hours.

The reaction mixture was purified by prep HPLC. Fractions containing product were combined, solvent removed in vacuo and lyophilised from 1:1 MeCN:H2O to give (R)—

N-(2-cyclopropyl-3-(2,4,6-trifluorophenyl)propyl)-6-oxo-1,6-dihydropyrimidine-2-carboxamide (20 mg, 0.058 mmol, 17%) as an off-white solid.

1H-NMR (400 MHz, DMSO-D6) δ 9.00 (t, J=6.2 Hz, 1H), 7.94 (d, J=6.4 Hz, 1H), 7.12 (t, J=8.5 Hz, 2H), 6.40 (d, J=6.4 Hz, 1H), 3.39 (q, J=6.6 Hz, 1H), 3.28 (q, J=6.7 Hz, 1H), 2.75-2.60 (m, 2H), 1.15 (dd, J=15.6, 8.7 Hz, 1H), 0.58-0.55 (m, 1H), 0.38-0.18 (m, 2H), 0.05 (td, J=9.4, 5.0 Hz, 1H), −0.39 (td, J=9.4, 5.0 Hz, 1H)

LC-MS (ES, m/z): [M+H]$^+$=352.2

The following compounds were prepared using analogous methods to those described for Example 183 (Method J).

TABLE 18

| Example No. | Name and Structure | Prepared Using | 1H-NMR | LCMS |
|---|---|---|---|---|
| 184 | 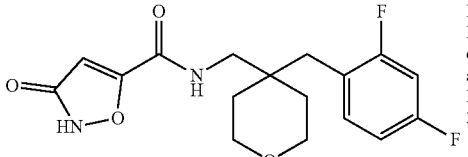<br>N-((4-(2,4-difluorobenzyl)tetrahydro-2H-pyran-4-yl)methyl)-3-oxo-2,3-dihydroisoxazole-5-carboxamide | LHS Intermediate commercially available and Intermediate 29B | 1H-NMR (400 MHz, CHLOROFORM-D) δ 7.14 (td, J = 8.7, 6.4 Hz, 1H), 6.90-6.84 (m, 2H), 6.78 (q, J = 6.0 Hz, 1H), 6.59 (s, 1H), 3.81-3.75 (m, 4H), 3.39 (d, J = 6.9 Hz, 2H), 2.72 (s, 2H), 1.60-1.45 (m, 4H) | LC-MS (ES, m/z): [M − H]− = 351.1 |
| 185 | 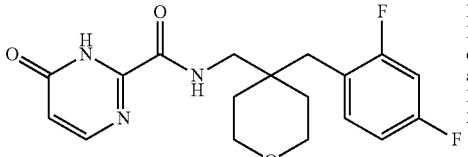<br>N-((4-(2,4-difluorobenzyl)tetrahydro-2H-pyran-4-yl)methyl)-6-oxo-1,6-dihydropyrimidine-2-carboxamide | LHS Intermediate commercially available and Intermediate 29B | 1H-NMR (400 MHz, DMSO-D6) δ 8.80 (s, 1H), 8.10-7.60 (m, 1H), 7.39-7.33 (m, 1H), 7.21 (td, J = 10.1, 2.4 Hz, 1H), 7.05 (td, J = 8.4, 2.6 Hz, 1H), 6.60-6.00 (m, 1H), 3.68-3.60 (m, 4H), 3.34 (d, J = 6.4 Hz, 2H), 2.69 (s, 2H), 1.39-1.25 (m, 4H) | LC-MS (ES, m/z): [M − H]− = 362.2 |
| 186 | 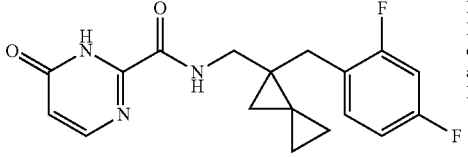<br>N-((1-(2,4-difluorobenzyl)spiro[2.2]pentan-1-yl)methyl)-6-oxo-1,6-dihydropyrimidine-2-carboxamide | LHS Intermediate commercially available and Intermediate 15B | 1H-NMR (400 MHz, DMSO-D6) δ 8.72 (s, 1H), 7.93 (s, 1H), 7.35 (td, J = 8.5, 6.9 Hz, 1H), 7.16-7.10 (m, 1H), 7.01-6.96 (m, 1H), 6.40 (s, 1H), 3.35 (t, J = 6.9 Hz, 1H), 3.23 (q, J = 6.7 Hz, 1H), 2.82 (d, J = 15.1 Hz, 1H), 2.66 (d, J = 11.4 Hz, 1H), 0.98 (d, J = 4.1 Hz, 1H), 0.95-0.91 (m, 1H), 0.80 (dd, J = 9.8, 3.9 Hz, 2H), 0.71-0.62 (m, 2H) | LC-MS (ES, m/z): [M + H]+ = 346.2 |
| 187 | 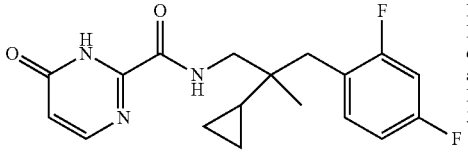<br>N-(2-cyclopropyl-3-(2,4-difluorophenyl)-2-methylpropyl)-6-oxo-1,6-dihydropyrimidine-2-carboxamide | LHS Intermediate commercially available and Intermediate 39B | 1H-NMR (400 MHz, DMSO-D6) δ 8.66 (t, J = 6.6 Hz, 1H), 7.94 (s, 1H), 7.38 (dd, J = 15.6, 8.7 Hz, 1H), 7.15 (t, J = 9.8 Hz, 1H), 7.01 (t, J = 8.5 Hz, 1H), 6.40 (d, J = 6.4 Hz, 1H), 3.23 (q, J = 6.1 Hz, 2H), 2.67-2.61 (m, 2H), 0.76-0.72 (m, 1H), 0.48 (s, 3H), 0.26-0.15 (m, 3H), −0.08 (t, J = 5.5 Hz, 1H) | LC-MS (ES, m/z): [M + H]+ = 348.2 |
| 188 | 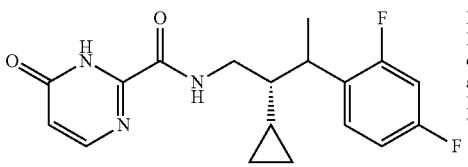<br>N-((2S)-2-cyclopropyl-3-(2,4-difluorophenyl)butyl)-6-oxo-1,6-dihydropyrimidine-2-carboxamide | LHS Intermediate commercially available and Intermediate 7 | 1H-NMR (400 MHz, DMSO-D6) δ 8.84 (s, 0.7H), 8.73 (s, 0.3H), 7.92 (s, 1H), 7.43-7.35 (m, 1H), 7.13-7.06 (m, 1H), 7.02-6.94 (m, 1H), 6.40 (s, 1H), 3.29-3.12 (m, 2H), 1.33 (d, J = 7.3 Hz, 3H), 1.17 (dd, J = 15.8, 5.7 Hz, 1H), 0.57-0.49 (m, 1H), 0.36-0.21 (m, 2H), 0.10-0.03 (m, 1H), −0.16--0.24 (m, 1H) | LC-MS (ES, m/z): [M − H]− = 346.1 |

TABLE 18-continued

| Example No. | Name and Structure | Prepared Using | 1H-NMR | LCMS |
|---|---|---|---|---|
| 189 | (R)-N-(2-cyclopropyl-3-(2,6-difluorophenyl)propyl)-6-oxo-1,6-dihydropyrimidine-2-carboxamide | LHS Intermediate commercially available and Intermediate 8 | 1H-NMR (400 MHz, DMSO-D6) δ 9.00 (s, 1H), 7.97 (s, 1H), 7.33-7.25 (m, 1H), 7.02 (t, J = 7.8 Hz, 2H), 6.46 (s, 1H), 3.32-3.25 (m, 2H), 2.77-2.64 (m, 2H), 1.20 (q, J = 8.1 Hz, 1H), 0.55 (d, J = 21.5 Hz, 1H), 0.33 (t, J = 4.4 Hz, 1H), 0.23-0.18 (m, 1H), 0.04 (q, J = 4.6 Hz, 1H), −0.41 (q, J = 4.7 Hz, 1H) | LC-MS (ES, m/z): [M + H]+ = 334.1 |
| 190 | (R)-N-(2-cyclopropyl-3-(4-fluorophenyl)propyl)-1-methyl-5-oxo-4,5-dihydro-1H-1,2,4-triazole-3-carboxamide | Intermediate 1 and Intermediate 10 | 1H-NMR (400 MHz, DMSO-D6) δ 8.50 (t, J = 6.0 Hz, 1H), 7.24 (qd, J = 5.7, 3.3 Hz, 2H), 7.06 (tt, J = 9.2, 2.4 Hz, 2H), 3.34 (s, 3H), 3.20 (dq, J = 25.1, 6.6 Hz, 2H), 2.68 (q, J = 6.7 Hz, 1H), 2.59 (q, J = 6.7 Hz, 1H), 1.19-1.09 (m, 1H), 0.52-0.43 (m, 1H), 0.37-0.31 (m, 1H), 0.29-0.22 (m, 1H), 0.07 (td, J = 9.2, 5.3 Hz, 1H), −0.22 (td, J = 9.4, 5.0 Hz, 1H) | LC-MS (ES, m/z): [M − H]− = 317.1 |
| 191 | (S)-N-(2-(2,4-difluorobenzyl)butyl)-6-oxo-1,6-dihydropyrimidine-2-carboxamide | LHS Intermediate commercially available and Intermediate 11 | 1H-NMR (400 MHz, DMSO-D6) δ 8.97 (s, 1H), 7.96 (s, 1H), 7.36 (td, J = 8.7, 6.9 Hz, 1H), 7.17-7.12 (m, 1H), 7.02-6.97 (m, 1H), 6.47 (s, 1H), 3.26-3.12 (m, 2H), 2.55 (d, J = 6.9 Hz, 2H), 1.94-1.87 (m, 1H), 1.28-1.20 (m, 2H), 0.87 (t, J = 7.3 Hz, 3H) | LC-MS (ES, m/z): [M − H]− = 320.1 |
| 192 | (R)-N-(2-cyclopropyl-3-(2,4-difluorophenyl)propyl)-5-fluoro-6-oxo-1,6-dihydropyrimidine-2-carboxamide | Intermediate 4 and Intermediate 40 | 1H-NMR (400 MHz, DMSO-D6) δ 8.88 (t, J = 6.0 Hz, 1H), 8.06 (d, J = 3.2 Hz, 1H), 7.36 (dd, J = 15.6, 8.7 Hz, 1H), 7.12 (td, J = 10.0, 2.3 Hz, 1H), 6.98 (td, J = 8.4, 2.6 Hz, 1H), 3.28-3.22 (m, 2H), 2.74-2.60 (m, 2H), 1.24-1.11 (m, 1H), 0.58-0.49 (m, 1H), 0.38-0.31 (m, 1H), 0.26-0.20 (m, 1H), 0.06 (td, J = 9.4, 5.0 Hz, 1H), −0.31 (td, J = 9.4, 4.9 Hz, 1H) | LC-MS (ES, m/z): [M − H]− = 350.1 |

Method K: Me₃Al Amidation

Example 193: N-(3-(2-chloro-4-fluorophenyl)-2-cyclopropylpropyl)-1-methyl-5-oxo-4,5-dihydro-1H-1,2,4-triazole-3-carboxamide

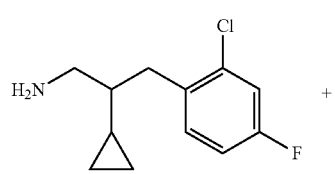

+

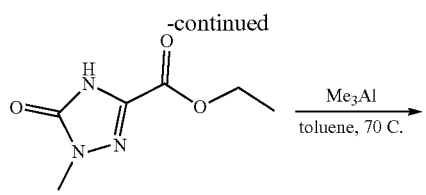

$\xrightarrow{\text{Me}_3\text{Al}}{\text{toluene, 70 C.}}$

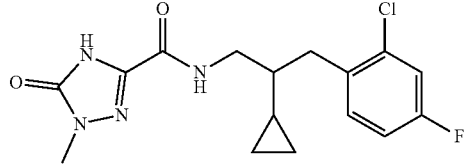

To ethyl 1-methyl-5-oxo-4H-1,2,4-triazole-3-carboxylate (prepared according to step 2, Intermediate 1, 271 mg, 1.58 mmol) and 3-(2-chloro-4-fluoro-phenyl)-2-cyclopropyl-propan-1-amine (Intermediate 32B, 360 mg, 1.58 mmol) in toluene (10 mL) was added trimethylaluminium solution 2.0 M in hexane (0.8 mL, 116 mg, 1.61 mmol) dropwise, and the reaction mixture stirred at 70° C. for 1 hour. To the mixture was added a few drops of 0.1 M aqueous HCl. A viscous gel formed and this was diluted with EtOAc, transferred to vials and these were centrifuged. The supernatant was removed and the precipitate/gel was extracted with EtOAc and sonication (2×). Each time the suspension was centrifuged and the supernatant removed. The combined supernatants were passed through a phase separator cartridge (Biotage), evaporated, redissolved in DMSO and purified by prep-HPLC.

The fractions containing product were combined, evaporated and lyophilised from MeCN:H2O=1:1 to afford N-(3-(2-chloro-4-fluorophenyl)-2-cyclopropylpropyl)-1-methyl-5-oxo-4,5-dihydro-1H-1,2,4-triazole-3-carboxamide (149 mg, 0.422 mmol, 27%) as a white solid.

1H-NMR (400 MHz, DMSO-D6) δ 12.23 (s, 1H), 8.55 (t, J=6.0 Hz, 1H), 7.44 (dd, J=8.2, 6.4 Hz, 1H), 7.35 (dd, J=9.2, 2.7 Hz, 1H), 7.13 (td, J=8.6, 2.6 Hz, 1H), 3.35 (s, 3H), 3.22-3.16 (m, 1H), 2.83 (q, J=6.7 Hz, 1H), 2.71 (dd, J=13.3, 7.8 Hz, 1H), 1.25-1.16 (m, 1H), 0.63-0.54 (m, 1H), 0.38-0.31 (m, 1H), 0.24-0.18 (m, 1H), 0.05 (td, J=9.3, 5.2 Hz, 1H), −0.37 (td, J=9.4, 4.9 Hz, 1H)

LC-MS (ES, m/z): [M+H]$^+$=353.2

The following compounds were prepared using analogous methods to those described for Example 193 (Method K).

TABLE 19

| Example No | Name and Structure | Prepared using | 1H-NMR | LCMS |
|---|---|---|---|---|
| 194 | 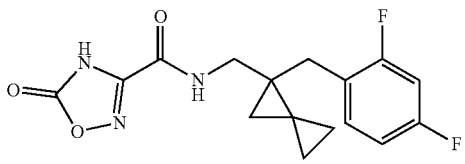<br>N-((1-(2,4-difluorobenzyl)spiro[2.2]pentan-1-yl)methyl)-5-oxo-4,5-dihydro-1,2,4-oxadiazole-3-carboxamide | LHS Intermediate commerically available and Intermediate 15B | 1H-NMR (400 MHz, DMSO-D6) δ 8.13 (s, 1H), 7.34-7.31 (m, 1H), 7.14 (t, J = 10.1 Hz, 1H), 7.02-6.97 (m, 1H), 3.20 (q, J = 7.0 Hz, 2H), 2.81 (d, J = 15.6 Hz, 1H), 2.61 (s, 1H), 0.91 (d, J = 4.1 Hz, 2H), 0.80-0.76 (m, 2H), 0.68-0.61 (m, 2H) | LC-MS (ES, m/z): [M − H]− = 334.1 |
| 195 | 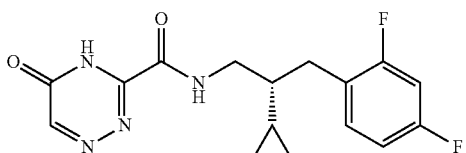<br>(R)-N-(2-cyclopropyl-3-(2,4-difluorophenyl)propyl)-5-oxo-4,5-dihydro-1,2,4-triazine-3-carboxamide | Intermediate 4 and Intermediate 42 | 1H-NMR (400 MHz, DMSO-D6) δ 9.13 (t, J = 5.7 Hz, 1H), 7.90 (s, 1H), 7.37 (dd, J = 15.6, 8.7 Hz, 1H), 7.13 (td, J = 10.0, 2.4 Hz, 1H), 6.98 (td, J = 8.1, 2.6 Hz, 1H), 3.36 (t, J = 6.4 Hz, 1H), 3.27 (q, J = 6.7 Hz, 1H), 2.76-2.61 (m, 2H), 1.24-1.16 (m, 1H), 0.59-0.50 (m, 1H), 0.39-0.32 (m, 1H), 0.27-0.20 (m, 1H), 0.10-0.06 (m, 1H), −0.27--0.32 (m, 1H) | LC-MS (ES, m/z): [M − H]− = 333.1 |

TABLE 19-continued

| Example No | Name and Structure | Prepared using | 1H-NMR | LCMS |
|---|---|---|---|---|
| 196A and 196B | N-((2S)-2-cyclopropyl-3-(2,4-difluorobenzyl)butyl)-1-methyl-5-oxo-4,5-dihydro-1H-1,2,4-triazole-3-carboxamide<br><br>Mixture of diastereosomers = 75:25<br><br>One of diastereoisomers is N-((2S,3R)-2-cyclopropyl-3-(2,4-difluorobenzyl)butyl)-1-methyl-5-oxo-4,5-dihydro-1H-1,2,4-triazole-3-carboxamide and the other is N-((2S,3S)-2-cyclopropyl-3-(2,4-difluorophenyl)butyl)-1-methyl-5-oxo-4,5-dihydro-1H-1,2,4-triazole-3-carboxamide | Intermediate 1 and Intermediate 7 | 1H-NMR (400 MHz, DMSO-D6) δ 12.20 (s, 1H), 8.42 (t, J = 6.0 Hz, 0.7H), 8.31 (t, J = 6.0 Hz, 0.3H), 7.42-7.34 (m, 1H), 7.13-6.96 (m, 2H), 3.33 (s, 2.1H), 3.32 (s, 0.9H), 3.26-3.12 (m, 3H), 1.31 (d, J = 7.3 Hz, 3H), 1.17-1.08 (m, 1H), 0.53-0.50 (m, 1H), 0.37-0.20 (m, 2H), 0.09-0.01 (m, 1H), −0.22 (q, J = 4.7 Hz, 0.3H), −0.28 (t, J = 5.3 Hz, 0.7H) | LC-MS (ES, m/z): [M + H]+ = 351.2 |
| 197 | N-((1-(2,4-difluorobenzyl)-4,4-difluorocyclohexyl)methyl)-1-methyl-5-oxo-4,5-dihydro-1H-1,2,4-triazole-3-carboxamide | Intermediate 1 and Intermediate 16B | 1H-NMR (400 MHz, CHLOROFORM-D) δ 9.95 (s, 1H), 7.13 (td, J = 8.9, 6.4 Hz, 1H), 6.93-6.84 (m, 3H), 3.51 (s, 3H), 3.30 (d, J = 6.9 Hz, 2H), 2.67 (s, 2H), 2.11-1.93 (m, 4H), 1.65-1.56 (m, 4H) | LC-MS (ES, m/z): [M + H]+ = 401.3 |
| 198 | N-((1-(2,4-difluorobenzyl)cyclobutyl)methyl)-5-oxo-4,5-dihydro-1,2,4-triazine-3-carboxamide | Intermediate 14B and Intermediate 42 | 1H-NMR (400 MHz, DMSO-D6) δ 9.08 (t, J = 6.0 Hz, 1H), 7.91 (s, 1H), 7.46 (dd, J = 15.6, 8.7 Hz, 1H), 7.20 (td, J = 10.0, 2.3 Hz, 1H), 7.04 (td, J = 8.5, 2.3 Hz, 1H), 3.34 (d, J = 6.4 Hz, 2H), 2.72 (s, 2H), 1.88-1.82 (m, 2H), 1.79-1.72 (m, 3H), 1.64-1.54 (m, 1H) | LC-MS (ES, m/z): [M − H]− = 333.1 |
| 199 | N-(2-(2,4-difluorobenzyl)-2-ethylbutyl)-1-methyl-5-oxo-4,5-dihydro-1H-1,2,4-triazole-3-carboxamide | Intermediate 1 and Intermediate 17B | 1H-NMR (400 MHz, CHLOROFORM-D) δ 7.17-7.11 (m, 1H), 6.87-6.79 (m, 2H), 6.71 (s, 1H), 3.49 (s, 3H), 3.19 (d, J = 6.4 Hz, 2H), 2.60 (s, 2H), 1.32 (q, J = 7.5 Hz, 4H), 0.92 (t, J = 7.6 Hz, 6H) | LC-MS (ES, m/z): [M + H]+ 353.2 |

TABLE 19-continued

| Example No | Name and Structure | Prepared using | 1H-NMR | LCMS |
|---|---|---|---|---|
| 200 | 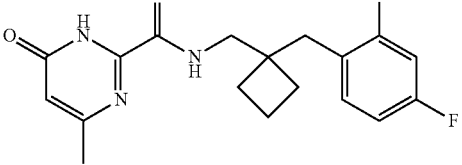<br>N-((1-(2,4-difluorobenzyl)cyclobutyl)methyl)-4-methyl-6-oxo-1,6-dihydropyrimidine-2-carboxamide | LHS intermediate commerically available and Intermediate 14B | 1H-NMR (400 MHz, DMSO-D6) δ 12.40 (1H), 8.69 (t, J = 6.4 Hz, 1H), 7.45 (td, J = 8.7, 6.9 Hz, 1H), 7.22 (td, J = 10.0, 2.6 Hz, 1H), 7.05 (td, J = 8.5, 2.6 Hz, 1H), 6.81 (s, 1H), 3.32 (d, J = 6.9 Hz, 2H), 2.71 (s, 2H), 2.32 (s, 3H), 1.86-1.74 (m, 5H), 1.65-1.59 (m, 1H) | LC-MS (ES, m/z): [M + H]+ = 348.2 |
| 201 | 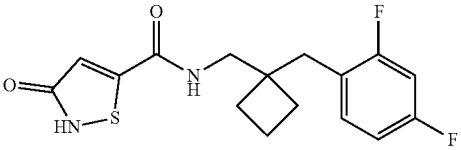<br>N-((1-(2,4-difluorobenzyl)cyclobutyl)methyl)-3-oxo-2,3-dihydroisothiazole-5-carboxamide | LHS intermediate commercially available and Intermediate 14B | 1H-NMR (400 MHz, CHLOROFORM-D) δ 7.21 (dd, J = 15.1, 8.7 Hz, 1H), 6.89-6.82 (m, 2H), 6.74 (s, 1H), 6.18-6.16 (m, 1H), 3.44 (d, J = 6.4 Hz, 2H), 2.80 (s, 2H), 2.04-1.82 (m, 6H) | LC-MS (ES, m/z): [M − H]− = 337.0 |
| 202 | 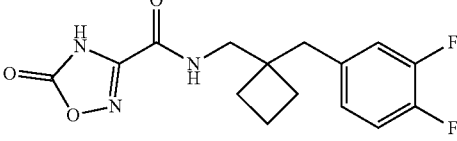<br>N-((1-(3,4-difluorobenzyl)cyclobutyl)methyl)-5-oxo-4,5-dihydro-1,2,4-oxadiazole-3-carboxamide | LHS intermediate commercially available and Intermediate 13B | 1H-NMR (400 MHz, DMSO-D6) δ 9.06 (t, J = 6.0 Hz, 1H), 7.43-7.30 (m, 2H), 7.13-7.11 (m, 1H), 3.24 (d, J = 6.4 Hz, 2H), 2.71 (s, 2H), 1.82-1.59 (m, 6H) | LC-MS (ES, m/z): [M − H]− = 322.1 |
| 203 | 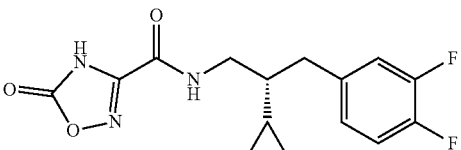<br>(R)-N-(2-cyclopropyl-3-(3,4-difluorophenyl)propyl)-5-oxo-4,5-dihydro-1,2,4-oxadiazole-3-carboxamide | LHS intermediate commercially available and Intermediate 3 | 1H-NMR (400 MHz, DMSO-D6) δ 8.74 (s, 1H), 7.33-7.26 (m, 2H), 7.07-7.04 (m, 1H), 3.27-3.16 (m, 2H), 2.66 (dq, J = 34.1, 6.7 Hz, 2H), 1.20-1.10 (m, 1H), 0.54-0.46 (m, 1H), 0.40-0.34 (m, 1H), 0.31-0.24 (m, 1H), 0.10 (td, J = 9.2, 5.0 Hz, 1H), −0.18 (td, J = 9.4, 5.0 Hz, 1H) | LC-MS (ES, m/z): [M − H]− = 322.1 |
| 204 | 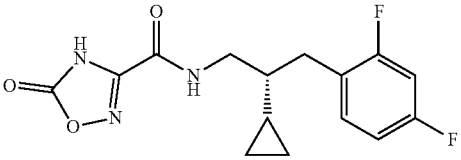<br>(R)-N-(2-cyclopropyl-3-(2,4-difluorophenyl)propyl)-5-oxo-4,5-dihydro-1,2,4-oxadiazole-3-carboxamide | LHS intermediate commerically available and Intermediate 4 | 1H-NMR (400 MHz, DMSO-D6) δ 8.94 (t, J = 5.0 Hz, 1H), 7.36 (dd, J = 15.6, 8.7 Hz, 1H), 7.13 (td, J = 10.0, 2.4 Hz, 1H), 6.99 (td, J = 8.4, 2.4 Hz, 1H), 3.24-3.17 (m, 1H), 2.75-2.60 (m, 2H), 1.13 (dt, J = 23.7, 7.0 Hz, 1H), 0.53 (tt, J = 13.0, | LC-MS (ES, m/z): [M − H]− = 322.1 |

TABLE 19-continued

| Example No | Name and Structure | Prepared using | 1H-NMR | LCMS |
|---|---|---|---|---|
| | | | 4.7 Hz, 1H), 0.38-0.31 (m, 1H), 0.26-0.20 (m, 1H), 0.06 (td, J = 9.3, 4.7 Hz, 1H), −0.31 (td, J = 9.4, 4.9 Hz, 1H) | |
| 205 | 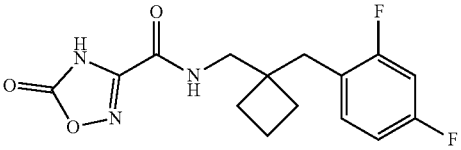<br>N-((1-(2,4-difluorobenzyl)cyclobutyl)methyl)-5-oxo-4,5-dihydro-1,2,4-oxadiazole-3-carboxamide | LHS intermediate commercially available and Intermediate 14B | 1H-NMR (400 MHz, CHLOROFORM-D) δ 7.20-7.14 (m, 1H), 6.88-6.80 (m, 3H), 3.44 (d, J = 6.0 Hz, 2H), 2.78 (s, 2H), 1.97-1.78 (m, 6H) | LC-MS (ES, m/z): [M − H]− = 322.1 |
| 206 | 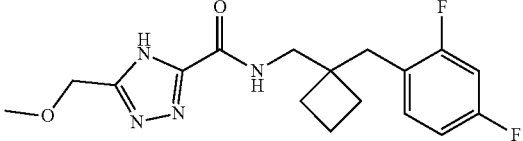<br>N-((1-(2,4-difluorobenzyl)cyclobutyl)methyl)-5-(methoxymethyl)-4H-1,2,4-triazole-3-carboxamide | LHC intermediate commercially available and Intermediate 14B | 1H-NMR (400 MHz, CHLOROFORM-D) δ 7.34 (t, J = 5.0 Hz, 1H), 7.19 (dd, J = 15.1, 8.7 Hz, 1H), 6.86-6.78 (m, 2H), 4.64 (s, 2H), 3.49 (t, J = 3.2 Hz, 5H), 2.79 (s, 2H), 1.97-1.78 (m, 6H) | LC-MS (ES, m/z): [M + H]+ = 351.0 |
| 207 | 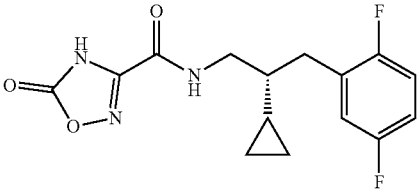<br>(R)-N-(2-cyclopropyl-3-(2,5-difluorophenyl)propyl)-5-oxo-4,5-dihydro-1,2,4-oxadiazole-3-carboxamide | LHS intermediate commercially available and Intermediate 12 | 1H-NMR (400 MHz, DMSO-D6) δ 9.03 (t, J = 6.0 Hz, 1H), 7.23-7.18 (m, 1H), 7.17-7.13 (m, 1H), 7.09-7.02 (m, 1H), 3.35 (t, J = 6.6 Hz, 1H), 3.25-3.18 (m, 1H), 2.74 (q, J = 6.9 Hz, 1H), 2.64 (q, J = 7.3 Hz, 1H), 1.22-1.13 (m, 1H), 0.55 (tt, J = 13.0, 4.8 Hz, 1H), 0.39-0.32 (m, 1H), 0.27-0.20 (m, 1H), 0.07 (td, J = 9.4, 4.9 Hz, 1H), −0.28 (td, J = 9.4, 5.0 Hz, 1H) | LC-MS (ES, m/z): [M − H]− = 322.1 |
| 208 | 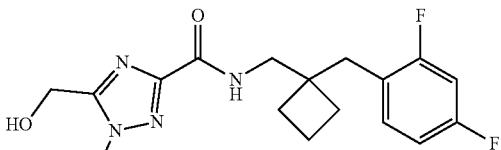<br>N-((1-(2,4-difluorobenzyl)cyclobutyl)methyl)-5-(hydroxymethyl)-1-methyl-1H-1,2,4-triazole-3-carboxamide | LHS intermediate commercially available and Intermediate 14B | 1H-NMR (400 MHz, CHLOROFORM-D) δ 7.21 (dd, J = 14.9, 8.5 Hz, 1H), 7.13 (s, 1H), 6.86-6.77 (m, 2H), 4.83 (s, 2H), 3.99 (s, 3H), 3.49 (d, J = 6.4 Hz, 2H), 2.79 (s, 2H), 2.02-1.81 (m, 6H) | LC-MS (ES, m/z): [M + H]+ = 351.3 |

TABLE 19-continued

| Example No | Name and Structure | Prepared using | 1H-NMR | LCMS |
|---|---|---|---|---|
| 209 | 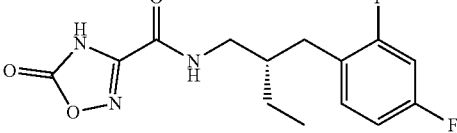<br>(S)-N-(2-(2,4-difluorobenzyl)butyl)-5-oxo-4,5-dihydro-1,2,4-oxadiazole-3-carboxamide | LHS intermediate commercially available and Intermediate 11 | 1H-NMR (400 MHz, DMSO-D6) δ 9.06 (t, J = 5.7 Hz, 1H), 7.35 (td, J = 8.7, 6.9 Hz, 1H), 7.18-7.13 (m, 1H), 7.03-6.98 (m, 1H), 3.24-3.08 (m, 2H), 2.57 (dd, J = 15.8, 7.1 Hz, 2H), 1.86 (td, J = 13.2, 6.7 Hz, 1H), 1.34-1.16 (m, 2H), 0.86 (t, J = 7.3 Hz, 3H) | LC-MS (ES, m/z): [M − H]− = 310.1 |

Method L: TBD Amidation

Example 210: N-(2-cyclopropyl-3-(2,4-difluorophenyl)-2-methylpropyl)-1-methyl-5-oxo-4,5-dihydro-1H-1,2,4-triazole-3-carboxamide

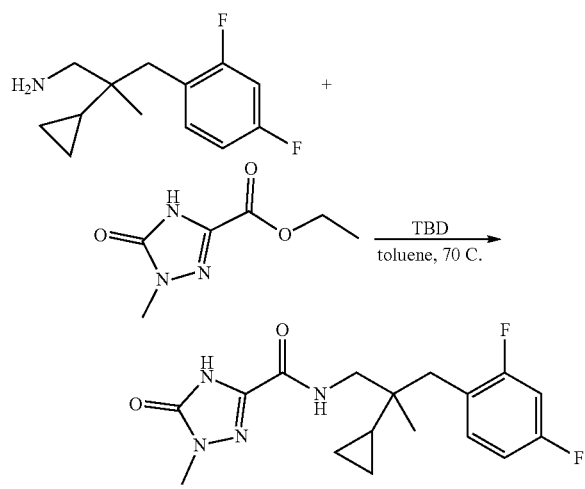

To ethyl 1-methyl-5-oxo-4H-1,2,4-triazole-3-carboxylate (prepared according to step 2, Intermediate 1, 500 mg, 2.19 mmol) and 2-cyclopropyl-3-(2,4-difluorophenyl)-2-methyl-propan-1-amine (Intermediate 39B, 494 mg, 2.19 mmol) in toluene (10 mL) was added 1,5,7-Triazabicyclo[4.4.0]dec-5-ene (TBD) (91 mg, 0.657 mmol), and the reaction mixture stirred at 70° C. overnight. Solvent was removed in vacuo to give a crude oil. This was dissolved in DMSO (4 mL) and purified by reverse phase flash column chromatography. Fractions containing product were combined and concentrated in vacuo. The residue was dissolved in 1:1 $CH_3CN$—$H_2O$ and lyophilised to give N-[2-cyclopropyl-3-(2,4-difluorophenyl)-2-methyl-propyl]-1-methyl-5-oxo-4H-1,2,4-triazole-3-carboxamide (299 mg, 0.824 mmol, 38%) as a white solid.

1H-NMR (400 MHz, DMSO-D6) δ 12.25 (s, 1H), 8.30 (t, J=6.4 Hz, 1H), 7.38 (q, J=8.1 Hz, 1H), 7.14 (td, J=9.8, 2.1 Hz, 1H), 6.99 (td, J=8.4, 2.4 Hz, 1H), 3.35 (s, 3H), 3.19 (dq, J=30.1, 6.6 Hz, 2H), 2.66-2.56 (m, 2H), 0.76-0.68 (m, 1H), 0.45 (s, 3H), 0.22-0.12 (m, 3H), −0.11-0.15 (m, 1H). LC-MS (ES, m/z): [M+H]+=351.2

The following compounds were prepared using analogous methods to those described for Example 210 (Method L).

TABLE 20

| Example No. | Name and Structure | Prepared Using | 1H-NMR | LCMS |
|---|---|---|---|---|
| 211 | 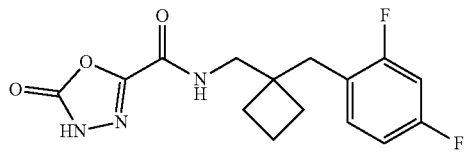<br>N-((1-(2,4-difluorobenzyl)cyclobutyl)methyl)-5-oxo-4,5-dihydro-1,3,4-oxadiazole-2-carboxamide | Material hydrolysed under purification and Intermediate 43 | 1H-NMR (400 MHz, DMSO-D6) δ 8.24 (s, 2H), 7.47-7.41 (m, 1H), 7.19 (td, J = 9.8, 2.4 Hz, 1H), 7.04 (td, J = 8.4, 2.4 Hz, 1H), 3.23 (d, J = 6.4 Hz, 2H), 2.69 (s, 2H), 1.84-1.56 (m, 6H) | LC-MS (ES, m/z): [M − H]− = 322.0 |

TABLE 20-continued

| Example No. | Name and Structure | Prepared Using | 1H-NMR | LCMS |
|---|---|---|---|---|
| 212 | 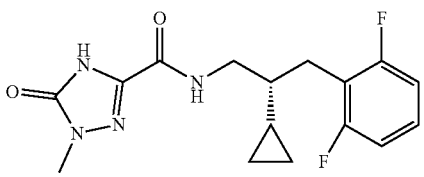<br>(R)-N-(2-cyclopropyl-3-(2,6-difluorophenyl)propyl)-1-methyl-5-oxo-4,5-dihydro-1H-1,2,4-triazole-3-carboxamide | Intermediate 1 and Intermediate 8 | 1H-NMR (400 MHz, DMSO-D6) δ 12.19 (s, 1H), 8.57 (t, J = 6.0 Hz, 1H), 7.33-7.26 (m, 1H), 7.06-6.99 (m, 2H), 3.37 (t, J = 6.6 Hz, 1H), 3.34 (s, 3H), 3.24-3.17 (m, 1H), 2.77-2.62 (m, 2H), 1.17-1.10 (m, 1H), 0.54 (q, J = 4.6 Hz, 1H), 0.36-0.29 (m, 1H), 0.21-0.14 (m, 1H), 0.02 (td, J = 9.4, 4.7 Hz, 1H), −0.45 (td, J = 9.5, 4.9 Hz, 1H) | LC-MS (ES,m/z): [M + H]+ = 337.1 |

Example 213: N-((1-(2,4-difluorobenzyl)cyclobutyl)methyl)-6-oxo-1,6-dihydropyrimidine-5-carboxamide

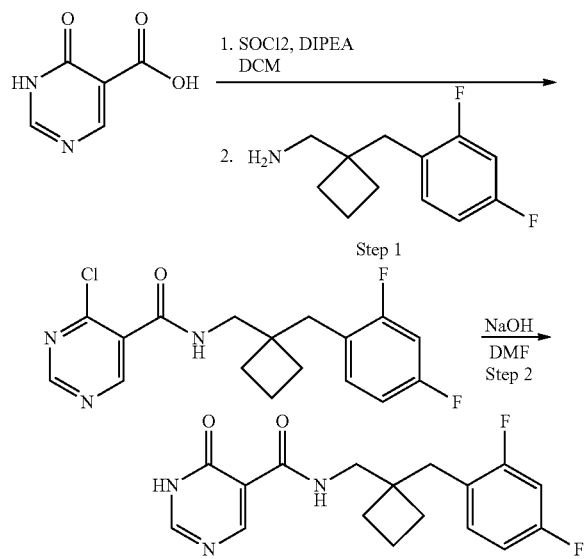

Step 1:

6-Oxo-1,6-dihydropyrimidine-5-carboxylic acid (commercially available, 75 mg, 0.535 mmol) was dissolved in a mixture of dichloromethane (5.0 mL) and a few of drops of DMF. Thionyl chloride (1.0 mL, 13.8 mmol) was added and the rm was stirred at room temperature for 2 h. The solution was evaporated to dryness, redissolved in DMF (3 mL) and DIPEA (0.280 mL, 1.61 mmol) and (1-(2,4-difluorobenzyl)cyclobutyl)methanamine (Intermediate 14B, 113 mg, 0.535 mmol) was added. The rm was stirred at room temperature for 3 days. Purification was achieved by prep-HPLC to afford 4-chloro-N-((1-(2,4-difluorobenzyl)cyclobutyl)methyl)pyrimidine-5-carboxamide (63 mg, 0.179 mmol, 33%) as a yellow gum.

Step 2:

4-chloro-N-((1-(2,4-difluorobenzyl)cyclobutyl)methyl)pyrimidine-5-carboxamide (63 mg, 0.179 mmol) was dissolved in N,N-dimethylformamide (4.0 mL). To this was added aqueous 1M NaOH (0.5 mL, 0.5 mmol) and the resulting mixture was heated to 50 C for 3 h.

The reaction mixture was neutralized with formic acid and purified by prep-HPLC. The fractions containing desired product were mixed, evaporated and the residue was lyophilised from MeCN:H2O=1:1 to afford N-((1-(2,4-difluorobenzyl)cyclobutyl)methyl)-6-oxo-1,6-dihydropyrimidine-5-carboxamide (8.6 mg, 0.0258 mmol, 14%) as a white solid.

1H-NMR (400 MHz, DMSO-D6) b 9.69 (s, 1H), 8.63 (s, 1H), 8.43 (s, 1H), 7.43-7.36 (m, 1H), 7.20 (td, J=9.8, 2.6 Hz, 1H), 7.05 (td, J=8.5, 2.6 Hz, 1H), 3.34 (s, 2H), 2.74 (s, 2H), 1.89-1.71 (i, 6H). LC-MS (ES, m/z): [M+H]+=334.1

Method J: T3P Coupling

The following compounds were prepared using analogous methods to those described for Example 183 (Method J).

TABLE 21

| Example No | Name and Structure | Prepared using | 1H-NMR | LCMS |
|---|---|---|---|---|
| 214 | 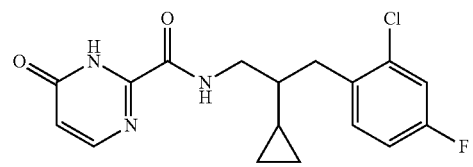<br>N-(3-(2-chloro-4-fluorophenyl)-2-cyclopropylpropyl)-6-oxo-1,6-dihydropyrimidine-2-carboxamide | LHS intermediate (commercially available) and intermediate 51B | 1H-NMR (400 MHz, DMSO-D6) δ 12.39 (s, 1H), 8.96 (t, J = 6.2 Hz, 1H), 7.93 (d, J = 6.4 Hz, 1H), 7.43 (dd, J = 8.7, 6.4 Hz, 1H), 7.34 (dd, J = 9.2, 2.7 Hz, 1H), 7.12 (td, J = 8.5, 2.7 Hz, 1H), 6.39 (d, J = 6.0 Hz, 1H), 3.38 (q, J = 6.6 Hz, 1H), 3.29-3.22 (m, 1H), 2.83 (q, J = 6.7 Hz, | LC-MS (ES, m/z): [M + H]+ = 350.1 |

TABLE 21-continued

| Example No | Name and Structure | Prepared using | 1H-NMR | LCMS |
|---|---|---|---|---|
| | | | 1H), 2.73 (dd, J = 13.7, 7.8 Hz, 1H), 1.29-1.19 (m, 1H), 0.60 (tt, J = 13.0, 5.0 Hz, 1H), 0.38-0.32 (m, 1H), 0.25-0.18 (m, 1H), 0.06 (td, J = 9.4, 5.0 Hz, 1H), -0.35 (td, J = 9.5, 5.2 Hz, 1H) | |
| 215 | 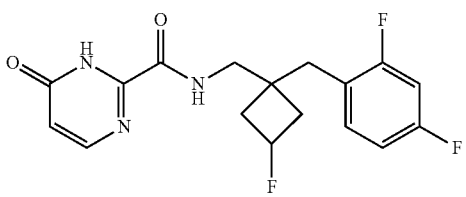<br>N-((1-(2,4-difluorobenzyl)-3-fluorocyclobutyl)methyl)-6-oxo-1,6-dihydropyrimidaine-2-carboxamide | LHS intermediate (commercially available) and intermediate 48C | 1H-NMR (400 MHz, DMSO-D6) δ 9.17-9.09 (m, 1H), 7.95 (s, 1H), 7.52 (dd, J = 15.7, 8.6 Hz, 0.2H), 7.46-7.40 (m, 0.8H), 7.26-7.20 (m, 1H), 7.07 (td, J = 8.5, 2.6 Hz, 1H), 6.51 (s, 0.3H), 6.42 (s, 0.8H), 5.06-4.85 (m, 0.8H), 4.70 (dt, J = 56.3, 6.8 Hz, 0.2H), 3.30 (s, 1.4H), 3.28 (s, 0.6H), 2.77 (s, 1.4H), 2.74 (s, 0.6H), 2.43-2.36 (m, 1.4H), 2.24-2.07 (m, 1.1H), 1.96-1.85 (m, 1.4H)<br>Mixture of isomers | LC-MS (ES, m/z): [M + H]+ = 352.2 |
| 216 | 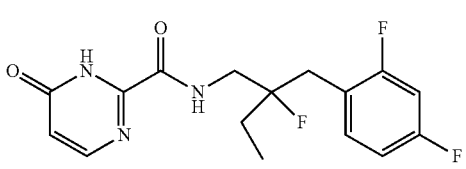<br>N-(2-(2,4-difluorobenzyl)-2-fluorobutyl)-6-oxo-1,6-dihydropyrimidine-2-carboxamide | LHS intermediate (commercially available) and intermediate 45 | 1H-NMR (400 MHz, DMSO-D6) δ 8.81 (t, J = 6.2 Hz, 1H), 7.95 (s, 1H), 7.39 (q, J = 7.9 Hz, 1H), 7.20 (td, J = 10.0, 2.6 Hz, 1H), 7.05 (td, J = 8.5, 2.4 Hz, 1H), 6.42 (s, 1H), 3.63-3.43 (m, 2H), 2.99 (d, J = 22.4 Hz, 2H), 1.64-1.47 (m, 2H), 0.93 (t, J = 7.6 Hz, 3H) | LC-MS (ES, m/z): [M + H]- = 338.1 |
| 217 | 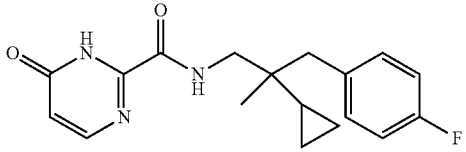<br>N-(2-cyclopropyl-3-(4-fluorophenyl)-2-methylpropyl)-6-oxo-1,6-dihydropyrimidine-2-carboxamide | LHS intermediate (commercially available) and intermediate 54B | 1H-NMR (400 MHz, DMSO-D6) δ 8.59 (t, J = 6.2 Hz, 1H), 7.94 (s, 1H), 7.26 (dd, J = 8.7, 5.5 Hz, 2H), 7.07 (t, J = 8.9 Hz, 2H), 6.41 (s, 1H), 3.25-3.17 (m, 2H), 2.59 (d, J = 3.7 Hz, 2H), 0.74-0.67 (m, 1H), 0.48 (s, 3H), 0.27-0.18 (m, 3H), 0.01--0.04 (m, 1H) | LC-MS (ES, m/z): [M - H]- = 320.1 |
| 218 | 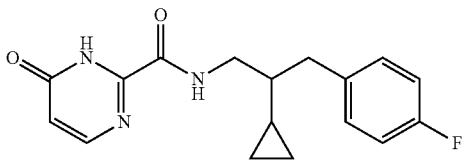<br>N-(2-cyclopropyl-3-(4-fluorophenyl)propyl)-6-oxo-1,6-dihydropyrimidine-2-carboxamide | LHS intermediate (commercially available) and intermediate 53B | 1H-NMR (400 MHz, DMSO-D6) δ 8.88 (t, J = 5.7 Hz, 1H), 7.88 (d, J = 3.7 Hz, 1H), 7.20 (dd, J = 8.5, 5.7 Hz, 2H), 7.02 (t, J = 8.7 Hz, 2H), 6.36 (s, 1H), 3.22 (dd, J = 8.9, 6.6 Hz, 2H), 2.61 (qd, J = 13.6, 6.6 Hz, 2H), 1.15 (d, J = 9.6 Hz, 1H), 0.5-0.40 (m, 1H), 0.32-0.21 (m, 2H), 0.05 (q, J = 4.4 Hz, 1H), -0.24 (q, J = 4.6 Hz, 1H) | LC-MS (ES, m/z): [M + H]+ = 330.2 |
| 219 | 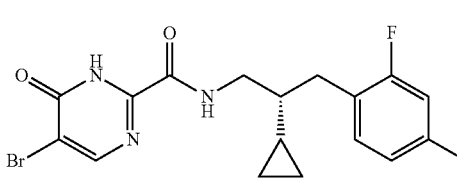<br>(R)-5-bromo-N-(2-cyclopropyl-3-(2,4-difluorophenyl)propyl)-6-oxo-1,6-dihydropyrimidine-2-carboxamide. Stereo chemistry inferred | Intermediate 55 and Intermediate 4 | 1H-NMR (400 MHz, DMSO-D6) δ 8.89 (s, 1H), 8.27 (s, 1H), 7.36 (dd, J = 15.6, 8.7 Hz, 1H), 7.13 (td, J = 10.0, 2.4 Hz, 1H), 6.98 (td, J = 8.4, 2.4 Hz, 1H), 3.31-3.21 (m, 2H), 2.74-2.59 (m, 2H), 1.17-1.12 (m, 1H), 0.55-0.50 (m, 1H), 0.38-0.31 (m, 1H), 0.23 (td, J = 8.6, 4.3 Hz, 1H), 0.06 (td, J = 9.2, 4.6 Hz, 1H), -0.32 (td, J = 9.3, 4.7 Hz, 1H) | LC-MS (ES, m/z): [M + H]- = 314.1 |

Method L: TBD Amidation

The following compounds were prepared using analogous methods to those described for Example 210 (Method L).

TABLE 22

| Example No. | Name and Structure | Prepared using | 1H-NMR | LCMS |
|---|---|---|---|---|
| 220 | 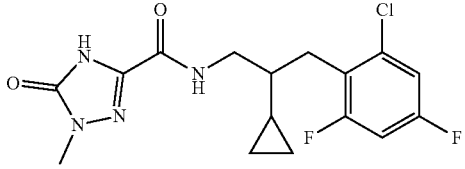<br>N-(3-(2-chloro-4,6-difluorophenyl)-2-cyclopropylpropyl)-1-methyl-5-oxo-4,5-dihydro-1H-1,2,4-triazole-3-carboxamide | Intermediate 1 and Intermediate 49B | 1H-NMR (400 MHz, DMSO-D6) δ 11.89 (s, 1H), 8.62 (t, J = 5.7 Hz, 1H), 7.32-7.24 (m, 2H), 3.39 (q, J = 6.6 Hz, 1H), 3.34 (s, 3H), 3.22-3.16 (m, 1H), 2.82-2.67 (m, 2H), 1.23-1.12 (m, 1H), 0.58 (dd, J = 22.4, 12.8 Hz, 1H), 0.36-0.29 (m, 1H), 0.20-0.14 (m, 1H), 0.01 (td, J = 9.2, 4.6 Hz, 1H), -0.49 (td, J = 9.2, 4.5 Hz, 1H) | LC-MS (ES, m/z): [M + H]+ = 371.3 |
| 221 | N-(2-(2,4-difluorobenzyl)-4,4,-trifluorobutyl)-1-methyl-5-oxo-4,5-dihydro-1H-1,2,4-triazole-3-carboxamide<br>Reaction mixture stirred at 80° C. overnight | Intermediate 1 and Intermediate 50B | 1H-NMR (400 MHz, DMSO-D6) δ 12.23 (s, 1H), 8.78 (t, J = 6.0 Hz, 1H), 7.39 (td, J = 8.5, 6.7 Hz, 1H), 7.19 (td, J = 9.8, 2.3 Hz, 1H), 7.03 (td, J = 8.5, 2.6 Hz, 1H), 3.34 (s, 3H), 3.19 (t, J = 6.4 Hz, 2H), 2.67 (d, J= 6.9 Hz, 2H), 2.47-2.08 (m, 3H) | LC-MS (ES, m/z): [M + H]+ = 379.2 |
| 222 | N-(3-(4-chloro-2-fluorophenyl)-2-cyclopropylpropyl)-1-methyl-5-oxo-4,5-dihydro-1H-1,2,4-triazole-3-carboxamide | Intermediate 1 and Intermediate 52B | 1H-NMR (400 MHz, DMSO-D6) δ 12.20 (s, 1H), 8.53 (t, J = 6.2 Hz, 1H), 7.35 (t, J = 8.2 Hz, 1H), 7.31 (dd, J = 10.1, 1.8 Hz, 1H), 7.18 (dd, J = 8.2, 1.8 Hz, 1H), 3.34 (s, 3H), 3.25-3.30 (1H), 3.14-3.24 (1H), 2.75-2.58 (m, 2H), 1.19-1.10 (m, 1H), 0.57-0.48 (m, 1H), 0.37-0.30 (m, 1H), 0.25-0.19 (m, 1H), 0.04 (td, J = 9.4, 5.0 Hz, 1H), -0.32 (td, J = 9.4, 5.0 Hz, 1H) | LC-MS (ES, m/z): [M - H]- = 351.1 |

Examples 223 and 224: N-((3S)-3-(2,4-difluorobenzyl)pentan-2-yl)-1-methyl-5-oxo-4,5-dihydro-1H-1,2,4-triazole-3-carboxamide Diastereomer A and N-((3S)-3-(2,4-difluorobenzyl)pentan-2-yl)-1-methyl-5-oxo-4,5-dihydro-1H-1,2,4-triazole-3-carboxamide Diastereomer B Examples 225 and 226: N-((2S)-2-cyclopropyl-3-(2,4-difluorophenyl)butyl)-6-oxo-1,6-dihydropyrimidine-2-carboxamide Diastereomer A and N-((2S)-2-cyclopropyl-3-(2,4-difluorophenyl)butyl)-6-oxo-1,6-dihydropyrimidine-2-carboxamide Diastereomer B

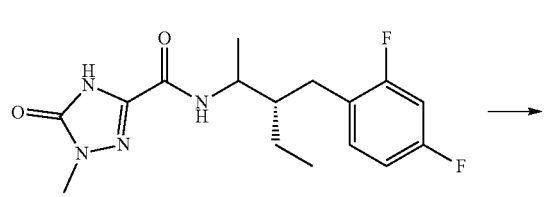

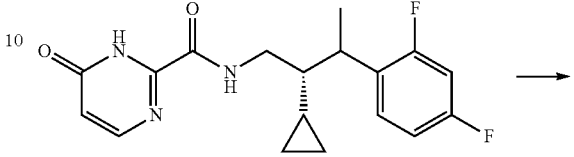

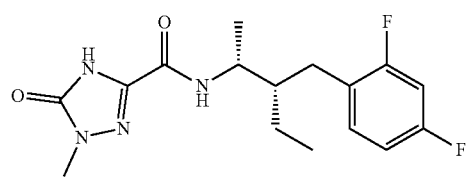 [SMILES: CCC(Cc1ccc(F)cc1F)CN(C)C(=O)c1nn(C)c(=O)[nH]1]

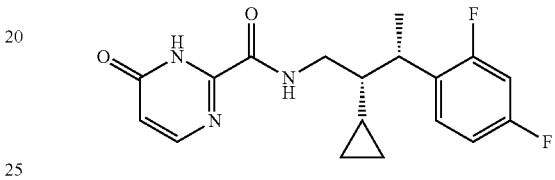

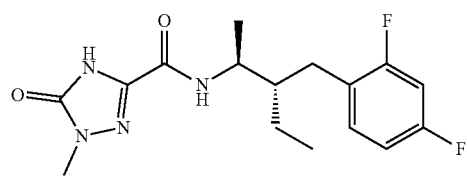

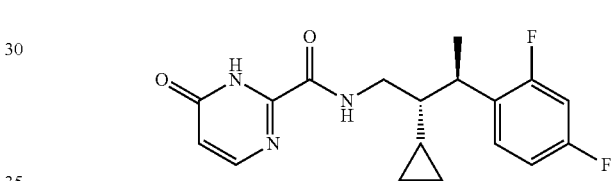

N-[(3S)-3-[(2,4-difluorophenyl)methyl]pentan-2-yl]-1-methyl-5-oxo-4H-1,2,4-triazole-3-carboxamide (Example 141) (45 mg, 0.13 mmol) was separated by Prep-HPLC (Column: XA-CHIRAL ART Cellulose-SC, 50*4.6 mm, 3 µm; Mobile Phase: 15% EtOH (containing 0.5% FA)/Hexane; Flow rate: 1.0 mL/min; Wavelength: 254 nm) to afford:

Diastereomer A (Rt=1.2 min.) as a white solid (22 mg, 49% yield)

LCMS (ES, m/z): 339 [M+H]$^+$, method LCMS11 $^1$H NMR (400 MHz, DMSO-d$_6$, ppm) δ 8.37 (d, J=8.4 Hz, 1H), 7.32 (q, J=8.4 Hz, 1H), 7.17-7.11 (m, 1H), 7.02-6.97 (m, 1H), 4.07-4.03 (m, 1H), 3.34 (s, 3H), 2.72-2.67 (m, 1H), 2.43-2.37 (m, 1H), 1.79-1.74 (m, 1H), 1.31-1.16 (m, 2H), 1.11 (d, J=4.0 Hz, 3H), 0.81 (t, J=7.4 Hz, 3H).

Diastereomer B (Rt=1.6 min.) as a white solid (4.5 mg, 10% yield)

LCMS (ES, m/z): 339 [M+H]$^+$, method LCMS11

$^1$H NMR (400 MHz, DMSO-d$_6$, ppm) b 12.19 (s, 1H), 8.38 (d, J=8.4 Hz, 1H), 7.32 (q, J=8.4 Hz, 1H), 7.17-7.14 (m, 1H), 7.02-6.99 (m, 1H), 4.01-3.99 (m, 1H), 3.34 (s, 3H), 2.61-2.60 (m, 1H), 2.51-2.50 (m, 1H), 1.76-1.71 (m, 1H), 1.30-1.23 (m, 2H), 1.13 (d, J=4.2 Hz, 3H), 0.84 (t, J=7.6 Hz, 3H).

One of Diastereoisomers A and B is (N-((2S,3S)-3-(2,4-difluorobenzyl)pentan-2-yl)-1-methyl-5-oxo-4,5-dihydro-1H-1,2,4-triazole-3-carboxamide and the other is N-((2R,3S)-3-(2,4-difluorobenzyl)pentan-2-yl)-1-methyl-5-oxo-4,5-dihydro-1H-1,2,4-triazole-3-carboxamide.

N-[(2S)-2-Cyclopropyl-3-(2,4-difluorophenyl)butyl]-4-oxo-3H-pyrimidine-2-carboxamide (Example 188) (34 mg, 0.1 mmol) was separated by Prep-HPLC (Column: XA-CHIRALPAK IG, 3*25 cm, 5 µm; Mobile Phase: 50% EtOH (containing 0.1% TFA)/3:1 Hexane:DCM; Flow rate: 30 mL/min; Wavelength: 254 nm) to afford:

Diastereomer A (Rt=13 min.) as a white solid (17 mg, 51% yield)

LCMS (ES, m/z): 348 [M+H]$^+$, method LCMS10

$^1$H NMR (300 MHz, DMSO-d$_6$, ppm) δ 8.87 (t, J=6.2 Hz, 1H), 7.93 (d, J=6.7 Hz, 1H), 7.45-7.41 (m, 1H), 7.29-6.93 (m, 2H), 6.41 (d, J=6.7 Hz, 1H), 3.46-3.01 (m, 3H), 1.33 (d, J=7.1 Hz, 3H), 1.26-1.08 (m, 1H), 0.58-0.54 (m, 1H), 0.37-034 (m, 2H), 0.09-0.05 (m, 1H), −0.20−−0.24 (m, 1H).

Diastereomer B (Rt=10 min.) as a white solid (6.9 mg, 20% yield)

LCMS (ES, m/z): 348 [M+H]$^+$, method LCMS10

$^1$H NMR (300 MHz, DMSO-d$_6$, ppm) δ 12.59 (br, s, 1H), 8.75 (t, J=6.1 Hz, 1H), 7.92 (d, J=6.8 Hz, 1H), 7.42-7.37 (m, 1H), 7.14-7.09 (m, 1H), 7.00-6'96 (m, 1H), 6.57-6.29 (m, 1H), 3.40-3.36 (m, 1H), 3.33-3.23 (m, 1H), 3.24-3.15 (m, 1H), 1.33 (d, J=7.2 Hz, 3H), 1.22-1.11 (m, 1H), 0.55-0.51 (m, 1H), 0.38-0.33 (m, 1H), 0.27-0.22 (m, 1H), 0.11-0.08 (m, 1H), −0.16−−0.20 (m, 1H).

One of Diastereoisomers A and B is (N-((2S,3R)-2-cyclopropyl-3-(2,4-difluorophenyl)butyl)-6-oxo-1,6-dihydropyrimidine-2-carboxamide and the other is (N-((2S,3S)-2-cyclopropyl-3-(2,4-difluorophenyl)butyl)-6-oxo-1,6-dihydropyrimidine-2-carboxamide.

Examples 227 and 228: N-[2-cyclopropyl-2-methyl-3-(2,4,6-trifluorophenyl)propyl]-1-methyl-5-oxo-4H-1,2,4-triazole-3-carboxamide Enantiomer A and N-[2-cyclopropyl-2-methyl-3-(2,4,6-trifluorophenyl)propyl]-1-methyl-5-oxo-4H-1,2,4-triazole-3-carboxamide Enantiomer B

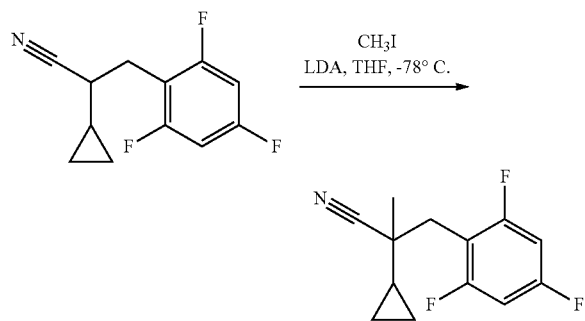

To a solution of 2-cyclopropyl-3-(2,4,6-trifluorophenyl)propanenitrile (Intermediate or Commercially Available ?) (1.0 g, 4.4 mmol) in THF (10 mL), was added 2M LDA in THF (3.3 mL, 6.6 mmol) dropwise at −78° C. The resulting mixture was stirred for 30 min. at −78° C. then CH₃I (0.94 g, 6.6 mmol) was added, and this was stirred for 30 min. at room temperature. The reaction was quenched with sat. aqueous NH₄Cl solution at 0° C. and extracted with EtOAc (2×50 mL). The combined organic layers were washed with brine (35 mL), dried over anhydrous Na₂SO₄ and concentrated. The residue was purified by silica gel column chromatography, eluting with n-hexane/EtOAc (10/1) to afford 3-cyclopropyl-3-methyl-4-(2,4,6-trifluorophenyl)butanenitrile) (400 mg, 35% yield) as a yellow green oil.

GCMS (ES, m/z): 239 [MS]

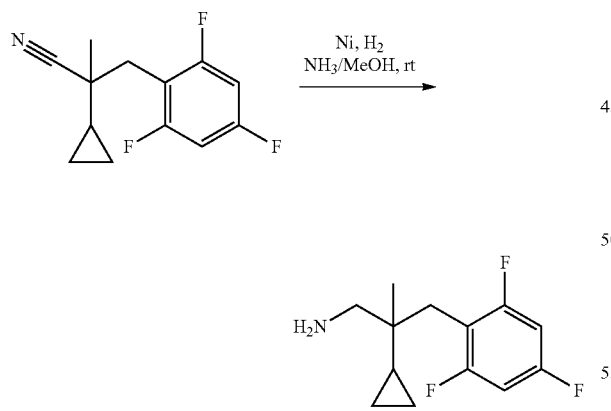

To a solution of 3-cyclopropyl-3-methyl-4-(2,4,6-trifluorophenyl)butanenitrile (0.4 g, 1.5 mmol) in 7M NH₃ in MeOH (4 mL) was added Raney nickel (0.4 g, 6.8 mmol). The mixture was stirred overnight under hydrogen atmosphere, then filtered, washed with MeOH (2×5 mL) and concentrated to afford 2-cyclopropyl-2-methyl-3-(2,4,6-trifluorophenyl)propan-1-amine) (300 mg, 73% yield) as a green oil.

LCMS (ES, m/z): 244 [M+H]⁺

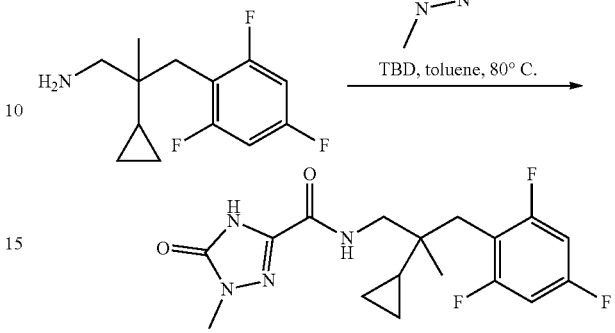

To a solution of 2-cyclopropyl-2-methyl-3-(2,4,6-trifluorophenyl)propan-1-amine (0.28 g, 1.1 mmol) in toluene (2 mL) was added 5-acetyl-2-methyl-4H-1,2,4-triazol-3-one (0.15 g, 1.1 mmol) and TBD (0.49 g, 3.5 mmol). The mixture was stirred overnight at 80° C. then concentrated. The residue was purified by Prep-HPLC (Column: YMC-Actus Triart C18, 30*150 mm, 5 μm; Mobile Phase: 24-49% MeCN/10 mmol/L aqueous NH₄HCO₃+0.1% NH₃·H₂O; Flow rate: 30 mL/min) to afford N-[2-cyclopropyl-2-methyl-3-(2,4,6-trifluorophenyl)propyl]-1-methyl-5-oxo-4H-1,2,4-triazole-3-carboxamide (60 mg, 14% yield) as a white solid.

LCMS (ES, m/z): 369 [M+H]⁺

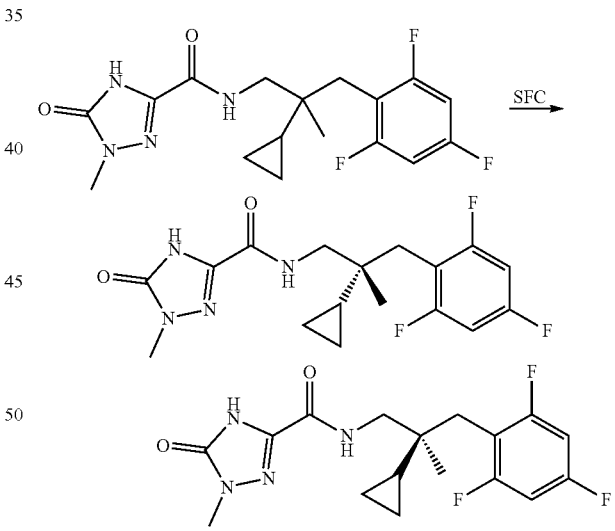

N-[2-cyclopropyl-2-methyl-3-(2,4,6-trifluorophenyl)propyl]-1-methyl-5-oxo-4H-1,2,4-triazole-3-carboxamide (60 mg, 0.1 mmol) was separated by Prep-SFC (Column: XA-CHIRALPAK IF, 3*25 cm, 5 μm; Mobile Phase: 30% 1:1 MeOH:DCM/CO₂; Flow rate: 80 mL/min; Wavelength: 220 nm) to afford:

Enantiomer A (Rt=5.9 min.) was isolated as a white solid (17 mg, 27% yield)

LCMS (ES, m/z): 369 [M+H]⁺, method LCMS01

¹H NMR (300 MHz, DMSO-d₆, ppm) δ 8.40 (t, J=6.6 Hz, 1H), 7.14 (t, J=8.6 Hz, 2H), 3.31 (s, 3H), 3.29-3.18 (m, 2H), 2.74-2.60 (m, 2H), 0.88-0.71 (m, 1H), 0.45 (s, 3H), 0.29-0.18 (m, 1H), 0.15-0.03 (m, 2H), −0.08−−0.14 (m, 1H).

Enantiomer B (Rt=6.9 min.) was isolated as a white solid (18 mg, 29% yield)

LCMS (ES, m/z): 369 [M+H]$^+$, method LCMS01

$^1$H NMR (300 MHz, DMSO-d$_6$, ppm) δ 8.40 (t, J=6.6 Hz, 1H), 7.14 (t, J=8.6 Hz, 2H), 3.32 (s, 3H), 3.30-3.17 (m, 2H), 2.71-2.58 (m, 2H), 0.76 (q, J=7.1 Hz, 1H), 0.45 (s, 3H), 0.25-0.18 (m, 1H), 0.15-0.05 (m, 2H), −0.08−−0.13 (m, 1H).

One of Enantiomers A and B is (S)—N-[2-cyclopropyl-2-methyl-3-(2,4,6-trifluorophenyl)propyl]-1-methyl-5-oxo-4H-1,2,4-triazole-3-carboxamide and the other is (R)—N-[2-cyclopropyl-2-methyl-3-(2,4,6-trifluorophenyl)propyl]-1-methyl-5-oxo-4H-1,2,4-triazole-3-carboxamide.

In the Examples of Table 23, the Examples listed in the second column as prepared above were separated. Assignment of the stereochemistry was either inferred for the eutomer in case of R$^4$ is hydrogen or the eutomer was called Enantiomer A in case of both R$^4$ and R$^5$ not being hydrogens.

TABLE 23

| From Example No. | Example No. | Name and Structure | LCMS | 1H-NMR | Separation conditions | Retention time / min. |
|---|---|---|---|---|---|---|
| | | | | Enantiomer A | | |
| 229 and 230 | 120 | 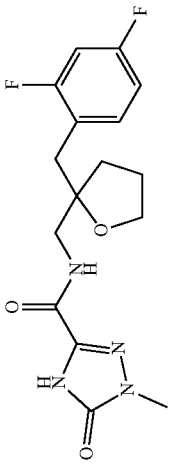<br>N-((2-(2,4-difluorobenzyl)tetrahydrofuran-2-yl)methyl)-1-methyl-5-oxo-4,5-dihydro-1H-1,2,4-triazole-3-carboxamide<br>Enantiomer A<br><br>N-((2-(2,4-difluorobenzyl)tetrahydrofuran-2-yl)methyl)-1-methyl-5-oxo-4,5-dihydro-1H-1,2,4-triazole-3-carboxamide<br>Enantiomer B<br><br>One of Enantiomers A and B is (S)-N-((2-(2,4-difluorobenzyl)tetrahydrofuran-2-yl)methyl)-1-methyl-5-oxo-4,5-dihydro-1H-1,2,4-trizole-3-carboxamide and the other is (R)-N-((2-(2,4-difluorobenzyl)tetrahydrofuran-2-yl)methyl)-1-methyl-5-oxo-4,5-dihydro-1H-1,2,4-trizole-3-carboxamide | 353 [M + H]+ | 1H NMR (400 MHz, DMSO-d6, ppm) δ 12.29 (s, 1H), 8.23 (t, J = 6.4 Hz, 1H), 7.45-7.39 (m, 1H), 7.20-7.13 (m, 1H), 7.13-6.96 (m, 1H), 3.75-3.61 (m, 1H), 3.56-3.50 (m, 1H), 3.10-3.29 (m, 4H), 3.27-3.20 (m, 1H), 2.77 (q, J = 14.0 Hz, 2H), 1.80-1.75 (m, 2H), 1.65-1.46 (m, 2H). | Column: XA-CHIRALPAKIC, 2*25 cm, 5 μm; Mobile Phase: 30% EtOH/ Hexane (0.1% FA); Flow rate: 25 mL/min; Wavelength: 254 nm | 10.3 |
| | | | | Enantiomer B | | |
| | | | 353 [M + H]+ | 1H NMR (400 MHz, DMSO-d6, ppm) δ 12.29 (s, 1H), 8.22 (t, J = 6.3 Hz, 1H), 7.45-7.39 (m, 1H), 7.20-7.13 (m, 1H), 7.06-6.92 (m, 1H), 3.83-3.65 (m, 1H), 3.57-3.48 (m, 1H), 3.10-3.29 (m, 4H), 3.25-3.12 (m, 1H), 2.77 (q, J = 14.0 Hz, 2H), 1.86-1.68 (m, 2H), 1.62-1.44 (m, 2H). | Column: XA-CHIRALPAKIC, 2*25 cm, 5 μm; Mobile Phase: 30% EtOH/ Hexane (0.1% FA); Flow rate: 25 mL/min; Wavelength: 254 nm | 12.5 |

TABLE 23-continued

| Example No. | From Example No. | Name and Structure | LCMS | 1H-NMR | Separation conditions | Retention time / min. |
|---|---|---|---|---|---|---|
| | | | | Enantiomer B | | |
| 231 and 232 | 123 | 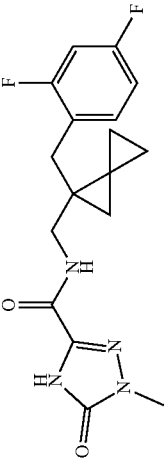<br><br>N-((1-(2,4-difluorobenzyl)spiro[2.2]pentan-1-yl)methyl)-1-methyl-5-oxo-4,5-dihydro-1H-1,2,4-triazole-3-carboxamide Enantiomer A<br>N-((1-(2,4-difluorobenzyl) spiro[2.2]pentan-1-yl)methyl)-1-methyl-5-oxo-4,5-dihydro-1H-1,2,4-triazole-3-carboxamide Enantiomer B<br>One of Enantiomers A and B is (S)-N-((1-(2,4-difluorobenzyl)spiro[2.2]pentan-1-yl)methyl)-1-methyl-5-oxo-4,5-dihydro-1H-1,2,4-triazole-3-carboxamide and the other is (R)-N-((1-(2,4-difluorobenzyl) spiro[2.2]pentan-1-yl)methyl)-1-methyl-5-oxo-4,5-dihydro-1H-1,2,4- | 349 [M + H]+ | $^1$H NMR (400 MHz, DMSO-d$_6$, ppm) δ 12.24 (br, s, 1H), 8.40 (br, s, 1H), 7.38-7.29 (m, 1H), 7.17-7.08 (m, 1H), 7.02-6.95 (m, 1H), 3.30 (s, 3H), 3.21 (d, J = 6.0 Hz, 2H), 2.80 (d, J = 15.0 Hz, 1H), 2.63 (d, J = 14.5 Hz, 1H), 0.95-0.85 (m, 2H), 0.80-0.73 (m, 2H), 0.67-0.60 (m, 2H). | Column: YMC Cellulose-SB, 100*4.6mm, 3 um 106YB00278; Mobile Phase A: 40% EtOH (containing 0.1% MIPA)/ 3:1 n-Hexane:DCM; Flow rate: 80 mL/min; Wavelength: 254 nm | 8.6 |
| | | | | Enantiomer A | | |
| | | | 349 [M + H]+ | $^1$H NMR (400 MHz, DMSO-d$_6$, ppm) 0 12.23 (s, 1H), 8.38 (s, 1H), 7.42-7.23 (m, 1H), 7.17-7.08 (m, 1H), 7.06-6.89 (m, 1H), 3.30 (s, 3H), 3.21 (d, J = 6.0 Hz, 2H), 2.80 (d, J = 15.0 Hz, 1H), 2.63 (d, J = 14.5 Hz, 1H), 0.95-0.85 (m, 2H), 0.80-0.73 (m, 2H), 0.67-0.60 (m, 2H). | Column: YMC Cellulose-SB, 100*4.6mm, 3 μm 106YB00278; Mobile Phase A: 40% EtOH (containing 0.1% MIPA)/ 3:1 n-Hexane:DCM; Flow rate: 80 mL/min; Wavelength: 254 nm | 10.4 |

TABLE 23-continued

| Example No. | From Example No. | Name and Structure | LCMS | 1H-NMR | Separation conditions | Retention time / min. |
|---|---|---|---|---|---|---|
| 233 and 234 | 194 | triazole-3-carboxamide<br><br>[Structure of compound with 2,4-difluorobenzyl, spiro[2.2]pentane, and 5-oxo-4,5-dihydro-1,2,4-oxadiazole-3-carboxamide groups]<br><br>N-((1-(2,4-difluorobenzyl)spiro[2.2]pentan-1-yl)methyl)-5-oxo-4,5-dihydro-1,2,4-oxadiazole-3-carboxamide Enantiomer A<br><br>N-((1-(2,4-difluorobenzyl)spiro[2.2]pentan-1-yl)methyl)-5-oxo-4,5-dihydro-1,2,4-oxadiazole-3-carboxamide Enantiomer B<br><br>One of Enantiomers A and B is (S)-N-((1-(2,4-difluorobenzyl)spiro[2.2]pentan-1-yl)methyl)-5-oxo-4,5-dihydro-1,2,4-oxadiazole-3-carboxamide and the other is (R)-N-((1-(2,4-difluorobenzyl)spiro[2.2]pentan-1-yl)methyl)-5-oxo-4,5-dihydro-1,2,4-oxadiazole-3-carboxamide | 336 [M + H]⁺ | Enantiomer A<br>¹H NMR (400 MHz, DMSO-d₆, ppm) δ 13.14 (br, s, 1H), 8.84 (s, 1H), 7.35-7.32 (m, 1H), 7.19-7.14 (m, 1H), 7.08-6.95 (m, 1H), 3.26-3.22 (m, 2H), 2.84 (d, J = 15.0 Hz, 1H), 2.74-2.62 (m, 1H), 0.95-0.92 (m, 2H), 0.82-0.79 (m, 2H), 0.68-0.64 (m, 2H). | Column: CHIRALPAK ADH, 2*25 cm, 5 μm; Mobile Phase: 30% EtOH/Hexane (containing 0.1% FA); Flow rate: 25 mL/min; Wavelength: 254 nm | 4.3 |
| | | | 336 [M + H]⁺ | Enantiomer B<br>¹H NMR (400 MHz, DMSO-d₆, ppm) δ 13.15 (br, s, 1H), 8.71 (s, 1H), 7.34 (q, J = 8.1 Hz, 1H), 7.17-7.14 (m, 1H), 7.04-6.99 (m, 1H), 3.25-3.22 (m, 2H), 2.83 (d, J = 15.0 Hz, 1H), 2.64 (d, J = 15.0 Hz, 1H), 0.95-0.92 (m, 2H), 0.82-0.79 (m, 2H), 0.68-0.65 (m, 2H). | Column: CHIRALPAK ADH, 2*25 cm, 5 μm; Mobile Phase: 30% EtOH/Hexane (containing 0.1% FA); Flow rate: 25 mL/min; Wavelength: 254 nm | 5.3 |

TABLE 23-continued

| From Example No. | Example No. | Name and Structure | LCMS | 1H-NMR | Separation conditions | Retention time / min. |
|---|---|---|---|---|---|---|
| 235 and 236 | 186 | 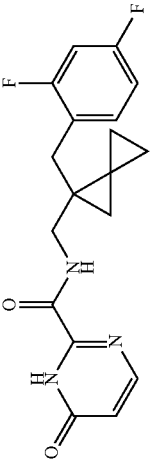<br>N-((1-(2,4-difluorobenzyl)sprio[2.2]pentan-1-yl)methyl)-6-oxo-1,6-dihydropyrimidine-2-carboxamide Enatiomer A<br><br>N-((1-(2,4-difluorobenzyl)spiro[2.2]pentan-1-yl)methyl)-6-oxo-1,6-dihydropyrimidine-2-carboxamide Enantiomer B<br><br>One of Enantiomers A and B is (S)-N-((1-(2,4-difluorobenzyl)spiro[2.2]pentan-1-yl)methyl)-6-oxo-1,6-dihydropyrimidine-2-carboxamide and the otehr is (R)-N-((1-(2,4-difluorobenzyl)spiro[2.2]pentan-1-yl)methyl)-6-oxo-1,6-dihydropyrimidine-2-carboxamide | 346 [M + H]⁺ | Enantiomer A<br>¹H NMR (300 MHz, DMSO-d₆, ppm) δ 12.59 (br, s, 1H), 8.73 (s, 1H), 7.92 (s, 1H), 7.43-7.23 (m, 1H), 7.21-7.05 (m, 1H), 7.03-6.90 (m, 1H), 6.41 (s, 1H), 3.30-3.23 (m, 1H), 3.20-3.16 (m, 1H), 2.81 (d, J = 15.0 Hz, 1H), 2.64 (d, J = 14.9 Hz, 1H), 0.98-0.92 (m, 2H), 0.81-0.76 (m, 2H), 0.68-0.64 (m, 2H). | SFC Column: CHIRALPAKIG, 3*25 cm, 5 μm; Mobile Phase: 40% MeOH:DCM 1:1 (0.1% 2M NH₃—MeOH)/CO₂; Flow rate: 80 mL/min; Wavelength: 220 nm | 5.3 |
| | | | 346 [M + H]⁺ | Enantiomer B<br>¹H NMR (300 MHz, DMSO-d₆, ppm) δ 12.59 (br, s, 1H), 8.73 (s, 1H), 7.92 (s, 1H), 7.35-7.33 (m, 1H), 7.15-7.11 (m, 1H), 7.05-6.85 (m, 1H), 6.40 (s, 1H), 3.30-3.23 (m, 1H), 3.20-3.16 (m, 1H), 2.81 (d, J = 14.9 Hz, 1H), 2.64 (d, J = 15.0 Hz, 1H), 0.98-0.95 (m, 2H), 0.94-0.92 (m, 1H), 0.81-0.74 (m, 2H), 0.67-0.64 (m, 2H). | SFC Column: CHIRALPAKIG, 3*25 cm, 5 μm; Mobile Phase: 40% MeOH: DCM 1:1 (0.1% 2M NH₃—MeOH)/CO₂; Flow rate: 80 mL/min; Wavelength: 220 nm | 6.2 |

TABLE 23-continued

| From Example No. | Example No. | Name and Structure | LCMS | 1H-NMR | Separation conditions | Retention time / min. |
|---|---|---|---|---|---|---|
| 237 and 238 | 196 | 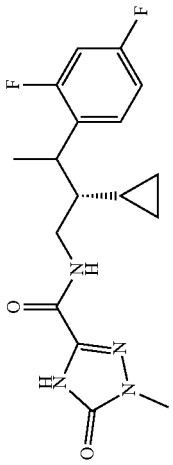  N-((2S)-2-cyclopropyl-3-(2,4-difluorophenyl)butyl)-1-methyl-5-oxo-4,5-dihydro-1H-1,2,4-triazole-3-carboxamide Diastereoisomer A  N-((2S)-2-cyclopropyl-3-(2,4-difluorophenyl)butyl)-1-methyl-5-oxo-4,5-dihydro-1H-1,2,4-triazole-3-carboxamide Diastereoisomer B  One of Diastereoisomer A and B is N-((2S,3R)-2-cyclopropyl-3-(2,4-difluorophenyl)butyl)-1-methyl-5-oxo-4,5-dihydro-1H-1,2,4-triazole-3-carboxamide and the other is N-((2S,3S)-2-cyclopropyl-3-(2,4-difluorophenyl)butyl)-1-methyl-5-oxo-4,5-dihydro-1H-1,2,4-triazole-3-carboxamide | 351 [M + H]+ | Diastereoisomer A<br>1H NMR (300 MHz, DMSO-d6, ppm) δ 12.22 (s, 1H), 8.45 (t, J = 6.0 Hz, 1H), 7.42-7.39 (m, 1H), 7.08-7.05 (m, 2H), 3.34-3.24 (m, 3H), 3.21-3.18 (m, 3H), 1.32 (d, J = 7.2 Hz, 3H), 1.15-1.13 (m, 1H), 0.55-050 (m, 1H), 0.37-0.33 (m, 2H), 0.06-0.01 (m, 1H), -0.15--0.38 (m, 1H). | Column: CHIRAL ART Cellulose-SC, 3*25cm 5um; Mobile Phase A: 30% EtOH (containing 0.1% FA)/ Hexane; Flow rate: 35 mL/min; Wavelength: 254 nm | 10.8 |
| | | | 351 [M + H]+ | Diastereoisomer B<br>1H NMR (300 MHz, DMSO-d6, ppm) δ 12.21 (s, 1H), 8.34 (t, J = 6.0 Hz, 1H), 7.38 (q, J = 8.1 Hz, 1H), 7.23-7.20 (m, 1H), 7.10-6.98 (m,1H), 3.31 (s, 3H), 3.25-3.23 (m, 1H), 3.19-3.17 (m, 2H), 1.31 (d, J = 7.2 Hz, 3H), 1.14-1.11 (m, 1H), 0.55-0.49 (m, 1H), 0.35-0.32 (m, 1H), 0.25-0.15 (m, 1H), 0.10-0.03 (m, 1H), -0.16--0.27 (m, 1H). | Column: CHIRAL ART Cellulose-SC, 3*25cm 5 um; Mobile Phase A: 30% EtOH (containing 0.1% FA)/ Hexane; Flow rate: 35 mL/min; Wavelength: 254 nm | 12 |

TABLE 23-continued

| From Example No. | Example No. | Name and Structure | LCMS | 1H-NMR | Separation conditions | Retention time / min. |
|---|---|---|---|---|---|---|
| | | | | Enantiomer A | | |
| 239 and 240 | 210 | 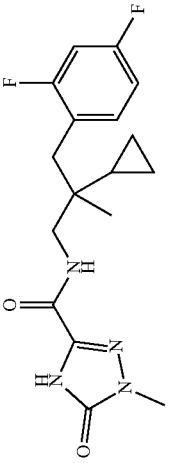<br>N-(2-cyclopropyl-3-(2,4-difluorophenyl)-2-methylpropyl)-1-methyl-5-oxo-4,5-dihydro-1H-1,2,4-triazole-3-carboxamide Enantiomer A<br>N-(2-cyclopropyl-3-(2,4-difluorophenyl)-2-methylpropyl)-1-methyl-5-oxo-4,5-dihydro-1H-1,2,4-triazole-3-carboxamide Enantiomer B<br>One of Enantiomers A and B is (S)- N-(2-cyclopropyl-3-(2,4-difluorophenyl)-2-methylpropyl)-1-methyl-5-oxo-4,5-dihydro-1H-1,2,4-triazole-3-carboxamide and the other is (R)-N-(2-cyclopropyl-3-(2,4-difluorophenyl)-2-methylpropyl)-1-methyl-5-oxo-4,5-dihydro-1H-1,2,4-triazole-3-carboxamide | 351 [M + H]$^+$ | $^1$H NMR (300 MHz, DMSO-d$_6$, ppm) δ 12.29 (s, 1H), 8.4-8.22 (m, 1H), 7.54-7.37 (m, 1H), 7.21-7.10 (m, 1H), 7.05-6.96 (m, 1H), 3.36 (s, 3H), 3.28-3.10 (m, 2H), 2.70-2.54 (m, 2H), 0.84-0.62 (m, 1H), 0.46 (s, 3H), 0.29-0.05 (m, 3H), -0.05–0.18 (m, 1H). | Column: CHIRAL ART Amylose-C NEO, 3*25 cm, 5 μm; Mobile Phase: 40% MeOH (containing 0.1% 2M NH$_3$—MeOH)/ CO$_2$; Flow rate: 80 mL/min; Wavelength: 220 nm | 6.8 |
| | | | | Enantiomer B | | |
| | | | 351 [M + H]$^+$ | $^1$H NMR (300 MHz, DMSO-d$_6$, ppm) δ 12.27 (s, 1H), 8.39-8.24 (m, 1H), 7.46-7.30 (m, 1H), 7.23-7.07 (m, 1H), 7.05-6.89 (m, 1H), 3.36 (s, 3H), 3.19-3.11 (m, 2H), 2.62-2.43 (m, 2H), 0.81-0.67 (m, 1H), 0.46 (s, 3H), 0.28-0.07 (m, 3H), -0.06–0.17 (m, 1H). | Column: CHIRAL ART Amylose-C NEO, 3*25 cm, 5 μm; Mobile Phase: 40% MeOH (containing 0.1% 2M NH$_3$—MeOH)/ rate: 80 mL/min; Wavelength: 220 nm | 8.0 |

TABLE 23-continued

| Example No. | From Example No. | Name and Structure | LCMS | 1H-NMR | Separation conditions | Retention time / min. |
|---|---|---|---|---|---|---|
| 241 | 193 | 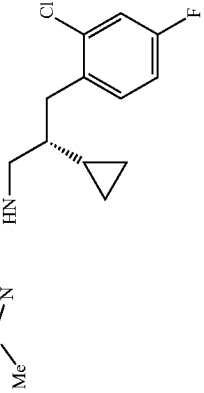<br>(R)-N-(3-(2-chloro-4-fluorophenyl)-2-cyclopropylpropyl)-1-methyl-5-oxo-4,5-dihydro-1H-1,2,4-triazole-3-carboxamide. Inferred stereochemistry | 353 [M + H]⁺ | ¹H NMR: (300 MHz, DMSO-d₆, ppm) δ 12.24 (s, 1H), 8.58 (t, J = 6.0 Hz, 1H), 7.46-7.43 (m, 1H), 7.38-7.30 (m, 1H), 7.18-7.10 (m, 1H), 3.36-3.34 (m, 1H), 3.30 (s, 3H), 3.19-3.17 (m, 1H), 2.86-2.82 (m, 1H), 2.74-2.70 (m, 1H), 1.24-1.19 (m, 1H), 0.62-0.58 (m, 1H), 0.44-0.26 (m, 1H), 0.24-0.20 (m, 1H), 0.09-0.03 (m, 1H), -0.38--0.42 (m, 1H). | Column: CHIRAL ART Amylose-C NEO, 3*25 cm, 5 μm; Mobile Phase: 50% MeOH (containing 0.1% 2M NH₃—MeOH)/CO₂; Flow rate: 80 mL/min; Wavelength: 220 nm; | 5.3 |
| 242 | 193 | 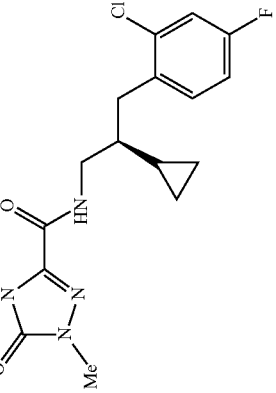<br>(S)-N-(3-(2-chloro-4-fluorophenyl)-2-cyclopropylpropyl)-1-methyl-5-oxo-4,5-dihydro-1H-1,2,4-triazole-3-carboxamide. Inferred stereochemistry | 353 [M + H]⁺ | ¹H NMR: (300 MHz, DMSO-d₆, ppm) δ 12.23 (s, 1H), 8.57 (t, J = 6.0 Hz, 1H), 7.47-7.42 (m, 1H), 7.40-7.35 (m, 1H), 7.16-7.12 (m, 1H), 3.38-3.33 (m, 1H), 3.30 (s, 3H), 3.19-3.17 (m, 1H), 2.88-2.83 (m, 1H), 2.76-2.71 (m, 1H), 1.24-1.19 (m, 1H), 0.62-0.58 (m, 1H), 0.44-0.26 (m, 1H), 0.24-0.20 (m, 1H), 0.09-0.03 (m, 1H), -0.38--0.42 (m, 1H). | Column: CHIRAL ART Amylose-C NEO, 3*25 cm, 5 μm; Mobile Phase: 50% MeOH (containing 0.1% 2M NH₃—MeOH)/CO₂; Flow rate: 80 mL/min; Wavelength: 220 nm; | 8.0 |

TABLE 23-continued

| Example No. | From Example No. | Name and Structure | LCMS | 1H-NMR | Separation conditions | Retention time / min. |
|---|---|---|---|---|---|---|
| | | | | Enantiomer A | | |
| 243 and 244 | 187 | 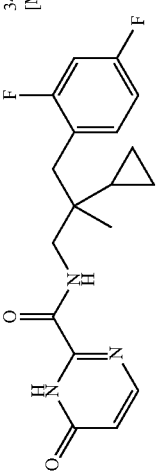<br>N-(2-cyclopropyl-3-(2,4-difluorophenyl)-2-methylpropyl)-6-oxo-1,6-dihydropyrimidine-2-carboxamide Enantiomer A<br>N-(2-cyclopropyl-3-(2,4-difluorophenyl)-2-methylpropyl)-6-oxo-1,6-dihydropyrimidine-2-carboxamide Enantiomer B<br>One of Enantiomers A and B is (S)-N-(2-cyclopropyl-3-(2,4-difluorophenyl)-2-methylpropyl)-6-oxo-1,6-dihydropyrimidine-2-carboxamide and the other is (R)-N-(2-cyclopropyl-3-(2,4-difluorophenyl)-2-methylpropyl)-6-oxo-1,6-dihydropyrimidine-2-carboxamide | 348 [M + H]$^+$ | $^1$H NMR: (400 MHz, DMSO-d$_6$, ppm) δ 12.66 (s, 1H), 8.66 (t, J = 6.4 Hz, 1H), 7.95 (d, J = 6.0 Hz, 1H), 7.41-7.35 (m, 1H), 7.19-7.13 (m, 1H), 7.03-6.98 (m, 1H), 6.41 (d, J = 5.6 Hz, 1H), 3.20-3.26 (m, 2H), 2.68-2.50 (m, 2H), 0.74-0.69 (m, 1H), 0.48 (s, 3H), 0.25-0.18 (m, 3H), -0.13--0.06 (m, 1H) | Column: XA-CHIRALPAKIG, 3*25 cm, 5 μm; Mobile Phase: 40% : 2:1 MeOH: DCM (containing 0.1% 2M NH$_3$—MeOH)/CO2; Flow rate: 80 mL/min; Wavelength: 254 nm | 8.6 |
| | | | | Enantiomer B | | |
| | | | 348 [M + H]$^+$ | $^1$H NMR: (400 MHz, DMSO-d$_6$, ppm) δ 12.66 (s, 1H), 8.66 (t, J = 6.4 Hz, 1H), 7.95 (d, J = 6.8 Hz, 1H), 7.41-7.35 (m, 1H), 7.19-7.13 (m, 1H), 7.03-6.98 (m, 1H), 6.40 (d, J = 6.8 Hz, 1H), 3.32-3.23 (m, 2H), 2.68-2.49 (m, 2H), 0.76-0.73 (m, 1H), 0.48 (s, 3H), 0.26-0.15 (m, 3H), -0.12--0.06 (m, 1H). | Column: XA-CHIRALPAK IG, 3*25 cm, 5 μm; Mobile Phase: 40% : 2:1 MeOH: DCM (containing 0.1% 2M NH$_3$—MeOH)/CO$_2$; Flow rate: 80 mL/min; Wavelength: 254 nm | 10.4 |

TABLE 23-continued

| Example No. | From Example No. | Name and Structure | LCMS | 1H-NMR | Separation conditions | Retention time / min. |
|---|---|---|---|---|---|---|
| 245 | 221 | (R)-N-(2-(2,4-difluorobenzyl)-4,4,4-trifluorobutyl)-1-methyl-5-oxo-4,5-dihydro-1H-1,2,4-triazole-3-carboxamide. Inferred stereochemistry | 379 [M + H]⁺ | ¹H NMR: (300 MHz, DMSO-d₆, ppm) δ 12.26 (s, 1H), 8.83-8.80 (m, 1H), 7.40 (q, J = 8.1 Hz, 1H), 7.20 (t, J = 10.0 Hz, 1H), 7.04 (t, J = 8.1 Hz, 1H), 3.35 (s, 3H), 3.20 (t, J = 6.2 Hz, 2H), 2.68 (d, J = 7.0 Hz, 2H), 2.38-2.33 (m, 3H). | Column: CHIRALPAKIA, 3*25 cm, 5 μm; Mobile Phase: 25% MeOH (containing 0.1% 2M NH₃—MeOH)/CO₂; Flow rate: 80 mL/min; Wavelength: 220 nm | 3.2 |
| 246 | 221 | (S)-N-(2-(2,4-difluorobenzyl)-4,4,4-trifluorobutyl)-1-methyl-5-oxo-4,5-dihydro-1H-1,2,4-triazole-3-carboxamide. Inferred stereochemistry 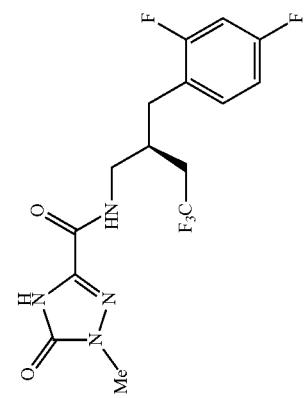 | 379 [M + H]⁺ | ¹H NMR: (300 MHz, DMSO-d₆, ppm) δ 12.27 (s, 1H), 8.83-8.80 (m, 1H), 7.40 (q, J = 8.2 Hz, 1H), 7.20 (t, J = 9.4 Hz, 1H), 7.04 (t, J = 8.6 Hz, 1H), 3.34 (s, 3H), 3.20 (t, J = 6.3 Hz, 2H), 2.68 (d, J = 6.9 Hz, 2H), 2.50-2.09 (m, 3H). | Column: CHIRALPAKIA, 3*25 cm, 5 μm; Mobile Phase: 25% MeOH (containing 0.1% 2M NH₃—MeOH)/CO₂; Flow rate: 80 mL/min; Wavelength: 220 nm | 4.0 |

TABLE 23-continued

| From Example No. | Example No. | Name and Structure | LCMS | 1H-NMR | Separation conditions | Retention time / min. |
|---|---|---|---|---|---|---|
| 247 and 248 | 215 | 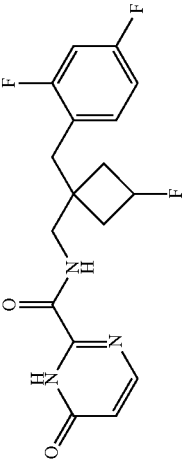<br>N-((1-(2,4-difluorobenzyl)-3-flurocyclobutyl)methyl)-6-oxo-1,6-dihydropyrimidine-2-carboxamide Isomer A<br>N-((1-(2,4-difluorobenzyl)-3-flurocyclobutyl)methyl)-6-oxo-1,6-dihydropyrimidine-2-carboxamide Isomer B<br><br>One of Isomers A and B is N-(((1s,3r)-1-(2,4-difluorobenzyl)-3-fluorocyclobutyl)methyl)-6-oxo-1,6-dihydropyrimidine-2-carboxamide and the other is N-(((1r,3s)-1-(2,4-difluorobenzyl)-3-fluorocyclobutyl)methyl)-6-oxo-1,6-dihydropyrimidine-2-carboxamide | | | | |
| | | *Isomer A* | 352 [M + H]⁺ | ¹H NMR: (400 MHz, DMSO-d₆, ppm) δ 12.61 (br, s, 1H), 9.09 (t, J = 6.6 Hz, 1H), 7.94 (d, J = 6.8 Hz, 1H), 7.47-7.35 (m, 1H), 7.25-7.18 (m, 1H), 7.09-7.02 (m, 1H), 6.40 (d, J = 6.7 Hz, 1H), 5.05-4.81 (m, 1H), 3.27 (d, J = 6.6 Hz, 2H), 2.75 (s, 2H), 2.44-2.32 (m, 2H), 1.99-1.67 (m, 2H). | Column: XA-CHIRALPAKIA, 2*25 cm, 5 μm; Mobile Phase: 50% EtOH (containing 0.1% FA)/Hexane; Flow rate: 25 mL/min; Wavelength: 254 nm | 11.5 |
| | | *Isomer B* | 352 [M + H]⁺ | ¹H NMR : (400 MHz, DMSO-d₆, ppm) δ 12.61 (br, s, 1H), 9.14 (t, J = 6.0 Hz, 1H), 7.95 (d, J = 6.0 Hz, 1H), 7.50-7.36 (m, 1H), 7.28-71.8 (m, 1H), 7.10-7.03 (m, 1H), 6.40 (d, J = 6.0 Hz, 1H), 4.79-4.62 (m,1H), 3.28 (d, J = 6.8 Hz, 2H), 2.73 (s, 2H), 2.29-2.07 (m, 4H). | Column: XA-CHIRALPAKIA, 2*25 cm, 5 μm; Mobile Phase: 50% EtOH (containing 0.1% FA)/Hexane; Flow rate: 25 mL/min; Wavelength: 254 nm | 15.7 |

TABLE 23-continued

| Example No. | From Example No. | Name and Structure | LCMS | 1H-NMR | Separation conditions | Retention time / min. |
|---|---|---|---|---|---|---|
| 249 | 218 | 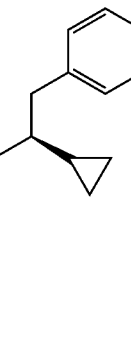<br>(S)-N-(2-cyclopropyl-3-(4-fluorophenyl)propyl)-6-oxo-1,6-dihydropyrimidine-2-carboxamide.<br>Inferred stereochemistry | 336 [M + H]+ | ¹H NMR (300 MHz, DMSO-d₆, ppm) δ 12.54 (br, s, 1H), 8.91 (s, 1H), 7.98 (s, 1H), 7.42-7.16 (m, 2H), 7.12-6.84 (m, 2H), 6.48 (s, 1H), 3.8-3.23(m, 2H), 2.78-2.58 (m, 2H), 1.30-1.11 (m, 1H), 0.50-0.48 (m, 1H), 0.35-0.31 (m, 2H), 0.14-0.09 (m, 1H), -0.19--0.20 (m, 1H). | Column: XA-CHIRALPAKIG, 3*25 cm, 5 μm; Mobile Phase: 30% EtOH (containing 0.1% FA)/ 1:1 Hex:DCM; Flow rate: 35 mL/min; Wavelength: 254 nm | 6.3 |
| 250 | 218 | 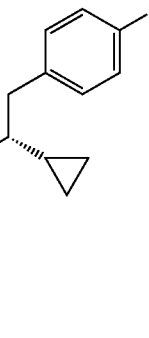<br>(R)-N-(2-cyclopropyl-3-(4-fluorophenyl)propyl)-6-oxo-1,6-dihydropyrimidine-2-carboxamide.<br>Inferred stereochemistry | 336 [M + H]+ | ¹H NMR (300 MHz, DMSO-d₆, ppm) δ 12.53 (br, s, 1H), 8.92-8.90 (m, 1H), 7.93 (d, J = 7.0 Hz, 1H), 7.42-7.18 (m, 2H), 7.12-6.86 (m, 2H), 6.40 (d, J = 6.6 Hz, 1H), 3.31-3.08 (m, 2H), 2.84-2.53 (m, 2H), 1.35-0.99 (m, 1H), 0.50 (m, 1H), 0.42-0.13 (m, 2H), 0.13-0.04 (m, 1H), -0.18--0.20 (m, 1H). | Column: XA-CHIRALPAKIG, 3*25 cm, 5 μm; Mobile Phase: 30% EtOH (containing 0.1% FA)/ 1:1 Hex:DCM; Flow rate: 35 mL/min; Wavelength: 254 nm | 9.5 |

TABLE 23-continued

| From Example No. | Example No. | Name and Structure | LCMS | 1H-NMR | Separation conditions | Retention time / min. |
|---|---|---|---|---|---|---|
| 251 and 252 | 217 | 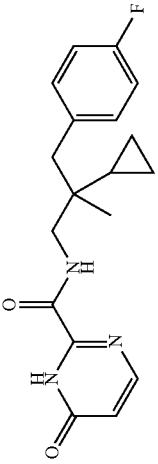<br>N-(2-cyclopropyl-3-(4-fluorophenyl)-2-methylpropyl)-6-oxo-1,6-dihydropyrimidine-2-carboxamide Enantiomer B<br><br>N-(2-cyclopropyl-3-(4-fluorophenyl)-2-methylpropyl)-6-oxo-1,6-dihydropyrimidine-2-carboxamide Enantiomer A<br><br>One of Enantiomers A and B is (S)-N-(2-cyclopropyl-3-(4-fluorophenyl)-2-methylpropyl)-6-oxo-1,6-dihydropyrimidine-2-carboxamide and the other is (R)-N-(2-cyclopropyl-3-(4-fluorophenyl)-2-methylpropyl)-6-oxo-1,6-dihydropyrimidine-2-carboxamide | 330 [M + H]⁺ | Enantiomer B<br>¹H NMR (400 MHz, DMSO-d₆, ppm) δ 12.65 (s, 1H), 8.58 (t, J = 6.6 Hz, 1H), 7.93 (s, 1H), 7.29-7.19 (m, 2H), 7.12-7.01 (m, 2H), 6.40 (s, 1H), 3.25-3.15 (m, 2H), 2.60-2.55 (m, 2H), 0.71-0.65 (m, 1H), 0.47 (s, 3H), 0.28-0.11 (m, 3H), 0.03–-0.08 (m, 1H). | Column: CHIRALPAK IG, 3*25 cm, 5 μm; Mobile Phase: 30% EtOH (containing 0.1% FA)/ Hexane:DCM; 3:1 Flow rate: 35 mL/min; Wavelength: 254 nm | 12.4 |
|  |  |  | 330 [M + H]⁺ | Enantiomer A<br>¹H NMR (400 MHz, DMSO-d₆, ppm) δ 12.62 (s, 1H), 8.58 (t, J = 6.5 Hz, 1H), 7.93 (d, J = 6.1 Hz, 1H), 7.29-7.21 (m, 2H), 7.10-7.03 (m, 2H), 6.40 (s, 1H), 3.26-3.14 (m, 2H), 2.65-2.54 (m, 2H), 0.71-067 (m, 1H), 0.47 (s, 3H), 0.29-0.11 (m, 3H), 0.01–-0.06 (m, 1H). | Column: CHIRALPAK IG, 3*25 cm, 5 μm; Mobile Phase: 30% EtOH (containing 0.1% FA)/ Hexane:DCM; 3:1 Flow rate: 35 mL/min; Wavelength: 254 nm | 16.3 |

TABLE 23-continued

| Example No. | From Example No. | Name and Structure | LCMS | 1H-NMR | Separation conditions | Retention time / min. |
|---|---|---|---|---|---|---|
| 253 | 222 | 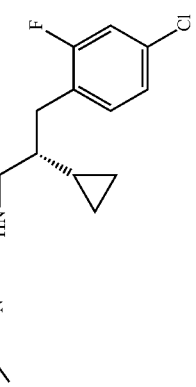<br>(R)-N-(3-(4-chloro-2-fluorophenyl)-2-cyclopropylpropyl)-1-methyl-5-oxo-4,5-dihydro-1H-1,2,4-triazole-3-carboxamide. Inferred stereochemistry. | 330 [M + H]⁺ | ¹H NMR (400 MHz, DMSO-d₆, ppm) δ 12.22 (s, 1H), 8.54 (t, J = 6.0 Hz, 1H), 7.37-7.29 (m, 2H), 7.17-7.17 (m, 1H), 3.33 (s, 3H), 3.29-3.23 (m, 1H), 3.21-3.10 (m, 1H), 2.73-2.64 (m, 1H), 2.63-2.55 (m, 1H), 1.23-1.13 (m, 1H), 0.53-0.50 (m, 1H), 0.34-0.31 (m, 1H), 0.24-0.21 (m, 1H), 0.06-0.05 (m, 1H), -0.30--0.34 (m, 1H). | Column: XA-CHIRALPAK IG, 3*25 cm, 5 μm; Mobile Phase: 20% EtOH (containing 0.1% FA)/ Hexane:DCM 5:1 Flow rate: 35 mL/min; Wavelength: 254 nm | 12.0 |
| 254 | 222 | 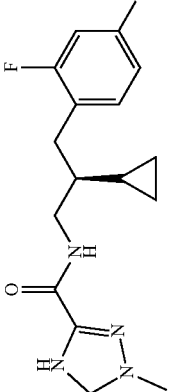<br>(S)-N-(3-(4-chloro-2-fluorophenyl)-2-cyclopropylpropyl)-1-methyl-5-oxo-4,5-dihydro-1H-1,2,4-triazole-3-carboxamide. Inferred stereochemistry. | 330 [M + H]⁺ | ¹H NMR (400 MHz, DMSO-d₆, ppm) δ 12.22 (s, 1H), 8.54 (t, J = 6.0 Hz, 1H), 7.37-7.29 (m, 2H), 7.17-7.17 (m, 1H), 3.33 (s, 3H), 3.29-3.23 (m, 1H), 3.21-3.10 (m, 1H), 2.73-2.64 (m, 1H), 2.63-2.55 (m, 1H), 1.23-1.13 (m, 1H), 0.53-0.50 (m, 1H), 0.34-0.31 (m, 1H), 0.24-0.21 (m, 1H), 0.06-0.05 (m, 1H), -0.30--0.34 (m, 1H). | Column: XA-CHIRALPAK IG, 3*25 cm, 5 μm; Mobile Phase: 20% EtOH (containing 0.1% FA)/ Hexane:DCM 5:1 Flow rate: 35 mL/min; Wavelength: 254 nm | 14.7 |

TABLE 23-continued

| From Example No. | Example No. | Name and Structure | LCMS | 1H-NMR | Separation conditions | Retention time / min. |
|---|---|---|---|---|---|---|
| 255 and 256 | 216 | 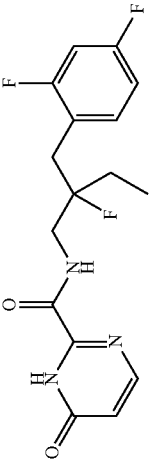<br>N-(2-(2,4-difluorobenzyl)-2-fluorobutyl)-6-oxo-1,6-dihydropyrimidine-2-carboxamide<br><br>Enantiomer A<br>N-(2-(2,4-difluorobenzyl)-2-fluorobutyl)-6-oxo-1,6-dihydropyrimidine-2-carboxamide | 340 [M + H]⁺ | Enantiomer A<br>¹H NMR (300 MHz, DMSO-d₆, ppm) δ 12.70 (br, s, 1H), 8.87-8.77 (m, 1H), 8.02-7.86 (m, 1H), 7.40 (q, J = 8.1 Hz, 1H), 7.24-7.04 (m, 1H), 7.08-6.98 (m, 1H), 6.43 (d, J = 6.6 Hz, 1H), 3.70-3.34 (m, 2H), 3.00 (d, J = 22.5 Hz, 2H), 1.69-1.43 (m, 2H), 0.93 (t, J = 7.5 Hz, 3H). | Column: XA-CHIRALPAKIG, 3*25 cm, 5 μm; Mobile Phase: 30% EtOH (containing 0.1% FA)/ 1:1 Hexane: DCM; Flow rate: 35 mL/min; Wavelength: 254 nm | 6.5 |
| | | Enantiomer B<br>One of Enantiomers A and B is (S)-N-(2-(2,4-difluorobenzyl)-2-fluorobutyl)-6-oxo-1,6-dihydropyrimidine-2-carboxamide and the other is (R)-N-(2-(2,4-difluorobenzyl)-2-fluorobutyl)-6-oxo-1,6-dihydropyrimidine-2-carboxamide | 340 [M+H]⁺ | Enantiomer B<br>¹H NMR (300 MHz, DMSO-d₆, ppm) δ 12.70 (br, s, 1H), 8.88-8.86 (m, 1H), 8.03-7.87 (m, 1H), 7.40 (q, J = 8.3 Hz, 1H), 7.26-7.16 (m, 1H), 7.11-7.00 (m, 1H), 6.45 (d, J = 6.6 Hz, 1H), 3.83-3.37 (m, 2H), 3.00 (d, J = 22.4 Hz, 2H), 1.71-1.42 (m, 2H), 0.93 (t, J = 7.5 Hz, 3H). | Column: XA-CHIRALPAKIG, 3*25 cm, 5 μm; Mobile Phase: 30% EtOH (containing 0.1% FA)/ 1:1 Hexane: DCM; Flow rate: 35 mL/min; Wavelength: 254 nm | 8.2 |

Examples 257 and 258: N-[(2R)-2-cyclopropyl-3-(2,4-difluorophenyl)-2-methylpropyl]-5-fluoro-4-oxo-3H-pyrimidine-2-carboxamide and N-[(2S)-2-cyclopropyl-3-(2,4-difluorophenyl)-2-methylpropyl]-5-fluoro-4-oxo-3H-pyrimidine-2-carboxamide

Step 1: 5-Fluoro-4-methoxypyrimidine-2-carbonitrile

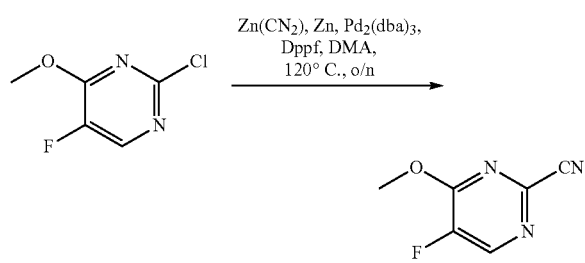

To 2-chloro-5-fluoro-4-methoxypyrimidine (10 g, 62 mmol), Zn(CN)$_2$ (5.1 g, 43 mmol, 0.7 eq) and Zn (2.1 g, 33 mmol, 0.5 eq) in DMA (200 mL) was added Pd$_2$(dba)$_3$ (5.6 g, 6.2 mmol, 0.1 eq) and Dppf (1.7 g, 3.1 mmol, 0.05 eq). The mixture was heated at 120° C. overnight then cooled. The mixture was filtered, and the filtrate was purified by Combi-Flash with the following conditions: Column: C18; Mobile Phase: 5-45% MeCN/0.1% aqueous formic acid over 20 min.; Flow rate: 100 mL/min; Wave Length: 254 nm/210 nm. Concentration of the appropriate fractions gave 5-fluoro-4-methoxypyrimidine-2-carbonitrile (5.0 g, 53% yield) as an orange oil.

Step 2. 5-Fluoro-4-methoxypyrimidine-2-carboxylic acid sodium salt

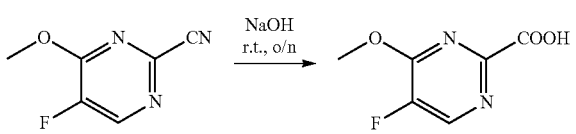

To 5-fluoro-4-methoxypyrimidine-2-carbonitrile (1.0 g, 6.5 mmol) in H$_2$O (3 ml) was added 1M aqueous NaOH (7.8 ml, 1.2 eq) and the mixture was stirred overnight. The solid formed was collected by filtration and dried to give the sodium salt of 5-fluoro-4-methoxypyrimidine-2-carboxylic acid (330 mg) as a white solid.

Step 3: N-[2-cyclopropyl-3-(2,4-difluorophenyl)-2-methylpropyl]-5-fluoro-4-methoxy-3,4-dihydropyrimidine-2-carboxamide

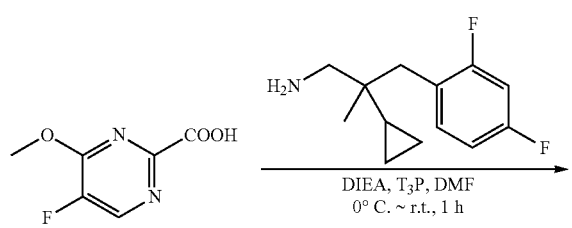

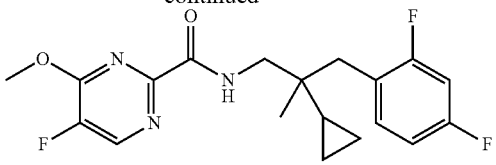

To 5-fluoro-4-methoxypyrimidine-2-carboxylic acid, sodium salt (330 mg, 1.9 mmol) and 2-cyclopropyl-3-(2,4-difluorophenyl)-2-methylpropan-1-amine (432 mg, 1.9 mmol, 1 eq) in DMF (3.3 mL) was added DIEA (743 mg, 5.8 mmol, 3 eq). The mixture was cooled to 0° C. and T$_3$P (3.7 g, 12 mmol, 6 eq) was added. The mixture was warmed to room temperature and stirred for 1 h. After concentration, the residue was purified by chromatography with the following conditions: Column: C18; Mobile Phase: 10-70% MeCN/10 mmol/L aqueous NH$_4$HCO$_3$ solution over 30 min.; Flow rate: 100 mL/min; Wavelength: 254 nm/210 nm; Rt 24 min. Concentration of the appropriate fractions gave N-[2-cyclopropyl-3-(2,4-difluorophenyl)-2-methylpropyl]-5-fluoro-4-methoxy-3,4-dihydropyrimidine-2-carboxamide (400 mg, 55% yield) as an orange oil.

Step 4: N-[2-cyclopropyl-3-(2,4-difluorophenyl)-2-methylpropyl]-5-fluoro-4-methoxy-3,4-dihydropyrimidine-2-carboxamide

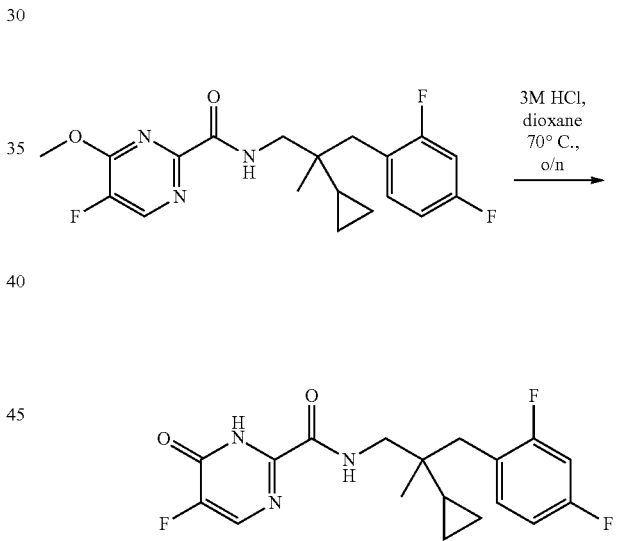

To N-[2-cyclopropyl-3-(2,4-difluorophenyl)-2-methylpropyl]-5-fluoro-4-methoxy-3,4-dihydropyrimidine-2-carboxamide (330 mg, 0.87 mmol) in dioxane (1.7 mL) was added 3M aqueous HCl (1.7 mL) and the solution stirred at 70° C. overnight. The reaction was cooled and quenched with H$_2$O (2 mL), then extracted with EA (2×10 mL). The organics were dried over anhydrous Na$_2$SO$_4$ and concentrated. The residue was purified by chromatography with the following conditions: Column: C18; Mobile Phase: 5-45% MeCN/10 mmol/L aqueous NH$_4$HCO$_3$ solution over 20 min.; Flow rate: 100 mL/min; Wavelength: 254 nm/210 nm. Concentration of the appropriate fractions gave N-[2-cyclopropyl-3-(2,4-difluorophenyl)-2-methylpropyl]-5-fluoro-4-oxo-3H-pyrimidine-2-carboxamide (180 mg, 57% yield) as an off-white solid.

Step 5: N-[(2R)-2-cyclopropyl-3-(2,4-difluorophenyl)-2-methylpropyl]-5-fluoro-4-oxo-3H-pyrimidine-2-carboxamide and N-[(2S)-2-cyclopropyl-3-(2,4-difluorophenyl)-2-methylpropyl]-5-fluoro-4-oxo-3H-pyrimidine-2-carboxamide

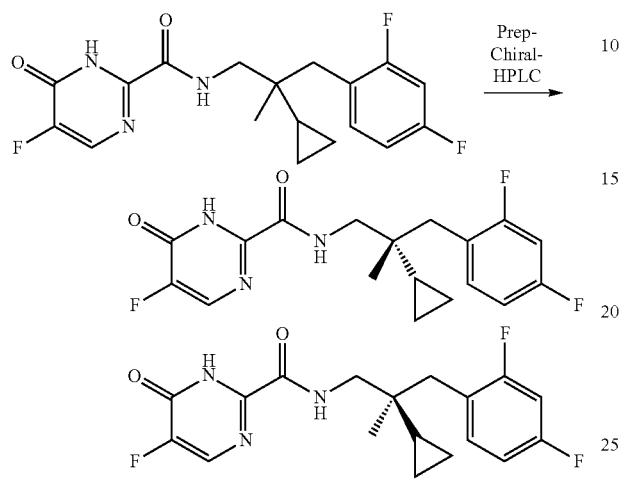

N-[2-cyclopropyl-3-(2,4-difluorophenyl)-2-methylpropyl]-5-fluoro-4-oxo-3H-pyrimidine-2-carboxamide (180 mg) was separated by Prep-Chiral-HPLC, Column: CHIRALPAK IF, 2*25 cm, 5 μm; Mobile Phase: 40% EtOH/Hexane containing 0.4% TFA; Flow rate: 20 mL/min; Wavelength: 220/254 nm. Concentration of the appropriate fractions gave: N-[2-cyclopropyl-3-(2,4-difluorophenyl)-2-methylpropyl]-5-fluoro-4-oxo-3H-pyrimidine-2-carboxamide Enantiomer A (51 mg, 28% yield) as a white solid. Rt1 25.4 min LCMS (ES, m/z): 366.05 [M+H]$^+$ $^1$H NMR: (300 MHz, DMSO-d$_6$, ppm) δ 8.49 (t, J=6.6 Hz, 1H), 7.87 (d, J=4.1 Hz, 1H), 7.38 (td, J=8.7, 6.7 Hz, 1H), 7.17 (ddd, J=12.1, 9.6, 2.6 Hz, 1H), 7.01 (td, J=8.4, 2.6 Hz, 1H), 3.21 (d, J=6.6 Hz, 2H), 2.44 (q, J=13.5 Hz, 2H), 0.74 (p, J=7.3 Hz, 1H), 0.58 (s, 3H), 0.29-0.12 (m, 3H), 0.09-0.22 (m, 1H)

$^{19}$F NMR: (282 MHz, DMSO-d$_6$, ppm) δ −111.1, −113.2, 151.9 and

N-[2-cyclopropyl-3-(2,4-difluorophenyl)-2-methylpropyl]-5-fluoro-4-oxo-3H-pyrimidine-2-carboxamide Enantiomer B (26 mg, 15% yield) as a white solid. Rt2 30.7 min LCMS (ES, m/z): 366.10 [M+H]$^+$ $^1$H NMR: (300 MHz, DMSO-d$_6$, ppm) δ 8.53 (s, 1H), 7.93 (d, J=3.9 Hz, 1H), 7.37 (q, J=8.1 Hz, 1H), 7.16 (t, J=9.9 Hz, 1H), 7.06-6.91 (m, 1H), 3.21 (d, J=6.7 Hz, 2H), 2.61 (q, J=13.5 Hz, 2H), 0.73 (s, 1H), 0.47 (s, 3H), 0.27-0.16 (m, 3H), 0.09-0.22 (m, 1H);

$^{19}$F NMR: (282 MHz, DMSO-d$_6$, ppm) δ −111.1, −113.1, −151.0

One of Enantiomers A and B is N-[(2R)-2-cyclopropyl-3-(2,4-difluorophenyl)-2-methylpropyl]-5-fluoro-4-oxo-3H-pyrimidine-2-carboxamide and the other is N-[(2S)-2-cyclopropyl-3-(2,4-difluorophenyl)-2-methylpropyl]-5-fluoro-4-oxo-3H-pyrimidine-2-carboxamide.

Examples 259 and 260: 5-chloro-N-[(2R)-2-cyclopropyl-3-(2,4-difluorophenyl)-2-methylpropyl]-4-oxo-3H-pyrimidine-2-carboxamide and 5-chloro-N-[(2S)-2-cyclopropyl-3-(2,4-difluorophenyl)-2-methylpropyl]-4-oxo-3H-pyrimidine-2-carboxamide Step 1: 5-chloro-4-methoxypyrimidine-2-carbonitrile

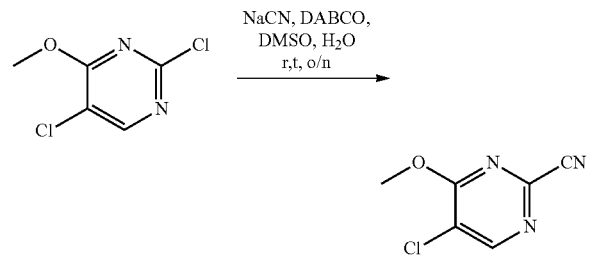

To 2,5-dichloro-4-methoxypyriimidine (5.0 g, 28 mmol) in DMSO (50 mL) and H$_2$O (50 mL) was added 1,4-diazabicyclo [2.2.2]octane (0.78 g, 7.0 mmol, 0.25 eq), followed by NaCN (1.4 g, 28, 1 eq). The reaction mixture was stirred overnight, then diluted with EA (100 mL) and washed with H$_2$O (3×30 mL). The combined organics were dried over anhydrous Na$_2$SO$_4$ and concentrated. The residue was purified by reverse phase chromatography with the following conditions: column, C18; Mobile Phase: 5-55% MeCN/0.1% aqueous formic acid over 30 min.; Flow rate: 100 mL/min; Wavelength: 210 nm. Concentration of the appropriate fractions gave 5-chloro-4-methoxypyrimidine-2-carbonitrile (2.5 g, 53% yield) as a brown solid.

Step 2: Methyl 5-chloro-4-oxo-3H-pyrimidine-2-carboxylate

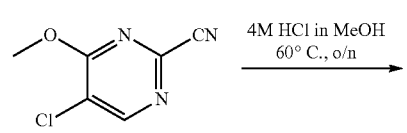

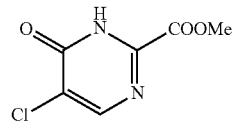

To 5-chloro-4-methoxypyrimidine-2-carbonitrile (1.0 g, 5.9 mmol) in MeOH (10 mL) was added 4M HCl in MeOH (10 mL). The mixture was stirred overnight at 60° C. and concentrated to give crude methyl 5-chloro-4-oxo-3H-pyrimidine-2-carboxylate (1 g) as a yellow solid.

Step 3: 5-Chloro-N-[2-cyclopropyl-3-(2,4-difluorophenyl)-2-methylpropyl]-4-oxo-3H-pyrimidine-2-carboxamide

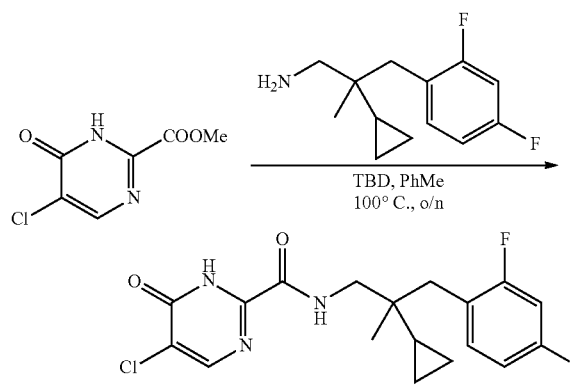

To methyl 5-chloro-4-oxo-3H-pyrimidine-2-carboxylate (650 mg, 3.4 mmol) in toluene (13 mL) was added 2-cyclopropyl-3-(2,4-difluorophenyl)-2-methylpropan-1-amine (777 mg, 3.4 mmol, 1.0 eq) and TBD (960 mg, 6.9 mmol, 2.0 eq). The mixture was stirred overnight at 100° C., then cooled and concentrated. The residue was purified by Prep-HPLC with the following conditions: Column: YMC-Actus Triart C18 ExRS30*150 mm, 5 μm; Mobile Phase: 32-62% MeCN/10 mmol/L aqueous $NH_4HCO_3$ solution containing 0.05% $NH_3$ over 10 min.; Flow rate: 60 mL/min; Wavelength: 254 nm/220 nm; Rt 8.8 min. Concentration of the appropriate fractions gave 5-chloro-N-[2-cyclopropyl-3-(2,4-difluorophenyl)-2-methylpropyl]-4-oxo-3H-pyrimidine-2-carboxamide (120 mg, 9% yield) as a yellow solid.

Step 4: 5-chloro-N-[(2R)-2-cyclopropyl-3-(2,4-difluorophenyl)-2-methylpropyl]-4-oxo-3H-pyrimidine-2-carboxamide and 5-chloro-N-[(2S)-2-cyclopropyl-3-(2,4-difluorophenyl)-2-methylpropyl]-4-oxo-3H-pyrimidine-2-carboxamide

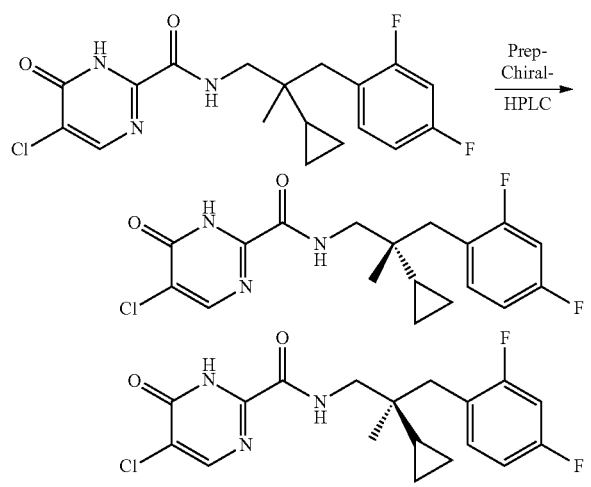

5-Chloro-N-[2-cyclopropyl-3-(2,4-difluorophenyl)-2-methylpropyl]-4-oxo-3H-pyrimidine-2-carboxamide (120 mg, 0.31 mmol) was separated by Prep-Chiral-HPLC, Column: CHIRALPAK IF, 2*25 cm, 5 μm; Mobile Phase: 40% EtOH/Hexane containing 0.4% TFA; Flow rate: 20 mL/min.; Wavelength: 220/254 nm; Concentration of the appropriate fractions gave: 5-chloro-N-[2-cyclopropyl-3-(2,4-difluorophenyl)-2-methylpropyl]-4-oxo-3H-pyrimidine-2-carboxamide Enantiomer A (30 mg, 24% yield) as a white solid. Rt1 28.1 min LCMS (ES, m/z): 382.1 [M+H]⁺

¹H NMR: (400 MHz, DMSO-d₆, ppm): δ 13.13 (s, 1H), 8.53 (t, J=6.6 Hz, 1H), 8.21-8.01 (m, 1H), 7.22 (q, J=8.2 Hz, 1H), 7.00 (td, J=9.9, 2.7 Hz, 1H), 6.84 (td, J=8.6, 2.7 Hz, 1H), 3.08 (t, J=6.1 Hz, 2H), 2.46 (q, J=13.5 Hz, 2H), 0.58 (p, J=7.5 Hz, 1H), 0.31 (s, 3H), 0.16--0.06 (m, 3H), -0.13-- -0.31 (m, 1H)

¹⁹F NMR: (376 MHz, DMSO-d₆, ppm) δ -111.0, -113.1 and 5-chloro-N-[2-cyclopropyl-3-(2,4-difluorophenyl)-2-methylpropyl]-4-oxo-3H-pyrimidine-2-carboxamide Enantiomer B (22 mg, 18% yield) as a white solid Rt2 36.2 min.

LCMS (ES, m/z): 382.1 [M+H]⁺

¹H NMR: (400 MHz, DMSO-d₆, ppm): δ 13.13 (s, 1H), 8.53 (t, J=6.6 Hz, 1H), 8.21-8.01 (m, 1H), 7.22 (q, J=8.2 Hz, 1H), 7.00 (td, J=9.9, 2.7 Hz, 1H), 6.84 (td, J=8.6, 2.7 Hz, 1H), 3.08 (t, J=6.1 Hz, 2H), 2.46 (q, J=13.5 Hz, 2H), 0.58 (p, J=7.5 Hz, 1H), 0.31 (s, 3H), 0.16--0.06 (m, 3H), -0.13-- -0.31 (m, 1H);

¹⁹F NMR: (376 MHz, DMSO-d₆, ppm) δ -111.0, -113.1

One of Enantiomers A and B is 5-chloro-N-[(2R)-2-cyclopropyl-3-(2,4-difluorophenyl)-2-methylpropyl]-4-oxo-3H-pyrimidine-2-carboxamide and the other is 5-chloro-N-[(2S)-2-cyclopropyl-3-(2,4-difluorophenyl)-2-methylpropyl]-4-oxo-3H-pyrimidine-2-carboxamide.

Example 261: N-[2-cyclopropyl-3-(4-fluorophenyl)-2-methylpropyl]-5-fluoro-4-oxo-3H-pyrimidine-2-carboxamide Enantiomer A

Step 1: [2-cyclopropyl-3-(4-fluorophenyl)-2-methylpropyl]-5-fluoro-4-methoxypyrimidine-2-carboxamide

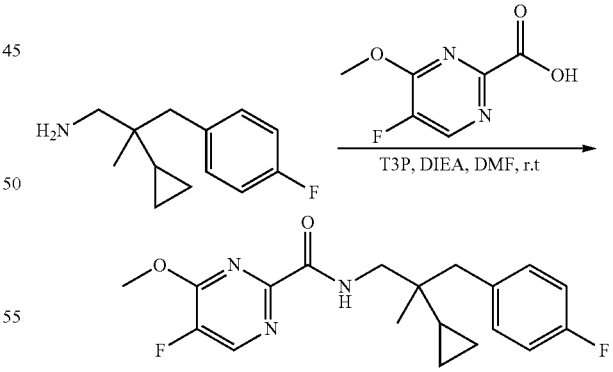

To 2-cyclopropyl-3-(4-fluorophenyl)-2-methylpropan-1-amine Enantiomer A (200 mg, 0.97 mmol) and 5-fluoro-4-methoxypyrimidine-2-carboxylic acid (166 mg, 0.97 mmol, 1 eq) in DMF (2 mL) at 0° C. was added DIEA (374 mg, 2.9 mmol, 3 eq) and $T_3P$ (1.84 g, 5.8 mmol, 6 eq). The reaction mixture was stirred overnight then quenched with water (1 mL). The resulting mixture was extracted with EtOAc (2×10 mL) and the combined organics washed with brine (10 mL×2), dried over anhydrous $Na_2SO_4$ and concentrated. The residue was purified by Prep-TLC (1:1 PE:EA) to afford [(2S)-2-cyclopropyl-3-(4-fluorophenyl)-2-methylpropyl]-5-fluoro-4-methoxypyrimidine-2-carboxamide (0.1 g, 29% yield) as a yellow oil.

Step 2: N-[2-cyclopropyl-3-(4-fluorophenyl)-2-methylpropyl]-5-fluoro-4-oxo-3H-pyrimidine-2-carboxamide Enantiomer A

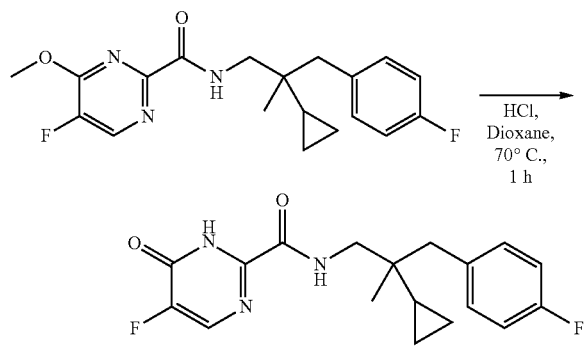

To N-[2-cyclopropyl-3-(4-fluorophenyl)-2-methylpropyl]-5-fluoro-4-methoxypyrimidine-2-carboxamide (100 mg, 0.28 mmol) in dioxane (1 mL) was added 3M aqueous HCl (0.3 mL). The resulting mixture was stirred for 1 h at 70° C., then cooled and concentrated. The crude product was purified by reverse phase chromatography with the following conditions (Column: Xbridge Prep OBD C18 Column, 30*150 mm, 5 m; Mobile Phase: 5-30% MeCN/10 mmol/L aqueous NH₄HCO₃ solution-containing 0.05% NH₃·H₂O over 10 min.; Flow rate: 60 mL/min; Wavelength: 254 nm/220 nm; Rt 4.5 min. Concentration of the relevant fractions gave N-[(2S)-2-cyclopropyl-3-(4-fluorophenyl)-2-methylpropyl]-5-fluoro-4-oxo-3H-pyrimidine-2-carboxamide (18 mg, 19% yield) as a white solid.

LCMS: (ES, m/z): 348.10 [M+H]⁺

¹H NMR: (300 MHz, DMSO-d₆) δ 8.46 (s, 1H), 7.90 (s, 1H), 7.24 (s, 2H), 7.08 (t, J=8.4 Hz, 2H), 3.19 (d, J=6.5 Hz, 2H), 2.57 (s, 2H), 0.76-0.61 (m, 1H), 0.47 (s, 3H), 0.28-0.12 (m, 3H), 0.06--0.05 (m, 1H)

¹⁹F NMR: (282 MHz, DMSO-d₆) δ −117.54, −151.30

Example 262: N-[2-cyclopropyl-3-(4-fluorophenyl)-2-methylpropyl]-5-fluoro-4-oxo-3H-pyrimidine-2-carboxamide Enantiomer B Step 1: N-[2-cyclopropyl-3-(4-fluorophenyl)-2-methyl-propyl]-5-fluoro-4-methoxypyrimidine-2-carboxamide

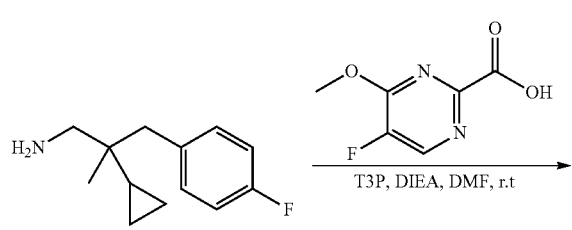

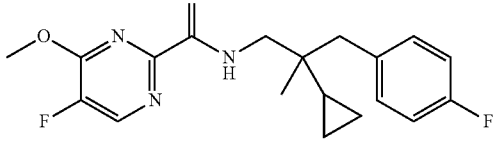

To 2-cyclopropyl-3-(4-fluorophenyl)-2-methylpropan-1-amine Enantiomer B (350 mg, 1.7 mmol) and 5-fluoro-4-methoxypyrimidine-2-carboxylic acid (440 mg, 2.5 mmol, 1.5 eq) in DMF (7 mL) were added DIEA (655 mg, 5.1 mmol, 3 eq) and T3P (1.6 g, 5.1 mmol, 3 eq) at room temperature. The reaction mixture was stirred overnight then concentrated. The residue was purified by Prep-TLC (PE/EA 1:1) to afford N-[(2R)-2-cyclopropyl-3-(4-fluorophenyl)-2-methyl-propyl]-5-fluoro-4-methoxypyrimidine-2-carboxamide (91 mg, 15% yield) as a grey solid.

Step 2: N-[2-cyclopropyl-3-(4-fluorophenyl)-2-methylpropyl]-5-fluoro-4-oxo-3H-pyrimidine-2-carboxamide Enantiomer B

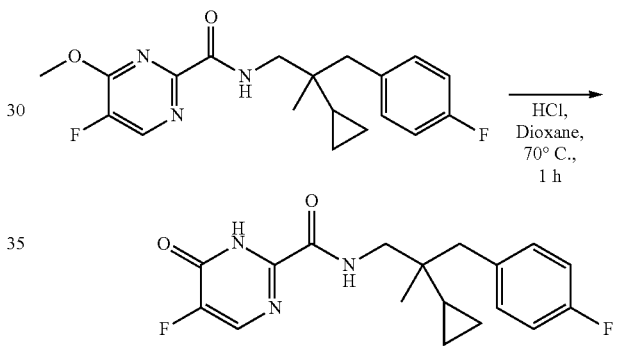

To N-[2-cyclopropyl-3-(4-fluorophenyl)-2-methylpropyl]-5-fluoro-4-methoxy-pyrimidine-2-carboxamide (91 mg, 0.25 mmol) in 1,4-dioxane (2 mL) was added 3M aqueous HCl (0.3 mL). The reaction mixture was stirred for 2 h at 60° C., then cooled and neutralized with 7M NH₃ in MeOH. The resulting mixture was concentrated and the residue purified by reverse-phase flash chromatography with the following conditions: Column: Xbridge Prep OBD C18 Column, 30*150 mm, 5 μm; Mobile Phase: 17-47% MeCN/10 mmol/L aqueous NH₄HCO₃ solution containing 0.05% NH₃—H₂O over 10 min.; Flow rate: 60 mL/min; Wavelength: 254 nm; Rt 8.8 min. Concentration of the appropriate fractions gave N-[(2R)-2-cyclopropyl-3-(4-fluorophenyl)-2-methylpropyl]-5-fluoro-4-oxo-3H-pyrimidine-2-carboxamide (19 mg, 21% yield) as a white solid.

LCMS (ES, m/z): 348.2 [M+H]⁺

¹H NMR: (400 MHz, DMSO-d₆, ppm): δ 8.60 (s, 1H), 8.10 (s, 1H), 7.28-7.21 (m, 2H), 7.09-7.04 (m, 2H), 3.22 (d, J=6.0 Hz, 2H), 2.58 (s, 2H), 0.73-0.64 (m, 1H), 0.47 (s, 3H), 0.32-0.05 (m, 3H), −0.03--0.06 (m, 1H)

¹⁹F NMR: (376 MHz, DMSO-d₆, ppm): δ −117.50, −148.62.

One of Examples 261 and 262 is (S)—N-[2-cyclopropyl-3-(4-fluorophenyl)-2-methylpropyl]-5-fluoro-4-oxo-3H-pyrimidine-2-carboxamide and the other is (R)—N-[2-cyclopropyl-3-(4-fluorophenyl)-2-methylpropyl]-5-fluoro-4-oxo-3H-pyrimidine-2-carboxamide.

Example 263: 5-Chloro-N-[2-cyclopropyl-3-(4-fluorophenyl)-2-methylpropyl]-4-oxo-3H-pyrimidine-2-carboxamide Enantiomer A

Example 264: 5-Chloro-N-[2-cyclopropyl-3-(4-fluorophenyl)-2-methylpropyl]-4-oxo-3H-pyrimidine-2-carboxamide Enantiomer B

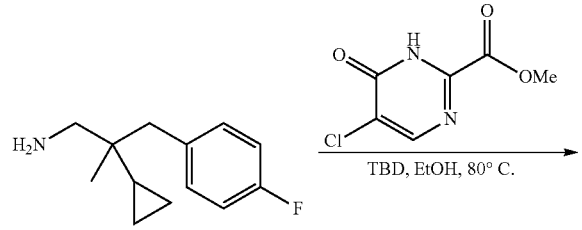

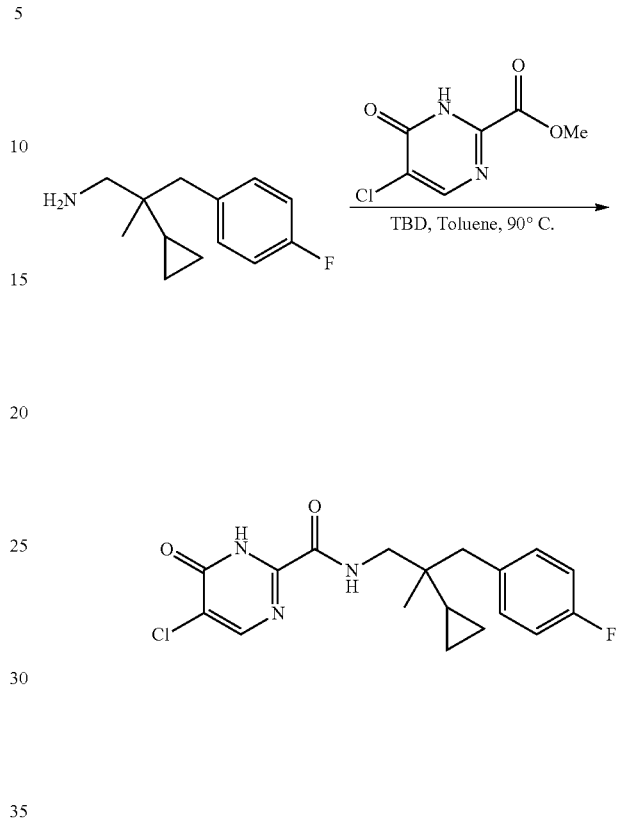

To 2-cyclopropyl-3-(4-fluorophenyl)-2-methylpropan-1-amine Enantiomer A (80 mg, 0.39 mmol) and methyl 5-chloro-4-oxo-3H-pyrimidine-2-carboxylate (73 mg, 0.39 mmol) in EtOH (3 mL) was added TBD (107 mg, 0.72 mmol, 2 eq). The resulting mixture was stirred overnight at 80° C., then cooled and concentrated. The residue was purified by reverse-phase flash chromatography with the following conditions: Column: YMC-Actus Triart C18 ExRS30*150 mm, 5 µm; Mobile Phase: 25-50% MeCN/10 mmol/L aqueous $NH_4HCO_3$ solution containing 0.05% $NH_3H_2O$ over 10 min.; Flow rate: 60 mL/min; Wavelength: 254 nm/220 nm; Rt 7 min. Concentration of the appropriate fractions gave 5-chloro-N-[2-cyclopropyl-3-(4-fluorophenyl)-2-methylpropyl]-4-oxo-3H-pyrimidine-2-carboxamide (23 mg, 17% yield) as a white solid.

LCMS (ES, m/z): 364.05 [M+H]$^+$ $^1$H NMR: (300 MHz, DMSO-$d_6$, ppm): δ 8.40 (t, J=6.4 Hz, 1H), 7.98 (s, 1H), 7.67 (s, 1H), 7.31-7.19 (m, 2H), 7.15-7.01 (m, 2H), 3.17 (d, J=6.5 Hz, 2H), 2.57 (d, J=2.0 Hz, 2H), 0.77-0.62 (m, 1H), 0.48 (s, 3H), 0.23 (ddt, J=14.1, 7.0, 4.3 Hz, 3H), 0.04--0.04 (m, 1H)

$^{19}$F NMR: (282 MHz, DMSO-$d_6$, ppm): δ −117.6

To 2-cyclopropyl-3-(4-fluorophenyl)-2-methylpropan-1-amine Enantiomer B (176 mg, 0.85 mmol, 0.8 eq) and methyl 5-chloro-4-oxo-3H-pyrimidine-2-carboxylate (200 mg, 1.1 mmol, 1.0 eq) in toluene (4 mL) was added TBD (295 mg, 2.1 mmol, 2.0 eq). The resulting mixture was stirred overnight at 90° C., then cooled and concentrated. The residue was purified by reverse-phase flash chromatography with the following conditions: Column: YMC-Actus Triart C18 ExRS30*150 mm, 5 µm; Mobile Phase: 12-42% MeCN/10 mmol/L aqueous $NH_4HCO_3$ solution containing 0.05% NH—$H_2O$ over 10 min.; Flow rate: 60 mL/min; Wavelength: 254 nm. Concentration of the appropriate fractions gave 5-chloro-N-[(2R)-2-cyclopropyl-3-(4-fluorophenyl)-2-methylpropyl]-4-oxo-3H-pyrimidine-2-carboxamide (44 mg, 11% yield) as a white solid.

LCMS (ES, m/z): 364.1 [M+H]$^+$ $^1$H NMR: (300 MHz, DMSO-$d_6$, ppm): δ 8.51 (s, 1H), 8.10 (s, 1H), 7.27-7.21 (m, 2H), 7.10-7.04 (m, 2H), 3.20 (d, J=6.5 Hz, 2H), 2.58 (s, 2H), 0.74-0.64 (m, 1H), 0.47 (s, 3H), 0.29-0.15 (m, 3H), 0.02--0.05 (in, 1H).

$^{19}$F NMR: (282 MHz, DMSO-$d_6$, ppm): δ −117.18

One of Examples 263 and 264 is (S)-5-Chloro-N-[2-cyclopropyl-3-(4-fluorophenyl)-2-methylpropyl]-4-oxo-3H-pyrimidine-2-carboxamide and the other is (R)-5-Chloro-N-[2-cyclopropyl-3-(4-fluorophenyl)-2-methylpropyl]-4-oxo-3H-pyrimidine-2-carboxamide.

The eutomer was called Enantiomer A in case of both $R^4$ and $R^5$ not being hydrogens.

TABLE 24

| Example No. | Name and Structure | LCMS | 1H-NMR | Separation conditions | Retention time / min. |
|---|---|---|---|---|---|
| 265 and 266 | N-(2-cyclopropyl-3-(2,4-difluorophenyl)-2-methylpropyl)-5-methyl-6-oxo-1,6-dihydropyrimidine-2-carboxamide<br><br>Enantiomer A<br>N-(2-cyclopropyl-3-(2,4-difluorophenyl)-2-methylpropyl)-5-methyl-6-oxo-1,6-dihydropyrimidine-2-carboxamide<br><br>Enantiomer B<br>One of Enantiomers A and B is (S)-N-(2-cyclopropyl-3-(2,4-difluorophenyl)-2-methylpropyl)-5-methyl-6-oxo-1,6-dihydropyrimidine-2-carboxamide and the otehr is (R)-N-(2-cyclopropyl-3-(2,4-difluorophenyl)-2-methylpropyl)-5-methyl-6-oxo-1,6-dihydropyrimidine-2-carboxamide | | Enantiomer A | | |
| | | 362.15 [M + H]$^+$ | 1H NMR: (300 MHz, DMSO-$d_6$, ppm) δ 12.53 (s, 1H), 8.63 (t, J = 6.5 Hz, 1H), 7.89 (s, 1H),7.39 (td, J = 8.7, 6.8 Hz, 1H), 7.16 (ddd, J = 10.3, 9.4, 2.6 Hz, 1H), 7.01 (td, J = 8.5, 2.7 Hz, 1H), 3.24 (dd, J = 6.7, 4.1 Hz, 2H), 2.72-2.55 (m, 2H), 1.96 (d, J = 1.2 Hz, 3H), 0.73 (d, J = 6.0 Hz, 1H), 0.48 (s, 3H), 0.20 (m, 3H), 0.06-0.12 (m, 1H); | CHIRALPAKIF, 2*25 cm, 5 μm; Mobile Phase: 20% 1:1 EtOH: DCM/ MTBE (containing 0.1% formic acid), Flow rate: 15 mL/min | 29.8 |
| | | | Enantiomer B | | |
| | | 362.15 [M + H]$^+$ | 1H NMR: (300 MHz, DMSO-$d_6$, ppm) δ 12.53 (s, 1H), 8.63 (t, J = 6.5 Hz, 1H), 7.89 (s, 1H), 7.39 (td, J = 8.7, 6.8 Hz, 1H), 7.16 (ddd, J = 10.3, 9.4, 2.6 Hz, 1H), 7.01 (td, J = 8.5, 2.7 Hz, 1H),3.24 (dd, J = 6.7, 4.1 Hz, 2H), 2.72-2.55 (m, 2H), 1.96 (d, J = 1.2 Hz, 3H), 0.73 (d, J = 6.0 Hz, 1H), 0.48 (s, 3H), 0.20 (m, 3H), 0.06-0.12 (m, 1H); | CHIRALPAKIF, 2*25 cm, 5 μm; Mobile Phase: 20% 1:1 EtOH:DCM MTBE (containing 0.1% formic acid), Flow rate: 15 mL/min | 23.9 |

The eutomer was called Enantiomer A in case of both R⁴ and R⁵ not being hydrogens.

TABLE 25

| Example No. | Name and Structure | LCMS | 1H-NMR | From Intermediate No |
|---|---|---|---|---|
| | | Enantiomer A | | |
| 267 and 268 | 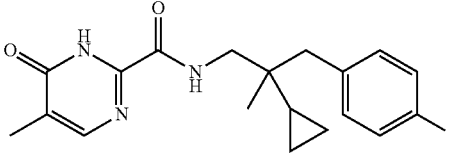<br>N-(2-cyclopropyl-3-(4-fluorophenyl)-2-methylpropyl)-5-methyl-6-oxo-1,6-dihydropyrimidine-2-carboxamide<br><br>Enantiomer A<br>N-(2-cyclopropyl-3-(4-flurophenyl)-2-methylpropyl)-5-methyl-6-oxo-1,6-dihydropyrimidine-2-carboxamide<br><br>Enantomer B<br>One of Enantiomers A and B is (S)-N-(2-cyclopropyl-3-(4-fluorophenyl)-2-methylpropyl)-5-methyl-6-oxo-1,6-dihydropyrimidine-2-carboxamide and the other is (R)-N-(2-cyclopropyl-3-(4-fluorophenyl)-2-methylpropyl)-5-methyl-6-oxo-1,6-dihydropyrimidine-2-carboxamide | 344.15 [M + H]⁺ | 1H NMR: (300 MHz, DMSO-d₆, ppm) δ 8.63 (s, 1H), 7.84 (s, 1H), 7.26- 7.24 (m, 2H), 7.11-7.05 (m, 2H), 3.51-3.10 (m, 2H), 2.63-2.51 (m, 2H), 1.94 (s, 3H), 0.75-0.63 (m, 1H), 0.48 (s, 3H), 0.19-0.04 (m, 3H), 0.02--0.05 (m, 1H) | Intermediate 58 |
| | | Enantiomer B | | |
| | | 344.15 [M + H]⁺ | 1H NMR: (300 MHz, DMSO-d₆, ppm) δ 12.31 (s, 1H), 8.58-8.53 (m, 1H), 7.87 (d, J = 1.4 Hz, 1H), 7.31-7.21 (m, 2H), 7.13-7.02 (m, 2H), 3.51-3.09 (m, 2H), 2.64-2.41 (m, 2H), 1.96 (s, 3H), 0.73-0.65 (m, 1H), 0.48 (s, 3H), 0.19-0.04 (m, 3H), 0.04--0.04 (m, 1H) | Intermediate 59 |
| | | Enantiomer A | | |
| 269 and 270 | 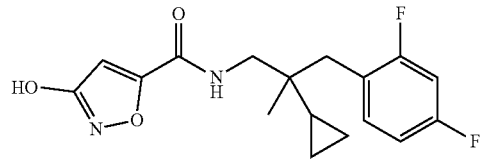<br>N-(2-cyclopropyl-3-(2,4-difluorophenyl)-2-methylpropyl)-3-hydroxyisoxazole-5-carboxamide<br><br>Enantiomer A<br>N-(2-cyclopropyl-3-(2,4-difluorophenyl)-2-methylpropyl)-3-hydroxyisoxazole-5-carboxamide<br><br>Enantiomer B<br>One of Enantiomers A and B is (S)-N-(2-cyclopropyl)-3-(2,4-difluorophenyl)-2-methylpropyl)-3-hydroxyisoxazole-5-carboxamide and the other is (R)-N-(2-cyclopropyl)-3-(2,4-difluorophenyl)-2-methylpropyl)-3-hydroxyisoxazole-5-carboxamide | 337.10 [M + H]⁺ | 1H NMR: (400 MHz, DMSO-d₆, ppm) δ 8.35 (t, J = 6.4 Hz, 1H), 7.38 (q, J = 8.1 Hz, 1H), 7.14 (t, J = 9.9 Hz, 1H), 6.99 (t, J = 8.7 Hz, 1H), 6.30 (s, 1H), 3.31 3.08 (m, 2H), 2.59 (q, 2H), 0.72 (p, J = 7.1 Hz, 1H), 0.45 (s, 3H), 0.26-0.05 (m, 3H), -0.07--0.27 (m, 1H) | Intermediate 56 |
| | | Enantiomer B | | |
| | | 337.10 [M + H]⁺ | 1H NMR: (400 MHz, DMSO-d₆, ppm) δ 8.35 (t, J = 6.4 Hz, 1H), 7.38 (q, J = 8.1 Hz, 1H), 7.14 (t, J = 9.9 Hz, 1H), 6.99 (t, J = 8.7 Hz, 1H), 6.30 (s, 1H), 3.31-3.08 (m, 2H), 2.59 (q, 2H), 0.72 (p, J = 7.1 Hz, 1H), 0.45 | Intermediate 57 |

TABLE 25-continued

| Example No. | Name and Structure | LCMS | 1H-NMR | From Intermediate No |
|---|---|---|---|---|
| | | | (s, 3H), 0.26-0.05 (m, 3H), -0.07--0.27 (m, 1H) | |
| | | | Enantiomer A | |
| 271 and 272 | 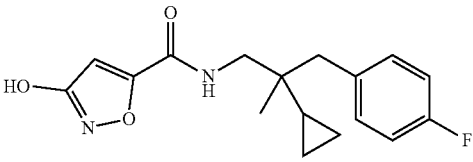<br>N-(2-cyclopropyl-3-(4-fluorophenyl)-2-methylpropyl)-3-hydroxyisoxazole-5-carboxamide<br><br>Enantiomer A<br>N-(2-cyclopropyl-3-(4-fluorophenyl)-2-methylpropyl)-3-hydroxyisoxazole-5-carboxamide<br><br>Enantiomer B<br>One of Enantiomers A and B is (S)-N-(2-cyclopropyl-3-(4-fluorophenyl)-2-methylpropyl)-3-hydroxyisoxazole-5-carboxamide and the other is (R)-N-(2-cyclopropyl-3-(4-fluorophenyl)-2-methylpropyl)-3-hydroxyisoxazole-5-carboxamide | 319.1 [M + H]$^+$ | 1H NMR: (300 MHz, DMSO-$d_6$, ppm) δ 8.37 (s, 1H), 7.27 (dd, J = 8.6, 5.8 Hz, 2H), 7.08 (t, J = 8.9 Hz, 2H), 6.38 (s, 1H), 3.22 (dd, J = 13.2, 6.6 Hz, 1H), 3.12 (dd, J = 12.9, 6.3 Hz, 1H), 2.58 (d, J = 3.0 Hz, 2H), 0.67 (t, J = 6.5 Hz, 1H), 0.46 (s, 3H), 0.25-0.13 (m, 3H), -0.06 (d, J = 5.3 Hz, 1H) | Intermediate 58 |
| | | | Enantiomer B | |
| | | 319.1 [M + H]$^+$ | $^1$H NMR: (300 MHz, DMSO-$d_6$, ppm) δ 8.32 (s, 1H), 7.27 (dd, J = 8.6, 5.7 Hz, 2H), 7.07 (t, J = 8.8 Hz, 2H), 6.33 (s, 1H), 3.17 (qd, J = 13.2, 6.4 Hz, 2H), 2.58 (d, J = 2.9 Hz, 2H), 0.71-0.64 (m, 1H), 0.46 (s, 3H), 0.18 (dd, J = 12.0, 6.8 Hz, 3H), -0.06 (d, J = 5.6 Hz, 1H) | Intermediate 59 |
| | | | Enantiomer B | |
| 273 and 274 | 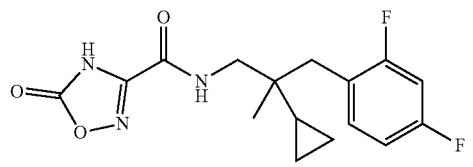<br>N-(2-cyclopropyl-3-(2,4-difluorophenyl)-2-methylpropyl)-5-oxo-4,5-dihydro-1,2,4-oxadiazole-3-carboxamide<br><br>Enantiomer B<br>N-(2-cyclopropyl-3-(2,4-difluorophenyl)-2-methylpropyl)-5-oxo-4,5-dihydro-1,2,4-oxadiazole-3-carboxamide<br><br>Enantiomer A<br>One of Enantiomers A and B is (S)-N-(2-cyclopropyl-3-(2,4-difluorophenyl)-2-methylpropyl)-5-oxo-4,5-dihydro-1,2,4-oxadiazole-3-carboxamide and the other is (R)-N-(2-cyclopropyl-3-(2,4-difluorophenyl)-2-methylpropyl)-5-oxo-4,5-dihydro-1,2,4-oxadiazole-3-carboxamide | 338.05 [M + H]$^+$ | $^1$H NMR: (400 MHz, DMSO-$d_6$, ppm) δ 13.17 (s, 1H), 8.90 (t, J = 6.4 Hz, 1H), 7.38 (td, J = 8.7, 6.8 Hz, 1H), 7.15 (td, J = 9.9, 2.7 Hz, 1H), 7.00 (td, J = 8.5, 2.7 Hz, 1H), 3.31-3.12 (m, 2H), 2.70-2.55 (m, 2H), 0.80-0.66 (m, 1H), 0.46 (s, 3H), 0.27-0.06 (m, 3H), -0.05--0.21 (m, 1H) | Intermediate 57 |

TABLE 25-continued

| Example No. | Name and Structure | LCMS | 1H-NMR | From Intermediate No |
|---|---|---|---|---|
| | | | Enantiomer A | |
| | | 338.05 [M + H]⁺ | ¹H NMR: (400 MHz, DMSO-d₆, ppm) δ 13.17 (s, 1H), 8.90 (t, J = 6.4 Hz, 1H), 7.38 (td, J = 8.7, 6.8 Hz, 1H), 7.15 (td, J = 9.9, 2.7 Hz, 1H), 7.00 (td, J = 8.5, 2.7 Hz, 1H), 3.31-3.12 (m, 2H), 2.70-2.55 (m, 2H), 0.80-0.66 (m, 1H), 0.46 (s, 3H), 0.27-0.06 (m, 3H), -0.05--0.21 (m, 1H) Enantiomer A | Intermediate 56 |
| 275 and 276 | N-(2-cyclopropyl-3-(4-fluorophenyl)-2-methylpropyl)-5-oxo-4,5-dihydro-1,2,4-oxadiazole-3-carboxamide<br><br>Enantiomer A<br>N-(2-cyclopropyl-3-(4-fluorophenyl)-2-methylpropyl)-5-oxo-4,5-dihydro-1,2,4-oxadiazole-3-carboxamide<br><br>Enantiomer B<br><br>One of Enantiomers A and B is (S)- N-(2-cyclopropyl-3-(4-fluorophenyl)-2-methylpropyl)-5-oxo-4,5-dihydro-1,2,4-oxadiazole-3-carboxamide and the other is (R)- N-(2-cyclopropyl-3-(4-fluorophenyl)-2-methylpropyl)-5-oxo-4,5-dihydro-1,2,4-oxadiazole-3-carboxamide | 318.05 [M - H]⁻ | 1H NMR: (300 MHz, DMSO-d6, ppm): δ 8.04 (s, 1H), 7.07 (t, J = 6.9 Hz, 2H), 6.99-6.85 (m, 3H), 3.05-2.92 (m, 2H), 2.42-2.32 (m, 2H), 0.52-0.49 (m, 1H), 0.27 (s, 3H), 0.12-0.06 (m, 3H), 0.02--0.05 (m, 1H) | Intermediate 58 |
| | | | Enantiomer B | |
| | | 318.05 [M - H]⁻ | 1H NMR: (300 MHz, DMSO-d₆, ppm): δ 13.15 (s, 1H), 8.85-8.81 (m, 1H), 7.29-7.24 (m, 2H), 7.11-7.05 (m, 2H), 3.27-3.11 (m, 2H), 2.64-2.55 (m, 2H), 0.73-0.64 (m, 1H), 0.47 (s, 3H), 0.27-0.23 (m, 3H), 0.02--0.05 (m, 1H) | Intermediate 59 |

Biological Examples

Biological Example 1—mPTP Activity Assay in Isolated Rat Liver Mitochondria and Isolated Rat Brain Mitochondria Rat Liver Mitochondria Assay Pharmacological inhibition or modulation of the mPTP can be measured in well characterised 'Ca$^{2+}$ retention' assays performed in isolated mitochondria. In vitro, isolated mitochondria rapidly sequester exogenous Ca$^{2+}$ until the intramitochondrial Ca$^{2+}$ concentration reaches the threshold for mPTP activation. Once the pore is activated, mitochondrial integrity is compromised and the stored Ca$^{2+}$ is released. The distribution of Ca$^{2+}$ between extra- and intramitochondrial compartments can be measured in real time with the use of membrane-impermeant Ca$^{2+}$ sensitive fluorescent dyes. Depending on the configuration of the assay, inhibition or modulation of the mPTP either delays the opening of the pore or increases the concentration of Ca$^{2+}$ required to induce mPTP opening.

MPTP activity was measured in mitochondria freshly isolated from female Sprague Dawley (250 to 300 gram) rat livers using the following method. Cervical dislocation was performed on the rat. The liver was then perfused in-situ with ~40 ml cold Dulbecco's Phosphate Buffered Saline (DPBS) prior to dissection and transferred into 30 ml Isolation Buffer (250 mM Sucrose, 10 mM KCl, 1 mM EGTA, 1 mM EDTA, 25 mM HEPES, adjusted to pH 7.5 with 1M NaOH). Each lobe of the liver was then removed from the buffer, minced using tweezers and a scalpel into ~5 mm pieces then transferred into a 50 ml Potterton dounce homogenization tube on ice containing 30 ml ice-cold centrifugation buffer (300 mM Trehalose, 25 mM HEPES, 1 mM EGTA, 1 mM EDTA, 10 mM KCl, adjusted to pH 7.5 with 1M NaOH and supplemented with 0.1% bovine serum albumin (BSA) and complete protease inhibitor cocktail (one tablet of inhibitor per 50 mls of buffer). Homogenisation was carried out using a teflon pestle at 1800 rpm. The slurry was centrifuged at 800 g for 10 min at 4° C., then the supernatant centrifuged at 10,000 g for 10 min. The pellet was washed once with FLIPR assay buffer (75 mM Mannitol, 25 mM Sucrose, 5 mM Potassium Phosphate Monobasic, 20 mM Tris base, 100 mM KCl, 0.1% BSA adjusted to pH 7.4 with 5M HCl) centrifuged again, then resuspended in FLIPR assay buffer to a concentration of 8.8 mg/ml protein.

Tested compounds (10 mM stock in DMSO) were serially diluted in DMSO in half log steps to generate 10 test concentrations (final concentrations in assay 30 µM to 1 nM). An intermediate dilution of 5 µl DMSO samples into 247 µl FLIPR assay buffer was carried out prior to transfer of 5 µl into duplicate wells of a 384 well polypropylene assay plate. Control wells were 0.5% (v/v) DMSO and 5 µM cyclosporin A.

A stock mitochondria/Fluo5N assay solution was prepared in 5.6 ml FLIPR assay buffer (at RT) supplemented with succinate disodium salt (10 mM), rotenone (1 µM), Fluo5N pentapotassium salt (2 µM) and 1 ml mitochondria suspension, then transferred (15 µl) into the assay plate containing test compounds and incubated for 10 min at RT. Assay plates were processed for fluorescence detection on either a FLIPR Tetra (Molecular Devices) or CLARIOstar (BMG) plate reader. For kinetic fluorescence detection on the FLIPR, dye fluorescence was measured every 3 sec for a total of 10 min. After 12 sec, a 2.5 µl bolus of $CaCl_2$ (75 µM) was added from a source plate containing 675 µM $CaCl_2$ in FLIPR assay buffer. Alternatively, the 2.5 µl addition of $CaCl_2$ was performed using a Viaflow 384, plates were incubated at RT for 10 min, and dye fluorescence measured after 10 min on the CLARIOstar plate reader. pIC50 values for tested compounds were calculated using the fluorescence value collected at the 10 min timepoint on either plate reader, with % inhibition calculated using the DMSO control and cyclosporin A values as 0 and 100% respectively.

Rat Brain Mitochondria Assay

MPTP activity was measured in brain mitochondria freshly isolated from female Sprague Dawley (250 to 300 gram) rats. Anaesthetised rats were perfused in-situ with ~40 ml cold Dulbecco's Phosphate Buffered Saline (DPBS), then brains dissected and transferred into 30 ml Isolation Buffer (225 mM mannitol, 75 mM sucrose, 1 mM EGTA, adjusted to pH 7.4 with 1M NaOH). The brain was minced using tweezers and a scalpel into ~5 mm pieces then transferred into a 50 ml Potterton Dounce homogenization tube on ice containing 10 ml ice-cold isolation buffer (as above with addition of Complete Protease inhibitor; 1 tablet per 50 ml buffer). Homogenisation was carried out using a teflon pestle at 1800 rpm. The slurry was centrifuged at 2000 g for 10 min at 4° C., then the supernatant centrifuged at 12,000 g for 9 min. The pellet was resuspended with a dounce homogeniser in isolation buffer as above but with the addition of 0.02% digitonin, centrifuged at 12,000 g for 11 min and finally resuspended in 5 ml modified isolation buffer (as above but with EGTA reduced to 0.1 mM).

Test compounds were prepared in 384 well polypropylene assay plates as described above for the liver mitochondria assay. A stock mitochondria/Fluo5N assay solution was prepared in 5.6 ml assay buffer (120 mM mannitol, 40 mM MOPS, 5 mM $KH_2PO_4$, 60 mM KCl, 10 mM pyruvate, 2 mM malate, 2 mM $MgCl_2$, 20 µM ADP, 1.26 µM oligomycin A, adjusted to pH 7.4) supplemented with Fluo5N pentapotassium salt (2 µM) and 1 ml mitochondria suspension, then transferred (15 µl) into the assay plate containing test compounds and incubated for 10 min at RT. Assay plates were then transferred to a FLIPR Tetra plate reader (Molecular Devices). Dye fluorescence was then measured every 3 sec for a total of 10 min. After 12 sec, a 2.5 µl bolus of Ca2+(75 µM) was added from a source plate containing 675 µM $CaCl_2$ in FLIPR assay buffer. pIC50 values for test compounds were calculated using the fluorescence value collected at the 10 min timepoint with % inhibition calculated using the DMSO control and cyclosporin A values at 100% and 0% respectively.

General cytotoxicity was assessed using standard cell viability methods (Cell Titre Glo; Promega) in HEK293 and SHSY5Y cells, following incubation of test compound for between 24 and 96 hours.

Results: mPTP $pIC_{50}$ values for certain Example compounds of the invention in a range of mPTP assays are provided in Table 26 below. The results indicate that the tested compounds of the invention display inhibition of mPTP, with many Example compounds displaying $pIC_{50}$ values of 6.0 or greater. Example 190 showed the highest activity in the rat liver mitochondria assay. Example 275 showed the highest activity in the rat brain mitochondria assay. Table 26 also presents mPTP rat brain mitochondria $PIC_{50}$ values for certain Example compounds. These results indicate that the tested Example compounds are active against isolated rat liver mitochondria and isolated rat brain mitochondria.

TABLE 26

Summary of results from Biological Example 1

| Example No | mPTP Rat liver pIC50* | mPTP Rat brain pIC50 |
| --- | --- | --- |
| 1 | 6.10 | 7.27 |
| 2 | 5.64 | 6.95 |
| 3 | 6.02 | 6.89 |
| 4 | 5.77 | 6.56 |
| 5 | 5.61 | 6.72 |
| 6 | 5.13 | NT |
| 7 | 5.97 | 7.42 |
| 8 | 6.32 | 7.40 |
| 9 | 6.14 | 7.33 |
| 10 | 6.58 | 7.42 |
| 11 | 5.18 | 6.48 |
| 12 | 5.70 | 7.08 |
| 13 | 5.33 | 7.74 |
| 14 | 5.63 | 6.94 |
| 15 | 5.92 | 7.65 |
| 16 | 5.88 | 7.35 |
| 17 | 6.05 | 6.96 |
| 18 | 5.55 | 7.04 |
| 19 | 5.41 | 7.35 |
| 20 | 6.44 | 7.55 |
| 21 | 6.09 | 7.63 |
| 22 | 6.79 | 7.75 |
| 23 | 6.64 | 7.37 |
| 24A | 6.75 | 7.83 |
| 24B | <4.52 | 5.49 |
| 25 | 6.42 | 7.37 |
| 26 | 6.87 | 7.60 |
| 27 | 5.49 | 6.25 |
| 28 | 5.96 | 6.73 |
| 29 | 6.34 | 7.84 |
| 30 | 6.20 | 7.63 |
| 31 | 6.48 | 7.37 |
| 32 | 5.76 | 6.79 |
| 33 | 5.63 | 6.51 |
| 34 | 5.82 | 7.32 |
| 35 | 5.23 | 6.86 |
| 36 | 5.28 | 7.05 |
| 37 | 5.79 | 7.61 |
| 38 | 6.14 | 7.30 |
| 39B | 6.56 | 7.62 |
| 39A | <4.57 | NT |
| 40 | 6.29 | 7.50 |
| 41 | 5.25 | 6.38 |
| 42 | 5.27 | 6.26 |
| 43 | 5.03 | 6.81 |
| 44 | 6.23 | 7.41 |
| 45 | 6.50 | NT |
| 46B | 6.97 | 7.68 |
| 46A | 4.71 | NT |

TABLE 26-continued

Summary of results from Biological Example 1

| Example No | mPTP Rat liver pIC50* | mPTP Rat brain pIC50 |
|---|---|---|
| 47 | 4.71 | 6.91 |
| 48 | 4.56 | 5.99 |
| 49 | 4.56 | 7.44 |
| 50 | 4.66 | 7.23 |
| 51 | 5.62 | 6.84 |
| 52 | 6.41 | 7.64 |
| 53 | 6.46 | 7.46 |
| 54a | 5.04 | 5.68 |
| 54b | 6.82 | 7.94 |
| 55 | 5.44 | NT |
| 56 | 5.76 | 6.73 |
| 57 | 5.43 | 6.25 |
| 58 | 5.03 | NT |
| 59 | 5.06 | NT |
| 60 | 5.10 | NT |
| 61 | 4.99 | NT |
| 62 | 4.85 | 5.16 |
| 63 | 4.65 | NT |
| 64 | <4.52 | 4.64 |
| 65 | <4.52 | NT |
| 66 | <4.52 | NT |
| 67 | <4.52 | NT |
| 68 | <4.52 | NT |
| 69 | <4.52 | NT |
| 70 | 4.85 | NT |
| 71 | <4.52 | NT |
| 72 | 4.67 | NT |
| 73 | 5.84 | NT |
| 74 | 5.98 | NT |
| 75 | 5.77 | NT |
| 76 | 5.65 | NT |
| 77 | 4.78 | NT |
| 78 | 6.59 | 7.28 |
| 79 | 6.39 | 7.59 |
| 80 | 5.77 | 6.29 |
| 81 | 6.85 | 6.51 |
| 82 | 5.27 | NT |
| 83 | 6.04 | 7.27 |
| 84 | 6.72 | 7.72 |
| 85 | 5.83 | NT |
| 86 | 5.86 | NT |
| 87 | 5.57 | NT |
| 88 | 5.28 | NT |
| 89 | 6.05 | NT |
| 90 | 5.61 | NT |
| 91 | 5.75 | NT |
| 92 | 6.31 | 7.54 |
| 93 | 6.58 | NT |
| 94 | 5.77 | NT |
| 95 | 6.16 | 7.39 |
| 96 | 6.76 | 7.91 |
| 97 | 5.66 | NT |
| 98 | 6.59 | 7.78 |
| 99 | 5.89 | 7.68 |
| 100 | 5.99 | 6.32 |
| 101** | <4.57 | <4.52 |
| 102 | <4.57 | NT |
| 103 | <4.57 | NT |
| 104 | <4.57 | NT |
| 105 | <4.57 | NT |
| 106 | <4.57 | NT |
| 107 | <4.57 | NT |
| 108 | <4.57 | NT |
| 109 | <4.57 | NT |
| 110 | <4.57 | NT |
| 111 | <4.57 | NT |
| 112 | <4.57 | NT |
| 113 | <4.57 | NT |
| 114** | <4.57 | NT |
| 115** | <4.57 | <4.52 |
| 116 | 6.04 | 6.45 |
| 117 | 6.47 | 7.56 |
| 118 | 6.26 | NT |
| 119 | 5.9 | NT |
| 120 | 6.51 | NT |
| 121 | 6.67 | 7.1 |
| 122 | 6.31 | NT |
| 123 | 7.04 | NT |
| 124 | 6.76 | NT |
| 125 | 6.55 | NT |
| 126 | <4.57 | NT |
| 127 | <4.57 | NT |
| 128 | 6.01 | NT |
| 129 | 6.45 | NT |
| 130 | 6.21 | NT |
| 131 | 7.01 | 7.85 |
| 132 | 6.08 | 7.31 |
| 133 | 6.51 | 7.5 |
| 134 | <4.57 | NT |
| 135 | 6.52 | NT |
| 136 | 6.39 | NT |
| 137 | 5.58 | NT |
| 138 | <4.57 | NT |
| 139 | 5.73 | NT |
| 140 | <4.57 | NT |
| 141 | 6.44 | NT |
| 142 | 7.04 | 7.42 |
| 143 | 6.47 | NT |
| 144 | <4.57 | NT |
| 145 | <4.57 | NT |
| 146 | 6.85 | 7.62 |
| 147 | <4.57 | NT |
| 148 | 6.58 | NT |
| 149 | 6.32 | 7.07 |
| 150 | 7.08 | 7.61 |
| 151 | 5.88 | NT |
| 152 | 6.19 | 7.44 |
| 153 | 6.22 | 7.12 |
| 154 | 5.54 | NT |
| 155 | 5.33 | NT |
| 156 | 6.28 | 7.24 |
| 157 | 7.03 | 7.81 |
| 158 | 5.33 | NT |
| 159 | 6.97 | 7.77 |
| 160 | 6.28 | 7.7 |
| 16 | <4.57 | NT |
| 162 | 5.26 | NT |
| 163 | 5.38 | NT |
| 164 | 6.56 | NT |
| 165 | <4.57 | NT |
| 166 | 5.7 | NT |
| 167 | <4.57 | NT |
| 168 | 6.07 | NT |
| 169 | <4.57 | NT |
| 170 | 5.65 | NT |
| 171 | 4.87 | NT |
| 172 | 5.41 | NT |
| 173 | <4.57 | NT |
| 174 | 6.29 | 7.74 |
| 175 | 5.92 | 6.81 |
| 176 | 4.8 | NT |
| 177 | 5.85 | 6.65 |
| 178 | <4.57 | NT |
| 179 | <4.57 | NT |
| 180 | 5.14 | NT |
| 181 | 5.66 | 6.91 |
| 182 | 5.02 | NT |
| 183 | 5.4 | NT |
| 184 | 6.14 | NT |
| 185 | 6.34 | NT |
| 186 | 6.58 | NT |
| 187 | 6.53 | NT |
| 188 | 5.42 | NT |
| 189 | 5.26 | NT |
| 190 | 7.31 | 7.75 |
| 191 | 6.47 | 7.42 |
| 192 | 5.72 | NT |
| 193 | 6.36 | NT |
| 194 | NT | NT |
| 195 | 6.37 | 7.43 |

TABLE 26-continued

Summary of results from Biological Example 1

| Example No | mPTP Rat liver pIC50* | mPTP Rat brain pIC50 |
|---|---|---|
| 196 | 6.56 | NT |
| 197 | <4.57 | NT |
| 198 | 5.95 | NT |
| 199 | 6.55 | NT |
| 200 | <4.57 | NT |
| 201 | <4.57 | NT |
| 202 | 5.61 | NT |
| 203 | 6.48 | 7.66 |
| 204 | 6.53 | NT |
| 205 | 6.15 | 7.38 |
| 206 | 5.24 | NT |
| 207 | 6.12 | 7.65 |
| 208 | <4.57 | NT |
| 209 | 5.96 | NT |
| 210 | 6.82 | NT |
| 211 | 6.05 | NT |
| 212 | 6.18 | NT |
| 213 | <4.57 | NT |
| 214 | <4.52 | NT |
| 215 | 6.34 | NT |
| 216 | 6.34 | NT |
| 217 | 6.37 | NT |
| 218 | 5.81 | NT |
| 219 | 5.73 | NT |
| 220 | 5.56 | NT |
| 221 | 6.23 | NT |
| 222 | 6.11 | NT |
| 223 | 6.90 | 7.60 |
| 224 | 4.52 | 5.04 |
| 225 | 5.47 | 6.66 |
| 226 | 4.52 | 4.82 |
| 227 | 6.21 | 7.76 |
| 228 | 6.16 | 7.12 |
| 229 | 6.32 | 6.83 |
| 230 | 6.18 | 6.40 |
| 231 | 6.61 | 7.37 |
| 232 | 6.65 | 7.56 |
| 233 | 5.77 | 7.10 |
| 234 | 5.24 | 6.30 |
| 235 | 6.79 | 7.65 |
| 236 | 6.11 | 7.18 |
| 237 | 6.56 | 7.46 |
| 238 | 5.15 | 6.21 |
| 239 | 7.10 | 8.07 |
| 240 | 6.91 | 7.61 |
| 241 | 6.81 | 7.73 |
| 242 | 4.95 | 5.39 |
| 243 | 6.91 | 7.93 |
| 244 | 6.73 | 7.53 |
| 245 | 6.13 | 7.44 |
| 246 | 4.56 | 5.85 |
| 247 | 6.27 | 7.26 |
| 248 | 6.16 | 7.05 |
| 249 | 6.25 | 7.07 |
| 250 | 5.23 | 5.94 |
| 251 | 6.21 | 7.06 |
| 252 | 6.82 | 7.91 |
| 253 | 6.30 | 7.56 |
| 254 | 4.52 | 5.70 |
| 255 | 6.45 | 7.29 |
| 256 | 5.09 | 6.13 |
| 257 | 6.82 | 8.37 |
| 258 | 6.39 | 7.71 |
| 259 | 6.46 | 8.22 |
| 260 | 5.78 | 7.50 |
| 261 | 7.13 | 8.29 |
| 262 | 6.00 | 7.45 |
| 263 | 6.54 | 8.09 |
| 264 | 6.09 | 7.29 |
| 265 | 6.15 | 7.50 |
| 266 | 5.95 | 7.04 |
| 267 | 6.55 | 7.32 |
| 268 | 6.04 | 7.02 |
| 269 | 6.78 | 7.73 |
| 270 | 5.39 | 6.51 |
| 271 | 6.83 | 7.59 |
| 272 | 4.52 | 6.35 |
| 273 | 6.50 | 7.92 |
| 274 | 6.85 | 8.5 |
| 275 | 6.75 | 8.57 |
| 276 | 5.82 | 7.27 |

*The examples were tested by different contract research organisation. Potencies as determined by the two organisations are believed to be comparable because tested standards had no notable differences between the two organisations.
**Reference example
NT-Not tested

Biological Example 2: Human Platelet Mitochondria Assay

The mPTP cell based assay was performed using a transformative functional cell-(human blood platelets)-based assay by flow cytometry. Procoagulant platelets expose phosphatidylserine (PS), allowing a burst of thrombin generation that is responsible for producing an occlusive thrombus. While an increase in cytosolic $Ca^{2+}$ concentration is required for deriving platelets to become activated, a higher and more sustained increases in cytosolic $Ca^{2+}$ concentration is needed to commit some platelets to becoming procoagulant [1]. Simulation of platelets results in the rapid influx of $Ca^{2+}$ across the platelet membrane. The $Ca^{2+}$ is then sequestered by mitochondria until the threshold for mPTP opening is reached, at which point the pore opens and the mitochondrial membrane potential is dissipated. mPTP opening and subsequent disruption in mitochondrial membrane potential leads to release of a high concentration of calcium stored in mitochondria into the platelet's cytosol ("supramaximal calcium signal" [1]) which is known to be a requisite initiating signal transduction leading to externalisation of procoagulant PS to the outer leaflet of platelets' plasma membrane [1]. PS externalisation of stimulated platelets can be quantified in live platelets using standard annexin V (AnV) labelling by flow cytometry, enabling pharmacological characterisation of mPTP inhibitors.

Fresh human blood (9 ml) was collected from consenting donors into 3.2% sodium citrate. Acid citrate dextrose (85 mM tri-sodium citrate, 71 mM citric acid, and 111 mM D-glucose) was added (1:7 vol/vol) and platelet-rich plasma was separated by centrifugation (200 g, 10 minutes, ambient temperature, and without any brake). Platelets were pelleted by centrifugation (600 g, 10 minutes, ambient temperature) in the presence of prostaglandin E1 (100 nM) and apyrase (0.02 U/mL). Pelleted platelets were resuspended in N-2-hydroxyethylpiperazine-N'-2-ethanesulfonic acid (HEPES)-buffered saline supplemented with D-glucose (135 mM NaCl, 10 mM HEPES, 3 mM KCl, 1 mM MgCl2, 0.34 mM NaH2PO4, 5 mM D-glucose, 0.1% bovine serum albumin, pH 7.4.) and apyrase (0.02 U/mL). Platelets were rested for 30 minutes at 30° C. before treatment protocols were initiated.

Test compounds were prepared from 10 mM stocks in DMSO. Serial dilution of search test compounds stamped in duplicate into a 96 well plate using Multidrop Pico 8 Digital Dispenser. Platelets were loaded and incubated for 30 min at room temperature. Then a stimulation mix containing Thrombin (FAC: 0.5 U/ml)/Convulxin (FAC: 0.05 µg/ml)/Calcium (FAC: 2 mM) added per well except control/not stimulated wells (This is low signal control). Some wells received no treatment but DMSO vehicle control and used as high signal controls (FAC of DMSO set at 0.1% in all wells of the 96 well plate). The reaction mix incubated for 10 min at room temperature. During last 2 min of stimulation AnV-APC was added to detect surface PS exposure. Samples ten fixed and fluorescence was detected by MACSQuant X flow cytometry and 10 000 platelet events were collected. The percentage of AnV-APC positive platelets was calculated for each well. IC50 for each compound was then calculated using a standard four parameter curve fit model (GraphPad Prism).

Results: $pIC_{50}$ values for certain Example compounds of the invention in a Human platelet mitochondria assay are provided in Table 27 below. The results indicate that the tested compounds of the invention display inhibition of mPTP in human platelets with most example compounds displaying $pIC_{50}$ values of 6.0 or greater.

TABLE 27

Summary of results from Biological Example 2

| Example No. | pIC50 |
|---|---|
| 22 | 7.14 |
| 26 | 6.77 |
| 27 | 5.70 |
| 235 | 7.31 |
| 239 | 7.39 |
| 243 | 7.36 |
| 244 | 7.14 |
| 247 | 6.52 |
| 249 | 6.52 |
| 252 | 7.42 |
| 96 | 7.43 |
| 117 | 6.90 |
| 190 | 7.23 |

Conclusion: The results of Biological Examples 1 and 2 demonstrate that the majority of tested compounds of the invention (or at least in the form of one stereoisomer thereof) are inhibitors of mPTP in at least one of a range of mPTP assays. A large number of the tested compounds are highly potent and have a $pIC_{50}$ value of 6.0 and above in the rat liver assay and/or a $pIC_{50}$ value of 7.0 and above in the rat brain assay. Therefore, the compounds of the invention are believed to be useful pharmaceuticals, particularly for the treatment or prophylaxis of diseases and disorders in which inhibition of mPTP provides a therapeutic or prophylactic effect.

Throughout the specification and the claims which follow, unless the context requires otherwise, the word 'comprise', and variations such as 'comprises' and 'comprising', will be understood to imply the inclusion of a stated integer, step, group of integers or group of steps but not to the exclusion of any other integer, step, group of integers or group of steps.

The application of which this description and claims forms part may be used as a basis for priority in respect of any subsequent application. The claims of such subsequent application may be directed to any feature or combination of features described herein. They may take the form of product, composition, process, or use claims and may include, by way of example and without limitation, the claims which follow.

All publications, including but not limited to patents and patent applications, cited in this specification are herein incorporated by reference as if each individual publication were specifically and individually indicated to be incorporated by reference herein as though fully set forth.

REFERENCES

Berge S et al. Pharmaceutical Salts. J. Pharm. Sci. 1977; 66; 1-19.

Greene et al. 4th Rev Ed., 2006, ISBN-10: 0471697540. "Protective Groups in Organic Synthesis".

Yu et al., TDP-43 Triggers Mitochondrial DNA Release via mPTP to Activate cGAS/STING in ALS, Cell, Volume 183, Issue 3, 2020, pages 636-649.e18.

Jang et al., Proximal tubule cyclophilin D mediates kidney fibrogenesis in obstructive nephropathy, 2021, American Journal of Physiology: Renal physiology, 2021 321:4, F431-F442

Plyte et al., Cinnamic Anilides as New Mitochondrial Permeability Transition Pore Inhibitors Endowed with Ischemia-Reperfusion Injury Protective Effect in Vivo, J. Med Chem. 2014, 57, 5333-47

Chen et al., Probing Mitochondrial Permeability Transition Pore Activity in Nucleated Cells and Platelets by High-Throughput Screening Assays Suggests Involvement of Protein Phosphatase 2B in Mitochondrial Dynamics, Assay and Drug Development Technologies, 2018, 16, 445-45.

Abbasian N, Millington-Burgess S L, Chabra S, Malcor J D, Harper M T. Supramaximal calcium signaling triggers procoagulant platelet formation. Blood Adv. 2020 Jan. 14; 4(1):154-164. doi: 10.1182/bloodadvances.2019000182. PMID: 31935287; PMCID: PMC6960470.

The invention claimed is:

1. A compound or a salt and/or solvate thereof, which is a compound selected from the group consisting of:

N-(2-cyclopropyl-3-(2,4-difluorophenyl)propyl)-1-methyl-5-oxo-4,5-dihydro-1H-1,2,4-triazole-3-carboxamide:

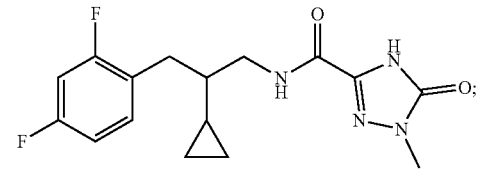 [SMILES: Cn1nc(C(=O)NCC(Cc2ccc(F)cc2F)C2CC2)[nH]c1=O]

N-(2-(2,4-difluorobenzyl)butyl)-1-methyl-5-oxo-4,5-dihydro-1H-1,2,4-triazole-3-carboxamide:

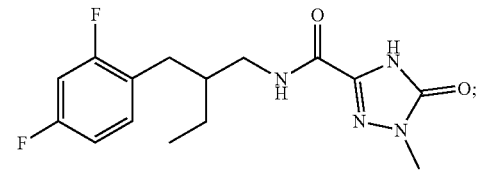 [SMILES: CCC(CNC(=O)c1nn(C)c(=O)[nH]1)Cc1ccc(F)cc1F]

N-(2-cyclopropyl-3-(3,4-difluorophenyl)propyl)-1-methyl-5-oxo-4,5-dihydro-1H-1,2,4-triazole-3-carboxamide:

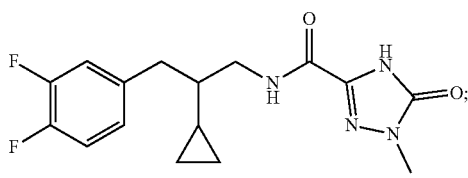 [SMILES: Cn1nc(C(=O)NCC(Cc2ccc(F)c(F)c2)C2CC2)[nH]c1=O]

N-(2-cyclopropyl-3-(2,5-difluorophenyl)propyl)-1-methyl-5-oxo-4,5-dihydro-1H-1,2,4-triazole-3-carboxamide:

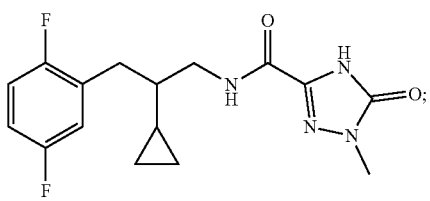 [SMILES: Cn1nc(C(=O)NCC(Cc2cc(F)ccc2F)C2CC2)[nH]c1=O]

N-(2-cyclopropyl-3-(2,4-difluorophenyl)-2-methylpropyl)-1-methyl-5-oxo-4,5-dihydro-1H-1,2,4-triazole-3-carboxamide:

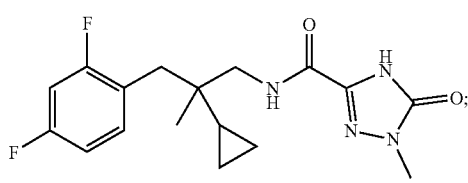 [SMILES: Cn1nc(C(=O)NCC(C)(Cc2ccc(F)cc2F)C2CC2)[nH]c1=O]

N-[2-cyclopropyl-3-(2,4-difluorophenyl)-2-methylpropyl]-5-fluoro-4-oxo-3H-pyrimidine-2-carboxamide:

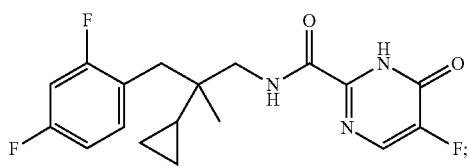 [SMILES: CC(CNC(=O)c1ncc(F)c(=O)[nH]1)(Cc1ccc(F)cc1F)C1CC1]

N-[2-cyclopropyl-3-(4-fluorophenyl)-2-methylpropyl]-5-fluoro-4-oxo-3H-pyrimidine-2-carboxamide:

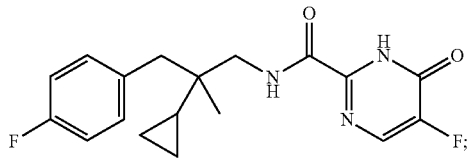 [SMILES: CC(CNC(=O)c1ncc(F)c(=O)[nH]1)(Cc1ccc(F)cc1)C1CC1]

or a salt and/or solvate of any one thereof.

2. The compound or salt and/or solvate thereof according to claim 1, which is (R)—N-(2-cyclopropyl-3-(2,4-difluorophenyl)propyl)-1-methyl-5-oxo-4,5-dihydro-1H-1,2,4-triazole-3-carboxamide:

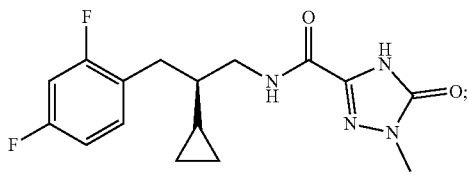

or a salt and/or solvate thereof.

3. The compound or salt and/or solvate thereof according to claim 1, which is (S)—N-(2-(2,4-difluorobenzyl)butyl)-1-methyl-5-oxo-4,5-dihydro-1H-1,2,4-triazole-3-carboxamide:

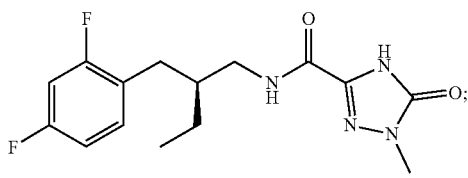

or a salt and/or solvate thereof.

4. The compound or salt and/or solvate thereof according to claim 1, which is (R)—N-(2-cyclopropyl-3-(3,4-difluorophenyl)propyl)-1-methyl-5-oxo-4,5-dihydro-1H-1,2,4-triazole-3-carboxamide:

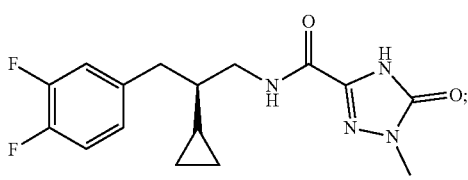 [SMILES: Cn1nc(C(=O)NC[C@H](Cc2ccc(F)c(F)c2)C2CC2)[nH]c1=O]

or a salt and/or solvate thereof.

5. The compound or salt and/or solvate thereof according to claim 1, which is (R)—N-(2-cyclopropyl-3-(2,5-difluorophenyl)propyl)-1-methyl-5-oxo-4,5-dihydro-1H-1,2,4-triazole-3-carboxamide:

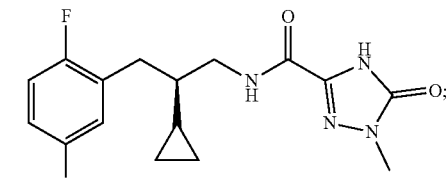

or a salt and/or solvate thereof.

6. The compound or salt and/or solvate thereof according to claim 1, which is (R)—N-(2-cyclopropyl-3-(2,4-difluorophenyl)-2-methylpropyl)-1-methyl-5-oxo-4,5-dihydro-1H-1,2,4-triazole-3-carboxamide:

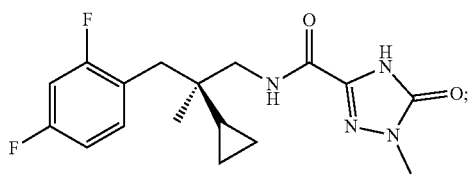 [SMILES: Cn1nc(C(=O)NC[C@](C)(Cc2ccc(F)cc2F)C2CC2)[nH]c1=O]

or a salt and/or solvate thereof.

7. The compound or salt and/or solvate thereof according to claim 1, which is (S)—N-(2-cyclopropyl-3-(2,4-difluorophenyl)-2-methylpropyl)-1-methyl-5-oxo-4,5-dihydro-1H-1,2,4-triazole-3-carboxamide:

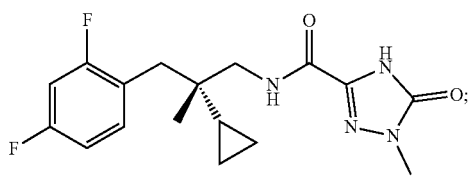 [SMILES: Cn1nc(C(=O)NC[C@@](C)(Cc2ccc(F)cc2F)C2CC2)[nH]c1=O]

or a salt and/or solvate thereof.

8. The compound or salt and/or solvate thereof according to claim 1, which is N-[(2R)-2-cyclopropyl-3-(2,4-difluorophenyl)-2-methylpropyl]-5-fluoro-4-oxo-3H-pyrimidine-2-carboxamide:

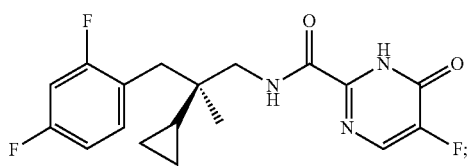 [SMILES: C[C@@](CNC(=O)c1ncc(F)c(=O)[nH]1)(Cc1ccc(F)cc1F)C1CC1]

or a salt and/or solvate thereof.

9. The compound or salt and/or solvate thereof according to claim 1, which is (R)—N-[2-cyclopropyl-3-(4-fluorophenyl)-2-methylpropyl]-5-fluoro-4-oxo-3H-pyrimidine-2-carboxamide:

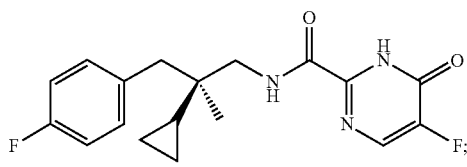 [SMILES: C[C@@](CNC(=O)c1ncc(F)c(=O)[nH]1)(Cc1ccc(F)cc1)C1CC1]

or a salt and/or solvate thereof.

10. The compound according to claim 1, which is (R)—N-(2-cyclopropyl-3-(2,4-difluorophenyl)propyl)-1-methyl-5-oxo-4,5-dihydro-1H-1,2,4-triazole-3-carboxamide:

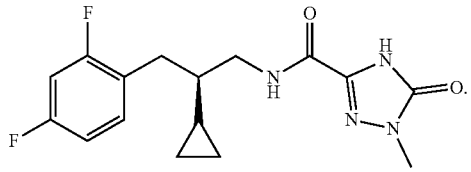

11. The compound according to claim 1, which is (S)—N-(2-(2,4-difluorobenzyl)butyl)-1-methyl-5-oxo-4,5-dihydro-1H-1,2,4-triazole-3-carboxamide:

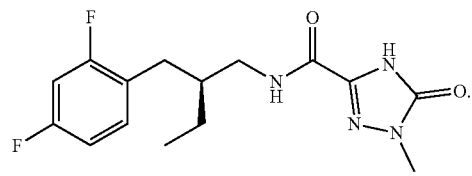 [SMILES: CC[C@H](CNC(=O)c1nn(C)c(=O)[nH]1)Cc1ccc(F)cc1F]

12. The compound according to claim 1, which is (R)—N-(2-cyclopropyl-3-(3,4-difluorophenyl)propyl)-1-methyl-5-oxo-4,5-dihydro-1H-1,2,4-triazole-3-carboxamide:

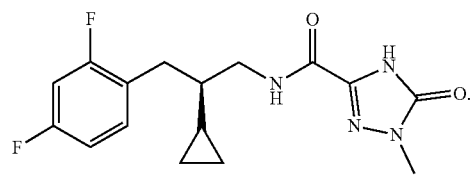 [SMILES: Cn1nc(C(=O)NC[C@H](Cc2ccc(F)cc2F)C2CC2)[nH]c1=O]

13. The compound according to claim 1, which is (R)—N-(2-cyclopropyl-3-(2,5-difluorophenyl)propyl)-1-methyl-5-oxo-4,5-dihydro-1H-1,2,4-triazole-3-carboxamide:

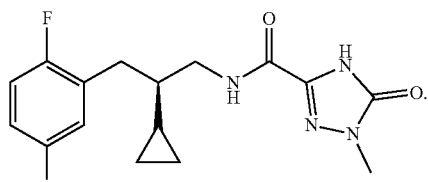

14. The compound according to claim 1, which is (R)—N-(2-cyclopropyl-3-(2,4-difluorophenyl)-2-methylpropyl)-1-methyl-5-oxo-4,5-dihydro-1H-1,2,4-triazole-3-carboxamide:

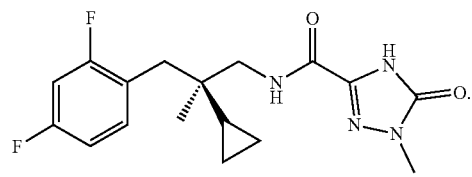 [SMILES: Cn1nc(C(=O)NC[C@](C)(Cc2ccc(F)cc2F)C2CC2)[nH]c1=O]

15. The compound according to claim 1, which is (S)—N-(2-cyclopropyl-3-(2,4-difluorophenyl)-2-methylpropyl)-1-methyl-5-oxo-4,5-dihydro-1H-1,2,4-triazole-3-carboxamide:

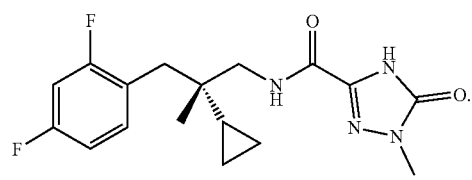 [SMILES: Cn1nc(C(=O)NC[C@@](C)(Cc2ccc(F)cc2F)C2CC2)[nH]c1=O]

16. The compound according to claim 1, which is N-[(2R)-2-cyclopropyl-3-(2,4-difluorophenyl)-2-methyl-propyl]-5-fluoro-4-oxo-3H-pyrimidine-2-carboxamide:

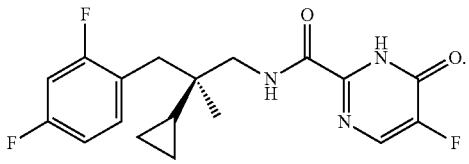

17. The compound according to claim 1, which is (R)—N-[2-cyclopropyl-3-(4-fluorophenyl)-2-methylpropyl]-5-fluoro-4-oxo-3H-pyrimidine-2-carboxamide:

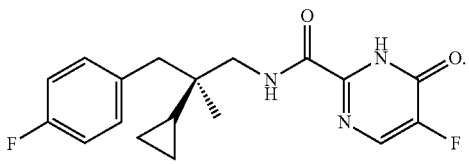

18. A pharmaceutical composition comprising a compound or a salt and/or solvate thereof according to claim 1 and at least one pharmaceutically acceptable carrier.

19. The pharmaceutical composition according to claim 18, wherein the compound or salt and/or solvate thereof is (R)—N-(2-cyclopropyl-3-(2,4-difluorophenyl)propyl)-1-methyl-5-oxo-4,5-dihydro-1H-1,2,4-triazole-3-carboxamide:

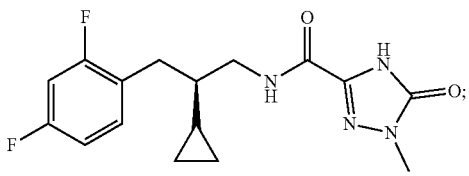 [SMILES: Cn1nc(C(=O)NC[C@H](Cc2ccc(F)cc2F)C2CC2)[nH]c1=O]

or a salt and/or solvate thereof.

20. The pharmaceutical composition according to claim 18, wherein the compound or salt and/or solvate thereof is (S)—N-(2-(2,4-difluorobenzyl)butyl)-1-methyl-5-oxo-4,5-dihydro-1H-1,2,4-triazole-3-carboxamide:

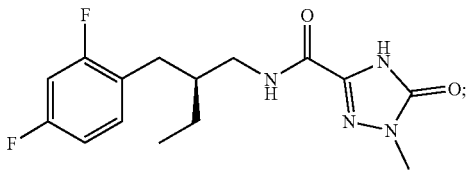 [SMILES: CC[C@H](CNC(=O)c1nn(C)c(=O)[nH]1)Cc1ccc(F)cc1F]

or a salt and/or solvate thereof.

21. The pharmaceutical composition according to claim 18, wherein the compound or salt and/or solvate thereof is (R)—N-(2-cyclopropyl-3-(3,4-difluorophenyl)propyl)-1-methyl-5-oxo-4,5-dihydro-1H-1,2,4-triazole-3-carboxamide:

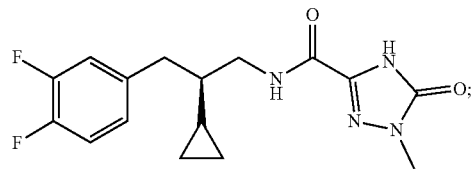 [SMILES: Cn1nc(C(=O)NC[C@H](Cc2ccc(F)c(F)c2)C2CC2)[nH]c1=O]

or a salt and/or solvate thereof.

22. The pharmaceutical composition according to claim 18, wherein the compound or salt and/or solvate thereof is (R)—N-(2-cyclopropyl-3-(2,5-difluorophenyl)propyl)-1-methyl-5-oxo-4,5-dihydro-1H-1,2,4-triazole-3-carboxamide:

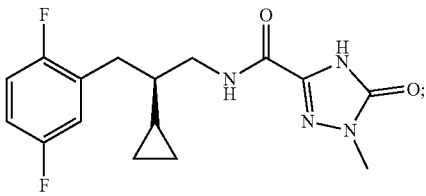 [SMILES: Cn1nc(C(=O)NC[C@H](Cc2cc(F)ccc2F)C2CC2)[nH]c1=O]

or a salt and/or solvate thereof.

23. The pharmaceutical composition according to claim 18, wherein the compound or salt and/or solvate thereof is (R)—N-(2-cyclopropyl-3-(2,4-difluorophenyl)-2-methylpropyl)-1-methyl-5-oxo-4,5-dihydro-1H-1,2,4-triazole-3-carboxamide:

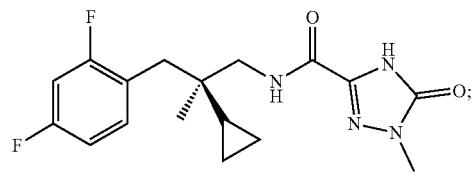 [SMILES: Cn1nc(C(=O)NC[C@](C)(Cc2ccc(F)cc2F)C2CC2)[nH]c1=O]

or a salt and/or solvate thereof.

24. The pharmaceutical composition according to claim 18, wherein the compound or salt and/or solvate thereof is (S)—N-(2-cyclopropyl-3-(2,4-difluorophenyl)-2-methylpropyl)-1-methyl-5-oxo-4,5-dihydro-1H-1,2,4-triazole-3-carboxamide:

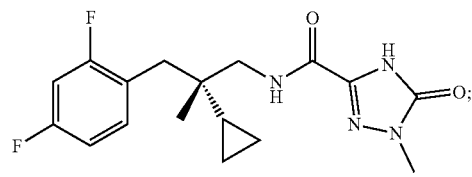

or a salt and/or solvate thereof.

25. The pharmaceutical composition according to claim 18, wherein the compound or salt and/or solvate thereof is N-[(2R)-2-cyclopropyl-3-(2,4-difluorophenyl)-2-methyl-propyl]-5-fluoro-4-oxo-3H-pyrimidine-2-carboxamide:

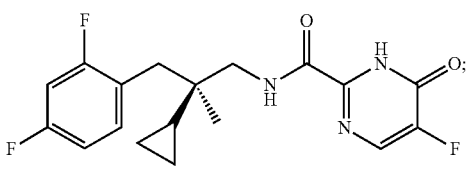 [SMILES: C[C@@](CNC(=O)c1ncc(F)c(=O)[nH]1)(Cc1ccc(F)cc1F)C1CC1]

or a salt and/or solvate thereof.

26. The pharmaceutical composition according to claim 18, wherein the compound or salt and/or solvate thereof is (R)—N-[2-cyclopropyl-3-(4-fluorophenyl)-2-methylpropyl]-5-fluoro-4-oxo-3H-pyrimidine-2-carboxamide:

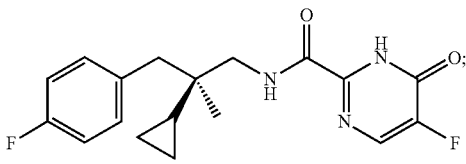 [SMILES: C[C@@](CNC(=O)c1ncc(F)c(=O)[nH]1)(Cc1ccc(F)cc1)C1CC1]

or a salt and/or solvate thereof.

27. A method of treating a disease or disorder in a human subject in which inhibition of mitochondrial permeability transition pore (mPTP) provides a therapeutic effect which comprises administering to the human subject an effective amount of a compound or pharmaceutically acceptable salt and/or solvate thereof according to claim 1.

28. The method according to claim 27, wherein the disease or disorder is selected from the group consisting of: Parkinson's disease, dementia with Lewy bodies, Alzheimer's disease, amyotrophic lateral sclerosis, multiple sclerosis, frontal temporal dementia, chemotherapy induced neuropathy, Huntington's disease, spinocerebellar ataxias, progressive supranuclear palsy, hereditary spastic paraplegia, Duchenne muscular dystrophy, congenital muscular dystrophy, traumatic brain injury, Friedreich's ataxia, AIDS dementia complex, depressive disorders, schizophrenia, epilepsy, myocardial infarction, stroke, kidney ischemia reperfusion injury, organ damage during transplantation, hepatic steatosis, diabetes, diabetic neuropathy, diabetic retinopathy, cognitive decline, obesity and feeding behaviours, non-alcoholic fatty liver disease, acute pancreatitis, systemic lupus, organ failure in sepsis, hepatitis, bone repair, bone weakness in aging in osteoporosis, sarcopenia, chronic kidney disease associated with APOL1 genetic variants, chronic kidney disease, Reye syndrome, Leber's hereditary optic neuropathy and disorders, Facial onset sensory and motor neuronopathy, Primary lateral sclerosis, Progressive muscular atrophy, Inclusion body myopathy associated with early-onset Paget disease of the bone, Frontotemporal lobar degeneration dementia, Perry disease, Chronic traumatic encephalopathy, Severe traumatic brain injury, Hippocampal sclerosis dementia, Limbic-predominant age-related TDP-43 encephalopathy, and Cerebral age-related TDP-43 with sclerosis.

29. The method according to claim 28, wherein the disease or disorder is selected from the group consisting of: Parkinson's disease, dementia with Lewy bodies, Alzheimer's disease, amyotrophic lateral sclerosis, multiple sclerosis, frontal temporal dementia, chemotherapy induced neuropathy, Huntington's disease, spinocerebellar ataxias, progressive supranuclear palsy, hereditary spastic paraplegia, Duchenne muscular dystrophy, congenital muscular dystrophy, traumatic brain injury, and Friedreich's ataxia.

30. The method according to claim 28, wherein the disease or disorder is selected from the group consisting of: Parkinson's disease and amyotrophic lateral sclerosis.

* * * * *